US011223899B2

(12) United States Patent
Felton et al.

(10) Patent No.: US 11,223,899 B2
(45) Date of Patent: Jan. 11, 2022

(54) USER INTERFACES FOR MANAGING AUDIO EXPOSURE

(71) Applicant: Apple Inc., Cupertino, CA (US)

(72) Inventors: Nicholas Felton, Sunnyvale, CA (US); Eamon Francis Gilravi, San Francisco, CA (US); Ruchi Goswami, Sunnyvale, CA (US); David Harrison, Mountain View, CA (US); Jakub Mazur, Daly City, CA (US); Aroon Pahwa, Palo Alto, CA (US); Andriy Suden, Chicago, IL (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/921,312

(22) Filed: Jul. 6, 2020

(65) Prior Publication Data

US 2020/0382868 A1 Dec. 3, 2020

Related U.S. Application Data

(63) Continuation of application No. 16/880,552, filed on May 21, 2020.

(Continued)

(51) Int. Cl.

*G06F 3/16* (2006.01)
*H04R 3/04* (2006.01)

(Continued)

(52) U.S. Cl.

CPC ............. *H04R 3/04* (2013.01); *G06F 3/0482* (2013.01); *G06F 9/542* (2013.01); *H04R 2430/01* (2013.01)

(58) Field of Classification Search

CPC ..... H04R 3/04; H04R 2430/01; G06F 3/0482; G06F 9/542

See application file for complete search history.

(56) References Cited

U.S. PATENT DOCUMENTS

| | | | |
|---|---|---|---|
| 5,515,344 | A | 5/1996 | Ng |
| 5,642,731 | A | 7/1997 | Kehr |

(Continued)

FOREIGN PATENT DOCUMENTS

| | | | |
|---|---|---|---|
| CA | 2815518 | A1 | 5/2012 |
| CN | 102448555 | | 5/2012 |

(Continued)

OTHER PUBLICATIONS

Non-Final Office Action received for U.S. Appl. No. 16/144,030, dated Nov. 5, 2020, 5 pages.

(Continued)

*Primary Examiner* — Joseph Saunders, Jr.
(74) *Attorney, Agent, or Firm* — Dentons US LLP

(57) ABSTRACT

The present disclosure generally relates to user interfaces and techniques for managing audio exposure using a computer system (e.g., an electronic device). In accordance with some embodiments, the electronic device displays a graphical indication of a noise exposure level over a first period of time with an area of the graphical indication that is colored to represent the noise exposure level, the color of the area transitioning from a first color to a second color when the noise exposure level exceeds a first threshold. In accordance with some embodiments, the electronic device displays noise exposure levels attributable to a first output device type and a second output device type and, in response to selecting a filtering affordance, visually distinguishes a set of noise exposure levels attributable to the second output device type.

27 Claims, 135 Drawing Sheets

Related U.S. Application Data

(60) Provisional application No. 63/023,023, filed on May 11, 2020, provisional application No. 62/856,016, filed on Jun. 1, 2019.

(51) Int. Cl.
*G06F 9/54* (2006.01)
*G06F 3/0482* (2013.01)

(56) References Cited

U.S. PATENT DOCUMENTS 6,416,471 B1 7/2002 Kumar et al.
6,600,696 B1 7/2003 Lynn
6,705,972 B1 3/2004 Takano et al.
6,950,839 B1 9/2005 Green et al.
7,128,693 B2 10/2006 Brown et al.
7,166,078 B2 1/2007 Saini et al.
7,739,148 B2 6/2010 Suzuki et al.
8,321,006 B1 11/2012 Snyder et al.
8,475,339 B2 7/2013 Hwang et al.
8,676,170 B2 3/2014 Porrati et al.
8,725,527 B1 5/2014 Kahn et al.
8,758,262 B2 6/2014 Rhee et al.
8,784,115 B1 7/2014 Chuang
9,026,927 B2 5/2015 Brumback et al.
9,224,291 B2 12/2015 Moll-carrillo et al.
9,579,060 B1 2/2017 Lisy et al.
9,589,445 B2 3/2017 White et al.
9,672,715 B2 6/2017 Roberts et al.
9,712,629 B2 7/2017 Molettiere et al.
9,721,066 B1 8/2017 Funaro et al.
9,730,621 B2 8/2017 Cohen et al.
9,801,562 B1 10/2017 Host-madsen
9,808,206 B1 11/2017 Zhao et al.
9,813,642 B1 11/2017 Chen et al.
9,940,682 B2 4/2018 Hoffman et al.
10,175,781 B2 1/2019 Karagozler et al.
10,254,911 B2 4/2019 Yang
10,339,830 B2 7/2019 Han et al.
10,576,327 B2 3/2020 Kim et al.
10,602,964 B2 3/2020 Kerber
10,635,267 B2 4/2020 Williams
10,674,942 B2 6/2020 Williams et al.
10,762,990 B1 9/2020 Schilling et al.
10,764,700 B1 9/2020 Felton
10,796,549 B2 10/2020 Roberts et al.
11,107,580 B1 8/2021 Felton et al.
2002/0095292 A1 7/2002 Mittal et al.
2003/0181291 A1 9/2003 Ogawa
2003/0191609 A1 10/2003 Bernardi et al.
2003/0200483 A1 10/2003 Sutton
2003/0216971 A1 11/2003 Sick et al.
2003/0226695 A1 12/2003 Mault
2004/0017300 A1 1/2004 Kotzin et al.
2004/0077958 A1 4/2004 Kato et al.
2004/0190729 A1 9/2004 Yonovitz et al.
2004/0193069 A1 9/2004 Takehara
2004/0236189 A1 11/2004 Hawthorne et al.
2005/0010117 A1 1/2005 Agutter et al.
2005/0027208 A1 2/2005 Shiraishi et al.
2005/0075214 A1 4/2005 Brown et al.
2005/0079905 A1 4/2005 Martens
2005/0149362 A1 7/2005 Peterson et al.
2005/0228735 A1 10/2005 Duquette
2005/0244013 A1 11/2005 Battenberg et al.
2005/0272564 A1 12/2005 Pyles et al.
2006/0094969 A1 5/2006 Nissila
2006/0098109 A1 5/2006 Ooki
2006/0106741 A1 5/2006 Janarthanan
2006/0136173 A1 6/2006 Case, Jr. et al.
2006/0149144 A1 7/2006 Lynn et al.
2006/0152372 A1 7/2006 Stout
2006/0182287 A1 8/2006 Schulein et al.
2006/0205564 A1 9/2006 Peterson
2006/0235319 A1 10/2006 Belohlavek et al.
2006/0274908 A1* 12/2006 Choi ........................ H04S 7/40
381/306
2007/0016440 A1 1/2007 Stroup
2007/0056727 A1 3/2007 Newman
2008/0012701 A1 1/2008 Kass et al.
2008/0058626 A1 3/2008 Miyata et al.
2008/0146892 A1 6/2008 Leboeuf et al.
2008/0159547 A1 7/2008 Schuler et al.
2008/0200312 A1 8/2008 Tagliabue
2008/0205660 A1 8/2008 Goldstein
2008/0228045 A1 9/2008 Gao et al.
2008/0240519 A1 10/2008 Nagamitsu
2008/0300110 A1 12/2008 Smith et al.
2009/0007596 A1 1/2009 Goldstein et al.
2009/0052677 A1 2/2009 Smith
2009/0065578 A1 3/2009 Peterson et al.
2009/0118100 A1 5/2009 Oliver et al.
2009/0180631 A1 7/2009 Michael et al.
2009/0210078 A1 8/2009 Crowley
2009/0216556 A1 8/2009 Martin et al.
2009/0245537 A1 10/2009 Morin
2009/0259134 A1 10/2009 Levine
2009/0262088 A1 10/2009 Moll-carrillo et al.
2009/0287103 A1 11/2009 Pillai
2009/0287327 A1 11/2009 Hsu et al.
2009/0290721 A1 11/2009 Goldstein et al.
2010/0003951 A1 1/2010 Ray et al.
2010/0010832 A1 1/2010 Boute et al.
2010/0017489 A1 1/2010 Birnbaum et al.
2010/0027807 A1 2/2010 Jeon
2010/0046767 A1 2/2010 Bayley et al.
2010/0062905 A1 3/2010 Rottier et al.
2010/0076331 A1 3/2010 Chan et al.
2010/0099539 A1 4/2010 Haataja
2010/0119093 A1 5/2010 Uzuanis et al.
2010/0121700 A1 5/2010 Wigder et al.
2010/0150378 A1 6/2010 Lee et al.
2010/0222645 A1 9/2010 Nadler et al.
2010/0292600 A1 11/2010 Dibenedetto et al.
2010/0312138 A1 12/2010 Regas
2011/0066051 A1 3/2011 Moon et al.
2011/0093481 A1 4/2011 Hussam
2011/0098928 A1 4/2011 Hoffman et al.
2011/0152656 A1 6/2011 Weinert et al.
2011/0166631 A1 7/2011 Breining
2011/0214162 A1 9/2011 Brakensiek et al.
2011/0245623 A1 10/2011 Chutani et al.
2011/0307821 A1 12/2011 Martens
2012/0002510 A1 1/2012 Berman, Jr.
2012/0029303 A1 2/2012 Shaya
2012/0038651 A1 2/2012 Case et al.
2012/0041767 A1 2/2012 Hoffman et al.
2012/0059664 A1 3/2012 Georgiev et al.
2012/0065480 A1 3/2012 Badilini et al.
2012/0071770 A1 3/2012 Grey et al.
2012/0112908 A1 5/2012 Prykaeri et al.
2012/0116550 A1 5/2012 Hoffman et al.
2012/0203124 A1 8/2012 Lim
2012/0215115 A1 8/2012 Takahashi
2012/0245447 A1 9/2012 Karan et al.
2012/0283524 A1 11/2012 Kiani et al.
2012/0283587 A1 11/2012 Gosh et al.
2012/0283855 A1 11/2012 Hoffman et al.
2012/0317167 A1 12/2012 Rahman et al.
2012/0321094 A1 12/2012 Schiller et al.
2013/0002425 A1 1/2013 Hatch et al.
2013/0011819 A1 1/2013 Horseman
2013/0012788 A1 1/2013 Horseman
2013/0013331 A1 1/2013 Horseman
2013/0033376 A1 2/2013 Seyed et al.
2013/0065569 A1 3/2013 Leipzig et al.
2013/0073960 A1 3/2013 Eppolito et al.
2013/0095459 A1 4/2013 Tran
2013/0110264 A1 5/2013 Weast et al.
2013/0114100 A1 5/2013 Torii et al.
2013/0115583 A1 5/2013 Gordon et al.
2013/0144653 A1 6/2013 Poe et al.
2013/0151285 A1 6/2013 Mclaren et al.
2013/0158416 A1 6/2013 Hatlestad et al.

(56) References Cited

U.S. PATENT DOCUMENTS

2013/0197679 A1 8/2013 Balakrishnan et al.
2013/0202121 A1 8/2013 Georgiou et al.
2013/0215042 A1 8/2013 Messerschmidt et al.
2013/0231575 A1 9/2013 Erkkila et al.
2013/0231947 A1 9/2013 Shusterman
2013/0268398 A1 10/2013 Agami et al.
2013/0274628 A1 10/2013 Fausti et al.
2013/0304616 A1 11/2013 Raleigh et al.
2013/0317380 A1 11/2013 Liley et al.
2013/0325396 A1 12/2013 Yuen et al.
2013/0332286 A1 12/2013 Medelius et al.
2014/0037107 A1 2/2014 Marino et al.
2014/0038781 A1 2/2014 Foley et al.
2014/0073486 A1 3/2014 Ahmed et al.
2014/0081118 A1 3/2014 Reinhold et al.
2014/0088995 A1 3/2014 Damani
2014/0127996 A1 5/2014 Park et al.
2014/0129007 A1 5/2014 Utter, II
2014/0129243 A1 5/2014 Utter
2014/0135592 A1 5/2014 Ohnemus et al.
2014/0142403 A1 5/2014 Brumback et al.
2014/0143678 A1 5/2014 Mistry et al.
2014/0164611 A1 6/2014 Molettiere et al.
2014/0176335 A1 6/2014 Brumback et al.
2014/0176475 A1 6/2014 Myers et al.
2014/0180595 A1 6/2014 Brumback et al.
2014/0184422 A1 7/2014 Mensinger et al.
2014/0189510 A1 7/2014 Ozcan
2014/0197946 A1 7/2014 Park et al.
2014/0200426 A1 7/2014 Taub et al.
2014/0240122 A1 8/2014 Roberts et al.
2014/0240349 A1 8/2014 Tuukkanen
2014/0266776 A1 9/2014 Miller et al.
2014/0275852 A1 9/2014 Hong et al.
2014/0275856 A1* 9/2014 Kohlrausch .......... A61B 5/0205 600/301
2014/0278220 A1 9/2014 Yuen
2014/0297217 A1 10/2014 Yuen
2014/0327527 A1 11/2014 Goldstein et al.
2014/0336796 A1 11/2014 Agnew
2014/0344687 A1 11/2014 Durham et al.
2014/0354494 A1 12/2014 Katz
2014/0358012 A1 12/2014 Richards et al.
2014/0371887 A1 12/2014 Hoffman et al.
2015/0081210 A1 3/2015 Yeh et al.
2015/0089536 A1 3/2015 Byerley
2015/0099991 A1 4/2015 Yamaguchi et al.
2015/0106025 A1 4/2015 Keller et al.
2015/0110277 A1 4/2015 Pidgeon et al.
2015/0110279 A1 4/2015 Tejerina
2015/0120633 A1 4/2015 Norlander et al.
2015/0124067 A1 5/2015 Bala et al.
2015/0125832 A1 5/2015 Tran
2015/0127365 A1 5/2015 Rizvi et al.
2015/0142689 A1 5/2015 Squires
2015/0179186 A1* 6/2015 Swierk .................... G06F 3/165 704/276
2015/0181314 A1 6/2015 Swanson
2015/0182843 A1 7/2015 Esposito et al.
2015/0185967 A1 7/2015 Ly et al.
2015/0196804 A1 7/2015 Koduri et al.
2015/0205947 A1 7/2015 Berman et al.
2015/0216448 A1 8/2015 Lotan et al.
2015/0217163 A1 8/2015 Amis et al.
2015/0220883 A1 8/2015 Bfar et al.
2015/0230717 A1 8/2015 Wan
2015/0262499 A1 9/2015 Wicka et al.
2015/0286800 A1 10/2015 Kanagala et al.
2015/0287421 A1* 10/2015 Benway ............. G10K 11/1754 704/226
2015/0288944 A1 10/2015 Nistico et al.
2015/0289823 A1 10/2015 Rack-Gomer et al.
2015/0297134 A1 10/2015 Albert et al.
2015/0324751 A1 11/2015 Orenstein et al.
2015/0347711 A1 12/2015 Soli et al.
2015/0350799 A1* 12/2015 Schnaare ............... H04R 29/00 381/56
2015/0350861 A1 12/2015 Soli et al.
2016/0019360 A1 1/2016 Pahwa et al.
2016/0055420 A1 2/2016 Karanam et al.
2016/0058313 A1 3/2016 Sato
2016/0058336 A1 3/2016 Blahnik et al.
2016/0058337 A1 3/2016 Blahnik et al.
2016/0062582 A1 3/2016 Wilson et al.
2016/0063215 A1 3/2016 Zamer
2016/0085937 A1 3/2016 Dettinger et al.
2016/0086500 A1 3/2016 Kaleal
2016/0098522 A1 4/2016 Weinstein
2016/0106398 A1 4/2016 Kuppuswami
2016/0109961 A1 4/2016 Parshionikar
2016/0132046 A1 5/2016 Beoughter et al.
2016/0135719 A1 5/2016 Von Kraus et al.
2016/0135731 A1 5/2016 Drennan
2016/0150978 A1 6/2016 Yuen et al.
2016/0166181 A1 6/2016 Shennib
2016/0174857 A1 6/2016 Eggers et al.
2016/0189051 A1 6/2016 Mahmood
2016/0196635 A1 7/2016 Cho et al.
2016/0210099 A1 7/2016 Hampapuram et al.
2016/0235325 A1 8/2016 Chou
2016/0235374 A1 8/2016 Miller et al.
2016/0249857 A1 9/2016 Choi et al.
2016/0250517 A1 9/2016 Tilvis et al.
2016/0256082 A1 9/2016 Ely et al.
2016/0263435 A1 9/2016 Venkatraman et al.
2016/0270717 A1 9/2016 Luna et al.
2016/0275990 A1 9/2016 Vassort
2016/0287177 A1 10/2016 Huppert et al.
2016/0292373 A1 10/2016 Spors et al.
2016/0299769 A1 10/2016 Hunter et al.
2016/0301761 A1 10/2016 Sanchez-sandoval et al.
2016/0301794 A1 10/2016 Schlakman et al.
2016/0302666 A1 10/2016 Shaya
2016/0314670 A1 10/2016 Roberts et al.
2016/0314683 A1 10/2016 Felch et al.
2016/0317341 A1 11/2016 Galvan
2016/0324457 A1 11/2016 Dagum
2016/0324488 A1 11/2016 Olsen
2016/0328991 A1 11/2016 Simpson et al.
2016/0332025 A1 11/2016 Repka
2016/0346607 A1 12/2016 Rapfogel
2016/0360100 A1 12/2016 Kim et al.
2017/0000348 A1 1/2017 Karsten et al.
2017/0000359 A1 1/2017 Kohli et al.
2017/0007159 A1 1/2017 Dieffenderfer et al.
2017/0007167 A1 1/2017 Kostic et al.
2017/0032168 A1 2/2017 Kim
2017/0039327 A1 2/2017 Bitran et al.
2017/0043214 A1 2/2017 Higashi
2017/0046024 A1 2/2017 Dascola et al.
2017/0053542 A1 2/2017 Wilson et al.
2017/0071551 A1 3/2017 Jain et al.
2017/0075551 A1 3/2017 Robinson et al.
2017/0086693 A1 3/2017 Peterson et al.
2017/0127997 A1 5/2017 Hyde et al.
2017/0132395 A1 5/2017 Futch
2017/0136297 A1 5/2017 Penie
2017/0150917 A1 6/2017 Brief et al.
2017/0156593 A1 6/2017 Ferber et al.
2017/0161014 A1 6/2017 Kikugawa et al.
2017/0172522 A1 6/2017 Insler et al.
2017/0177797 A1 6/2017 Kurniawan et al.
2017/0181645 A1 6/2017 Mahalingam et al.
2017/0188841 A1 7/2017 Ma et al.
2017/0188893 A1 7/2017 Venkatraman et al.
2017/0188979 A1 7/2017 Volpe
2017/0202496 A1 7/2017 Ramanathan
2017/0235443 A1 8/2017 Suzuki
2017/0237694 A1 8/2017 Choudhary et al.
2017/0243508 A1 8/2017 Cheng et al.
2017/0258455 A1 9/2017 Qi
2017/0274149 A1 9/2017 Aeschlimann
2017/0274267 A1 9/2017 Blahnik
2017/0293727 A1 10/2017 Klaassen et al.

(56) References Cited

U.S. PATENT DOCUMENTS

| | | | |
|---|---|---|---|
| 2017/0294174 A1 | 10/2017 | Albadawi et al. | |
| 2017/0300186 A1 | 10/2017 | Kuhar et al. | |
| 2017/0303844 A1 | 10/2017 | Baker et al. | |
| 2017/0319184 A1 | 11/2017 | Sano | |
| 2017/0330297 A1 | 11/2017 | Cronin et al. | |
| 2017/0348562 A1 | 12/2017 | Jung et al. | |
| 2017/0354845 A1 | 12/2017 | Williams et al. | |
| 2017/0357329 A1 | 12/2017 | Park et al. | |
| 2017/0357520 A1 | 12/2017 | De Vries et al. | |
| 2018/0000426 A1 | 1/2018 | Li | |
| 2018/0001184 A1 | 1/2018 | Tran et al. | |
| 2018/0011686 A1 | 1/2018 | Zhao et al. | |
| 2018/0032234 A1 | 2/2018 | Michalske | |
| 2018/0042559 A1 | 2/2018 | Cabrera et al. | |
| 2018/0047277 A1 | 2/2018 | Thyroff | |
| 2018/0049659 A1 | 2/2018 | Briante et al. | |
| 2018/0049696 A1 | 2/2018 | Eom et al. | |
| 2018/0055490 A1 | 3/2018 | Lee et al. | |
| 2018/0060522 A1 | 3/2018 | Petterson et al. | |
| 2018/0064356 A1 | 3/2018 | Mendenhall et al. | |
| 2018/0064388 A1 | 3/2018 | Heneghan et al. | |
| 2018/0065025 A1 | 3/2018 | Toda et al. | |
| 2018/0070861 A1 | 3/2018 | Eastman et al. | |
| 2018/0074462 A1 | 3/2018 | Helder et al. | |
| 2018/0074464 A1 | 3/2018 | Essery et al. | |
| 2018/0081918 A1 | 3/2018 | Gravenites et al. | |
| 2018/0096739 A1 | 4/2018 | Sano | |
| 2018/0107962 A1 | 4/2018 | Lundin et al. | |
| 2018/0117414 A1 | 5/2018 | Miyasaka et al. | |
| 2018/0120985 A1 | 5/2018 | Wallace et al. | |
| 2018/0132768 A1 | 5/2018 | Sasahara et al. | |
| 2018/0137937 A1 | 5/2018 | Gass et al. | |
| 2018/0140211 A1 | 5/2018 | Nakazawa et al. | |
| 2018/0140927 A1 | 5/2018 | Kito et al. | |
| 2018/0154212 A1 | 6/2018 | Park et al. | |
| 2018/0189077 A1 | 7/2018 | Gupta et al. | |
| 2018/0211020 A1 | 7/2018 | Fukuda | |
| 2018/0239869 A1 | 8/2018 | Laing et al. | |
| 2018/0255159 A1 | 9/2018 | Cohen et al. | |
| 2018/0256036 A1 | 9/2018 | Kogure et al. | |
| 2018/0256078 A1 | 9/2018 | Vaterlaus | |
| 2018/0256095 A1 | 9/2018 | Arnold et al. | |
| 2018/0263510 A1 | 9/2018 | Cronin et al. | |
| 2018/0263517 A1 | 9/2018 | Kubo | |
| 2018/0279885 A1 | 10/2018 | Bulut | |
| 2018/0336530 A1 | 11/2018 | Johnson et al. | |
| 2018/0350451 A1 | 12/2018 | Ohnemus et al. | |
| 2018/0368814 A1 | 12/2018 | R. Kudtarkar | |
| 2018/0376107 A1 | 12/2018 | Shibaev et al. | |
| 2019/0012898 A1 | 1/2019 | Wittrup | |
| 2019/0014205 A1 | 1/2019 | Miloseski et al. | |
| 2019/0034050 A1 | 1/2019 | Williams et al. | |
| 2019/0034494 A1 | 1/2019 | Bradley et al. | |
| 2019/0043337 A1 | 2/2019 | Liu et al. | |
| 2019/0073618 A1* | 3/2019 | Kanukurthy | G06Q 10/0635 |
| 2019/0090800 A1 | 3/2019 | Bosworth et al. | |
| 2019/0090816 A1 | 3/2019 | Horseman | |
| 2019/0104951 A1 | 4/2019 | Valys et al. | |
| 2019/0122523 A1 | 4/2019 | Roberts et al. | |
| 2019/0138696 A1 | 5/2019 | Carpenter et al. | |
| 2019/0150854 A1 | 5/2019 | Chung et al. | |
| 2019/0192086 A1 | 6/2019 | Menon et al. | |
| 2019/0206538 A1 | 7/2019 | Xing et al. | |
| 2019/0223843 A1 | 7/2019 | Vitti | |
| 2019/0228179 A1 | 7/2019 | Rakshit et al. | |
| 2019/0228640 A1 | 7/2019 | Freedman et al. | |
| 2019/0240534 A1 | 8/2019 | Black | |
| 2019/0252054 A1 | 8/2019 | Dirani et al. | |
| 2019/0274562 A1 | 9/2019 | Soli et al. | |
| 2019/0274563 A1 | 9/2019 | Soli et al. | |
| 2019/0274564 A1 | 9/2019 | Soli et al. | |
| 2019/0274565 A1 | 9/2019 | Soli et al. | |
| 2019/0278556 A1 | 9/2019 | Usher et al. | |
| 2019/0298230 A1 | 10/2019 | Nicholson et al. | |
| 2019/0336044 A1 | 11/2019 | Williams et al. | |
| 2019/0336045 A1 | 11/2019 | Williams et al. | |
| 2019/0339849 A1 | 11/2019 | Williams et al. | |
| 2019/0365332 A1 | 12/2019 | Fedichev et al. | |
| 2019/0380624 A1 | 12/2019 | Ota et al. | |
| 2019/0385708 A1 | 12/2019 | Hong et al. | |
| 2020/0000441 A1 | 1/2020 | Lafon et al. | |
| 2020/0069258 A1 | 3/2020 | Grinberg | |
| 2020/0100693 A1 | 4/2020 | Velo | |
| 2020/0126673 A1 | 4/2020 | Tanabe et al. | |
| 2020/0245928 A1 | 8/2020 | Kang et al. | |
| 2020/0261011 A1 | 8/2020 | Seppanen et al. | |
| 2020/0273566 A1 | 8/2020 | Bhowmik et al. | |
| 2020/0297249 A1 | 9/2020 | Williams et al. | |
| 2020/0315544 A1 | 10/2020 | Levine | |
| 2020/0356687 A1 | 11/2020 | Salzman et al. | |
| 2020/0374682 A1 | 11/2020 | Newman et al. | |
| 2020/0379611 A1 | 12/2020 | Dryer et al. | |
| 2020/0381099 A1 | 12/2020 | Crowley et al. | |
| 2020/0381123 A1 | 12/2020 | Dryer et al. | |
| 2020/0382866 A1 | 12/2020 | Felton | |
| 2020/0382867 A1 | 12/2020 | Felton | |
| 2020/0384314 A1 | 12/2020 | Lee et al. | |
| 2021/0068714 A1 | 3/2021 | Crowley et al. | |
| 2021/0113137 A1 | 4/2021 | Soli et al. | |
| 2021/0225482 A1 | 7/2021 | Crowley et al. | |

FOREIGN PATENT DOCUMENTS

| | | | |
|---|---|---|---|
| CN | 103403627 | A | 11/2013 |
| CN | 104720765 | A | 6/2015 |
| CN | 106164808 | | 11/2016 |
| CN | 106537397 | A | 3/2017 |
| CN | 106709235 | A | 5/2017 |
| CN | 106725384 | A | 5/2017 |
| CN | 107278138 | A | 10/2017 |
| CN | 107361755 | A | 11/2017 |
| CN | 107591211 | A | 1/2018 |
| CN | 107713981 | A | 2/2018 |
| EP | 2391004 | A1 | 11/2011 |
| EP | 2568409 | A1 | 3/2013 |
| EP | 2921899 | A2 | 9/2015 |
| EP | 3042606 | A1 | 7/2016 |
| EP | 3096235 | A1 | 11/2016 |
| EP | 3101882 | A2 | 12/2016 |
| EP | 3557590 | A1 | 10/2019 |
| JP | 2005-79814 | A | 3/2005 |
| JP | 2008-011865 | A | 1/2008 |
| JP | 2010-517725 | A | 5/2010 |
| JP | 2010-162297 | A | 7/2010 |
| JP | 2010-181280 | A | 8/2010 |
| JP | 2011-200575 | A | 10/2011 |
| JP | 2012-524640 | A | 10/2012 |
| JP | 2013-544140 | A | 12/2013 |
| JP | 2016-502875 | A | 2/2016 |
| JP | 2016-528016 | A | 9/2016 |
| JP | 2016-177151 | A | 10/2016 |
| JP | 2016-202751 | A | 12/2016 |
| JP | 2017-134689 | A | 8/2017 |
| JP | 2017-211994 | A | 11/2017 |
| JP | 2017-532069 | A | 11/2017 |
| KR | 10-2012- 0023657 | A | 3/2012 |
| KR | 10-2013- 0111569 | A | 10/2013 |
| KR | 10-2013-0111570 | A | 10/2013 |
| KR | 10-1594486 | B1 | 2/2016 |
| KR | 10-2016-0028351 | A | 3/2016 |
| KR | 10-2017- 0003608 | A | 1/2017 |
| KR | 10-2019-0094795 | A | 8/2019 |
| WO | 2003/067202 | A2 | 8/2003 |
| WO | 2006/046648 | A1 | 5/2006 |
| WO | 2008/073359 | A2 | 6/2008 |
| WO | 2010/126825 | A1 | 11/2010 |
| WO | 2012/060588 | A2 | 5/2012 |
| WO | 2012/061438 | A2 | 5/2012 |
| WO | 2012/061440 | A2 | 5/2012 |
| WO | 2013/109916 | A1 | 7/2013 |
| WO | 2014/015378 | A1 | 1/2014 |
| WO | 2015/027133 | A1 | 2/2015 |
| WO | 2015/153803 | | 10/2015 |
| WO | 2015/187799 | A1 | 12/2015 |

(56) References Cited

FOREIGN PATENT DOCUMENTS

| | | | |
|---|---|---|---|
| WO | 2015/198488 | A1 | 12/2015 |
| WO | 2016/036582 | A2 | 3/2016 |
| WO | 2016/151479 | A1 | 9/2016 |
| WO | 2016/161152 | A1 | 10/2016 |
| WO | 2016/164475 | A1 | 10/2016 |
| WO | 2017/003045 | A1 | 1/2017 |
| WO | 2017/037242 | A1 | 3/2017 |
| WO | 2017/062621 | A1 | 4/2017 |
| WO | 2017/087642 | A1 | 5/2017 |
| WO | 2017/090810 | A1 | 6/2017 |
| WO | 2017/215203 | A1 | 12/2017 |
| WO | 2018/148356 | A1 | 8/2018 |
| WO | 2019/020977 | A1 | 1/2019 |
| WO | 2019/168956 | A1 | 9/2019 |

OTHER PUBLICATIONS

Office Action received for Australian Patent Application No. 2019234289, dated Nov. 2, 2020, 6 pages.
Office Action received for Australian Patent Application No. 2020230340, dated Nov. 2, 2020, 5 pages.
Office Action received for European Patent Application No. 20182116.2, dated Nov. 6, 2020, 9 pages.
Summons to Attend Oral Proceedings received for European Patent Application No. 19726205.8, dated Oct. 29, 2020, 13 pages.
Final Office Action received for U.S. Appl. No. 16/586,154, dated May 24, 2021, 29 pages.
Notice of Allowance received for Korean Patent Application No. 10-2020-7026391, dated May 11, 2021, 3 pages (1 page of English Translation and 2 pages of Official Copy).
Notice of Allowance received for Korean Patent Application No. 10-2020-7026453, dated May 11, 2021, 3 pages (1 page of English Translation and 2 pages of Official Copy).
Office Action received for European Patent Application No. 20182116.2, dated May 25, 2021, 9 pages.
Cook James, "German Period Tracking App Clue Has Over 2.5 Million Active Users—But It's Still Not Sure How It's Going to Make Money", Available online at https://www.businessinsider.in/tech/german-period-tracking-app-clue-has-over-2-5-million-active-users-but-its-still-not-sure-how-its-going-to-make-money/articleshow/50511307.cms, Jan. 9, 2016, 9 pages.
Applicant-Initiated Interview Summary received for U.S. Appl. No. 16/907,261, dated Mar. 25, 2021, 2 pages.
Decision on Appeal received for Korean Patent Application No. 10-2019-7025538, dated Feb. 24, 2021, 20 pages (4 pages of English Translation and 16 pages of Official Copy).
Final Office Action received for U.S. Appl. No. 16/907,261, dated Mar. 18, 2021, 20 pages.
Notice of Allowance received for Korean Patent Application No. 10-2019-7025538, dated Mar. 10, 2021, 5 pages (2 pages of English Translation and 3 pages of Official Copy).
Notice of Allowance received for U.S. Appl. No. 16/144,864, dated Mar. 30, 2021, 2 pages.
Notice of Allowance received for U.S. Appl. No. 16/880,714, dated Mar. 19, 2021, 7 pages.
Office Action received for Australian Patent Application No. 2019234289, dated Mar. 16, 2021, 8 pages.
Result of Consultation received for European Patent Application No. 19726205.8, dated Mar. 15, 2021, 19 pages.
Advisory Action received for U.S. Appl. No. 16/144,864, dated Jul. 29, 2019, 6 pages.
Advisory Action received for U.S. Appl. No. 16/143,909, dated Nov. 7, 2019, 5 pages.
Advisory Action received for U.S. Appl. No. 16/143,997, dated Dec. 26, 2019, 7 pages.
Advisory Action received for U.S. Appl. No. 16/144,849, dated Aug. 12, 2019, 5 pages.
Advisory Action received for U.S. Appl. No. 16/144,864, dated Jul. 6, 2020, 6 pages.
Applicant Initiated Interview Summary received for U.S. Appl. No. 16/144,849, dated Jan. 21, 2020, 6 pages.
Applicant Initiated Interview Summary received for U.S. Appl. No. 16/144,864, dated Apr. 29, 2020, 4 pages.
Applicant Initiated Interview Summary received for U.S. Appl. No. 16/586,154, dated Mar. 11, 2020, 4 pages.
Applicant-Initiated Interview Summary received for U.S. Appl. No. 16/138,809, dated Jun. 9, 2020, 4 pages.
Applicant-Initiated Interview Summary received for U.S. Appl. No. 16/144,864, dated Jun. 22, 2020, 3 pages.
Applicant-Initiated Interview Summary received for U.S. Appl. No. 16/584,186, dated Feb. 3, 2020, 4 pages.
Casella Cel Casella, "The Casella dBadge2—World's First Truly Wireless Noise Dosimeter and Airwave App!", Retrieved from URL: <https://www.youtube.com/watch?v=Xvy2fl3cgYo>, May 27, 2015, 3 pages.
Certificate of Examination received for Australian Patent Application No. 2019100222, dated Aug. 29, 2019, 2 pages.
CNET, "Google Fit's automatic activity tracking is getting smarter on Android Wear", Available online at: https://www.youtube.com/watch?v=lttzlCid_d8, May 18, 2016, 1 page.
Corrected Notice of Allowance received for U.S. Appl. No. 16/143,909, dated Feb. 20, 2020, 3 pages.
Corrected Notice of Allowance received for U.S. Appl. No. 16/143,909, dated Mar. 18, 2020, 3 pages.
Corrected Notice of Allowance received for U.S. Appl. No. 16/143,959, dated Dec. 13, 2019, 2 pages.
DC Rainmaker, "Garmin Fenix3 New Auto Climb Functionality", Available online at https://www.youtube.com/watch?v=iuavOSNpVRc, Feb. 19, 2015, 1 page.
Decision to Grant received for Danish Patent Application No. PA201870379, dated Jul. 5, 2019, 2 pages.
Decision to Grant received for Danish Patent Application No. PA201870600, dated Oct. 17, 2019, 2 pages.
Evergreen et al., "Bar Chart", Better Evaluation, Available Online at https://www.betterevaluation.org/en/evaluation-options/BarChart, Oct. 31, 2014, 8 pages.
Final Office Action received for U.S. Appl. No. 16/143,909, dated Aug. 28, 2019, 20 pages.
Final Office Action received for U.S. Appl. No. 16/143,997, dated Sep. 30, 2019, 16 pages.
Final Office Action received for U.S. Appl. No. 16/144,030, dated Feb. 13, 2020, 11 pages.
Final Office Action received for U.S. Appl. No. 16/144,030, dated Oct. 1, 2019, 13 pages.
Final Office Action received for U.S. Appl. No. 16/144,849, dated Jun. 7, 2019, 29 pages.
Final Office Action received for U.S. Appl. No. 16/144,864, dated May 17, 2019, 24 pages.
Final Office Action received for U.S. Appl. No. 16/144,864, dated May 28, 2020, 29 pages.
Fitbit App, Available online at: <http://web.archive.org/web/20180114083150/https://www.fitbit.com/au/app>, Jan. 14, 2018, 8 pages.
Graphs and Charts, Online available at: <https://www.teachervision.com/lesson-planning/graph-chart-teacher-resources, retrieved on Dec. 12, 2018, 4 pages.
Garmin, "Fenix 5x Owner's Manual", Online Available at :—https://web.archive.org/web/20180127170640/https://static.garmin.com/pumac/fenix5x_OM_EN.pdf, Jan. 27, 2018, 42 pages.
Intention to Grant received for Danish Patent Application No. PA201870379, dated May 2, 2019, 2 pages.
Intention to Grant received for Danish Patent Application No. PA201870600, dated Jul. 10, 2019, 2 pages.
Intention to Grant received for Danish Patent Application No. PA201870601, dated Apr. 24, 2020, 2 pages.
Intention to Grant received for Danish Patent Application No. PA201870602, dated Apr. 24, 2020, 2 pages.
International Search Report and Written Opinion received for PCT Patent Application No. PCT/US2019/019694, dated Sep. 2, 2019, 17 pages.

(56) References Cited

OTHER PUBLICATIONS

International Search Report and Written Opinion received for PCT Patent Application No. PCT/US2019/024570, dated Aug. 8, 2019, 18 pages.
Invitation to Pay Additional Fees received for PCT Patent Application No. PCT/US2019/019694, dated Jul. 10, 2019, 12 pages.
Invitation to Pay Search Fees received for European Patent Application No. 19726205.8, dated Feb. 14, 2020, 5 pages.
Megadepot, "Casella dBadge2 Noise Dosimeter", Retrieved from URL: <https://www.youtube.com/watch?v=pHiHLiYCD08>, Jun. 12, 2018, 3 pages.
Multi-Set Bar Chart, The Data Visualization Catalogue, Available Online at: https://datavizcatalogue.com/methods/multiset_barchart.html, Feb. 8, 2014, 3 pages.
Myflo App, "Functional Medicine Period Tracker and Hormone Balancing App", Available online at <https://web.archive.org/web/20170127104125/https://myflotracker.com/>, Jan. 2017, 14 pages.
Myflo Tutorial, "How to change the start date of your current period", Available online at <https://www.youtube.com/watch?v=uQQ-odlBJB4>, Jan. 23, 2017, 3 pages.
Myflo Tutorial, "Setting and changing the end date of your period", Available online at <https://www.youtube.com/watch?v=UvAA40gqL3E>, Jan. 23, 2017, 3 pages.
Non-Final Office Action Received for U.S. Appl. No. 16/144,864, dated Dec. 18, 2018, 19 pages.
Non-Final Office Action received for U.S. Appl. No. 16/138,809, dated Feb. 28, 2020, 22 pages.
Non-Final Office Action received for U.S. Appl. No. 16/143,909, dated Apr. 19, 2019, 16 pages.
Non-Final Office Action received for U.S. Appl. No. 16/143,959, dated Apr. 17, 2019, 15 pages.
Non-Final Office Action received for U.S. Appl. No. 16/143,997, dated May 21, 2019, 15 pages.
Non-Final Office Action received for U.S. Appl. No. 16/144,030, dated Apr. 12, 2019, 8 pages.
Non-Final Office Action received for U.S. Appl. No. 16/144,849, dated Dec. 31, 2018, 28 pages.
Non-Final Office Action received for U.S. Appl. No. 16/144,849, dated Sep. 17, 2019, 9 pages.
Non-Final Office Action received for U.S. Appl. No. 16/144,864, dated Jan. 31, 2020, 29 pages.
Non-Final Office Action received for U.S. Appl. No. 16/584,186, dated Dec. 6, 2019, 13 pages.
Non-Final Office Action received for U.S. Appl. No. 16/586,154, dated Dec. 9, 2019, 23 pages.
Notice of Acceptance received for Australian Patent Application No. 2019222943, dated May 5, 2020, 3 pages.
Notice of Allowance received for U.S. Appl. No. 16/143,909, dated Jan. 21, 2020, 9 pages.
Notice of Allowance received for U.S. Appl. No. 16/143,959, dated Oct. 31, 2019, 10 pages.
Notice of Allowance received for U.S. Appl. No. 16/144,849, dated Apr. 17, 2020, 2 pages.
Notice of Allowance received for U.S. Appl. No. 16/144,849, dated Mar. 6, 2020, 9 pages.
Notice of Allowance received for U.S. Appl. No. 16/584,186, dated Mar. 24, 2020, 10 pages.
Office Action received for Australian Patent Application No. 2019100222, dated May 24, 2019, 6 pages.
Office Action received for Australian Patent Application No. 2019100495, dated Mar. 6, 2020, 3 pages.
Office Action received for Australian Patent Application No. 2019100495, dated Mar. 16, 2020, 3 pages.
Office Action received for Australian Patent Application No. 2019100495, dated Sep. 17, 2019, 7 pages.
Office Action received for Australian Patent Application No. 2019222943, dated Oct. 3, 2019, 3 pages.
Office Action received for Danish Patent Application No. PA201870378, dated Feb. 25, 2019, 3 pages.
Office Action received for Danish Patent Application No. PA201870378, dated Jan. 6, 2020, 3 pages.
Office Action received for Danish Patent Application No. PA201870379, dated Feb. 28, 2019, 3 pages.
Office Action received for Danish Patent Application No. PA201870380, dated Mar. 5, 2020, 2 pages.
Office Action received for Danish Patent Application No. PA201870380, dated Mar. 27, 2019, 4 pages.
Office Action received for Danish Patent Application No. PA201870380, dated Sep. 11, 2018, 9 pages.
Office Action received for Danish Patent Application No. PA201870599, dated Dec. 20, 2019, 5 pages.
Office Action received for Danish Patent Application No. PA201870600, dated May 8, 2019, 3 pages.
Office Action received for Danish Patent Application No. PA201870601, dated Dec. 13, 2018, 8 pages.
Office Action received for Danish Patent Application No. PA201870601, dated Jan. 14, 2020, 3 pages.
Office Action received for Danish Patent Application No. PA201870601, dated Jun. 25, 2019, 3 pages.
Office Action received for Danish Patent Application No. PA201870602, dated Feb. 5, 2020, 3 pages.
Office Action received for Danish Patent Application No. PA201870602, dated Jun. 26, 2019, 3 Pages.
Office Action received for Danish Patent Application No. PA201970534, dated Jun. 29, 2020, 2 pages.
Office Action received for European Patent Application No. 19721883.7, dated Jan. 10, 2020, 4 pages.
Office Action received for European Patent Application No. 19721883.7, dated May 28, 2020, 11 pages.
Office Action received for European Patent Application No. 19726205.8, dated Jun. 26, 2020, 9 pages.
Office Action received for Japanese Patent Application No. 2019-162293, dated Jan. 31, 2020, 8 pages.
Office Action received for Korean Patent Application No. 10-2019-7025538, dated Feb. 17, 2020, 12 pages.
Rizknows, "Tom Tom Multisport Cardio Review", Online available at :—https://www.youtube.com/watch?v=WoVCzLrSN9A, Sep. 4, 2015, 1 page.
Search Report and Opinion received for Danish Patent Application No. PA201870378, dated Sep. 10, 2018, 9 pages.
Search Report and Opinion received for Danish Patent Application No. PA201870379, dated Sep. 14, 2018, 9 pages.
Search Report and Opinion received for Danish Patent Application No. PA201870599, dated Dec. 21, 2018, 9 pages.
Search Report and Opinion received for Danish Patent Application No. PA201870600, dated Jan. 31, 2019, 8 pages.
Search Report and Opinion received for Danish Patent Application No. PA201870602, dated Dec. 19, 2018, 8 pages.
Search Report and Opinion received for Danish Patent Application No. PA201970534, dated Sep. 23, 2019, 6 pages.
Smith, "Garmin Fenix 5 Activity/Smart Watch Review", Online Available at https://www.youtube.com/watch?v=6PkQxXQxpoU, Sep. 2, 2017, 1 page.
Sportstechguides, "Garmin Fenix 5: Howto Add Power Data Fields", Online Available at https://www.youtube.com/watch?v=ZkPptnnXEiQ, Apr. 29, 2017, 2 pages.
Sportstechguides, "Garmin Fenix 5: How to Set Up Run Alerts", Online Available at: https://www.youtube.com/watch?v=gSMwv8vlhB4, May 13, 2017, 2 pages.
Supplemental Notice of Allowance received for U.S. Appl. No. 16/144,849, dated Mar. 31, 2020, 2 pages.
"Suunto Spartan Trainer Wrist Hr 1.12", Online Available at https://web.archive.Org/web/20180127155200/https://ns.suunto.com/Manuals/Spartan_Trainer_WristHR/Userguides/Suunto_Spartan_Trainer_WristHR_UserGuide_EN.pdf, Jan. 17, 2018, 47 pages.
Studiosixdigital, "Dosimeter", Retrieved from URL: <https://studiosixdigital.com/audiotools-modules-2/spl-modules/dosimeter.html>, Mar. 3, 2017, 6 pages.
Suunto, "Suunto Spartan- Heart Rate Zones", Online Available at:—https://www.youtube.com/watch?v=aixfoCnS0OU, Mar. 19, 2018, 2 pages.

(56) References Cited

OTHER PUBLICATIONS

Teunmo, "Data field: Visual Pace Alarm", Garmin Forum; Available online at:—https://forums.garmin.com/forum/developers/connect-iq/connect-iq-showcase/115996-data-field-visual-pace-alarm, Nov. 17, 2015, 10 pages.
TomTom, "TomTom Runner & Multi-Sport Reference Guide", Online available at:—https://web.archive.org/web/20150908075934/http://download.tomtom.com/open/manuals/Runner_Multi-Sport/refman/TomTom-Runner-Multi-Sport-RG-en-GB.pdf, Sep. 8, 2015, 44 pages.
"Visual Pace Alarm app", Available Online at: https://apps.garmin.com/en-US/apps/3940f3a2-4847-4078-a911-d77422966c82, Oct. 19, 2016, 1 page.
Wesley, "Apple Watch Series 1", online available at:—http://toolbox.info/blog/archives/1737-unknown.html, May 28, 2015, 5 pages.
Youtube, "Apple Watch Series 3", Online available at:—https://www.youtube.com/watch?v=IBPr9gEfkK8, Nov. 21, 2017, 15 pages.
Zlelik, "Garmin Fenix 5 Open Water Swimming Activity Demo", Online Available at:—https://www.youtube.com/watch?v=iSVhdvw2dcs, Jun. 9, 2017, 1 page.
Applicant-Initiated Interview Summary received for U.S. Appl. No. 16/586,154, dated Apr. 14, 2021, 4 pages.
Notice of Allowance received for U.S. Appl. No. 16/144,030, dated Apr. 5, 2021, 8 pages.
Office Action received for European Patent Application No. 20180581.9, dated Apr. 1, 2021, 11 pages.
Office Action received for European Patent Application No. 20180592.6, dated Apr. 1, 2021, 11 pages.
Office Action received for Japanese Patent Application No. 2018-184532, dated Mar. 1, 2021, 11 pages (6 pages of English Translation and 5 pages of Official Copy).
International Preliminary Report on Patentability received for PCT Patent Application No. PCT/US2019/019694, dated Sep. 24, 2020, 12 pages.
Non-Final Office Action received for U.S. Appl. No. 16/907,261, dated Sep. 30, 2020, 22 pages.
Notice of Allowance received for U.S. Appl. No. 16/144,864, dated Sep. 29, 2020, 2 pages.
Result of Consultation received for European Patent Application No. 19721883.7, dated Oct. 7, 2020, 3 pages.
Applicant-Initiated Interview Summary received for U.S. Appl. No. 16/880,714, dated Feb. 26, 2021, 5 pages.
Final Office Action received for U.S. Appl. No. 16/894,309, dated Feb. 24, 2021, 30 pages.
International Search Report and Written Opinion received for PCT Patent Application No. PCT/US2020/035164, dated Feb. 8, 2021, 26 pages.
Non-Final Office Action received for U.S. Appl. No. 16/880,552, dated Feb. 19, 2021, 11 pages.
Office Action received for Danish Patent Application No. PA201970534, dated Feb. 16, 2021, 2 pages.
Office Action received for Korean Patent Application No. 10-2020-7026035, dated Feb. 19, 2021, 13 pages (6 pages of English Translation and 7 pages of Official Copy).
Applicant-Initiated Interview Summary received for U.S. Appl. No. 16/880,552, dated Apr. 21, 2021, 3 pages.
Notice of Allowance received for Japanese Patent Application No. 2019-162293, dated Apr. 9, 2021, 4 pages (1 page of English Translation and 3 pages of Official Copy).
Notice of Allowance received for U.S. Appl. No. 16/138,809, dated Apr. 16, 2021, 11 pages.
Office Action received for Chinese Patent Application No. 202010618569.X, dated Mar. 12, 2021, 14 pages (7 pages of English Translation and 7 pages of Official Copy).
Corrected Notice of Allowance received for U.S. Appl. No. 16/880,552, dated Dec. 23, 2020, 2 pages.
Non-Final Office Action received for U.S. Appl. No. 16/586,154, dated Dec. 28, 2020, 26 pages.
Search Report and Opinion received for Danish Patent Application No. PA202070620, dated Dec. 11, 2020, 9 pages.
Applicant-Initiated Interview Summary received for U.S. Appl. No. 16/880,552, dated Oct. 20, 2020, 6 pages.
European Search Report received for European Patent Application No. 20182116.2, dated Oct. 21, 2020, 4 pages.
Invitation to Pay Addition Fees received for PCT Patent Application No. PCT/US2020/035474, dated Oct. 2, 2020, 11 pages.
Non-Final Office Action received for U.S. Appl. No. 16/894,309, dated Oct. 15, 2020, 24 pages.
Office Action received for Japanese Patent Application No. 2020-104679, dated Sep. 18, 2020, 13 pages (7 pages of English Translation and 6 pages of Official Copy).
Chatrzarrin Hanieh, "Feature Extraction for the Differentiation of Dry and Wet Cough Sounds", Carleton University, Sep. 2011, 144 pages.
Haslam Oliver, "Stop Coronavirus in its Tracks by Using This Apple Watch App to Time Hand Washes", Available Online at: <https://www.imore.com/stop-coronavirus-its-tracks-using-apple-watch-app-time-hand-washes>, Mar. 12, 2020, 12 pages.
Liaqat et al., "Challenges with Real-World Smartwatch based Audio Monitoring", WearSys'18, Munich, Germany, Available Online at: <https://doi.org/10.1145/3211960.3211977>, Jun. 10, 2018, 6 pages.
Lyles Taylor, "Wear OS Smartwatches are Now Sending Reminders to Wash Your Hands", Available Online at: <https://www.theverge.eom/2020/4/14/21221294/google-wear-os-smartwatches-reminders-wash-your-hands>, Apr. 14, 2020, 2 pages.
Peters Jay, "Samsung's Smartwatches Get a Hand-Washing Reminder and Timer App", Available Online at: <https://www.theverge.eom/2020/4/17/21225205/samsung-smartwatch-galaxy-active-hand-washing-timer-reminder-app>, Apr. 17, 2020, 2 pages.
Schoon Ben, "Wear OS Now Sends a Reminder to Wash Your Hands Every Few Hours", Available Online at: <https://9to5google.com/2020/04/14/wear-os-wash-hands-reminder-coronavirus/>, Apr. 14, 2020, 7 pages.
Applicant-Initiated Inteview Summary received for U.S. Appl. No. 16/907,261, dated Jul. 16, 2021, 10 pages.
Notice of Allowance received for Japanese Patent Application No. 2020-547369, dated Jul. 16, 2021, 4 pages (1 page of English Translation and 3 pages of Officiai Copy).
Notice of Allowance received for U.S. Appl. No. 16/880,552, dated Jul. 20, 2021, 6 pages.
Notice of Allowance received for U.S. Appl. No. 16/880,552, dated Jul. 23, 2021, 5 pages.
Office Action received for Australian Patent Application No. 2019234289, dated Jul. 20, 2021, 4 pages.
Office Action received for Australian Patent Application No. 2020239692, dated Jul. 20, 2021, 5 pages.
Office Action received for Chinese Patent Application No. 201910858933.7, dated Jun. 29, 2021, 8 pages (3 pages of English Translation and 5 pages of Official Copy).
Applicant Initiated Interview Summary received for U.S. Appl. No. 16/143,997, dated Aug. 13, 2020, 3 pages.
Decision to Grant received for Danish Patent Application No. PA201870601, dated Aug. 17, 2020, 2 pages.
Decision to Grant received for Danish Patent Application No. PA201870602, dated Aug. 18, 2020, 2 pages.
Extended European Search Report received for European Patent Application No. 20180581.9, dated Aug. 12, 2020, 9 pages.
Extended European Search Report received for European Patent Application No. 20180592.6, dated Aug. 11, 2020, 10 pages.
Final Office Action received for U.S. Appl. No. 16/138,809, dated Aug. 27, 2020, 24 pages.
International Search Report and written Opinion received for PCT Patent Application No. PCT/US2020/025768, dated Aug. 10, 2020, 11 pages.
Notice of Allowance received for Japanese Patent Application No. 2020-104679, dated Jan. 4, 2021, 4 pages (1 page of English Translation and 3 pages of Official Copy).
International Search Report and Written Opinion received for PCT Patent Application No. PCT/US2020/070280, dated Nov. 30, 2020, 20 pages.
Invitation to Pay Additional Fees received for PCT Patent Application No. PCT/US2020/070280, dated Oct. 7, 2020, 12 pages.

(56) References Cited

OTHER PUBLICATIONS

Notice of Allowance received for U.S. Appl. No. 16/144,864, dated Mar. 12, 2021, 2 pages.
Office Action received for Australian Patent Application No. 2020230340, dated Mar. 2, 2021, 6 pages.
Office Action received for Chinese Patent Application No. 202010606407.4, dated Jan. 27, 2021, 16 pages (7 pages of English Translation and 9 pages of Official Copy).
Corrected Notice of Allowance received for U.S. Appl. No. 16/143,997, dated Jun. 4, 2021, 2 pages.
Notice of Allowance received for U.S. Appl. No. 16/880,714, dated Jun. 9, 2021, 6 pages.
Office Action received for Australian Patent Application No. 2020256383, dated Jun. 4, 2021, 3 pages.
Office Action received for Danish Patent Application No. PA202070335, dated Jun. 11, 2021, 4 pages.
Office Action received for European Patent Application No. 19721883.7, dated Jun. 15, 2021, 9 pages.
Applicant-Initiated Interview Summary received for U.S. Appl. No. 16/143,997, dated May 3, 2021, 4 pages.
Non-Final Office Action received for U.S. Appl. No. 16/990,846, dated May 10, 2021, 16 pages.
Notice of Allowance received for U.S. Appl. No. 16/143,997, dated May 13, 2021, 10 pages.
Notice of Allowance received for U.S. Appl. No. 16/880,552, dated May 12, 2021, 7 pages.
Office Action received for Chinese Patent Application No. 202010618240.3, dated Mar. 29, 2021, 21 pages (11 pages of English Translation and 10 pages of Official Copy).
Office Action received for Danish Patent Application No. PA202070620, dated May 10, 2021, 5 pages.
Office Action received for Japanese Patent Application No. 2020-547369, dated Apr. 9, 2021, 4 pages (2 pages of English Translation and 2 pages of Official Copy).
International Preliminary Report on Patentability received for PCT Patent Application No. PCT/US2019/024570, dated Nov. 19, 2020, 10 pages.
Notice of Allowance received for U.S. Appl. No. 16/880,552, dated Dec. 1, 2020, 7 pages.
Applicant-Initiated Interview Summary received for U.S. Appl. No. 16/138,809, dated Dec. 16, 2020, 7 pages.
Applicant-Initiated Interview Summary received for U.S. Appl. No. 16/586,154, dated Dec. 11, 2020, 5 pages.
Applicant-Initiated Interview Summary received for U.S. Appl. No. 16/880,552, dated Dec. 16, 2020, 6 pages.
Applicant-Initiated Interview Summary received for U.S. Appl. No. 16/907,261, dated Dec. 16, 2020, 6 pages.
Final Office Action received for U.S. Appl. No. 16/586,154, dated Jul. 6, 2020, 27 pages.
International Search Report and Written Opinion received for PCT Patent Application No. PCT/US2020/035462, dated Sep. 11, 2020, 17 pages.
International Search Report and Written Opinion received for PCT Patent Application No. PCT/US2020/035474, dated Nov. 26, 2020, 16 pages.
Invitation to Pay Additional Fees and Partial International Search Report received for PCT Patent Application No. PCT/US2020/035164, dated Oct. 16, 2020, 14 pages.
Non-Final Office Action received for U.S. Appl. No. 16/880,714, dated Oct. 28, 2020, 11 pages.
Search Report and Opinion received for Danish Patent Application No. PA202070335, dated Nov. 27, 2020, 10 pages.
Search Report and Opinion received for Danish Patent Application No. PA202070395, dated Nov. 24, 2020, 10 pages.
Gupta Rajat, "Disable High Volume Warning (no root) in Samsung S7, S8 / Android 7.0", Online available at: <https://www.youtube.com/watch?v=9fKwRBtk-x8>, Retrieved on Nov. 26, 2020; esp. 2:04, Aug. 6, 2017, 1 page.
Tech, Kalyani,"I See Some problems in Honor Band 5", Retrieved from https://www.youtube.com/watch?v=5XPnYJFqajl, May 19, 2020, 1 page.
Ticks, Smartwatch,"SENBONO S10 IP67 Waterproof Multi-Function Blood Pressure Sports Smartwatch: One Minute Overview", Retrieved from https://www.youtube.com/watch?v=rMxLJvKIVBs, Oct. 30, 2019, 1 page.
Notice of Allowance received for Chinese Patent Application No. 201910972529.2, dated Sep. 14, 2020, 6 pages (3 pages of English Translation and 3 pages of Official Copy).
Notice of Allowance received for U.S. Appl. No. 16/144,864, dated Sep. 10, 2020, 3 pages.
Notice of Allowance received for U.S. Appl. No. 16/144,864, dated Sep. 16, 2020, 2 pages.
Epstein et al., "Examining Menstrual Tracking to Inform the Design of Personal Informatics Tools", Proceedings of the 2017 CHI Conference on Human Factors in Computing Systems, CHI '17, ACM Press, Denver, CO, USA, May 6-11, 2017, pp. 6876-6888.
Moglia et al., "Evaluation of Smartphone Menstrual Cycle Tracking Applications Using an Adapted Applications Scoring System", Obstetrics and Gynecology, vol. 127, No. 6, Jun. 2016, pp. 1153-1160.
Office Action received for Chinese Patent Application No. 201910858933.7, dated Aug. 18, 2020, 14 pages (7 pages of English Translation and 7 pages of Official Copy).
Office Action received for Japanese Patent Application No. 2019-162293, dated Jul. 27, 2020, 9 pages (5 pages of English Translation and 4 pages of Official Copy).
Office Action received for Korean Patent Application No. 10-2019-7025538, dated Aug. 15, 2020, 8 pages (4 pages of English Translation and 4 pages of Official Copy).
Corrected Notice of Allowance received for U.S. Appl. No. 16/584,186, dated Jul. 31, 2020, 2 pages.
Non-Final Office Action received for U.S. Appl. No. 16/143,997, dated Jul. 27, 2020, 15 pages.
Non-Final Office Action received for U.S. Appl. No. 16/880,552, dated Jul. 23, 2020, 19 pages.
Notice of Acceptance received for Australian Patent Application No. 2020204153, dated Jul. 6, 2020, 3 pages.
Notice of Allowance received for U.S. Appl. No. 16/144,864, dated Jul. 28, 2020, 27 pages.
Office Action received for Chinese Patent Application No. 201910972529.2, dated Jun. 28, 2020, 8 pages (1 page of English Translation and 7 pages of Official Copy).
Applicant-Initiated Interview Summary received for U.S. Appl. No. 16/894,309, dated Jun. 25, 2021, 4 pages.
Corrected Notice of Allowance received for U.S. Appl. No. 16/143,997, dated Jul. 2, 2021, 2 pages.
Corrected Notice of Allowance received for U.S. Appl. No. 16/880,552, dated Jul. 7, 2021, 2 pages.
Office Action received for Australian Patent Application No. 2020230340, dated May 27, 2021, 5 pages.
Office Action received for Chinese Patent Application No. 202010606407.4, dated Jun. 2, 2021, 12 pages (5 pages of English Translation and 7 pages of Official Copy).
Office Action received for Chinese Patent Application No. 202011220489.5, dated Jun. 1, 2021, 12 pages (6 pages of English Translation and 6 pages of Official Copy).
Office Action received for Japanese Patent Application No. 2020-153166, dated May 31, 2021, 6 pages (3 pages of English Translation and 3 pages of Official Copy).
Applicant-Initiated Interview Summary received for U.S. Appl. No. 16/894,309, dated Jan. 26, 2021, 3 pages.
Extended European Search Report received for European Patent Application No. 20203526.7, dated Jan. 29, 2021, 13 pages.
Final Office Action received for U.S. Appl. No. 16/143,997, dated Feb. 9, 2021, 16 pages.
International Search Report and Written Opinion received for PCT Patent Application No. PCT/US2020/042439, dated Oct. 9, 2020, 14 pages.

(56) References Cited

OTHER PUBLICATIONS

Lovejoy, Ben, "Apple Watch blood sugar measurement coming in Series 7, claims report", Available Online at: https://9to5mac.com/2021/01/25/apple-watch-blood-sugar-measurement/, Jan. 25, 2021, 6 pages.
Notice of Allowance received for U.S. Appl. No. 16/144,864, dated Feb. 9, 2021, 13 pages.
Office Action received for Korean Patent Application No. 10-2020-7026391, dated Jan. 27, 2021, 5 pages (2 pages of English Translation and 3 pages of Official Copy).
Office Action received for Korean Patent Application No. 10-2020-7026453, dated Jan. 27, 2021, 5 pages (2 pages of English Translation and 3 pages of Official Copy).
Notice of Acceptance received for Australian Patent Application No. 2020256383, dated Aug. 3, 2021, 3 pages.
Notice of Allowance received for U.S. Appl. No. 16/907,261, dated Aug. 13, 2021, 8 pages.
Summons to Attend Oral Proceedings received for European Patent Application No. 20180581.9, mailed on Aug. 18, 2021, 15 pages.
Summons to Attend Oral Proceedings received for European Patent Application No. 20180592.6, mailed on Aug. 11, 2021, 16 pages.
Applicant-Initiated Interview Summary received for U.S. Appl. No. 16/586,154, dated Sep. 3, 2021, 4 pages.
Applicant-Initiated Interview Summary received for U.S. Appl. No. 17/031,704, dated Feb. 9, 2021, 3 pages.
Applicant-Initiated Interview Summary received for U.S. Appl. No. 17/031,704, dated Jun. 25, 2021, 3 pages.
Applicant-Initiated Interview Summary received for U.S. Appl. No. 17/031,717, dated Jan. 29, 2021, 5 pages.
Applicant-Initiated Interview Summary received for U.S. Appl. No. 17/031,717, dated May 17, 2021, 5 pages.
Applicant-Initiated Interview Summary received for U.S. Appl. No. 17/031,717, dated Nov. 4, 2021, 5 pages.
Corrected Notice of Allowance received for U.S. Appl. No. 16/143,997, dated Oct. 21, 2021, 2 pages.
Corrected Notice of Allowance received for U.S. Appl. No. 16/586,154, dated Oct. 27, 2021, 2 pages.
Corrected Notice of Allowance received for U.S. Appl. No. 17/031,704, dated Nov. 2, 2021, 7 pages.
Final Office Action received for U.S. Appl. No. 17/031,704, dated Apr. 1, 2021, 31 pages.
Final Office Action received for U.S. Appl. No. 17/031,717, dated Feb. 24, 2021, 23 pages.
International Search Report and Written Opinion received for PCT Patent Application No. PCT/US2021/035227, dated Oct. 6, 2021, 17 pages.
Non-Final Office Action received for U.S. Appl. No. 17/031,704, dated Dec. 10, 2020, 30 pages.
Non-Final Office Action received for U.S. Appl. No. 17/031,717, dated Nov. 19, 2020, 22 pages.
Non-Final Office Action received for U.S. Appl. No. 17/031,717, dated Sep. 14, 2021, 35 pages.
Notice of Allowance received for Japanese Patent Application No. 2020-153166, dated Sep. 13, 2021, 4 pages (1 page of English Translation and 3 pages of Official Copy).
Notice of Allowance received for Korean Patent Application No. 10-2020-7026035, dated Aug. 23, 2021, 4 pages (2 pages of English Translation and 2 pages of Official Copy).
Notice of Allowance received for U.S. Appl. No. 16/143,997, dated Sep. 30, 2021, 8 pages.
Notice of Allowance received for U.S. Appl. No. 16/586,154, dated Oct. 15, 2021, 8 pages.
Notice of Allowance received for U.S. Appl. No. 16/894,309, dated Nov. 5, 2021, 12 pages.
Notice of Allowance received for U.S. Appl. No. 16/907,261, dated Sep. 28, 2021, 6 pages.
Notice of Allowance received for U.S. Appl. No. 16/990,846, dated Sep. 22, 2021, 9 pages.
Notice of Allowance received for U.S. Appl. No. 17/031,704, dated Jul. 21, 2021, 10 pages.
Notice of Allowance received for U.S. Appl. No. 17/031,727, dated Dec. 24, 2020, 12 pages.
Notice of Allowance received for U.S. Appl. No. 17/031,727, dated Jun. 25, 2021, 6 pages.
Notice of Allowance received for U.S. Appl. No. 17/031,727, dated Mar. 12, 2021, 7 pages.
Office Action received for Australian Patent Application No. 2019234289, dated Nov. 1, 2021, 4 pages.
Office Action received for Australian Patent Application No. 2020230340, dated Oct. 11, 2021, 4 pages.
Office Action received for Australian Patent Application No. 2020239740, dated Jul. 9, 2021, 4 pages.
Office Action received for Australian Patent Application No. 2020239740, dated Sep. 28, 2021, 5 pages.
Office Action received for Chinese Patent Application No. 202010618569.X, dated Sep. 7, 2021, 7 pages (4 pages of English Translation and 3 pages of Official Copy).
Office Action received for Danish Patent Application No. PA202070619, dated Aug. 27, 2021, 12 pages.
Office Action received for Danish Patent Application No. PA202070619, dated Oct. 14, 2021, 3 pages.
Search Report and Opinion received for Danish Patent Application No. PA202070619, dated Dec. 2, 2020, 11 pages.
Supplemental Notice of Allowance received for U.S. Appl. No. 16/880,714, dated Sep. 16, 2021, 2 pages.
Supplemental Notice of Allowance received for U.S. Appl. No. 17/031,727, dated Jan. 15, 2021, 2 pages.
Corrected Notice of Allowance received for U.S. Appl. No. 16/143,997, dated Nov. 16, 2021, 2 pages.

* cited by examiner

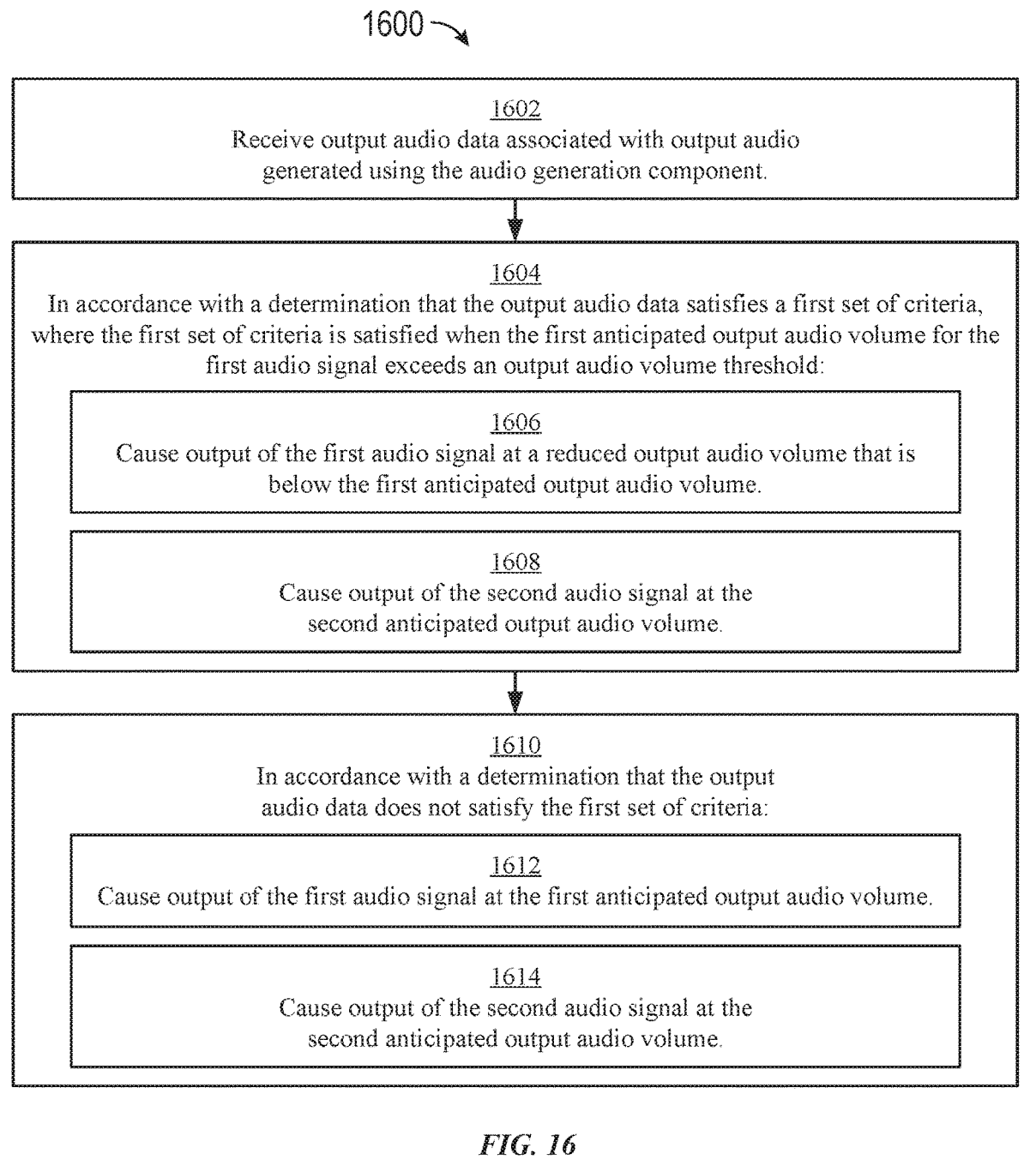

1600

1602
Receive output audio data associated with output audio generated using the audio generation component.

1604
In accordance with a determination that the output audio data satisfies a first set of criteria, where the first set of criteria is satisfied when the first anticipated output audio volume for the first audio signal exceeds an output audio volume threshold:

1606
Cause output of the first audio signal at a reduced output audio volume that is below the first anticipated output audio volume.

1608
Cause output of the second audio signal at the second anticipated output audio volume.

1610
In accordance with a determination that the output audio data does not satisfy the first set of criteria:

1612
Cause output of the first audio signal at the first anticipated output audio volume.

1614
Cause output of the second audio signal at the second anticipated output audio volume.

*FIG. 16*

USER INTERFACES FOR MANAGING AUDIO EXPOSURE

CROSS-REFERENCE TO RELATED APPLICATIONS

This application is a continuation of U.S. application Ser. No. 16/880,552, filed May 21, 2020, entitled "USER INTERFACES FOR MANAGING AUDIO EXPOSURE," which claims priority to U.S. Provisional Application No. 63/023,023, filed May 11, 2020, entitled "USER INTERFACES FOR MANAGING AUDIO EXPOSURE," and U.S. Provisional Application No. 62/856,016, filed Jun. 1, 2019, entitled "USER INTERFACES FOR MONITORING NOISE EXPOSURE LEVELS," the contents of each of which are hereby incorporated by reference in their entirety.

FIELD

The present disclosure relates generally to computer user interfaces, and more specifically to user interfaces and techniques for managing audio exposure.

BACKGROUND

An electronic device can be used to manage an amount of audio that is exposed to a user of the electronic device. Information concerning audio exposure can be presented to the user on the electronic device.

BRIEF SUMMARY

Some techniques for managing audio exposure using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing audio exposure. Such methods and interfaces optionally complement or replace other methods for managing audio exposure. Such methods and interfaces reduce the cognitive burden on a user and produce a more efficient human-machine interface. For battery-operated computing devices, such methods and interfaces conserve power and increase the time between battery charges.

In accordance with some embodiments, a method performed at an electronic device including a display device is described. The method comprises: displaying, via the display device, a first user interface including a graphical object that varies in appearance based on a noise level; receiving first noise level data corresponding to a first noise level, the first noise level below a threshold noise level; in response to receiving the first noise level data, displaying the graphical object with an active portion of a first size based on the first noise data and in a first color; while maintaining display of the first user interface, receiving second noise level data corresponding to a second noise level different from the first noise level; and in response to receiving the second noise level data: displaying the active portion in a second size based on the second noise level that that is different from the first size; in accordance with a determination that the second noise level exceeds the threshold noise level, displaying the active portion in a second color different from the first color; and in accordance with a determination that the second noise level does not exceed the threshold noise level, maintaining display of the graphical object in the first color.

In accordance with some embodiments, a non-transitory computer-readable storage medium storing one or more programs configured to be executed by one or more processors of an electronic device with a display device is described. The one or more programs include instructions for: displaying, via the display device, a first user interface including a graphical object that varies in appearance based on a noise level; receiving first noise level data corresponding to a first noise level, the first noise level below a threshold noise level; in response to receiving the first noise level data, displaying the graphical object with an active portion of a first size based on the first noise data and in a first color; while maintaining display of the first user interface, receiving second noise level data corresponding to a second noise level different from the first noise level; and in response to receiving the second noise level data: displaying the active portion in a second size based on the second noise level that that is different from the first size; in accordance with a determination that the second noise level exceeds the threshold noise level, displaying the active portion in a second color different from the first color; and in accordance with a determination that the second noise level does not exceed the threshold noise level, maintaining display of the graphical object in the first color.

In accordance with some embodiments, a transitory computer-readable storage medium storing one or more programs configured to be executed by one or more processors of an electronic device with a display device is described. The one or more programs include instructions for: displaying, via the display device, a first user interface including a graphical object that varies in appearance based on a noise level; receiving first noise level data corresponding to a first noise level, the first noise level below a threshold noise level; in response to receiving the first noise level data, displaying the graphical object with an active portion of a first size based on the first noise data and in a first color; while maintaining display of the first user interface, receiving second noise level data corresponding to a second noise level different from the first noise level; and in response to receiving the second noise level data: displaying the active portion in a second size based on the second noise level that that is different from the first size; in accordance with a determination that the second noise level exceeds the threshold noise level, displaying the active portion in a second color different from the first color; and in accordance with a determination that the second noise level does not exceed the threshold noise level, maintaining display of the graphical object in the first color.

In accordance with some embodiments, an electronic device is described. The electronic device comprises a display device; one or more processors; and memory storing one or more programs configured to be executed by the one or more processors, the one or more programs including instructions for: displaying, via the display device, a first user interface including a graphical object that varies in appearance based on a noise level; receiving first noise level data corresponding to a first noise level, the first noise level below a threshold noise level; in response to receiving the first noise level data, displaying the graphical object with an active portion of a first size based on the first noise data and in a first color; while maintaining display of the first user interface, receiving second noise level data corresponding to a second noise level different from the first noise level; and in response to receiving the second noise level data: displaying the active portion in a second size based on the second noise level that that is different from the first size; in accordance with a determination that the second noise level exceeds the threshold noise level, displaying the active portion in a second color different from the first color; and in accordance with a determination that the second noise level does not exceed the threshold noise level, maintaining display of the graphical object in the first color.

In accordance with some embodiments, an electronic device is described. The electronic device comprises a display device; means for displaying, via the display device, a first user interface including a graphical object that varies in appearance based on a noise level; means for receiving first noise level data corresponding to a first noise level, the first noise level below a threshold noise level; means for, in response to receiving the first noise level data, displaying the graphical object with an active portion of a first size based on the first noise data and in a first color; means for, while maintaining display of the first user interface, receiving second noise level data corresponding to a second noise level different from the first noise level; and means for, in response to receiving the second noise level data: displaying the active portion in a second size based on the second noise level that that is different from the first size; in accordance with a determination that the second noise level exceeds the threshold noise level, displaying the active portion in a second color different from the first color; and in accordance with a determination that the second noise level does not exceed the threshold noise level, maintaining display of the graphical object in the first color.

In accordance with some embodiments, a method performed at an electronic device including a display device and a touch sensitive surface is described. The method comprises: receiving: first noise level data attributable to a first device type; and second noise level data attributable to a second device type different from the first device type; displaying, via the display device, a first user interface, the first user interface including: a first representation of received noise level data that is based on the first noise level data and the second noise level data; and a first device type data filtering affordance; while displaying the first user interface, detecting a first user input corresponding to selection of the first device type data filtering affordance; and in response detecting the first user input, displaying a second representation of received noise level data that is based on the second noise level data and that is not based on the first noise level data.

In accordance with some embodiments, a non-transitory computer-readable storage medium storing one or more programs configured to be executed by one or more processors of an electronic device with a display device and a touch sensitive surface is described. The one or more programs include instructions for: receiving: first noise level data attributable to a first device type; and second noise level data attributable to a second device type different from the first device type; displaying, via the display device, a first user interface, the first user interface including: a first representation of received noise level data that is based on the first noise level data and the second noise level data; and a first device type data filtering affordance; while displaying the first user interface, detecting a first user input corresponding to selection of the first device type data filtering affordance; and in response detecting the first user input, displaying a second representation of received noise level data that is based on the second noise level data and that is not based on the first noise level data.

In accordance with some embodiments, a transitory computer-readable storage medium storing one or more programs configured to be executed by one or more processors of an electronic device with a display device and a touch sensitive surface is described. The one or more programs include instructions for: receiving: first noise level data attributable to a first device type; and second noise level data attributable to a second device type different from the first device type; displaying, via the display device, a first user interface, the first user interface including: a first representation of received noise level data that is based on the first noise level data and the second noise level data; and a first device type data filtering affordance; while displaying the first user interface, detecting a first user input corresponding to selection of the first device type data filtering affordance; and in response detecting the first user input, displaying a second representation of received noise level data that is based on the second noise level data and that is not based on the first noise level data.

In accordance with some embodiments, an electronic device is described. The electronic device comprises a display device; a touch sensitive surface; one or more processors; and memory storing one or more programs configured to be executed by the one or more processors, the one or more programs including instructions for: receiving: first noise level data attributable to a first device type; and second noise level data attributable to a second device type different from the first device type; displaying, via the display device, a first user interface, the first user interface including: a first representation of received noise level data that is based on the first noise level data and the second noise level data; and a first device type data filtering affordance; while displaying the first user interface, detecting a first user input corresponding to selection of the first device type data filtering affordance; and in response detecting the first user input, displaying a second representation of received noise level data that is based on the second noise level data and that is not based on the first noise level data.

In accordance with some embodiments, an electronic device is described. The electronic device comprises a display device; a touch sensitive surface; means for receiving: first noise level data attributable to a first device type; and second noise level data attributable to a second device type different from the first device type; means for displaying, via the display device, a first user interface, the first user interface including: a first representation of received noise level data that is based on the first noise level data and the second noise level data; and a first device type data filtering affordance; means for, while displaying the first user interface, detecting a first user input corresponding to selection of the first device type data filtering affordance; and means for, in response detecting the first user input, displaying a second representation of received noise level data that is based on the second noise level data and that is not based on the first noise level data.

In accordance with some embodiments, a method performed at a computer system that is in communication with a display generation component, an audio generation component, and one or more input devices is described. The method comprises: displaying, via the display generation component, an audio preference interface, including concurrently displaying: a representation of a first audio sample, wherein the first audio sample has a first set of audio characteristics; and a representation of a second audio sample, wherein the second audio sample has a second set of audio characteristics that is different from the first set of audio characteristics; while displaying the audio preference interface: outputting, via the audio generation component, at least a portion of the first audio sample; and receiving, via the one or more input devices, a set of one or more user inputs; and after receiving the set of one or more inputs: recording a selection of the first audio sample as a preferred sample or a selection of the second audio sample as a preferred sample; and outputting, via the audio generation component, a first audio data, wherein: in accordance with the first audio sample having been recorded as the preferred sample, the output of the first audio data is based on at least one audio characteristic of the first set of audio characteristics; and in accordance with the second audio sample having been recorded as the preferred sample, the output of the first audio data is based on at least one audio characteristic of the second set of audio characteristics.

In accordance with some embodiments, a non-transitory computer-readable storage medium storing one or more programs configured to be executed by one or more processors of a computer system that is in communication with a display generation component, an audio generation component, and one or more input devices is described. The one or more programs include instructions for: displaying, via the display generation component, an audio preference interface, including concurrently displaying: a representation of a first audio sample, wherein the first audio sample has a first set of audio characteristics; and a representation of a second audio sample, wherein the second audio sample has a second set of audio characteristics that is different from the first set of audio characteristics; while displaying the audio preference interface: outputting, via the audio generation component, at least a portion of the first audio sample; and receiving, via the one or more input devices, a set of one or more user inputs; and after receiving the set of one or more inputs: recording a selection of the first audio sample as a preferred sample or a selection of the second audio sample as a preferred sample; and outputting, via the audio generation component, a first audio data, wherein: in accordance with the first audio sample having been recorded as the preferred sample, the output of the first audio data is based on at least one audio characteristic of the first set of audio characteristics; and in accordance with the second audio sample having been recorded as the preferred sample, the output of the first audio data is based on at least one audio characteristic of the second set of audio characteristics.

In accordance with some embodiments, a transitory computer-readable storage medium storing one or more programs configured to be executed by one or more processors of a computer system that is in communication with a display generation component, an audio generation component, and one or more input devices is described. The one or more programs include instructions for: displaying, via the display generation component, an audio preference interface, including concurrently displaying: a representation of a first audio sample, wherein the first audio sample has a first set of audio characteristics; and a representation of a second audio sample, wherein the second audio sample has a second set of audio characteristics that is different from the first set of audio characteristics; while displaying the audio preference interface: outputting, via the audio generation component, at least a portion of the first audio sample; and receiving, via the one or more input devices, a set of one or more user inputs; and after receiving the set of one or more inputs: recording a selection of the first audio sample as a preferred sample or a selection of the second audio sample as a preferred sample; and outputting, via the audio generation component, a first audio data, wherein: in accordance with the first audio sample having been recorded as the preferred sample, the output of the first audio data is based on at least one audio characteristic of the first set of audio characteristics; and in accordance with the second audio sample having been recorded as the preferred sample, the output of the first audio data is based on at least one audio characteristic of the second set of audio characteristics.

In accordance with some embodiments, a computer system that is in communication with a display generation component, an audio generation component, and one or more input devices is described. The computer system that is in communication with a display generation component, an audio generation component, and one or more input devices comprises: means for displaying, via the display generation component, an audio preference interface, including concurrently displaying: a representation of a first audio sample, wherein the first audio sample has a first set of audio characteristics; and a representation of a second audio sample, wherein the second audio sample has a second set of audio characteristics that is different from the first set of audio characteristics; means for, while displaying the audio preference interface: outputting, via the audio generation component, at least a portion of the first audio sample; and receiving, via the one or more input devices, a set of one or more user inputs; and means for, after receiving the set of one or more inputs: recording a selection of the first audio sample as a preferred sample or a selection of the second audio sample as a preferred sample; and outputting, via the audio generation component, a first audio data, wherein: in accordance with the first audio sample having been recorded as the preferred sample, the output of the first audio data is based on at least one audio characteristic of the first set of audio characteristics; and in accordance with the second audio sample having been recorded as the preferred sample, the output of the first audio data is based on at least one audio characteristic of the second set of audio characteristics.

In accordance with some embodiments, a method performed at a computer system that is in communication with an audio generation component is described. The method comprises: while causing, via the audio generation component, output of audio data at a first volume, detecting that an audio exposure threshold criteria has been met; and in response to detecting that the audio exposure threshold criteria has been met: while continuing to cause output of audio data, reducing the volume of output of audio data to a second volume, lower than the first volume.

In accordance with some embodiments, a non-transitory computer-readable storage medium storing one or more programs configured to be executed by one or more processors of a computer system that is in communication with an audio generation component is described. The one or more programs include instructions for: while causing, via the audio generation component, output of audio data at a first volume, detecting that an audio exposure threshold criteria has been met; and in response to detecting that the audio exposure threshold criteria has been met: while continuing to cause output of audio data, reducing the volume of output of audio data to a second volume, lower than the first volume.

In accordance with some embodiments, a transitory computer-readable storage medium storing one or more programs configured to be executed by one or more processors of a computer system that is in communication with an audio generation component is described. The one or more programs include instructions for: while causing, via the audio generation component, output of audio data at a first volume, detecting that an audio exposure threshold criteria has been met; and in response to detecting that the audio exposure threshold criteria has been met: while continuing to cause output of audio data, reducing the volume of output of audio data to a second volume, lower than the first volume.

In accordance with some embodiments, a computer system that is in communication with an audio generation component is described. The computer system that is in communication with an audio generation component comprises one or more processors, and memory storing one or more programs configured to be executed by the one or more processors. The one or more programs include instructions for: while causing, via the audio generation component, output of audio data at a first volume, detecting that an audio exposure threshold criteria has been met; and in response to detecting that the audio exposure threshold criteria has been met: while continuing to cause output of audio data, reducing the volume of output of audio data to a second volume, lower than the first volume.

In accordance with some embodiments, a computer system is described. The computer system comprises a display generation component; an audio generation component; one or more input devices; means for, while causing, via the audio generation component, output of audio data at a first volume, detecting that an audio exposure threshold criteria has been met; and means for, in response to detecting that the audio exposure threshold criteria has been met: while continuing to cause output of audio data, reducing the volume of output of audio data to a second volume, lower than the first volume.

In accordance with some embodiments, a method performed at a computer system that is in communication with a display generation component and one or more input devices is described. The method comprises: receiving, via the one or more input devices, an input corresponding to a request to display audio exposure data; and in response to receiving the input corresponding to the request to display audio exposure data, displaying, via the display generation component, an audio exposure interface including, concurrently displaying: an indication of audio exposure data over a first period of time; and a first visual indication of a first alert provided as a result of a first audio exposure value exceeding an audio exposure threshold, the first visual indication of the first alert including an indication of a time at which the first alert was provided.

In accordance with some embodiments, a non-transitory computer-readable storage medium storing one or more programs configured to be executed by one or more processors of a computer system in communication with a display generation component and one or more input devices is described. The one or more programs include instructions for: receiving, via the one or more input devices, an input corresponding to a request to display audio exposure data; and in response to receiving the input corresponding to the request to display audio exposure data, displaying, via the display generation component, an audio exposure interface including, concurrently displaying: an indication of audio exposure data over a first period of time; and a first visual indication of a first alert provided as a result of a first audio exposure value exceeding an audio exposure threshold, the first visual indication of the first alert including an indication of a time at which the first alert was provided.

In accordance with some embodiments, a transitory computer-readable storage medium storing one or more programs configured to be executed by one or more processors of a computer system in communication with a display generation component and one or more input devices is described. The one or more programs include instructions for: receiving, via the one or more input devices, an input corresponding to a request to display audio exposure data; and in response to receiving the input corresponding to the request to display audio exposure data, displaying, via the display generation component, an audio exposure interface including, concurrently displaying: an indication of audio exposure data over a first period of time; and a first visual indication of a first alert provided as a result of a first audio exposure value exceeding an audio exposure threshold, the first visual indication of the first alert including an indication of a time at which the first alert was provided.

In accordance with some embodiments, a computer system in communication with a display generation component and one or more input devices is described. The computer system in communication with a display generation component and one or more input devices comprises one or more processors, and memory storing one or more programs configured to be executed by the one or more processors. The one or more programs include instructions for: receiving, via the one or more input devices, an input corresponding to a request to display audio exposure data; and in response to receiving the input corresponding to the request to display audio exposure data, displaying, via the display generation component, an audio exposure interface including, concurrently displaying: an indication of audio exposure data over a first period of time; and a first visual indication of a first alert provided as a result of a first audio exposure value exceeding an audio exposure threshold, the first visual indication of the first alert including an indication of a time at which the first alert was provided.

In accordance with some embodiments, a computer system in communication with a display generation component and one or more input devices is described. The computer system in communication with a display generation component and one or more input devices comprises means for receiving, via the one or more input devices, an input corresponding to a request to display audio exposure data; and means for, in response to receiving the input corresponding to the request to display audio exposure data, displaying, via the display generation component, an audio exposure interface including, concurrently displaying: an indication of audio exposure data over a first period of time; and a first visual indication of a first alert provided as a result of a first audio exposure value exceeding an audio exposure threshold, the first visual indication of the first alert including an indication of a time at which the first alert was provided.

In accordance with some embodiments, a method performed at a computer system that is in communication with an audio generation component is described. The method comprises: receiving output audio data associated with output audio generated using the audio generation component, the output audio comprising a first audio signal and a second audio signal, the output audio data including a first anticipated output audio volume for the first audio signal and a second anticipated output audio volume for the second audio signal; in accordance with a determination that the output audio data satisfies a first set of criteria, wherein the first set of criteria is satisfied when the first anticipated output audio volume for the first audio signal exceeds an output audio volume threshold: causing output of the first audio signal at a reduced output audio volume that is below the first anticipated output audio volume; and causing output of the second audio signal at the second anticipated output audio volume; and in accordance with a determination that the output audio data does not satisfy the first set of criteria: causing output of the first audio signal at the first anticipated output audio volume; and causing output of the second audio signal at the second anticipated output audio volume.

In accordance with some embodiments, a non-transitory computer-readable storage medium storing one or more programs configured to be executed by one or more processors of a computer system that is in communication with an audio generation component is described. The one or more programs include instructions for: receiving output audio data associated with output audio generated using the audio generation component, the output audio comprising a first audio signal and a second audio signal, the output audio data including a first anticipated output audio volume for the first audio signal and a second anticipated output audio volume for the second audio signal; in accordance with a determination that the output audio data satisfies a first set of criteria, wherein the first set of criteria is satisfied when the first anticipated output audio volume for the first audio signal exceeds an output audio volume threshold: causing output of the first audio signal at a reduced output audio volume that is below the first anticipated output audio volume; and causing output of the second audio signal at the second anticipated output audio volume; and in accordance with a determination that the output audio data does not satisfy the first set of criteria: causing output of the first audio signal at the first anticipated output audio volume; and causing output of the second audio signal at the second anticipated output audio volume.

In accordance with some embodiments, a transitory computer-readable storage medium storing one or more programs configured to be executed by one or more processors of a computer system that is in communication with an audio generation component is described. The one or more programs include instructions for: receiving output audio data associated with output audio generated using the audio generation component, the output audio comprising a first audio signal and a second audio signal, the output audio data including a first anticipated output audio volume for the first audio signal and a second anticipated output audio volume for the second audio signal; in accordance with a determination that the output audio data satisfies a first set of criteria, wherein the first set of criteria is satisfied when the first anticipated output audio volume for the first audio signal exceeds an output audio volume threshold: causing output of the first audio signal at a reduced output audio volume that is below the first anticipated output audio volume; and causing output of the second audio signal at the second anticipated output audio volume; and in accordance with a determination that the output audio data does not satisfy the first set of criteria: causing output of the first audio signal at the first anticipated output audio volume; and causing output of the second audio signal at the second anticipated output audio volume.

In accordance with some embodiments, a computer system that is in communication with an audio generation component is described. The computer system that is in communication with an audio generation component comprises one or more processors, and memory storing one or more programs configured to be executed by the one or more processors. The one or more programs include instructions for: receiving output audio data associated with output audio generated using the audio generation component, the output audio comprising a first audio signal and a second audio signal, the output audio data including a first anticipated output audio volume for the first audio signal and a second anticipated output audio volume for the second audio signal; in accordance with a determination that the output audio data satisfies a first set of criteria, wherein the first set of criteria is satisfied when the first anticipated output audio volume for the first audio signal exceeds an output audio volume threshold: causing output of the first audio signal at a reduced output audio volume that is below the first anticipated output audio volume; and causing output of the second audio signal at the second anticipated output audio volume; and in accordance with a determination that the output audio data does not satisfy the first set of criteria: causing output of the first audio signal at the first anticipated output audio volume; and causing output of the second audio signal at the second anticipated output audio volume.

In accordance with some embodiments, a computer system that is in communication with an audio generation component is described. The computer system that is in communication with an audio generation component comprises: means for receiving output audio data associated with output audio generated using the audio generation component, the output audio comprising a first audio signal and a second audio signal, the output audio data including a first anticipated output audio volume for the first audio signal and a second anticipated output audio volume for the second audio signal; means for in accordance with a determination that the output audio data satisfies a first set of criteria, wherein the first set of criteria is satisfied when the first anticipated output audio volume for the first audio signal exceeds an output audio volume threshold: causing output of the first audio signal at a reduced output audio volume that is below the first anticipated output audio volume; and causing output of the second audio signal at the second anticipated output audio volume; and means for in accordance with a determination that the output audio data does not satisfy the first set of criteria: causing output of the first audio signal at the first anticipated output audio volume; and causing output of the second audio signal at the second anticipated output audio volume.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing audio exposure, thereby increasing the effectiveness, efficiency, and user satisfaction with such devices. Such methods and interfaces may complement or replace other methods for managing audio exposure.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 16 is a flow diagram illustrating a method for managing audio exposure using a computer system, in accordance with some embodiments.

DESCRIPTION OF EMBODIMENTS

Figure 1A:
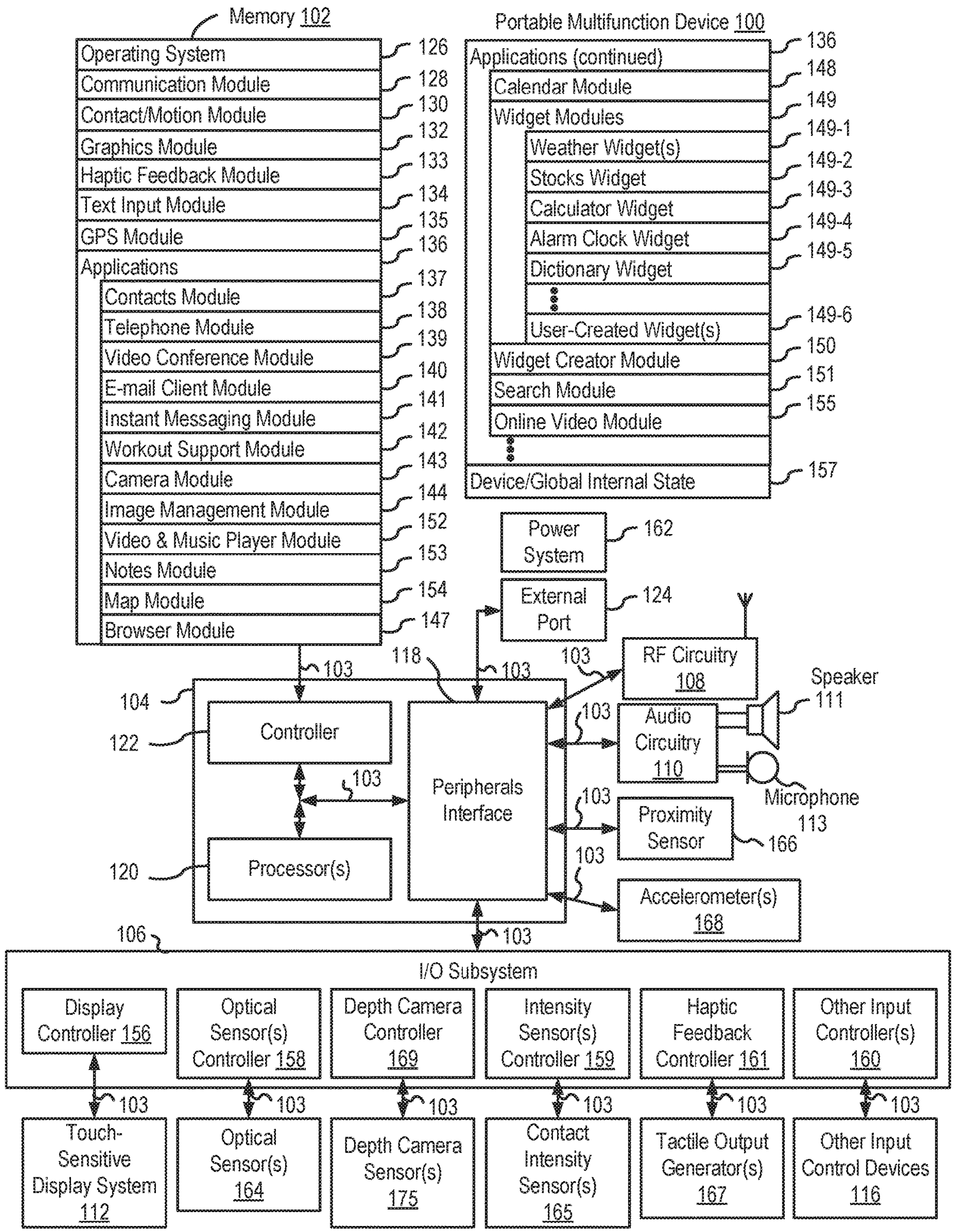
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

In some implementations, an example electronic device provides efficient methods and interfaces for managing audio exposure. For example, the example electronic device can provide a user with information about the level of noise the user is exposed to in an easily understandable and convenient manner. In another example, the example electronic device can effectively alert the user of the electronic device when the noise level that the user is exposed to exceeds a certain threshold level. In another example, the example electronic device can customize audio settings based on a user's preferences. In another example, the example electronic device can provide a user with information about the amount of audio the user is exposed to in an easily understandable and convenient manner. In another example, the example electronic device can effectively alert the user of the electronic device when the amount of audio that the user is exposed to exceeds a certain threshold level. In another example, the example electronic device can effectively adjust the amount of audio that the user is exposed to in order to protect the health of the user's auditory system. Such techniques of the example electronic device can reduce the cognitive burden on a user who monitors noise exposure levels, thereby enhancing productivity. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a “down click” or “up click” of a physical actuator button. In some cases, a user will feel a tactile sensation such as an “down click” or “up click” even when there is no movement of a physical actuator button associated with the touch-sensitive surface that is physically pressed (e.g., displaced) by the user’s movements. As another example, movement of the touch-sensitive surface is, optionally, interpreted or sensed by the user as “roughness” of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an “up click,” a “down click,” “roughness”), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif. A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
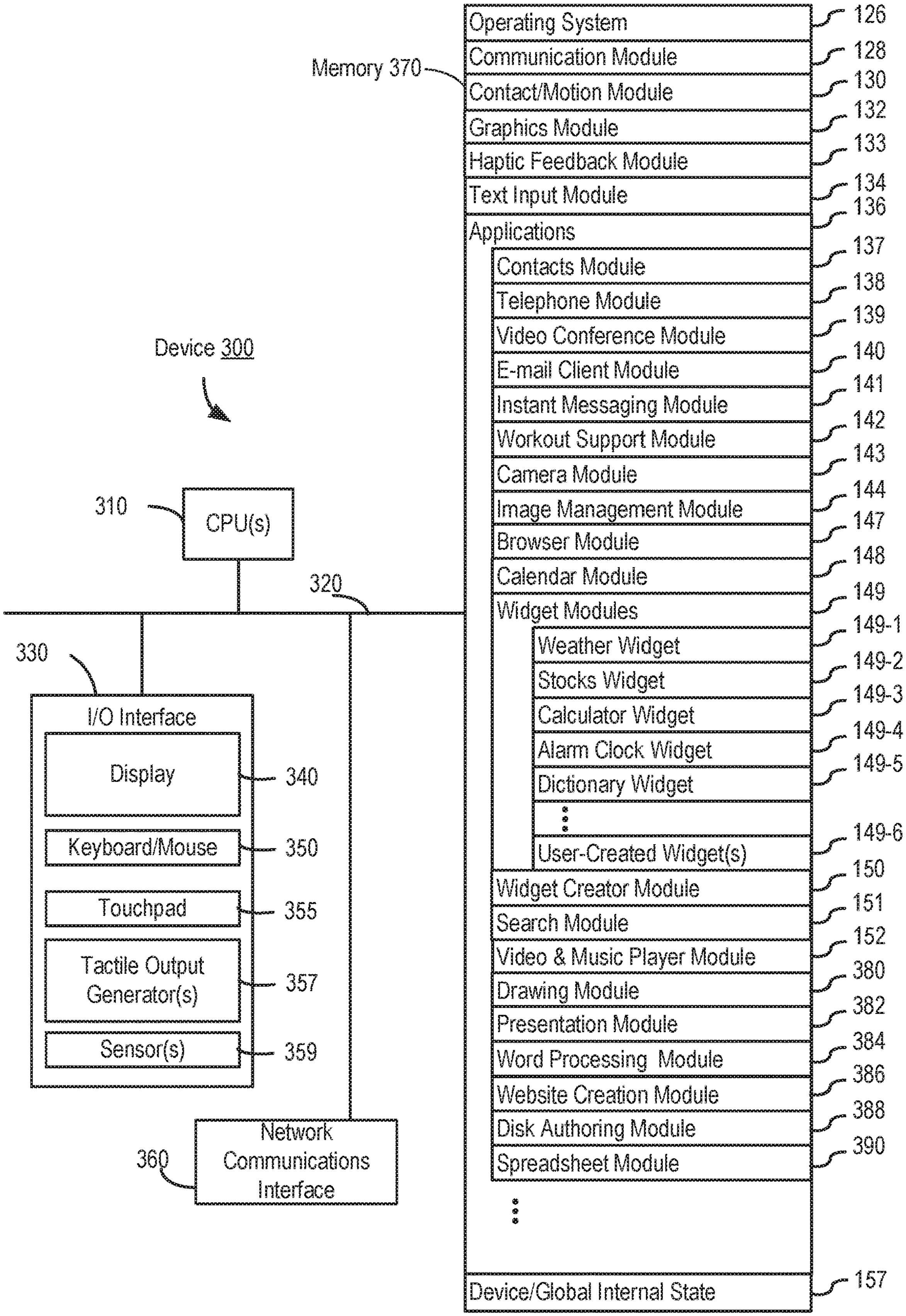
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE- WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
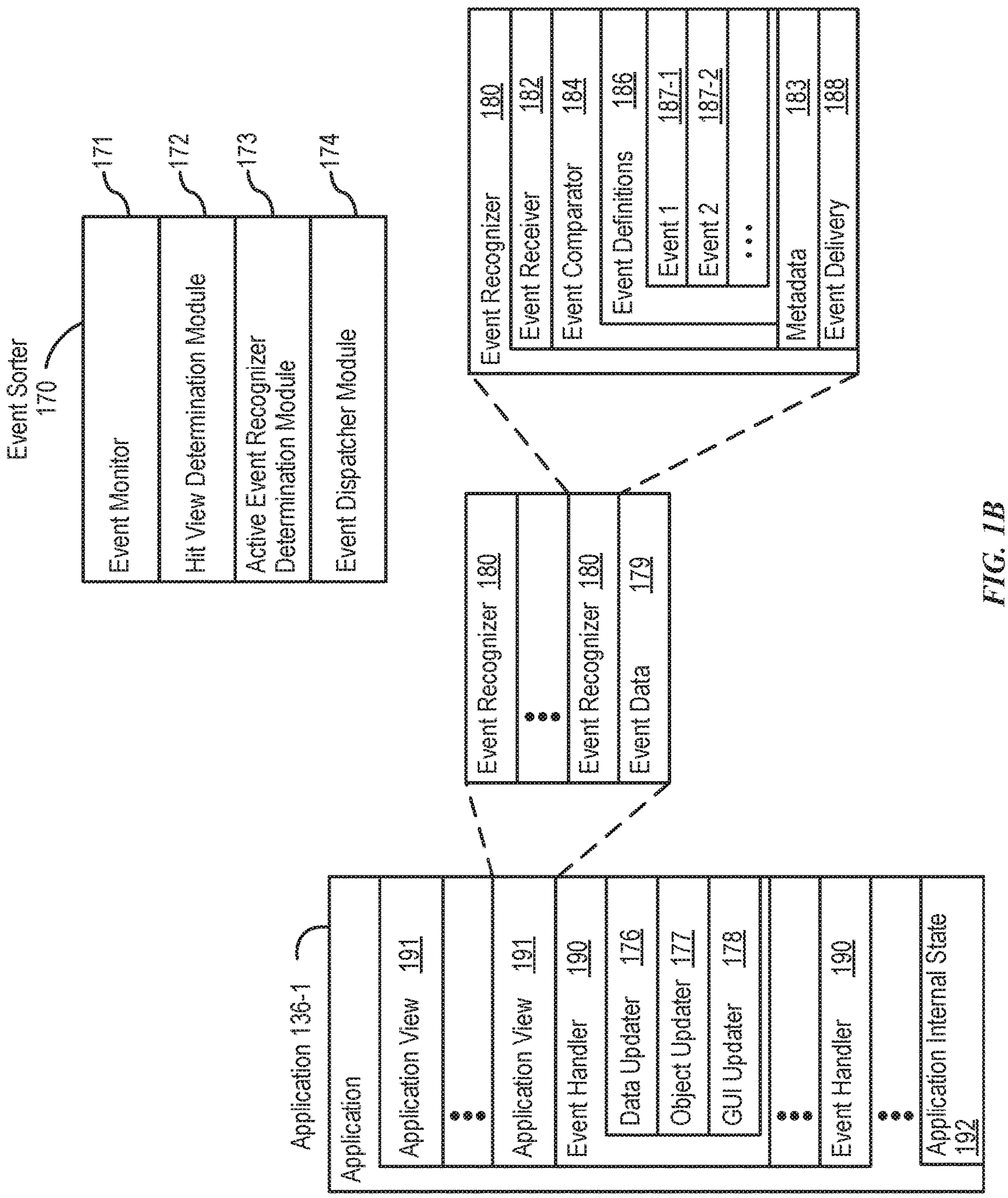
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
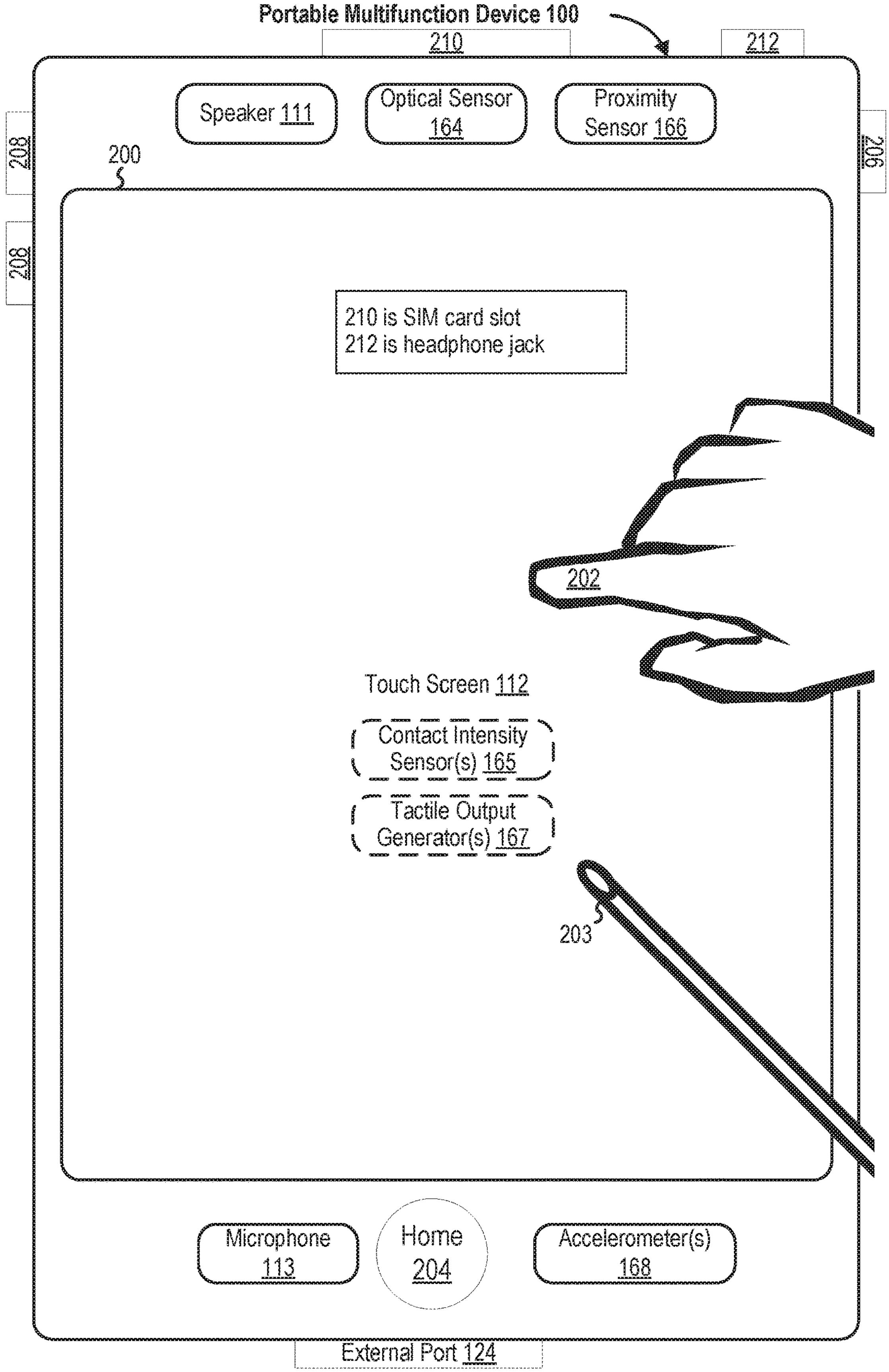
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
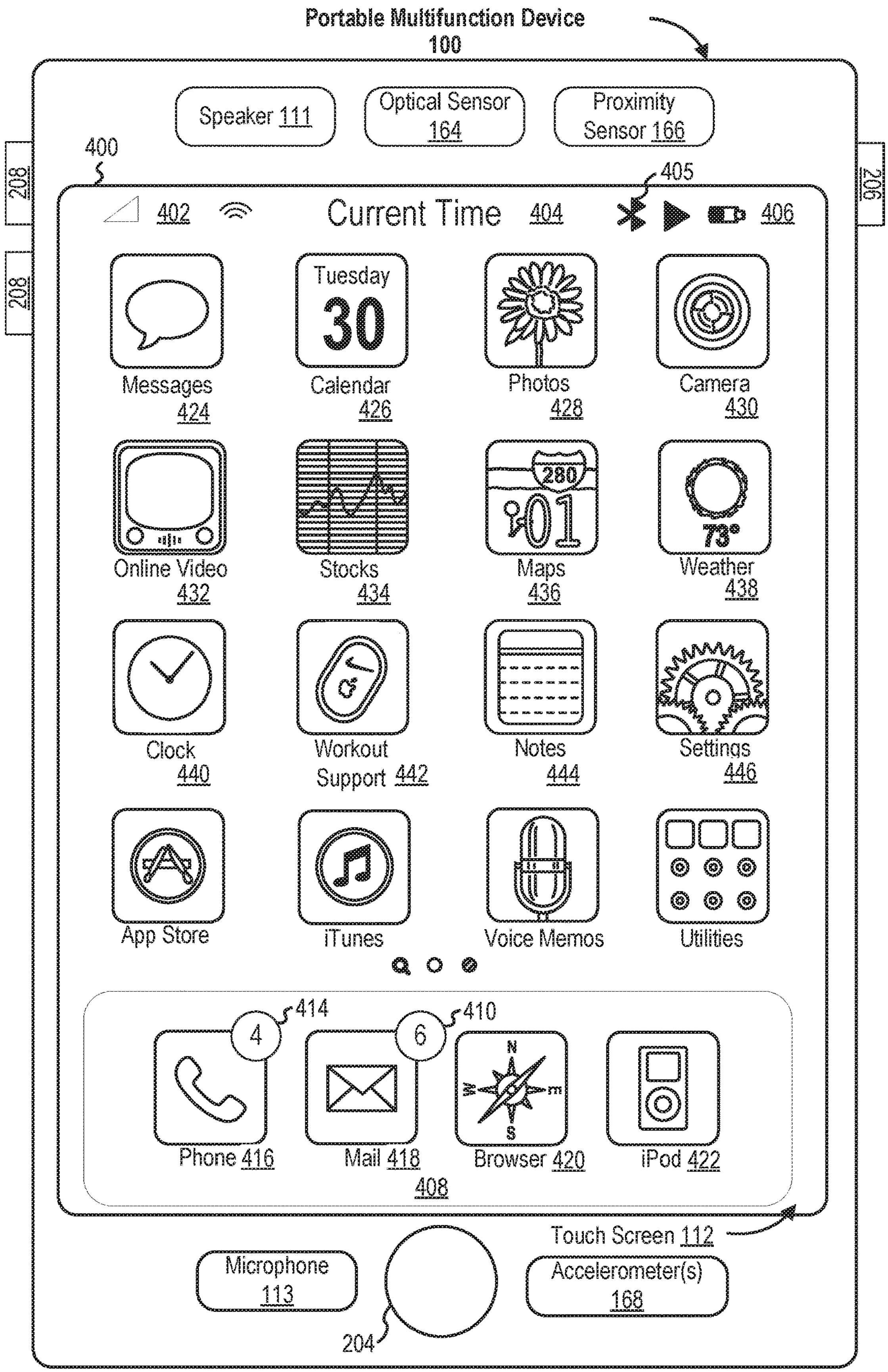
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
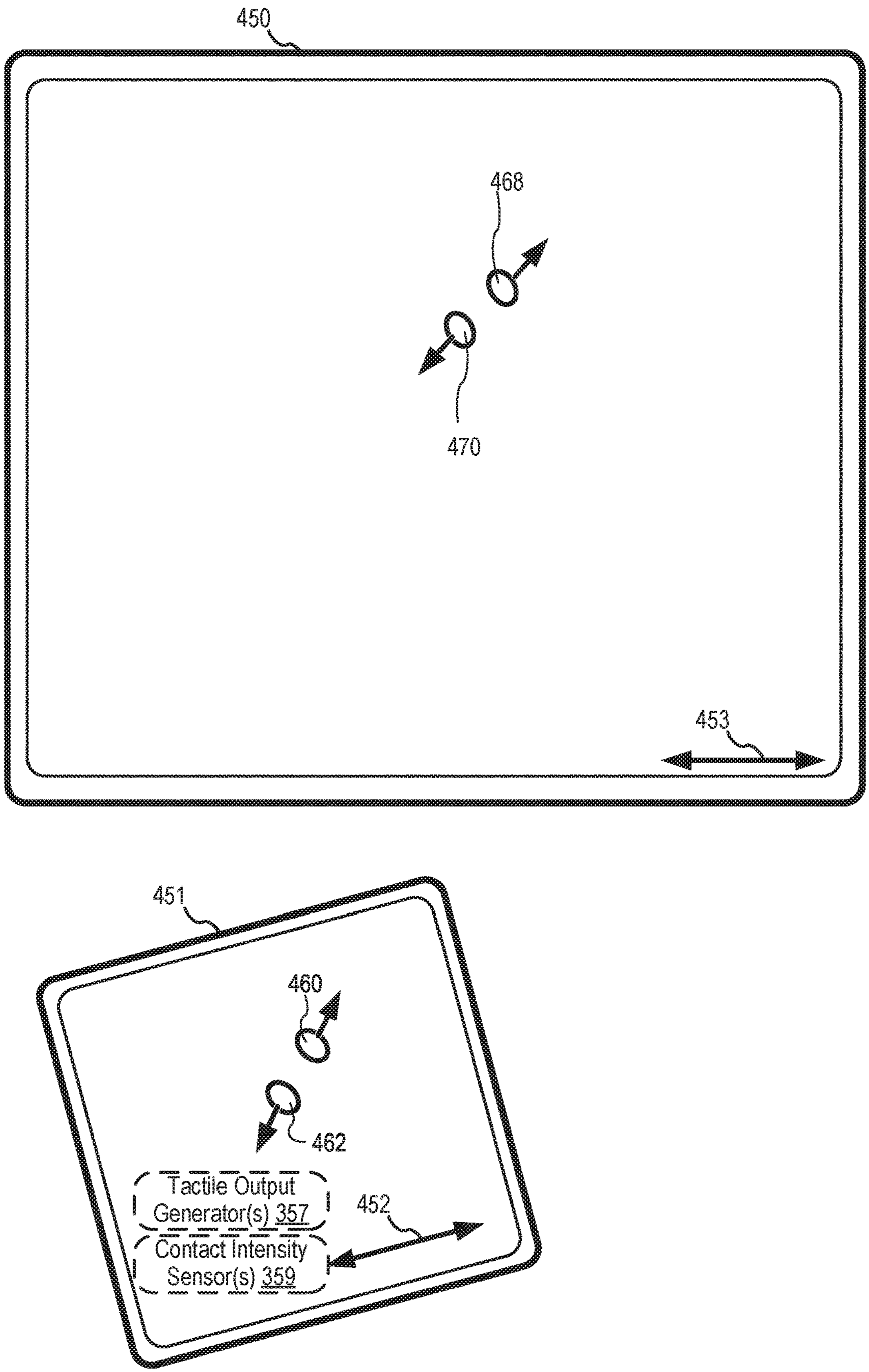
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
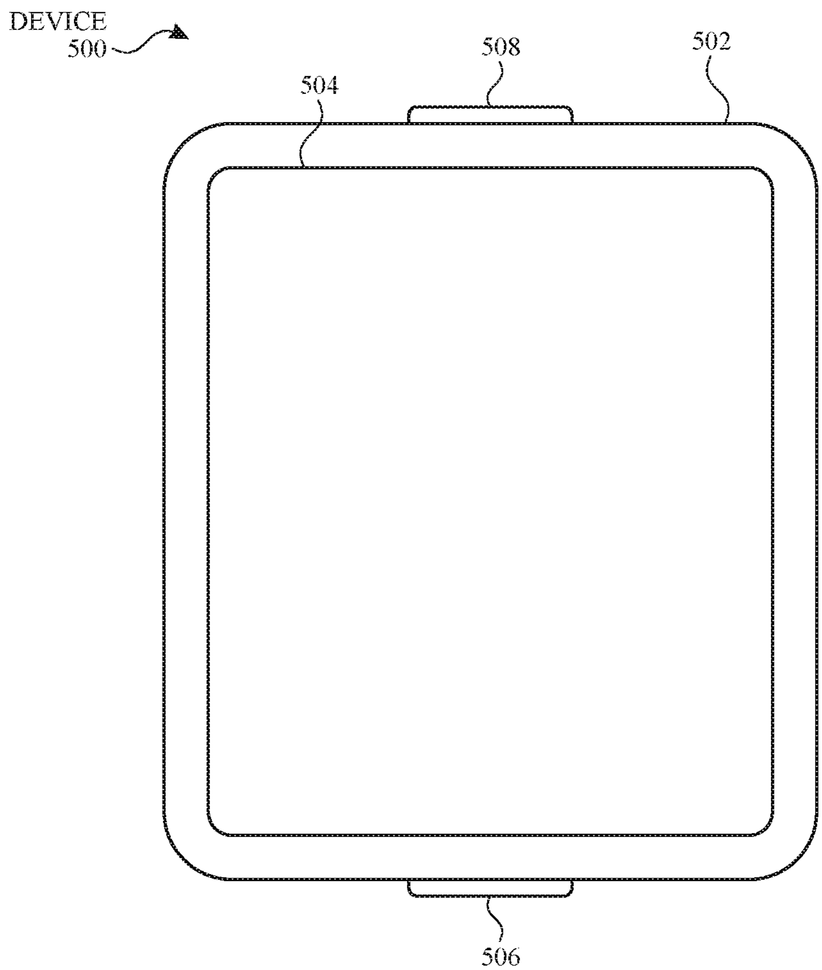
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Ser. No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
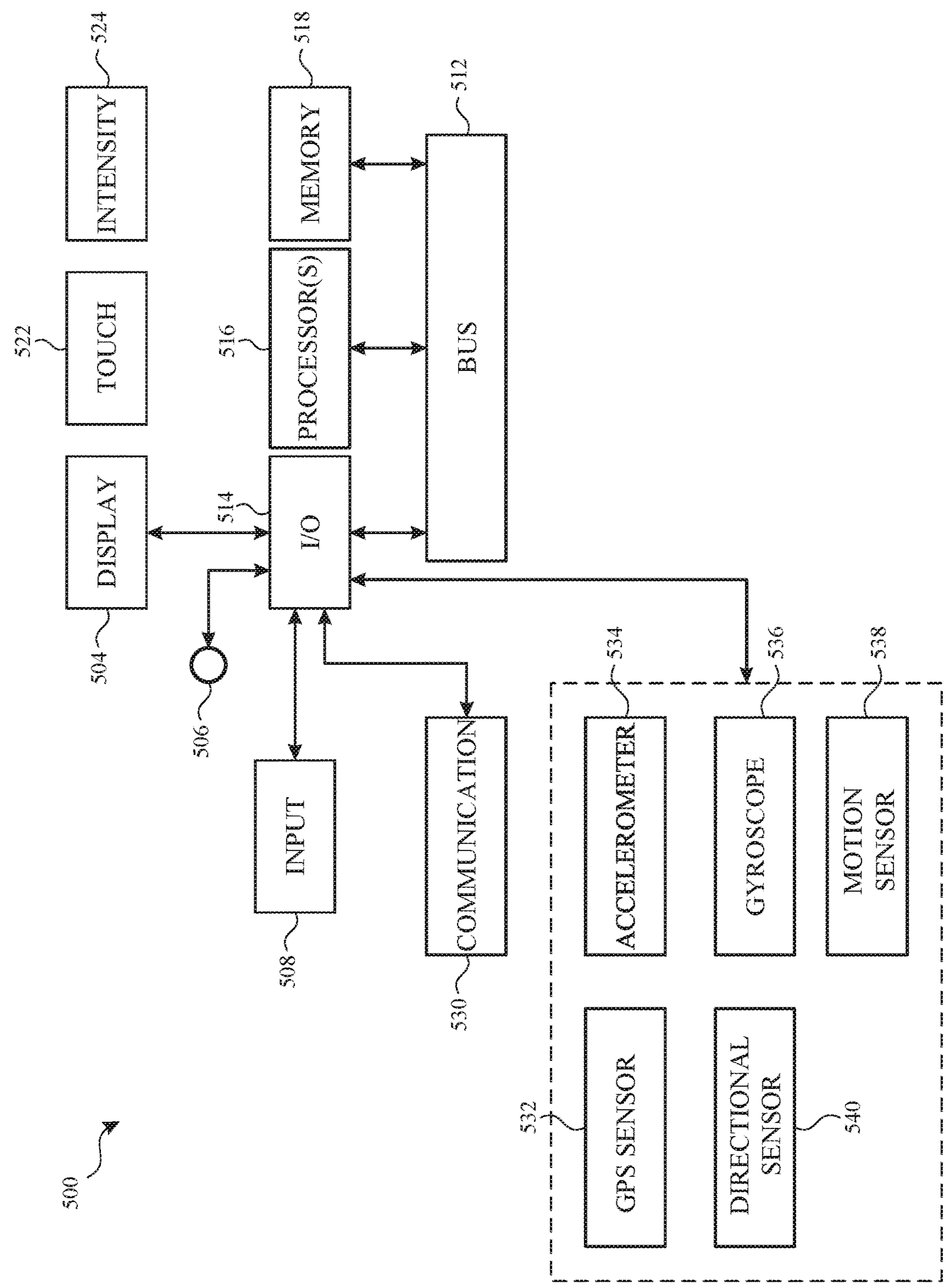
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 1000, 1300, 1500, 1600, and 1800 (FIGS. 7A-7B, 10, 13, 15, 16, and 18). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
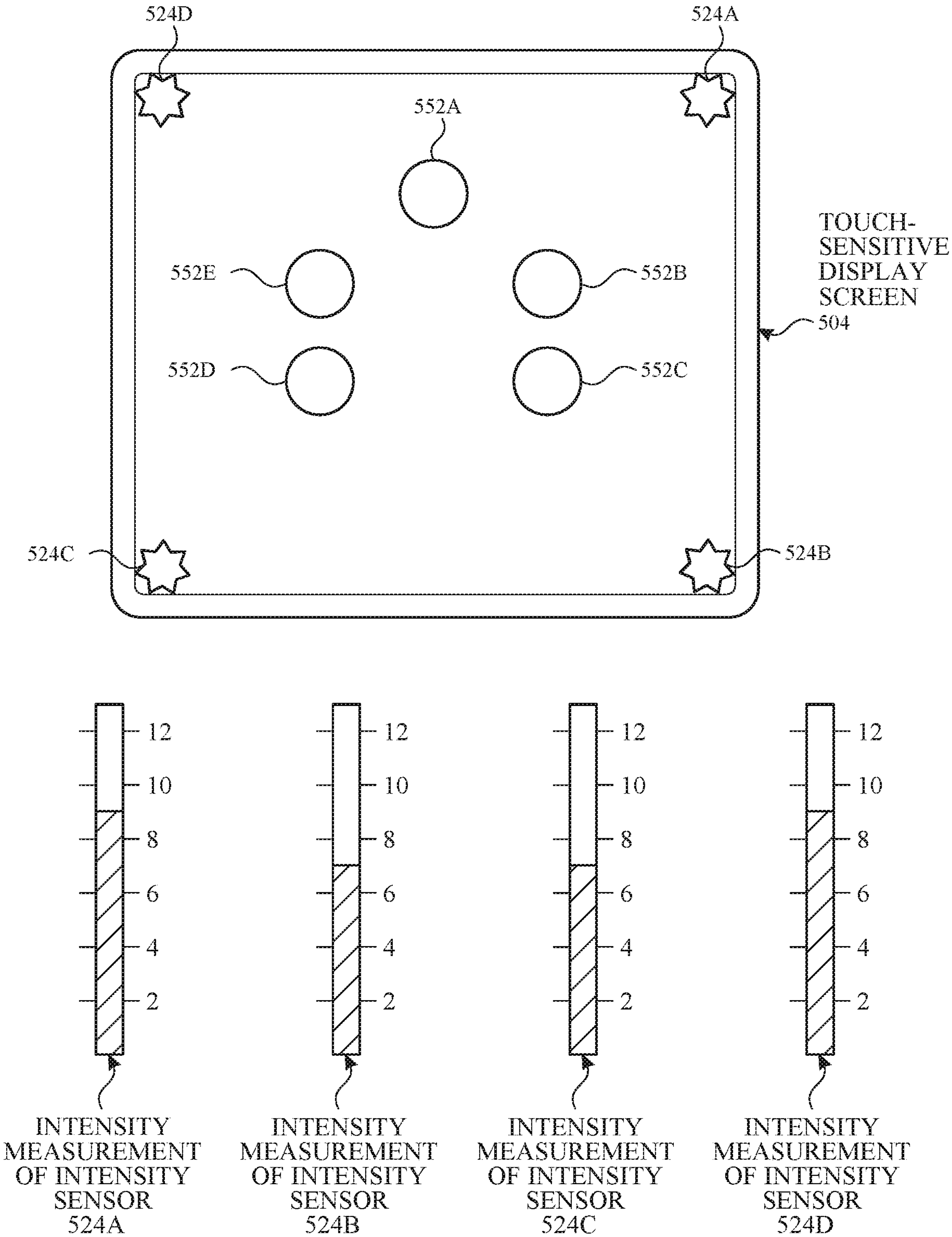
FIGS. 5C-5D illustrate exemplary components of a personal electronic device having a touch-sensitive display and intensity sensors in accordance with some embodiments.
Figure 5D:
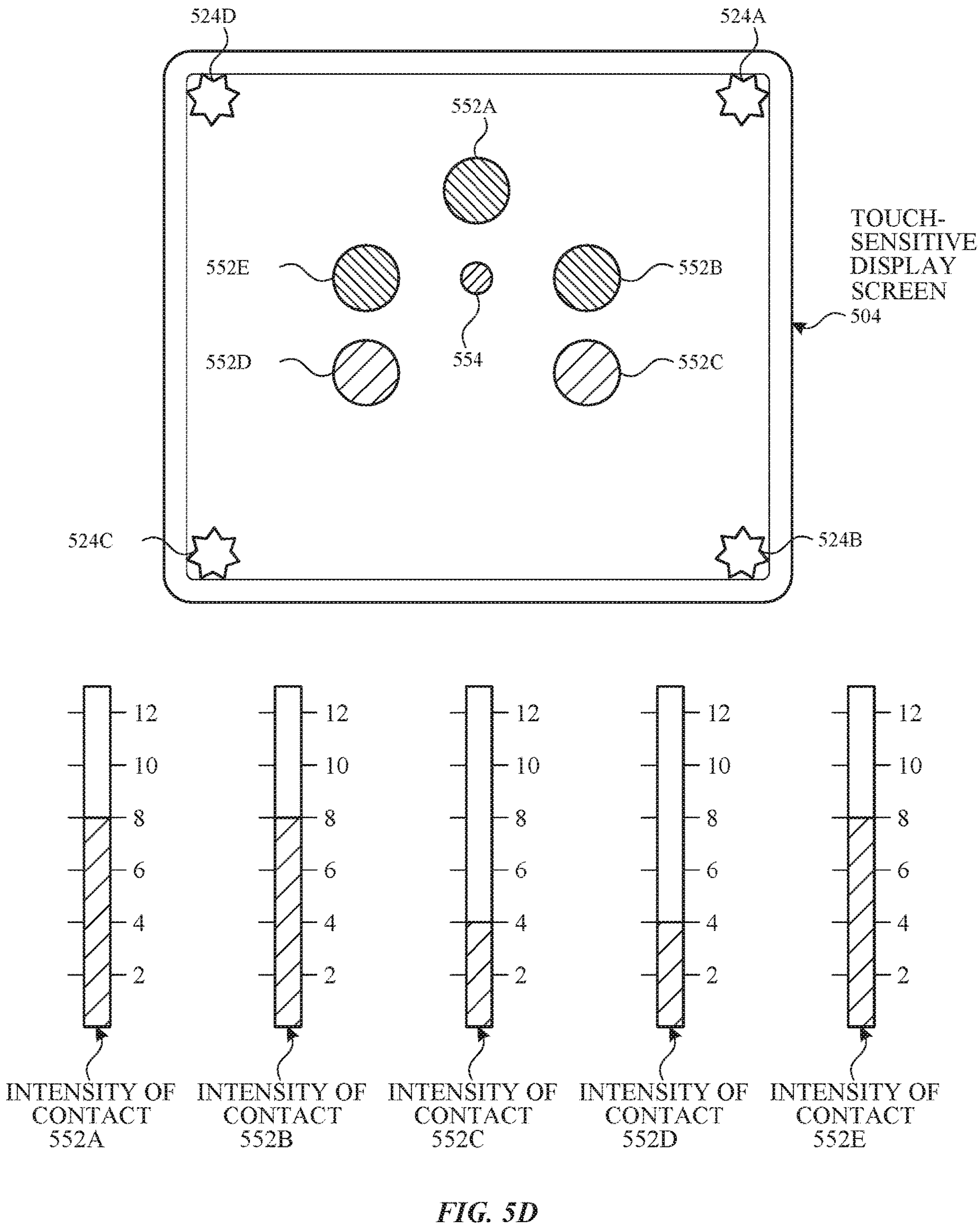

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
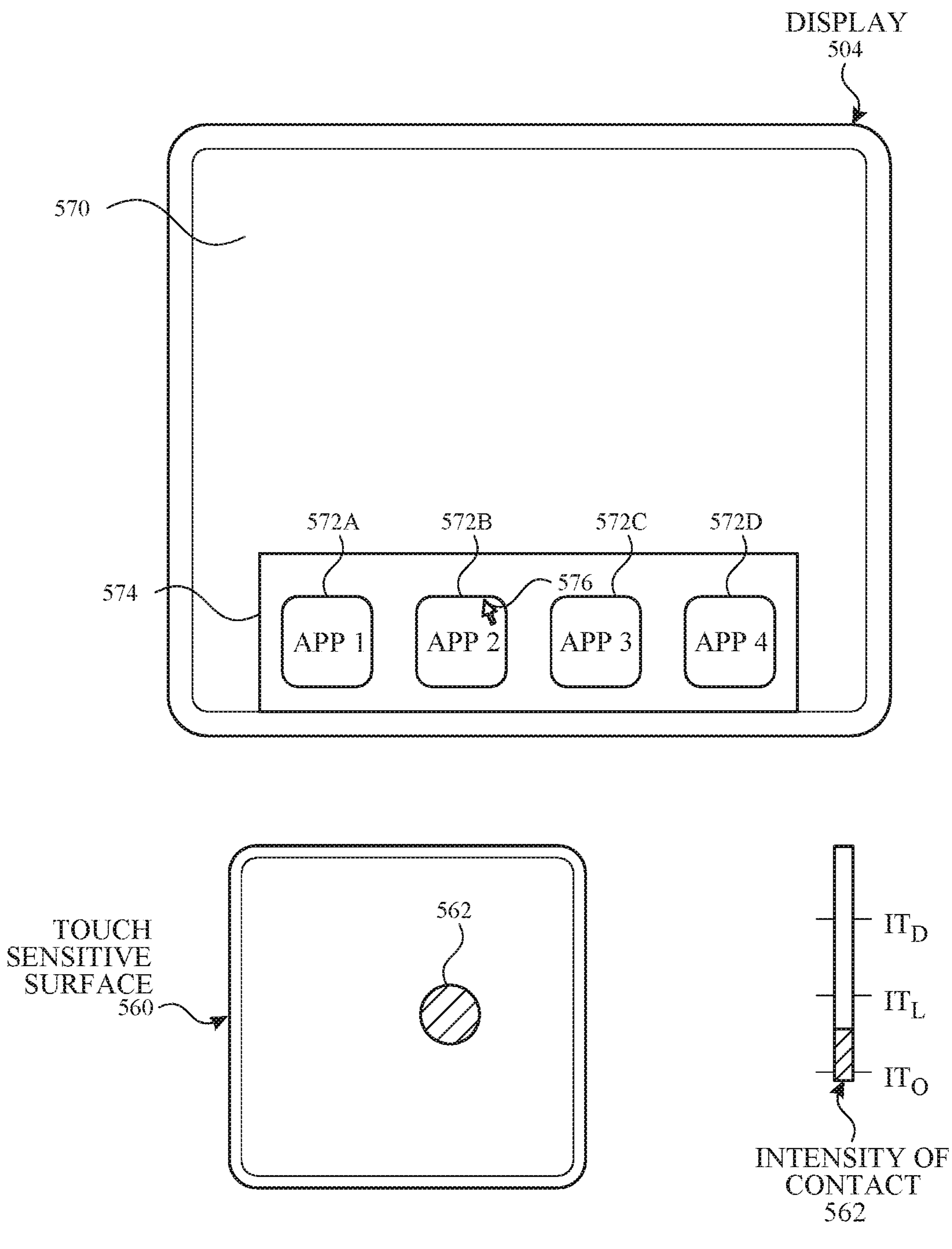
FIGS. 5E-5H illustrate exemplary components and user interfaces of a personal electronic device in accordance with some embodiments.
Figure 5F:
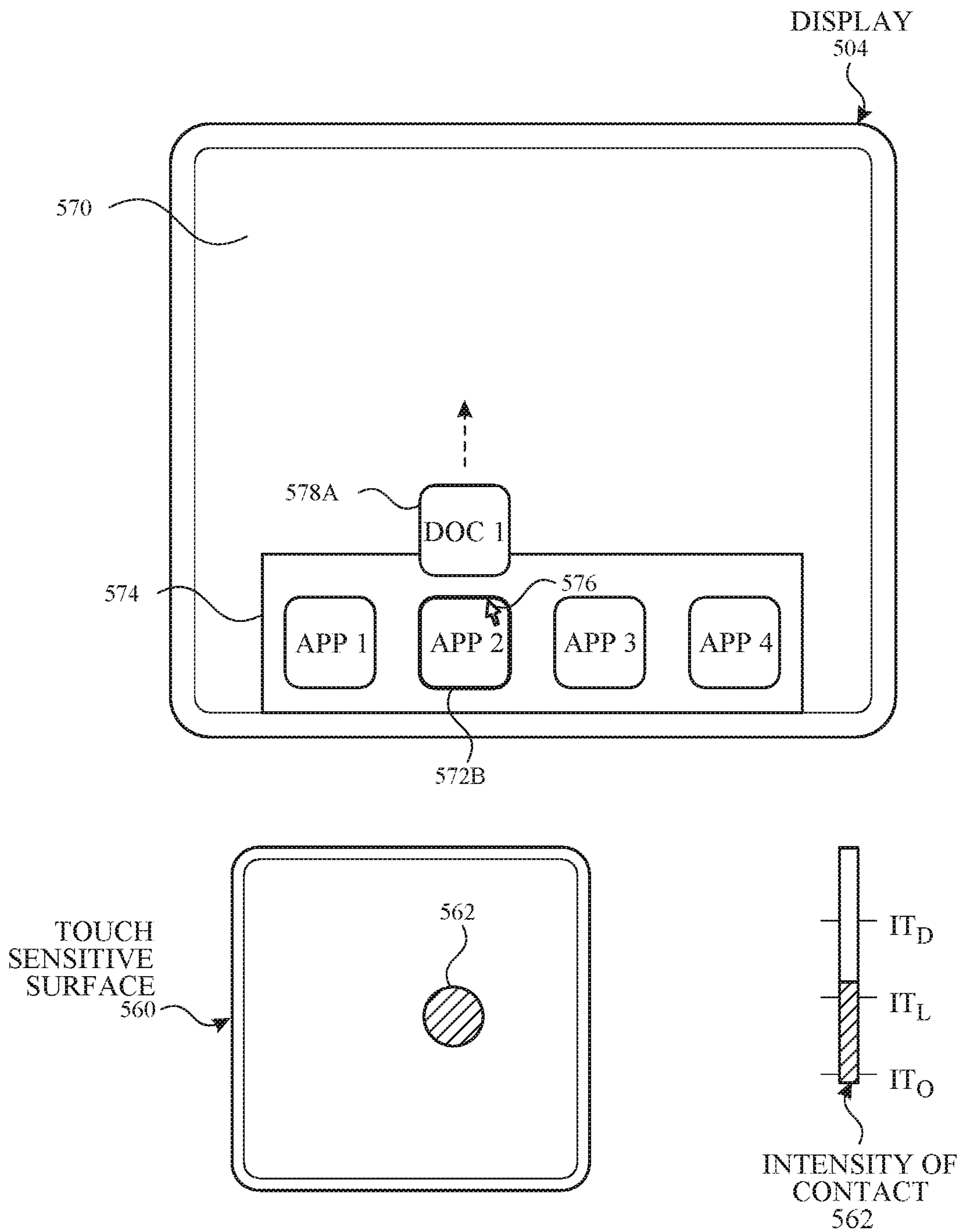
Figure 5G:
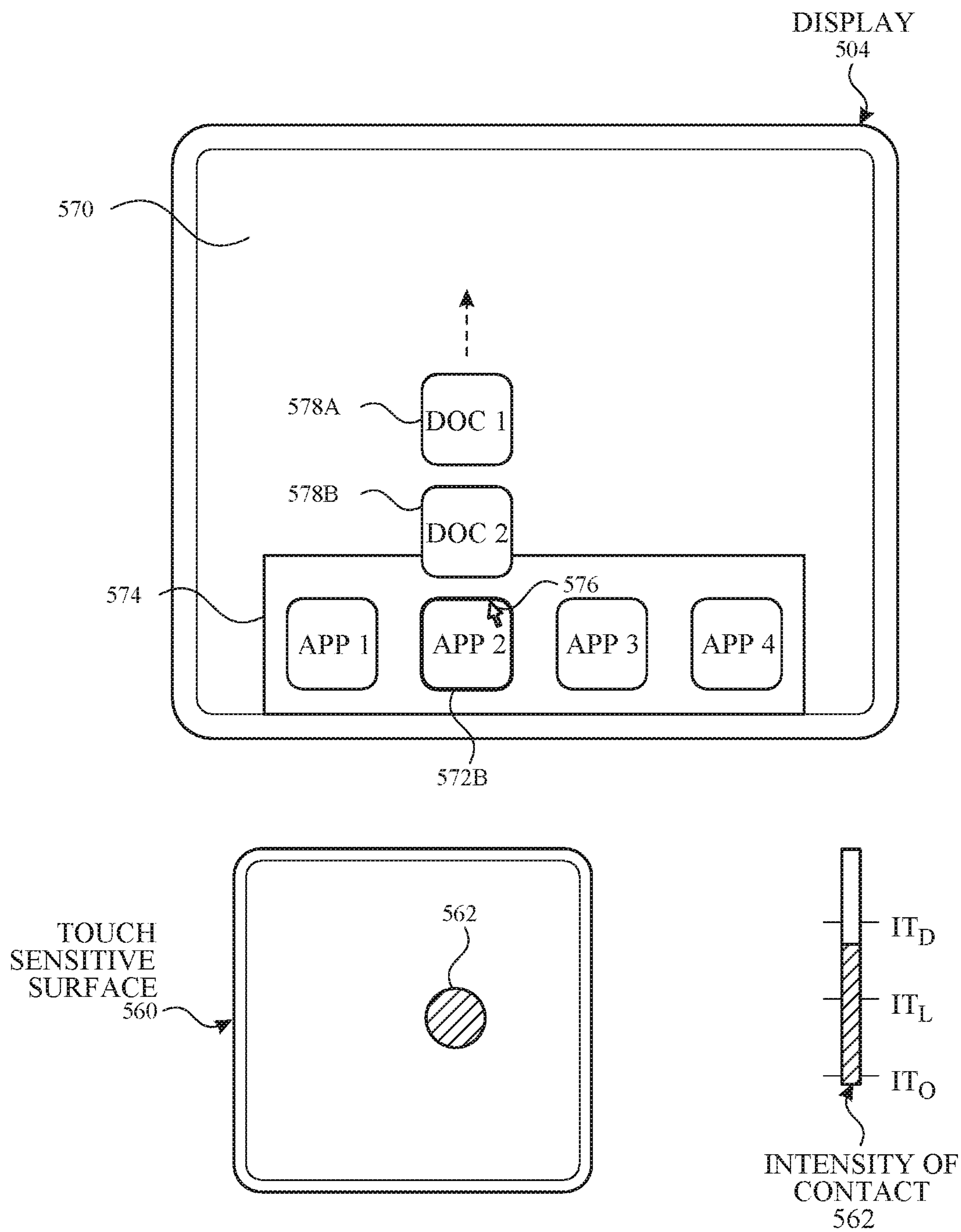
Figure 5H:
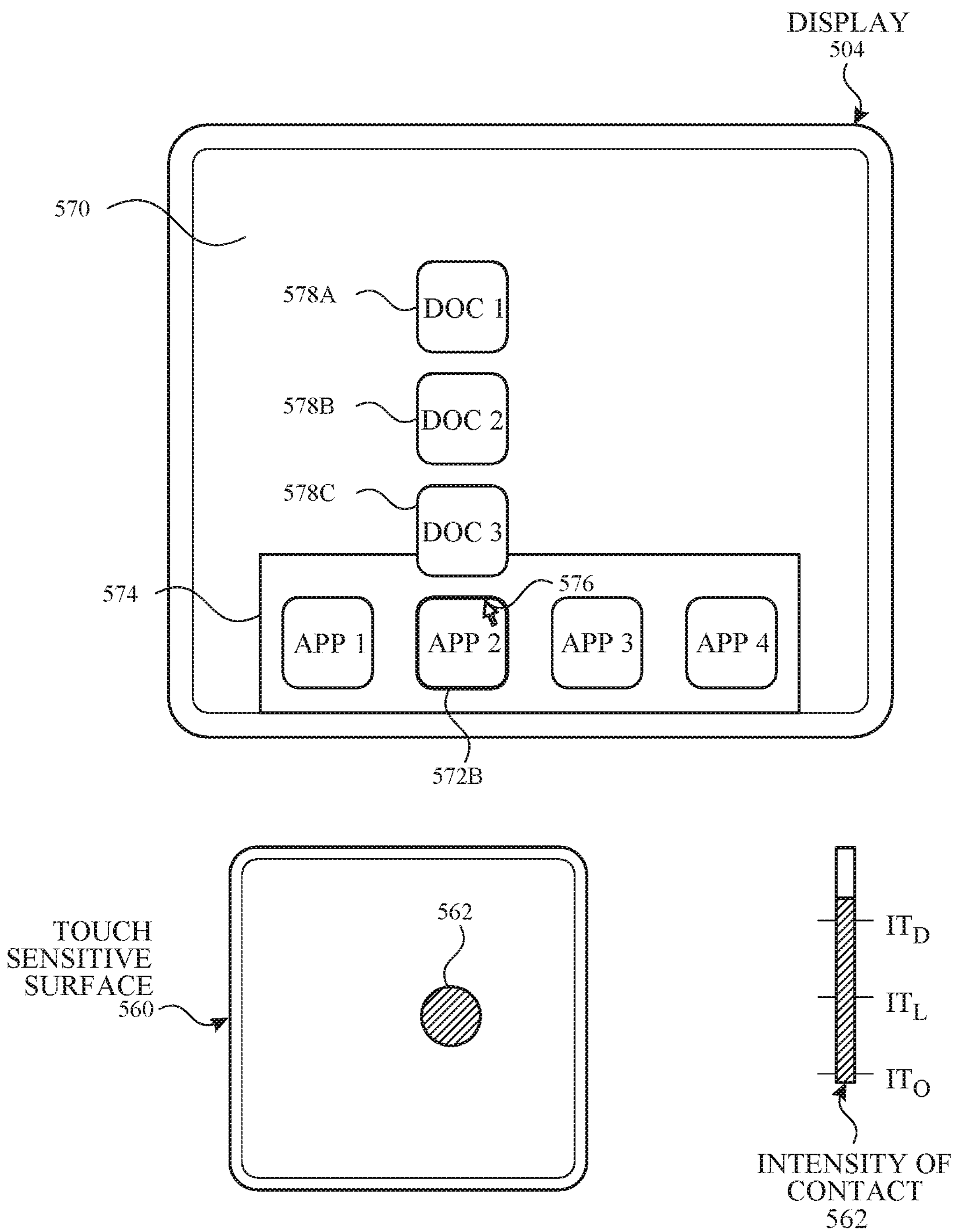

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

Figure 6A:
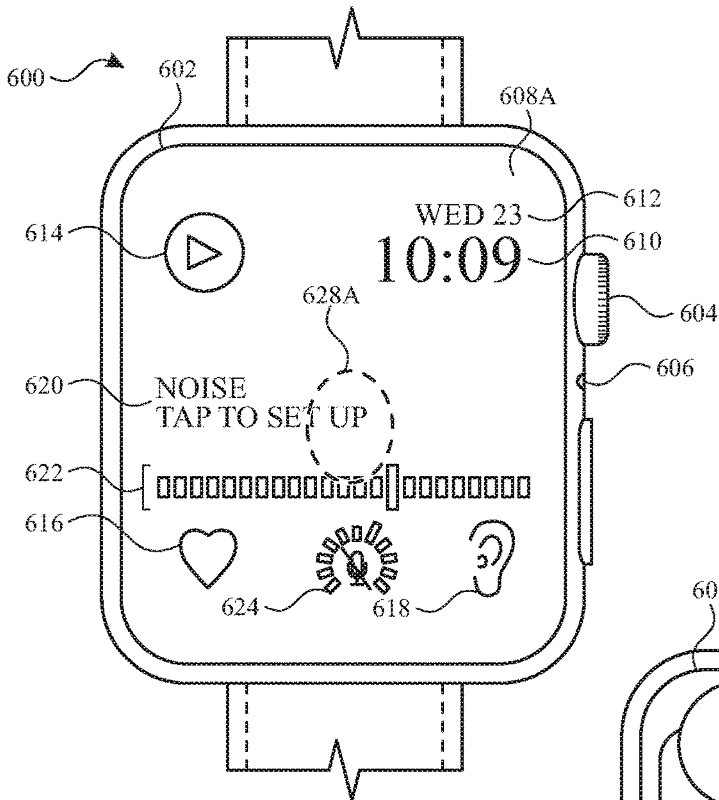
FIGS. 6A-6AL illustrate user interfaces for monitoring noise exposure levels in accordance with some embodiments.

FIGS. 6A-6AL illustrate exemplary user interfaces for monitoring sound exposure levels, in accordance with some embodiments. The user interfaces in these figures are used to illustrate the processes described below, including the processes in FIGS. 7A-7B.

As depicted in FIG. 6A, device 600 includes display 602 (e.g., a display device) and rotatable and depressible input mechanism 604 (e.g., rotatable and depressible in relation to a housing or frame of the device), and microphone 606. In some embodiments, device 600 is a wearable electronic device, such as smartwatch. In some embodiments, device 600 includes one or more features of devices 100, 300, or 500.

As depicted in FIG. 6A, clock user interface 608A includes digital indication of time 610 (e.g., a representation of digital clock displaying current hour, and minute values), and multiple affordances, each affordance associated with an application stored on device 600. Date affordance 612 indicates a current date and launches a calendar application upon selection. Remote affordance 614 launches a remote control application upon selection (e.g., an application to control devices external to device 600). Heart rate affordance 616 launches a heart rate monitoring application upon selection.

As depicted in FIG. 6A, clock user interface 608A (e.g., a clock face interface) also includes multiple noise application affordances that upon selection, launch a noise monitoring application (e.g., noise icon 618, noise status affordance 620, noise meter affordance 622, and compact noise affordance 624). As depicted in FIG. 6A, the noise application on device 600 has not been installed or initialized (e.g., enabled), as a result, noise status affordance 620, noise meter affordance 622, and compact noise affordance 624 do not indicate (e.g., display) any noise data from the noise application. Instead, for example, device 600 displays, noise status affordance 620 as a setup prompt (e.g., "tap to set up"), indicating that the noise application needs to be initialized.

Figure 6B:
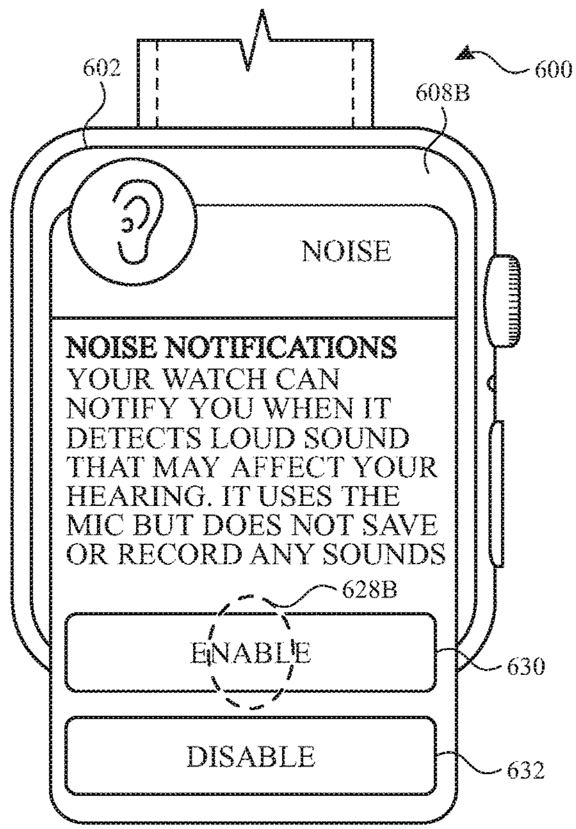

FIG. 6A depicts device 600 receiving user input 628A (e.g., a tap) on noise status affordance 620. In response to receiving user input 628A, device 600 displays the user interface 608B, as depicted in FIG. 6B. User interface 608B includes a description of the functionality of the noise application, enable affordance 630 for enabling (e.g., initializing the noise application), and disable affordance 632 for disabling (e.g., maintaining the uninitialized state of the noise application). FIG. 6B depicts device 600 receiving user input 628B (e.g., a tap) on enable affordance 630. In response to receiving user input 628B, device 600 displays user interface 608C (e.g., an interface associated with the noise application), as depicted in FIG. 6C.

Figure 6C:
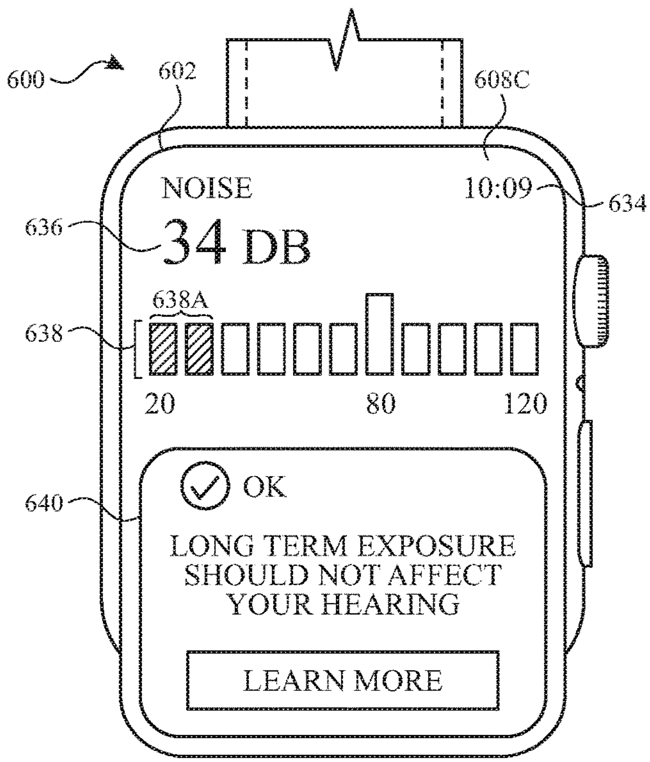

As depicted in FIGS. 6C (and 6D-6G), user interface 608C includes indication of time 634 (e.g., indicating a current time of 10:09), noise level indicator 636, noise meter indicator 638, and noise status indicator 640. Noise level indicator 636 provides a numeric indication (e.g., 34 DB) of a first noise level value (e.g., measured by or determined by device 600 from noise data derived from microphone 606). Noise status indicator 640, provides a non-numeric indication (e.g., an indication including graphics and/or text) of the first noise level value (e.g., measured by or determined by device 600 from noise data derived from microphone 606) relative to a first level threshold (e.g., a predetermined 80 DB threshold). In some embodiments, the first noise level threshold is user-configurable. In some embodiments, the device identifies a noise level based on noise data detected by a sensor (e.g., microphone) of the electronic device (e.g., the first noise level represents a noise level of the physical environment where the device is located).

Noise meter indicator 636 provides a graphical indication of a second noise level (e.g., measured by device 600 via microphone 606). In some embodiments, the second noise level and the first noise are the same noise level. In some embodiments, the first noise level and the second noise level are determined based on common noise data sampled at different time periods and/or rates (e.g., 1-second and 0.1-seconds, respectively). Noise meter indicator 638 includes active portion 638A (e.g., a visually emphasized portion) that varies in size and/or color according to a second noise level. As illustrate by the following figures, the size of active portion 638A increases as a noise level increases and the color of the active portion 638A changes relative to a second threshold level. In some embodiments, size includes a number of visually emphasized segments, a relative area occupied by a set of visually emphasized segments, or a position of the right-most edge of a set of visually emphasized segments relative to a scale. In some embodiments, each emphasized segment in active portion 638A represents a predetermined number of decibels (e.g., 10 DB). In some embodiments, the first threshold level and the second threshold level are the same level (e.g., 80DB).

The noise levels (e.g., values, amplitudes) indicated by the appearance of noise level indicator 636, noise meter indicator 638, and noise status indicator 640 (e.g., as described below), are updated in response to device 600 determining one or more noise levels based on received noise data (e.g., the indications update as ambient noise levels are continuously determined or measured by device 600). In some embodiments, noise levels are measured or detected by a device external to device 600 (e.g., device 600 receives data representing a current noise level from a remote device communicatively coupled with device 600).

FIG. 6C depicts the state of user interface 608C while device 600 is in an environment with a consistent noise level of 34 DB at a time of 10:09 (e.g. device 600 is located in a low noise environment such as a computer lab). Accordingly, as depicted in FIG. 6C, noise level indicator 636 includes a "34 DB" value and noise status indicator 640 includes a non-cautionary prompt (e.g., a check mark graphic, "OK," and a descriptive prompt indicating relatively low risk associated with exposure at the level indicated by noise level indicator 636) indicating that the noise level is below a threshold level (e.g., 80 DB). Likewise, as depicted in FIG. 6C, noise meter indicator 638 provides a graphical indication of a low, consistent noise level by displaying active portion 638A in a size corresponding to two green segments (e.g., green as represented by diagonal hatching). In some implementations, the two segments may be distinguished in a different way to illustrate that there are no issues with the low, consistent noise level.

Figure 6D:
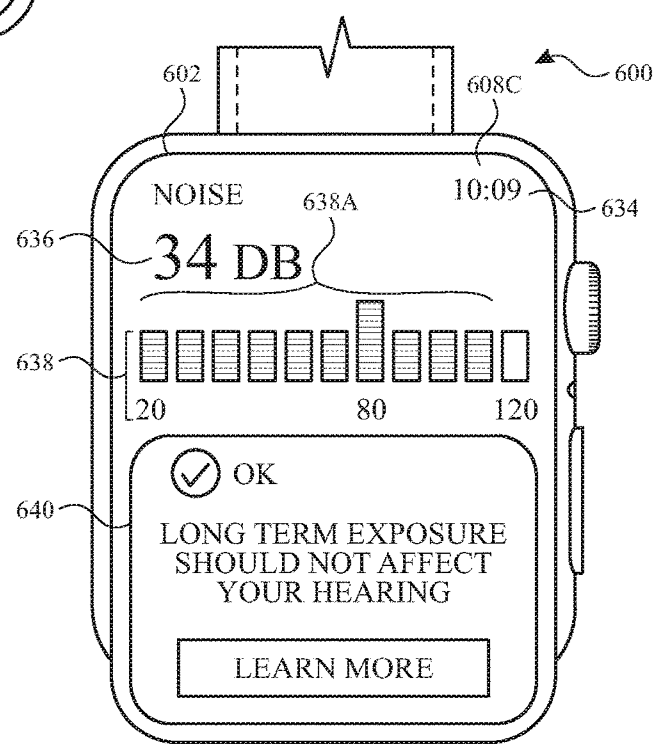

FIG. 6D depicts the state of user interface 608C in response to a sudden increase (e.g., within 200 millisecond of a spike) in ambient noise (e.g., a fire alarm goes off inside of the computer lab). As depicted in FIG. 6D, the size of active portion 638A of noise meter indicator 638 has increased from 2-segments to 10-segments and the color transitioned from green to yellow (e.g. yellow represented by horizontal hatching). In some implementations, instead of a color transition from green to yellow, the segments may be distinguished in a different way to illustrate that the noise level has transitioned to a level in which the user needs to be cautious. As illustrated, noise level indicator 636 and noise status indicator 640 maintain their previous appearance (e.g., as depicted in FIG. 6C).

As described above, the appearance of noise level indicator 636 and noise status indicator 640 vary with a first noise level (e.g., a noise level based on a longer 1-second period of noise level data) and the appearance of noise meter indicator 638 varies based on a second noise level (e.g., a noise level based on a shorter 0.1-second period of noise level data). Consequently, the graphical meter changes more quickly (e.g., instantaneously) than noise level indicator 636 (and noise status indicator 640) in response to sudden changes in ambient noise level. This lagging effect is illustrated by the difference between the noise levels represented by noise level indicator 636 and noise status indicator 640 and noise meter 638. In some embodiments, the slower update makes it easier to for a user to decipher (e.g., read) a displayed noise level, while the faster update behavior of noise meter indicator 638 provides the user with more timely (e.g., responsive) visual feedback.

Figure 6E:
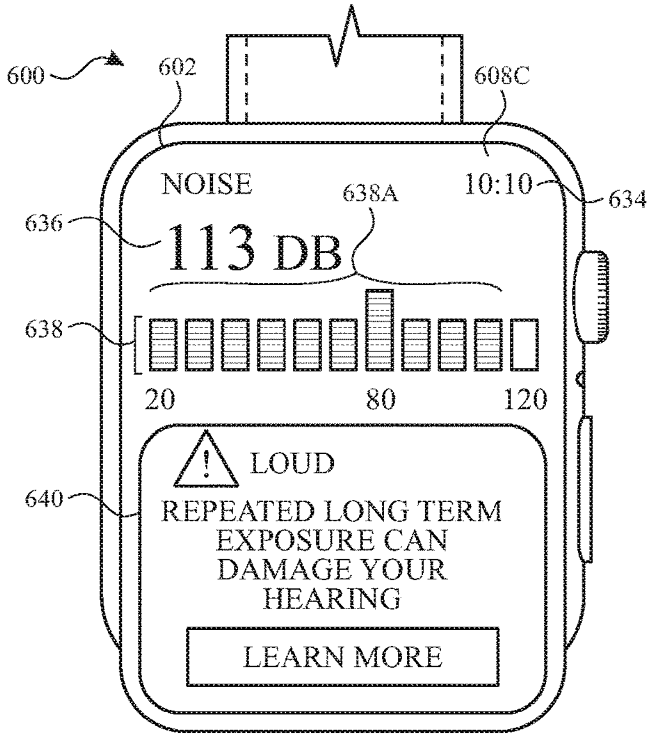

FIG. 6E depicts the state of user interface 608C after an elevated noise level has been sustained (e.g., a fire alarm continues to sound for a 1-minute). As depicted in FIG. 6E, the size and color of active portion 638A of noise meter indicator 638 remains unchanged (e.g., compared to the depiction in FIG. 6D). However, noise level indicator 636 and noise status indicator 640 have been updated to reflect the sustained elevated ambient noise level (e.g., noise level indicator 636 indicates a 113 DB level and noise status indicator 640 includes a cautionary (e.g., "LOUD") prompt indicating a noise level above an 80 DB threshold).

Figure 6F:
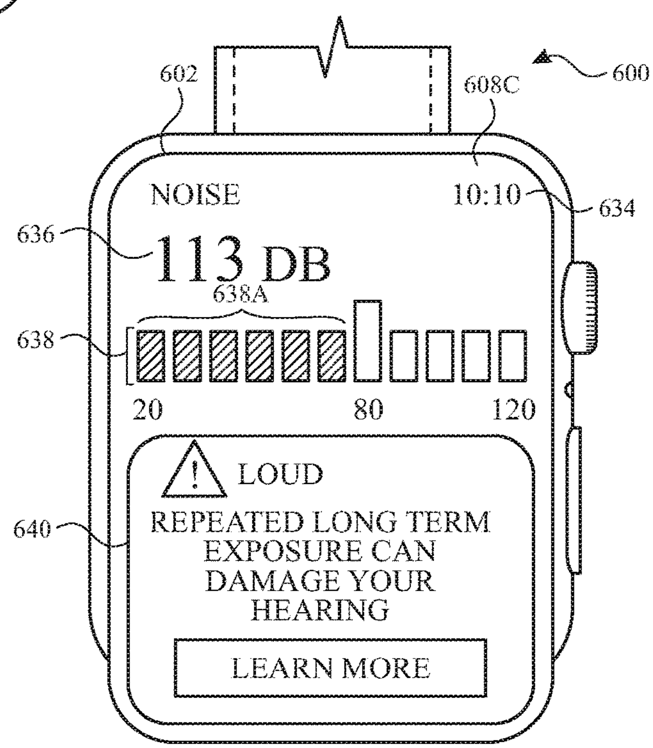

FIG. 6F depicts the state of user interface 608C in response to a sudden decrease in ambient noise level (e.g., a fire alarm abruptly stops). As depicted in FIG. 6F, the size of active portion 638A of noise meter indicator 638 has decrease from 10-segments to 6-segments and the color changed from yellow to green (e.g. green represented by diagonal hatching). In some implementations, instead of a color transition from yellow to green, the segments may be distinguished in a different way to illustrate that the noise level has transitioned from a level in which the user needs to be cautious to a normal level that is low risk to the user's hearing. As illustrated, noise level indicator 636 and noise status indicator 640 maintain their previous appearance (e.g., as depicted in FIG. 6E).

Figure 6G:
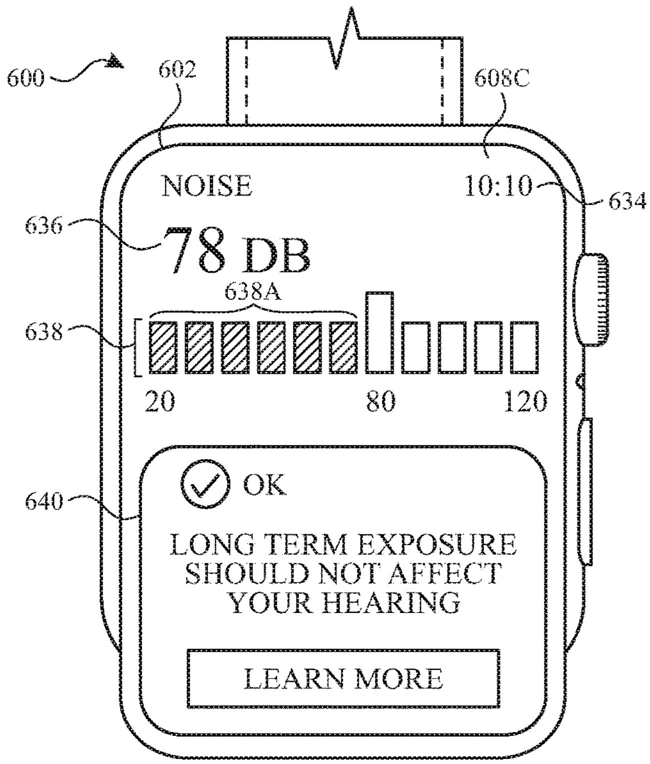

FIG. 6G depicts the state of user interface 608C after the reduced noise level has been sustained (e.g., for a period longer that 1-second). As depicted in FIG. 6G, the size and color of active portion 638A of noise meter indicator 638 remains unchanged (e.g., compared to the depiction in FIG. 6F). However, the noise level indicator 636 and noise status indicator 640 have been updated to reflect the reduced ambient noise level (e.g., noise level indicator 636 indicates a 78 DB level and noise status indicator 640 includes a non-cautionary prompt (e.g., "OK") indicating a noise level below an 80 DB threshold.

Figure 6H:
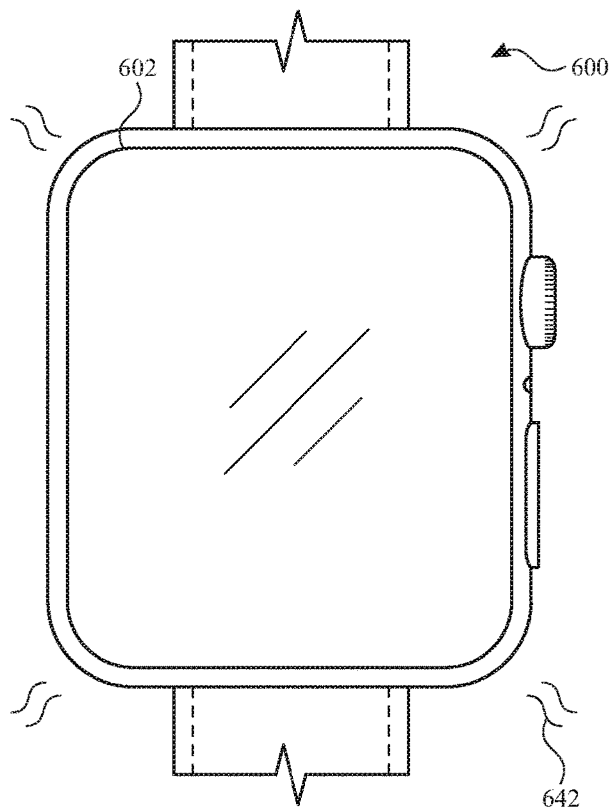

In response to a determination that a noise level exceeds a notification level threshold (e.g., 80 DB, 85 DB, 90 DB) for a period of time (e.g., 3-minutes), device 600 emits haptic alert 642 as depicted in FIG. 6H. In some embodiments, noise data used to determine a noise level value is sampled at a first rate while device 600 displays graphical noise meter indicator 638 (e.g., FIG. 6C-6E) and noise meter affordance 622 (e.g., FIGS. 6K-6N) and is sampled at a second rate (e.g., a lower sampling rate, 20% lower), while device 600 is not displaying graphical noise meter indicator 638 or noise meter affordance 622 (e.g., FIG. 6H).

Figure 6I:
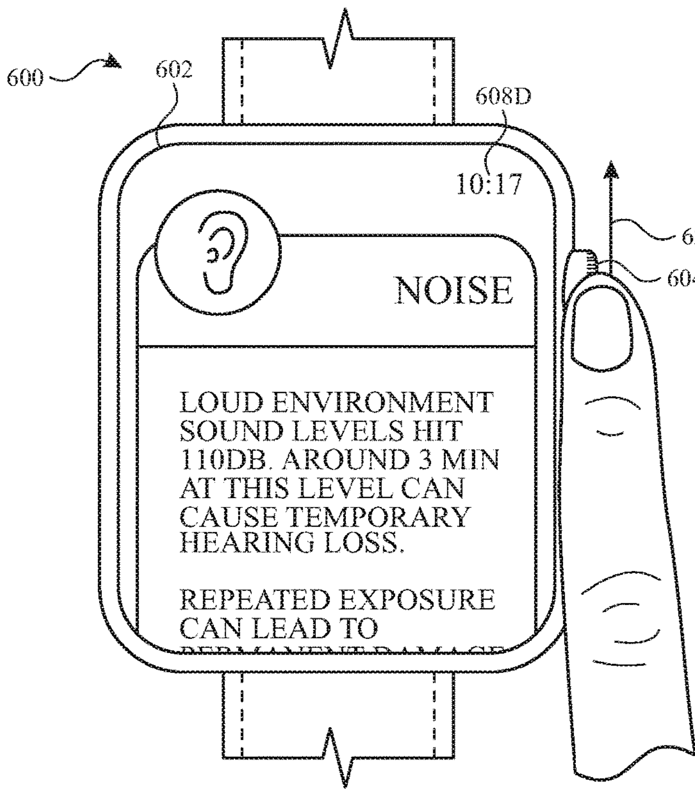
Figure 6J:
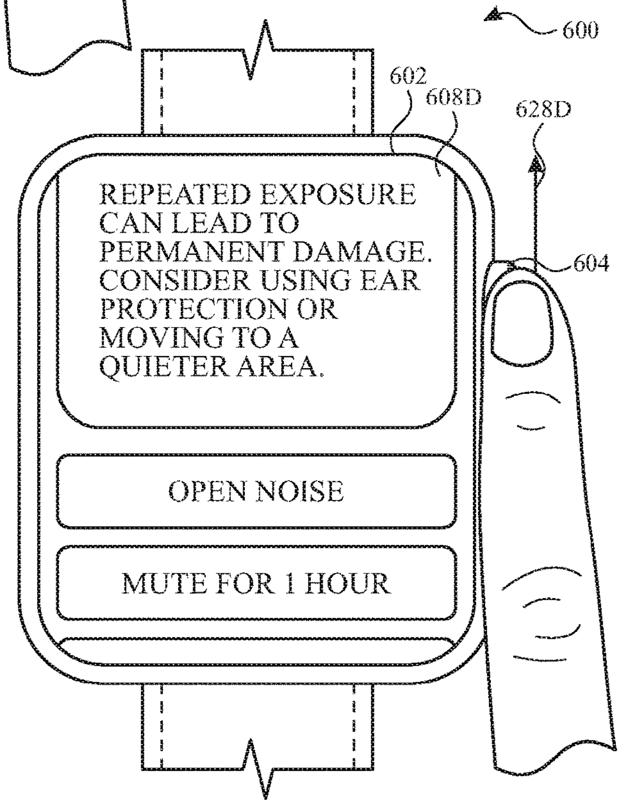

Subsequent to outputting haptic alert 642, device 600 displays the noise notification user interface 608D of FIG. 6I (e.g., a warning notification). As depicted in FIG. 6I, noise notification user interface 608D includes an explanation of the notification triggering condition (e.g., "110 DB around 3 MIN") and the associated hearing loss risk. FIGS. 6I and 6J depict device 600 receiving user inputs 628C and 628D (e.g., scroll inputs) at rotatable and depressible mechanism 604. In response to receiving the user inputs, device 600 displays additional portions of noise notification user interface 608D.

Figure 6K:
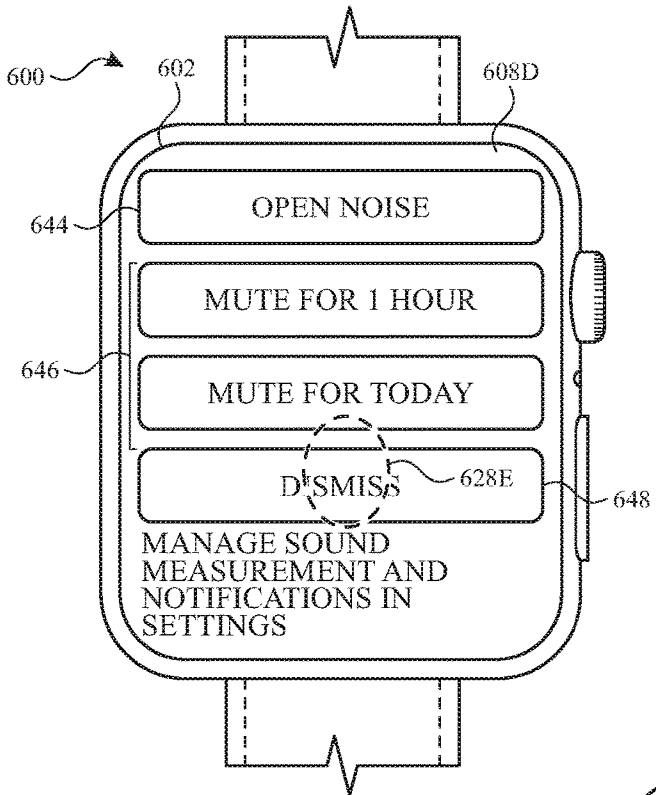

As depicted in FIG. 6K, noise notification user interface 608D includes noise app affordance 644 for launching the noise application, multiple mute affordances 646 for suppressing display of subsequent noise notifications (e.g., display of user interface 608D) for a specified time periods (e.g., 1-hour and the remainder of the day), and dismiss affordance 648. FIG. 6K depicts device 600 receiving user input 628E (e.g., tap) corresponding to dismiss affordance 648. In response to receiving user input 628E, device 600 displays (e.g., re-displays) clock user interface 608A. In some embodiments, selection of dismiss affordance 648 causes device 600 to suppress (e.g., to forgo displaying notification user interface 608D despite a notification triggering condition being detected by device 600) subsequent notifications for a predetermined auto-suppression period (e.g., 30 minutes). In some embodiments, notification user interface 608D includes a graphical indication of a noise exposure level (e.g. noise meter indicator 638).

Figure 6L:
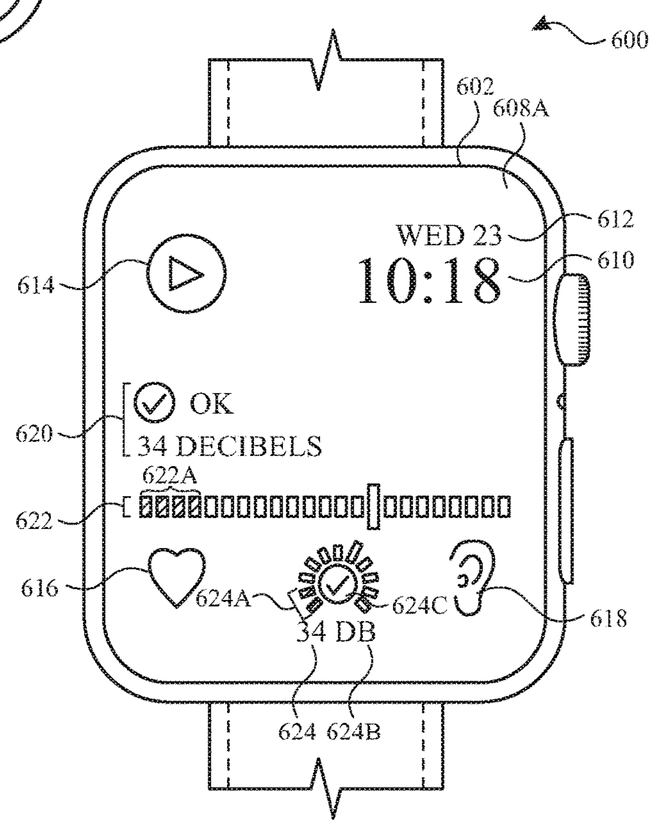

As depicted in FIG. 6L, noise status affordance 620, noise meter affordance 622, and compact noise affordance 624 now display noise level data associated with the noise application (e.g., since the noise application was initialized via user input 628B). The appearance of noise status affordance 620, noise meter affordance 622, and compact noise affordance 624, mirror the functionality provided by noise level indicator 636, noise meter indicator 638, and noise status indicator 640 (e.g., as described below with reference to FIGS. 6C-6G).

FIG. 6L depicts the state of clock user interface 608A while device 600 is in an environment with a consistent noise level of 34 DB at 10:18 (e.g. device 600 is located in a low noise environment such as a library). Accordingly, as depicted in FIG. 6L, noise status affordance 620 includes a "34 DECIBELS" value and a non-cautionary prompt (e.g., a check mark graphic and "OK") indicating that the noise level is below a threshold level (e.g., 80 DB). As depicted in FIG. 6L, noise meter affordance 622 provides a graphical indication of low noise level by displaying active portion 622A in a size corresponding to 4 segments (out of 23 segments) in a green (e.g., green as represented by diagonal hatching). Like active portion 638A of noise meter indicator 638, the size of active portion 622A is proportional to noise level and the color (e.g., green) indicates a noise level relative to a threshold level (e.g., green below and yellow above). In some implementations, the indication of the noise level relative to a threshold level can be different colors or other non-color distinguishing indications.

As depicted in FIG. 6L, compact noise affordance 624 displays a combination of the information represented by noise meter affordance 622 and noise status affordance 620. In particular, as depicted in FIG. 6L, compact noise affordance includes a graphical indication of a low noise level by displaying active portion 624A in a size corresponding to 2 segments (out of 11 segments) in green (e.g., green as represented by diagonal hatching, representing noise level below a threshold), numeric portion 624B includes value (e.g., 34 DB) and graphic portion 624C includes a non-cautionary graphic (e.g., a check mark graphic) corresponding to the values indicate by noise status affordance 620.

Figure 6M:
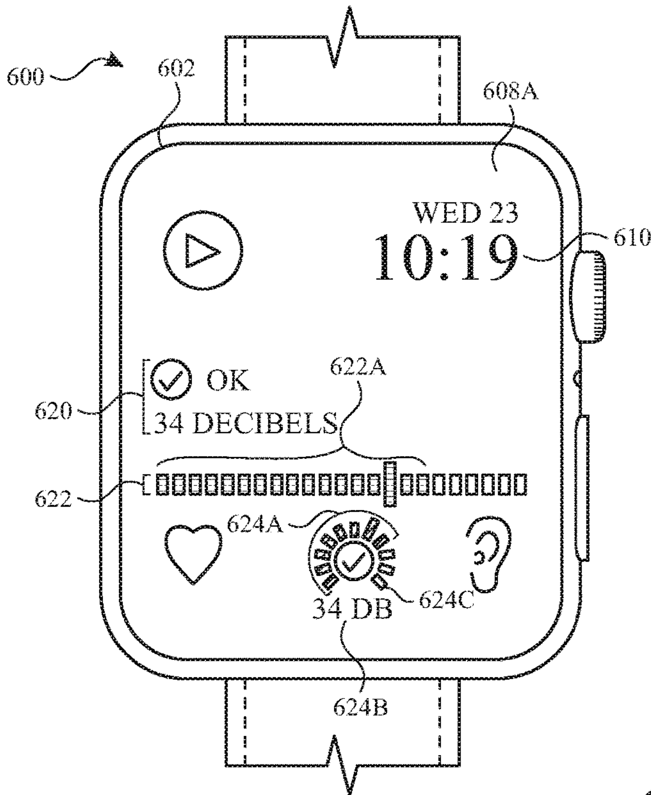

FIG. 6M depicts the state of user interface 608A in response to a sudden increase (e.g., a spike) in ambient noise at a time of 10:19. As depicted in FIG. 6M, the size of active portion 622A of noise meter affordance 622 has increased from 4-segments to 17-segments and the color of active portion 622A transitions from green to yellow (e.g. yellow represented by horizontal hatching, transitioning from a noise level below a threshold to a noise level in which the user should exercise listening caution). Similarly, as depicted in FIG. 6M, the size of active portion 624A of compact noise affordance 624 has increased from 2-segments to 8-segments and the color changed from green to yellow. In contrast, noise level status affordance 620, numeric portion 624B, and graphic portion 624C have maintained their previous appearance (e.g., as depicted in FIG. 6L).

Figure 6N:
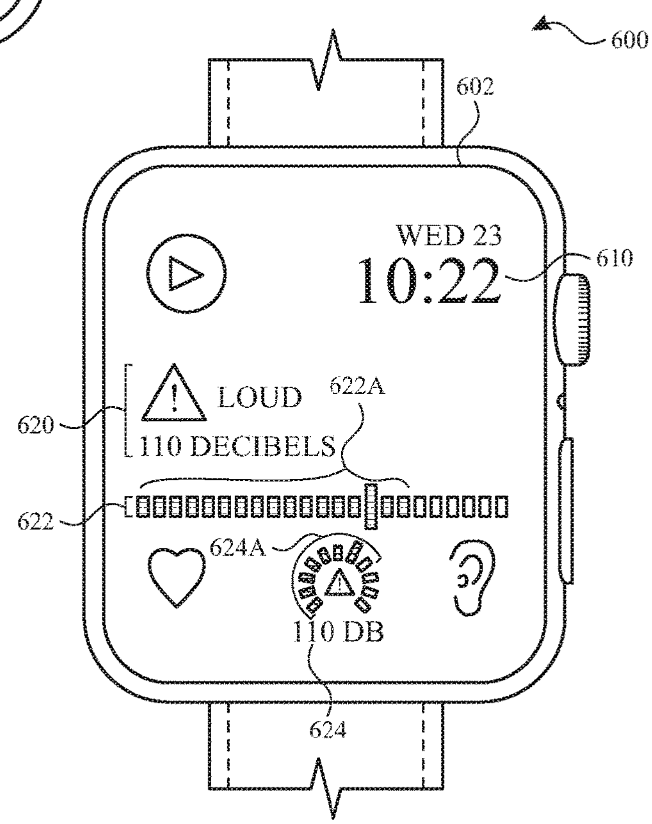

FIG. 6N depicts the state of user interface 608A after an elevated noise level has been sustained (e.g., for 3-minutes). As depicted in FIG. 6N, the size and color of active portion 622A of noise meter affordance 622 remain unchanged (e.g., compared to the depiction in FIG. 6M). However, noise status affordance 620, numeric portion 624B, and graphic portion 624C have been updated to reflect the sustained elevated ambient noise level. Notably, immediately after displaying user interface 608A as depicted FIG. 6N (e.g., after device 600 detects and displays a sustained noise level of 110 DB for 3-minutes, the previously discussed notification triggering condition), device 600 does not output haptic alert (e.g., FIG. 6H) or display noise notification user interface 608D (e.g., FIG. 6I), since the previous notification was dismiss within an auto-suppression period (e.g., 30 minutes).

Figure 6O:
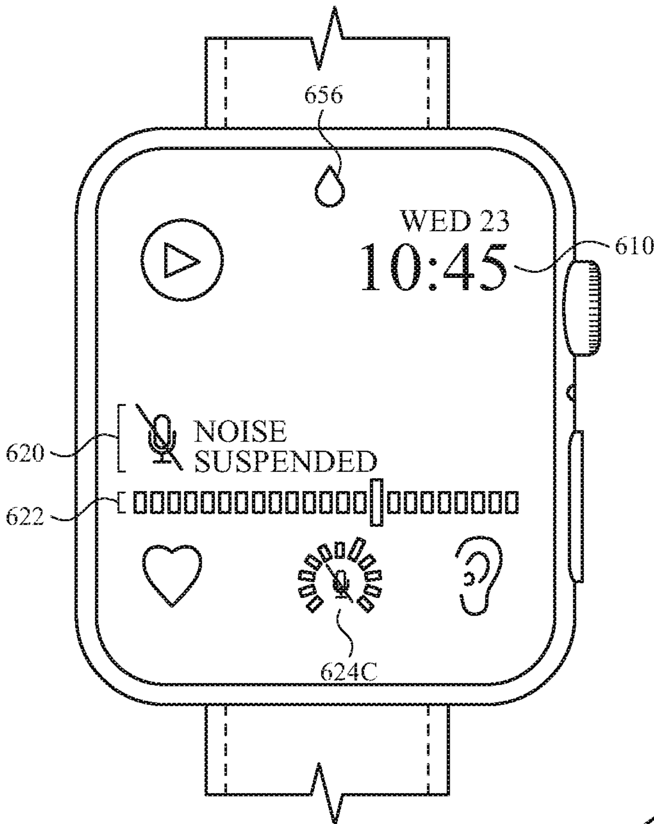
Figure 6P:
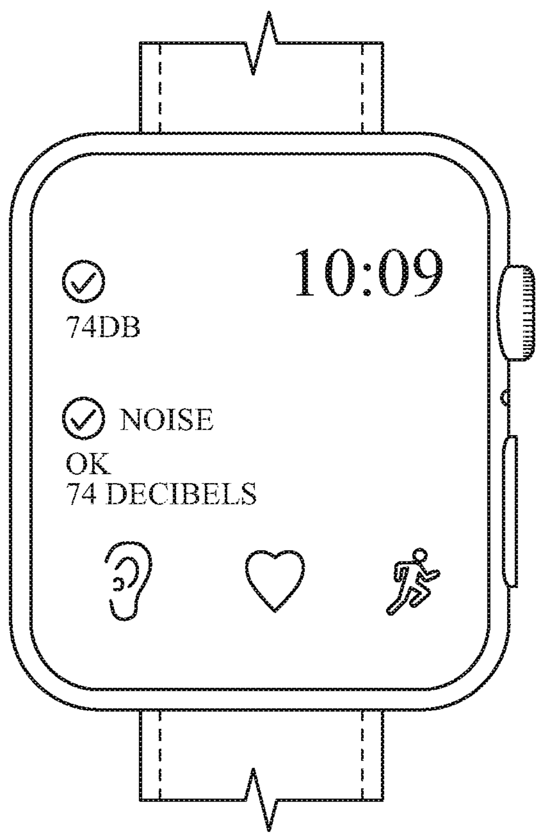
Figure 6Q:
Figure 6R:
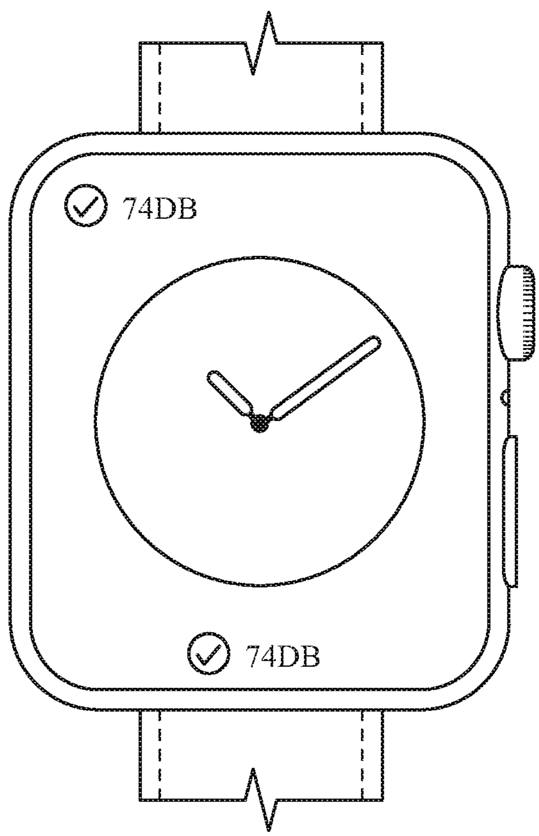
Figure 6S:
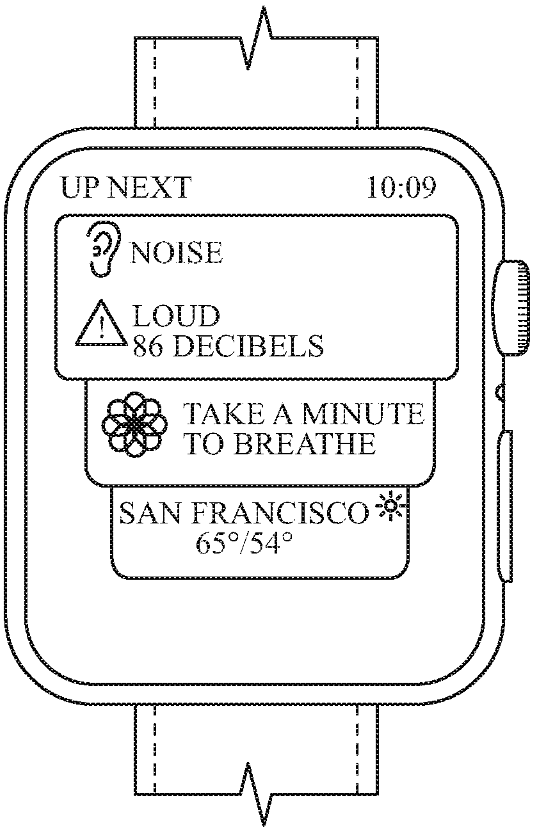
Figure 6T:
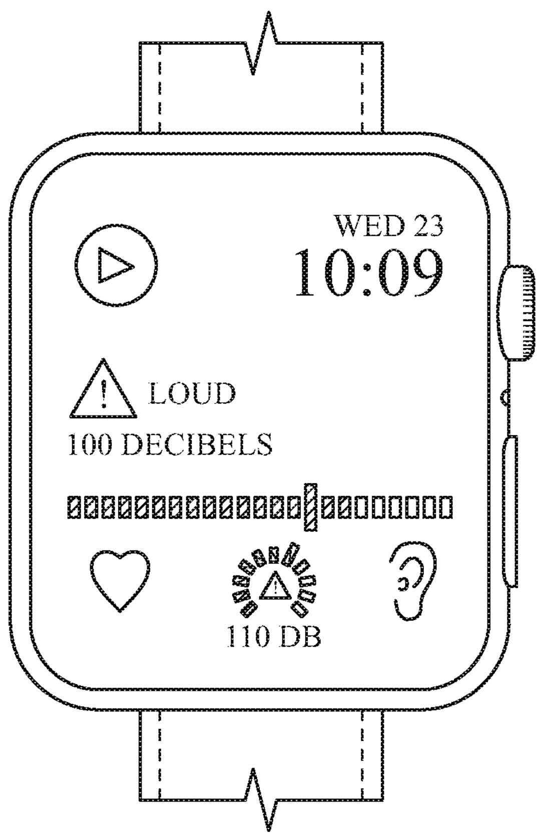
Figure 6U:
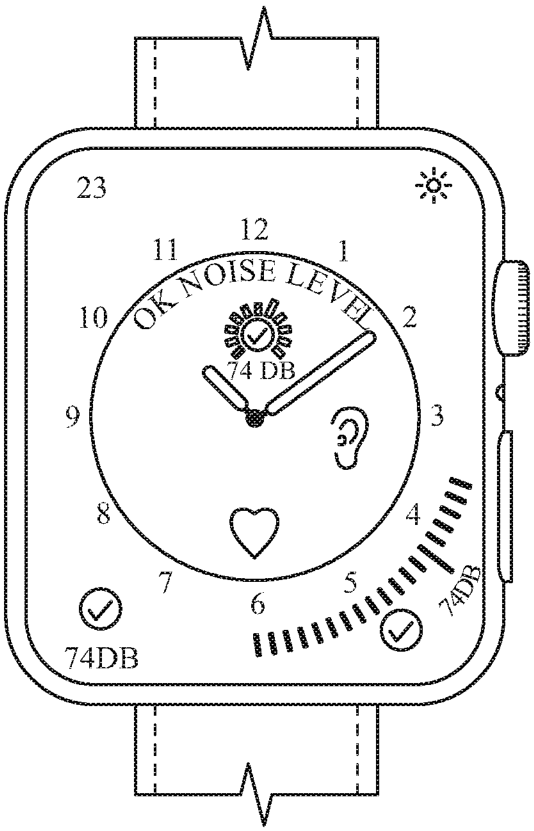
Figure 6V:
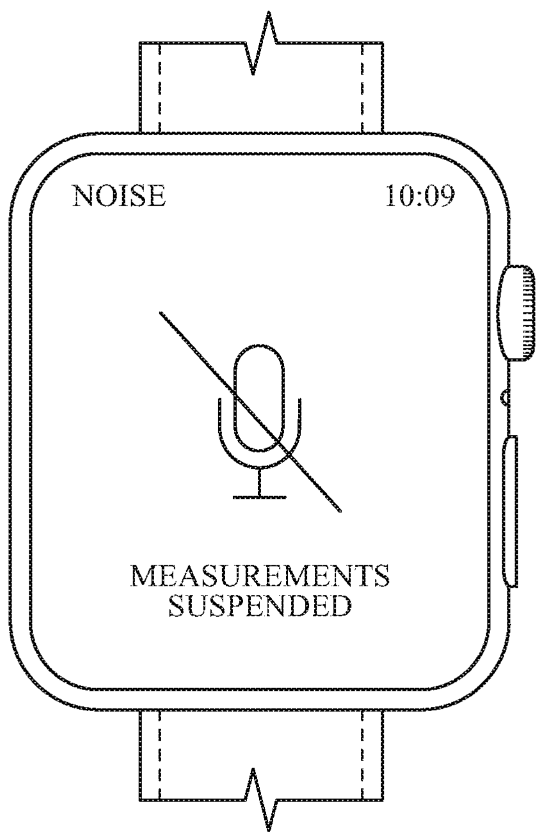
Figure 6W:
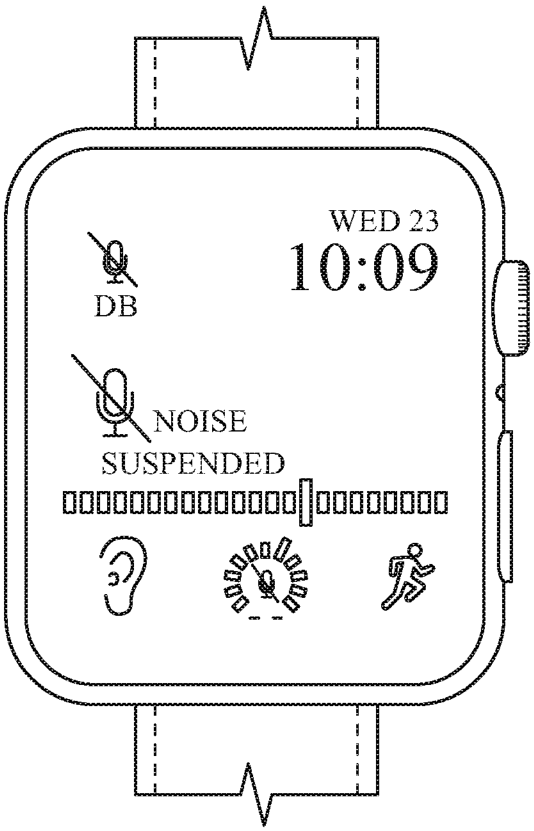
Figure 6X:
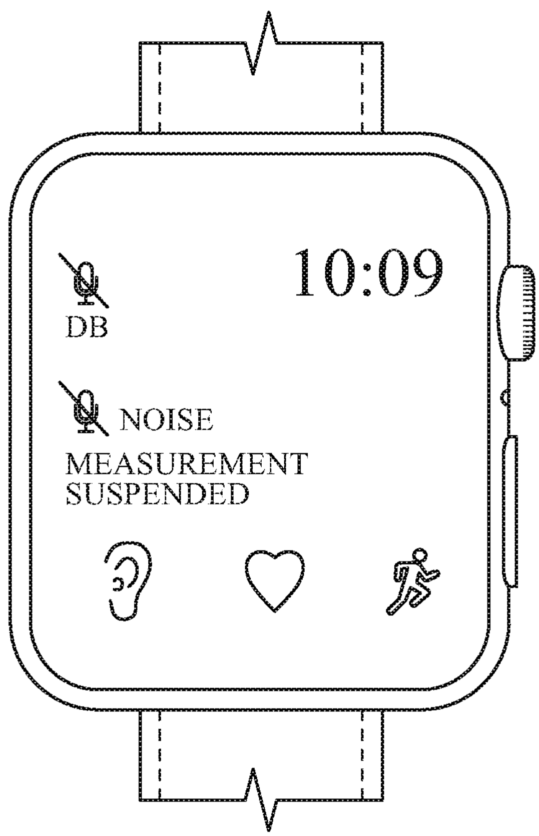
Figure 6Y:
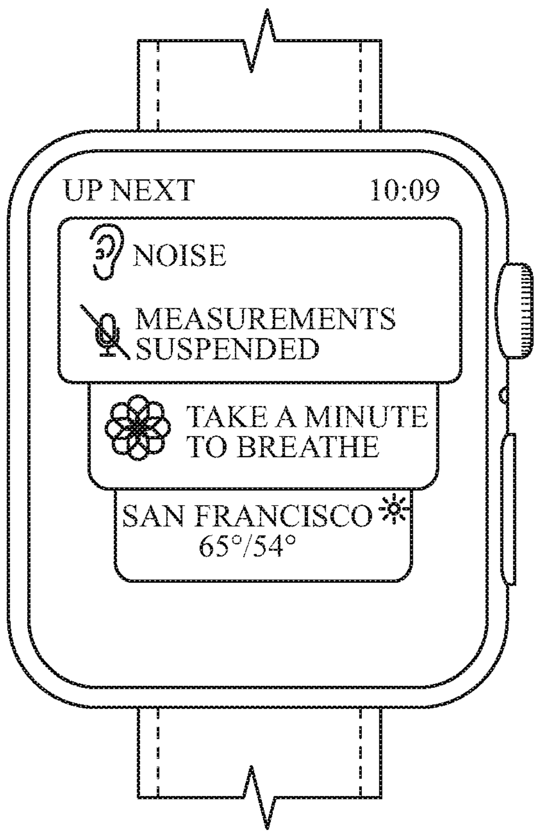

FIG. 6O depicts user interface 608A while device 600 operates in a suspended state (e.g., not currently measuring or detecting noise levels). As depicted in FIG. 6O, while in a suspended state, user interface 608A does not indicate noise level values and noise status affordance 620 and graphic portion 624C appear in an alternative form to indicate the suspending state of device 600. In some embodiments, noise measurements are suspended upon detection of various operating conditions (e.g., water lock mode on, phone call active, speaker in-use, or watch off-wrist conditions (unless the watch has been manually unlocked)). In some embodiments, notification (e.g., display of user interface 608D) may be disabled without suspending noise measurements. In some embodiments, noise measurements are disabled when a noise application feature is disabled (e.g., via device privacy setting or noise app setting).

FIGS. 6P-6U depict device 600 displaying exemplary clock user interfaces including noise application affordances and elements corresponding those described above with respect to FIGS. 6A-6O.

FIGS. 6V-6Y depict device 600 displaying exemplary user interfaces reflecting device 600 in a suspended state.

Figure 6Z:
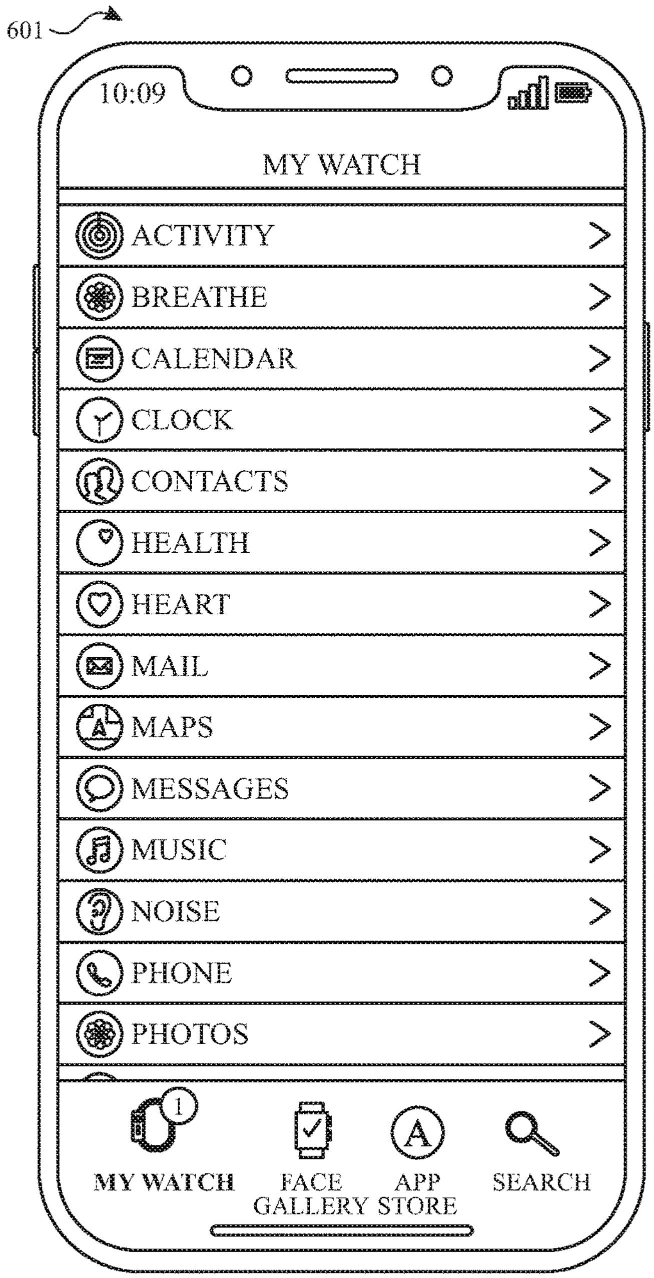
Figure 6A:
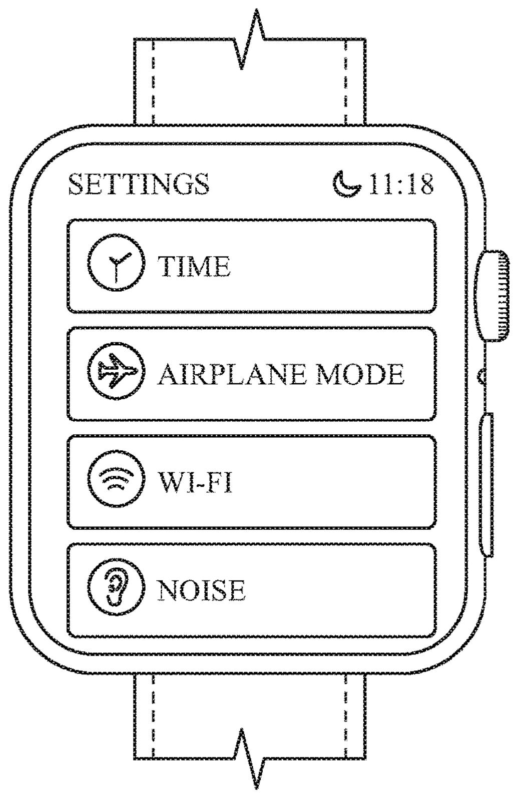
Figure 6A:
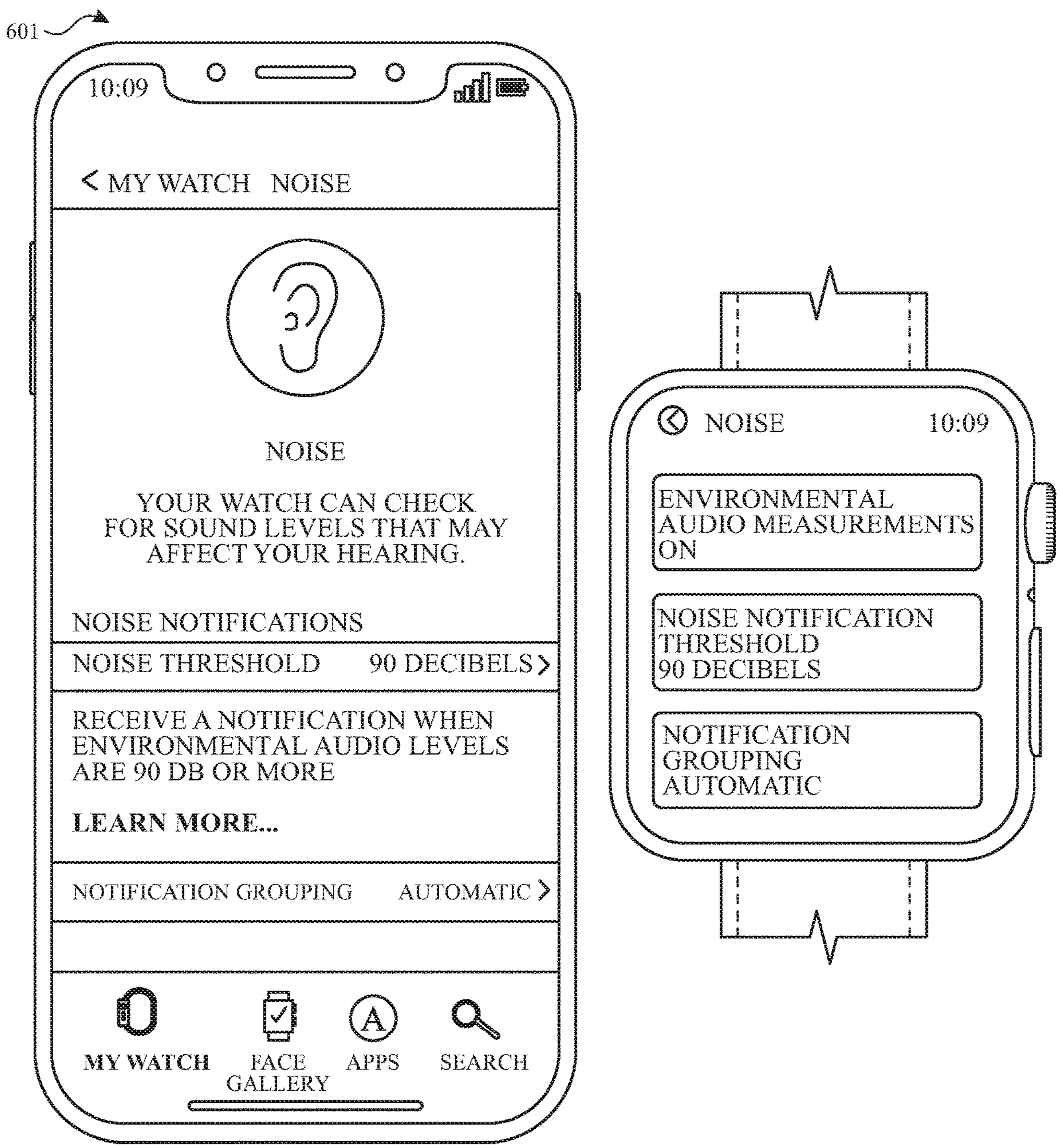
Figure 6A:
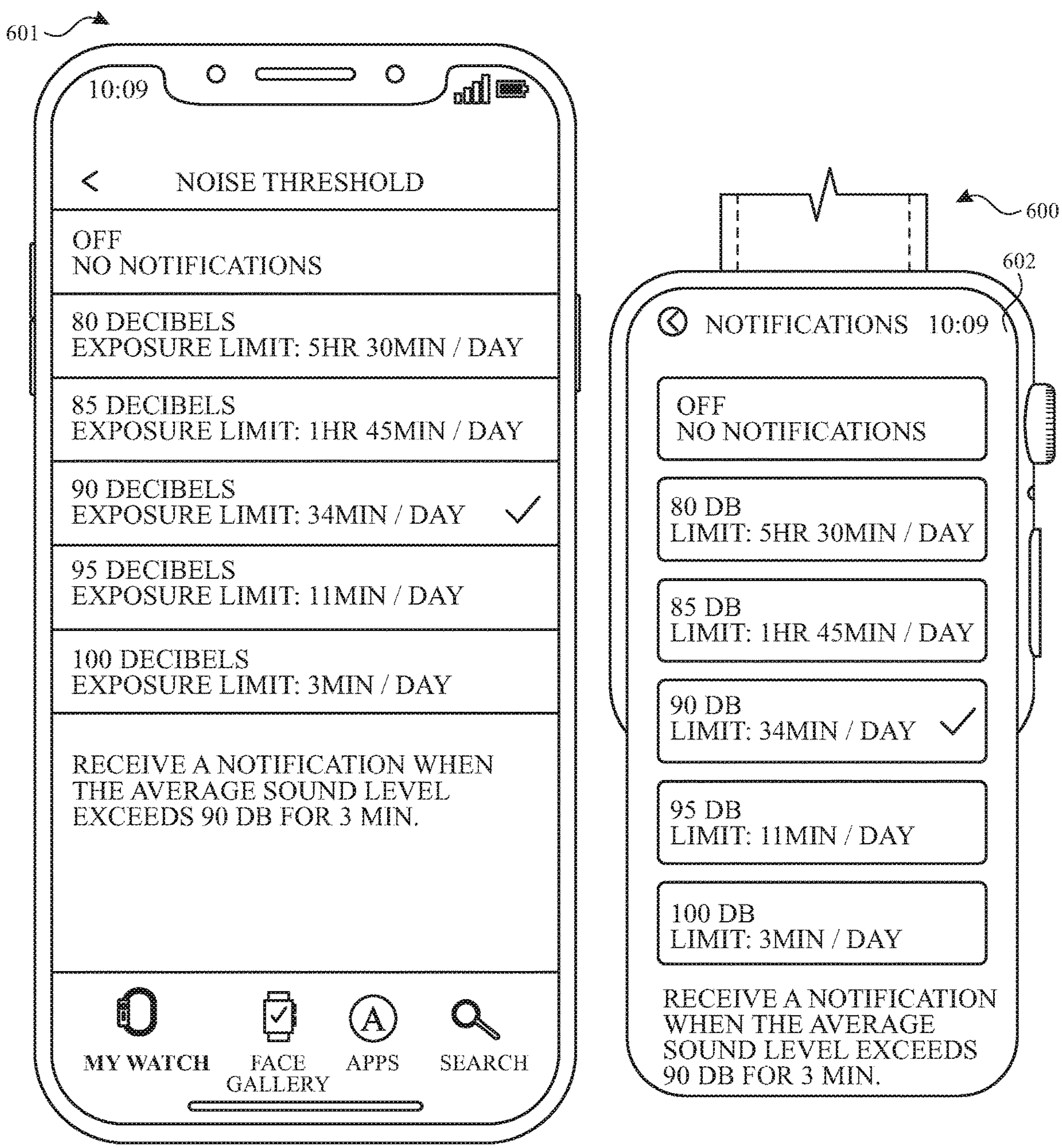
Figure 6A:
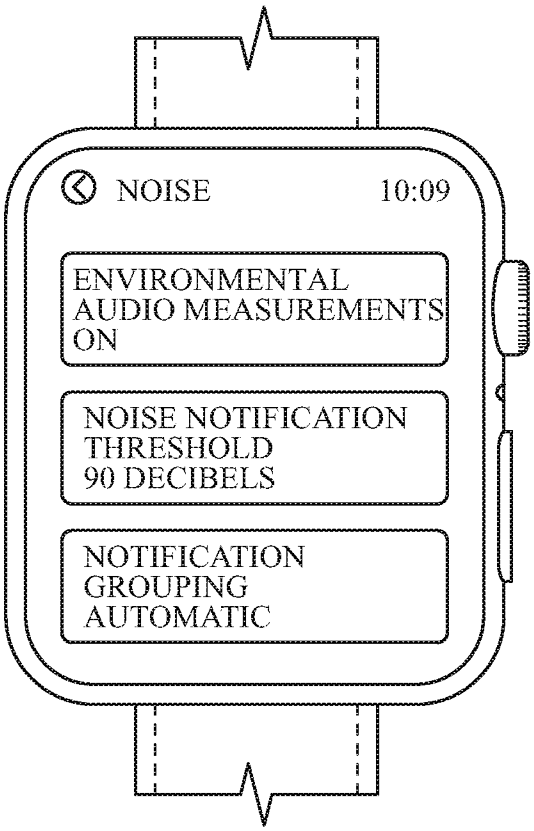
Figure 6A:
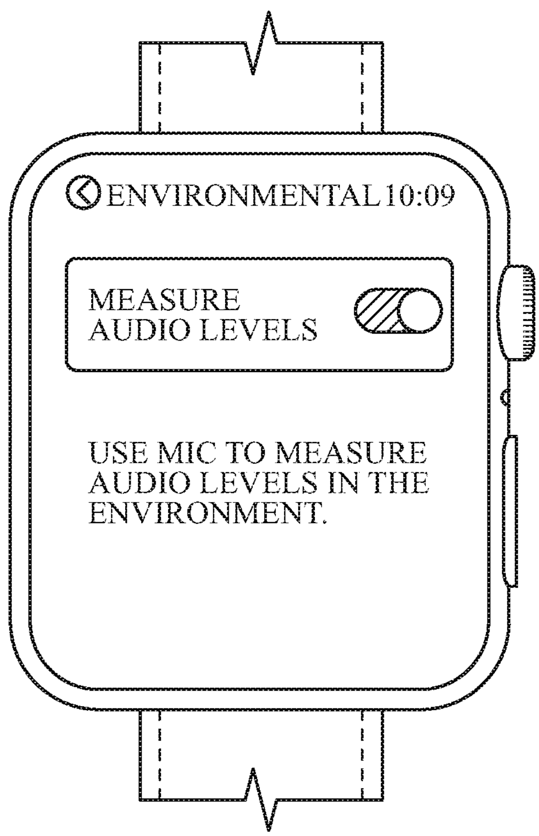
Figure 6A:
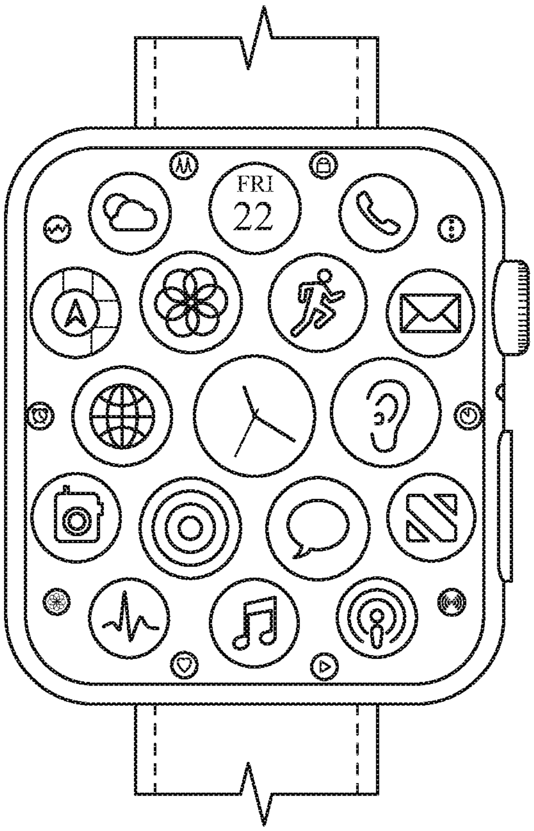
Figure 6A:
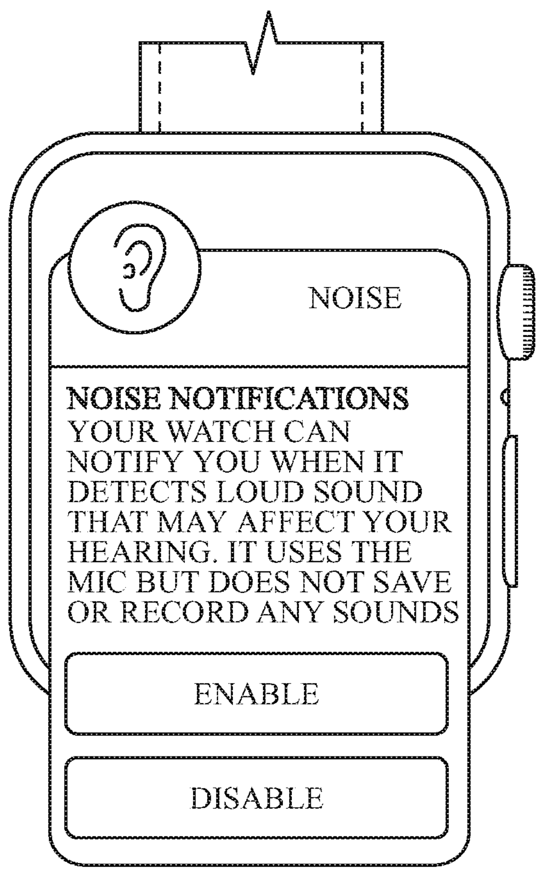
Figure 6A:
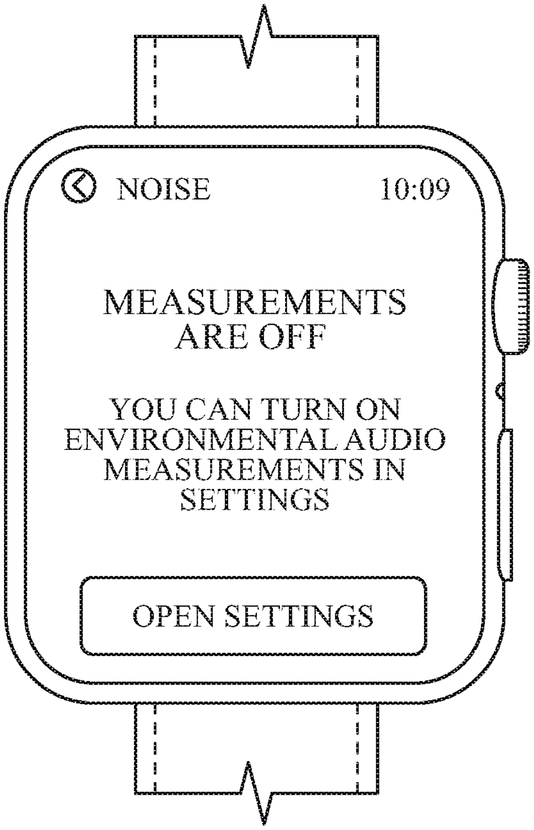
Figure 6A:
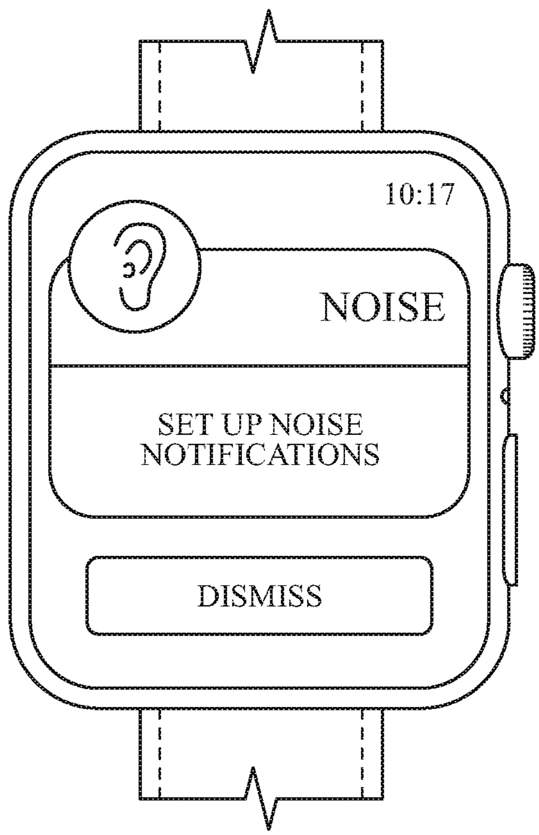
Figure 6A:
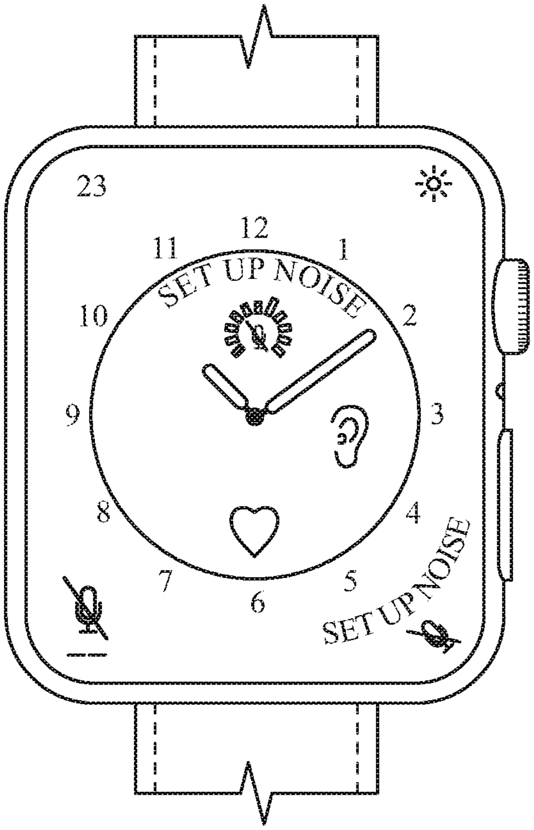
Figure 6A:
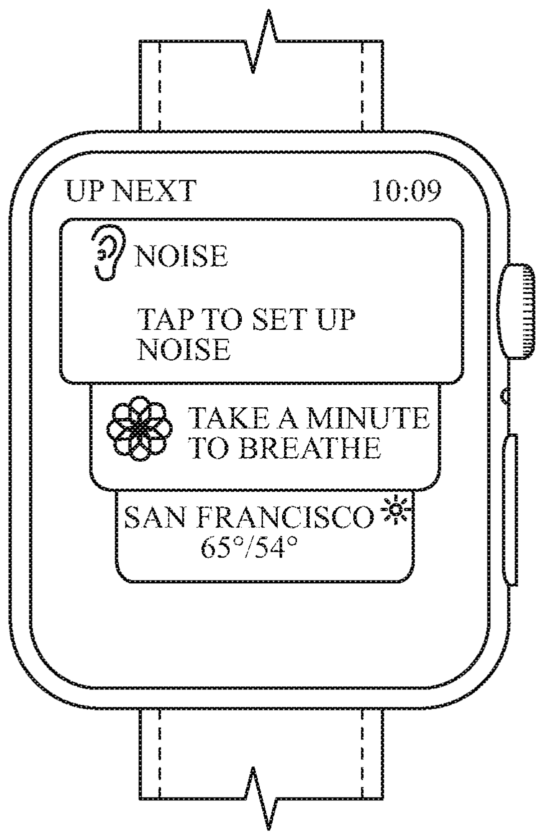
Figure 6A:
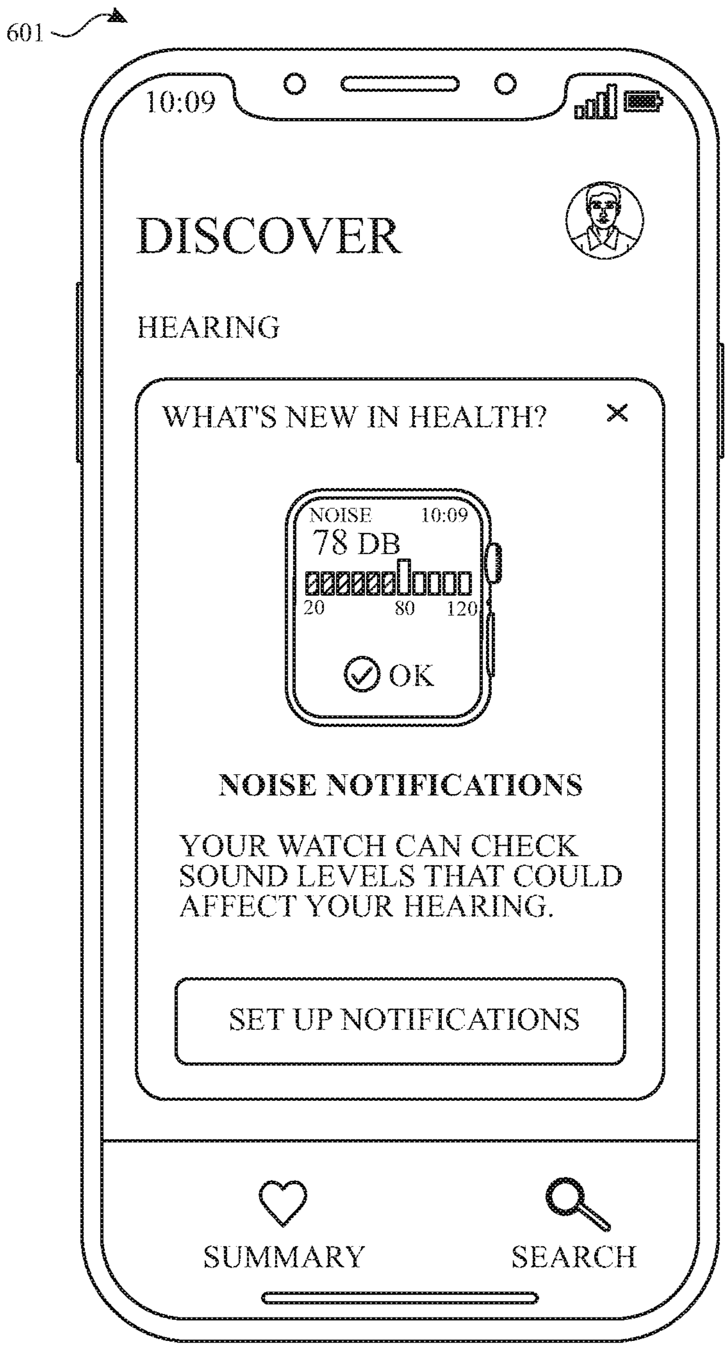

FIGS. 6Z-6AC depict a series user interfaces associated with configuring a noise level threshold (e.g., a noise level threshold corresponding to the thresholds described above with respect to FIGS. 6A-6O), from device 600 or from an external device 601 coupled (e.g., wirelessly) to device 600.

FIGS. 6AD-6AE depict user interfaces for enabling and disabling noise measurement on device 600.

FIGS. 6AF-6AL depict various interfaces for initializing or enabling a noise monitoring application (e.g., as describe above with respect to FIGS. 6A-6O).

Figure 7A:
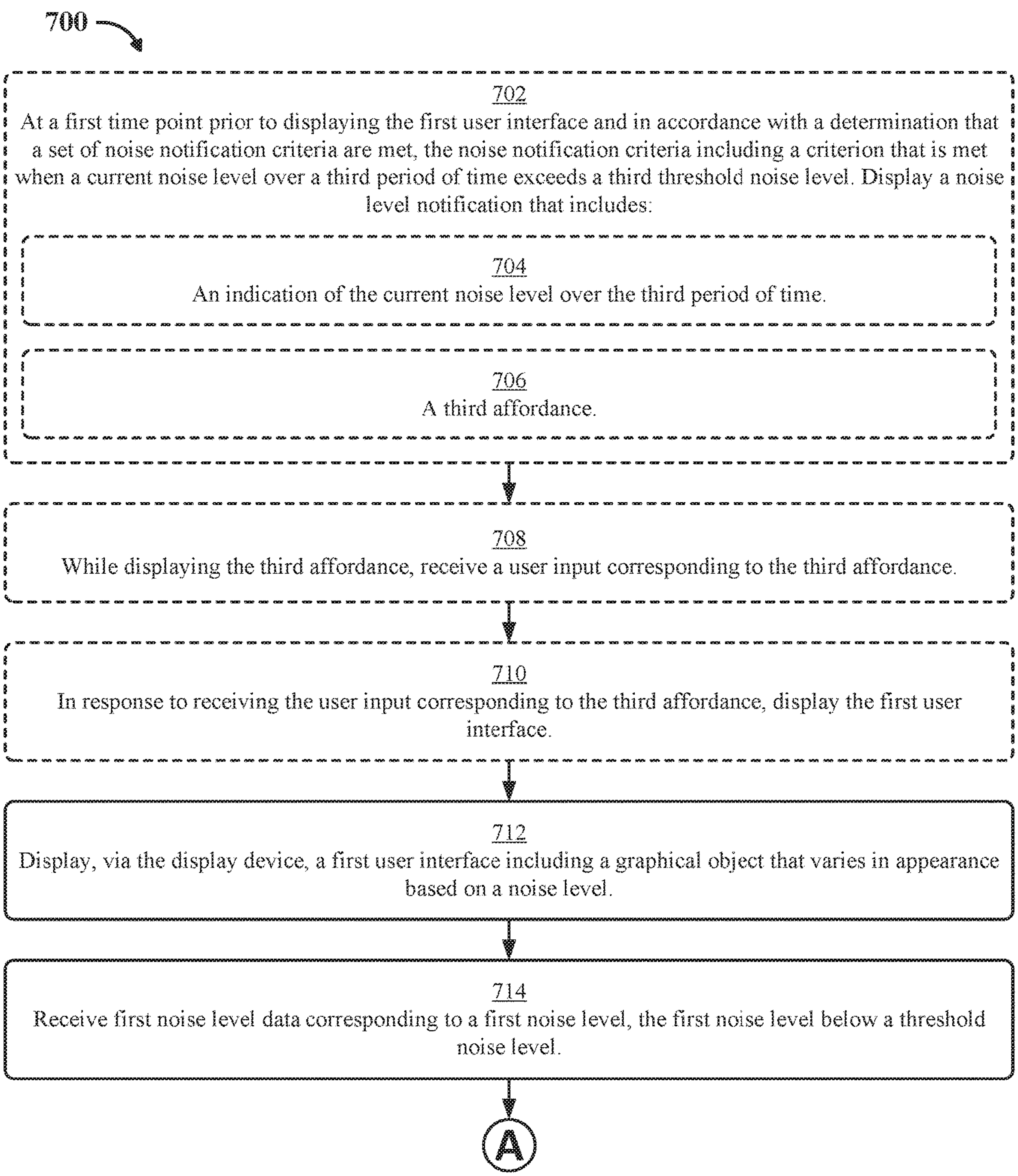
FIGS. 7A-7B are a flow diagram illustrating a method for monitoring noise exposure levels using an electronic device, in accordance with some embodiments.
Figure 7B:
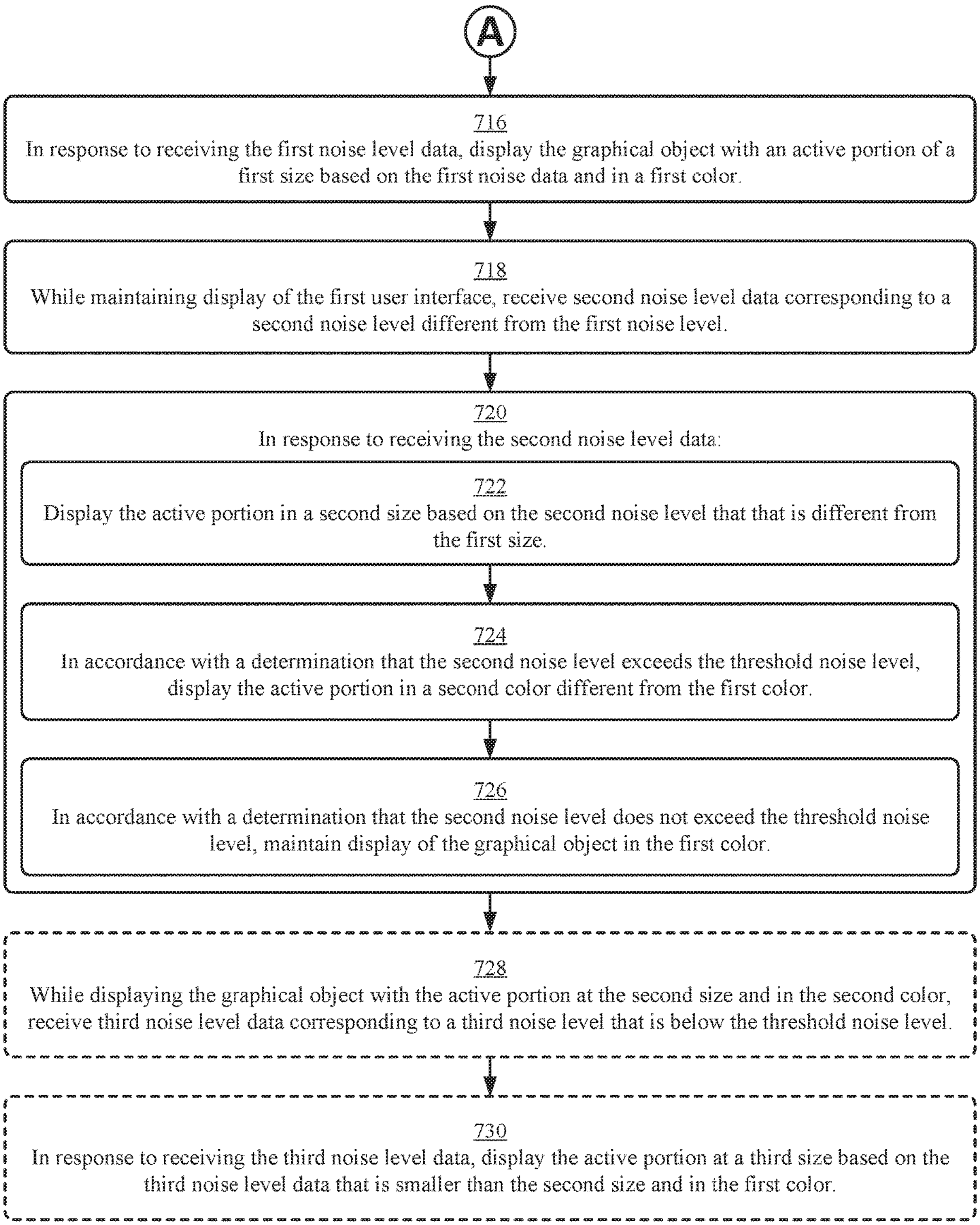

FIGS. 7A-7B are a flow diagram illustrating a method for monitoring noise levels using an electronic device, in accordance with some embodiments. Method 700 is performed at an electronic device (e.g., 100, 300, 500, 600, 601, 800, 900, 1100, 1200, 1400, 1401, and 1700) with a display device (e.g., 602). In some embodiments, the electronic device also includes a set of sensors (e.g., accelerometer, gyroscope, GPS, heart rate sensor, barometric altimeter, microphone, pressure sensor, ambient light sensor, ECG sensor). In some embodiments, the electronic device is a wearable device with an attachment mechanism, such as a band. Some operations in method 700 are, optionally, combined, the orders of some operations are, optionally, changed, and some operations are, optionally, omitted.

In some embodiments, the electronic device (e.g., 100, 300, 500, 600, 601, 800, 900, 1100, 1200, 1400, 1401, and 1700) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 700 provides an intuitive way for monitoring noise exposure levels. The method reduces the cognitive burden on a user seeking to monitor noise levels (e.g., environment noise levels) the user is exposed to and experiencing during a day, thereby creating a more efficient human-machine interface. For battery-operated computing devices, enabling a user to monitor noise exposure levels faster and more efficiently conserves power and increases the time between battery charges.

The electronic device (e.g., 600) displays (712), via the display device, a first user interface (e.g., a clock face user interface or user interface of an application) including a graphical object (e.g., a meter) that varies in appearance based on a noise level. In some embodiments, at a first time point prior to displaying the first user interface (e.g., 608A, 608C) and in accordance with a determination that a set of noise notification criteria are met, the noise notification criteria including a criterion that is met when a current noise level over a third period of time (e.g., an average value of the current noise level over the third period of time) exceeds a third threshold noise level (e.g., 80 dB, 85 dB, 90 dB) (e.g., the average noise level exceeds the threshold for at least 3 minutes), the electronic device displays (702) a noise level notification (608D) that includes: an indication of the current noise level over the third period of time (e.g., text indicating that a current noise level over the third period of time has exceeded the third threshold noise level; text indicating the amount of time that the current noise level has exceeded the third threshold noise level) (704), and a third affordance (e.g., “Open Noise”) (e.g., 644) (706). In some embodiments, the third threshold level is the same as the first or second threshold levels. In some embodiments, the set of noise notification criteria includes a second criterion that is met when the current noise level exceeds the third threshold noise level for at least a third period of time. In some embodiments, while displaying the third affordance (e.g., 644), the electronic device receives (708) a user input corresponding to the third affordance. In some embodiments, in response to receiving the user input corresponding to the third affordance, the electronic device displays (710) the first user interface (e.g., 608C) (e.g., opening the noise app). Displaying (e.g., automatically) the noise level notification in accordance with the determination that the set of noise notification criteria are met provides a user with quick and easy access to information concerning a current noise exposure level. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the set of noise notification criteria are not satisfied when a second noise notification level was displayed within a predetermined time (e.g., 30 minutes) before the first time point (e.g., 10:17 as depicted in FIG. 6I). In some embodiments, subsequent noise level notifications are suppressed for a period of time after issuing a previous noise level notification. Suppressing subsequent noise level notifications for the period of time after issuing the previous noise level notification prevents the electronic device from unnecessarily providing redundant notifications, which in turn enhances the operability of the device and makes the user-device interface more efficient which, additionally, reduces power usage and improves battery life of the device by enabling the user to use the device more quickly and efficiently. In some embodiments, notifications displayed within the predetermined period after the first time point are not suppressed if the noise level averages below the threshold for a fixed period (e.g., 15 minutes) after the first time point.

In some embodiments, the noise level notification (e.g., 608D) further includes a fourth affordance (e.g., 646) associated with a second predetermined period and the electronic device receives an input corresponding to the fourth affordance and in response to receiving the input corresponding to the fourth affordance, the electronic device forgoes display of (e.g., suppressing display of) further instances of noise level notifications for the second predetermined time period (e.g., 1 hour, ½ hour, reminder of the day). Providing the fourth affordance in the noise level notification that enables a user to cause the electronic device to forgo displaying further instances of noise level notifications enables the user to quickly and easily suppress further noise level notifications on the electronic device. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The electronic device receives (714) first noise level data (e.g., noise level data corresponding to the noise level over a first period of time; an average value over the first period of time or multiple data points representing the noise level over the first period of time) (e.g., noise level “34 DB” of FIG. 6C) corresponding to a first noise level (e.g. data from a sensor of the electronic device; data from an external electronic device), the first noise level below a threshold noise level (e.g., 80 dB). In some embodiments, the first noise level data over the first period of time represents an instantaneous noise level.

In response to receiving the first noise level data, the electronic device displays (716) the graphical object (e.g., 622, 638) with an active portion (e.g., emphasized or visually distinct portion based on appearance) (e.g., 622A, 638A) of a first size (e.g., a number of segments, a length, or an area relative to the object’s overall size that is proportional to the noise level) based on the first noise data and in a first color (e.g., green). In some embodiments, the active portion extends from the left-most edge of the graphical object to a location between the left-most edge and right-most edge of the graphical object. In some embodiments, the graphical object includes an indication of the first noise level data other than a size of the active portion (e.g., a numeric value, a position of a point or a line along the axis of a graph). Displaying the graphical object with the active portion of the first size based on the first noise data and in the first color provides a user with easily recognizable and understandable noise exposure level information. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While maintaining display of the first user interface, the electronic device receives (718) second noise level data corresponding to a second noise level different from the first noise level (e.g., the second is either lower or higher than the first) (e.g., noise level "113 DB" of FIG. 6E).

In response to receiving the second noise level data (720), the electronic device displays (722) the active portion in a second size based on the second noise level that that is different from the first size (e.g., the active portion grows or shrinks corresponding the difference between the first noise level and the second noise level) (e.g., 638A in FIG. 6D). Displaying the active portion in the second size based on the second noise level in response to receiving the second noise level data enables a user to quickly and easily visually differentiate between noise exposure level information corresponding to the first noise level data and the second noise level data. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to receiving the second noise level data (720), in accordance with a determination that the second noise level exceeds the threshold noise level (e.g., the noise level has increased beyond the 80 dB threshold), the electronic device displays (724) the active portion (e.g., 638A in FIG. 6D) in a second color different from the first color (e.g., change from green to yellow). Displaying the active potion in the second color different from the first color in accordance with the determination that the second noise level exceeds the threshold noise level provides visual feedback to the user that the noise exposure level has exceeded a certain threshold. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to receiving the second noise level data (720), in accordance with a determination that the second noise level does not exceed the threshold noise level (e.g., the noise level remains below the 80 dB threshold), the electronic device maintains (726) display of the graphical object in the first color (e.g., maintain as green).

In some embodiments, while displaying the graphical object with the active portion at the second size and in the second color (e.g., yellow), the electronic device receives (728) third noise level data corresponding to a third noise level that is below the threshold noise level (e.g., the noise level has decreased to below the 80 dB threshold). In some embodiments, in response to receiving the third noise level data, the electronic device displays (730) the active portion at a third size based on the third noise level data that is smaller than the second size and in the first color (e.g., the active portion shrinks corresponding the difference between the second noise level and the third noise level and changes from yellow to green) (e.g., 638A in FIG. 6F). Displaying the active portion at the third second size based on the third noise level in response to receiving the third noise level data enables a user to quickly and easily visually differentiate between noise exposure level information corresponding to the third noise level data from that corresponding to the first noise level data and the second noise level data. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the graphical object varies based on noise level over a first period of time (e.g., an average of noise level over a 0.1-second window) and the first user interface further includes a second graphical object (e.g., a text indication; a graphical indication) (e.g., 620, 624, 636, 640) that varies in appearance based on the noise level over a second period of time that is different from the first period of time (e.g., averaged over a 1-second window).

In some embodiments, displaying the first user interface includes displaying a first affordance that, when selected, displays a second user interface (e.g., an interface with information about the threshold noise level) (e.g., 640) in accordance with a determination that a current noise level (e.g., based on noise data for the first period of time or noise data for the second period of time) is below a second threshold noise level (e.g., a user-selected threshold). In some embodiments, the first affordance includes "OK" or a graphical element (e.g., a checkmark) when the noise level is below the threshold (e.g., 640 in FIGS. 6C, 6D, 6G; 620 in FIGS. 6L-6M). In some embodiments, the first threshold and the second threshold are the same.

In some embodiments, displaying the first user interface includes displaying a second affordance (e.g., without displaying the first affordance), different from the first affordance, that, when selected, displays a third user interface (e.g., the same as the second user interface; different than the first user interface and with information about the threshold noise level) in accordance with a determination that a current noise level is above the second threshold noise level. In some embodiments, the first affordance includes "LOUD" or a graphical element (e.g., an exclamation point) when the noise level is at or above the threshold.

In some embodiments, the electronic device includes one or more noise sensors (e.g., one or more pressure sensing devices such as a microphone or microphone array) (e.g., 606), and the first noise level data and the second noise level data are received from the one or more noise sensors. In some embodiments, the display device and the one or more noise sensors are located within a common housing or body of the electronic device and the first noise level data and the second noise level data represent the noise level of the physical environment where the electronic device is located.

In some embodiments, the first noise level data and the second noise level data are received from a second electronic device that is different from the first electronic device (e.g., noise level data is received at the electronic device displaying the UI from a device external to the electronic device displaying the UI).

In some embodiments, while the first user interface is displayed (e.g., 608A, 608C), the electronic device samples noise level data at a first sampling rate (e.g., receiving new noise level data at a first rate). In some embodiments, while the first user interface is not displayed (e.g., 608B, 608D, and as generally depicted by FIGS. 6H, 6P-6S, 6AA-6AI), the electronic device samples noise level data at a second sampling rate different from the first sampling rate. In some embodiments, the first noise level data and the second noise level data are spaced apart by a first time interval. While the first user interface is not displayed, noise level data is received at a second time interval that is longer than the first time interval. In some embodiments, the second sampling rate is 20% of the first sampling rate. By automatically sampling the noise level data at the second sampling rate different from the first sampling rate when the first user interface is not displayed as opposed to when the first user interface is displayed, the electronic device reduces power usage and thus improves battery life of the device.

Note that details of the processes described above with respect to method 700 (e.g., FIGS. 7A-7B) are also applicable in an analogous manner to the methods described below. For example, method 1000 optionally includes one or more of the characteristics of the various methods described above with reference to method 700. For example, information concerning noise exposure levels corresponding to one or more of the output devices described in method 1000 can be represented or provided to a user using the graphical indication (e.g., a graphical object) described above that varies in appearance based on the noise exposure level. For brevity, these details are not repeated below.

FIGS. 8A-8L depict device 800 displaying user interfaces (e.g., user interfaces 808A-808F) on display 802 for accessing and displaying environmental noise exposure data (e.g., sets of data representing a device user's exposure to noise at various sound intensities). In some embodiments, environmental noise exposure data is received at device 800 from a sensor of device 800 or from an external device (e.g., device 600 as described above). In some embodiments, environmental noise exposure data is inputted manually by a device user (e.g., via series of user inputs detected by device 800).

Figure 8A:
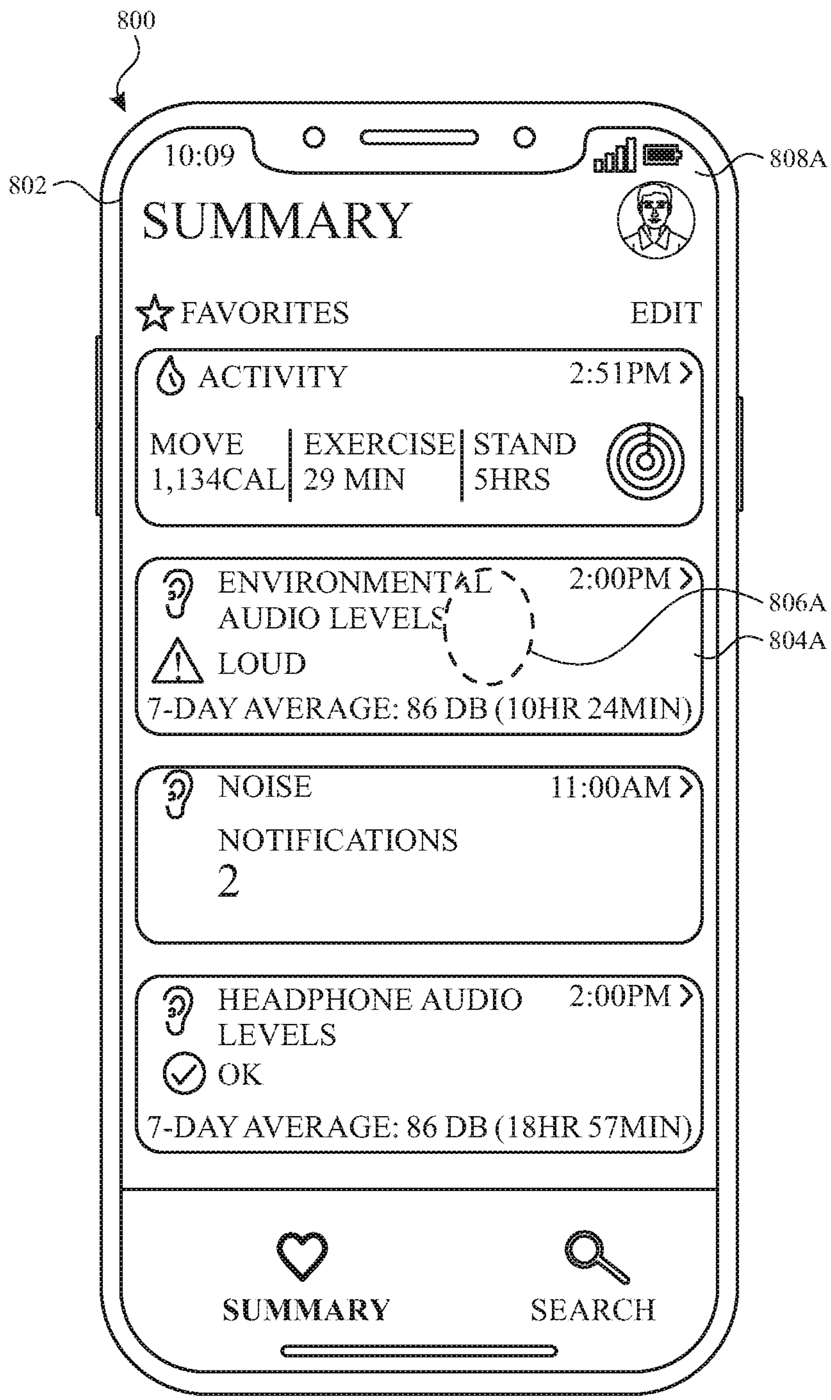
FIGS. 8A-8L illustrate user interfaces for monitoring noise exposure levels in accordance with some embodiments.
Figure 8B:
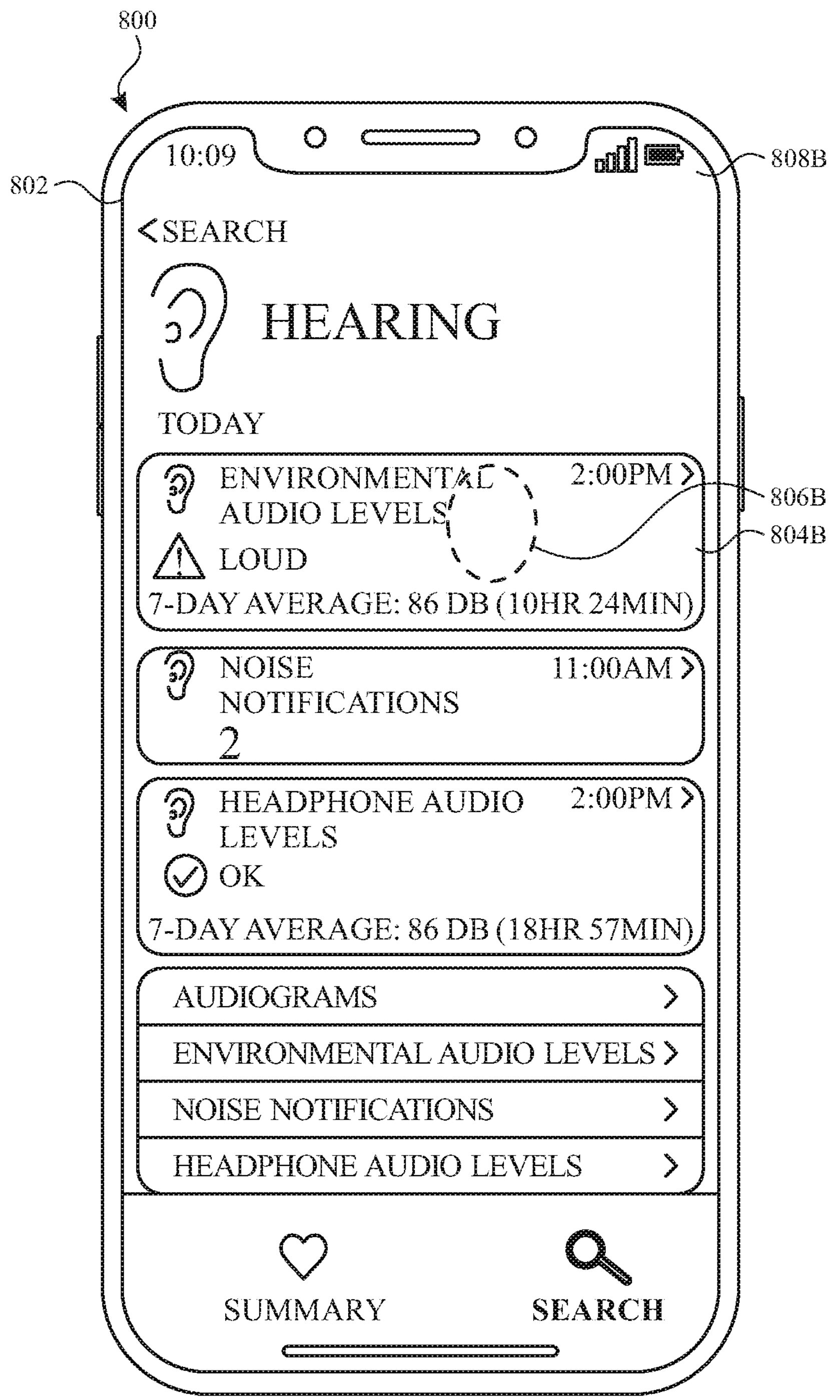

FIGS. 8A and 8B illustrate user interfaces within a health application for accessing environmental noise data. FIGS. 8A and 8B depict device 800 receiving inputs (e.g., 806A and 806B) at environmental audio levels affordance 804A and 804B, respectively. Upon detecting these inputs, device 800 displays data viewing interface 808C as depicted in FIG. 8C.

FIGS. 8C-8I depict various techniques for displaying and manipulating stored environmental noise data via user interface 808C. As depicted in FIGS. 8C-8I user interface 808C includes chart 805 displaying environmental noise exposure data (e.g., amplitudes or levels of noise a user associated with device 800 has been exposed to) over a selectable period (e.g., day, week, month, year).

Figure 8C:
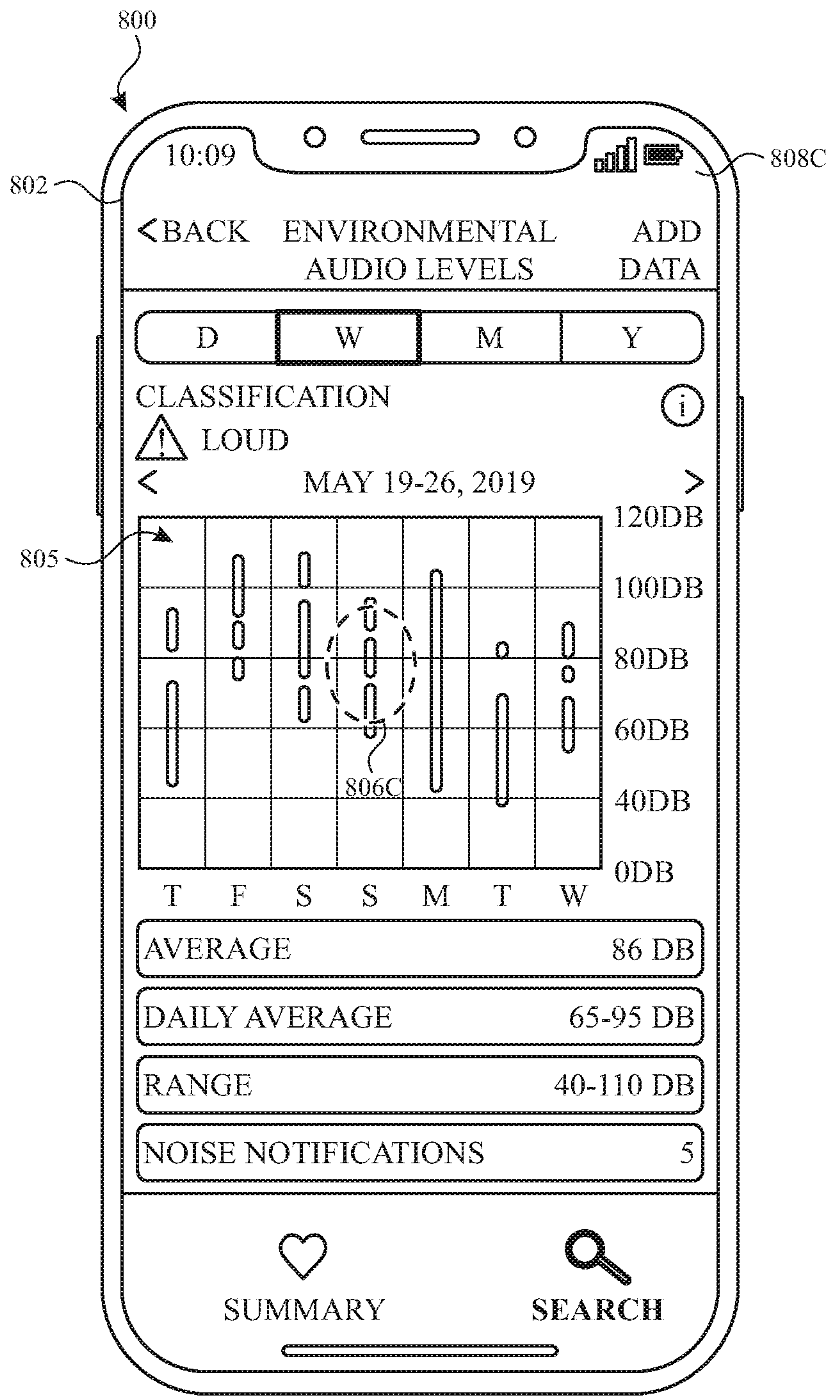
Figure 8D:
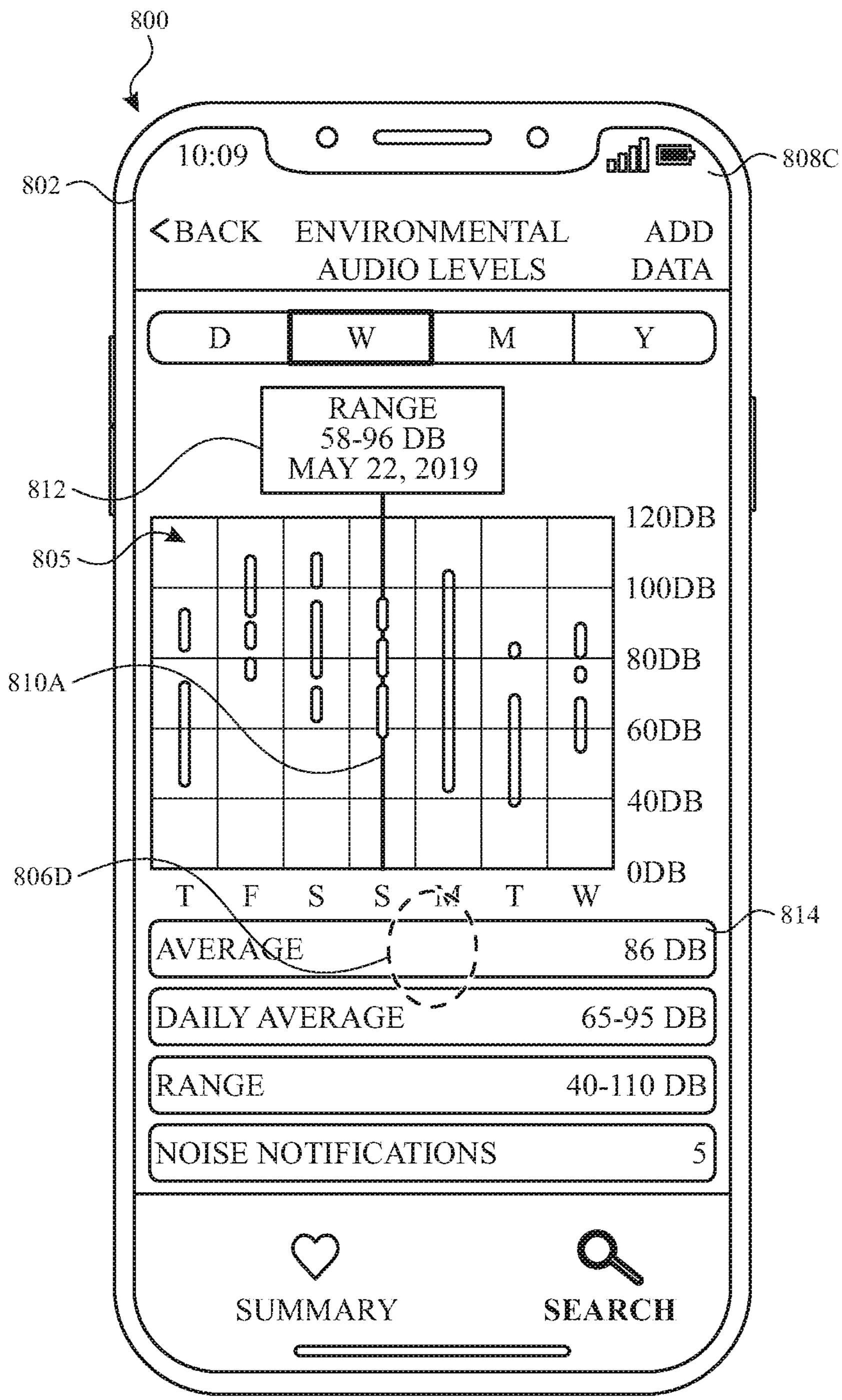

As depicted in FIGS. 8C-8D, environmental noise exposure data associated with a specific period (e.g., day of a week) on chart 805 is selected (e.g., via user input 806C). In response to selection, user interface 808C displays additional information about the selected environmental noise exposure data (e.g., details affordance 812). In response to selection, device also displays data overlay 810 at a location on chart 805 corresponding to the selected environmental noise exposure data in order to provide a visual indication of the data corresponding to the information displayed by details affordance 812.

Figure 8E:
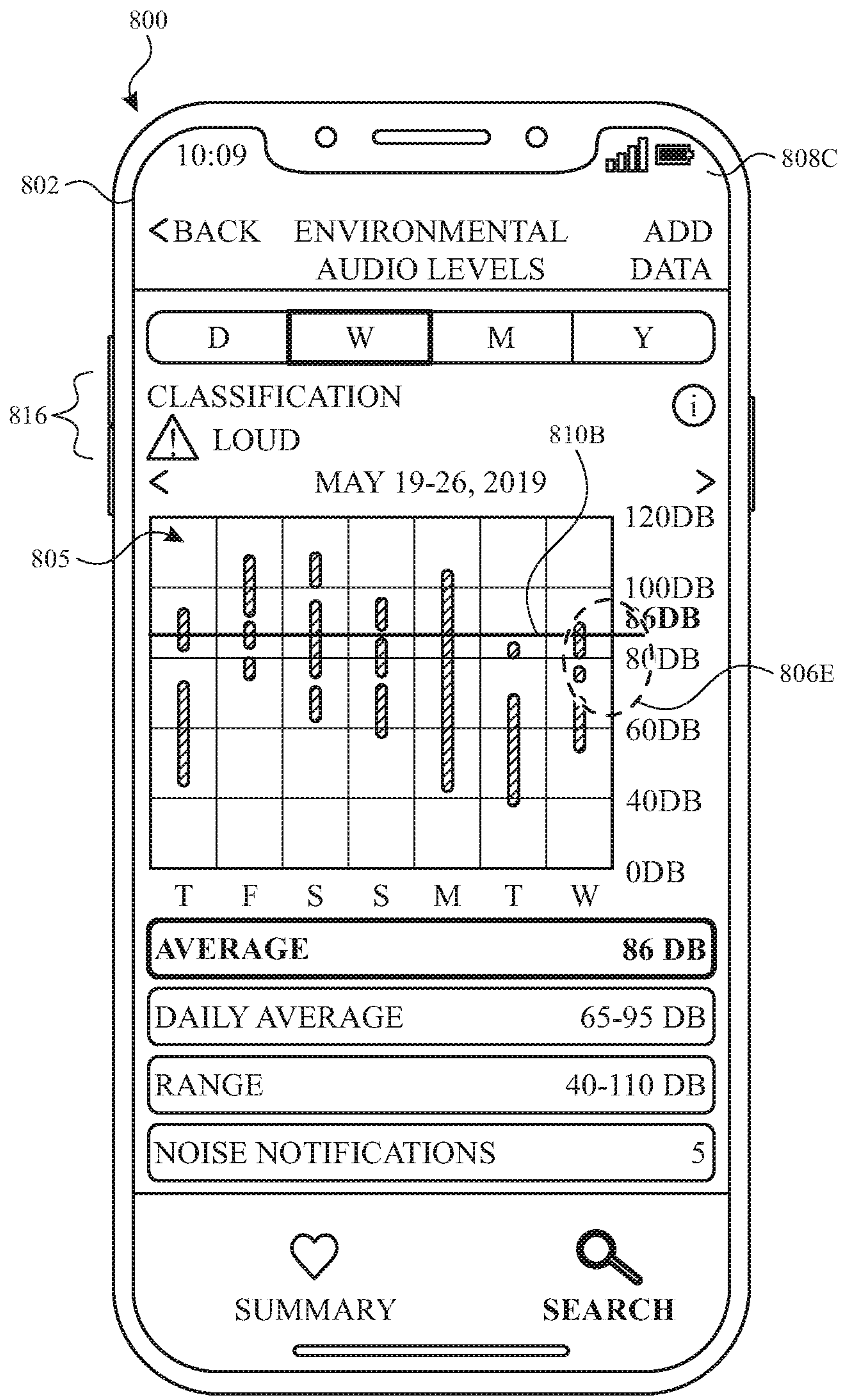
Figure 8F:
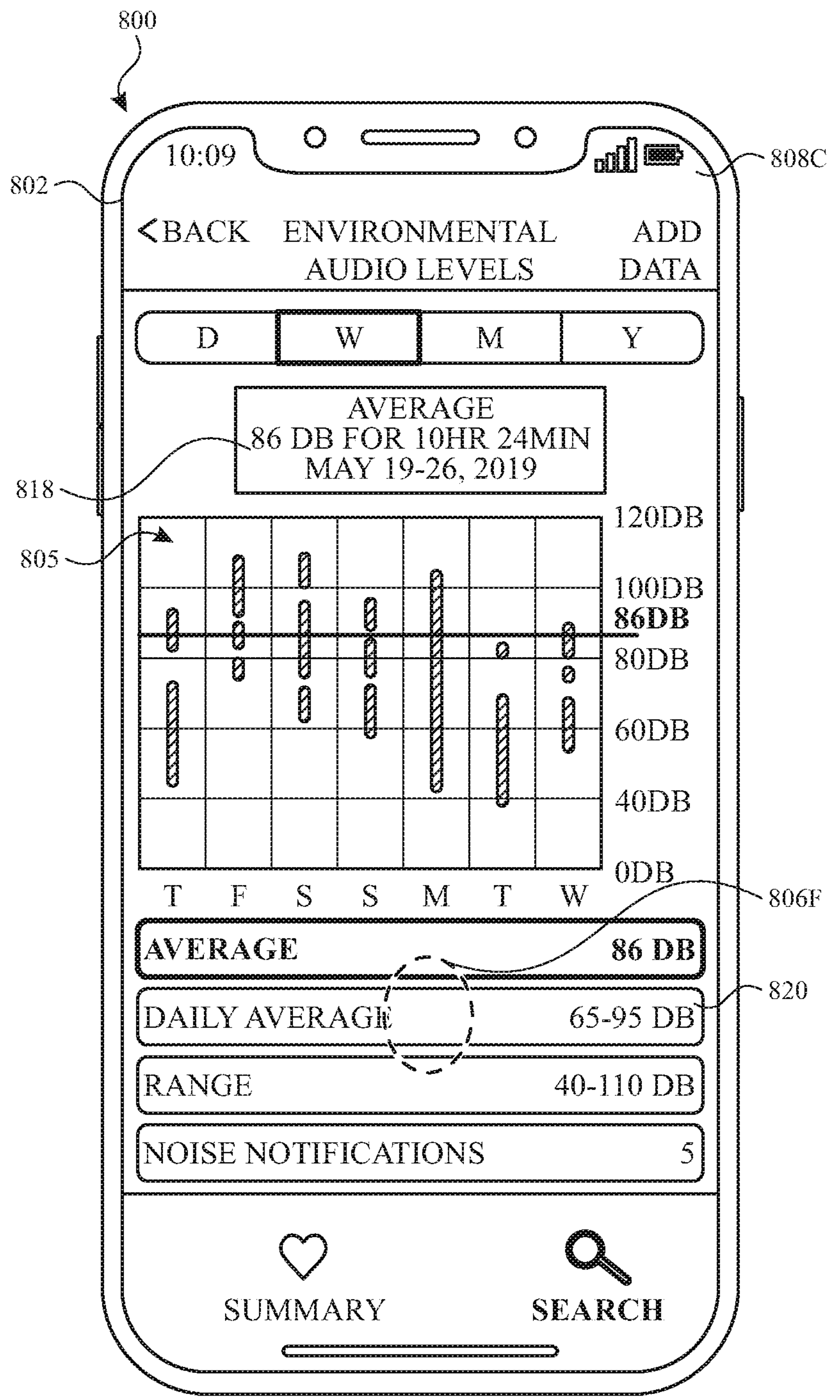
Figure 8G:
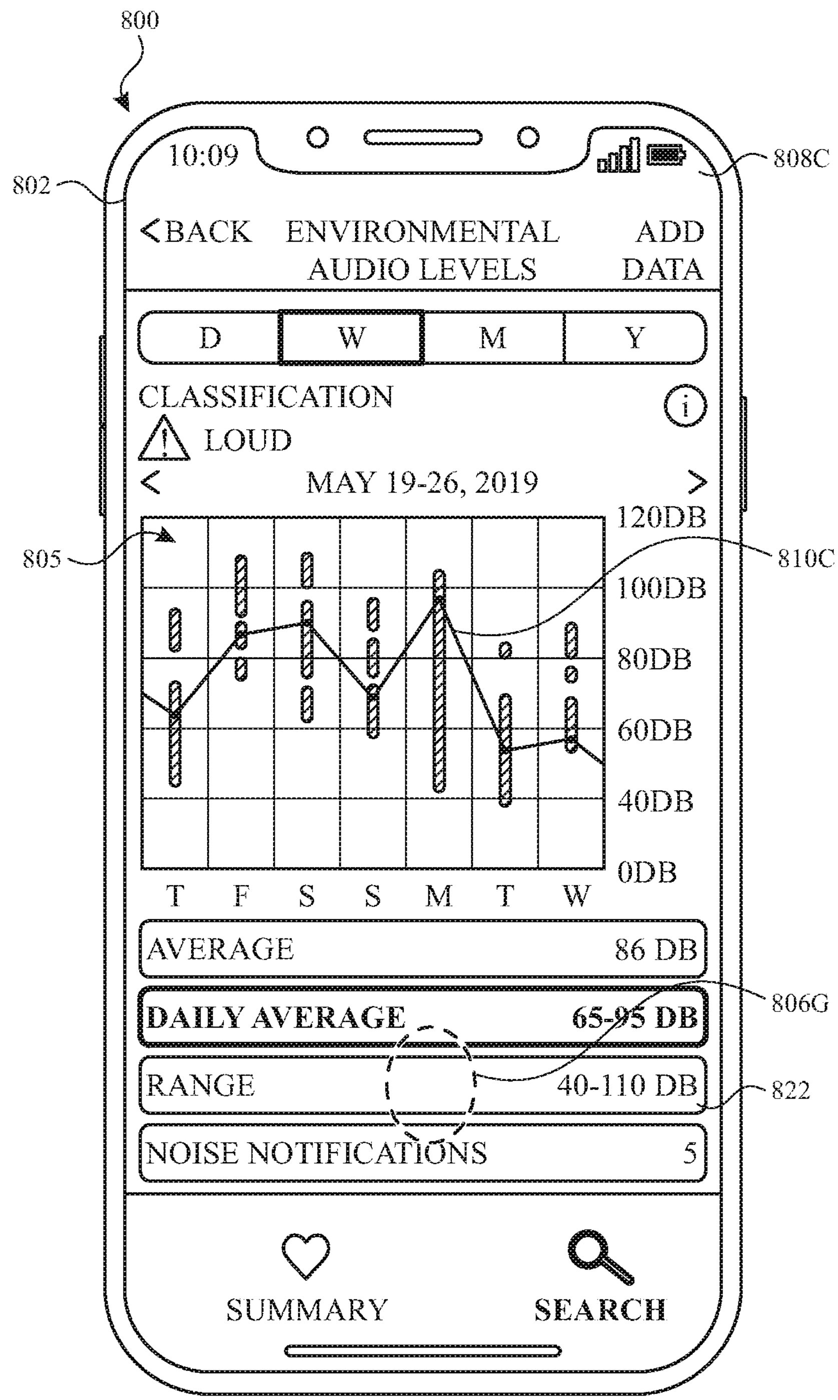

As depicted in FIGS. 8C-8I, user interface 808C includes various affordances for manipulating data displayed by chart 805 (e.g. average affordance 814, daily average affordance 820, range affordance 822, notification affordance 826). A depicted by FIGS. 8D-8E, in response to receiving user input 806D at average affordance 814, device 800 displays average overlay 810B (e.g., a visual reference to an average environmental noise exposure level calculated over the displayed period). As depicted by FIGS. 8E-8F, device 800 displays average details affordance 818 in respond to detecting selection (e.g., user input 806E) of average overlay 810B. As depicted by FIGS. 8F-8G, device 800 displays average details affordance 818 in respond to detecting selection (e.g., user input 806E) of average overlay 810B. A depicted by FIGS. 8F-8G, in response to receiving user input 806F at daily average affordance 820, device 800 displays daily average overlay 810C (e.g., a visual reference to the average environmental noise exposure levels as calculated on a daily basis). In some embodiments, device 800 displays noise classification affordance 816 (as depicted in FIG. 8E) in response to a determination that the average noise exposure level (e.g as indicated by average overlay 810B) is above a threshold level (e.g., 80 DB). In some embodiments, in response to a determination that the average noise exposure level (e.g., as indicated by average overlay 810B) is below a threshold level (e.g., 80 DB), device displays noise classification affordance 816 with a different appearance (e.g., the affordance behaves similar to noise status affordance 620 or noise status indicator 640 as describe above with respect to FIGS. 6A-6O).

Figure 8H:
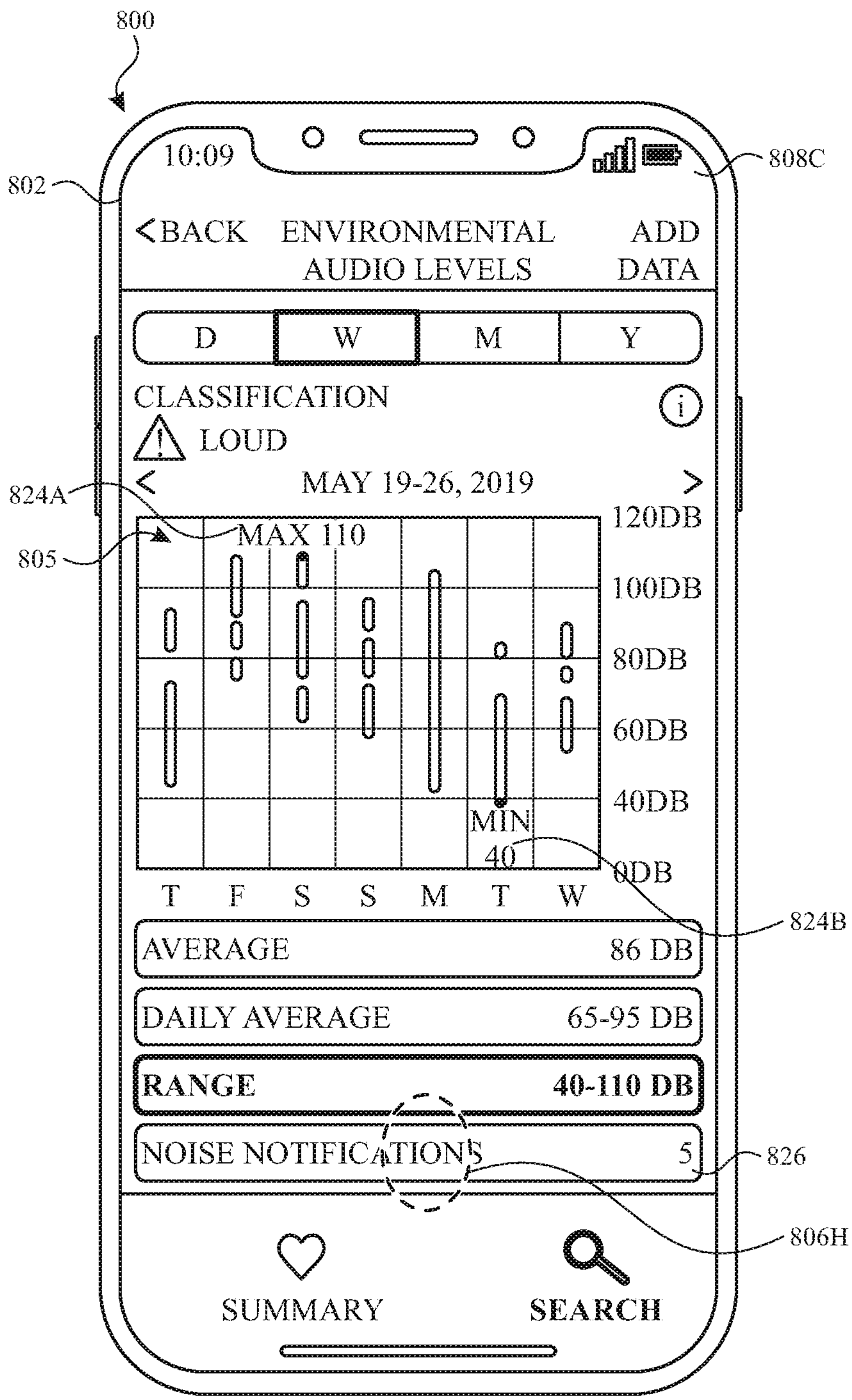
Figure 8I:
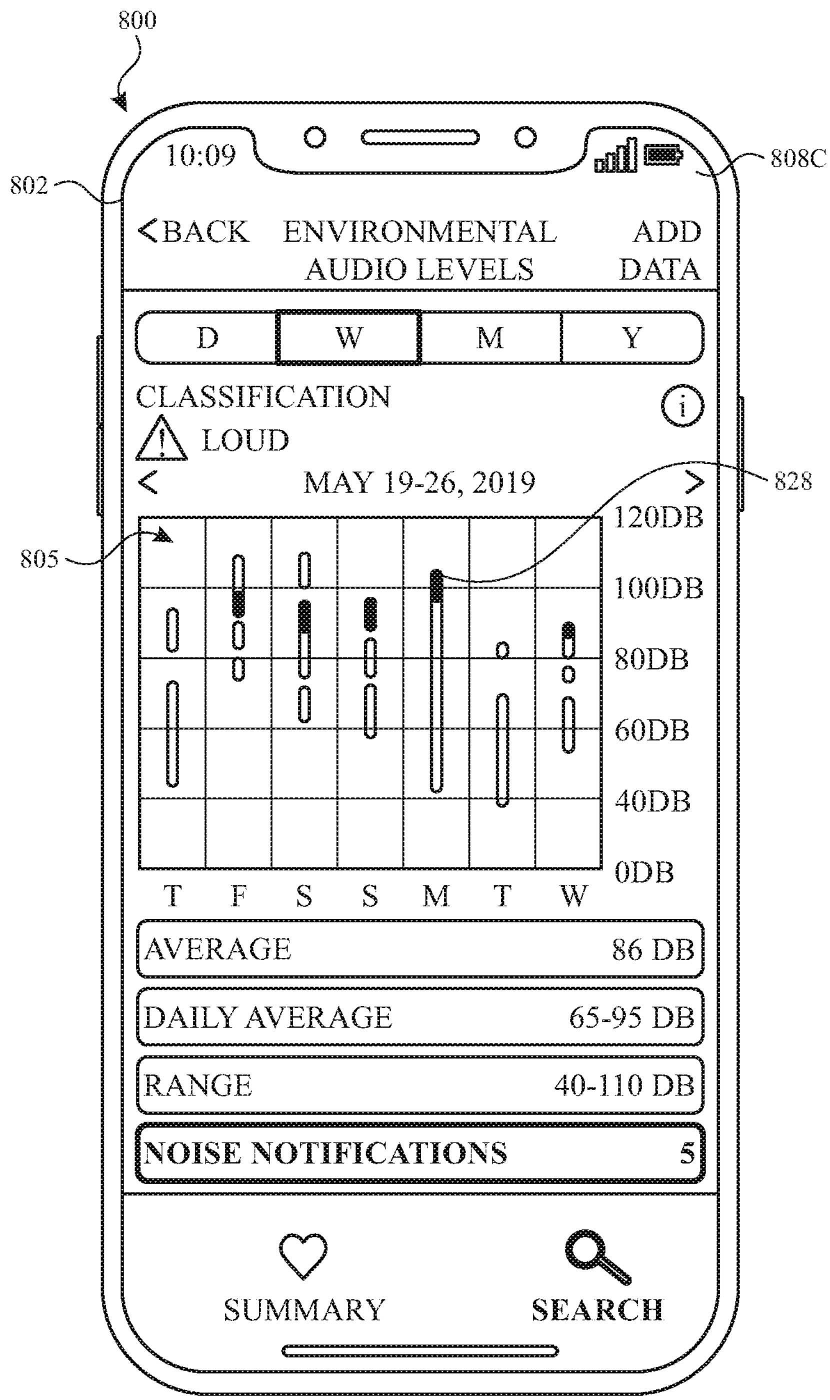

A depicted by FIGS. 8G-8H, in response to receiving user input 806G at range affordance 822, device 800 displays maximum level indicator 824A and minimum level indicator 824B (e.g., a visual references to the highest and lowest noise exposure levels within the displayed environmental noise level data on chart 805).

A depicted by FIGS. 8H-8G, in response to receiving user input 806H at notifications affordance 826, device 800 updates the environmental noise level data displayed in chart 805 by visually emphasizing (e.g., by varying one or more visual characteristics) of environmental noise exposure levels which caused device 800 (or a device coupled to device 800 such as device 600), to display a noise notification interface (e.g., noise notification user interface 608D of FIG. 6I).

Figure 8J:
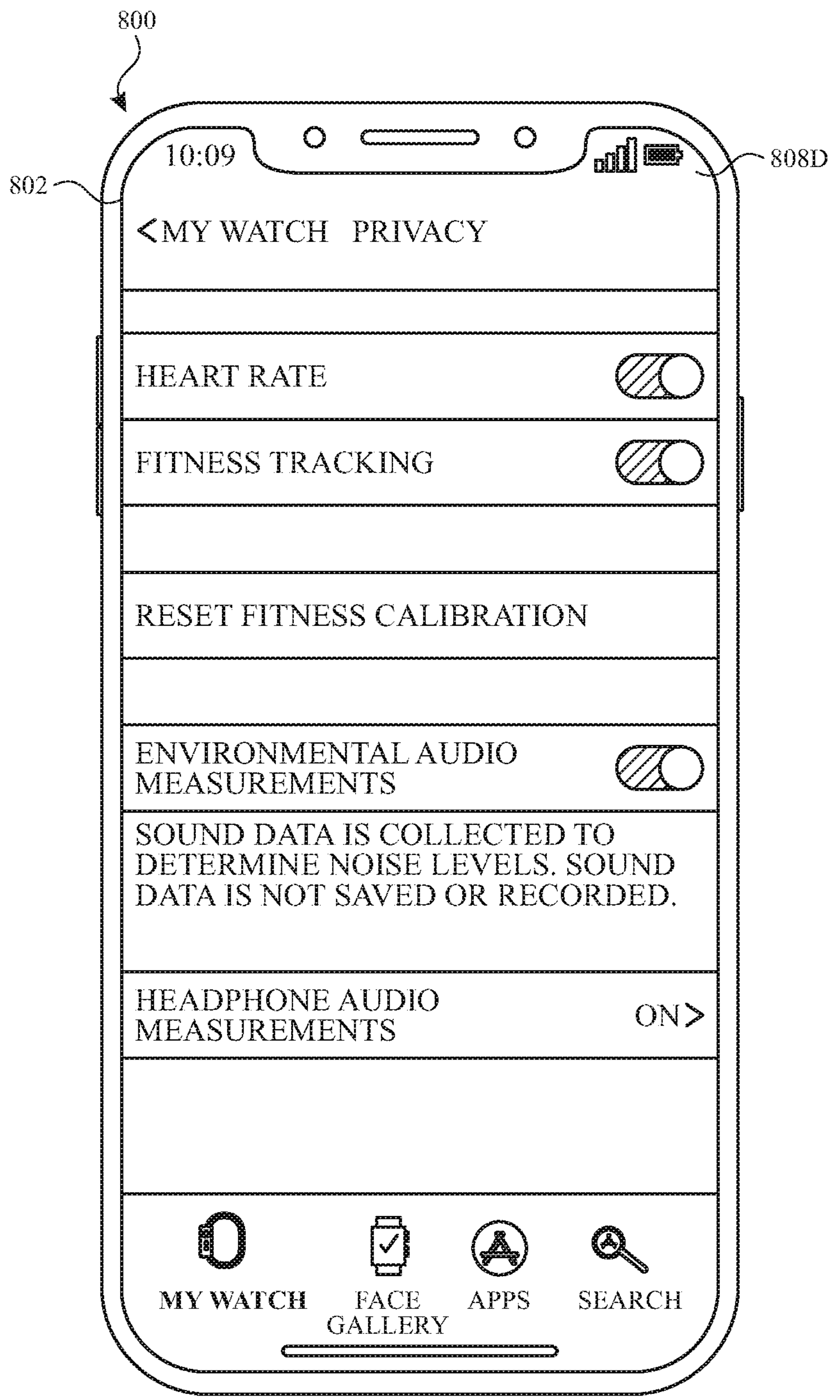
Figure 8K:
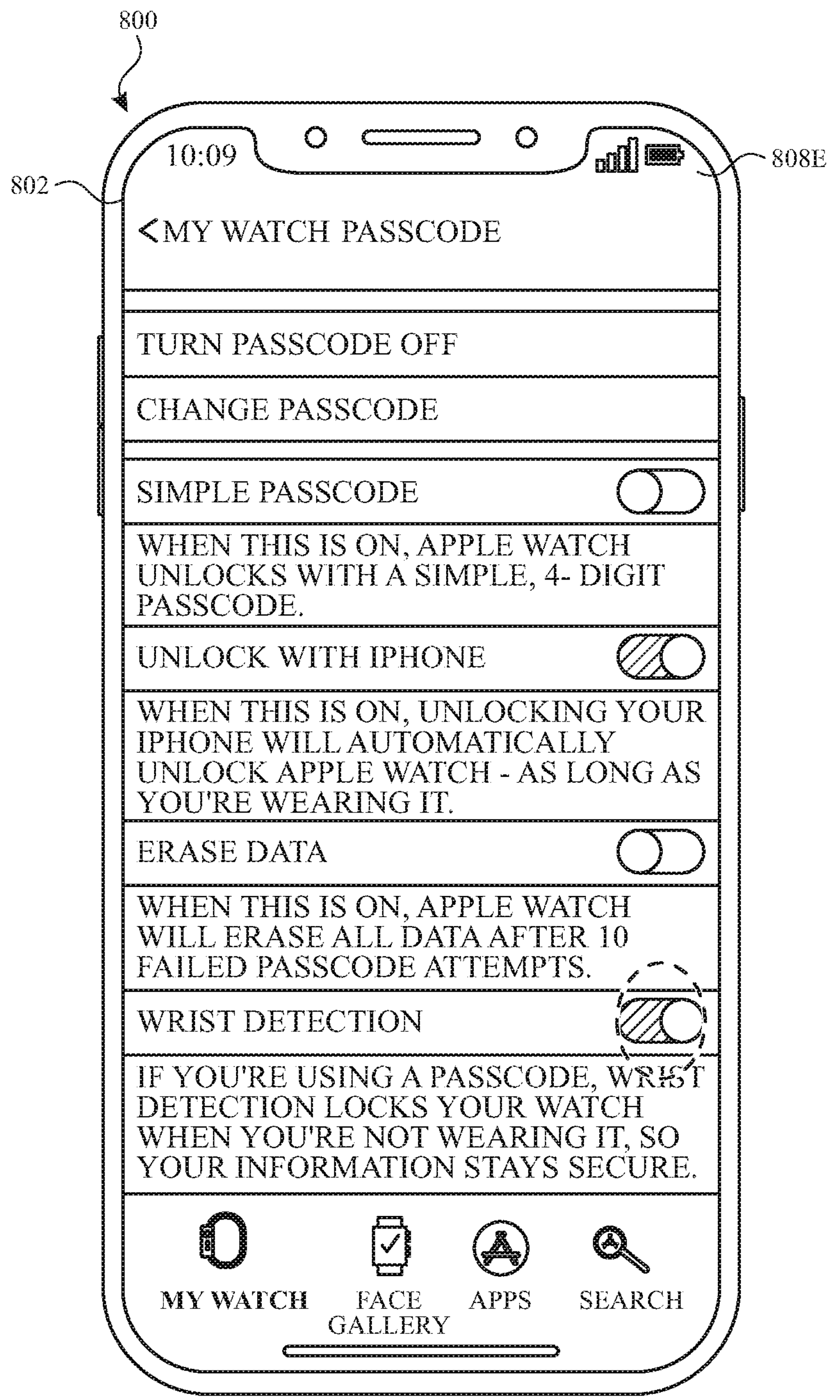
Figure 8L:
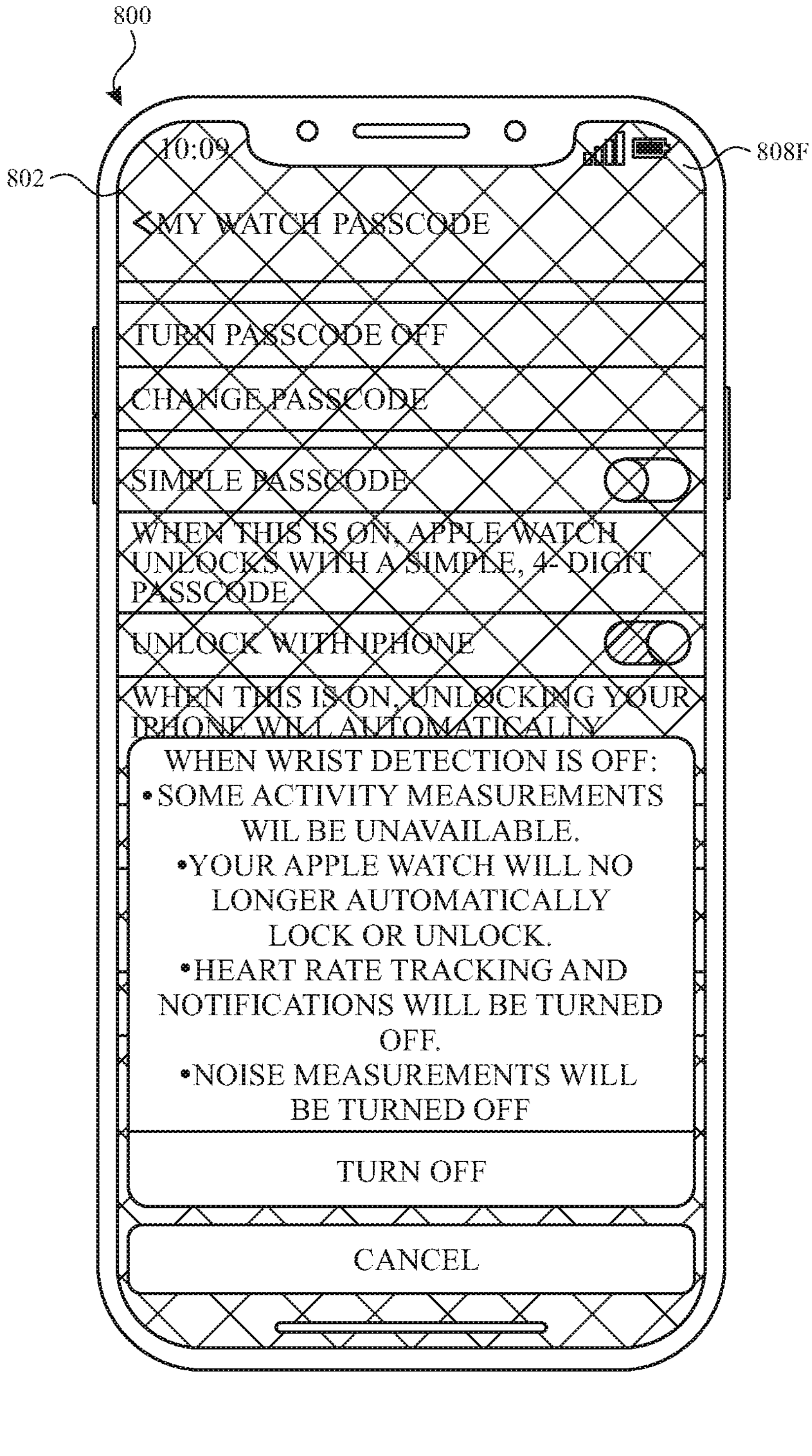

FIGS. 8J-8K depict user interfaces for enabling and disabling noise measurement on device 800. In some embodiments, measurements on a device external to device 800 (e.g., a device used to obtain environmental noise exposure data for display via the user interfaces described above) may be turned off or deactivated in response to disabling other features on a device external (e.g., wrist detection).

FIGS. 9A-9G illustrate exemplary user interfaces for monitoring noise levels (e.g., exposure to noise due from media devices), in accordance with some embodiments. The user interfaces in these figures are used to illustrate the processes described below, including the processes in FIG. 10.

Figure 9A:
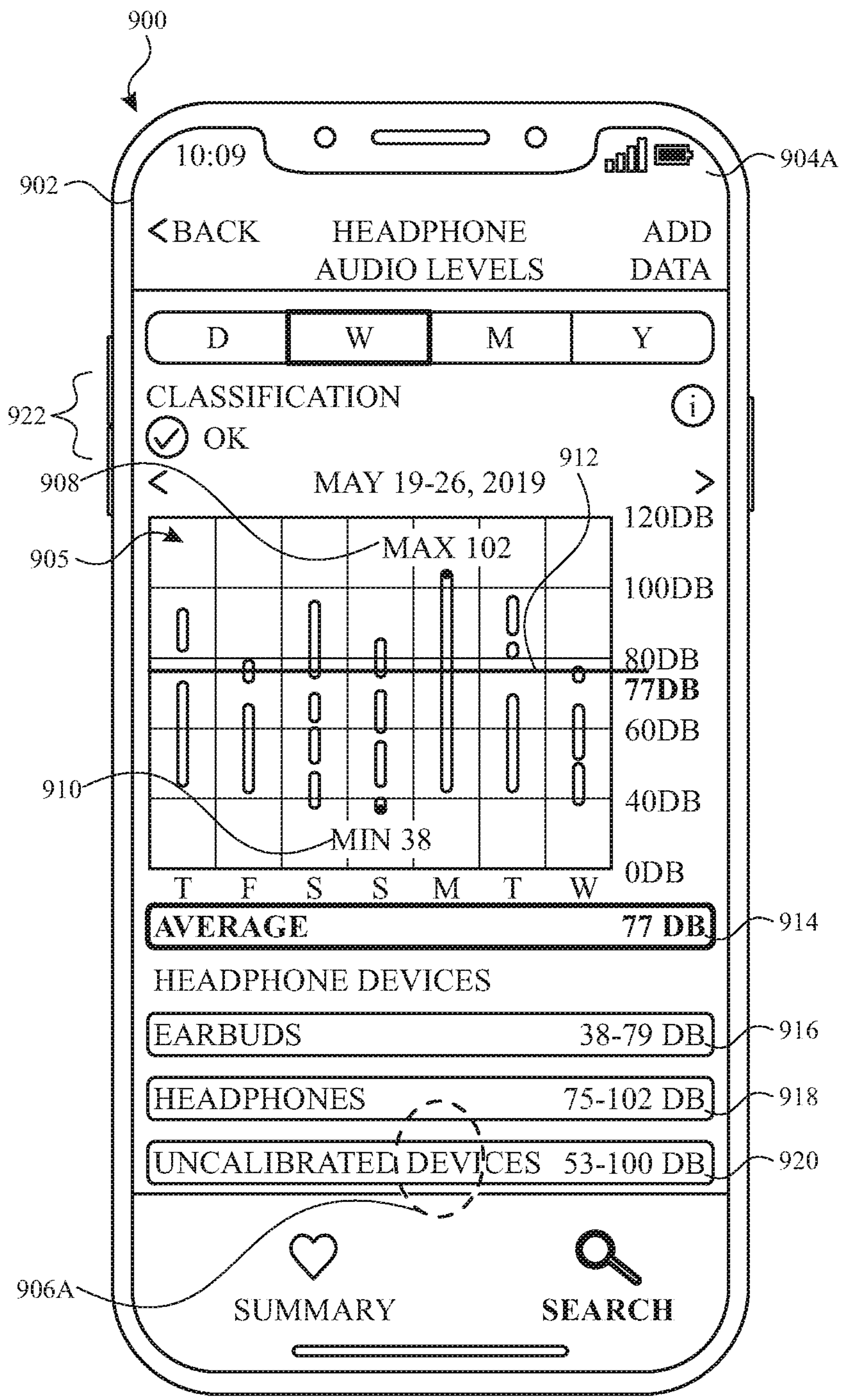
FIGS. 9A-9G illustrate user interfaces for monitoring audio exposure levels in accordance with some embodiments.

FIG. 9A depicts device 900 displaying user interface 904A on display 902. As depicted in FIG. 9A, user interface 904A includes chart 906 depicting a set of daily audio amplitude values (e.g., corresponding to the range of sound levels experienced by a user of device 900 due to use of connected audio output devices) over a 7-day period. In some embodiments, audio amplitude values are determined based on an output volume setting of device 900 (e.g., audio levels are not measured via a microphone). In some embodiments, audio amplitude values (e.g. levels of sound exposure due to device use) are estimated or extrapolated based on a known output device response (e.g., sensitivity, frequency response). As depicted in FIG. 9A, chart 905 includes maximum indication 908 and minimum indication 910, representing the highest and lowest audio amplitude levels experienced by a user of device 900 due to use of connected audio output devices.

As depicted in FIG. 9A, average affordance 914 is displayed in a selected state (e.g., it was previously selected via a user input or was selected by default upon display of user interface 904A). Average affordance 914 includes a value indicating an average audio level over the set of displayed audio amplitude values (e.g., "77 DB").

Chart 905 includes an overlay line corresponding the average audio level indicated by average affordance 914 (e.g. overlay 912). In some embodiments, the average audio level is not an average of the displayed data but rather a time-based average of underlying data (e.g., an average based on how long a user was exposed to each level (e.g., sound pressure level) depicted by the data in chart 905). In some embodiments, the data depicted by chart 905 represents the audio amplitudes levels a device user has been exposed to over the course of a day or other period of time (e.g., hour, week, year, month). As depicted in FIG. 9A, user interface 904A includes an audio classification indicator 922, which provides a non-numeric indication (e.g., an indication including graphics and/or text) of the average audio level relative to a threshold (e.g., a predetermined 80 DB threshold). As depicted in FIG. 9A, the audio classification indicator 922 indicates that the average audio level (e.g., 77 DB) is below an 80 DB threshold with an "OK" and a check mark graphic.

As depicted in FIG. 9A, user interface 904A includes device type filtering affordances (e.g., affordances associated with a specific type of device) for emphasizing data in chart 905 attributable to each respective device type (e.g., emphasizing a subset of the set of daily audio amplitude values included in chart 905 of FIG. 9A). Each device type filtering affordance (e.g., earbuds filtering affordance 916, headphones filtering affordance 918, uncalibrated devices affordance 920) includes an associated range representing the highest and lowest audio amplitude levels experienced by a user of device 900 due to use devices of the respective device type. In some embodiments, a device type corresponds to a single device. In some embodiments, a single device includes a pair (e.g., left and right) of connected devices.

Figure 9B:
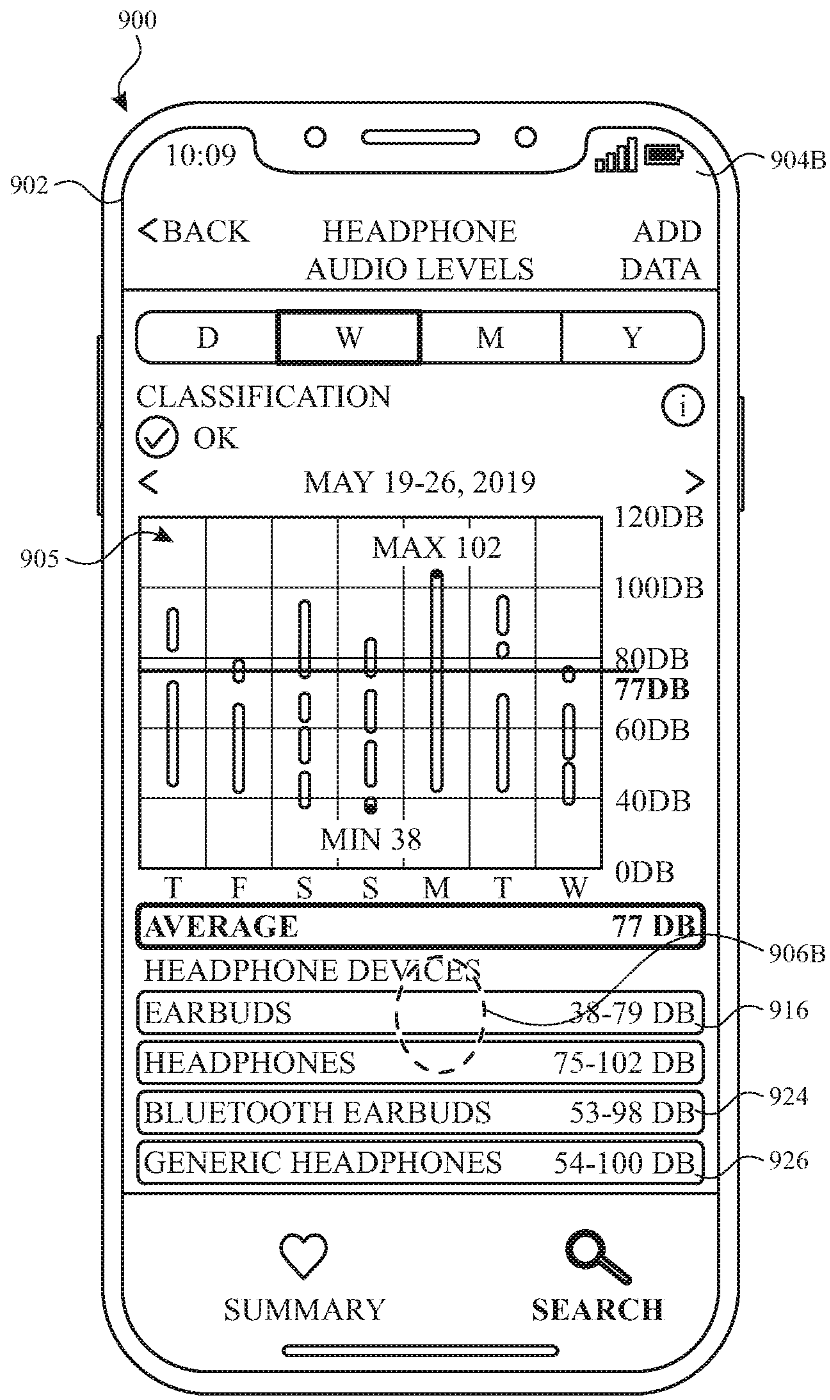

FIG. 9A depicts device 900 receiving user input 906A (e.g., a tap) on uncalibrated device affordance 920. In response to receiving user input 906A, device 900 displays user interface 904B. As depicted in FIG. 9B, uncalibrated device affordance 920 is replaced by Bluetooth earbuds affordance 924 and generic headphones affordance 926, each corresponding to an audio output device coupled (e.g., wirelessly or physically) to device 900 (e.g. audio output devices receive analog or digital audio signals generated by device 1100 and convert those into acoustic output).

Figure 9C:
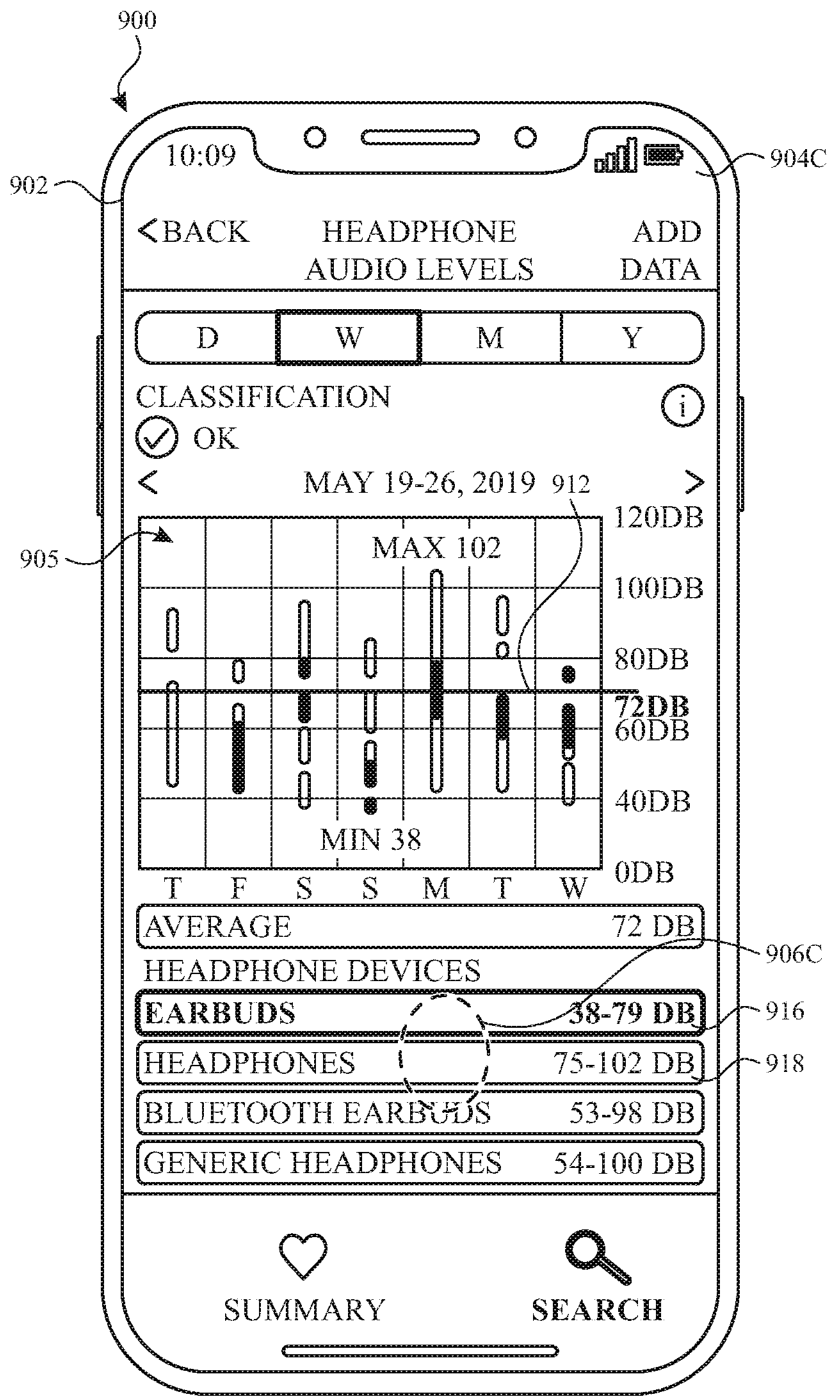

FIG. 9B depicts device 900 receiving user input 906B (e.g., a tap) on earbuds affordance 916. In response to receiving user input 906B, device 900 displays user interface 904C (e.g., an interface emphasizing audio level data associated with earbuds type output devices), as depicted in FIG. 9C. In some embodiments, earbuds type output devices are calibrated devices (e.g., devices with a known frequency response).

As depicted in FIG. 9C, user interface 904C emphasizes audio level data attributable to one or more output devices associated with the earbuds affordance 916. For example, a set of data points (e.g., ranges of audio exposure level data) attributable to devices corresponding to the selected device type filter (e.g., earbud type devices) are visually distinguished (e.g., by varying on or more visual property such as color, hue, saturation, texture) from data not attributable to devices corresponding to the selected device type filter (e.g., earbud type devices). As illustrated in FIG. 9C, data attributable to earbud type devices corresponds to black data points on chart 905. In some embodiments, visually distinguishing data (e.g., a set of exposure levels attributable to a first device type includes de-emphasizing noise exposure levels attributable to a second device type by varying one or more visual properties (e.g., brightness, opacity, color, contrast, hue, saturation).

In addition to emphasizing audio data in response to user input 906C, device 900 updates overlay 912 to depict an average audio level (e.g., 72 DB) based on the emphasized set of noise amplitude values (e.g., the average audio level attributable to earbud device types).

Figure 9D:
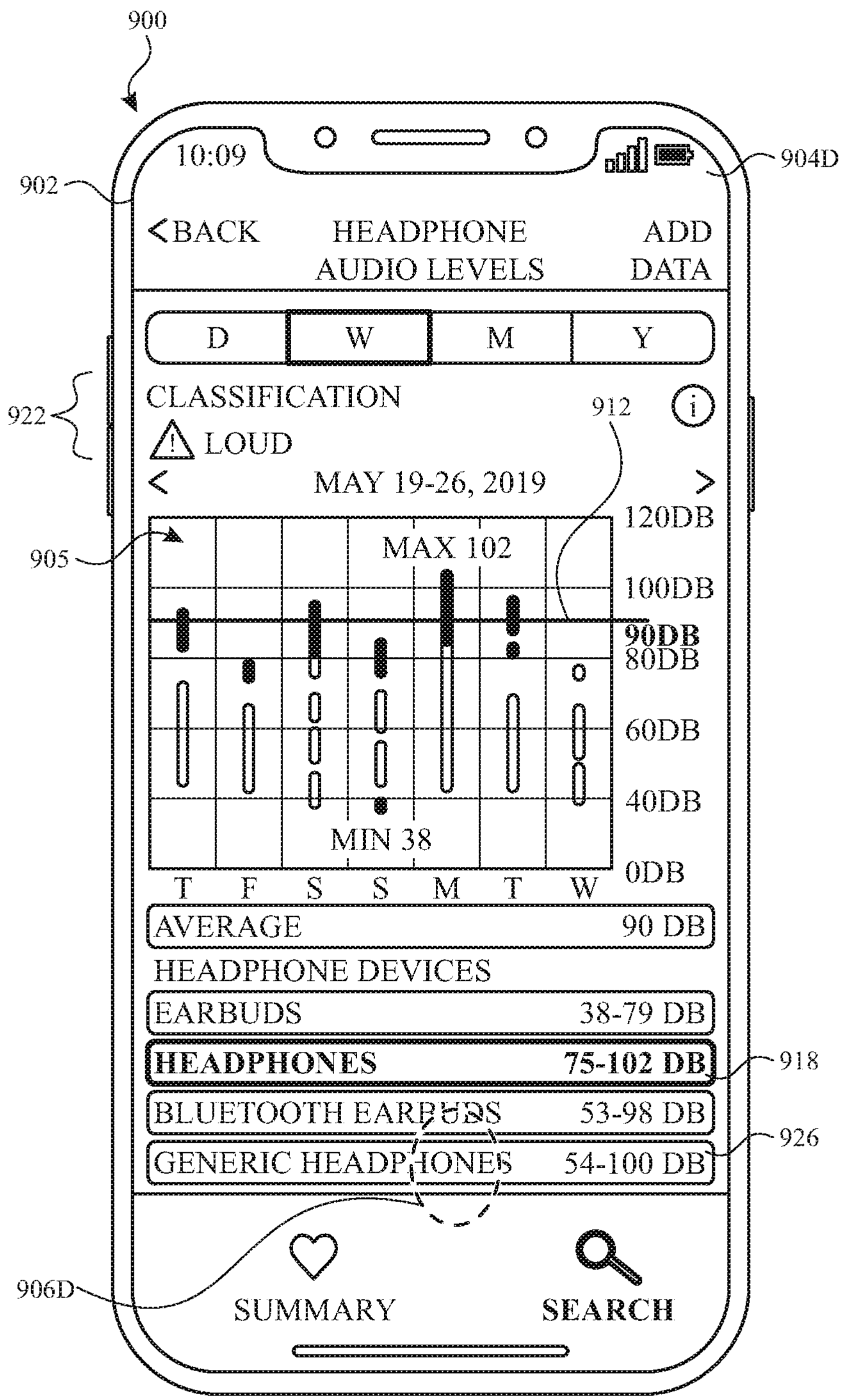

FIG. 9C depicts device 900 receiving user input 906C (e.g., a tap) on headphones affordance 918. In response to receiving user input 906C, device 900 displays user interface 904D (e.g., an interface emphasizing noise level data associated a headphones type output device), as depicted in FIG. 9D. In some embodiments, headphone type output devices are calibrated devices (e.g., devices with a known frequency response).

As depicted in FIG. 9D, user interface 904D emphasizes audio level data attributable to one or more output devices associated with the headphones affordance 918. For example, a set of data points (e.g., ranges of audio exposure level data) attributable to devices corresponding to the selected device type filter (e.g., headphones type devices) are visually distinguished (e.g., by varying on or more visual property such as color, hue, saturation, texture) from data not attributable to devices corresponding to the selected device type filter (e.g., headphone type devices). As illustrated in FIG. 9D, data attributable to headphones type devices corresponds to black data points on chart 905. In addition to emphasizing audio data in response to user input 906D, device 900 updates overlay 912 to depict an average audio level (e.g., 90 DB) based on the emphasized set of noise amplitude values (e.g., the average audio level attributable to headphones device types). Device 900 also updated, audio classification indicator 922 to indicate that the average audio level (e.g., 90 DB) has exceeded an 80 DB threshold with an "LOUD" and caution graphic.

Figure 9E:
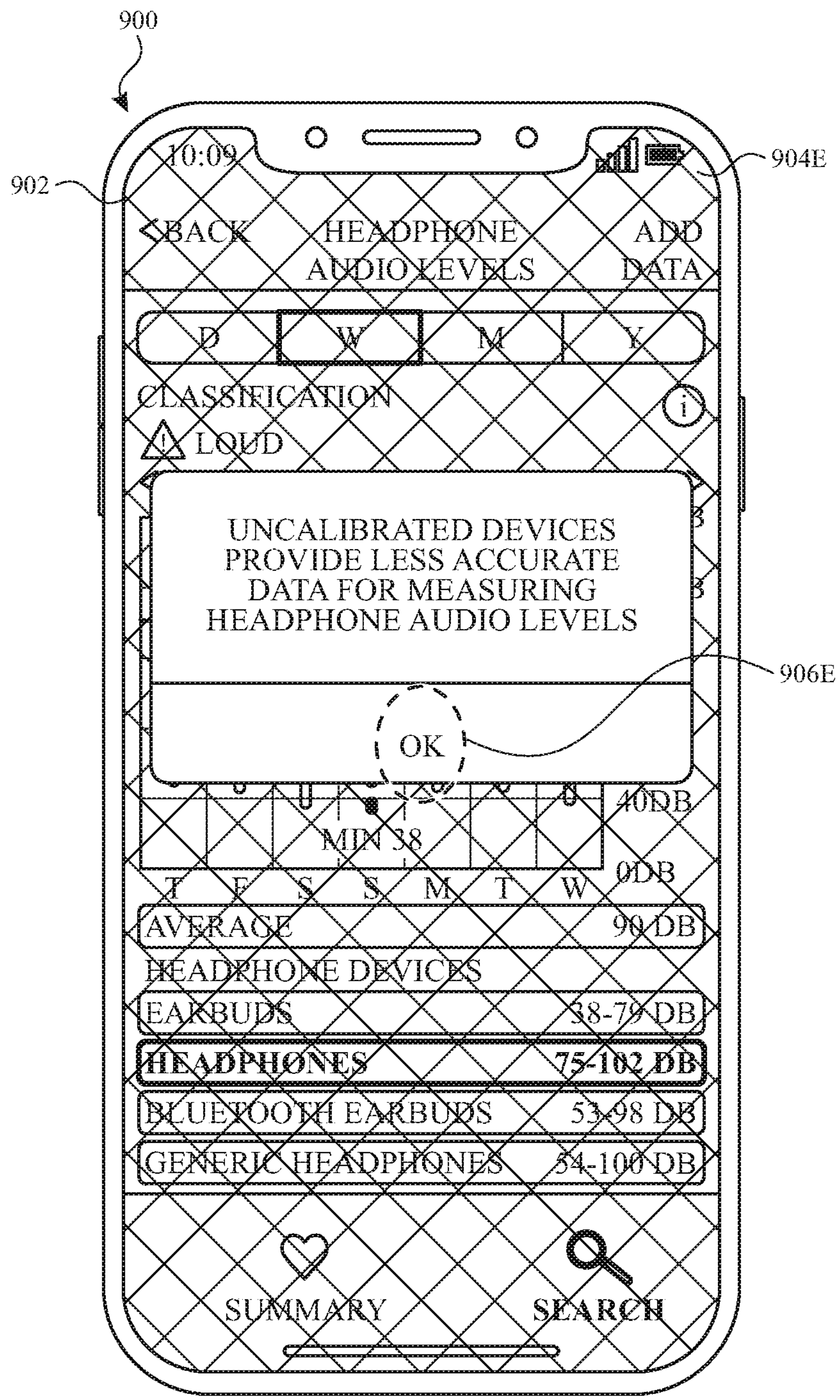

FIG. 9D depicts device 900 receiving user input 906D (e.g., a tap) on generic headphones affordance 926. In response to receiving user input 906D, device 900 displays user interface 904E (e.g., a warning prompt interface), as depicted in FIG. 9E. User interface 904E informs a user that the audio levels based on uncalibrated devices may not be accurate. For example, device 900 cannot accurately extrapolate audio exposures levels without data characterizing the response of a given output device (e.g., a headphone frequency response curve).

FIG. 9E depicts device 900 receiving user input 906E (e.g., a tap) on an acknowledgement affordance (e.g., "OK"). In response to receiving user input 906E, device 900 displays user interface 904F (e.g., an interface emphasizing noise level data associated generic headphones type output devices) as depicted in FIG. 9F.

Figure 9F:
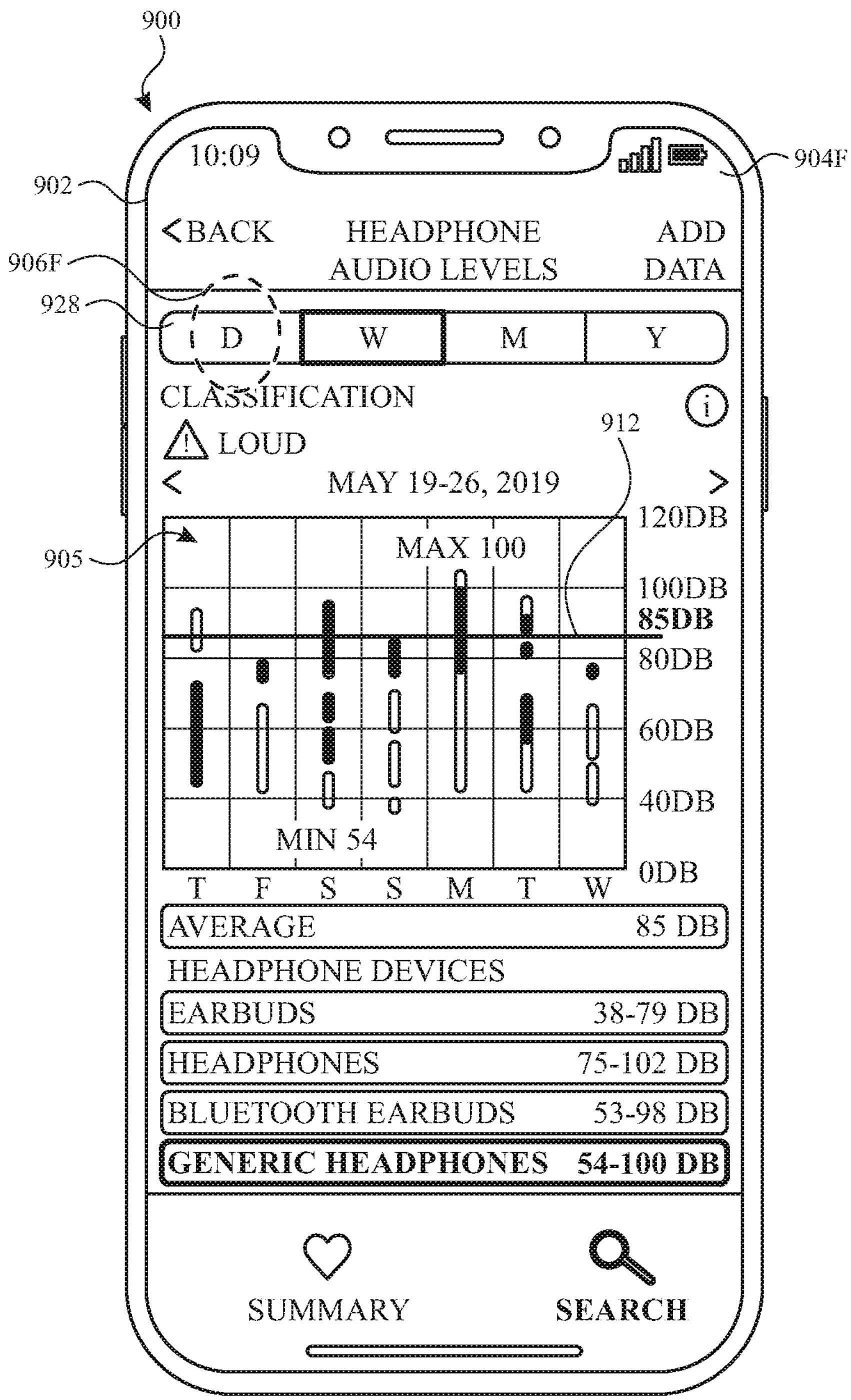

As depicted in FIG. 9F, user interface 904F emphasizes audio level data attributable to one or more output devices associated with generic headphones affordance 926. For example, a set of data points (e.g., ranges of audio exposure level data) attributable to devices corresponding to the selected device type filter (e.g., generic headphones type devices) are visually distinguished (e.g., by varying on or more visual property such as color, hue, saturation, texture) from data not attributable to devices corresponding to the selected device type filter (e.g., generic headphones type devices). As illustrated in FIG. 9E, data attributable to generic headphones type devices corresponds to black data points on chart 905. In addition to emphasizing audio data in response to user input 906E, device 900 updates overlay 912 to depict an average audio level (e.g., 85 DB) based on the emphasized set of noise amplitude values (e.g., the average audio level attributable to generic headphones device types).

FIG. 9F depicts device 900 receiving user input 906F (e.g., a tap) on day time-scale affordance 928. In response to receiving user input 906E, device 900 displays user interface 904G (e.g., an interface emphasizing noise level data associated generic headphones type output devices over a day period) as depicted in FIG. 9F.

As depicted in FIG. 9F, in response receiving user input 906E device displays audio level data corresponding to Saturday May 22 (e.g. center day of the 7-day period displayed throughout FIGS. 9A-9F). In some embodiments, audio exposure levels corresponding to a day other than the center day (e.g., a current day of audio exposure level) are displayed by chart 905.

Figure 9G:
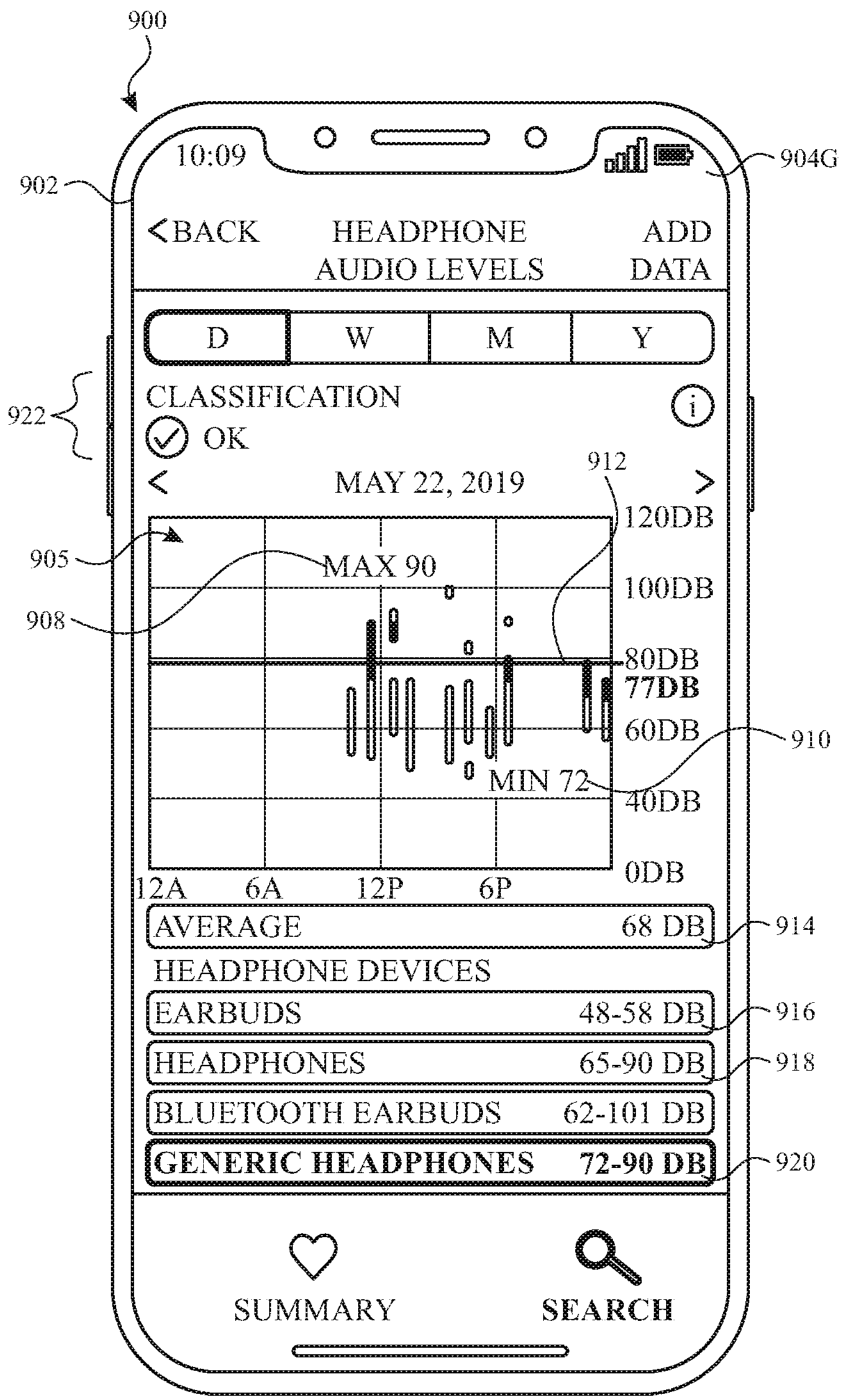

As depicted in FIG. 9G, user interface 904G emphasizes audio level data attributable to one or more output devices associated with generic headphones affordance 926 over 24-hour period (e.g., a day). For example, a set of data points (e.g., ranges of audio exposure level data) attributable to devices corresponding to the selected device type filter (e.g., generic headphones type devices) are visually distinguished (e.g., by varying on or more visual property such as color, hue, saturation, texture) from data not attributable to devices corresponding to the selected device type filter (e.g., generic headphones type devices). As illustrated in FIG. 9G, data attributable to generic headphones type devices corresponds to black data points on chart 905. In addition displaying emphasized audio data for a different time period in response to user input 906F, device 900 updates maximum indication 908, minimum indication 910, overlay 912, average affordance 914, earbuds filtering affordance 916, headphones filtering affordance 918, generic headphones filtering affordance 920, and audio level classification 922 to depict an audio levels (e.g., 85 DB) based on the emphasized set of noise amplitude values (e.g., the average audio level attributable to generic headphones device types) within the displayed 24-hour time period. For example, average affordance 914 updated to indicate a daily average audio level of 68 DB (e.g., compared to the 85 DB weekly average audio level as depicted in FIGS. 9A-9F).

Figure 10:
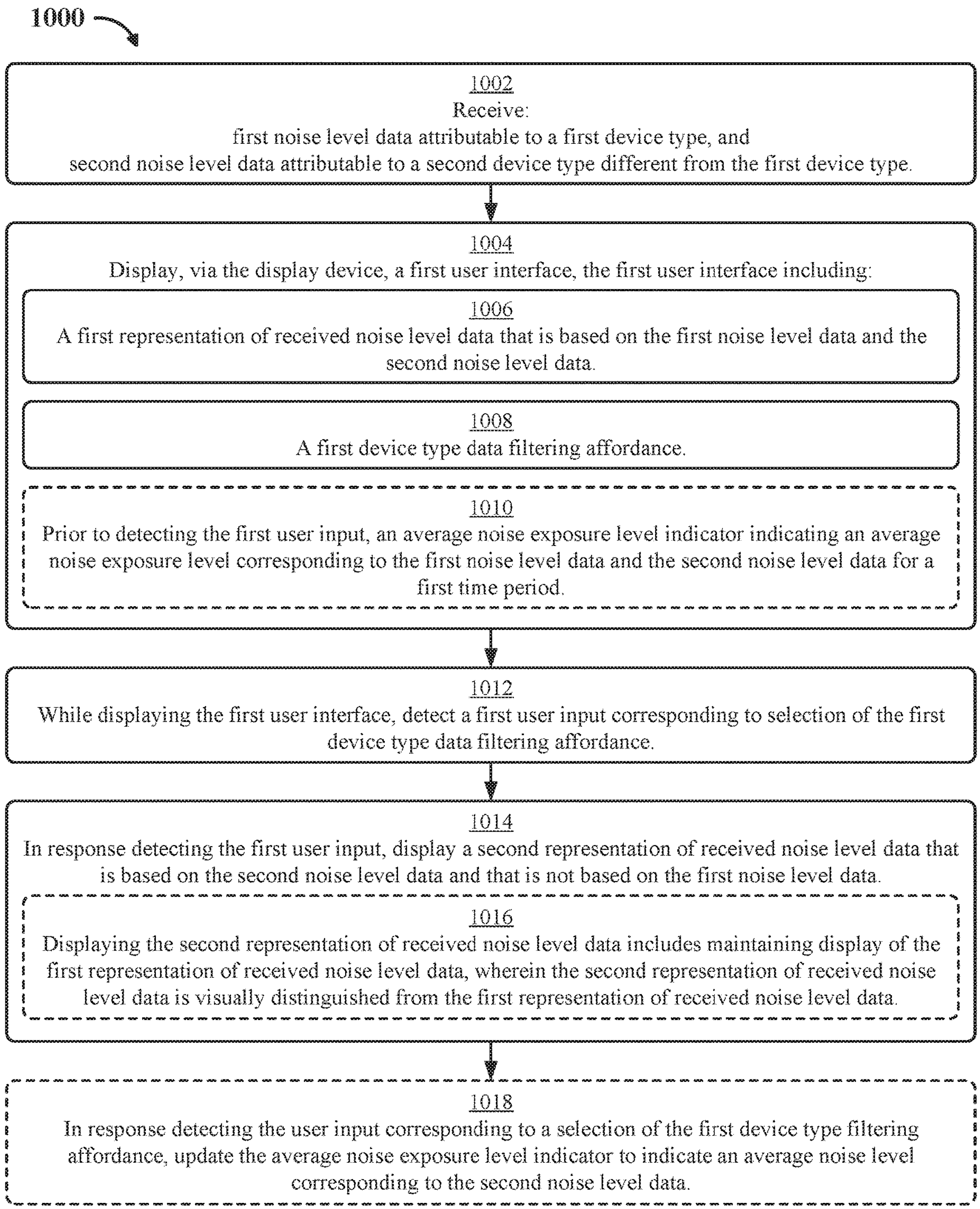
FIG. 10 is a flow diagram illustrating a method for monitoring audio exposure levels using an electronic device, in accordance with some embodiments.

FIG. 10 is a flow diagram illustrating a method for monitoring noise exposure levels using an electronic device, in accordance with some embodiments. Method 1000 is performed at an electronic device (e.g., 100, 300, 500, 600, 601, 800, 900, 1100, 1200, 1400, 1401, and 1700) with a display device and a touch-sensitive surface. Some operations in method 1000 are, optionally, combined, the orders of some operations are, optionally, changed, and some operations are, optionally, omitted.

In some embodiments, the electronic device (e.g., 100, 300, 500, 600, 601, 800, 900, 1100, 1200, 1400, 1401, and 1700) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

As described below, method 700 provides an intuitive way for monitoring noise exposure levels. The method reduces the cognitive burden on a user to monitor noise exposure levels, thereby creating a more efficient human-machine interface. For battery-operated computing devices, enabling a user to monitor noise exposure levels faster and more efficiently conserves power and increases the time between battery charges.

The electronic device receives (1002) first noise level data attributable to a first device type (e.g., uncalibrated devices, such as wired headphones connected to the electronic device via a port (e.g., a headphone jack) or uncalibrated wireless headphones). The electronic device receives (1002) second noise level data attributable to a second device type (e.g., calibrated devices, such as calibrated wireless headphones) different from the first device type. In some embodiments, the electronic device identifies the first and second noise level data based on one or more output signals (e.g., voltages, digital audio data) sent by the electronic device to an output device of the first type.).

The electronic device displays (1004), via the display device (e.g., 902), a first user interface (e.g., 904A). In some embodiments, the first user interface is displayed in response to a user request (e.g., request to view a UI of noise application through search feature of health app or notifications in discover tab of health app). The first user interface includes a first representation of received noise level data that is based on the first noise level data and the second noise level data (e.g., a graph showing combined data or concurrently showing separate data for each of the first and second noise level data) (1006) (e.g., 905 in FIG. 9A). The first user interface includes a first device type data filtering affordance (1008) (e.g., 916). Including the first representation of received noise level data that is based on the first noise level data and the second noise level data in the first user interface (e.g., as a graph) visually informs a user of the noise level data in an easily understandable and recognizable manner. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While displaying the first user interface, the electronic device detects (1012) a first user input corresponding to selection of the first device type data filtering affordance (e.g., 916, 918, 926).

In response detecting the first user input, the electronic device displays (1014) a second representation of received noise level data that is based on the second noise level data and that is not based on the first noise level data (e.g., a second representation (e.g., a separate graph, a visual emphasis on the first representation) that emphasizes noise level data from calibrated devices compared to the depiction of noise level data in the first representation) (e.g., 905 in FIGS. 9C-9D, 9F, and 9G). Displaying the second representation of the received noise level data that is based on the second noise level data and that is not based on the first noise level data (e.g., as a separate graph) in response detecting the first user input enables a user to more easily view information corresponding to the second noise level data. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as part of displaying the second representation of received noise level data, the electronic device maintains (1016) display of the first representation of received noise level data (e.g., 905 in FIGS. 9C and 9D-9G). In some embodiments, the second representation of received noise level data is visually distinguished from the first representation of received noise level data (e.g., 905 in FIGS. 9C and 9D-9G). In some embodiments, visually distinguishing data (e.g., a set of exposure levels attributable to the second output device type) includes de-emphasizing noise exposure levels attributable to the first device type data by varying one or more visual properties (e.g., brightness, opacity, color, contrast, hue, saturation) (e.g., 905 in FIGS. 9C and 9D-9G). In some embodiments, visually distinguishing data includes emphasizing noise exposure levels attributable to the second device type by varying one or more visual properties (e.g., brightness, opacity, color, contrast, hue, saturation) (e.g., 905 in FIGS. 9C and 9D-9G).

In some embodiments, the second noise level data corresponds to noise level data attributable to a single device. In some embodiments, a single device includes a pair of linked devices (e.g., wirelessly linked left and right headphones).

In some embodiments, the first noise level data corresponds to noise level data attributable to a plurality of devices (e.g., a plurality of sets of linked devices (e.g., pairs of linked wireless headphones).

In some embodiments, the second noise level data includes third noise level data attributable to a third device type (e.g., data from an additional calibrated device). In some embodiments, the first user interface includes a second device type filtering affordance corresponding to the third noise level data (e.g., an additional calibrated device affordance in additions to the first calibrated device affordance) (e.g., 918). In some embodiments, while displaying the first user interface (e.g., 904C), the electronic device detects a user input corresponding to selection of the second device type filtering affordance (e.g., 906C). In some embodiments, in response detecting the user input corresponding to a selection of the second device type filtering affordance, the electronic device displays a third representation of the third noise level data (e.g., 905 in FIG. 6D). Displaying the third representation of the third noise level data enables a user to more easily view and understand information corresponding to the third noise level data. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first user interface includes, prior to detecting the first user input, an average noise exposure level indicator (e.g., 912, 914) indicating an average noise exposure level corresponding to the first noise level data and the second noise level data for a first time period (e.g., a day, a week) (1010). In some embodiments, the average noise level indicator includes a check mark or exclamation point, 'LOUD' or 'OK' (e.g., 922). In some embodiments, the average noise level indicator is an overlay line (e.g., 912), textual description, or icon (e.g., 922). Providing an average noise exposure level indicator indicating the average noise exposure level provides a user with a simple and easily recognizable metric to understand the overall noise exposure level. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response detecting the user input corresponding to a selection of the first device type filtering affordance (e.g., 916), the electronic device updates (1018) the average noise exposure level indicator to indicate an average noise level corresponding to the second noise level data (e.g., that does not correspond to the first noise level data) (e.g., indicating the average based on only the calibrated data associated with the second device type) (e.g., 912 in FIGS. 9B-9C).

In some embodiments, the second noise level data is based, at least in part, on one or more signals transmitted from the electronic device to one or more devices of the second type (e.g., noise levels are not based on incoming signals or data (e.g., audio levels measured via a microphone). In some embodiments, noise levels are estimated based on a volume setting (e.g., volume at 100%) and a known output device response (e.g., headphones of a first type output 87 dB at 100% for the particular signal being played).

In some embodiments, the first representation of received noise level data includes an indication of the maximum value of the noise level data (e.g., 908) and the minimum value of the noise level data (e.g., values representing the highest and lowest noise levels within the combined first noise level data and second noise level data) for a second time period (e.g., a day, a week) (e.g., 910). In some embodiments, the first representation includes more than one pair of maximum and minimum noise level values (e.g., maximum and minimum values for each day within a week).

Note that details of the processes described above with respect to method 1000 (e.g., FIG. 10) are also applicable in an analogous manner to the methods described above. For example, method 700 optionally includes one or more of the characteristics of the various methods described above with reference to method 1000. For example, the graphical indication (e.g., a graphical object) that varies in appearance based on a noise exposure level, as described above in method 700, can be used to display noise exposure level information corresponding to one or more output devices. For brevity, these details are not repeated below.

Figure 11A:
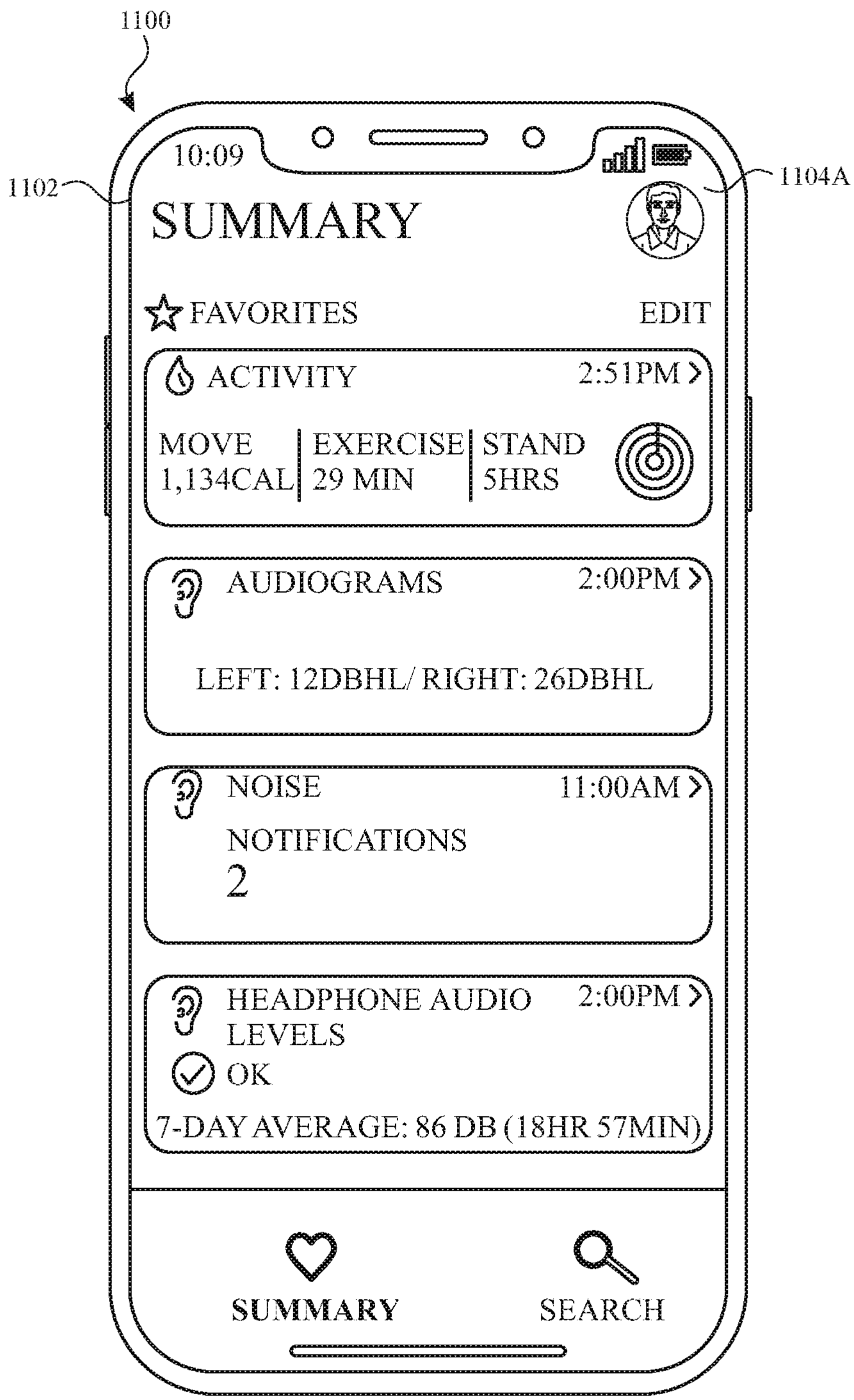
FIG. 11A-11L illustrates user interfaces in accordance with some embodiments.
Figure 11B:
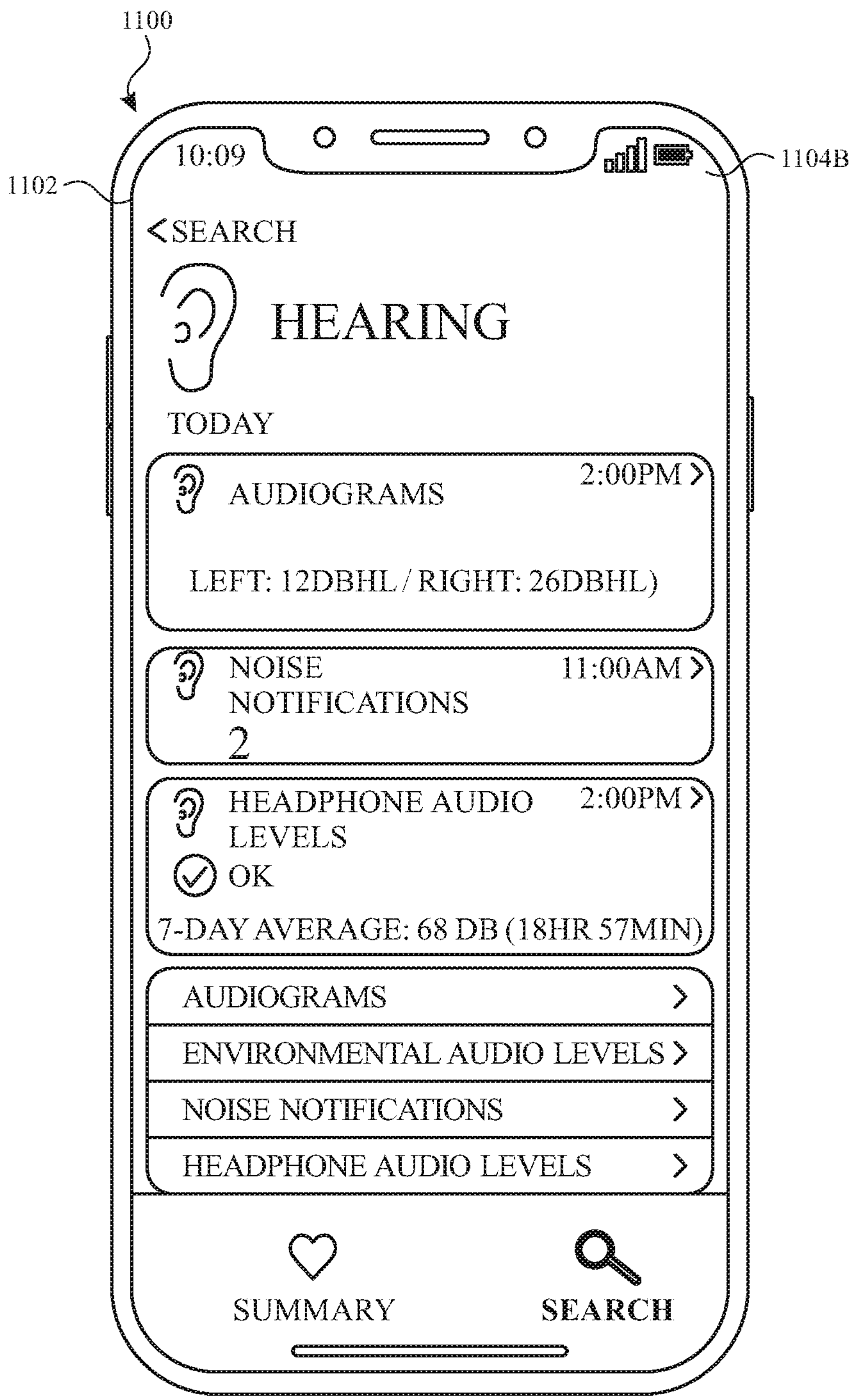
Figure 11C:
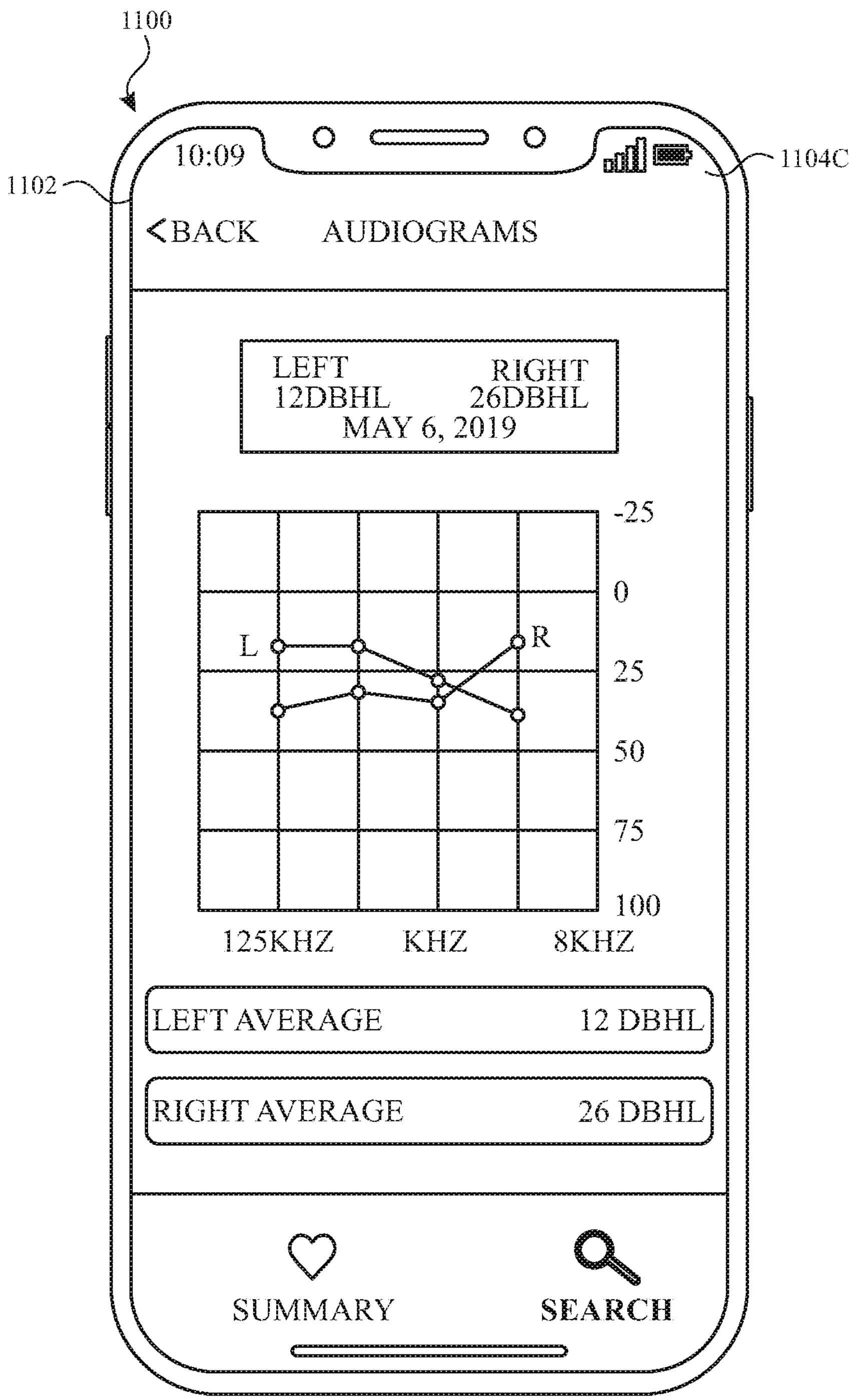
Figure 11D:
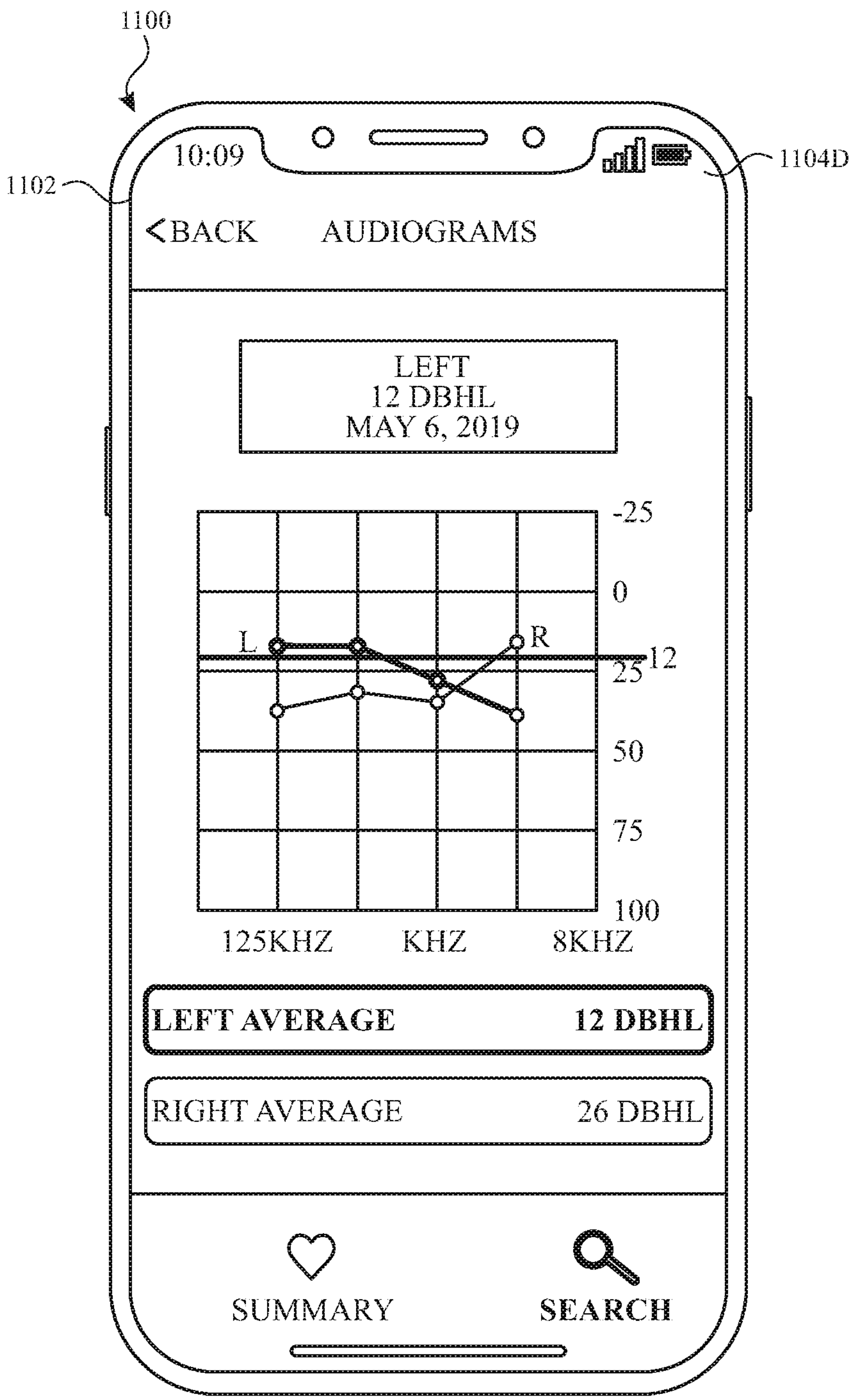
Figure 11E:
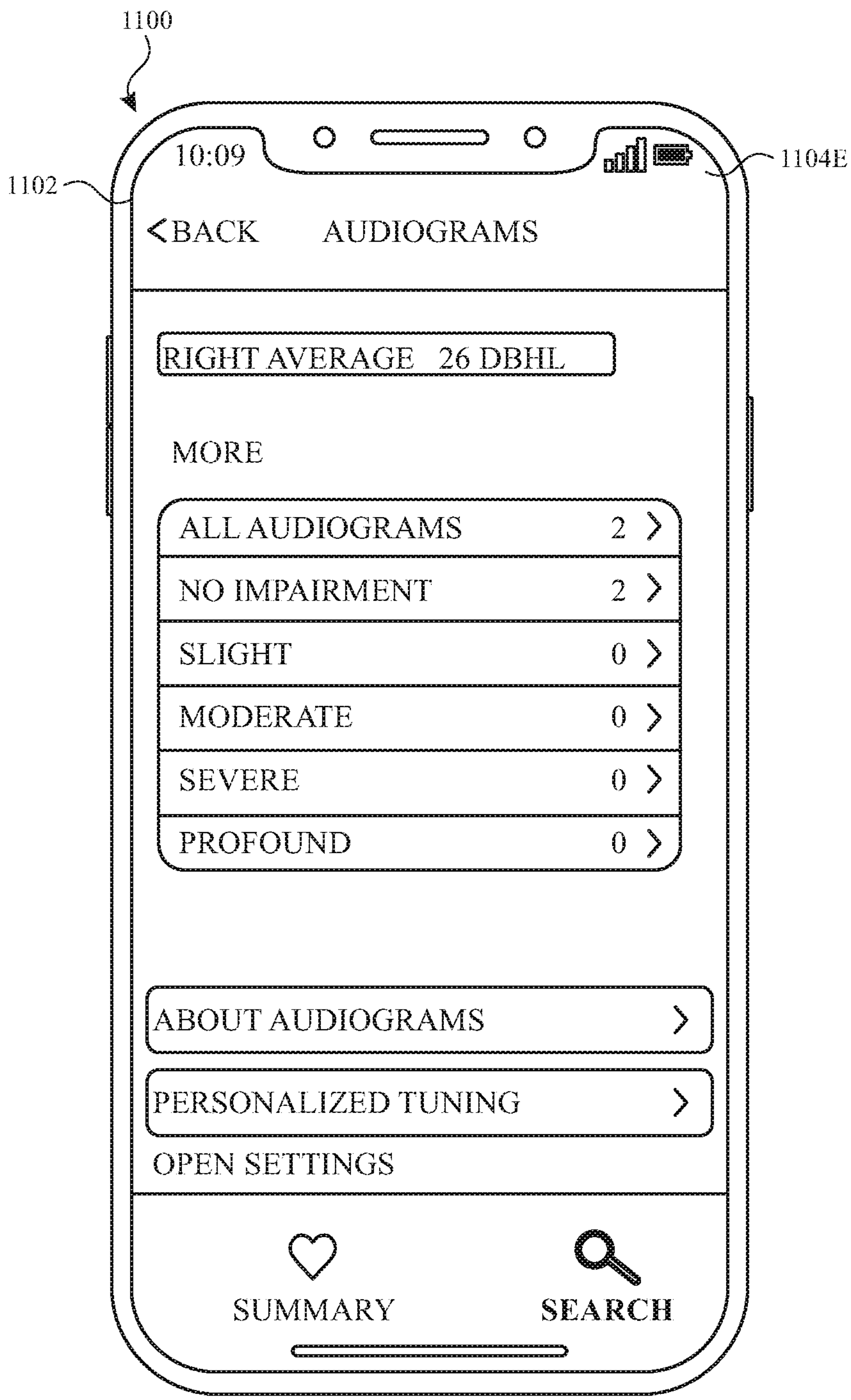
Figure 11F:
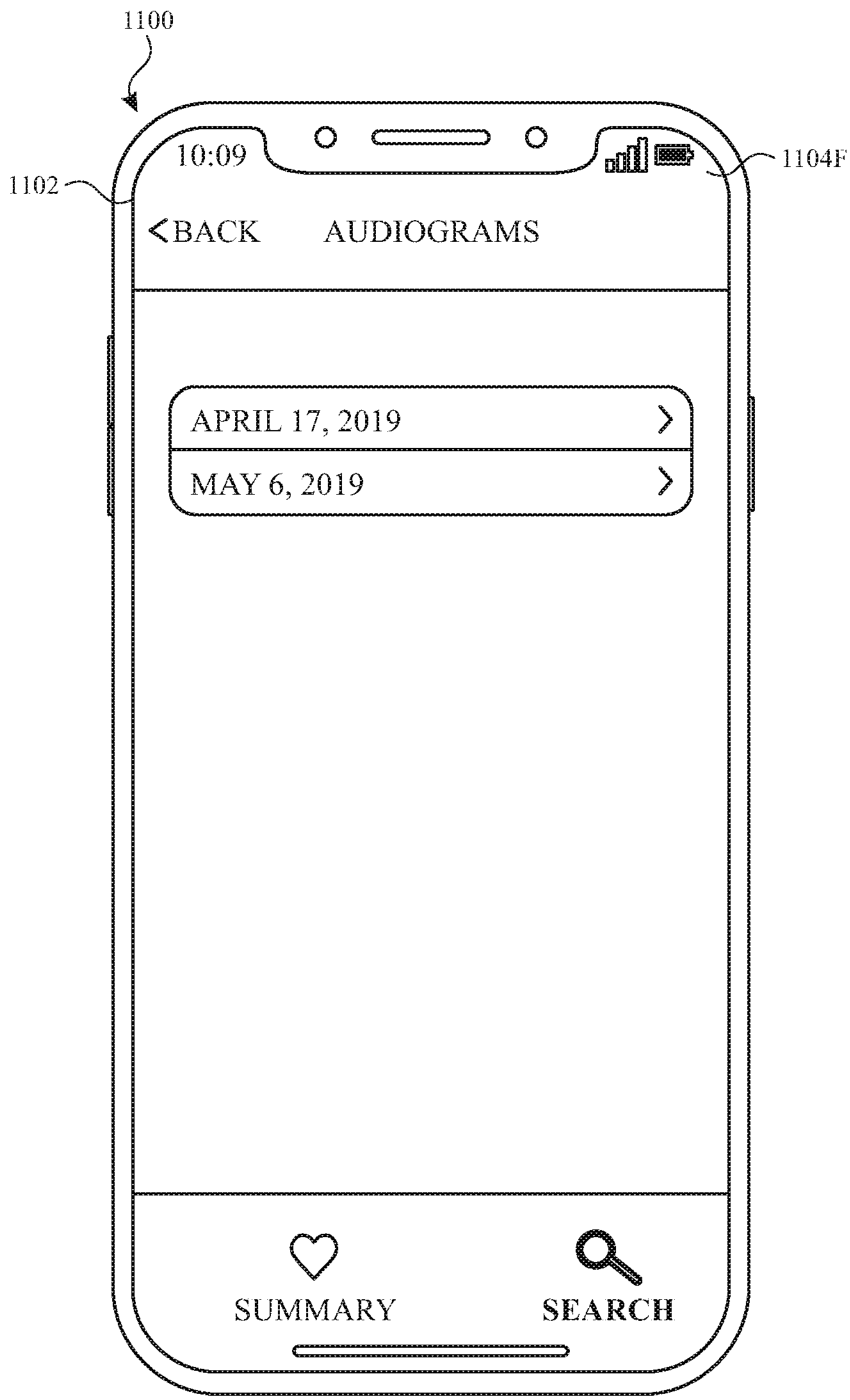
Figure 11G:
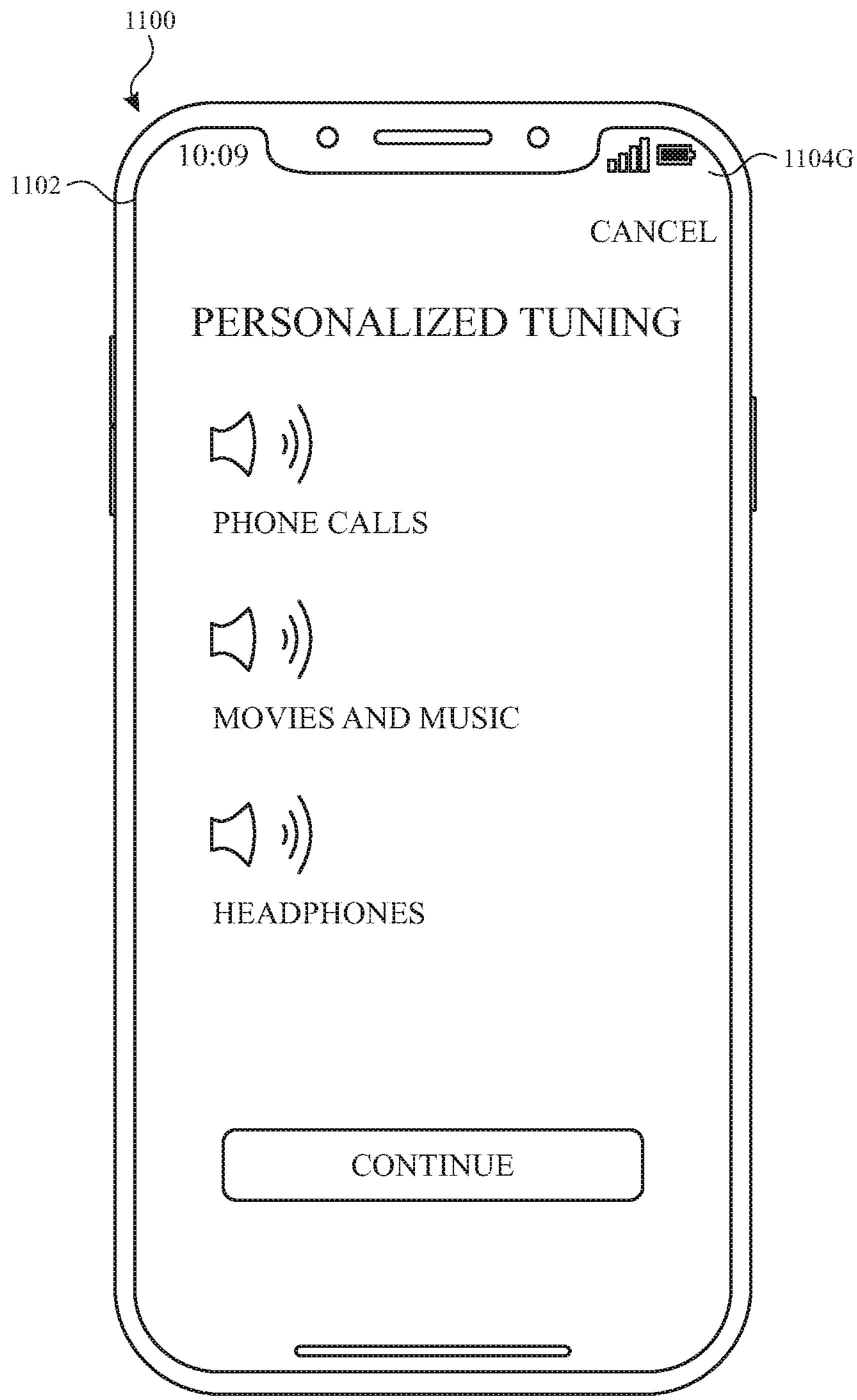
Figure 11H:
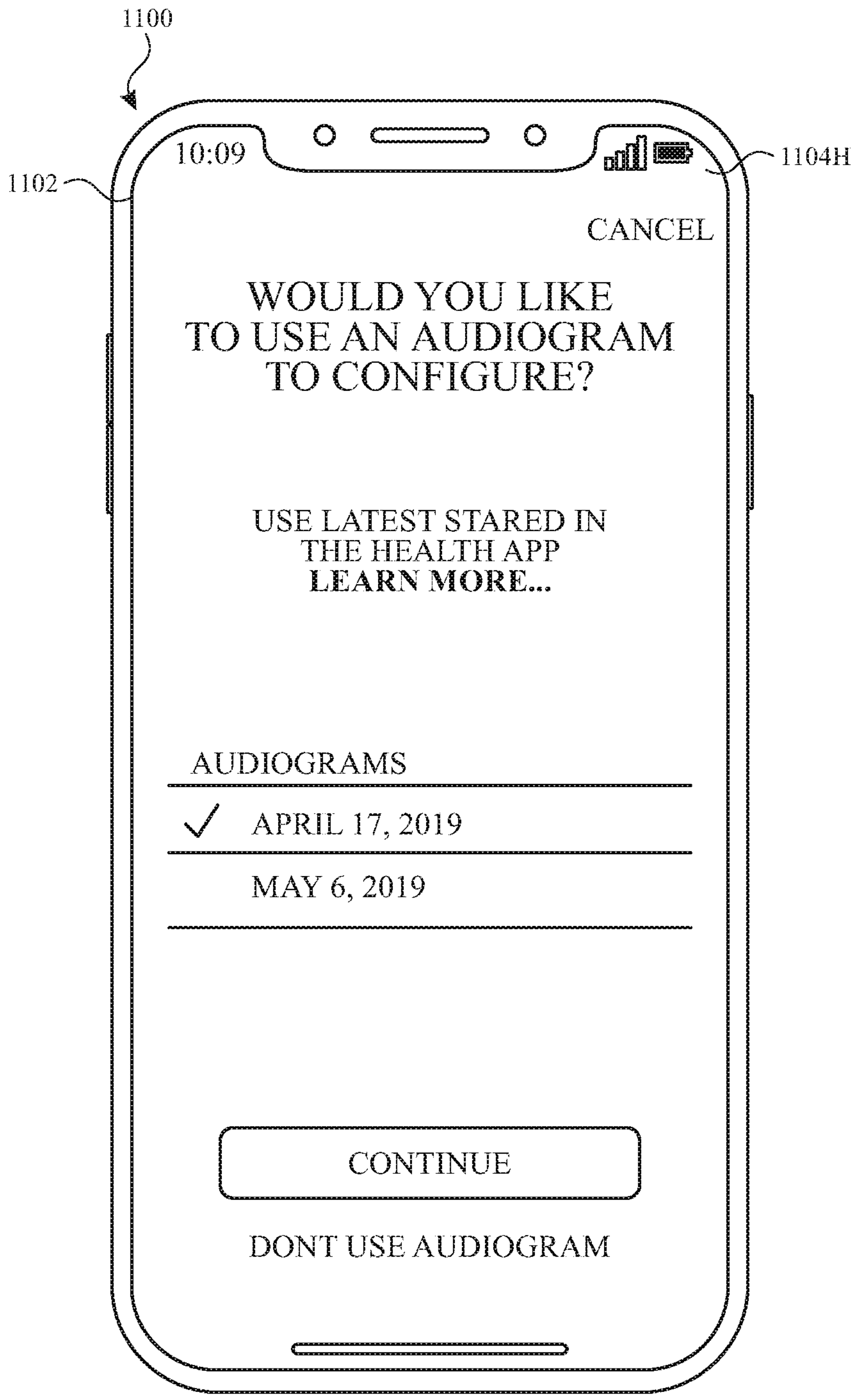
Figure 11I:
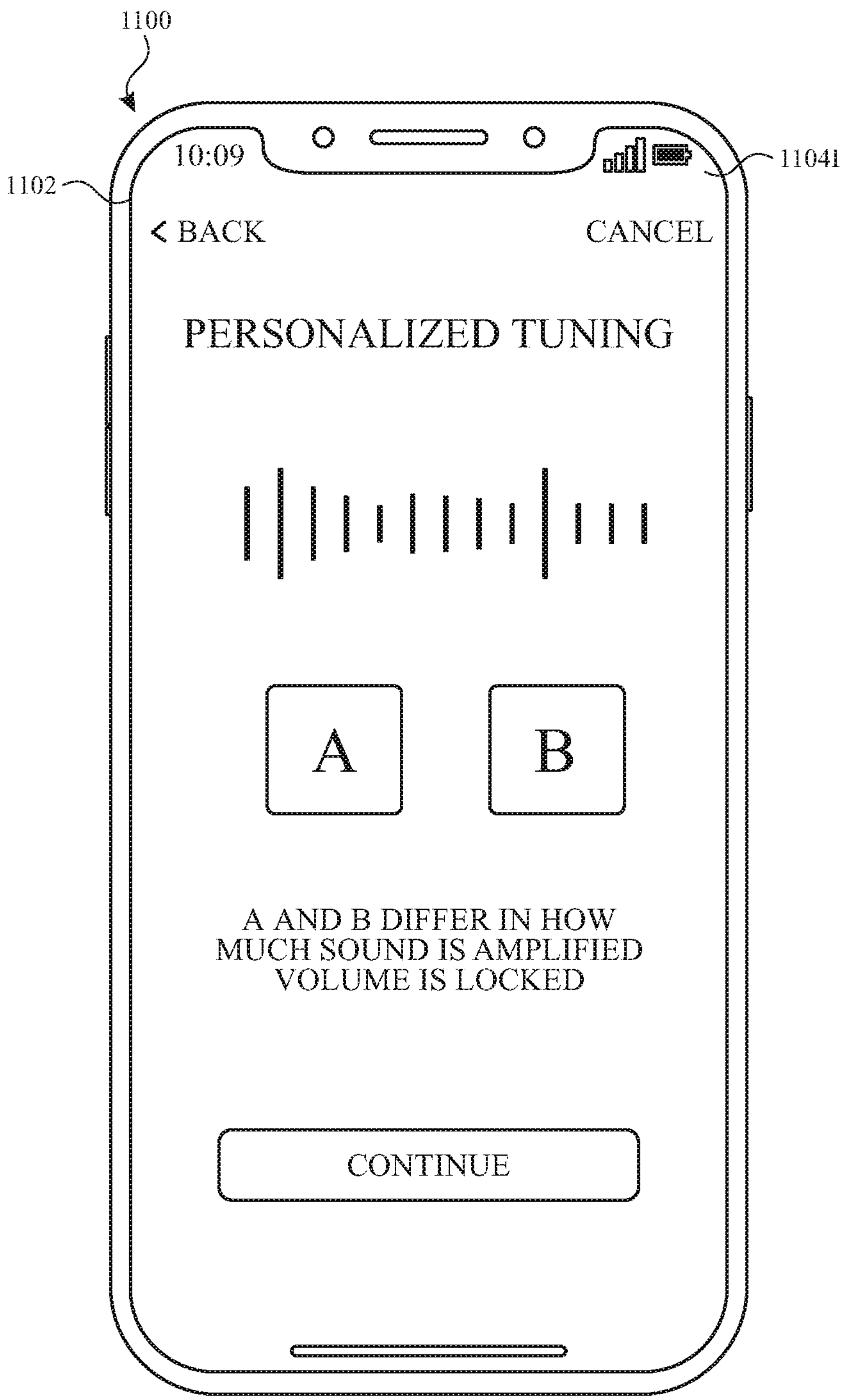
Figure 11J:
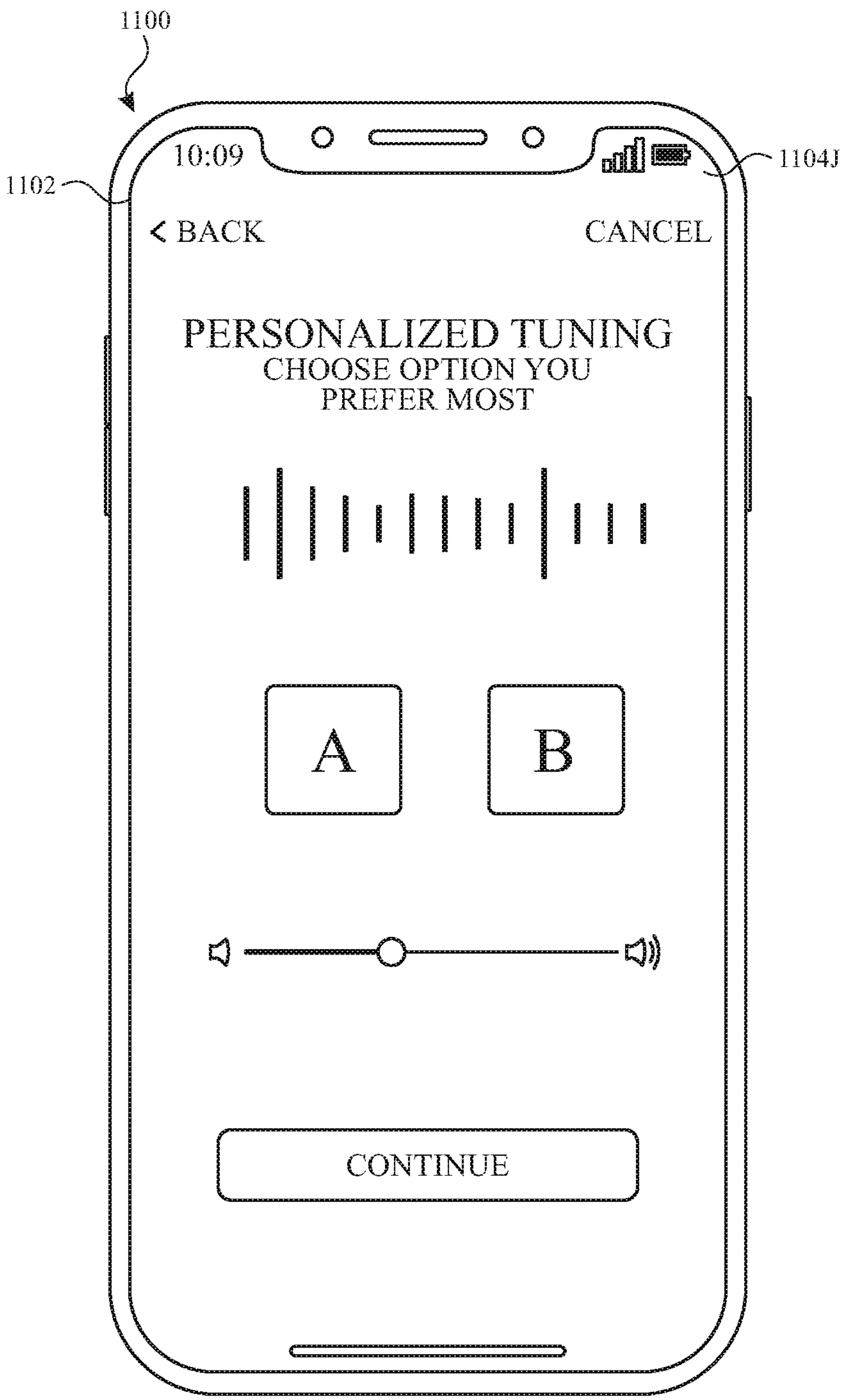
Figure 11K:
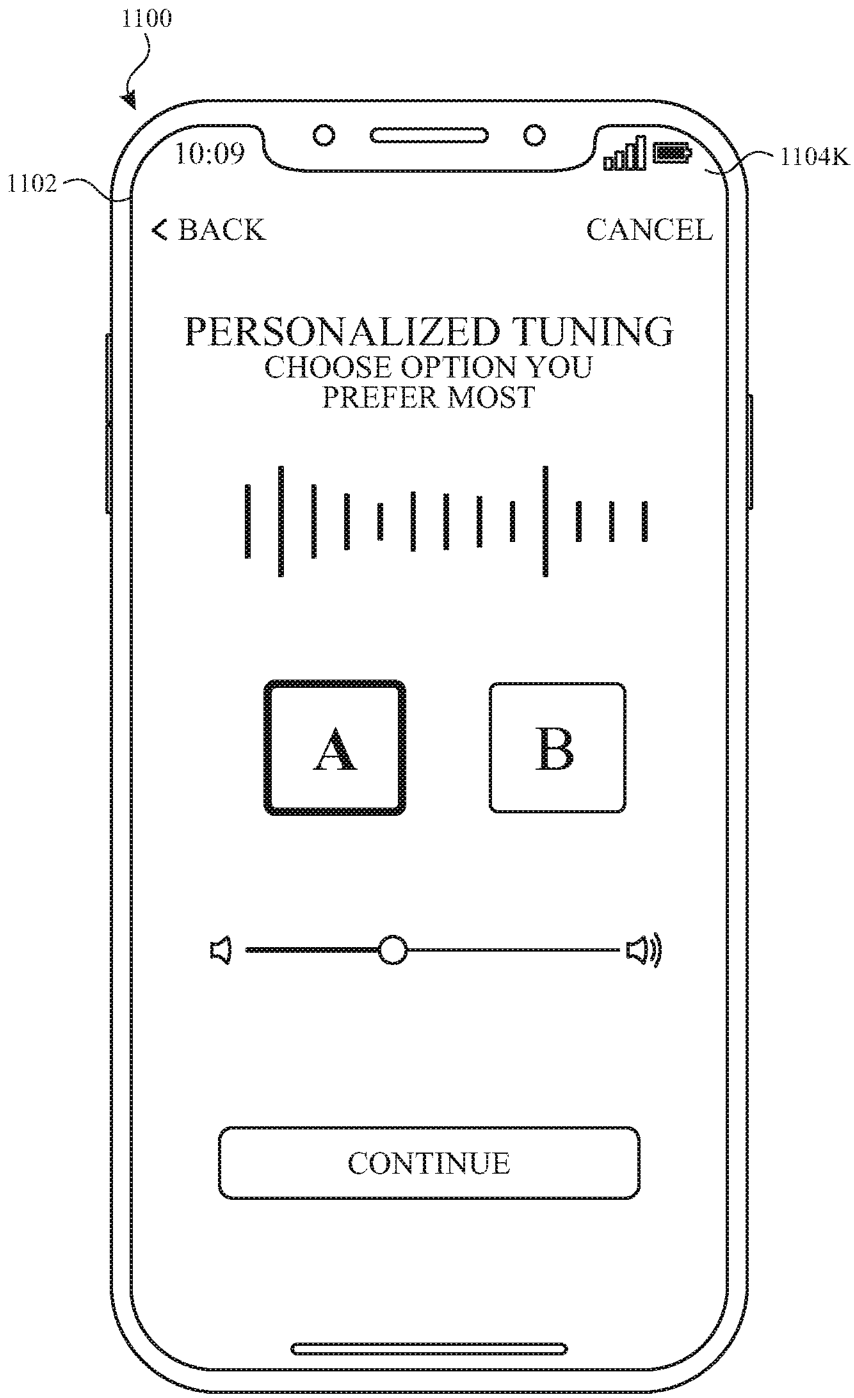
Figure 11L:
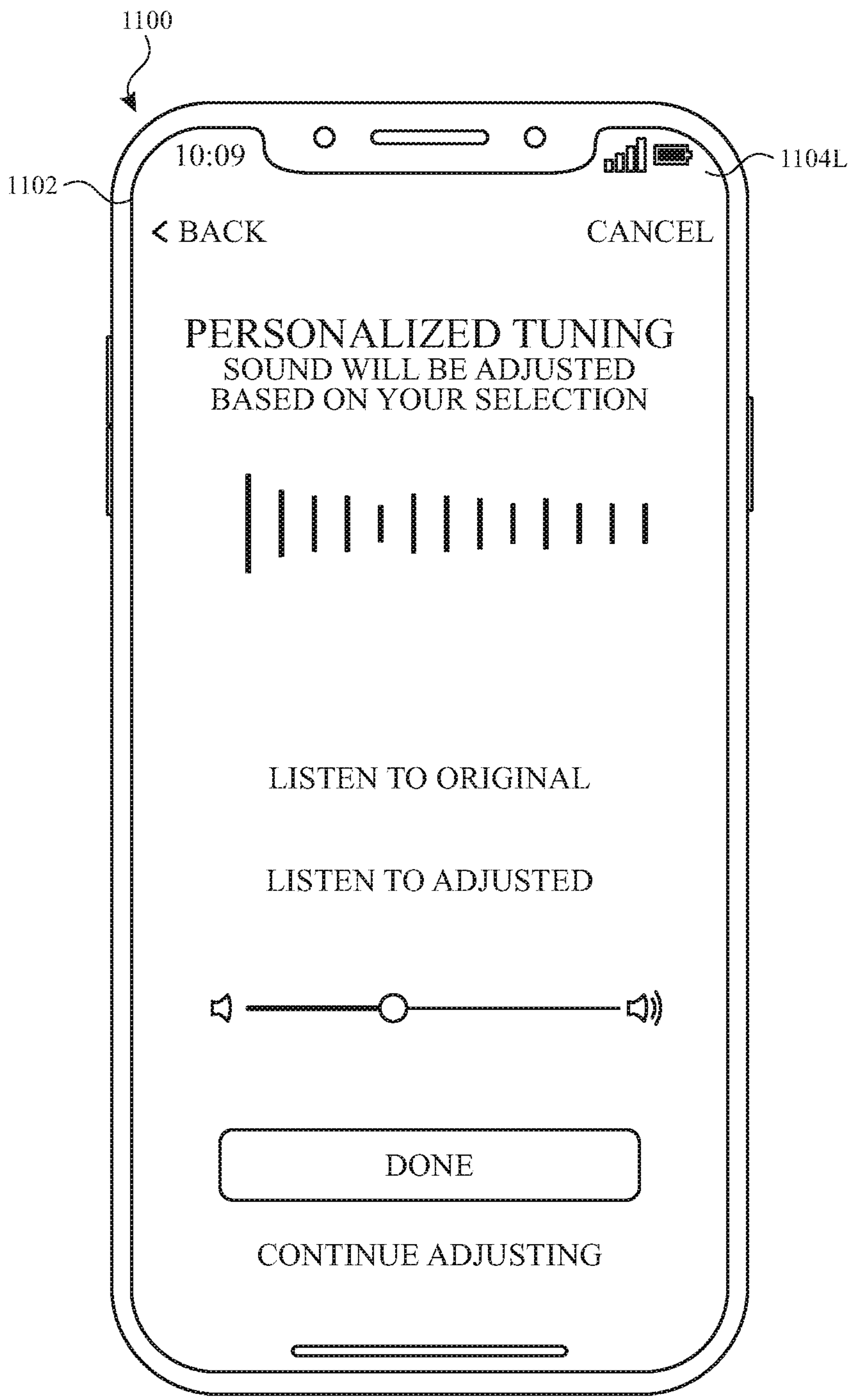

FIGS. 11A-11F depict user interfaces (e.g., 1104A-1104F) for accessing and displaying audiogram data (e.g., sets of data representing hearing impairment at various sound frequencies). In some embodiments, audiogram data is received at device 1100 from a third-party application. In some embodiments, audiogram data is inputted manually by a device user (e.g., via series of user inputs detected by device 1100). For example, FIGS. 11A and 11B illustrate user interfaces within a health application for accessing audiogram noise data. FIGS. 11C-11D illustrate techniques for displaying audiogram data and selecting or visually emphasizing portions of the data (e.g., a portion associated with a left or right side). FIGS. 11G-11L depict a series of user interfaces (e.g., 1104G-1104L) for using audiograms to personalize the audio output of device 1100 (e.g., output via devices associated with device 1100 such as connected headphones, integrated headsets or speakers, external speaker, and other media playback devices). For example, FIG. 11H depicts a technique for creating a hearing profile via an A-B testing process hearing test that is supplemented by stored audiogram data. In some embodiments, utilizing audiogram data shortens the process of creating a hearing profile or improves the accuracy the profile compared to a tuning process which does not leverage audiogram data.

Figure 12B:
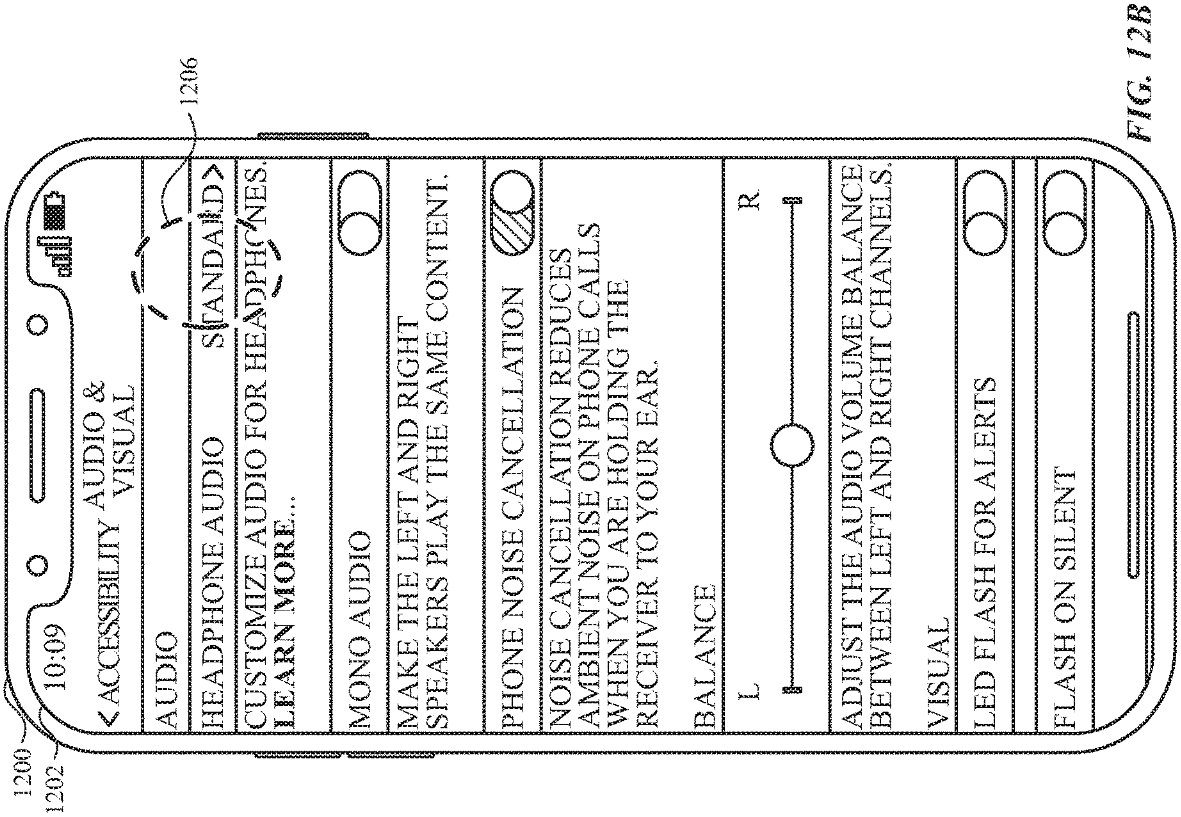
FIGS. 12A-12AN illustrate user interfaces for customizing audio settings based on user preferences, in accordance with some embodiments.
Figure 12A:
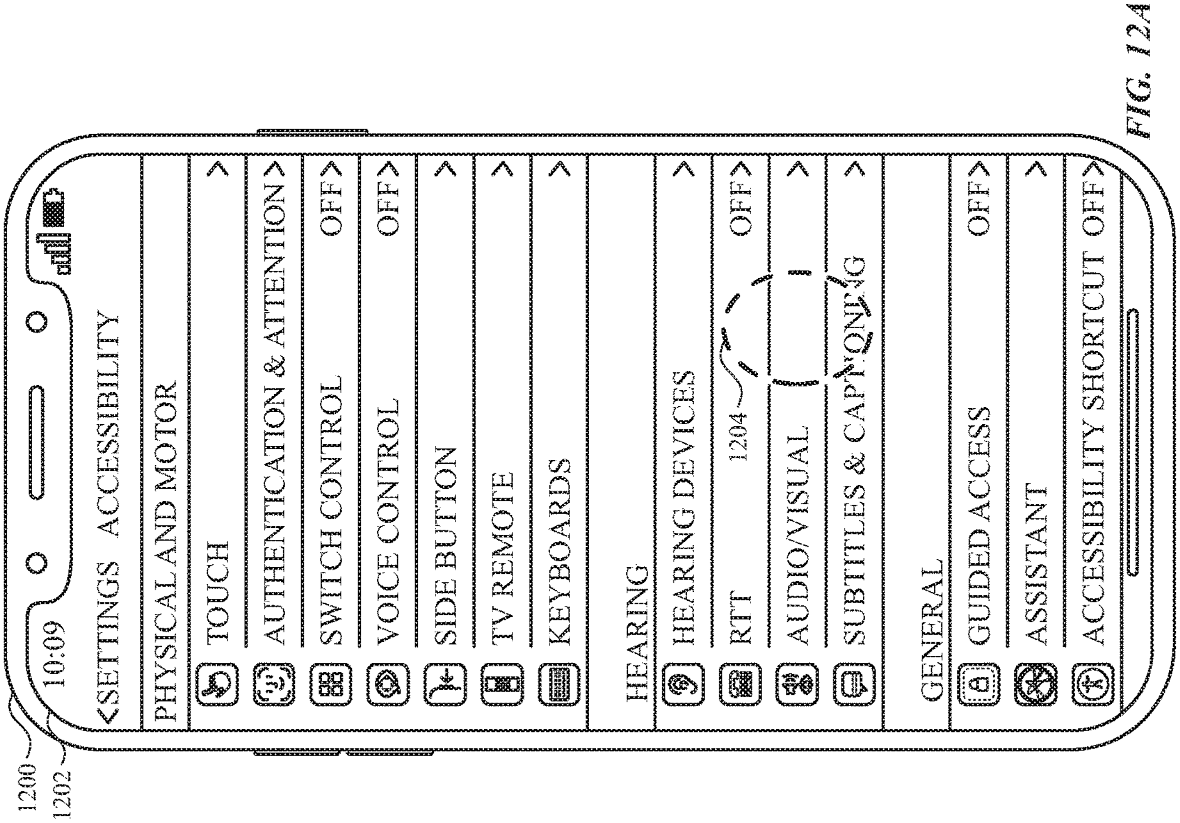

FIGS. 12A-12AN illustrate exemplary user interfaces for customizing audio settings based on user preferences, in accordance with some embodiments. The user interfaces in these figures are used to illustrate the processes described below, including the processes in FIG. 13.

FIGS. 12A-12AN, illustrate device 1200 displaying user interfaces on display 1202 (e.g., a display device or display generation component) for customizing audio settings based on user preferences. In some embodiments, device 1200 is the same as device 800, device 900, and device 1100. In some embodiments, device 1200 includes one or more features of devices 100, 300, or 500.

Figure 12C:
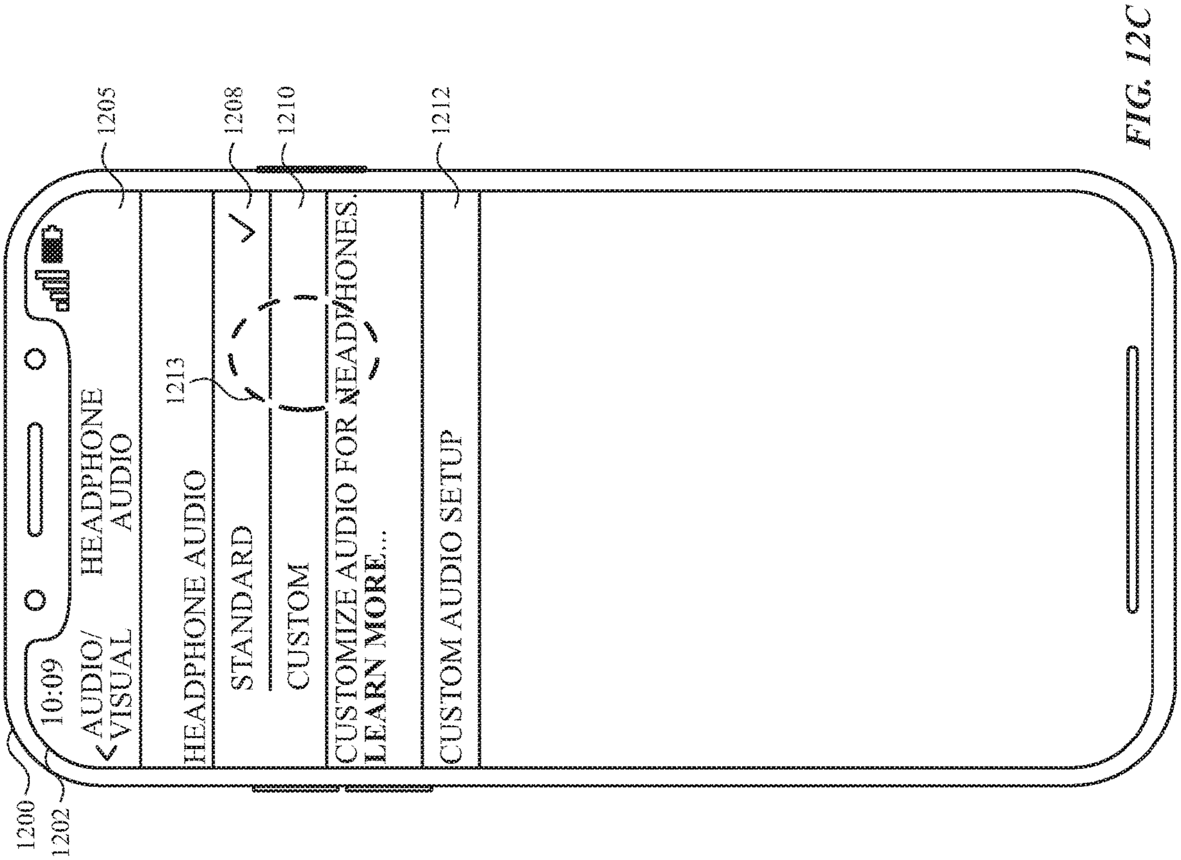

FIGS. 12A-12C depict example user interfaces for accessing headphone audio settings interface 1205 of FIG. 12C, in response to detecting input 1204 and input 1206 in FIGS. 12A and 12B, respectively.

In FIG. 12C, device 1200 displays, via display 1202, headphone audio settings interface 1205 shown with standard audio settings option 1208 selected. Accordingly, device 1200 currently applies standard (e.g., non-customized) audio settings for one or more connected headphone devices. Headphone audio settings interface 1205 also includes custom audio settings option 1210 and custom audio setup option 1212. Custom audio settings option 1210 is selectable to manually configure custom audio settings for connected headphone devices, and custom audio setup option 1212 is selectable to initiate a guided process for configuring customized audio settings.

Figure 12D:
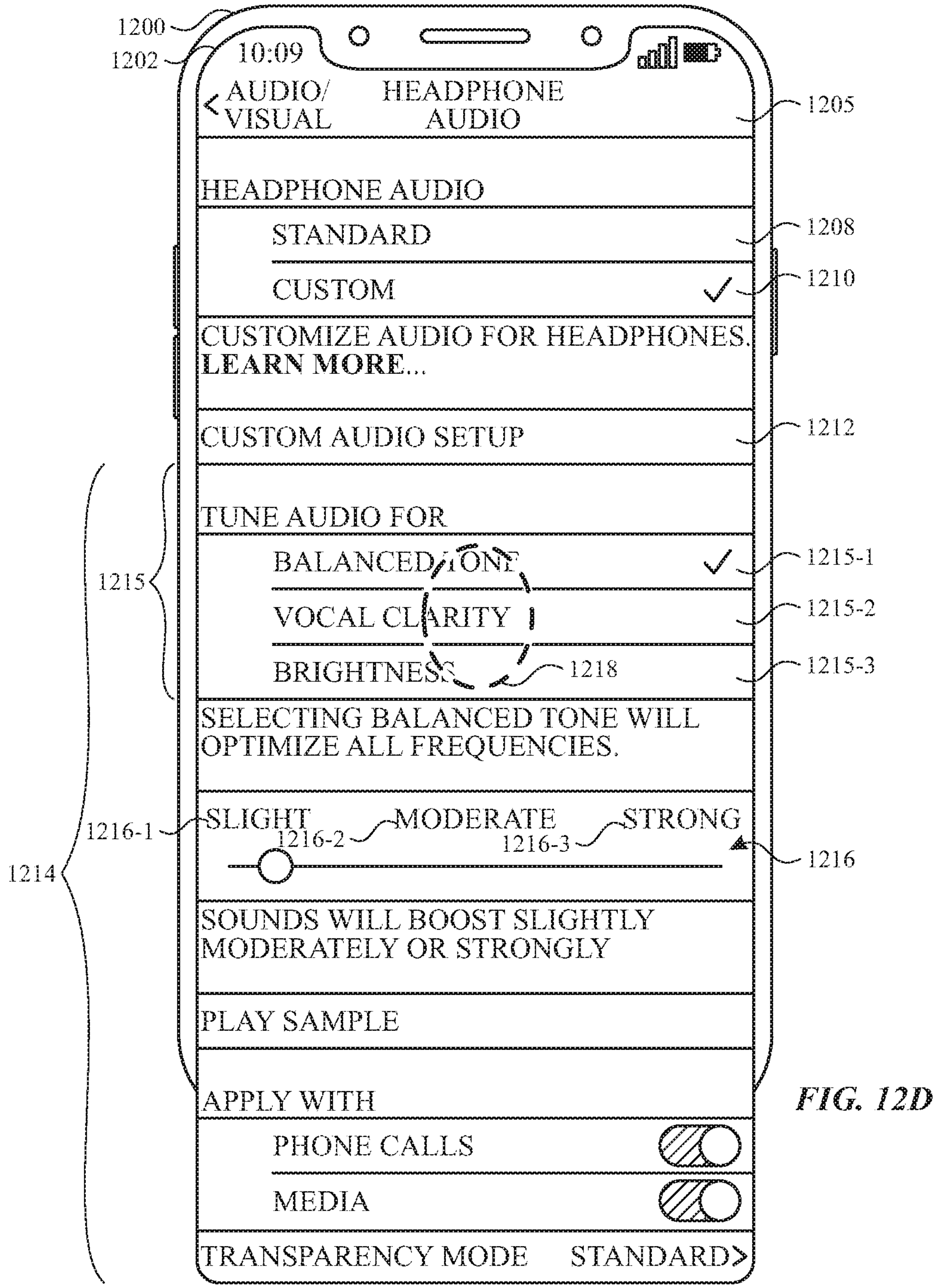

In FIG. 12C, device 1200 detects, via display 1202, input 1213 (e.g., a tap gesture) on custom audio settings option 1210 and, in response, selects custom audio settings option 1210 and displays customization options 1214 as shown in FIG. 12D. When custom audio settings option 1210 is selected, device 1200 applies customized audio settings for one or more connected headphone devices. In some embodiments, the customized audio settings are determined based on the settings indicated in customization options 1214.

In FIG. 12D, customization options 1214 include a set of audio options 1215 that can be selected and, in some embodiments, individually tuned (e.g., customized) using slider 1216 to select a boost level for each respective audio option. In some embodiments, the boost value for each selected audio option can be adjusted between slight 1216-1, moderate 1216-2, and strong 1216-3 by adjusting slider 1216. In some embodiments, audio options 1215 can include an option that corresponds to customized audio settings that based on the results of an audiometry test (e.g., an audiogram). In such embodiments, the settings of the audiogram cannot be changed using customization options 1214 and, consequently, slider 1216 is not displayed when the audiogram option is selected. The audiogram option is discussed in greater detail below.

In FIG. 12D, the set of audio options includes balanced tone option 1215-1, vocal clarity option 1215-2, and brightness option 1215-3. In some embodiments, balanced tone option 1215-1 can be selected to customize (e.g., using slider 1216) boost levels for a frequency range (e.g., tonal balance of frequencies ranging from, for example, 20 Hz to 20 KHz). In some embodiments, the custom setting (e.g., the boost level) of balanced tone option 1215-1 is applied across all frequencies of a connected headphone device. In some embodiments, vocal clarity option 1215-2 can be selected to customize boost levels for frequencies used for dialogue such as, for example, a range of 2 KHz to 8 KHz. In some embodiments, brightness option 1215-2 can be selected to customize boost levels for high frequencies such as, for example, a range of 2 KHz to 20 KHz.

Figure 12E:
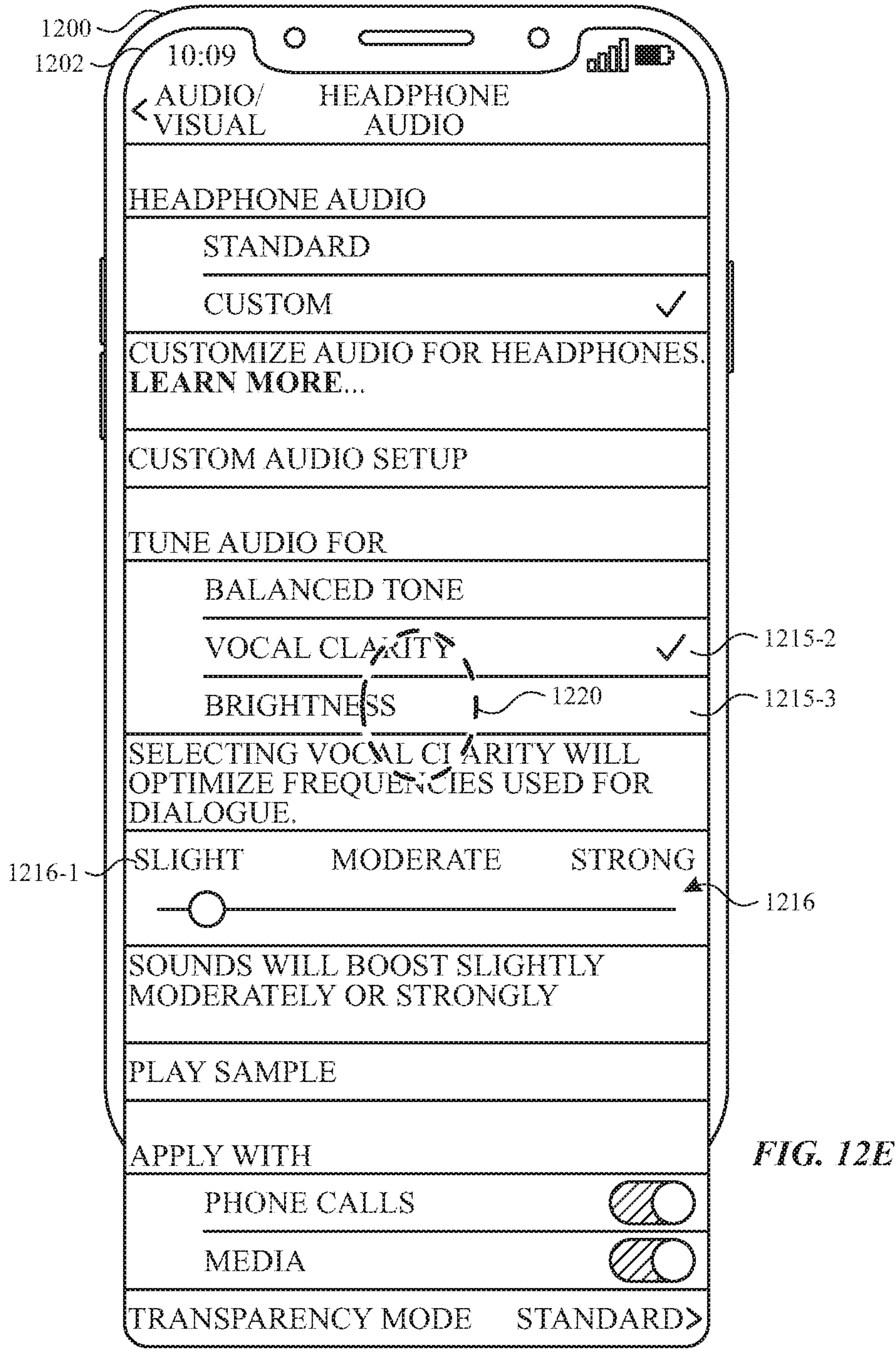
Figure 12F:
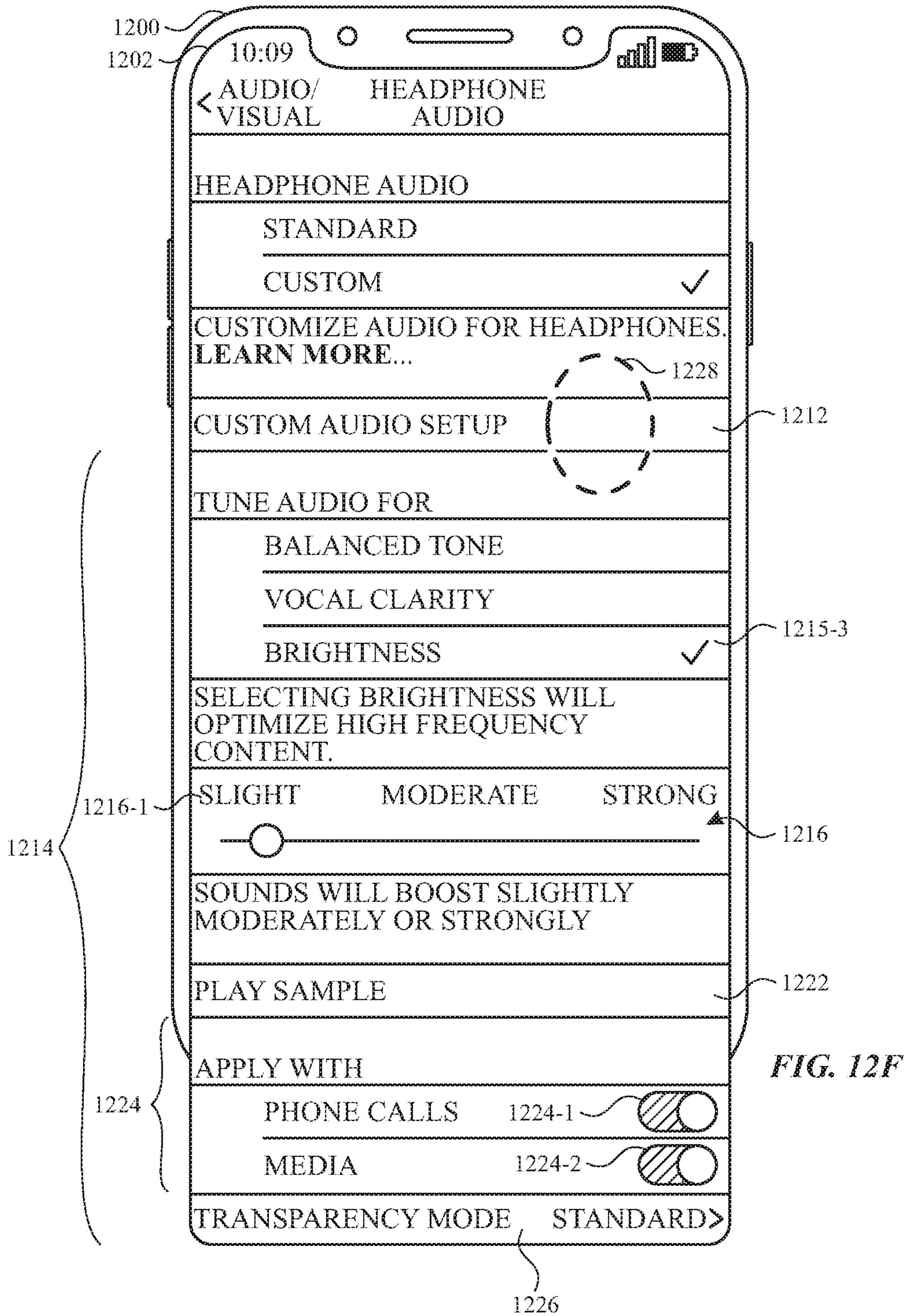

As shown in FIGS. 12D-12F, each of the audio options 1215 can be selected and, in response, device 1200 displays slider 1216 with the current boost level for the selected option. For example, in FIG. 12D, balanced tone option 1215-1 is selected and slider 1216 shows that the boost value for balanced tone is set to slight 1216-1. The boost value for balanced tone option 1215-1 can be adjusted using slider 1216.

In FIG. 12E, device 1200 displays vocal clarity option 1215-2 selected (in response to input 1218 in FIG. 12D), and slider 1216 shows that the current boost value for vocal clarity is set to slight 1216-1. The boost value for vocal clarity option 1215-2 can be adjusted using slider 1216.

In FIG. 12F, device 1200 displays brightness option 1215-3 selected (in response to input 1220 in FIG. 12D), and slider 1216 shows that the current boost value for brightness is set to slight 1216-1. The boost value for brightness option 1215-3 can be adjusted using slider 1216.

In some embodiments, slider 1216 can have a different appearance than that shown in headphone audio settings interface 1205. For example, slider 1216 can have additional setting positions such as "none," "very slight," or "very strong," or intermediate positions between "slight" and "moderate" and between "moderate" and "strong." In some embodiments, slider 1216 can be modified to include the ability to set a range of values. For example, slider 1216 can have two notches to set a high end of the range and a low end of the range. Additionally, in some embodiments, slider 1216 can be replaced or supplemented with other user interface objects for indicating a boost setting such as, for example, a field for entering a range of values (e.g., a numerical range) or a value (e.g., a numerical value) within a range of values.

As shown in FIG. 12F, customization options 1214 further include sample option 1222, application options 1224, and transparency mode setting 1226. Sample option 1222 is selectable to play an audio sample having the customized audio settings. In some embodiments, while the audio sample is played, a user can select different audio options 1215 and adjust the slider 1216 to modulate the audio sample while it is playing. Application options 1224 include phone calls toggle 1224-1 and media toggle 1224-2. Phone calls toggle 1224-1 is selectable to enable or disable the customized audio settings for phone calls. Media toggle 1224-2 is selectable to enable or disable the customized audio settings for media (e.g., music, video, movies, games). In some embodiments, when a respective application option 1224 is disabled, the standard audio settings are used for the disabled option. In FIG. 12F, both application options 1224 are enabled and the customized audio settings are, therefore, used for the respective options. Phone calls toggle 1224-1 and media toggle 1224-2 are non-limiting examples of application options 1224. In some embodiments, application options 1224 can include different application options (e.g., different types of media) that can be selected for enabling or disabling the audio settings for an application associated with the respective option. Transparency mode setting 1226 is selectable to customize audio settings for ambient sound, as discussed in greater detail below.

In FIG. 12F, device 1200 detects input 1228 on custom audio setup option 1212 and, in response, initiates a process for configuring customized audio settings based on user preferences of various audio samples having different audio characteristics. User interfaces for various embodiments of this custom audio setup process are depicted in FIGS. 12G-12AE.

Figure 12H:
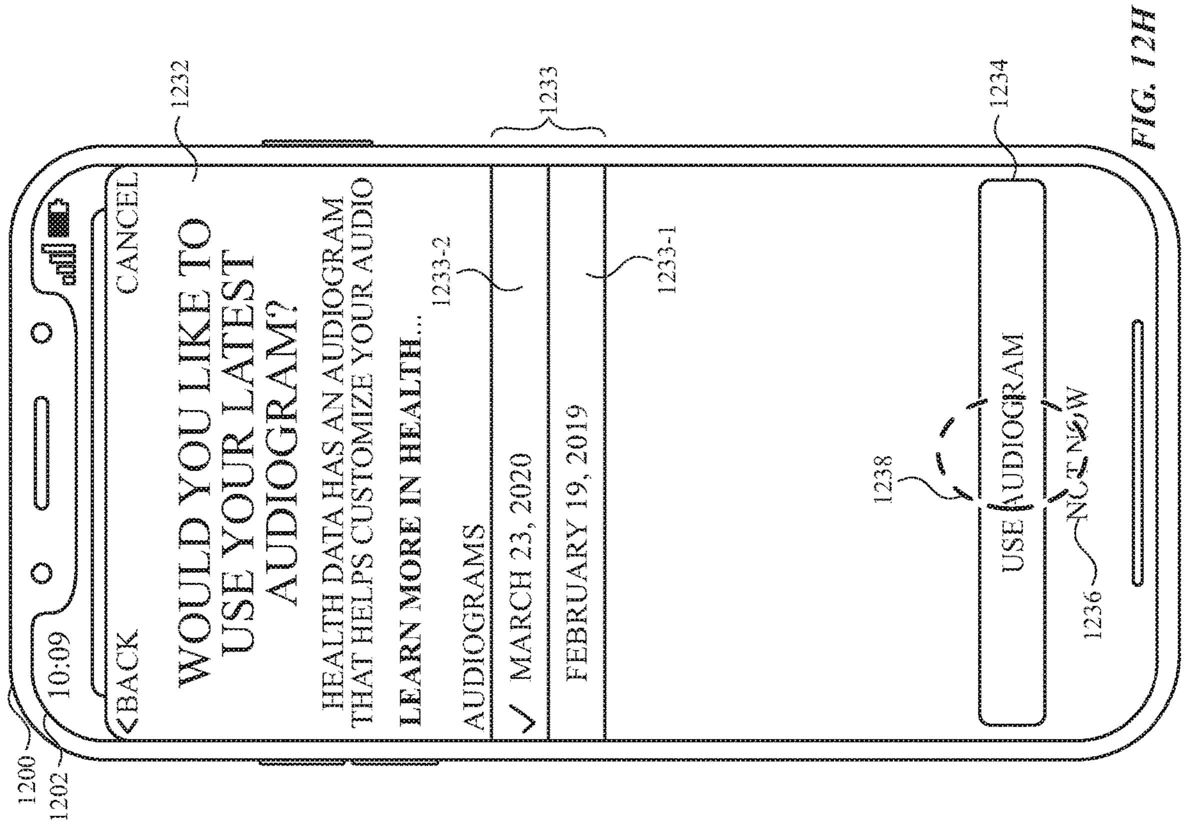
Figure 12G:
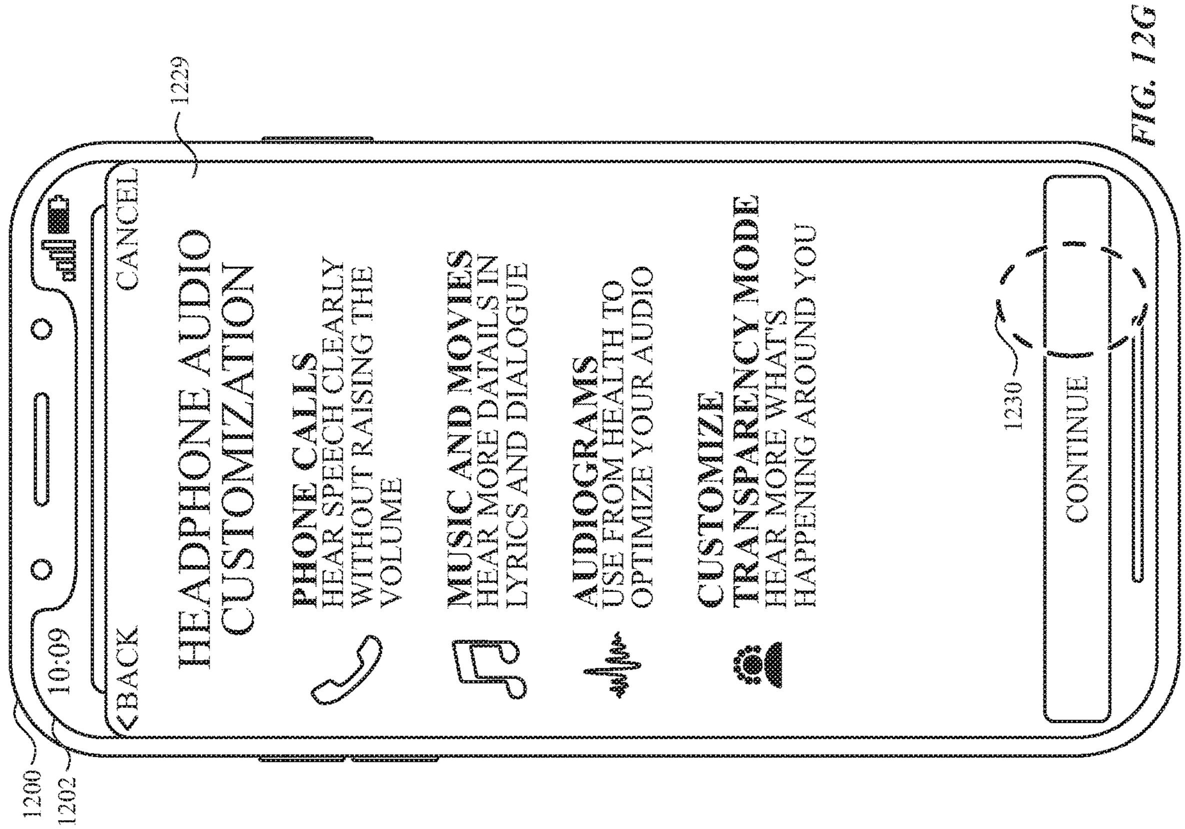

Referring now to FIG. 12G, device 1200 displays introductory interface 1229 in response to input 1228. Introductory interface 1229 indicates that the customization process can be used to customize headphone audio settings for phone calls, media, and ambient audio, and that the customization process can incorporate audiogram results. In some embodiments, introductory interface 1229 is not displayed in response to input 1228. For example, in some embodiments, device 1200 displays introductory interface 1229 only the first time the user selects custom audio setup option 1212. In such embodiments, device 1200 instead displays the interface shown in FIG. 12H or 12K in response to the selection of custom audio setup option 1212.

In FIG. 12G, device 1200 detects input 1230 and, in response, displays audiogram interface 1232. Audiogram interface 1232 includes a listing of various audiograms 1233 that are available for a user account associated with device 1200. For example, in FIG. 12G the user's account includes audiogram 1233-1 from an audiometry test performed Feb. 19, 2019, and audiogram 1233-2 from an audiometry test performed Mar. 23, 2020. The user can select which audiogram the user would like to use to customize the audio settings. The most recent audiogram is selected by default, as shown in FIG. 12H. In some embodiments, the audiograms are provided to the user account by a medical professional or healthcare provider. In some embodiments, audiogram interface 1232 is not displayed if the user account does not include any audiograms. In such embodiments, device 1200 instead displays the interface shown in FIG. 12K (e.g., in response to input 1228 or input 1230).

Audiogram interface 1232 includes option 1234 for choosing to use a selected audiogram to customize the audio settings and option 1236 for choosing not to use an audiogram to customize the audio settings. In FIG. 12H, device 1200 detects input 1238 on option 1234 to use selected audiogram 1233-2 to customize the audio settings. In response to detecting input 1238, device 1200 terminates the custom audio setup process, applies custom audio settings based on the selected audiogram, and displays headphone audio settings interface 1205, as shown in FIG. 12I. In some embodiments, prior to displaying the interface in FIG. 12I, device 1200 displays the user interface shown in FIG. 12AE to allow the user to customize ambient audio settings. In some embodiments, prior to displaying the interface in FIG. 12I, device 1200 displays an interface similar to recommendation interface 1280, discussed in greater detail below with respect to FIGS. 12AC and 12AD, but instead including options for comparing the standard audio settings with audio settings that are based on the audiogram, and including options for selecting the standard audio settings or the customized settings that are based on the audiogram.

In FIG. 12I, audio options 1215 is now shown updated with selected audiogram option 1215-4. Because audiogram option 1215-4 is selected, device 1200 customizes the audio settings based on the results of the audiogram, which are not configurable by the user (e.g., using headphone audio settings interface 1205). Accordingly, slider 1216 is not displayed. In some embodiments, audio options 1215 include audiogram option 1215-4 when an audiogram is available to use for customizing the audio settings, otherwise audiogram option 1215-4 is not displayed.

Figure 12J:
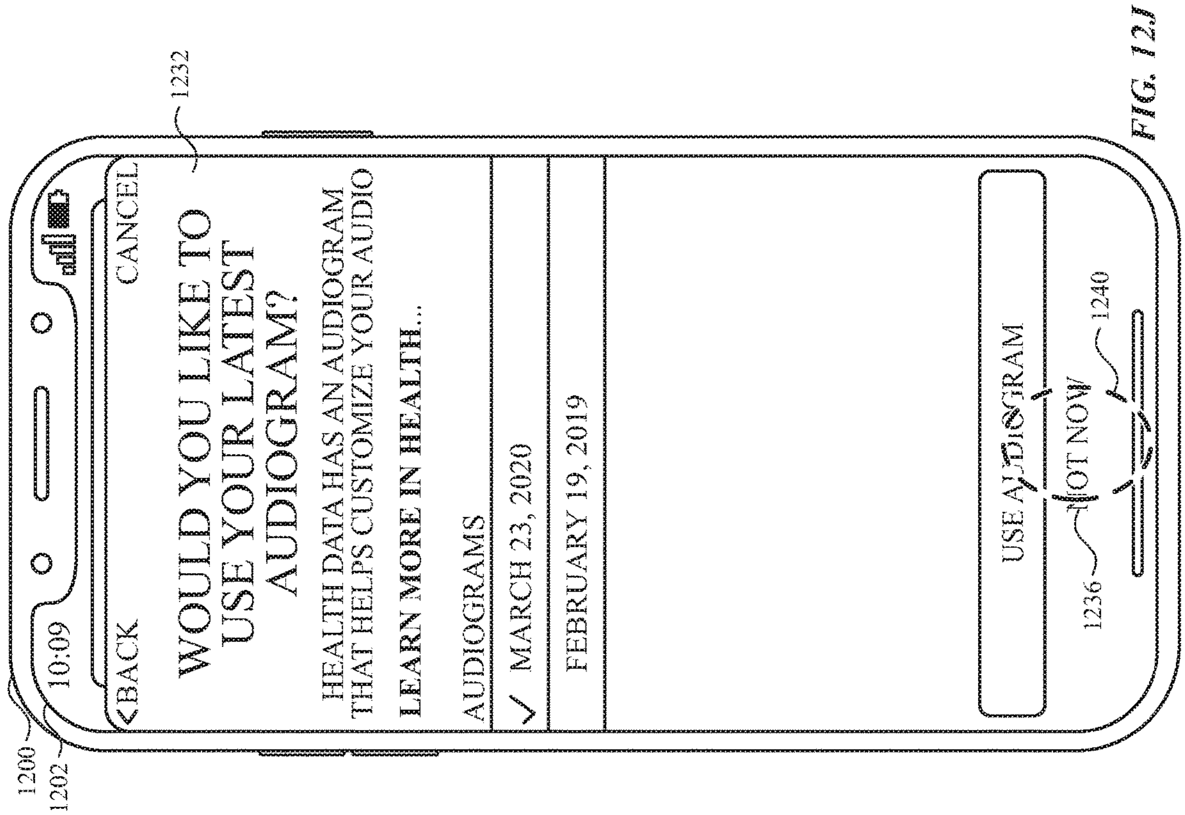
Figure 12I:
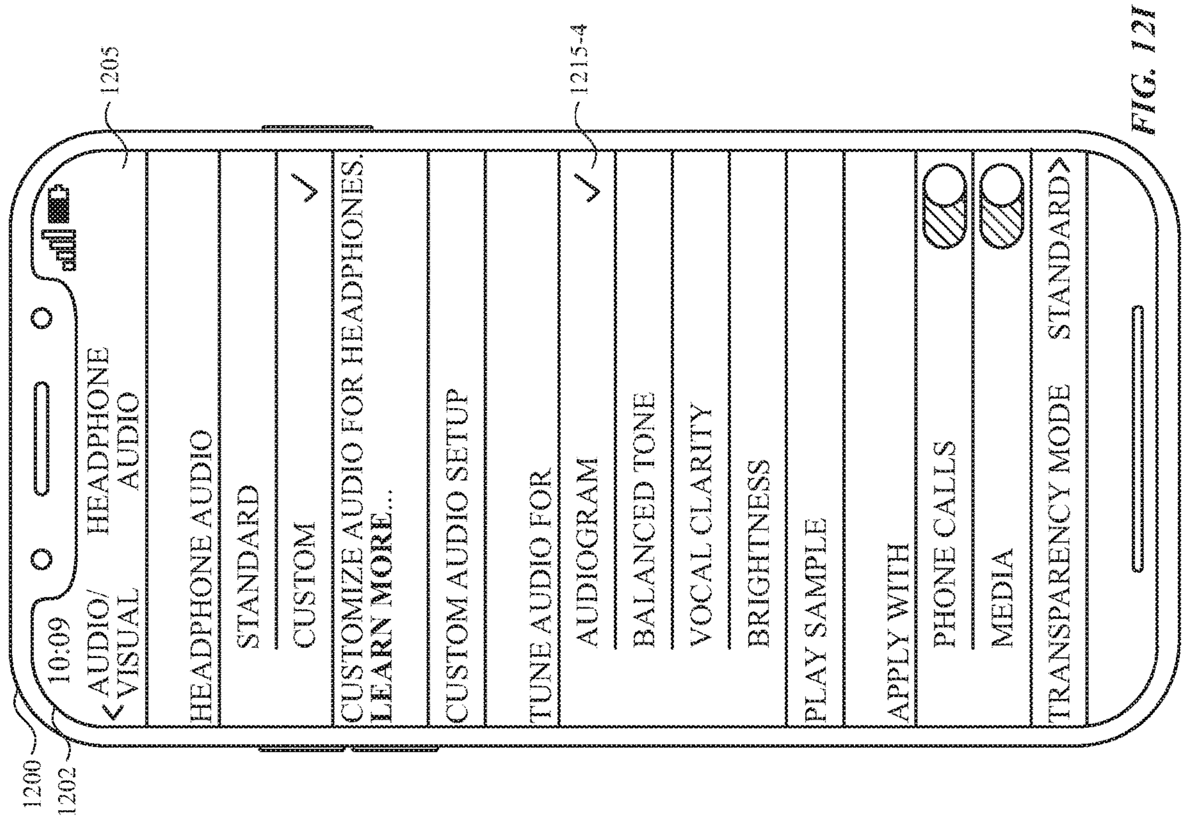

In FIG. 12J, device 1200 depicts an embodiment in which an audiogram is not used for customizing the audio settings, and the device instead continues to the custom audio setup process in response to input 1240 on option 1236.

Figure 12L:
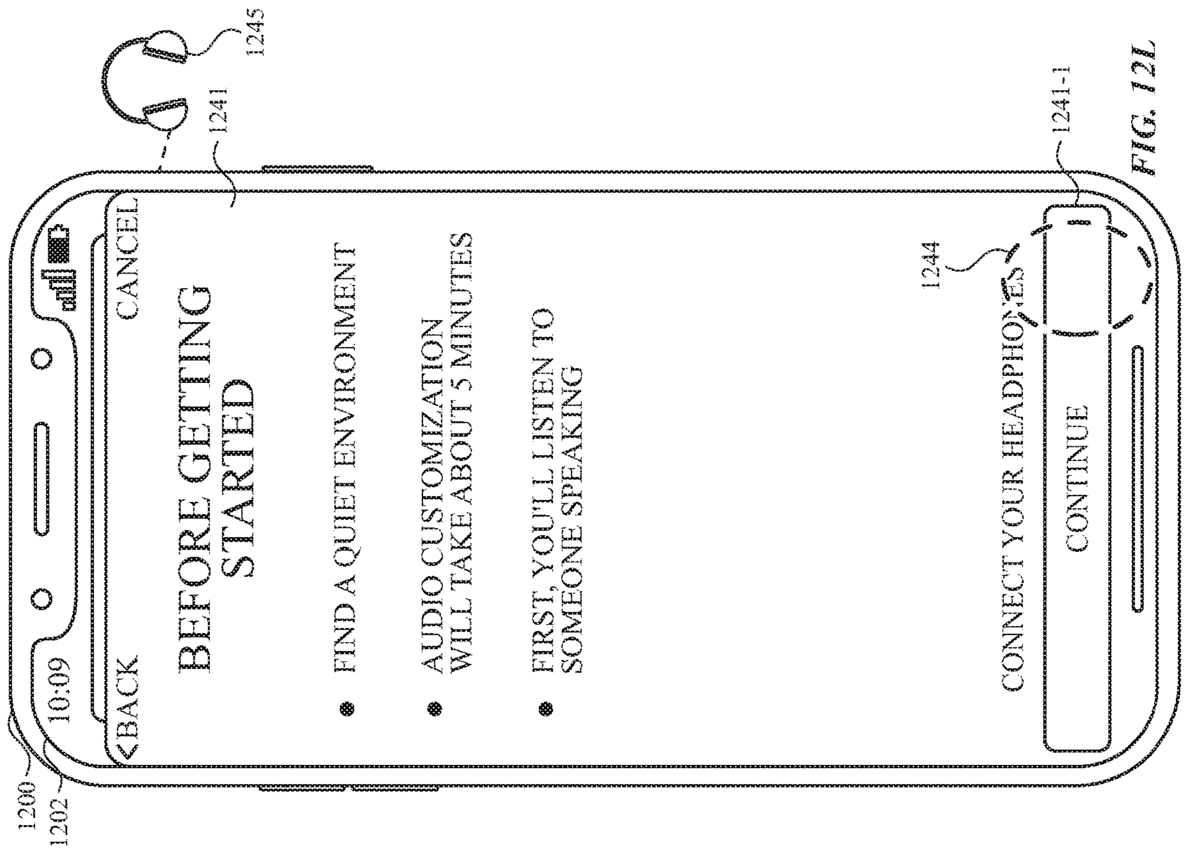
Figure 12K:
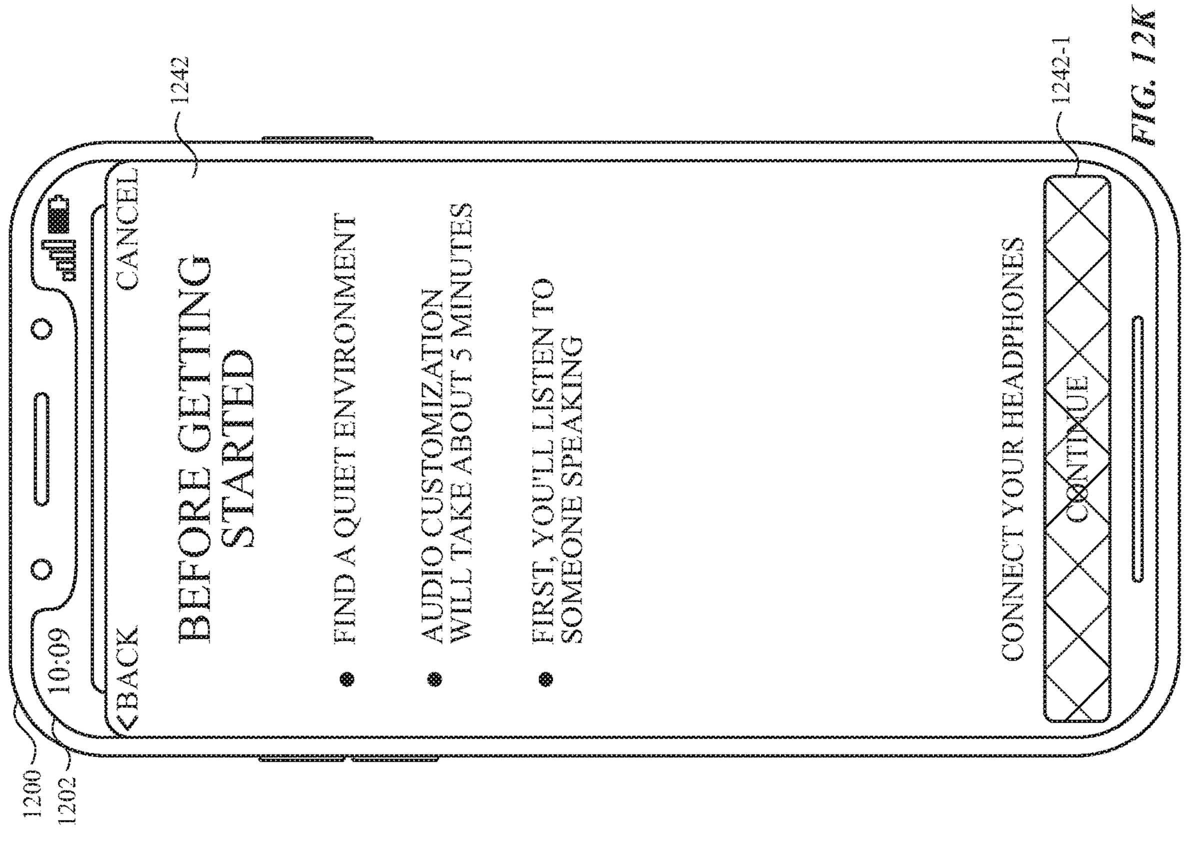

In FIG. 12K, device 1200 displays instruction interface 1242, which includes continue affordance 1242-1, currently depicted unavailable for selection because a headphone device is currently not connected to device 1200.

In FIG. 12L, device 1200 is coupled (e.g., via a wireless connection) to (e.g., paired to, connected to, in communication with, or actively exchanging data with) headphones device 1245, and continue affordance 1242-1 is shown available for selection. Device 1200 detects input 1244 on continue affordance 1242-1 and, in response, commences the custom audio setup process.

In some embodiments, the custom audio setup process includes two phases: 1) an amplification phase, and 2) a tone adjustment phase. In some embodiments, device 1200 uses the amplification phase to determine what volume a user can hear. In some embodiments, device 1200 uses the tone adjustment phase to determine what audio tones are preferred by a user. In some embodiments, device 1200 recommends one or more adjustments to the audio settings (e.g., tone balance, vocal clarity, brightness) based on the results of the two phases of the custom audio setup process. For example, device 1200 can recommend boosting tone balance slightly, moderately, or strongly. As another example, device 1200 can recommend boosting vocal clarity slightly, moderately, or strongly. As yet another example, device 1200 can recommend boosting brightness slightly, moderately, or strongly. In some embodiments, device 1200 can recommend adjustments to any combination of tone balance, vocal clarity, and brightness. In some embodiments, the tone adjustment phase determines whether adjustments are recommended for tone balance, vocal clarity, and/or brightness, based on the user's preferences. In some embodiments, the results of the amplification phase affect the tone adjustment phase. For example, in some embodiments, results of the amplification phase dictate whether a recommended tone adjustment is slight, moderate, or strong.

Figure 12N:
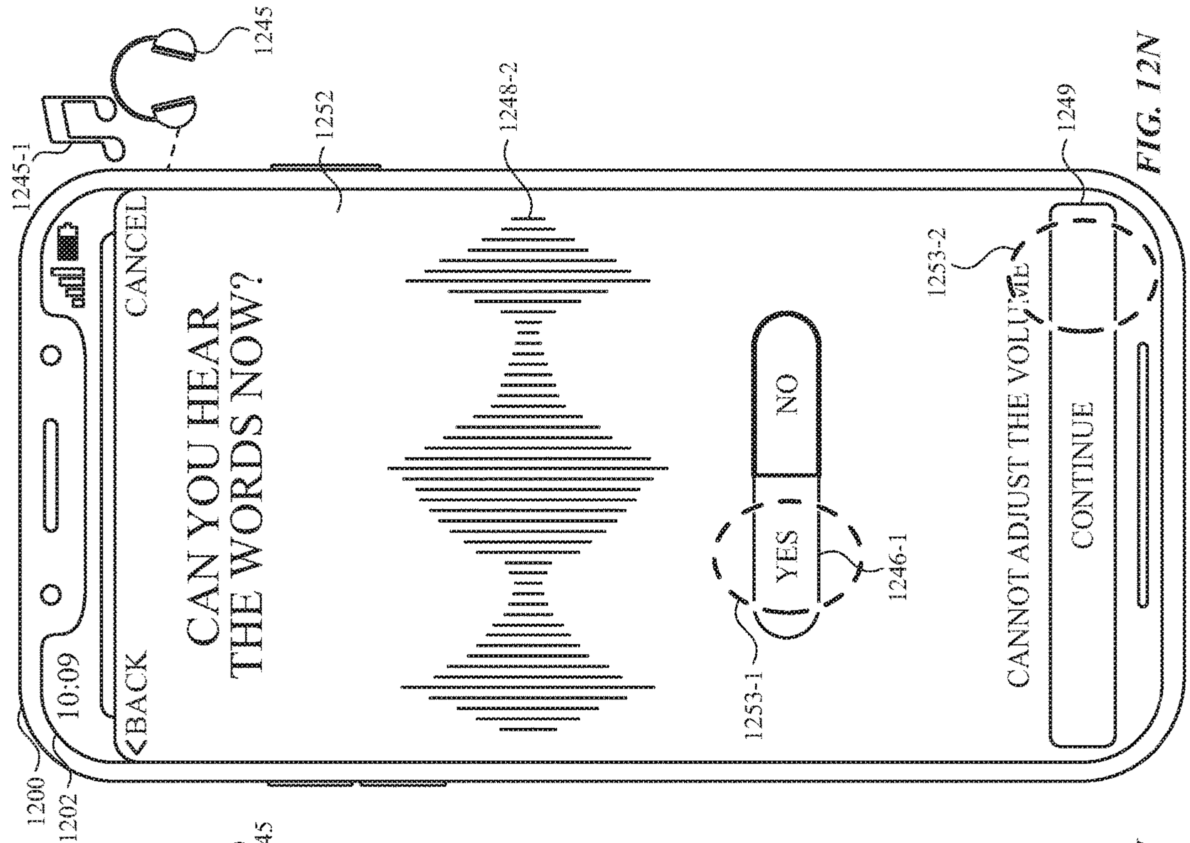
Figure 12M:
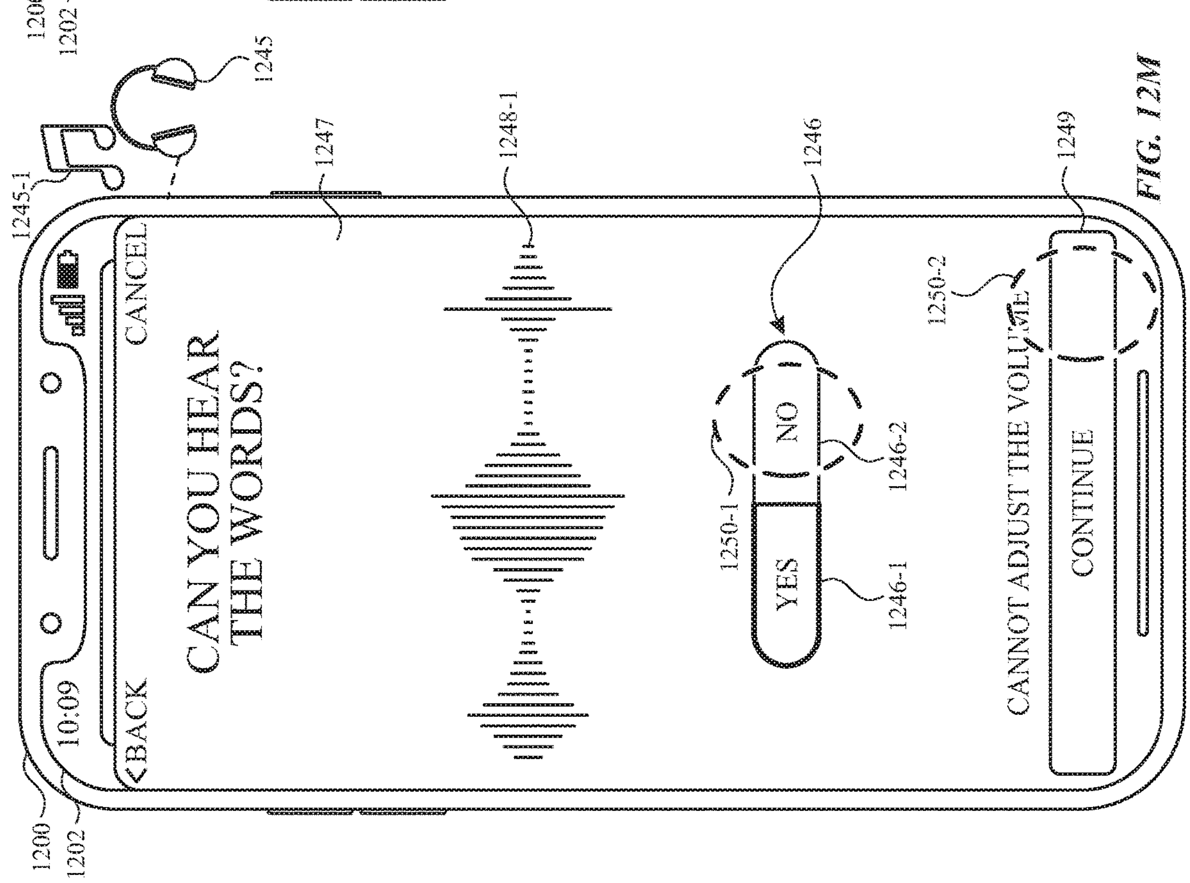

In FIGS. 12M and 12N, device 1200 depicts interfaces for the amplification phase of the custom audio setup process. During the amplification phase, device 1200 generates an audio output at different volumes to determine what volume can be heard by a user. In some embodiments, the audio is a looping playback of a voice saying "hello." In the embodiments illustrated in FIGS. 12M-12AN, sound graphic

1245-1 is used to indicate when audio is produced at headphones device 1245. In some embodiments, device 1200 displays a waveform (e.g., waveform 1248-1 in FIG. 12M) having movement to indicate to the user that audio is being played, even if the user is unable to hear it.

In FIG. 12M, device 1200 displays first amplification comparison interface 1247 and produces audio at a low sound level. Interface 1247 instructs the user to indicate whether they can hear the audio, which is produced at headphones device 1245 and visually represented by waveform 1248-1. Device 1200 also displays toggle selector 1246, with yes toggle 1246-1 and no toggle 1246-2, for indicating, in combination with continue affordance 1249, whether the user is able to hear the audio.

In the embodiment depicted in FIG. 12M, if the user indicates they can hear the audio (e.g., by selecting continue affordance 1249 when yes toggle 1246-1 is selected), device 1200 terminates (e.g., completes) the amplification phase and proceeds to the tone adjustment phase. In this scenario, the amplification setting will be slight, because the user indicated they are able to hear the low sound level.

In FIG. 12M, device 1200 detects input 1250-1 (e.g., tap gesture) on no toggle 1246-2, followed by input 1250-2 (e.g., tap gesture) on continue affordance 1249. In this scenario, the user indicates they are unable to hear the low sound level, and the amplification phase continues in FIG. 12N.

In FIG. 12N, device 1200 displays second amplification comparison interface 1252 and produces (at headphones device 1245) audio at a medium sound level. Interface 1252 again instructs the user to indicate whether they can hear the audio, which is visually represented by waveform 1248-2, having greater amplitude than waveform 1248-1. If the user indicates they can hear the audio, the amplification setting will be moderate, because the user indicated they are able to hear the medium sound level. If the user indicates they cannot hear the audio, the amplification setting will be strong.

In FIG. 12N, device 1200 detects input 1253-1 (e.g., tap gesture) on yes toggle 1246-1, followed by input 1253-2 (e.g., tap gesture) on continue affordance 1249. In this scenario, the user indicates they are able to hear the medium sound level.

In some embodiments, the setting of toggle selector 1246 persists until it is changed by a selection of the unselected toggle. For example, in FIG. 12M, no toggle 1246-2 is selected, and remains selected when second amplification comparison interface 1252 is displayed in FIG. 12N. In some embodiments, however, the setting of toggle selector 1246 is reset for each comparison. For example, the toggle resets to having yes toggle 1246-1 selected when second amplification comparison interface is displayed.

In FIGS. 120-12AD, device 1200 depicts interfaces for the tone adjustment phase of the custom audio setup process. During the tone adjustment phase, device 1200 generates sets of audio comparisons. Each comparison features two audio samples of a same sound (e.g., a looping playback of music), with each sample having audio characteristics that are different from those of the other sample. For each comparison, device 1200 instructs the user to select which audio sample they prefer and, based on their selections, recommends customized audio settings (e.g., adjustments to one or more of balanced tone, vocal clarity, or brightness) to optimize the user's preferences. In some embodiments, device 1200 recommends standard audio settings based on the user's selections and, consequently, terminates the tone adjustment phase after two comparisons. An example of such an embodiment is depicted in FIGS. 12P-12T.

Figure 12P:
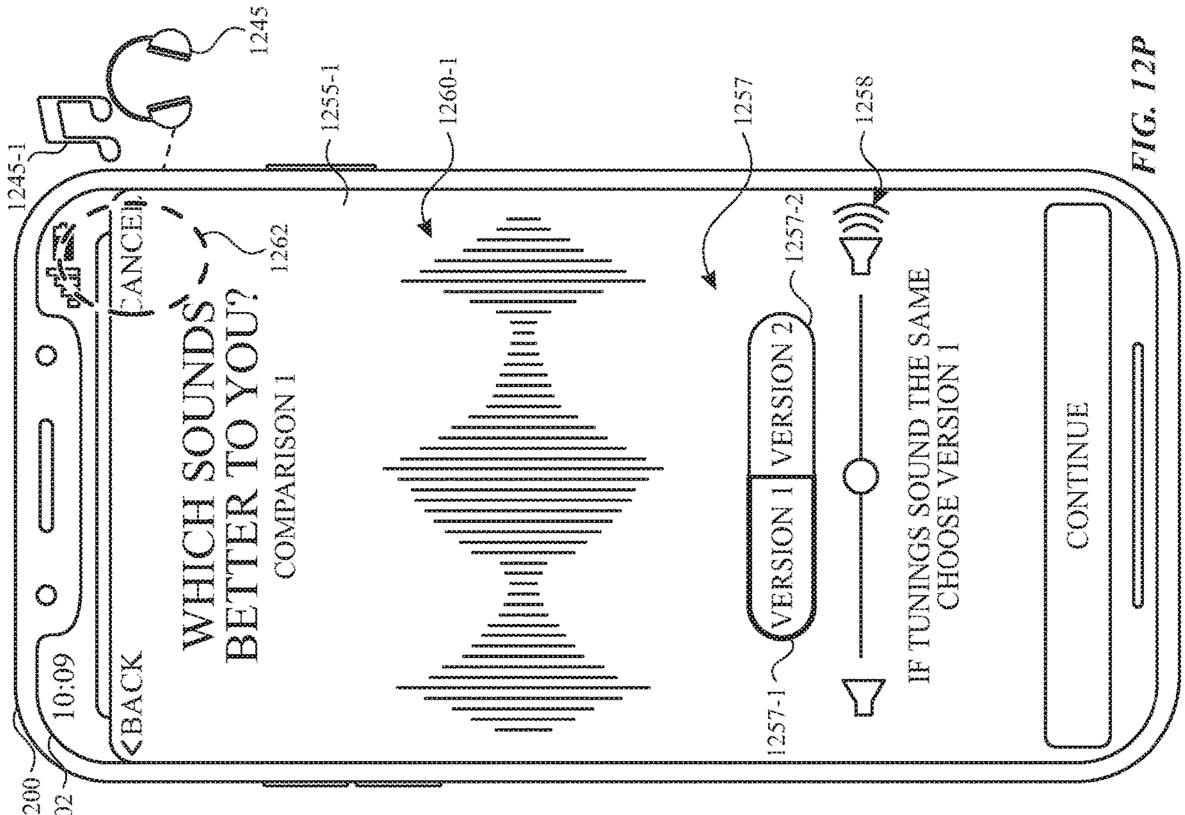
Figure 12O:
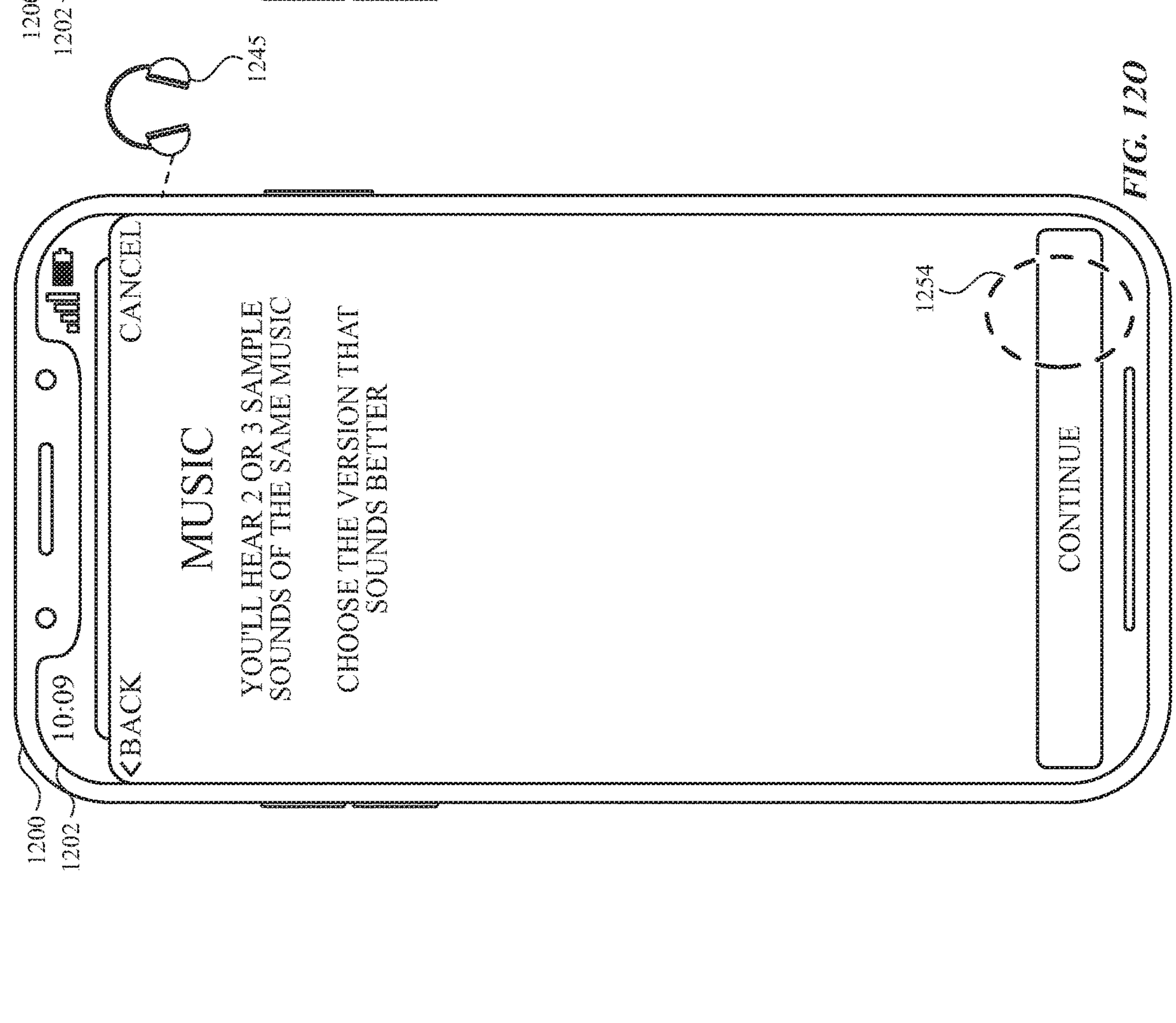

In response to detecting input 1254 in FIG. 12O, device 1200 displays first comparison interface 1255-1 and produces music at headphones device 1245, as shown in FIG. 12P. Interface 1255-1 instructs the user to indicate whether they prefer a first version of the audio, or a second version of the audio. Interface 1255-1 includes toggle selector 1257 having version one toggle 1257-1 for selecting the first version of the audio in the comparison, and version two toggle 1257-2 for selecting the second version of the audio in the comparison. When the first version of the audio is selected, the music is played at headphones device 1245 having the audio characteristics that correspond to the first version of the audio. Similarly, when the second version of the audio is selected, the music is played at headphones device 1245 having the audio characteristics that correspond to the second version of the audio. While music continues to play, the user can toggle between the first version and the second version, and the audio characteristics of the music change based on the selection. For example, the pitch changes when the second version is selected, then changes back when the first version is selected. By toggling between the two versions of the audio in the comparison, the user can compare the different versions and select the one they prefer. In some embodiments, device 1200 instructs the user to select the first version, if both versions sound the same to the user.

Interface 1255-1 also includes volume slider 1258 for adjusting a volume of the audio being played at headphones device 1245. In some embodiments, the volume setting in interface 1255-1 is determined based on the results of the amplification phase. For example, if the amplification is moderate, the tab of volume slider 1258 is positioned in the middle as shown in FIG. 12P. In some embodiments, the results of the amplification phase determine a baseline volume, and volume slider 1258 makes adjustments to the baseline volume. In some embodiments, changes to volume slider 1258 alter (e.g., redefine) the results of the amplification phase. In some embodiments, the amplification phase illustrated in FIGS. 12M and 12N is optional. In such embodiments, amplification can instead be determined based on the setting of volume slider 1258.

Each comparison interface includes a waveform providing a visual representation of the audio sample being produced at headphones device 1245. For example, in first comparison interface 1255-1, waveform 1260-1 represents the first version of the audio sample in the first comparison, and waveform 1260-2 (shown in FIG. 12V), represents the second version of the audio sample in the first comparison.

In FIG. 12P, device 1200 detects input 1262 selecting an option to cancel the custom audio setup process and, in response, displays confirmation interface 1263, encouraging the user to complete the custom audio setup process. In response to detecting input 1264, device 1200 returns to first comparison interface 1255-1 in FIG. 12R.

Figure 12R:
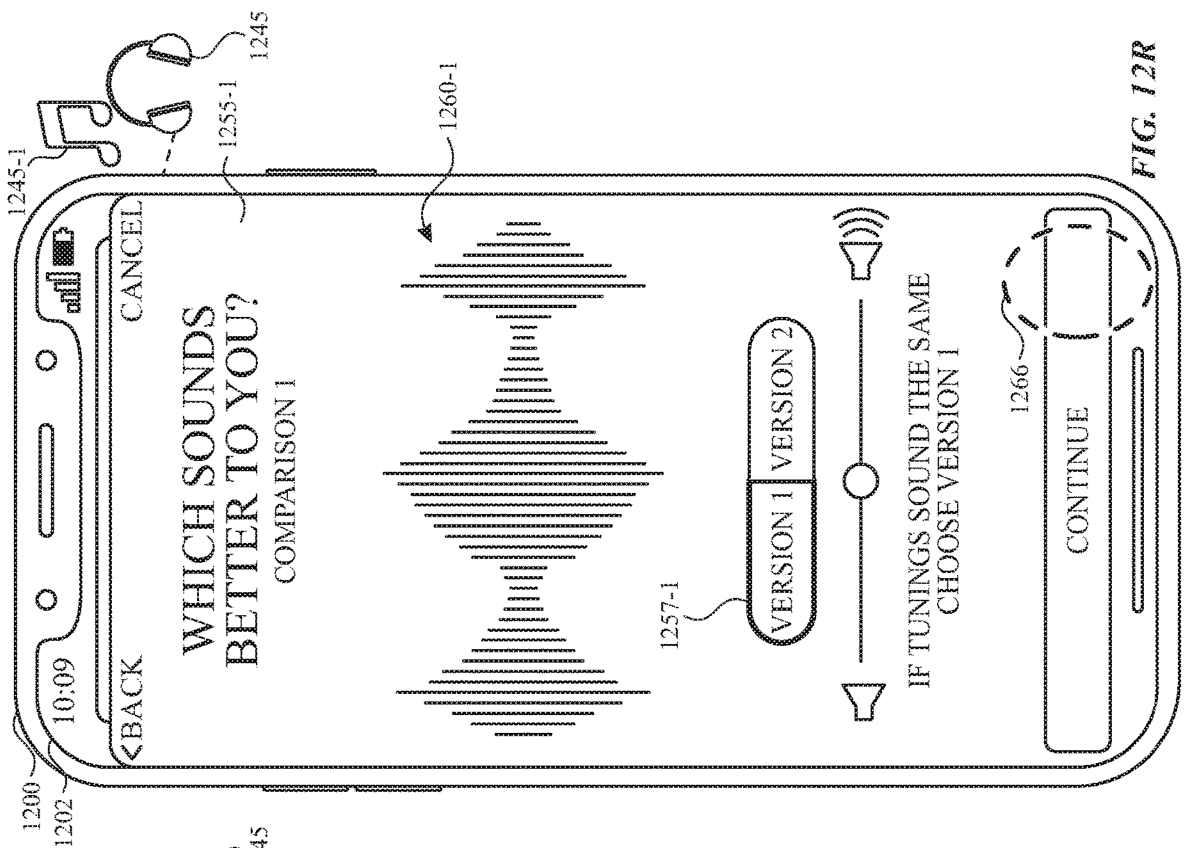
Figure 12Q:
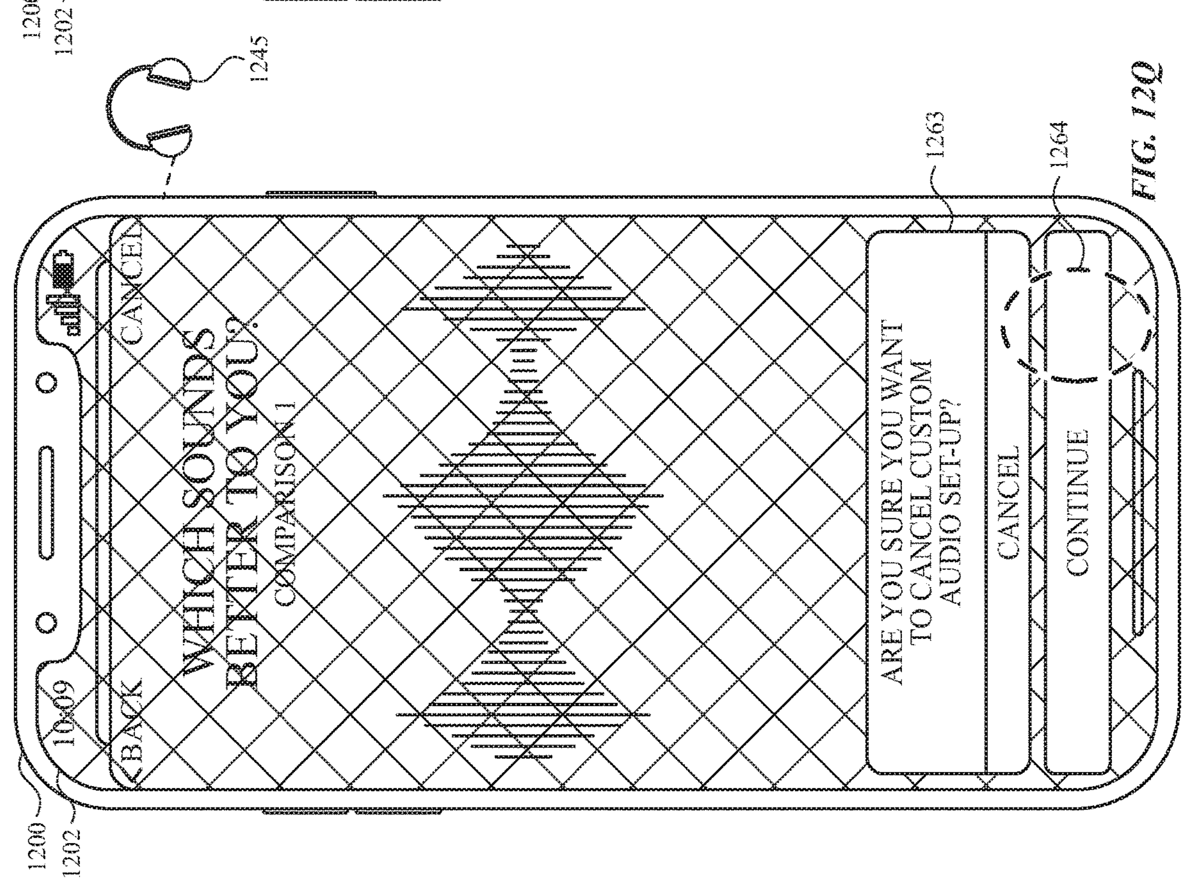
Figure 12T:
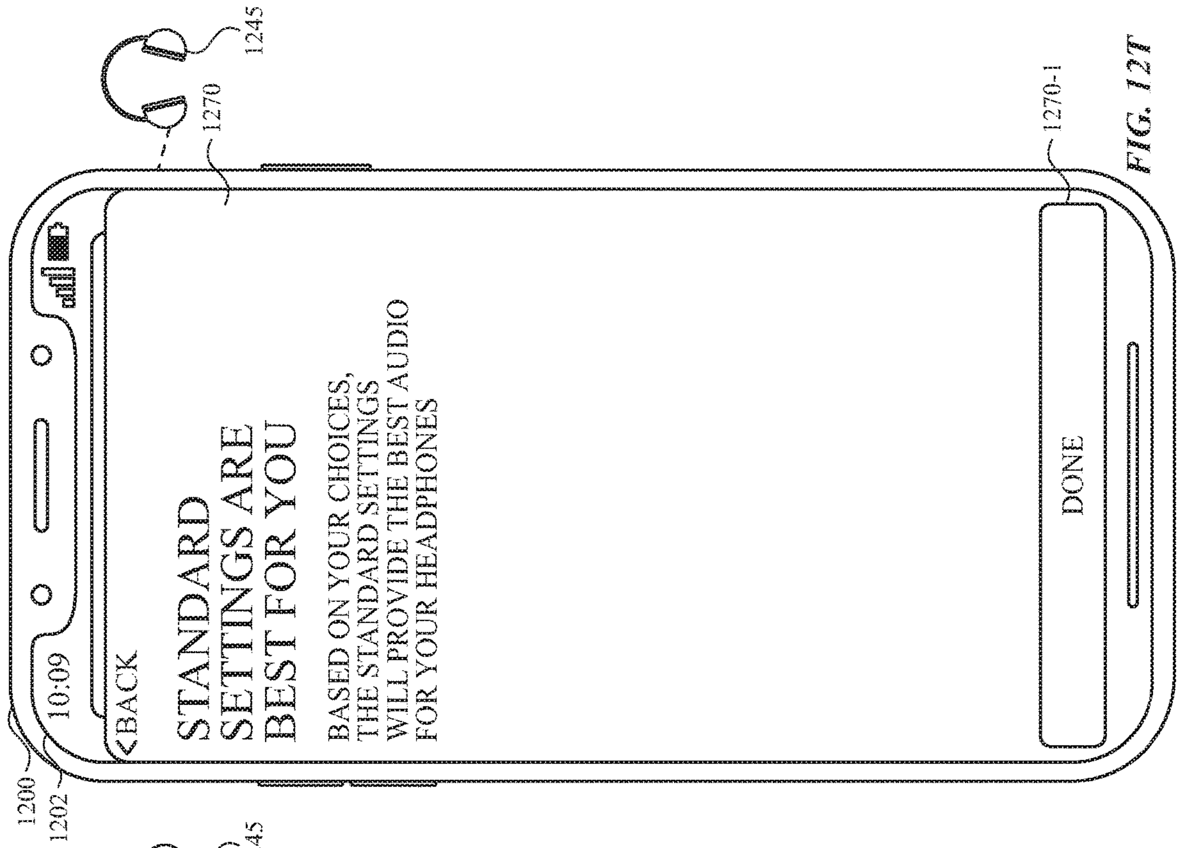
Figure 12S:
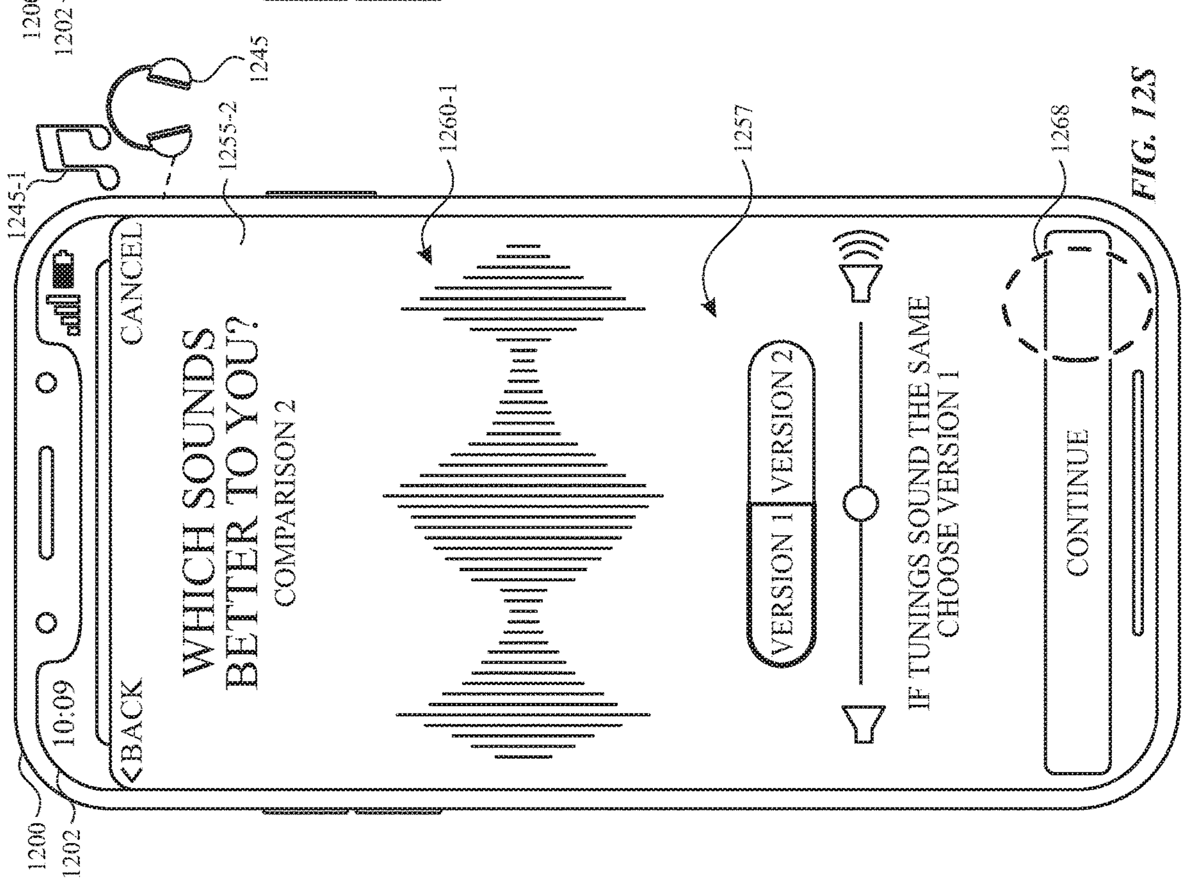

In FIG. 12R, device 1200 detects the user's preference for the first version of the audio signal featured in first comparison interface 1255-1 (e.g., by detecting input 1266 on the continue affordance when version one toggle 1257-1 is selected) and, in response, displays second comparison interface 1255-2 in FIG. 12S.

Device 1200 continues to produce music at headphones 1245 when displaying second comparison interface 1255-2. Second comparison interface 1255-2 is similar to first comparison interface 1255-1, but featuring at least one different audio sample. In FIG. 12S, the first version of the audio is the same as the first version of the audio in first comparison interface 1255-1, as indicated by waveform 1260-1. Accordingly, the music produced at the headphones remains unchanged when transitioning from first comparison interface 1255-1 to second comparison interface 1255-2.

In some embodiments, the version of the audio selected in a previous comparison interface becomes one of the versions of the audio in a current comparison interface. For example, in second comparison interface 1255-2, the first version of the audio is the same as the first version of the audio selected in first comparison interface 1255-1. Alternatively, if the second version was selected in first comparison interface 1255-1, the selected version would be one of the options (e.g., the second version) in second comparison interface 1255-2.

In FIG. 12S, device 1200 detects the user's preference for the first version of the audio signal featured in second comparison interface 1255-2 (e.g., by detecting input 1268 on the continue affordance when version one toggle 1257-1 is selected) and, in response, displays standard recommendation interface 1270 in FIG. 12T.

In the embodiment illustrated in FIG. 12T, device 1200 recommends the standard audio settings based on the user's preference for the first version of the audio signal in both first comparison interface 1255-1 and second comparison interface 1255-1. As a result, device 1200 terminates the custom audio setup process and recommends the standard settings, which are optionally applied when the user selects done affordance 1270-1. In some embodiments, the amplification settings are retained when the standard settings are applied, but a tone adjustment is not performed. In some embodiments, the amplification setting are not retained and a tone adjustment is not performed when the standard settings are applied. In some embodiments, device 1200 optionally displays the user interface in FIG. 12AE in response to detecting the selection of done affordance 1270-1. In some embodiments, device displays the user interface in FIG. 12C in response to detecting the selection of done affordance 1270-1.

Figure 12V:
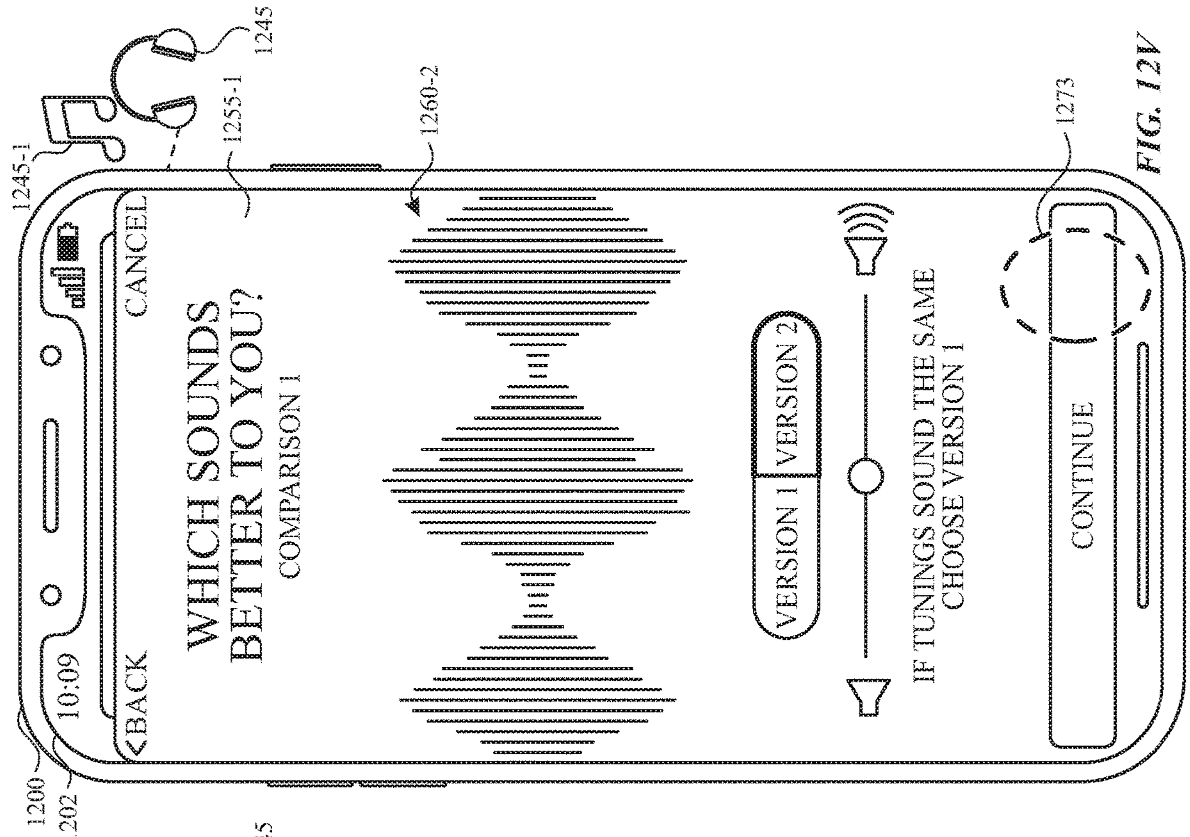
Figure 12U:
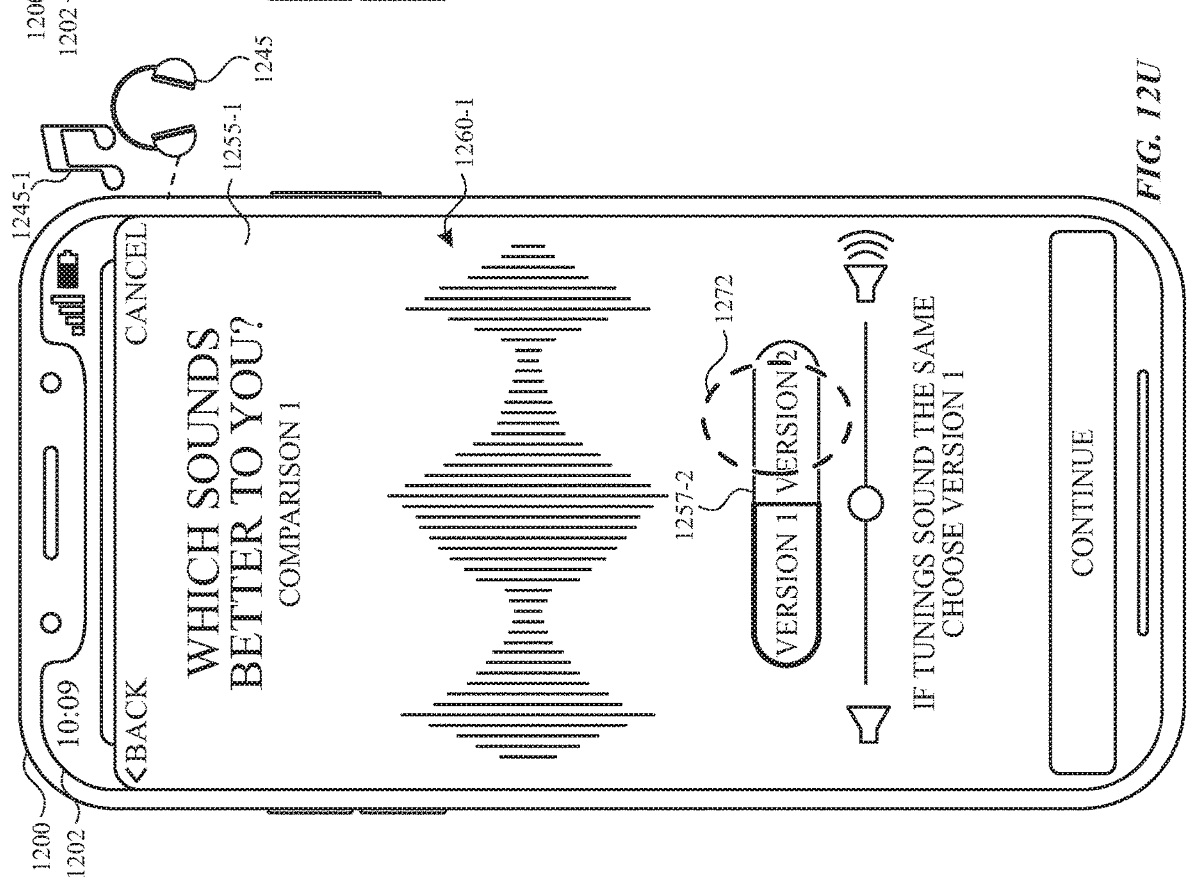

FIGS. 12U-12AD depict an example embodiment in which the tone adjustment phase is completed and custom audio settings are recommended based on the user's selected preferences.

Referring to FIG. 12U, device 1200 displays first comparison interface 1255-1 and detects input 1272 on version two toggle 1257-2. While continuing to play music at headphones device 1245, device 1200 changes the audio characteristics from those of the first version of the audio to those of the second version of the audio, in response to input 1272. In FIG. 12V, waveform 1260-2 visually represents the second version of the audio in the first comparison, and version two toggle 1257-2 is highlighted to indicate the second version of the audio is currently selected.

In FIG. 12V, device 1200 detects input 1273 on the continue affordance indicating the user's preference for the second version of the audio—that is, the second audio sample in the first comparison. In response to detecting input 1273, device 1200 displays second comparison interface 1255-2, shown in FIG. 12W.

Figure 12X:
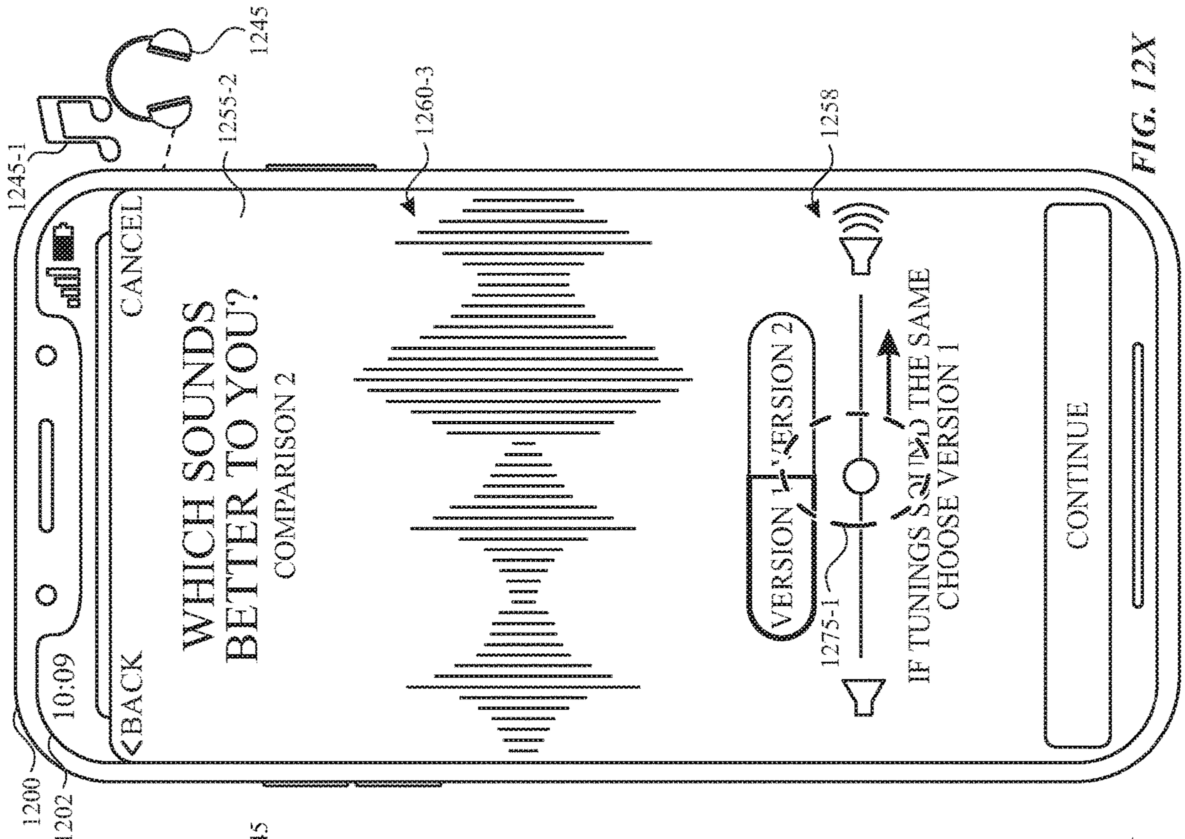
Figure 12W:
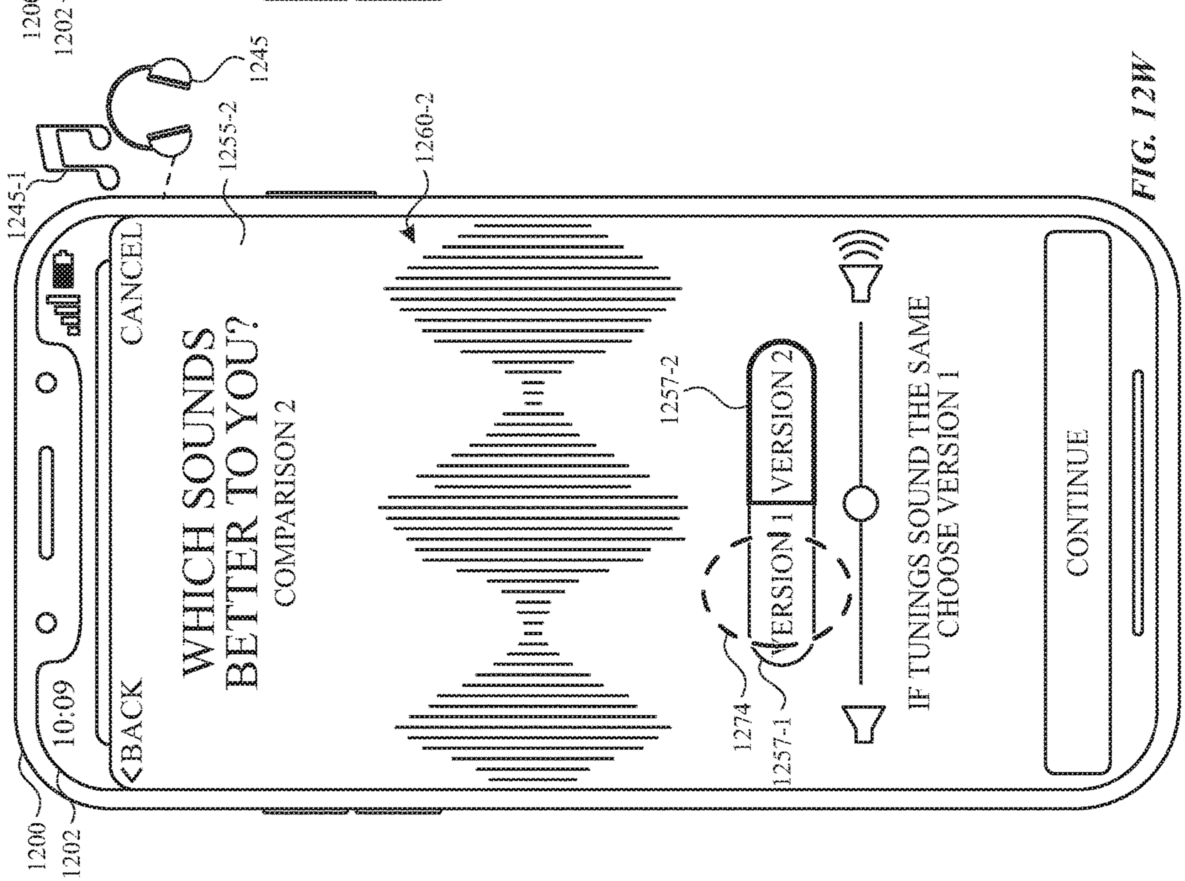

In FIG. 12W, device 1200 continues to play the music at headphones device 1245. The music played at headphones device 1245 currently has the audio characteristics associated with the second version of the audio that was selected in first comparison interface 1255-1, as indicated by waveform 1260-2. In other words, second comparison interface 1255-2 features a comparison of different audio samples than that provided in first comparison interface 1255-1, but one of the featured audio samples in the second comparison (the second version) is the audio sample selected from first comparison interface 1255-1. In some embodiments, the first and second versions of the audio in the second comparison interface are different from both the first and second versions of the audio in the first comparison interface, but at least one of the first or second version of the audio in the second comparison is influenced by the version of the audio selected in the first comparison interface.

In some embodiments, the setting of toggle selector 1257 persists across different comparison interfaces. For example, in the embodiment shown in FIG. 12W, version two toggle 1257-2 remains selected (after input 1273) and the set of audio characteristics selected from first comparison interface 1255-1 (the second version of the audio in the first comparison) remain associated with version two toggle 1257-2. In some embodiments, however, the setting of toggle selector 1257 resets to having version one toggle 1257-2 selected when a new comparison interface is displayed. In accordance with such embodiments, the second comparison interface of FIG. 12W would be shown with version one toggle 1257-1 selected, and the audio characteristics associated with the second version of the audio in first comparison interface 1255-1 would instead be associated with the first version of the audio in second comparison interface 1255-2.

Referring again to FIG. 12W, device 1200 detects input 1274 on version one toggle 1257-1 and, in response, modifies the music at headphones device 1245 based on the audio characteristics associated with the first version of the audio sample in second comparison interface 1255-2. The first version of the audio in second comparison interface 1255-2 is different from both the first and second versions of the audio in the first comparison interface (and the second version of the audio in the second comparison), as depicted by waveform 1260-3 in FIG. 12X. Furthermore, in the embodiment depicted in FIG. 12X, the first version of the audio signal (e.g., waveform 1260-3) featured in second comparison interface 1255-2 is different than the first version of the audio signal (e.g., waveform 1260-1) featured in second comparison interface 1255-2 in FIG. 12S. This is because selections of preferred audio samples influence the audio samples used in subsequent comparisons, and the selections in the embodiment illustrated in FIG. 12S are different from the selections in the embodiment illustrated in FIG. 12X.

In FIG. 12X, device 1200 detects input 1275-1 (e.g., a slide gesture) on volume slider 1258 and, in response, increases the amplitude of the audio being produced at headphones device 1245, as indicated by amplified waveform **1260-3*a* in FIG. 12**Y.

Figure 12Z:
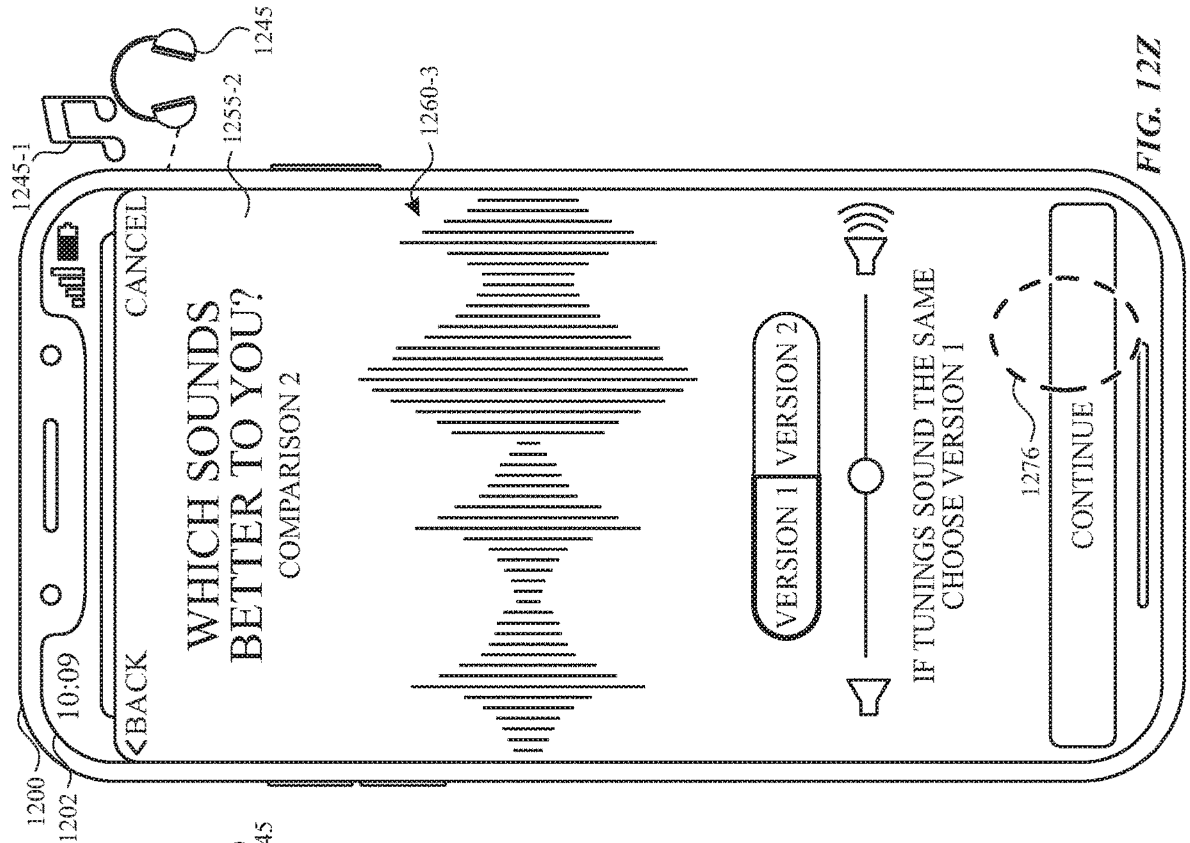
Figure 12Y:
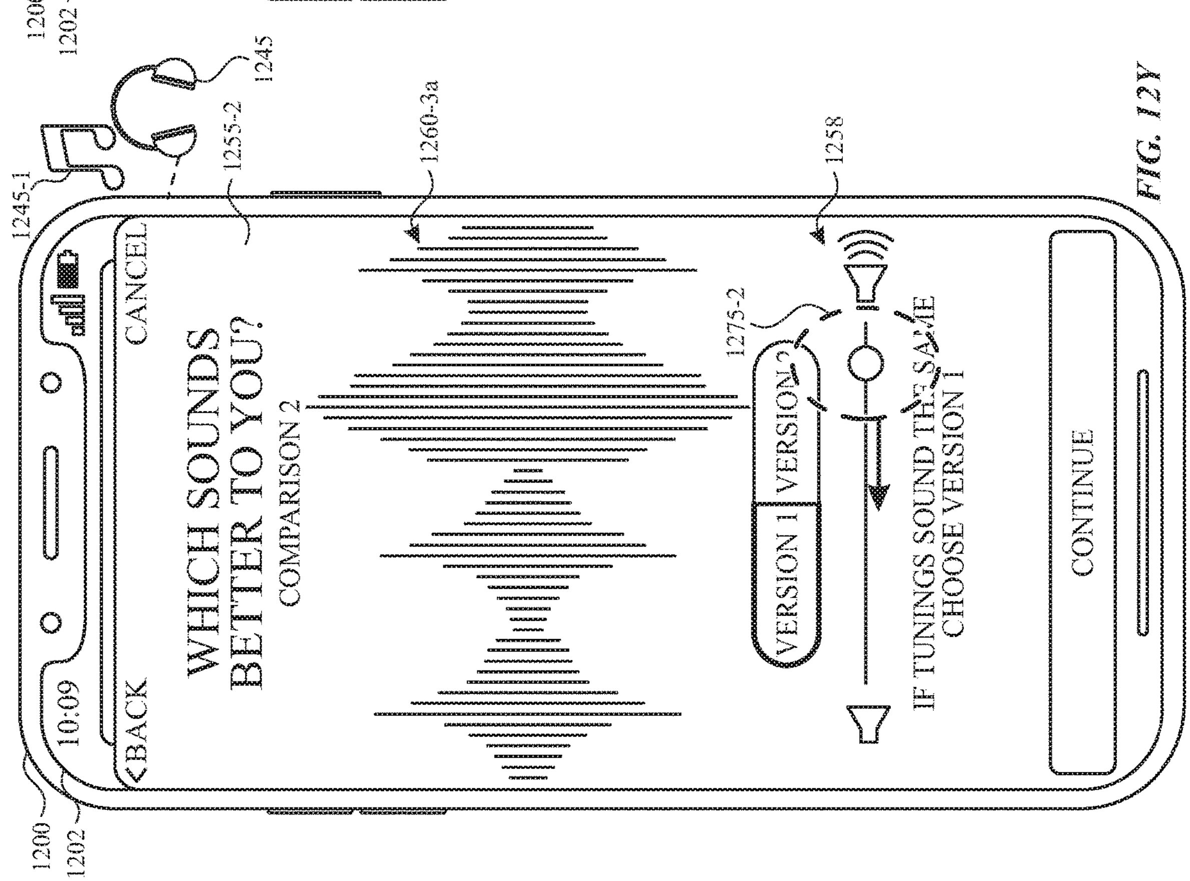
Figure 12A:
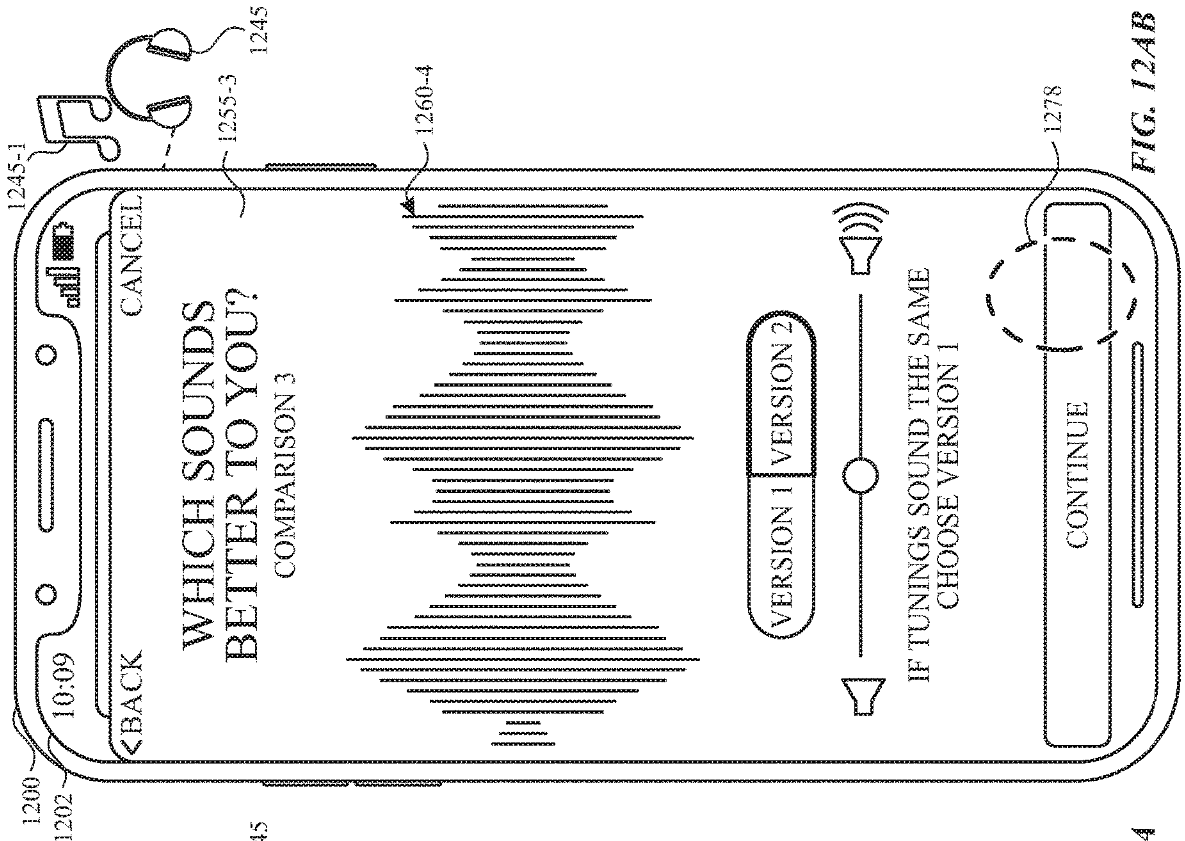
Figure 12A:
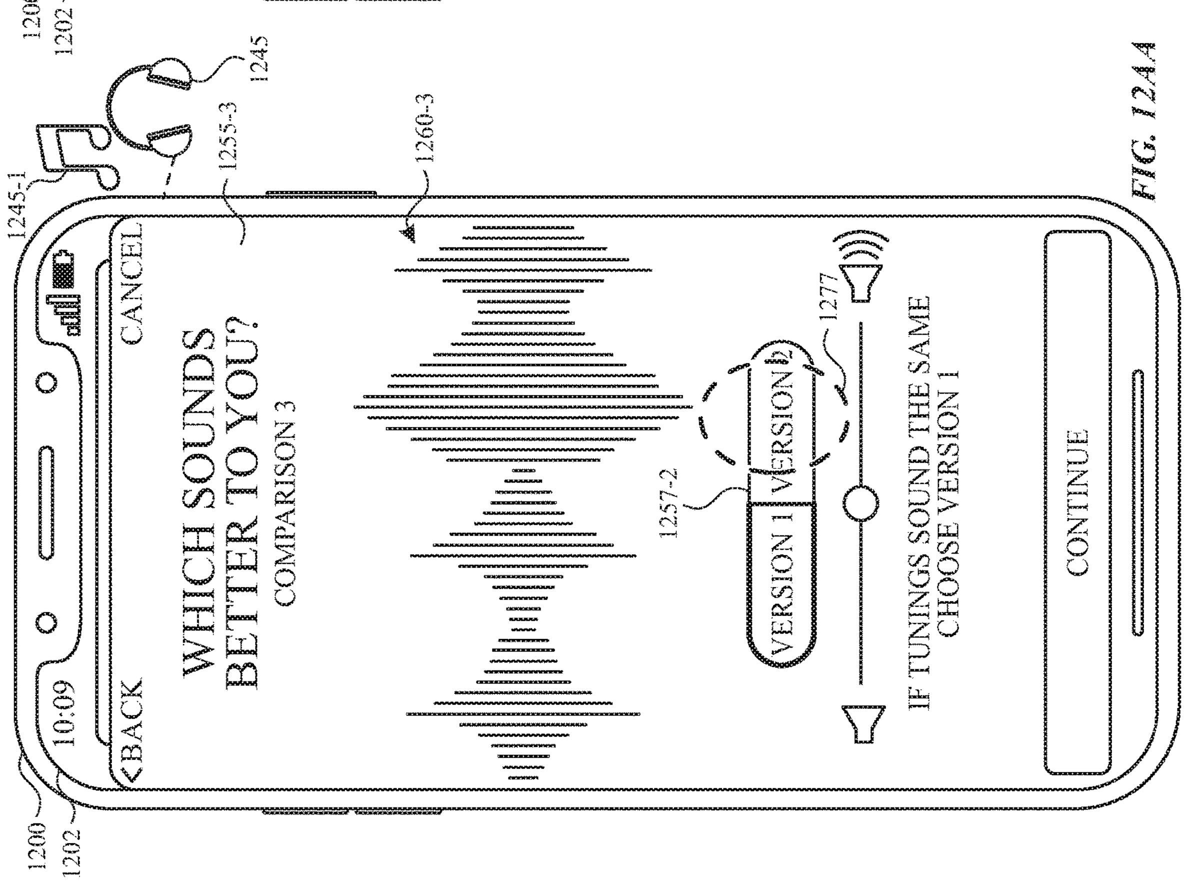
Figure 12A:
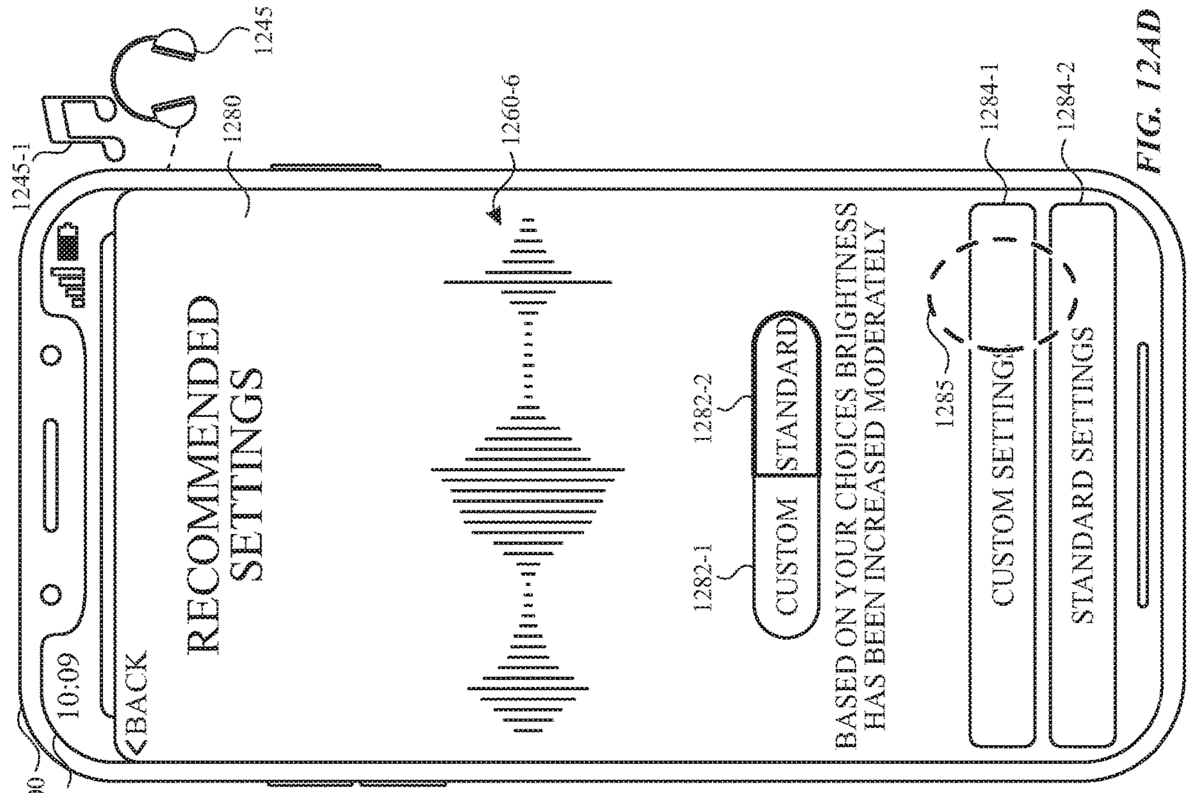
Figure 12A:
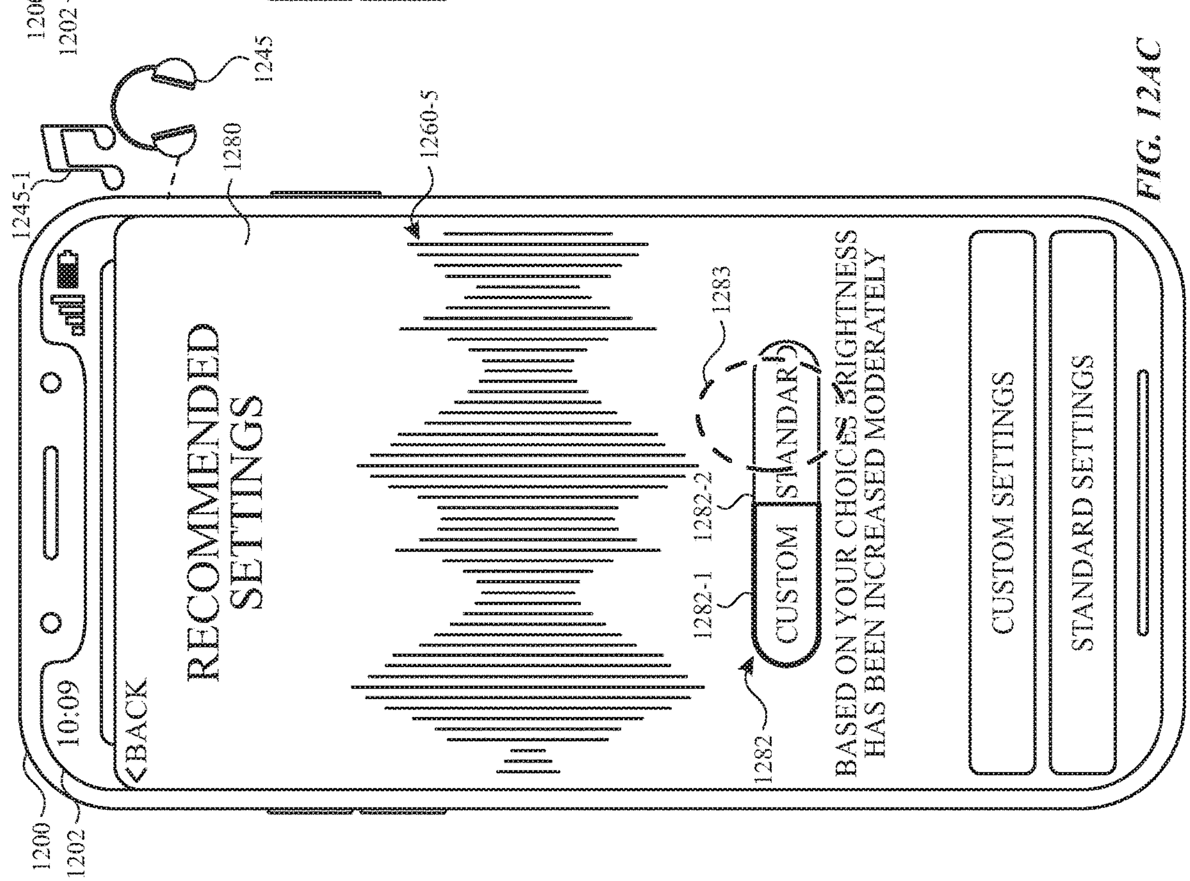
Figure 12A:
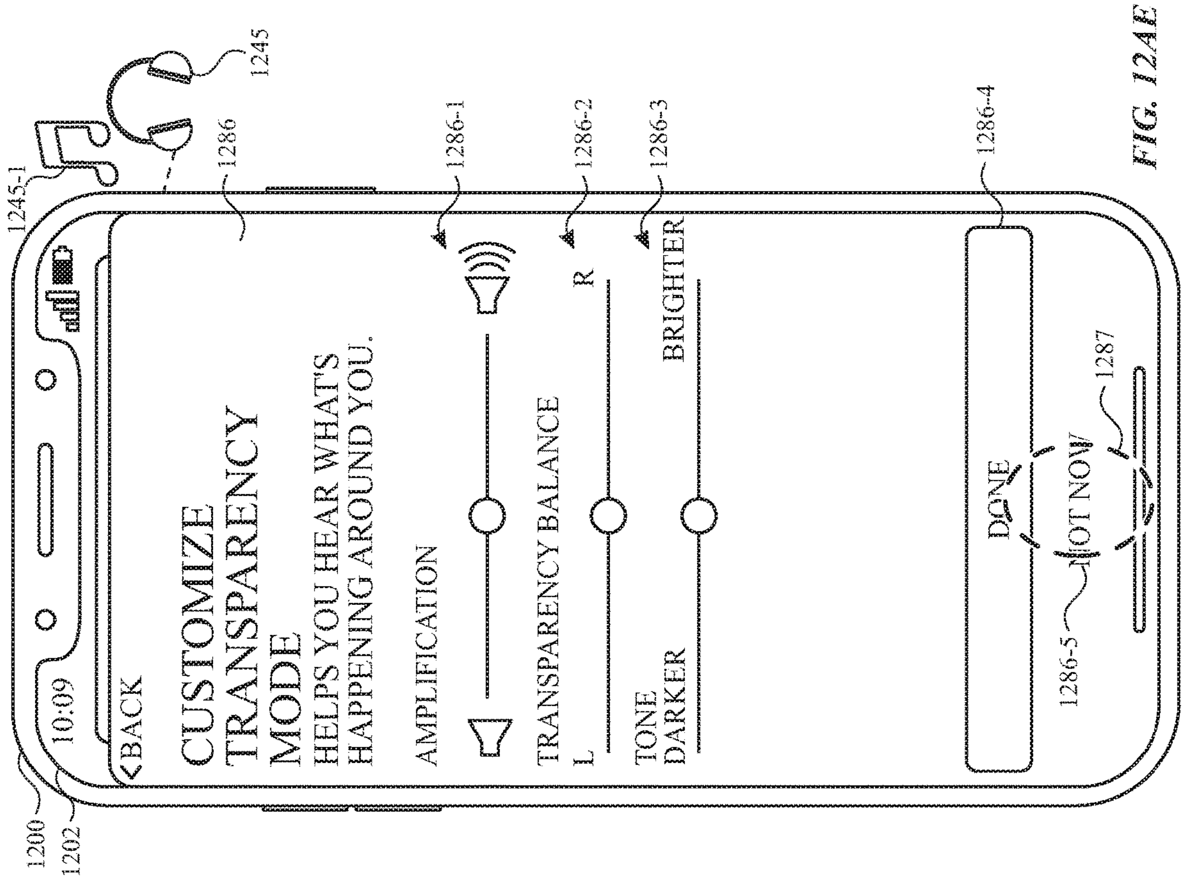
Figure 12A:
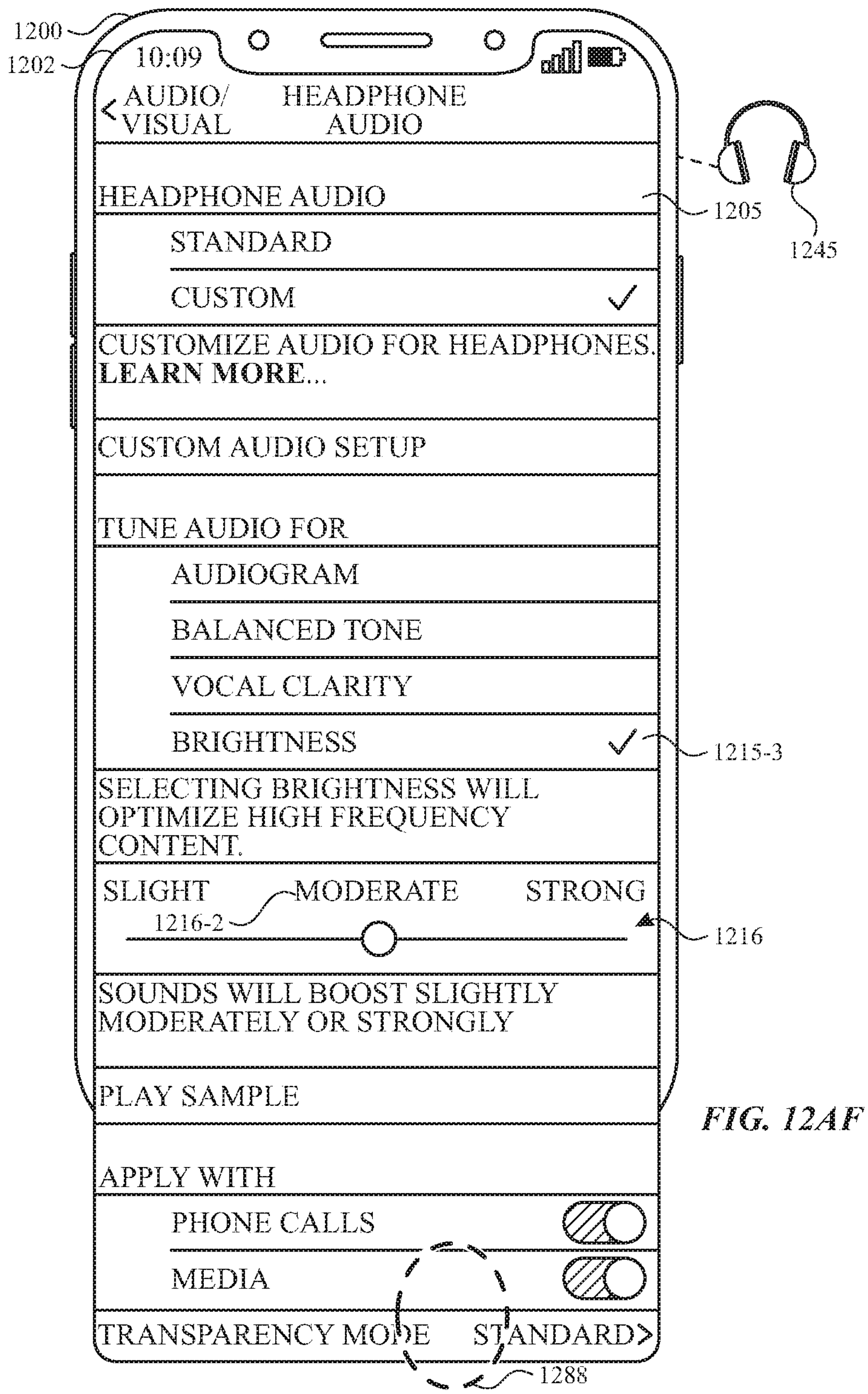
Figure 12A:
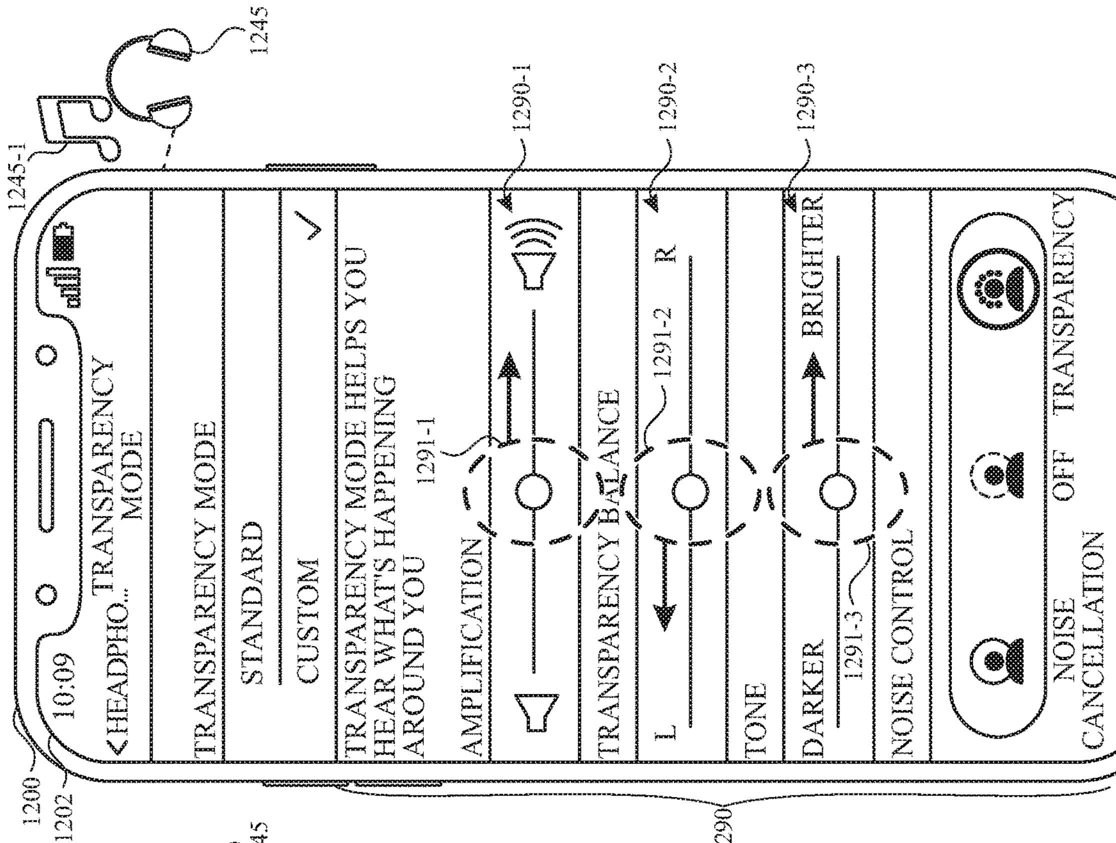
Figure 12A:
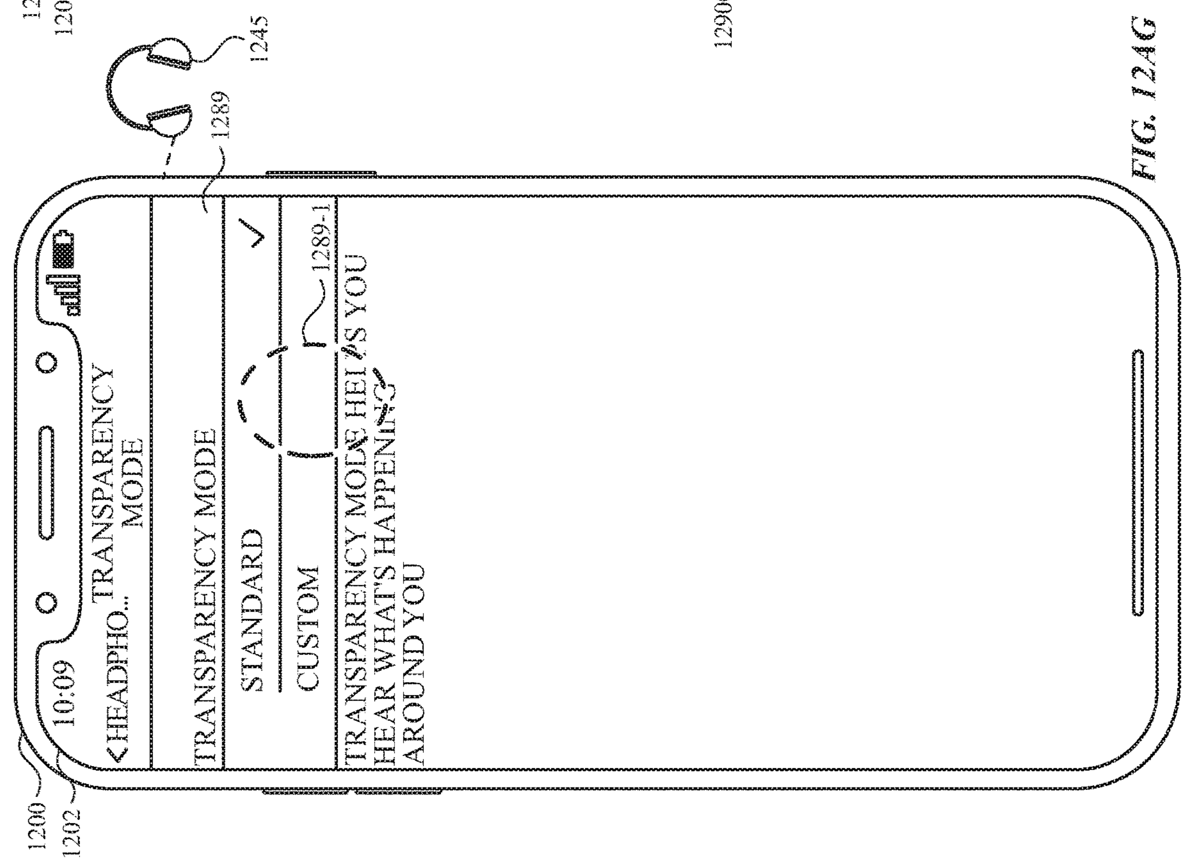
Figure 12A:
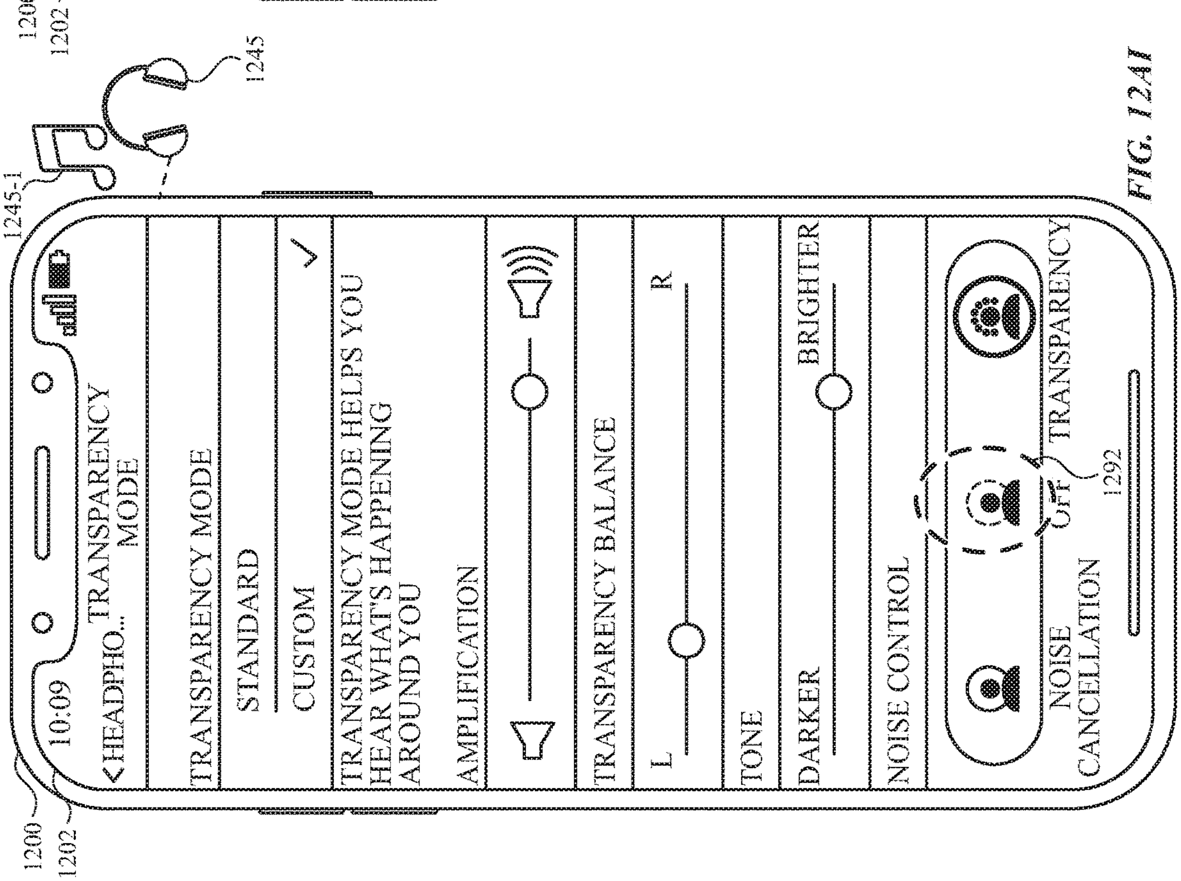
Figure 12A:
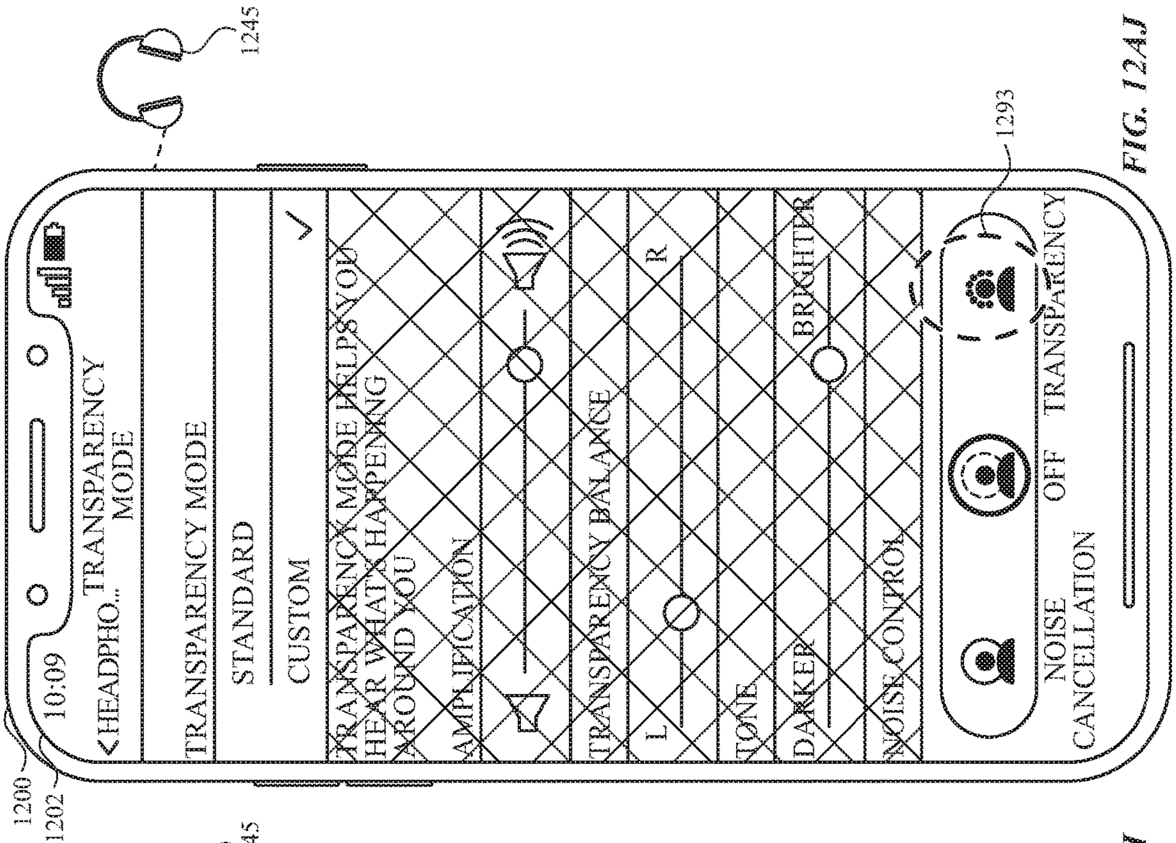
Figure 12A:
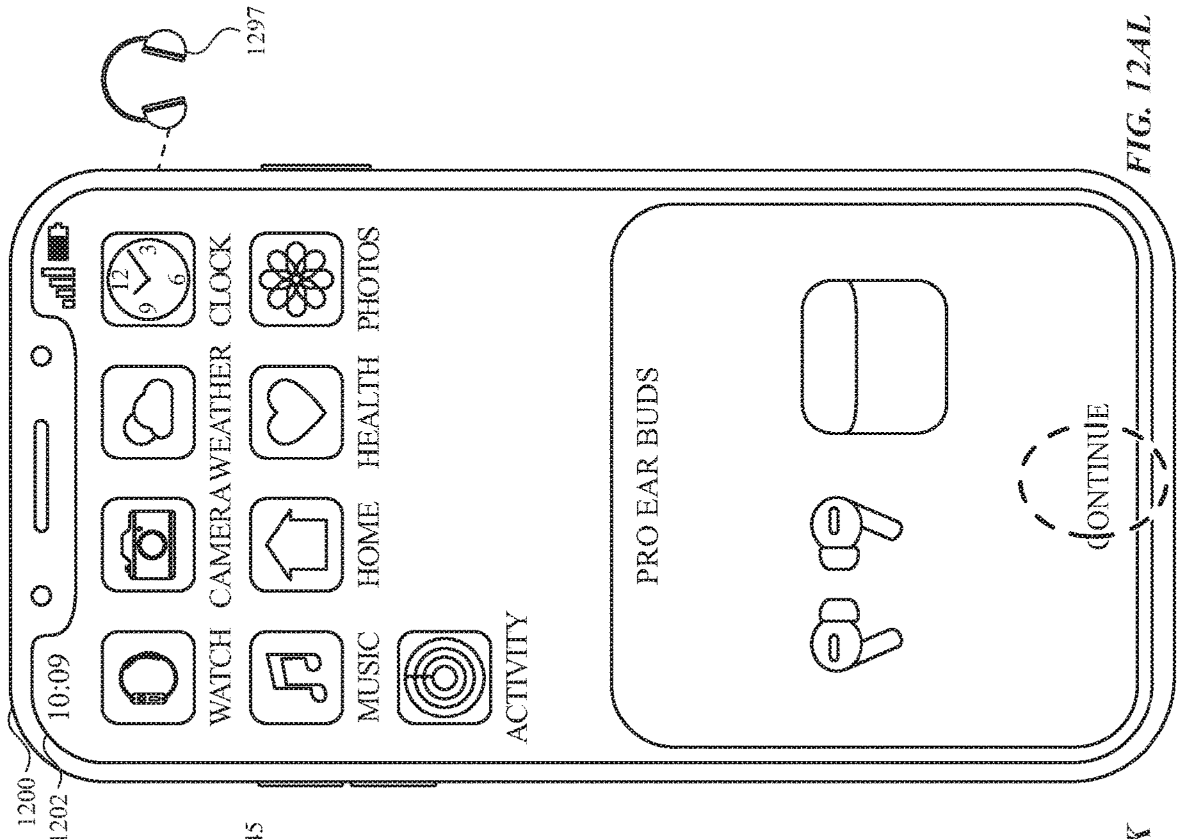
Figure 12A:
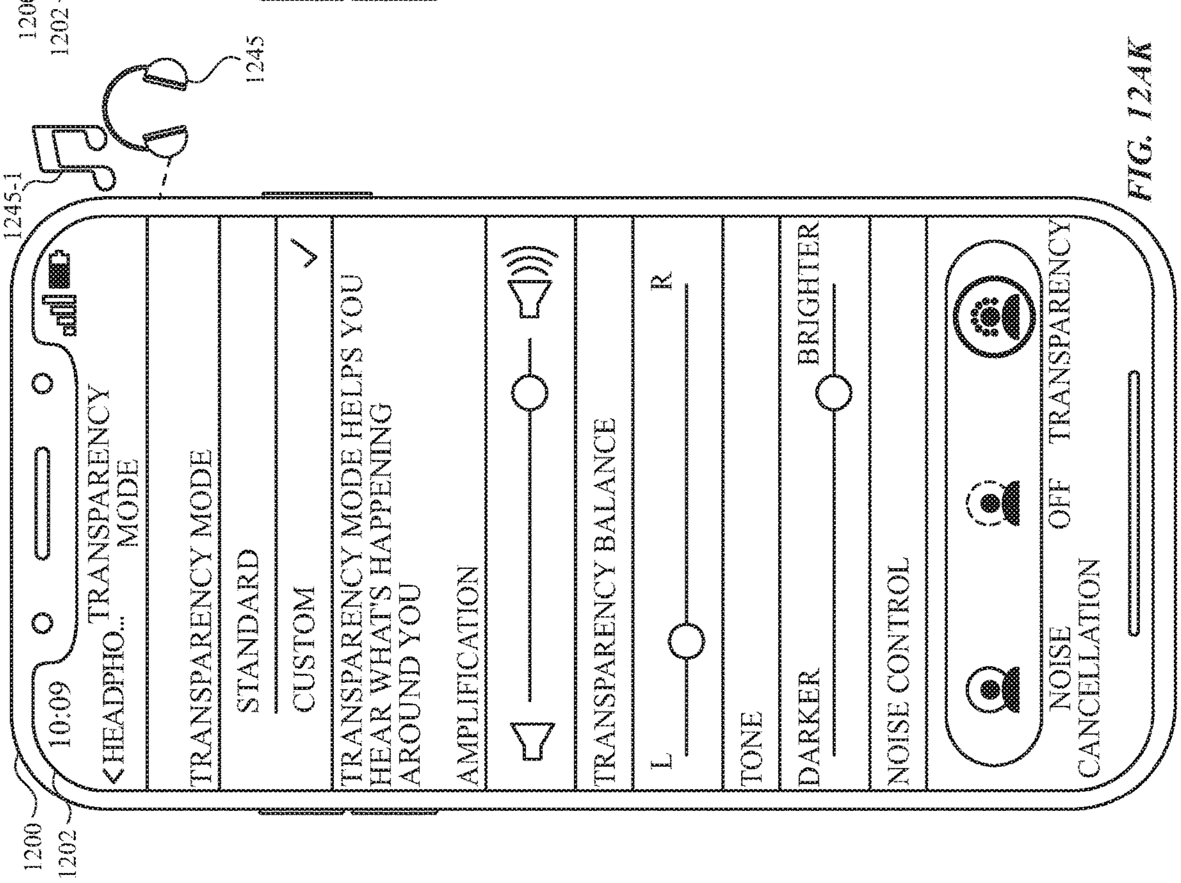
Figure 12A:
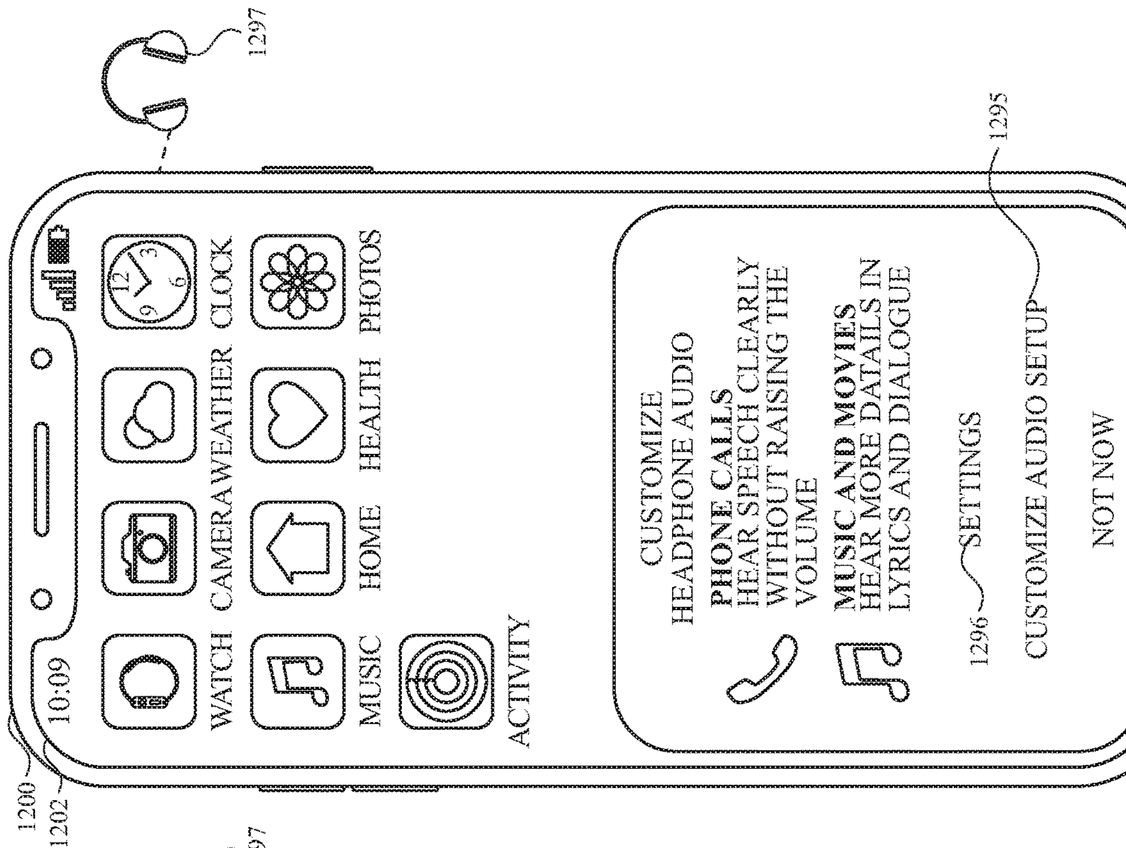
Figure 12A:
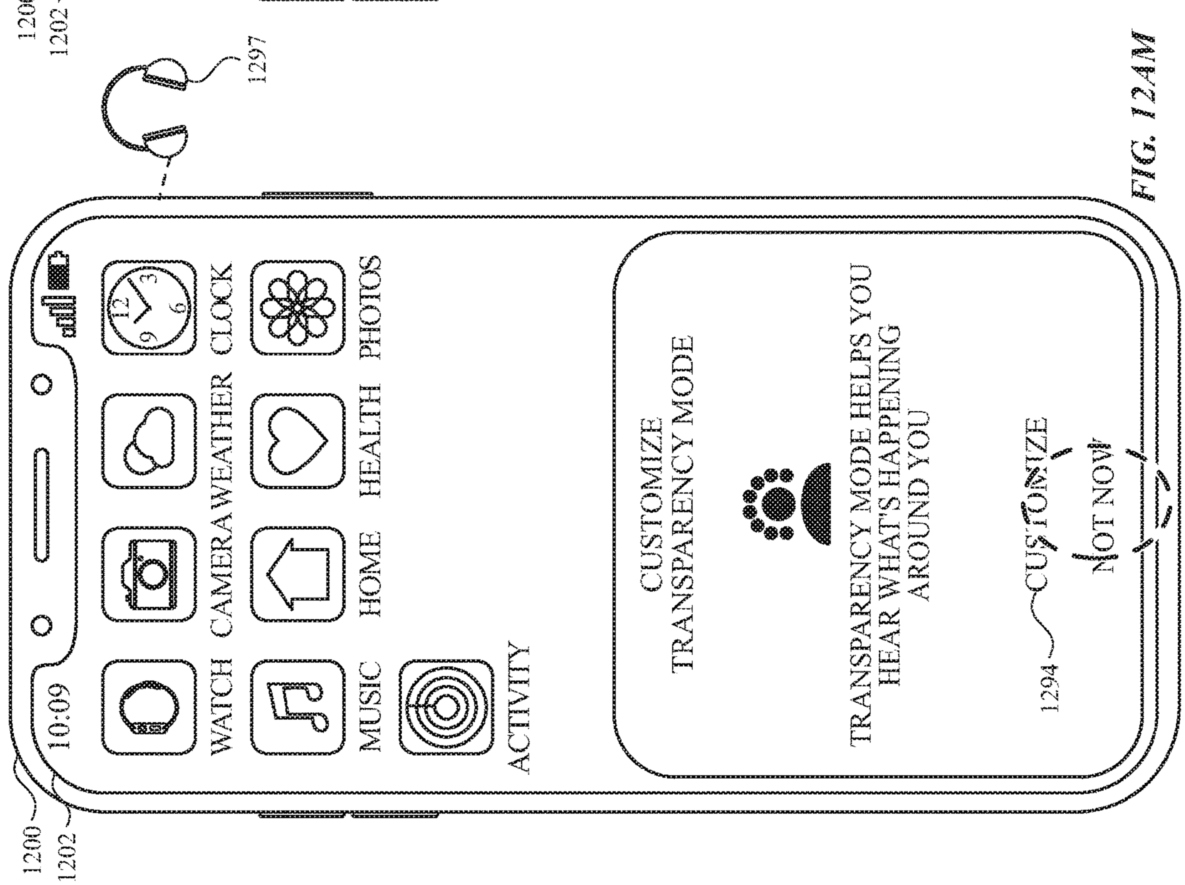

In FIG. 12Y, device 1200 detects input 1275-2 (e.g., a slide gesture) on volume slider 1258 and, in response, reduces the amplitude of the audio being produced at headphones device 1245 back to the previous amplitude, as indicated by waveform 1260-3 in FIG. 12Z.

In FIG. 12Z, device 1200 detects the user's preference for the first version of the audio signal featured in second comparison interface 1255-2 (e.g., by detecting input 1276 on the continue affordance when version one toggle 1257-1 is selected) and, in response, displays third comparison interface 1255-3 in FIG. 12AA.

In FIG. 12AA, device 1200 continues to play the music at headphones device 1245 having audio characteristics associated with the first version of the audio that was selected in second comparison interface 1255-2, as indicated by waveform 1260-3. Device 1200 detects input 1277 on version two toggle 1257-2 and, in response, modifies the music at headphones device 1245 based on the audio characteristics associated with the second version of the audio sample in third comparison interface 1255-3. The second version of the audio in third comparison interface 1255-3 is different from the versions of the audio in first comparison interface 1255-1 and second comparison interface 1255-2, as depicted by waveform 1260-4 in FIG. AB.

In FIG. 12AB, device 1200 detects the user's preference for the second version of the audio signal featured in third comparison interface 1255-3 (e.g., by detecting input 1278 on the continue affordance when version two toggle 1257-2 is selected) and, in response, displays recommendation interface 1280 in FIG. 12AC.

In FIG. 12AC, recommendation interface 1280 indicates customized settings or audio adjustments that are recommended by device 1200 based on the selections made in the custom audio setup process. In the embodiment depicted in FIG. 12AC, device 1200 is recommending to moderately boost the brightness. In some embodiments, recommendation interface 1280 can recommend other audio adjustments based on different preferences selected by the user in the custom audio setup process.

Recommendation interface 1280 includes recommendation toggle selector 1282, which includes custom toggle 1282-1 and standard toggle 1282-2. When custom toggle 1282-1 is selected, device 1200 produces audio at headphones device 1245 having the recommended audio adjustments, as shown in FIG. 12AC. In the embodiment in FIG. 12AC, waveform 1260-5 represents the audio at headphones device 1245 having the customized audio settings. In some embodiments, waveform 1260-5 corresponds to the preferred audio sample (e.g., waveform 1260-4) selected in third comparison interface 1255-3. In some embodiments, waveform 1260-5 is different from the preferred audio sample selected in the third comparison, but is still influenced based on the selection of the preferred audio sample in the third comparison.

In FIG. 12AC, device 1200 detects input 1283 on standard toggle 1282-2 and, in response, selects standard toggle 1282-2, as depicted in FIG. 12AD. When standard toggle 1282-2 is selected, device 1200 produces audio at headphones device 1245 having the standard audio settings. In the embodiment in FIG. 12AD, waveform 1260-6 represents the audio at headphones device 1245 having the standard audio settings. In some embodiments, waveform 1260-6 corresponds to waveform 1260-1 in first comparison interface 1255-1. In some embodiments, waveform 1260-6 incorporates the amplification setting determined from the amplification phase of the custom audio setup process. In some embodiments, waveform 1260-6 does not incorporate the amplification setting determined from the amplification phase of the custom audio setup process.

Recommendation toggle selector 1282 permits the user to toggle between the custom audio setting and the standard audio settings, to hear a preview of audio that features the custom or standard settings, helping the user to more efficiently decide whether they wish to apply the recommended customized audio settings, or instead use the standard audio settings.

Recommendation interface 1280 further includes custom settings affordance 1284-1 and standard settings affordance 1284-2. Custom settings affordance 1284-1 is selectable to apply the recommended custom audio settings and, in some embodiments, create a custom audio settings profile that can be used to apply the custom audio settings to other connected headphone devices. Standard settings affordance 1284-2 is selectable to apply the standard audio settings. In FIG. 12AD, device 1200 detects input 1285 on custom settings affordance 1284-1 and, in response, applies the custom audio settings and optionally displays transparency mode interface 1286, as shown in FIG. 12AE.

Referring now to FIG. 12AE, in some embodiments, device 1200 optionally displays transparency mode interface 1286 if ambient audio settings are supported by headphones device 1245. Otherwise, device 1200 displays headphone audio settings interface 1205, as shown in FIG. 12AF. Transparency mode interface 1286 includes amplification slider 1286-1, balance slider 1286-2, and tone slider 1286-3. These sliders are selectable to adjust audio settings for a feature of headphones 1245 for amplifying ambient sounds, as discussed in greater detail below with respect to FIG. 12AH. In some embodiments, headphones device 1245 produces the ambient audio, as indicated by sound graphic 1245-1, when displaying transparency mode interface 1286. For example, headphones device 1245 detects the ambient audio (e.g., using a microphone) and produces an amplified version of the ambient audio so that the user can more easily hear their physical environment while wearing the headphones.

Transparency mode interface 1286 also includes option 1286-4 for applying any setting changes that were made using sliders 1286-1, 1286-2, and 1286-3. In FIG. 12AE, device 1200 detects input 1287 on option 1286-5 and, in response, does not apply any transparency mode setting changes and displays headphone audio settings interface 1205, as shown in FIG. 12AF.

Referring now to FIG. 12AF, device 1200 displays audio settings interface 1205 having updated audio settings based on the results of the custom audio setup process. For example, brightness option 1215-3 is shown selected and now having moderate boost 1216-2 as indicated by slider 1216 (based on the results of the custom audio setup process). In some embodiments, a user can further adjust any of the audio options 1215 (other than audiogram option 1215-4), by selecting the respective audio option and adjusting slider 1216. In some embodiments, if the custom audio settings have not been set or have been changed from the results of a prior custom audio setup process, a user can manually adjust the custom audio settings to match the results of a prior custom audio setup process. This allows the user to set the custom results without having to complete the custom audio setup process. In some embodiments, the process of manually selecting the custom audio settings can be initiated when a new set of headphones is connected to device 1200, as discussed in greater detail below.

In FIG. 12AF, transparency mode setting 1226 is shown having standard settings because no changes were made to the transparency mode settings in FIG. 12AE. In some embodiments, if changes were made to these settings, and option 1286-4 was selected, transparency mode setting 1226 would display "custom" in FIG. 12AF. Device 1200 detects input 1288 on transparency mode setting 1226 and, in response, displays transparency mode settings interface 1289, similar to transparency mode interface 1286 in FIG. 12AE.

FIG. 12AG depicts transparency mode settings interface 1289 with standard settings selected. Device 1200 detects input 1289-1 and, in response, applies custom settings indicated by displayed transparency mode customization options 1290, similar to those displayed in FIG. 12AE.

FIG. 12AH depicts transparency mode customization options 1290 and various inputs 1291 to adjust the customization options. For example device 1200 detects input

1291-1 (a slide gesture) on amplification slider 1290-1 to increase amplification of ambient audio, input 1291-2 on balance slider 1290-1 to focus the ambient audio to the left, and input 1291-3 on tone slider 1290-3 to increase brightness. Device 1200 updates the respective settings as shown in FIG. 12AI.

In FIG. 12AI, device 1200 detects input 1292 and, in response, disables the transparency mode setting, as shown in FIG. 12AJ.

In FIG. 12AJ, device 1200 detects input 1293 and, in response, re-enables the transparency mode setting with the previous setting adjustments retained, as shown in FIG. 12AK.

In FIGS. 12AL-12AN, device 1200 depicts example user interfaces that are displayed when connecting new headphones device 1297 to device 1200. In some embodiments, new headphones device 1297 is a different set of headphones than headphones device 1245. In FIG. 12AM, device 1200 depicts option 1294 for accessing transparency mode settings interface 1289 or transparency mode interface 1286 to customize the transparency mode settings for new headphones device 1297. In FIG. 12AN, device 1200 displays option 1295 for initiating the custom audio setup process discussed above, and option 1296 for displaying headphone audio settings interface 1205 to allow the user to manually set custom headphone audio settings that can, optionally, be applied to new headphones device 1297.

Figure 13:
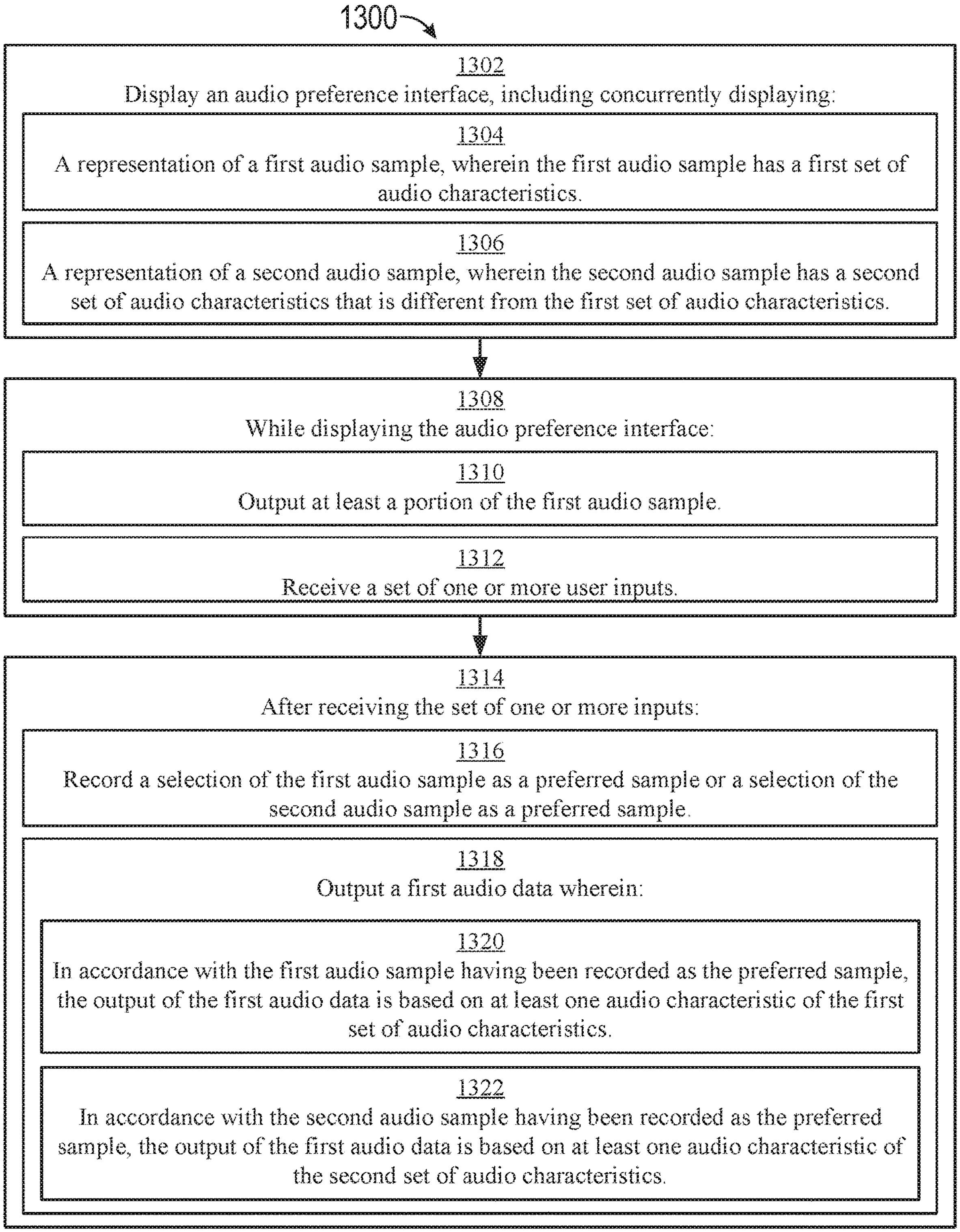
FIG. 13 is a flow diagram illustrating a method for customizing audio settings using a computer system, in accordance with some embodiments.

FIG. 13 is a flow diagram illustrating a method for customizing audio settings based on user preferences using a computer system, in accordance with some embodiments. Method 1300 is performed at a computer system (e.g., a smartphone, a smartwatch) (e.g., device 100, 300, 500, 600, 601, 800, 900, 1100, 1200, 1400, 1401, 1700) that is in communication with a display generation component (e.g., display 1202) (e.g., a display controller, a touch-sensitive display system), an audio generation component (e.g., headphones device 1245) (e.g., audio circuitry, a speaker), and one or more input devices (e.g., a touch-sensitive surface of display 1202). In some embodiments, the computer system includes the display generation component and the one or more input devices. Some operations in method 1300 are, optionally, combined, the orders of some operations are, optionally, changed, and some operations are, optionally, omitted.

As described below, method 1300 provides an intuitive way for customizing audio settings based on user preferences. The method reduces the cognitive burden on a user for customizing audio settings based on user preferences, thereby creating a more efficient human-machine interface. For battery-operated computing devices, enabling a user to customize audio settings faster and more efficiently conserves power and increases the time between battery charges.

In method 1300, the computer system (e.g., 1200) displays (1302), via the display generation component (e.g., 1202), an audio preference interface (e.g., 1255 (e.g., 1255-1; 1255-2; 1255-3); 1247; 1252), including concurrently displaying (1304) a representation (e.g., 1257-1) (e.g., an interface object (e.g., a selectable user interface object (e.g., an affordance))) of a first audio sample (e.g., 1260-1 in interface 1255-1 (e.g., FIG. 12U)) (e.g., 1260-3 in interface 1255-2 (e.g., FIG. 12X)) (e.g., 1260-3 in interface 1255-3 (e.g., FIG. 12AA)), wherein the first audio sample has a first set of audio characteristics (e.g., first values for one or more of amplification, balance, vocal clarity, brightness) (e.g., the first affordance is selectable to change audio characteristics of the audio sample to the first set of audio characteristics) and concurrently displaying (1306) a representation (e.g., 1257-2) (e.g., a second affordance) of a second audio sample (e.g., 1260-2 in interface 1255-1 (e.g., FIG. 12V)) (e.g., 1260-2 in interface 1255-2 (e.g., FIG. 12W)) (e.g., 1260-4 in interface 1255-3 (e.g., FIG. 12AB)), wherein the second audio sample has a second set of audio characteristics that is different from the first set of audio characteristics. In some embodiments, an indication (e.g., a focus selector; highlighting, visual emphasis) is displayed that indicates that the first audio sample is currently selected or the second audio sample is currently selected (e.g., in FIG. 12R, version one toggle 1257-1 is bolded to show it is selected). In some embodiments, the first and second audio sample is a same audio sample, but having different audio characteristics. For example, the first audio sample is a spoken or musical audio sample, and the second audio sample is the same spoken or musical audio sample having different values for at least one of amplification, balance, vocal clarity, and brightness.)

While displaying (1308) (in some embodiments, subsequent to displaying) the audio preference interface (e.g., 1255 (e.g., 1255-1; 1255-2; 1255-3); 1247; 1252), the computer system (e.g., 1200) outputs (1310), via the audio generation component (e.g., 1245), at least a portion of the first audio sample (e.g., 1260-1 in interface 1255-1 (e.g., FIG. 12U)) (e.g., 1260-3 in interface 1255-2 (e.g., FIG. 12X)) (e.g., 1260-3 in interface 1255-3 (e.g., FIG. 12AA)) (e.g., and/or at least a portion of the second audio sample) and the computer system receives (1312) (e.g., after outputting the at least a portion of the first and/or second audio sample), via the one or more input devices (e.g., 1202), a set of one or more user inputs (e.g., 1266; 1268; 1272; 1273; 1274; 1275-1; 1275-2; 1276; 1277; 1278; 1283; 1285). Outputting at least a portion of the first audio sample while displaying the audio preference interface provides feedback that permits a user to more quickly and easily associate the output audio with the selections made using the audio preference interface. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently At 1314 of method 1300, after receiving the set of one or more inputs (e.g., 1266; 1268; 1272; 1273; 1274; 1275-1; 1275-2; 1276; 1277; 1278; 1283; 1285), the computer system (e.g., 1200) records (1316) (e.g., stores (e.g., locally and/or at a server)) (e.g., in response to receiving the set of one or more user inputs) a selection of the first audio sample as a preferred sample (e.g., input 1266 results in selection of the audio sample represented with waveform 1260-1 in interface 1255-1 (e.g., FIG. 12R)) (e.g., input 1268 results in selection of the audio sample represented with waveform 1260-1 in interface 1255-2 (e.g., FIG. 12S) (e.g., input 1276 results in selection of the audio sample represented with waveform 1260-3 in interface 1255-2 (e.g., FIG. 12Z)) (e.g., input 1285 results in selection of the audio sample represented with waveform 1260-5 in interface 1280 (e.g., FIGS. 12AC and 12AD)) or a selection of the second audio sample as a preferred sample (e.g., as a selected sample) (e.g., input 1273 results in selection of the audio sample represented with waveform 1260-2 in interface 1255-1 (e.g., FIG. 12V)) (e.g., input 1278 results in selection of the audio sample represented with waveform 1260-4 in interface 1255-3 (e.g., FIG. 12AB)). In some embodiments, the set of one or more user inputs includes an input corresponding to the representation of the first audio sample (e.g., input 1274) or the second audio sample (e.g., input 1277). In some embodiments, the set of one or more user inputs includes an input on a selection affordance (e.g., input 1278 on continue affordance) that is received while an indication (e.g., focus selector; bolded outline) is displayed that indicates that the first audio sample is currently selected or the second audio sample is currently selected, and recording the selection includes recording the selection of the audio sample that is currently indicated as the selected audio sample as the preferred sample.

After receiving the one or more inputs (e.g., 1266; 1268; 1272; 1273; 1274; 1275-1; 1275-2; 1276; 1277; 1278; 1283; 1285), the computer system (e.g., 1200) outputs (1318), via the audio generation component (e.g., 1245), a first audio data (e.g., audio produced at headphones device 1245 (e.g., represented in some embodiments by the presence of sound graphic 1245-1)) (e.g., audio media (e.g., music, a voice recording, an audio component of audiovisual media)).

In accordance with the first audio sample (e.g., 1260-1 in interface 1255-1 (e.g., FIG. 12U)) (e.g., 1260-3 in interface 1255-2 (e.g., FIG. 12X)) (e.g., 1260-3 in interface 1255-3 (e.g., FIG. 12AA)) having been recorded as the preferred sample (e.g., the first audio sample is selected as the preferred sample), the output of the first audio data (e.g., current audio playback; future audio playback) is based on (1320) (e.g., generated using) at least one audio characteristic of the first set of audio characteristics (e.g., the audio produced at headphones device 1245 in, for example, FIG. 12AA is based on the audio selected as a result of the selection of version one toggle 1257-1 and input 1276 in FIG. 12Z) (e.g., selecting, for the output of audio playback, a value of one or more of amplification, balance, vocal clarity, and brightness from a corresponding first value of the first set of audio characteristics).

In accordance with the second audio sample (e.g., 1260-2 in interface 1255-1 (e.g., FIG. 12V)) (e.g., 1260-2 in interface 1255-2 (e.g., FIG. 12W)) (e.g., 1260-4 in interface 1255-3 (e.g., FIG. 12AB)) having been recorded as the preferred sample (e.g., the second audio sample is selected as the preferred sample), the output of the first audio data (e.g., current audio playback; future audio playback) is based on (1322) (e.g., generated using) at least one audio characteristic of the second set of audio characteristics (e.g., the audio produced at headphones device 1245 in, for example, FIG. 12W is based on the audio selected as a result of the selection of version two toggle 1257-2 and input 1273 in FIG. 12V) (e.g., selecting, for the output of audio playback, a value of one or more of amplification, balance, vocal clarity, and brightness from a corresponding second value of the second set of audio characteristics).

In some embodiments, after recording a selection of the first audio sample (e.g., 1260-1 in interface 1255-1 (e.g., FIG. 12U)) (e.g., 1260-3 in interface 1255-2 (e.g., FIG. 12X)) (e.g., 1260-3 in interface 1255-3 (e.g., FIG. 12AA)) as a preferred sample or a selection of the second audio sample (e.g., 1260-2 in interface 1255-1 (e.g., FIG. 12V)) (e.g., 1260-2 in interface 1255-2 (e.g., FIG. 12W)) (e.g., 1260-4 in interface 1255-3 (e.g., FIG. 12AB)) as a preferred sample, the computer system (e.g., 1200) concurrently displays, via the display generation component (e.g., 1202), a representation (e.g., 1257-1 in a subsequent interface (e.g., 1255-2; 1255-3)) of a third audio sample (e.g., 1260-3 in interface 1255-2 (e.g., FIG. 12X)) (e.g., 1260-3 in interface 1255-3 (e.g., FIG. 12AA)), wherein the third audio sample has a third set of audio characteristics, and a representation (e.g., 1257-2 in a subsequent interface (e.g., 1255-2; 1255-3)) of a fourth audio sample (e.g., 1260-2 in interface 1255-2 (e.g., FIG. 12W)) (e.g., 1260-4 in interface 1255-3 (e.g., FIG. 12AB)), wherein the fourth audio sample has a fourth set of audio characteristics that is different from the third set of audio characteristics. In some embodiments, at least one of the third audio sample or the fourth audio sample is based on (e.g., is selected according to) the recorded selection of the first audio sample or the second audio sample as a preferred sample. In some embodiments, the representations of the first and second audio samples form a first audio sample comparison in a series of audio sample comparisons and, after the first or second audio sample is selected, the display generation component ceases display of the first audio sample comparison (e.g., the representations of the first and second audio samples), and displays a subsequent audio sample comparison that includes the representations of the third and fourth audio samples.

In some embodiments, the third audio sample is the first audio sample (e.g., 1260-3 in interface 1255-2 (e.g., FIG. 12X)) (e.g., 1260-3 in interface 1255-3 (e.g., FIG. 12AA)) or the second audio sample (e.g., 1260-2 in interface 1255-2 (e.g., FIG. 12W)) (e.g., 1260-4 in interface 1255-3 (e.g., FIG. 12AB)). In some embodiments, one of the audio samples of a subsequent audio sample comparison is an audio sample of a previous audio sample comparison. For example, if the first audio sample is selected as the preferred audio sample, one of the audio samples in the next audio sample comparison is the first audio sample. Conversely, if the second audio sample is selected as the preferred audio sample, one of the audio samples in the next audio sample comparison is the second audio sample.

In some embodiments, the representation of the first audio sample (e.g., 1257-1), when selected while the first audio sample is not being outputted (e.g., see FIG. 12W), causes output, via the audio generation component (e.g., 1245), of at least a second portion (e.g., a portion that is the same or different than the portion of the first audio sample) of the first audio sample (e.g., in FIG. 12W, input 1274 on version one toggle 1257-1 causes audio output at headphones device 1245 to switch to audio associated with toggle 1257-1, as represented by the transition from waveform 1260-2 in FIG. 12W to waveform 1260-3 in FIG. 12X). In some embodiments, the representation of the second audio sample (e.g., 1257-2), when selected while the second audio sample is not being outputted (e.g., see FIG. 12AA), causes output, via the audio generation component, of at least a portion of the second audio sample (e.g., in FIG. 12AA, input 1277 on version two toggle 1257-2 causes audio output at headphones device 1245 to switch to audio associated with toggle 1257-2, as represented by the transition from waveform 1260-3 in FIG. 12AA to waveform 1260-4 in FIG. 12AB). In some embodiments, displaying the audio preference interface (e.g., 1255-1; 1255-2; 1255-3) includes displaying a selectable volume control user interface object (e.g., 1258) configured for adjusting (e.g., in response to the set of one or more user inputs) a volume of audio outputted while the selectable volume control user interface object is displayed. Displaying the audio preference interface with the selectable volume control user interface object permits a user to more quickly and easily compare and adjust the audio being produced without having to display a separate interface to access the volume controls, thereby reducing the number of inputs needed to perform the volume adjustments and to compare the audio samples. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the audio preference interface is used to toggle between selecting the first audio sample or the second audio sample, and the volume control user interface object is used to adjust the volume of the first or second audio sample that is selected (e.g., see FIGS. 12X-12Z). For example, if the first audio sample is selected, adjusting the volume control interface object increases or decreases an output volume of the first audio sample that is being played back (e.g., using the audio generation component). Alternatively, if the second audio sample is selected, adjusting the volume control interface object increases or decreases an output volume of the second audio sample that is being played back.

In some embodiments, the first audio sample (e.g., audio associated with version one toggle 1257-1) and the second audio sample (e.g., audio associated with version two toggle 1257-2) are both based on a second audio data (e.g., audio produced at headphones device 1245 in, for example, FIG. 12V or 12W) (e.g., audio media (e.g., music, a voice recording, an audio component of audiovisual media)) (e.g., the first audio sample and the second audio sample are samples of the same audio media, but with different sets of audio characteristics) that has a playback time (e.g., a playback duration). In some embodiments, the second audio data is the first audio data. In some embodiments, while the computer system (e.g., 1200) outputs the second audio data, at a first time point (e.g., a time stamp, a particular time in the overall playback time) in the playback time of the second audio data, as a portion of the first audio sample or as a portion of the second audio sample (e.g., while outputting the second audio data based on the first set of audio characteristics or the second set of audio characteristics), the computer system receives, via the one or more input devices, a second set of one or more user inputs (e.g., input 1272; input 1275). In some embodiments, the second audio data is outputted as looping playback so that, upon reaching the end of the playback time, the audio restarts (e.g., without interruption) from the start of the playback time. In some embodiments, in response to receiving the second set of one or more user inputs, in accordance with a determination that the second audio data is being outputted as a portion of the first audio sample and a determination that the set of one or more user inputs includes a selection of the representation of the second audio sample, the computer system continues to output the second audio data from the first time point (e.g., substantially from the first time point) and transitions to output of the second audio data as a portion of the second audio sample (e.g., modify playback of the second audio data from being based on the first set of audio characteristics to the second set of audio characteristics, while continuing to playback the second audio data from the same timepoint) (e.g., in FIGS. 12U and 12V, in response to input 1272, audio continues playback at headphones device 1245 and switches from the audio characteristics associated with version one toggle 1257-1 to the audio characteristics associated with version two toggle 1257-2). In some embodiments, in response to receiving the second set of one or more user inputs, in accordance with a determination that the second audio data is being outputted as a portion of the second audio sample and a determination that the set of one or more user inputs includes a selection of the representation of the first audio sample, the computer system continues to output the second audio data from the first time point and transitions to output of the second audio data as a portion of the first audio sample (e.g., modify playback of the second audio data from being based on the second set of audio characteristics to the first set of audio characteristics, while continuing to playback the second audio data from the same timepoint) (e.g., in FIGS. 12W and 12X, in response to input 1274, audio continues playback at headphones device 1245 and switches from the audio characteristics associated with version two toggle 1257-2 to the audio characteristics associated with version one toggle 1257-1). Transitioning the output of the second audio data based on the selection of the representation of the audio sample, while continuing to output the second audio data, permits the user to compare and contrast the different audio samples without having to initiate playback of the audio for each comparison, thereby reducing the number of inputs needed to perform the audio comparison. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the audio is output in a looping playback while the user selects the representation of the first audio sample or the representation of the second audio sample. As the user toggles between selecting the representation of the first audio sample and selecting the representation of the second audio sample, the output audio toggles between the first audio sample (having the first set of audio characteristics) and the second audio sample (having the second set of audio characteristics).

In some embodiments, at least one of the first audio sample or the second audio sample includes a spoken audio sample (e.g., audio that includes recorded human speech). In some embodiments, the audio preference interface includes a volume control interface when one or more of the audio samples include a spoken audio recording. In some embodiments, the audio preference interface does not include a volume control interface when one or more of the audio samples include a spoken audio recording.

In some embodiments, after recording the selection of the first audio sample as a preferred audio sample or the selection of the second audio sample as the preferred audio sample (in some embodiments, before outputting the first audio data), the computer system (e.g., 1200) displays, via the display generation component (e.g., 1202), a recommended audio adjustment interface (e.g., 1270; 1280) (e.g., the recommended audio adjustments are based, at least in part, on the recorded selection of the first or second audio sample as the preferred sample), including concurrently displaying a first audio preview interface object (e.g., 1282-1) corresponding to a recommended set of audio characteristics (in some embodiments, the recommended set of audio characteristics is selected based on at least the preferred sample recorded in response to the set of one or more inputs) and a second audio preview interface object (e.g., 1282-2) corresponding to a fifth set of audio characteristics, different than the recommended set of audio characteristics. In some embodiments, the fifth set of audio characteristics is a predefined set of audio characteristics (e.g., default or standard audio characteristics) that is not based on selections recorded using the audio preference interface. In some embodiments, the computer system receives, via the one or more input devices, a third set of one or more inputs (e.g., an input on 1282-1; 1283; 1285). In some embodiments, in response to receiving the third set of one or more inputs, and in accordance with a determination that the third set of one or more inputs includes a selection of the first audio preview interface object (e.g., an input on 1282-1; input 1285), the computer system outputs (in some embodiments, continues to output if output is already occurring based on the recommended set of audio characteristics) a third audio data (e.g., audio represented by waveform 1260-5) (e.g., a preview of output audio) based on (e.g., using) the recommended set of audio characteristics (e.g., the preview of output audio includes the recommended audio adjustments; the preview of output audio has customized audio settings applied to it). In some embodiments, in response to receiving the third set of one or more inputs, and in accordance with a determination that the third set of one or more inputs includes a selection of the second audio preview interface object (e.g., 1283), the computer system outputs (in some embodiments, continues to output if output is already occurring based on the fifth set of audio characteristics) the third audio data based on (e.g., using) the fifth set of audio characteristics (e.g., audio represented by waveform 1260-6) (e.g., the preview of output audio does not include the recommended audio adjustments; the preview of output audio has standard audio settings applied to it). Outputting the third audio data based on the recommended set of audio characteristics or the fifth set of audio characteristics, in response to the selection of the respective first or second audio preview interface object, permits the user to compare and contrast audio settings based on the recommended or fifth sets of audio characteristics without having to accept, decline, or modify the audio settings to compare playback of audio with the different characteristics, thereby reducing the number of inputs needed to set the audio settings. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the recommended audio adjustment interface permits the user to preview output audio having the recommended/customized audio settings enabled or disabled. In some embodiments, the recommended audio adjustment interface further includes a recommended interface object that, when selected, sets the recommended set of audio characteristics as the set of audio characteristics for later playback of audio data of at least a first type (e.g., audio media such as music or videos). In some embodiments, the recommended audio adjustment interface further includes an interface object that, when selected, sets the fifth set of audio characteristics as the set of audio characteristics for later playback of audio data of at least a first type (e.g., audio media such as music or videos). In some embodiments, the recommended audio adjustment interface includes an indication that no audio adjustments are recommended or needed (e.g., that the fifth set of audio characteristics will be used for later playback).

In some embodiments, the computer system (e.g., 1200) displays, via the display generation component (e.g., 1202), a selectable ambient sound amplification control (e.g., 1286; 1289). In some embodiments, the computer system receives an input (e.g., 1287; 1289-1; 1291-1; 1291-2; 1291-3; 1292; 1293) corresponding to the selectable ambient sound amplification control. In some embodiments, in response to the input corresponding to the selectable ambient sound amplification control, the computer system adjusts an audio characteristic (e.g., 1286-1; 1286-2; 1286-3; 1290-1; 1290-2; 1290-3; a noise control feature) (e.g., a volume, a balance, vocal clarity, brightness) of an ambient sound amplification function of the computer system (e.g., modifying a setting that affects future operation of the sound amplification function). In some embodiments, the audio generation component is a set of headphones (e.g., 1245) (e.g., over-the-ear or in-the-ear headphones) and the computer system is in communication with a microphone (e.g., integrated in the headphones) for detecting ambient sounds and is configured to amplify the detected ambient sounds using the audio generation component. In some embodiments, amplifying the ambient noise can permit the user to better hear the ambient sounds of the environment (e.g., without having to remove their headphones). In some embodiments, the audio characteristic of the ambient sound amplification function of the computer system is selected from the group consisting of amplification, balance, brightness, and a combination thereof.

In some embodiments, the computer system (e.g., 1200) displays (e.g., before or after display of the audio preference interface (e.g., 1255)), via the display generation component (e.g., 1202), a representation of an existing audio profile (e.g., 1233-1; 1233-2; 1215-4) (e.g., an audiogram, a record produced by a previous audiometry test). In some embodiments, the audiogram was provided by a medical institution. In some embodiments, the process for modifying output of audio playback based on an existing audio profile includes customizing audio settings based on the existing audio profile. In some embodiments, this includes displaying one or more representations of prior audiogram tests, receiving a selection of one of the representations of a prior audiogram test, and applying audio settings that are recommended based on the results of an audiogram test associated with the selected representation of a prior audiogram test. In some embodiments, the computer system receives a set of one or more inputs including an input corresponding to (e.g., a selection of) the representation of the existing audio profile. In some embodiments, in response to the set of one or more inputs including an input corresponding to the representation of the existing audio profile, the computer system initiates a process for configuring, based on the existing audio profile, one or more audio characteristics of audio playback (e.g., future audio playback of audio data). Initiating a process for configuring one or more audio characteristics of audio playback based on the existing audio profile allows a user to select custom audio settings that have been optimized based on the user's hearing capabilities without having to initiate the custom audio setup process, thereby reducing the number of inputs needed to create custom audio settings. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the audio generation component (e.g., 1245) is a first external audio output device (e.g., a first set of headphones 1245). In some embodiments, after receiving the set of one or more user inputs, the computer system (e.g., 1200) generates a first audio settings profile (e.g., custom audio settings shown in FIG. 12AF) based on at least the recorded selection. In some embodiments, after the audio settings profile is created, it is associated with the first external audio output device so that the customized audio settings are automatically applied when the first external audio output device is being used. In some embodiments, the computer system detects communication (e.g., establishing a connection) with a second external audio output device (e.g., new headphones 1297) different from the first external audio output device (e.g., a second, different set of headphones). In some embodiments, in response to detecting communication with the second audio output device, the computer system displays, via the display generation component (e.g., 1202), a user interface object (e.g., 1296) that, when selected, initiates a process for associating (e.g., by adjusting the audio settings in 1205 (e.g., FIG. 12AF)) (e.g., automatically) the first audio settings profile with the second external audio output device. In some embodiments, after the audio settings profile is created and a second headphones device is connected to the computer system, the system displays a user interface for initiating a process for automatically associating the audio settings profile with the second set of headphones so that the customized audio settings are automatically applied when the second set of headphones are being used with the computer system. This allows the user to use different sets of headphones without having to customize the audio settings for each set of headphones connected to the computer system. Initiating a process for associating the first audio settings profile with the second external audio output device allows a user to apply custom audio settings that have been optimized based on the user's preferences without having to initiate the custom audio setup process, thereby reducing the number of inputs needed to re-create the custom audio settings. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 1200) displays, via the display generation component (e.g., 1202), a set of one or more audio type controls (e.g., 1224) (e.g., toggle switches for different audio types (e.g., phone calls, media)). In some embodiments, the computer system receives a set of one or more inputs including an input directed to the set of one or more audio type controls (e.g., 1224-1; 1224-2) (e.g., a selection of a toggle switch for phone calls). In some embodiments, in response to receiving the set of one or more inputs including an input directed to the set of one or more audio type controls, and in accordance with a determination that the set of one or more inputs including an input directed to the set of one or more audio type controls includes a first input (e.g., the input corresponds to an activation of a first audio playback type control) (e.g., the input corresponds to an activation of the phone calls toggle switch), the computer system configures one or more audio characteristics of audio playback (e.g., future playback) of a first type (e.g., a first category of audio, a format of audio, a source of audio (e.g., phone calls, media, ambient sound amplification audio)) of audio (e.g., without configuring one or more audio characteristics of audio playback of a second type of audio (e.g., a different audio type)) (e.g., configuring one or more audio characteristics of audio playback for phone calls, without affecting/adjusting the audio characteristics of audio playback for other audio types (e.g., media, ambient sound amplification audio)). In some embodiments, in response to receiving the set of one or more inputs including an input directed to the set of one or more audio type controls, and in accordance with a determination that the set of one or more inputs including an input directed to the set of one or more audio type controls includes a second input different from the first input (e.g., the input is directed to a media toggle switch, rather than the phone calls toggle switch), the computer system configures one or more audio characteristics of audio playback of a second type of audio different from the first type of audio, without configuring one or more audio characteristics of audio playback of the first type of audio.

In some embodiments, the at least one audio characteristic of the first set of audio characteristics includes a volume amplification characteristic (e.g., a boosting of volume across all frequency ranges), and the at least one audio characteristic of the second set of audio characteristics includes the volume amplification characteristic (e.g., see amplification phase in FIGS. 12M and 12N).

In some embodiments, the at least one audio characteristic of the first set of audio characteristics includes a frequency-specific volume amplification characteristic (e.g., 1215-1; 1215-2; 1215-3) (e.g., amplifying the volume of different frequency ranges differently), and the at least one audio characteristic of the second set of audio characteristics includes the frequency-specific volume amplification characteristic (e.g., see tone adjustment phase in FIGS. 12O-12AD).

Note that details of the processes described above with respect to method 1300 (e.g., FIG. 13) are also applicable in an analogous manner to the methods described above and below. For example, methods 1500, 1600, and 1800 optionally include one or more of the characteristics of the various methods described above with reference to method 1300. For example, operations for displaying audio exposure limit alerts, operations for managing audio exposure, and operations for managing audio exposure data can incorporate at least some of the operations for setting and adjusting audio settings discussed above with respect to method 1300. For brevity, these details are not repeated below.

Figure 14A:
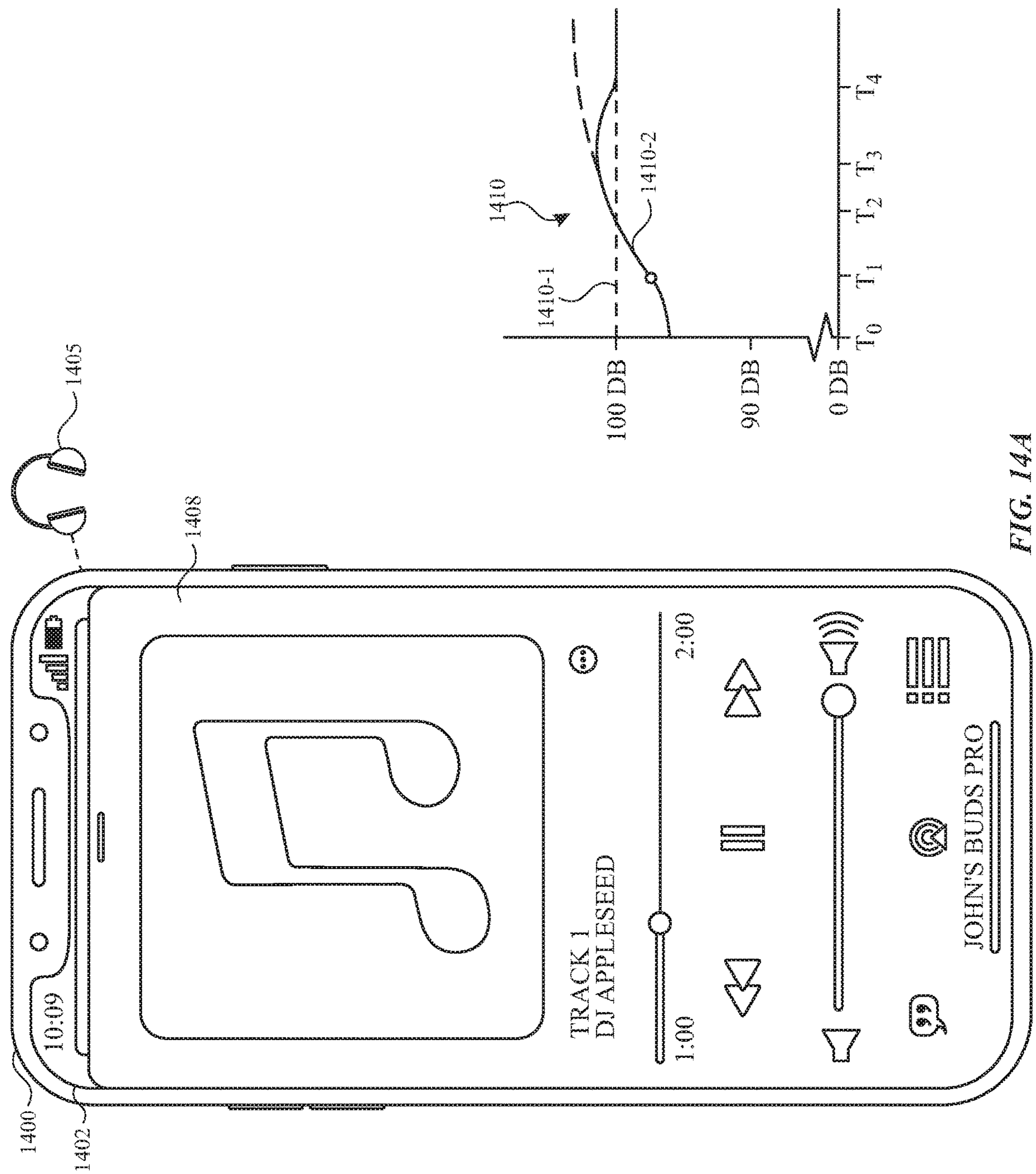
FIGS. 14A-14AK illustrate exemplary user interfaces for managing audio exposure, in accordance with some embodiments.

FIGS. 14A-14AK illustrate exemplary user interfaces for managing audio exposure, in accordance with some embodiments. The user interfaces in these figures are used to illustrate the processes described below, including the processes in FIGS. 15 and 16.

FIGS. 14A-14AK illustrate device 1400 displaying user interfaces on display 1402 (e.g., a display device or display generation component) for generating audio exposure alerts (also referred to as notifications) and managing various audio exposure settings for a user account associated with device 1400. In some embodiments, device 1400 is the same as device 601, device 800, device 900, device 1100, and device 1200. In some embodiments, device 1400 includes one or more features of devices 100, 300, or 500.

Referring briefly to FIG. 14A, device 1400 is coupled (e.g., via a wireless connection) to headphones device 1405 (e.g., John's Buds Pro). As indicated by media user interface 1408, device 1400 is currently playing music at headphones device 1405 at full volume (e.g., 100% volume) using a media application.

FIGS. 14A-14D illustrate an example embodiment in which device 1400 adjusts an output volume of audio produced at headphones device 1405, when an audio exposure threshold (e.g., threshold 1410-1) is reached. In some embodiments, the audio exposure threshold can be an instantaneous volume limit (e.g., a maximum volume limit setting). In some embodiments, the audio exposure threshold can be an aggregate exposure limit (e.g., a limit of an amount of audio that is accumulated over a period of time). In some embodiments, audio exposure threshold (and corresponding actions in response to exceeding the threshold) only applies to headphone devices (e.g., devices worn in or over the user's ears), but not to other audio devices such as speakers. In some embodiments, the audio exposure limit is ignored when media is being played back from a non-headphone speaker. In other words, audio data representing the output volume is not counted towards the audio exposure limit if the media is being played back from a device other than headphones.

FIGS. 14A-14D include graph 1410 representing the output volume of the headphones audio over a period of time (T0-T4). FIGS. 14A-14D correspond to respective times T1-T4 and, collectively, illustrate fluctuations in the volume of the music played at headphones device 1405 as well as the corresponding user interfaces displayed at device 1400 at each respective time. Graph 1410 includes threshold 1410-1, volume 1410-2 (a solid-line representation of the actual volume of the audio output at headphones device 1405), and anticipated volume 1410-3 (a dashed-line representation of what the output audio would have been at headphones device 1405 if the output volume were to remain unadjusted by device 1400).

In FIG. 14A, graph 1410 indicates that, at time T1, music is produced at headphones device 1405 at a volume that is below threshold 1410-1.

Figure 14B:
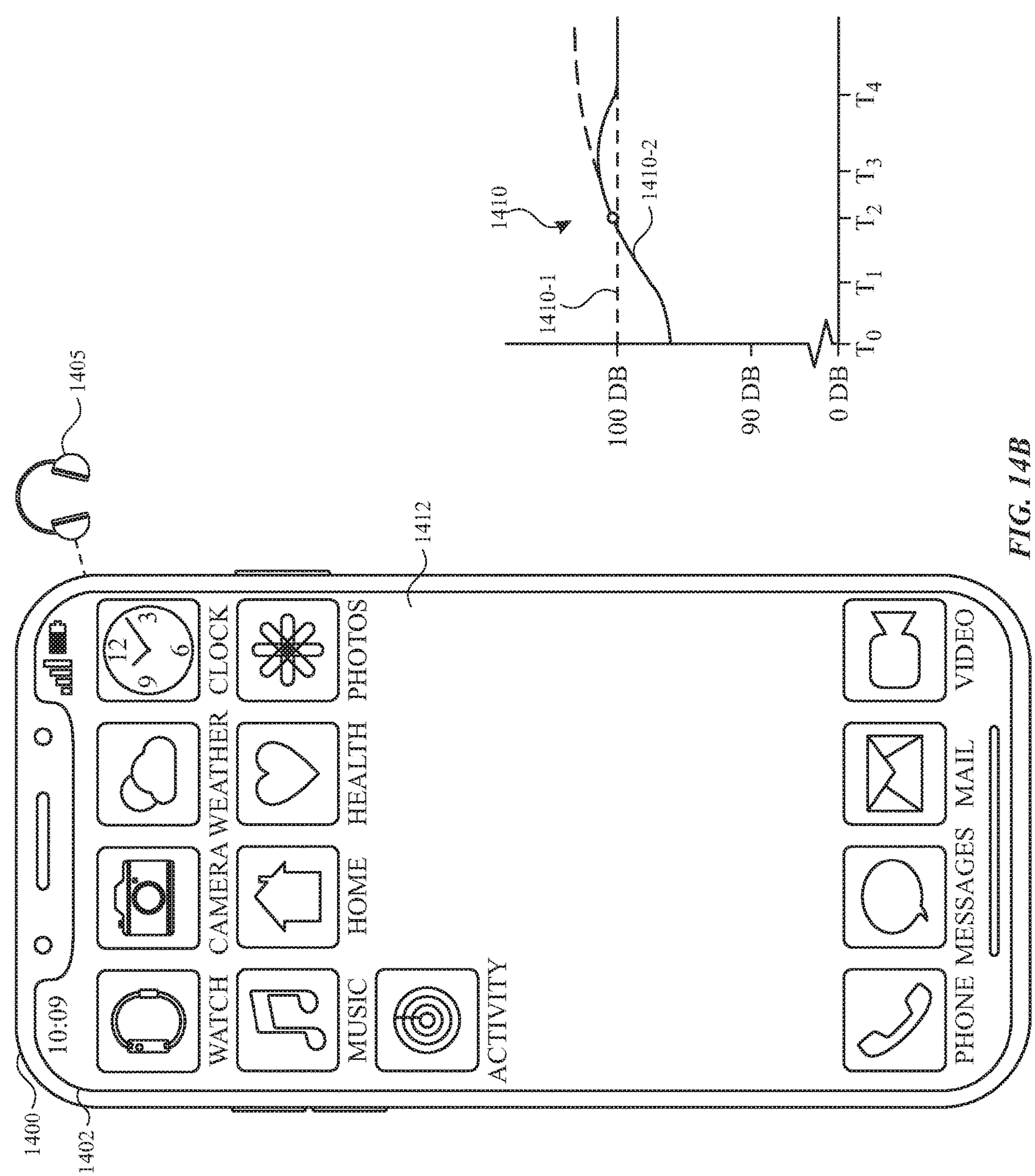

In FIG. 14B, graph 1400 indicates that, at time T2, music produced at headphones device 1405 exceeds threshold 1410-1. At time T2, device 1400 is unlocked and displaying home screen interface 1412 when the output volume at headphones device 1405 meets/exceeds the threshold.

Figure 14C:
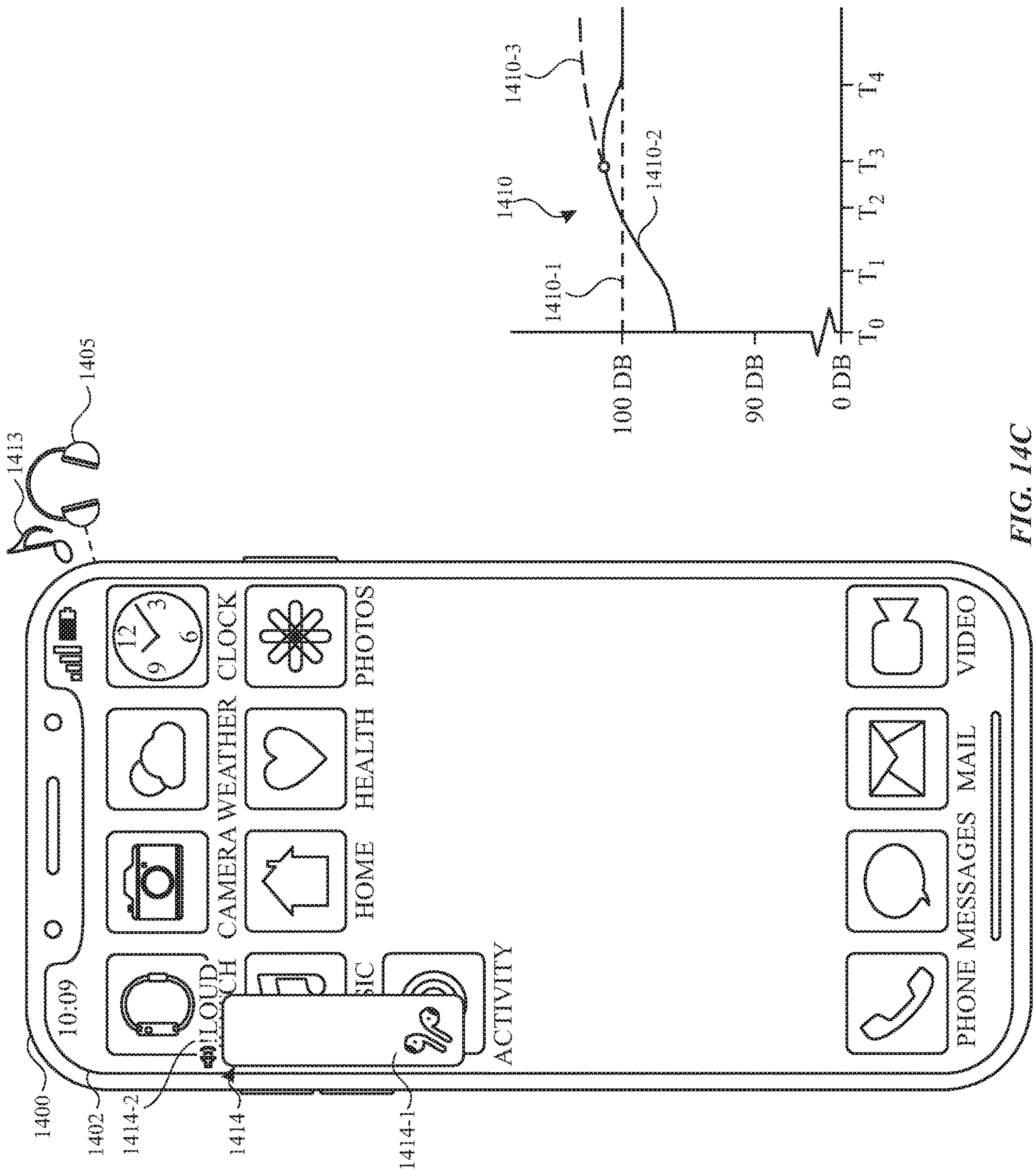

Referring to FIG. 14C, in response to the output volume at headphones device 1405 exceeding threshold 1410-1, device 1400 displays volume interface 1414 and, optionally, produces an audible chime 1413 indicating that the output volume has exceeded the threshold. Volume interface 1414 includes representation 1414-1 of the current volume setting (e.g., 100%) and loud indicator 1414-2 indicating that the output volume is too loud. In some embodiments, device 1400 displays volume interface 1414 as an animation in which volume interface 1414 appears moving onscreen from the edge of display 1402. In some embodiments, loud indicator 1414-2 is displayed when certain conditions are met. For example, in some embodiments, loud indicator 1414-2 is only displayed if the volume setting is 100% and the output volume at headphones device 1405 is over a particular volume (e.g., 80 dB, 100 dB, the threshold volume).

Figure 14D:
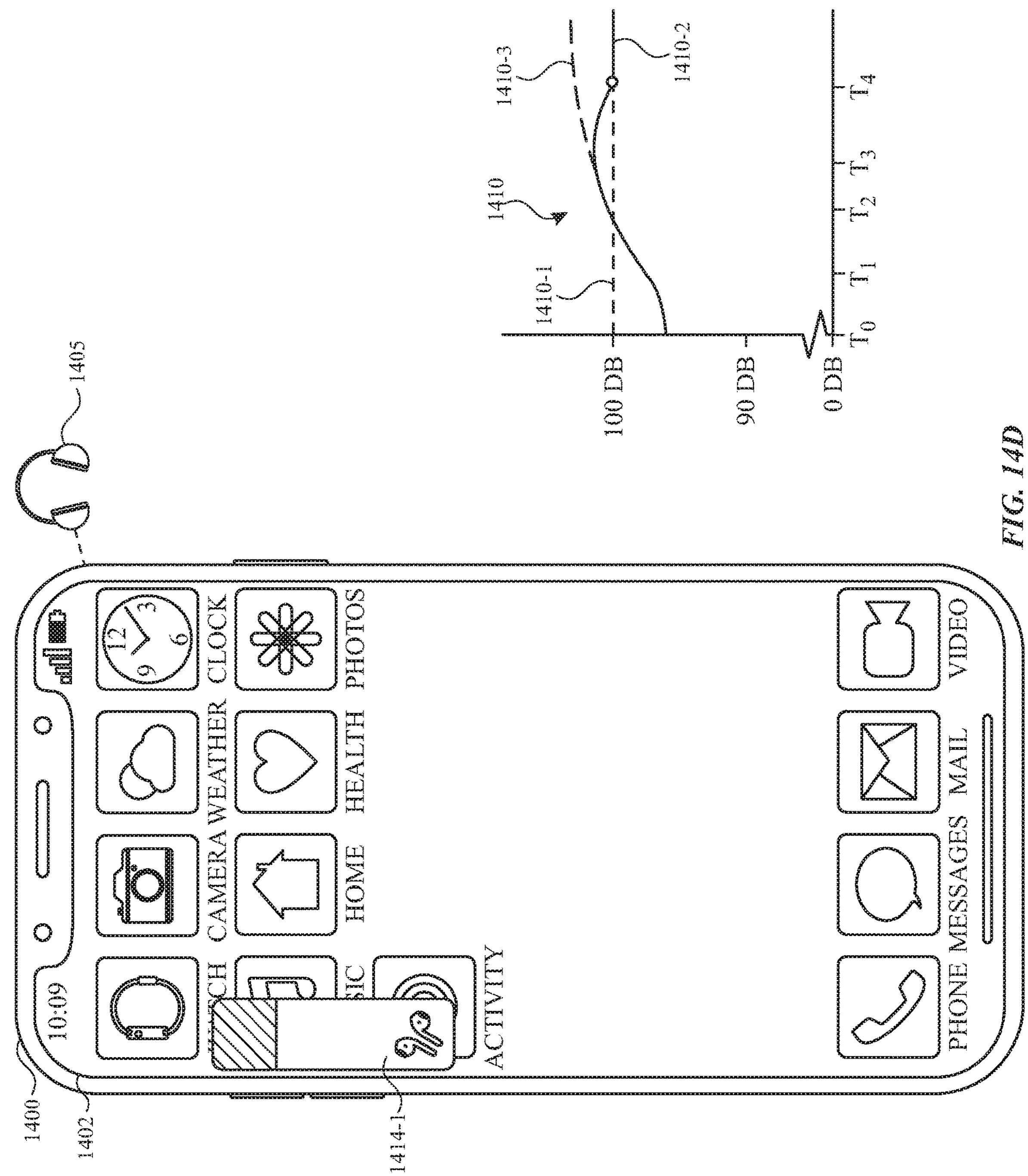

In FIGS. 14A-14C, the output volume at headphones device 1405 has increased (e.g., from a quiet portion of a song to a loud portion of the song) without any adjustments to the volume setting of device 1400 (or headphones device 1405). Accordingly, graph 1410 shows that the output volume of the music continues to rise from time T1 to time T3. In response to detecting the output volume exceeding threshold 1410-1, device 1400 gradually reduces the volume setting as shown in FIG. 14D. In some embodiments, the volume reduction can be an abrupt reduction from the volume that exceeds the threshold to a volume that is at or below the threshold.

In FIG. 14D, device 1400 is shown with volume interface 1414 having a reduced volume setting 1414-1 (and without loud indicator 1414-2), and the output volume at headphones device 1405 is reduced in response to the lowered volume setting, as shown by volume 1410-2 in graph 1410. Moreover, graph 1410 indicates that, if the volume setting of device 1400 were to remain unadjusted, the output volume at device 1405 would have continued to rise (or at least remain above the exposure threshold), as indicated by anticipated volume 1410-3, potentially damaging the user's hearing. Therefore, device 1400 protects the user's hearing by automatically lowering the volume setting of the output audio (e.g., from 100% to 80%) so that the resulting volume of the output audio is at or below threshold 1410-1 and, therefore, avoids potential damage to the user's hearing. In some embodiments, the user is able to override the volume reduction by increasing the volume setting of device 1400. In some embodiments, the volume returns to the previous volume setting (e.g., 100%, in this example) or moves to a setting that is louder than the reduced volume setting (e.g., volume setting increases from 80% to 90%). For example, if device 1200 detects an input to increase the volume within a predetermined amount of time after device 1200 reduces the volume (e.g., within three seconds of the volume reduction), device 1200 increases the volume back to the previous volume setting (e.g., the 100% volume setting of FIG. 14A). If, however, device 1200 detects the input to increase the volume after the predetermined amount of time lapses, device 1200 increases the volume by an amount that is otherwise associated with the volume increase command (e.g., 5%).

In some embodiments, device 1400 displays the volume reduction of FIG. 14D as an animation of volume setting 1414-1 decreasing from the maximum setting shown in FIG. 14C to the setting shown in FIG. 14D. In some embodiments, the volume reduction applies to media playback (e.g., music, games, and videos), but not to other sound sources such as system sounds, phone volume, and video chat.

After reducing the volume setting, device 1400 generates an alert that notifies the user that the volume of the output audio was reduced. FIGS. 14E-14I provide example interfaces of such alerts.

Figure 14F:
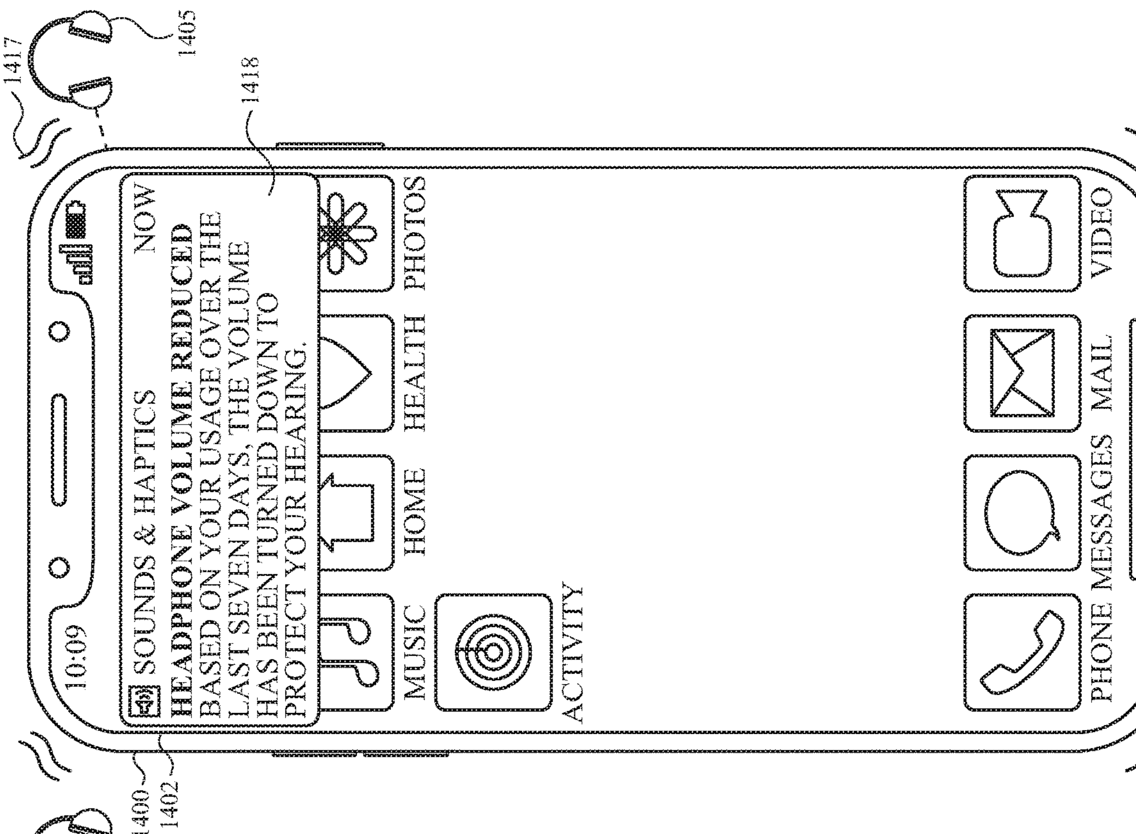
Figure 14E:
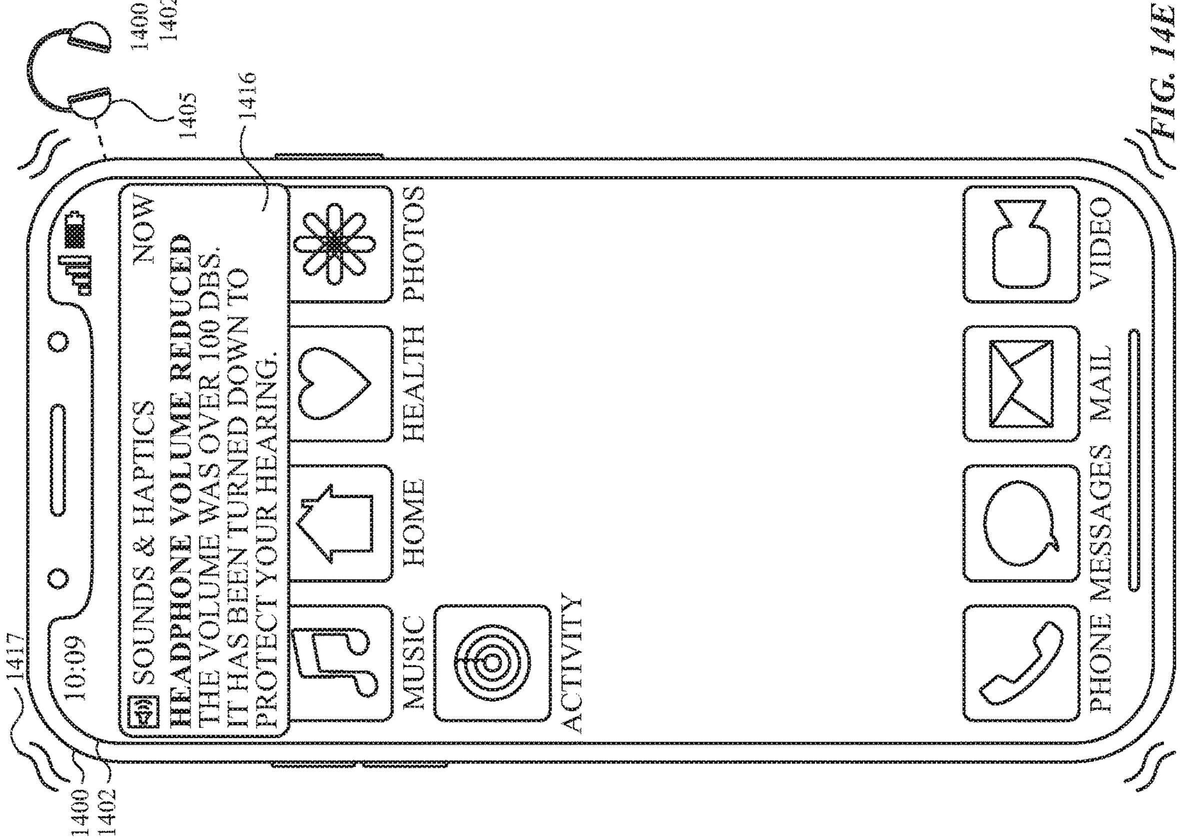

FIG. 14E depicts an embodiment in which audio exposure threshold 1410-1 represents an instantaneous audio exposure limit (e.g., a maximum volume limit of 100 dB), and device 1400 generates instantaneous audio exposure alert 1416 in response to the output volume of headphones device 1405 exceeding the 100 dB instantaneous audio exposure limit. In the embodiments disclosed herein, the instantaneous audio exposure limit is 100 dB; however, the audio exposure limit can be a different value.

In FIG. 14E, display 1402 is already unlocked and device 1400 displays instantaneous audio exposure alert 1416 notifying the user that, based on the current output volume at headphones device 1405, device 1400 lowered the volume of headphones device 1405 to protect the user's hearing. Instantaneous audio exposure alert 1416 is displayed by a system-level application of device 1400 that is distinct from the media application (associated with media user interface 1408) that is generating the audio. In some embodiments, device 1400 displays instantaneous audio exposure alert 1416 as a banner-style notification and, optionally, generates haptic feedback 1417 when displaying the alert.

FIG. 14F depicts an embodiment in which audio exposure threshold 1410-1 represents an aggregate audio exposure limit—that is, a limit of audio exposure that is determined based on a history of the user's headphone audio exposure over a predetermined time period such as, for example, the past seven days. Accordingly, device 1400 generates aggregate audio exposure alert 1418 in response to the aggregate amount of audio volume levels the user has been exposed to for a seven-day period exceeding the aggregate audio exposure limit. In some embodiments, device 1400 generates a subsequent aggregate audio exposure alert 1418 for each instance when a multiple of the aggregate audio exposure limit is reached (e.g., 200%, 300% of the aggregate audio exposure limit).

In some embodiments, the aggregate audio exposure limit (also referred to herein as an aggregate audio exposure threshold) represents a maximum amount of aggregated audio exposure that is not harmful to a user's hearing (e.g., the user's auditory system) when measured over a specific time period (e.g., a rolling seven-day window). In some embodiments, the aggregate audio exposure threshold is determined for a rolling seven-day window based on a combination of two primary factors: the volume of the audio a user is listening to using headphones (e.g., headphones device 1405), and the duration for which the user is exposed to the audio during the seven-day period (e.g., 24 minutes of the seven days). Accordingly, the louder the volume of the audio played at the headphones, the shorter the amount of time the user can be exposed to the audio without damaging their hearing. Similarly, the longer a user is exposed to headphone audio, the lower the volume at which the user can safely listen to the audio without damaging their hearing. For example, over a seven-day period, a user can safely listen to audio at 75 dB for a total of 127 hours. As another example, over a seven-day period, a user can safely listen to audio at 90 dB for a total of 4 hours. As yet another example, over a seven-day period, a user can safely listen to audio at 100 dB for a total of 24 minutes. As yet another example, over a seven-day period, a user can safely listen to audio at 110 dB for a total of 2 minutes. It should be recognized that other metrics may be used for the aggregate audio exposure threshold.

In FIG. 14F, display 1402 is already unlocked and device 1400 displays aggregate audio exposure alert 1418 notifying the user that, based on the user's audio exposure history, device 1400 lowered the volume of headphones device 1405 to protect the user's hearing. Aggregate audio exposure alert 1418 is displayed by a system-level application of device 1400 that is distinct from the media application (which is associated with media user interface 1408) that is generating the audio. In some embodiments, device 1400 displays aggregate audio exposure alert 1418 as a banner-style notification and, optionally, generates haptic feedback 1417 when displaying the alert.

Figure 14H:
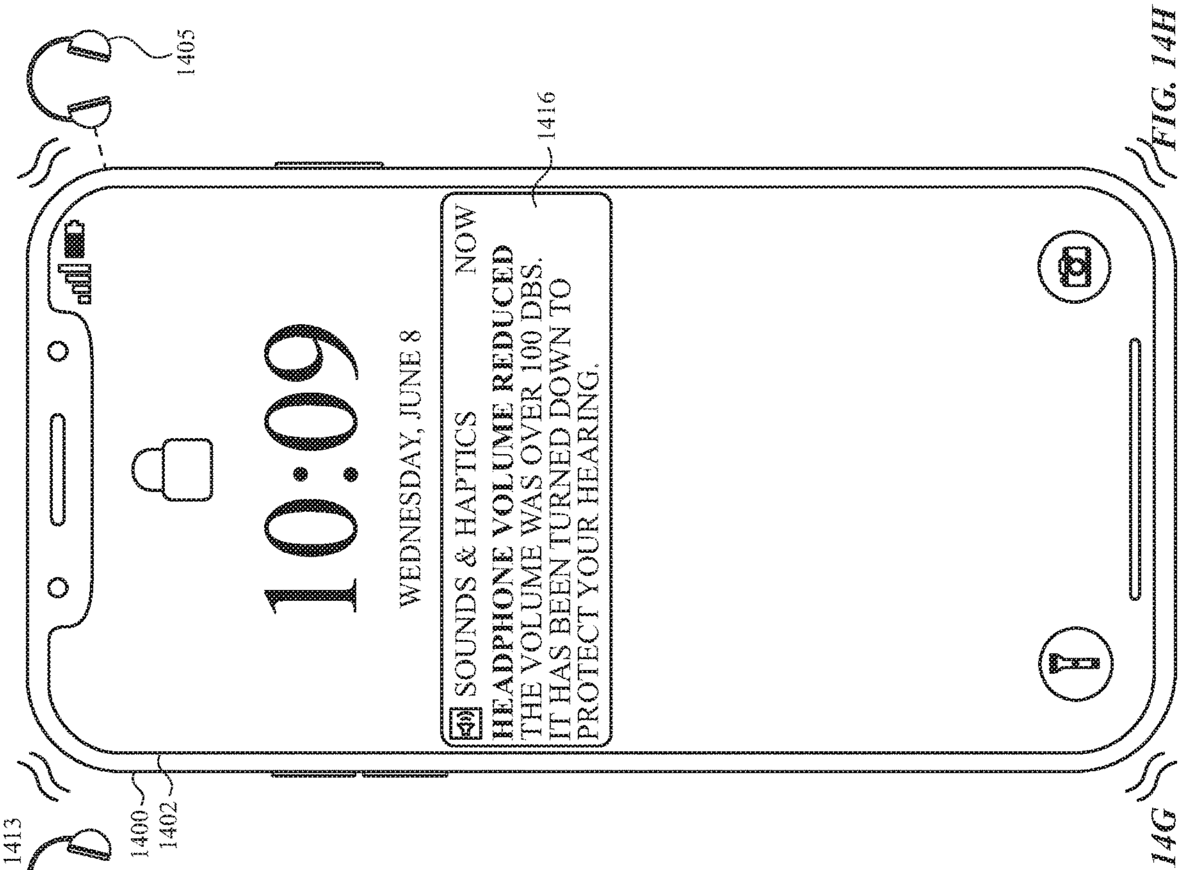
Figure 14G:
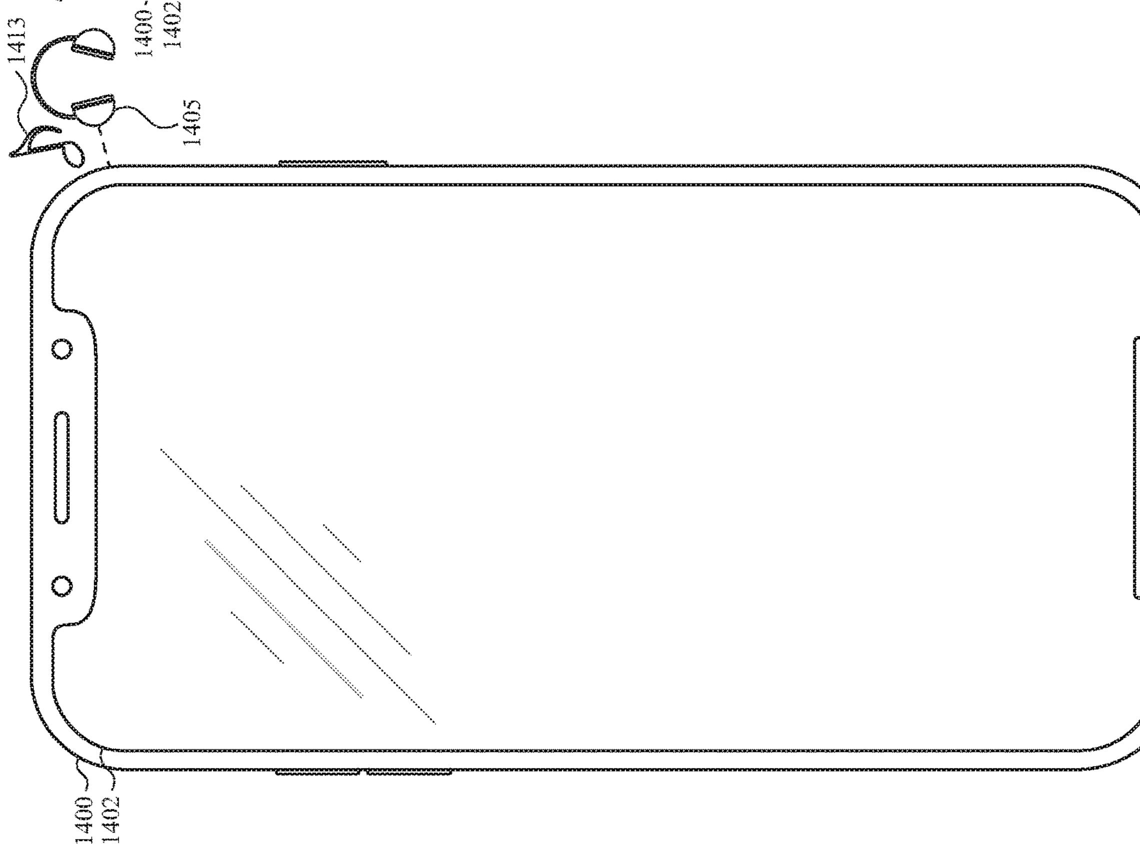
Figure 14I:
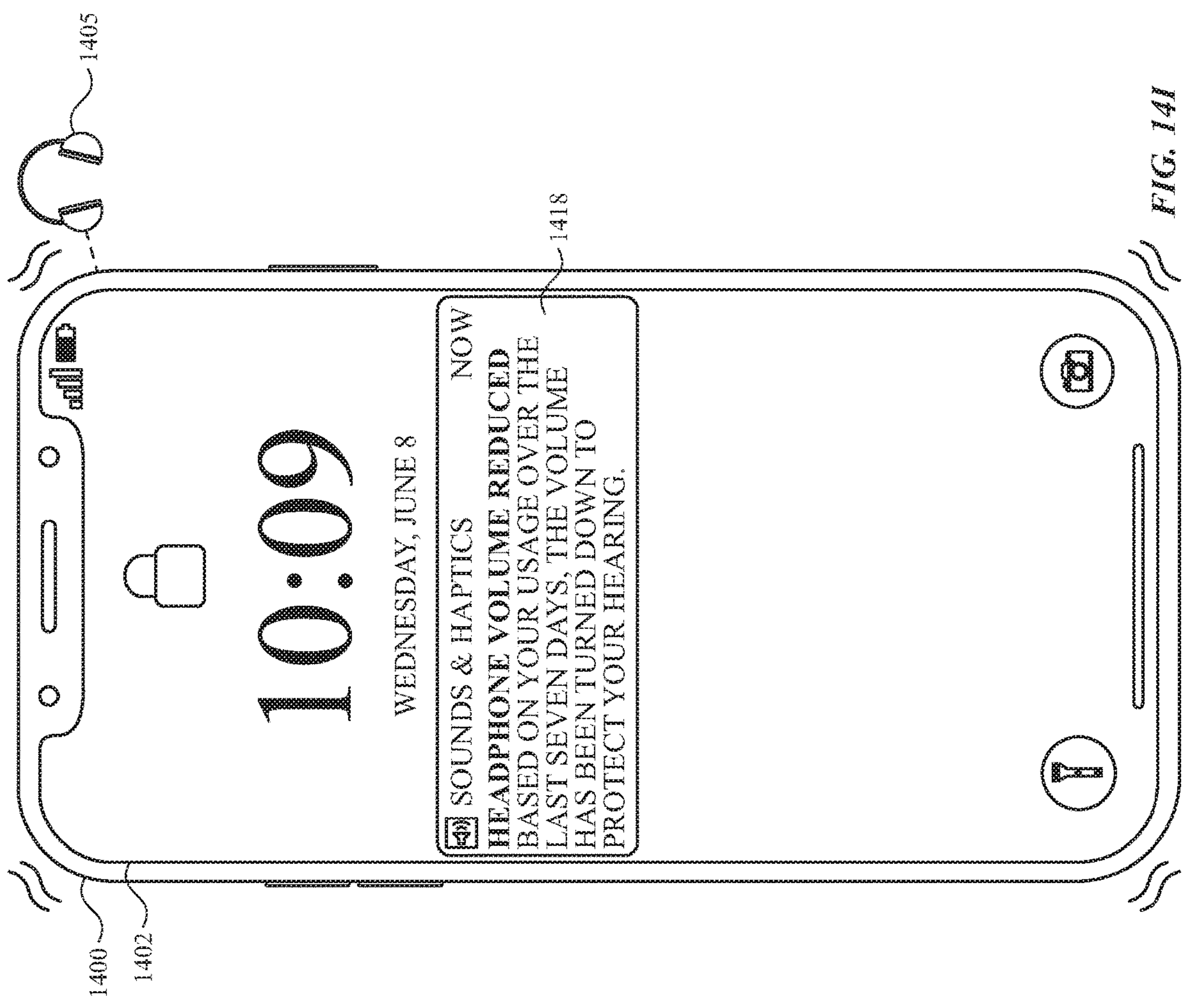

FIGS. 14G-14I illustrate an embodiment in which display 1402 is inactive (e.g., device 1400 is locked), when audio exposure threshold 1410-1 is reached. As depicted in FIG. 14G, display 1402 is inactive and chime 1413 is optionally generated (similar to FIG. 14C) when the output audio at headphones device 1405 exceeds the threshold. In some embodiments, in addition to, or instead of, generating chime 1413, device 1400 uses a virtual assistant to announce the change in volume. The resulting alert is displayed in FIG. 14H or 14I, depending on whether the audio exposure threshold 1410-1 represents the instantaneous audio exposure threshold or the aggregate audio exposure threshold. FIG. 14H depicts the resulting instantaneous audio exposure alert 1416 when audio exposure threshold 1410-1 represents the instantaneous audio exposure threshold. FIG. 14I depicts the resulting aggregate audio exposure alert 1418 when audio exposure threshold 1410-1 represents the aggregate audio exposure threshold.

Figure 14J:
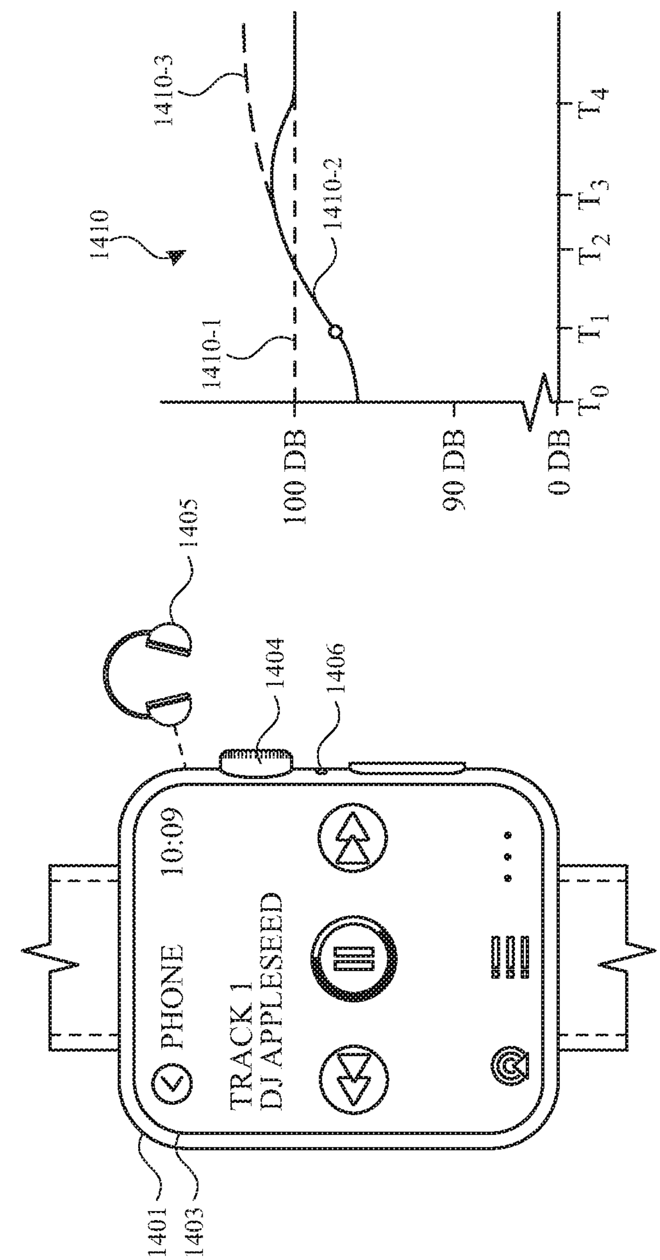
Figure 14K:
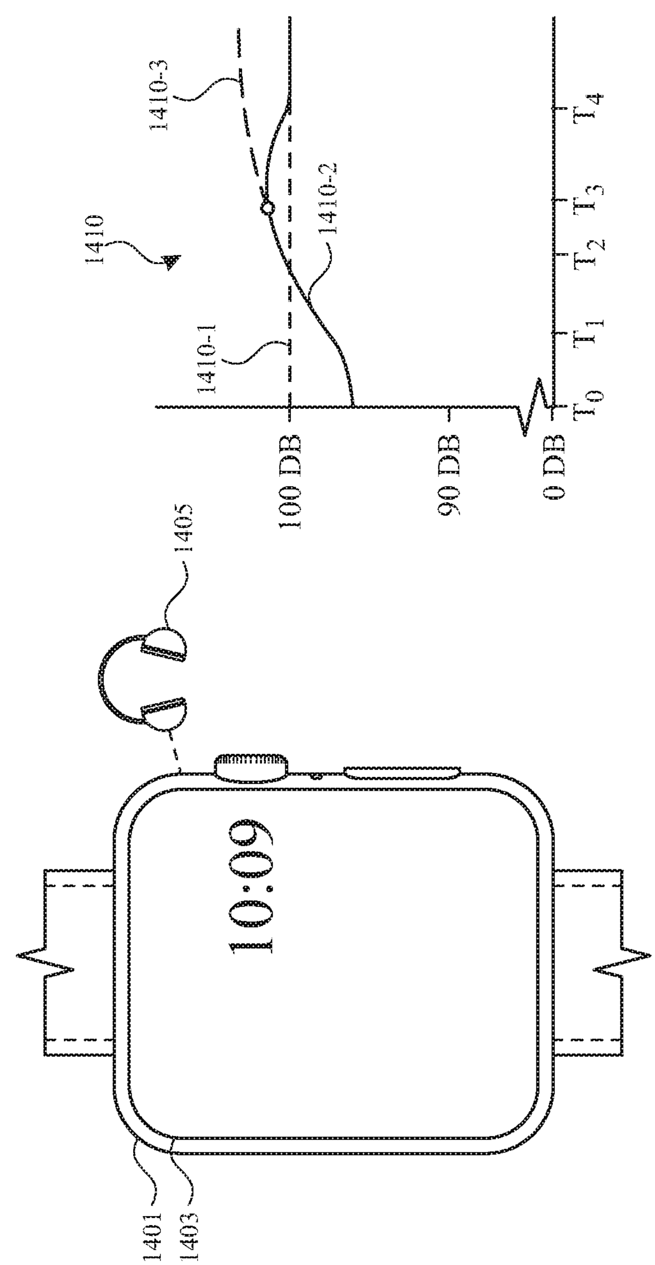
Figure 14L:
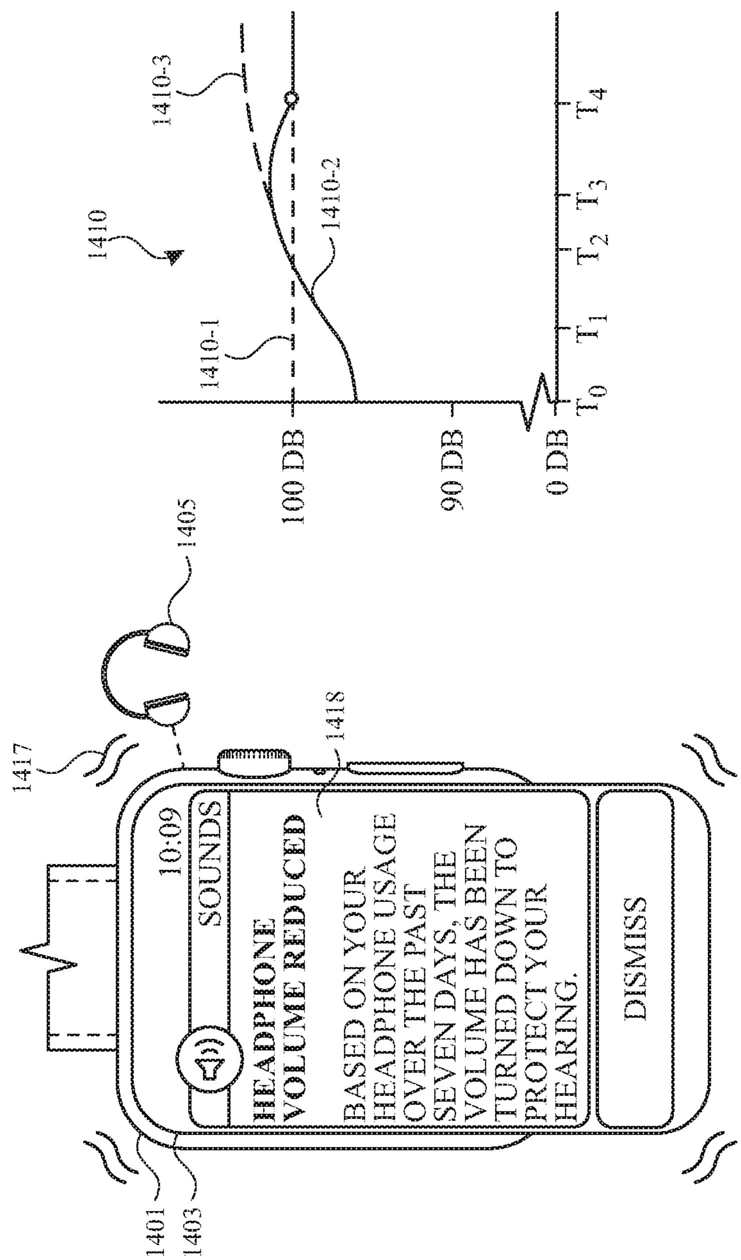

FIGS. 14J-14L illustrate an example embodiment similar to that discussed above with respect to FIGS. 14A-14I, but replacing device 1400 with device 1401. Device 1401 includes display 1403 (e.g., a display device), rotatable and depressible input mechanism 1404 (e.g., rotatable and depressible in relation to a housing or frame of the device), and microphone 1406. In some embodiments, device 1401 is a wearable electronic device, such as a smartwatch. In some embodiments, device 1401 includes one or more features of devices 100, 300, 500, or 1400. In some embodiments, device 1401 is the same as device 600.

In FIG. 14J, device 1401 is coupled to headphones device 1405 and playing music, similar to FIG. 14A. In FIG. 14K, display 1403 is inactive when the output volume of the music at headphones device 1405 exceeds audio exposure threshold 1410-1, similar to FIGS. 14C and 14G. In FIG. 14L, device 1401 reduces the output volume and displays aggregate audio exposure alert 1418 with optional haptic feedback 1417, similar to FIGS. 14D and 14I. In some embodiments, the alert in FIG. 14L is instantaneous audio exposure alert 1416 when the audio exposure threshold 1410-1 represents an instantaneous audio exposure threshold. In some embodiments, the alert (e.g., instantaneous audio exposure alert 1416 or aggregate audio exposure alert 1418) is displayed while reducing the volume, as depicted in FIG. 14L. In some embodiments, the alert is displayed after reducing the volume, as depicted in FIGS. 14E and 14F. In some embodiments, device 1401 and headphones device 1405 are both coupled to device 1400 (e.g., device 1401 is not directly connected to headphones device 1405). In such embodiments, the audio exposure alerts (e.g., alert 1416 and alert 1418) can be displayed on device 1401, rather than on device 1400 (or, in some embodiments, in addition to being displayed on device 1400), even though headphones device 1405 is coupled to device 1400 instead of device 1401. Similarly, device 1401 can also display the interfaces depicted in FIGS. 14X and 14Y, discussed in greater detail below, when headphones device 1405 is coupled to device 1400 instead of device 1401.

FIGS. 14M-14W illustrate device 1400 displaying user interfaces for managing audio exposure settings.

Figure 14N:
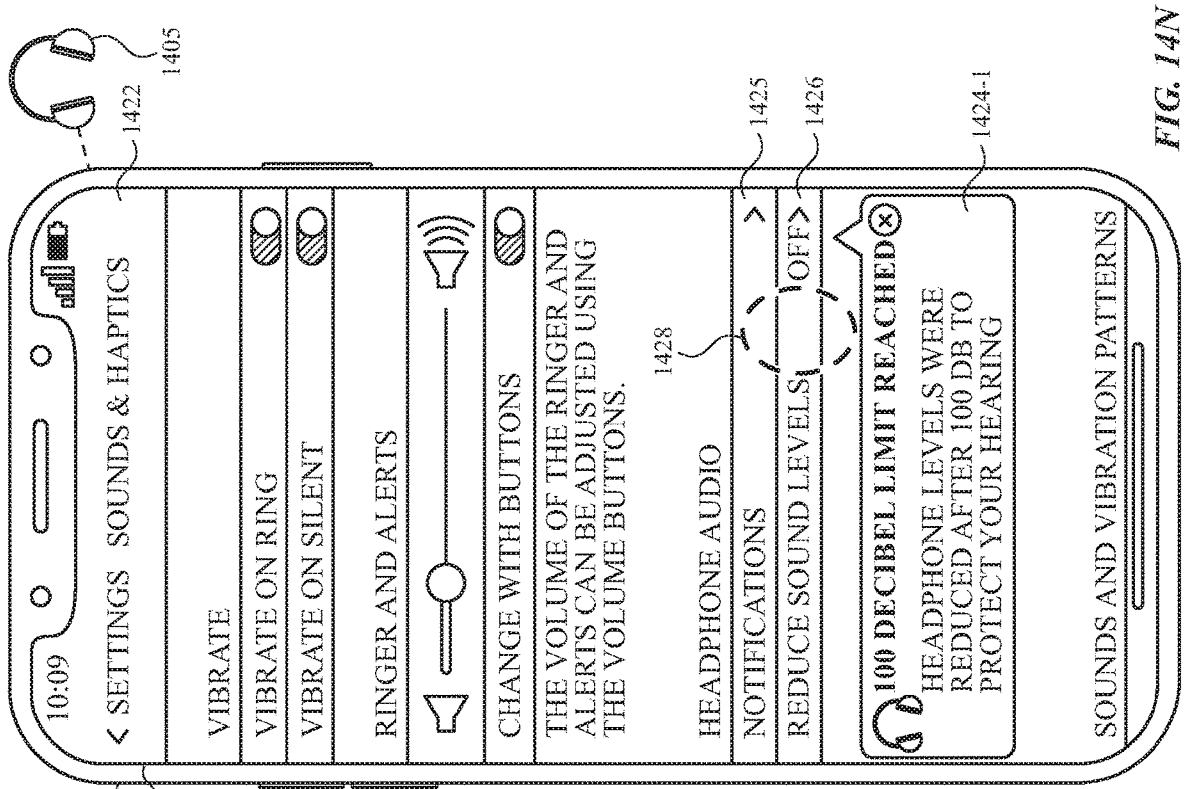
Figure 14M:
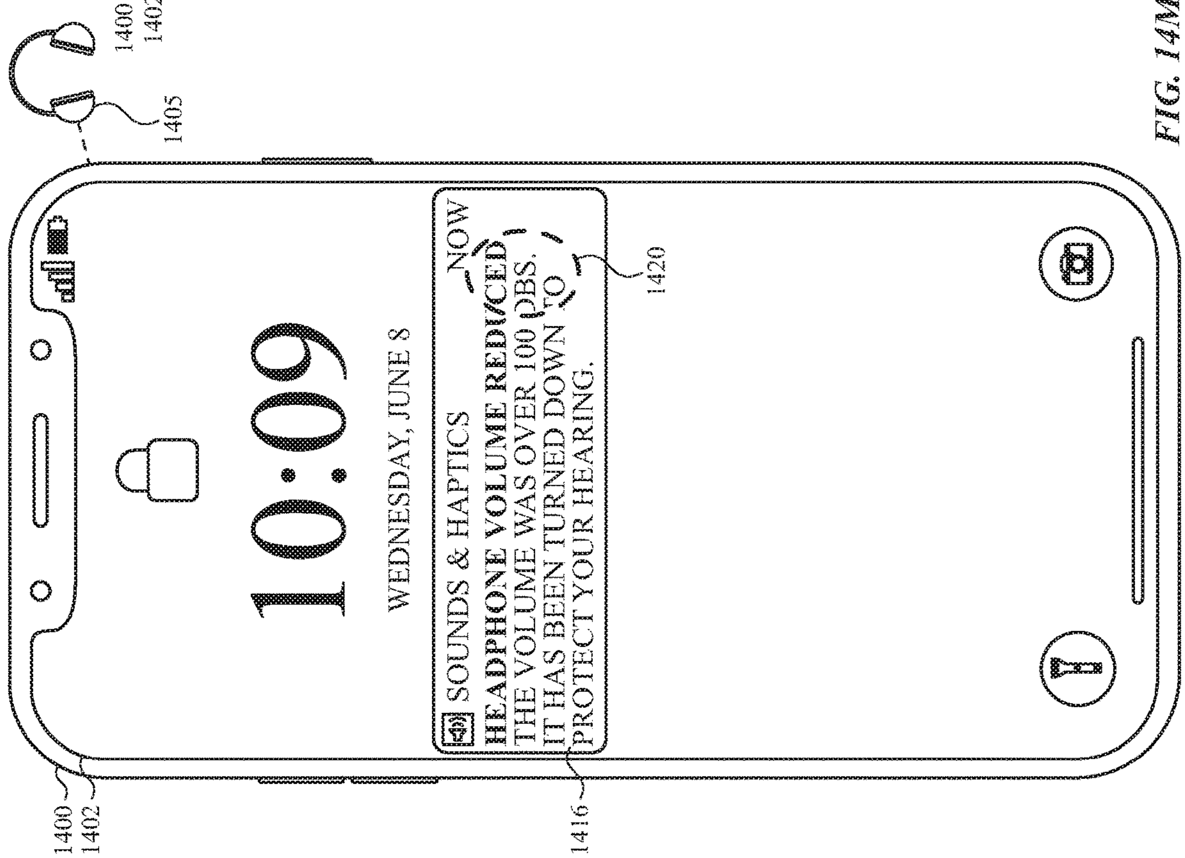
Figure 14O:
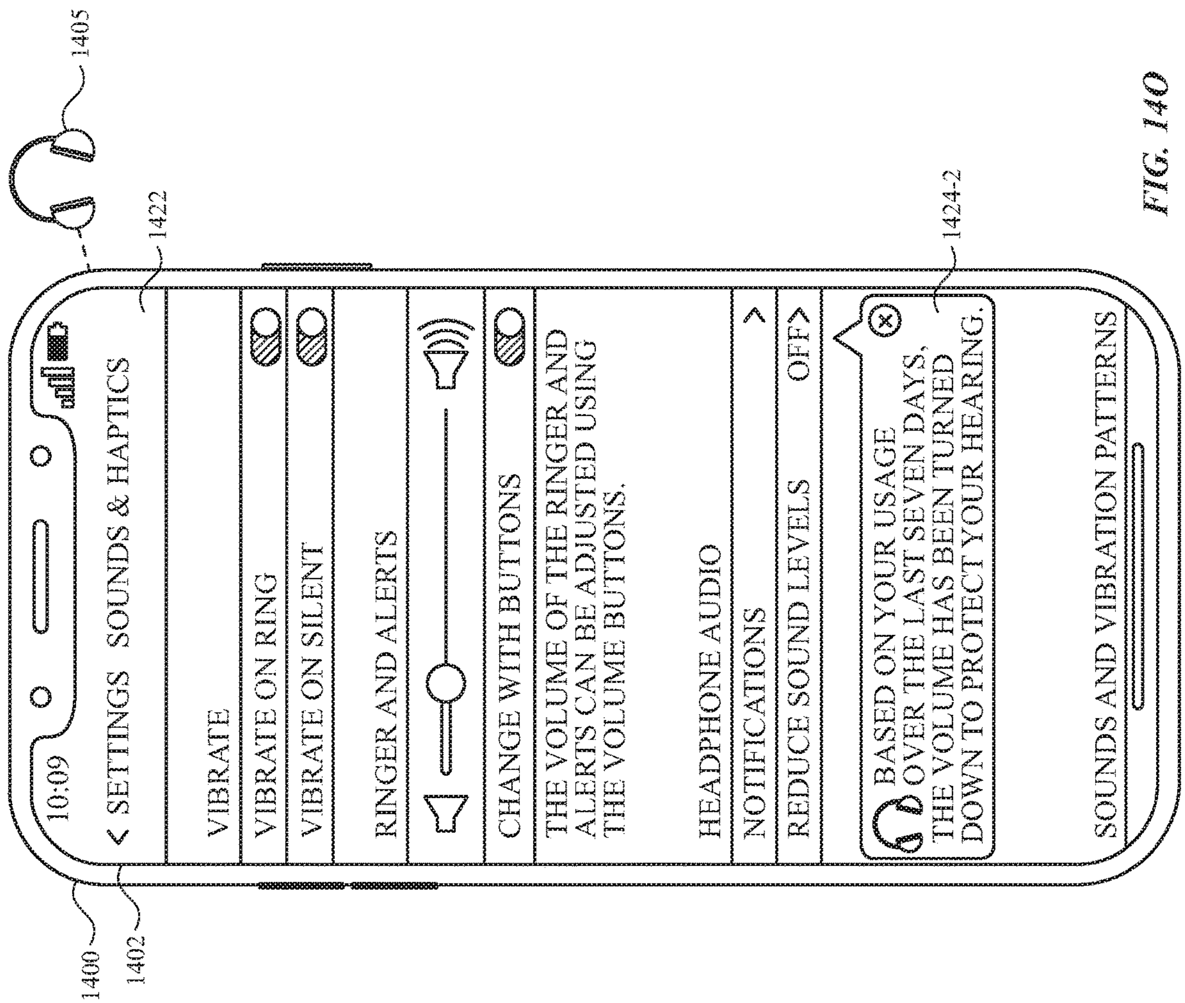

In FIG. 14M, device 1400 detects input 1420 (e.g., a tap input) on instantaneous audio exposure alert 1416 and, in response, displays audio settings interface 1422, as shown in FIG. 14N. In some embodiments, device 1400 displays audio settings interface 1422 in response to an input on aggregate audio exposure alert 1418.

In FIG. 14N, audio settings interface 1422 includes indication 1424-1 of the alert that was recently generated (e.g., the alert in FIG. 14M). In FIG. 14N, indication 1424-1 corresponds to the instantaneous audio exposure alert 1416 in FIG. 14M. However, if the alert in FIG. 14M was the aggregate audio exposure alert 1418, the indication would correspond to the aggregate audio exposure alert, as depicted by indication 1424-2 in FIG. 14O.

In FIG. 14N, audio settings interface 1422 includes notifications menu item 1425 and sound reduction menu item 1426, which is currently disabled. Device 1400 detects input 1428 on sound reduction menu item 1426 and, in response, displays sound reduction interface 1430 in FIG. 14P.

Figure 14P:
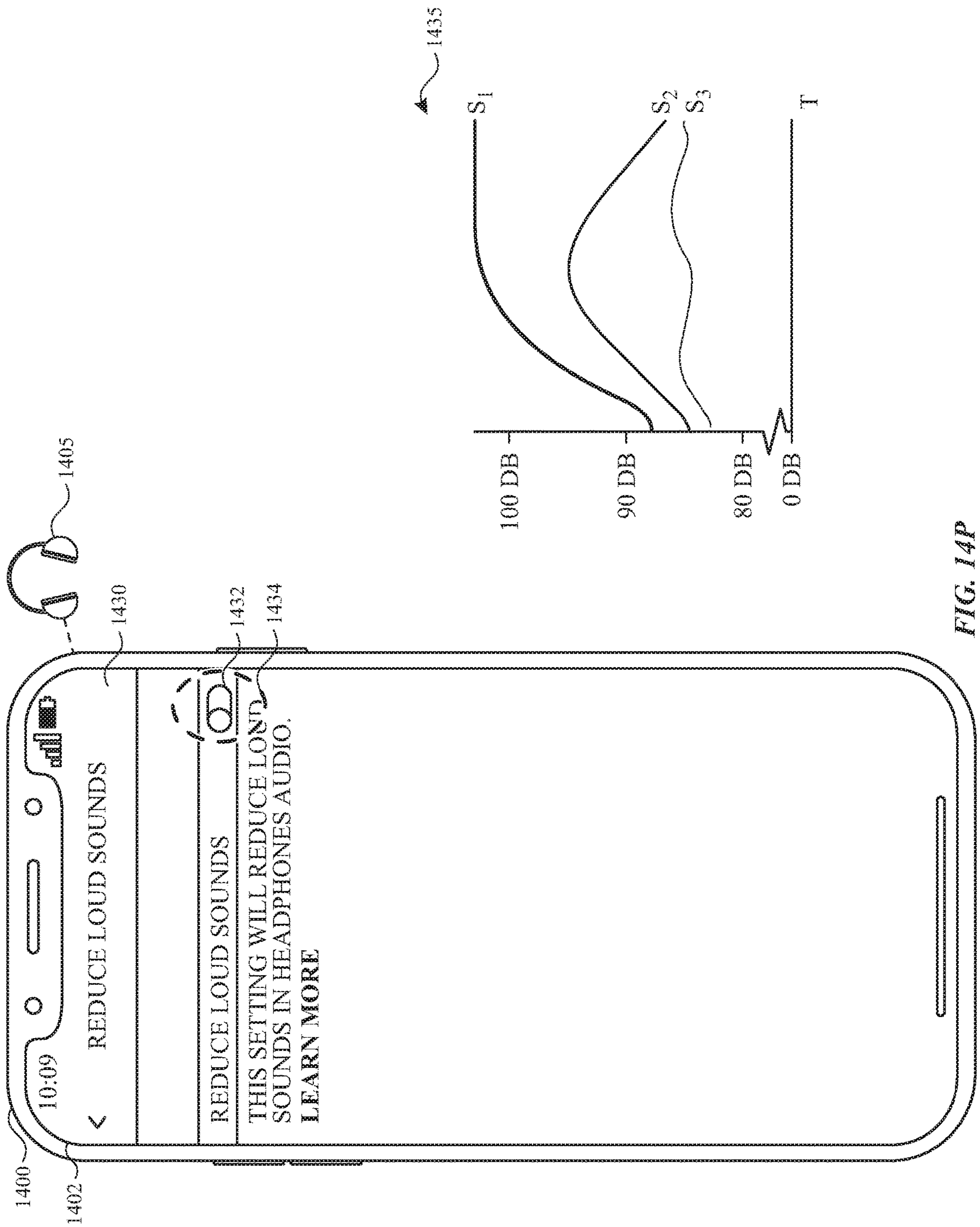
Figure 14Q:
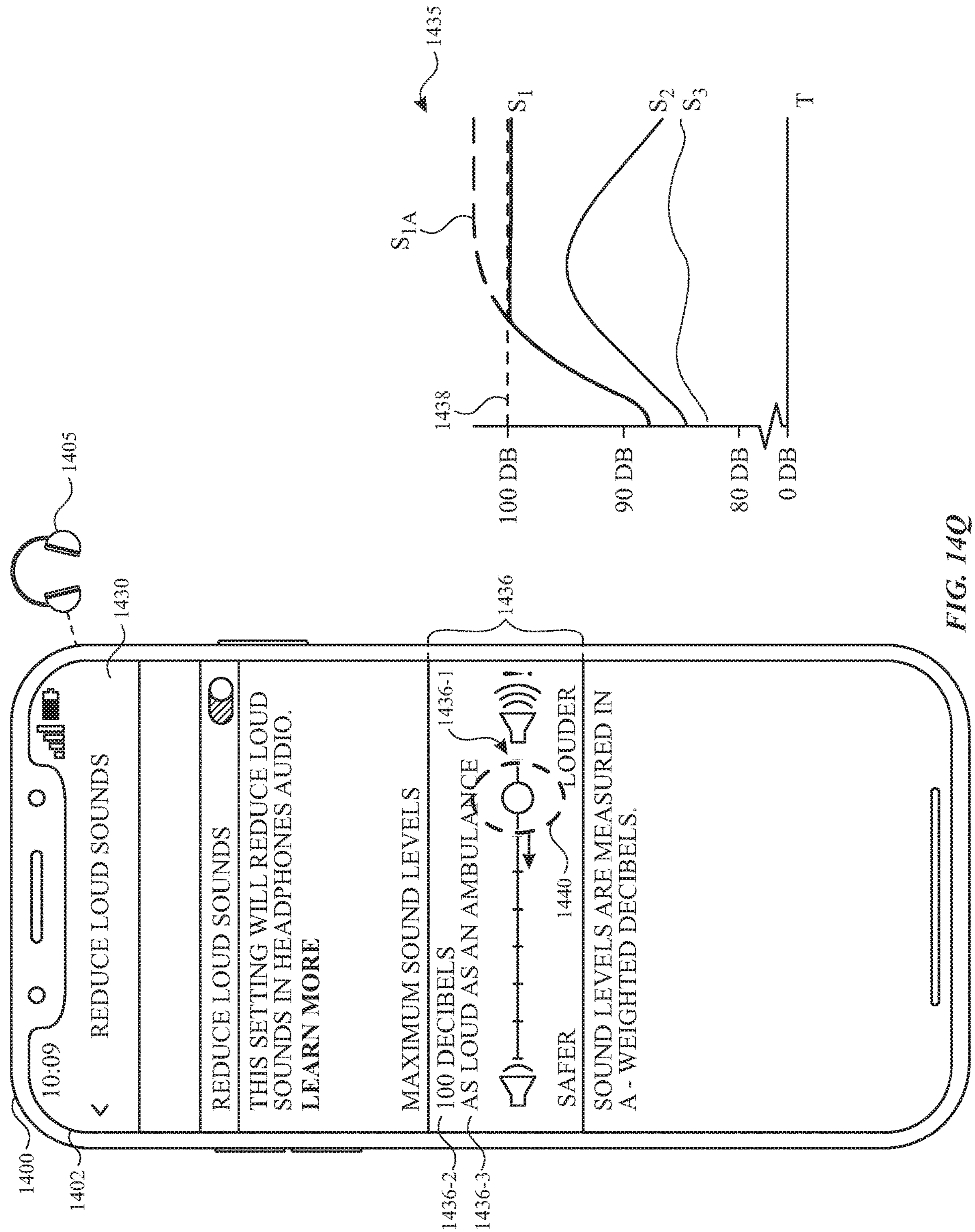
Figure 14R:
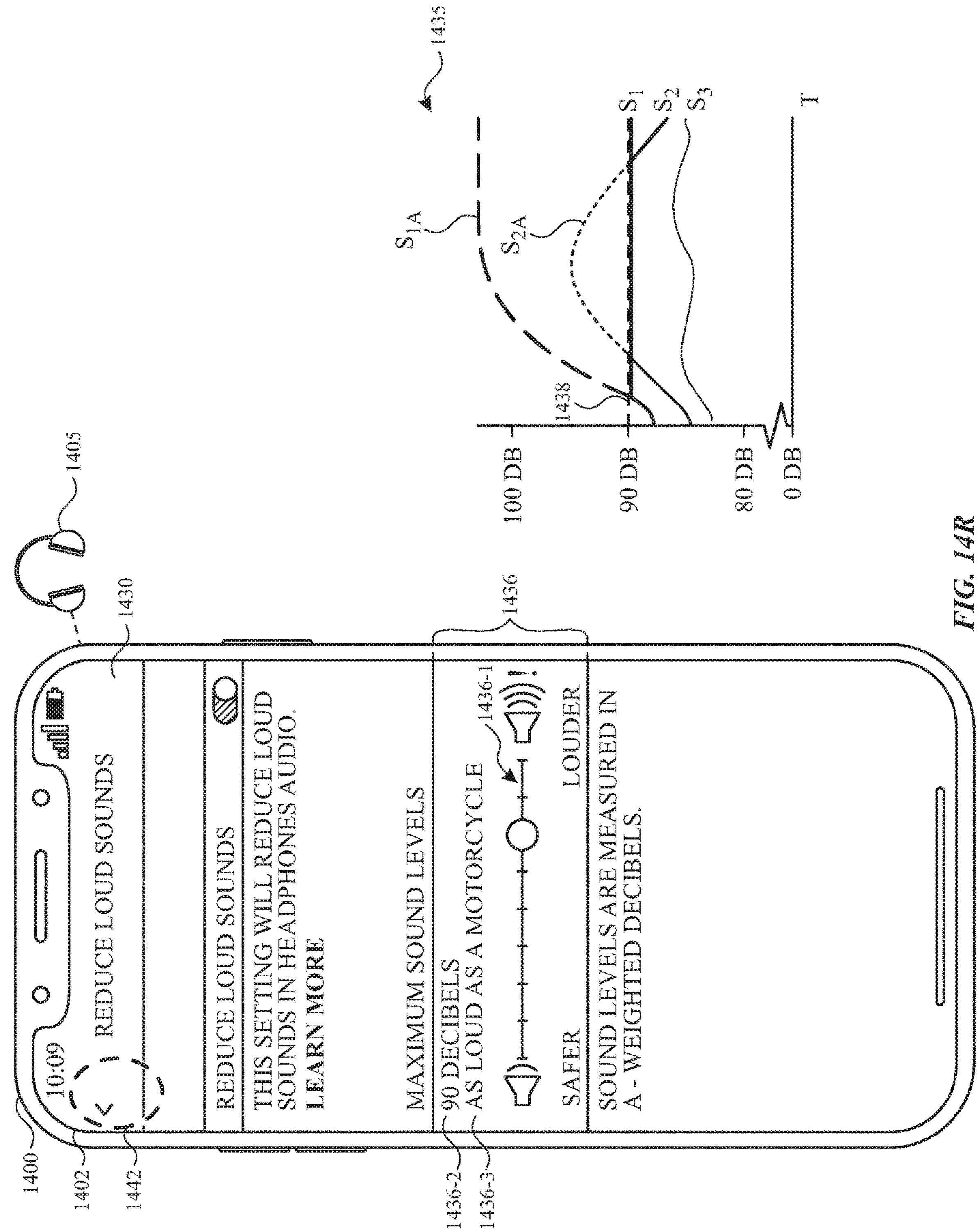

FIGS. 14P-14R illustrate example user interfaces for modifying a sound reduction setting (also referred to herein as the "reduce loud sounds" setting) of device 1400. The sound reduction setting, when enabled, prevents each sound produced at headphones device 1405 from exceeding a designated threshold by compressing the peak volume of the signal at the threshold, without otherwise adjusting the volumes of other signals (assuming these other signals do not exceed the threshold). In some embodiments, enabling the sound reduction setting prevents device 1400 from generating output audio (e.g., at headphones device 1405) that exceeds the instantaneous audio exposure threshold and, consequently, device 1400 will not be triggered to generate instantaneous audio exposure alerts 1416. In some embodiments, enabling the sound reduction setting reduces the maximum output volume produced at headphones device 1405, which, depending on the user's listening habits, may reduce the likelihood of triggering aggregate audio exposure alerts 1418.

FIGS. 14P-14R include audio chart 1435, which represents the volumes of example audio signals that form a portion of the music generated at headphones device 1405. The audio signals include 51, S2, and S3, which vary in volume over time. FIGS. 14P-14R demonstrate how enabling, and adjusting, the sound reduction setting affects the peak output volume for different signals (e.g., signals 51, S2, and S3) output at headphones device 1405.

In FIG. 14P, sound reduction toggle 1432 is off, and the sound reduction feature is disabled. Accordingly, audio chart 1435 is shown with the full (unmodified) range of volume for signals S1, S2, and S3. In other words, the volumes of these respective signals currently are not capped or limited by the sound reduction setting.

In FIG. 14P, device 1400 detects input 1434 on sound reduction toggle 1432 and, in response, enables the sound reduction feature, as shown in FIG. 14Q.

When the sound reduction feature is enabled, device 1400 displays maximum sound level user interface 1436 and applies a corresponding volume limit to the output volume for audio generated at headphones device 1405. Maximum sound level user interface 1436 includes slider 1436-1, numerical limit description 1436-2, and textual limit description 1436-3. Slider 1436-1 is adjustable to set the maximum sound level. Numerical limit description 1436-2 provides a numerical identification of the limit. Textual limit description 1436-3 provides a non-numerical description of the limit. In the example depicted in FIG. 14Q, the maximum sound level is set to 100 dB, as represented by slider 1436-1 and numerical limit description 1436-2. Textual limit description 1436-3 provides a real-world contextual description of the maximum sound level, in this example indicating that the 100 dB limit is "as loud as an ambulance." In some embodiments, device 1400 implements the volume limit such that the volume compresses (e.g., is scaled) as it nears the threshold. For example, as the increasing volume approaches the threshold, the volume is scaled such that the volume continues to increase without reaching the threshold value.

Because the sound reduction feature is enabled, audio chart 1435 is modified to depict output limit 1438 having the 100 dB maximum sound level value set by slider 1436-1. Audio chart 1435 is also modified to depict the corresponding changes to the output volume of the audio signals generated at headphones device 1405. As shown in FIG. 14Q, the maximum sound level is limited to 100 dB, which limits signal S1 from reaching its peak value. Accordingly, signal S1 is capped at the 100 dB limit. In this example, signal S1 is shown having a solid line to represent the actual volume (which remains at or below the 100 dB limit) and having dashed line S1A representing the anticipated output volume of S1—that is, the expected volume of S1 if the output volume of headphones device 1405 remained unadjusted. Thus, anticipated volume S1A corresponds to signal S1 in FIG. 14P. In the example illustrated in FIG. 14Q, signals S2 and S3 do not reach the 100 dB limit and, therefore, remain unadjusted.

In FIG. 14Q, device 1400 detects, via display 1402, input 1440 (e.g., a slide gesture) on slider 1436-1 and, in response, decreases the maximum sound level to 90 dB, as shown in FIG. 14R.

In FIG. 14R, the maximum sound level is reduced to 90 dB as indicated by slider 1436-1, and numerical limit description 1436-2. Textual limit description 1436-3 provides a real-world contextual description of the maximum sound level, in this example indicating that the 90 dB limit is "as loud as a motorcycle."

Audio chart 1435 is also modified to depict the changed value of output limit 438 and the corresponding changes to the output volumes of the audio signals generated at headphones device 1405. As shown in FIG. 14R, the maximum sound level (output limit 438) is limited to 90 dB, which limits signals S1 and S2 from reaching their respective peak values. Accordingly, the volumes of signals S1 and S2 are capped at the 90 dB limit. In this example, signals S1 and S2 are both shown having respective solid lines to represent the actual volume of each signal (which remains at or below the 90 dB limit). Signal S1 has dashed line S1A representing the anticipated output volume of S1, and signal S2 has dashed line S2A representing the anticipated output volume of S2—that is, the expected volume of S2 if the output volume of headphones device 1405 remained unadjusted. Thus, anticipated volume S1A corresponds to signal S1 in FIG. 14P, and anticipated volume S2A corresponds to signal S2 in FIGS. 14P and 14Q. In the example illustrated in FIG. 14R, signal S3 does not reach the 90 dB limit and, therefore, remain unadjusted. Notably, signal S2 starts out below the 90 dB limit and increases until it is compressed at about 90 dB. S2 then decreases when the anticipated volume S2A meets the actual volume of S2, and continues to decrease, following its original path shown in FIG. 14P.

Figure 14S:
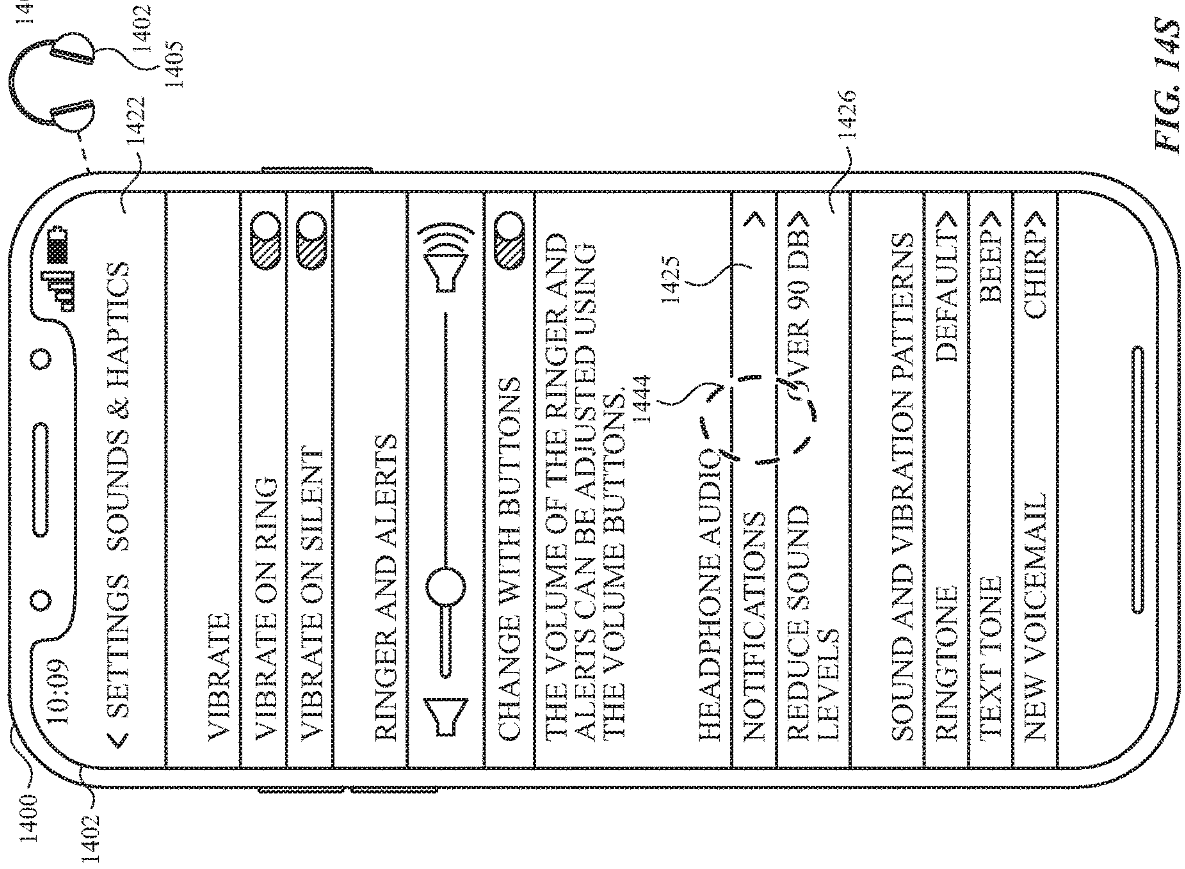

In FIG. 14R, device 1400 detects input 1442 and, in response, displays audio settings interface 1422 in FIG. 14S. Settings interface 1422 shows sound reduction menu item 1426 updated to indicate the current 90 dB limit selected in FIG. 14R.

Figure 14T:
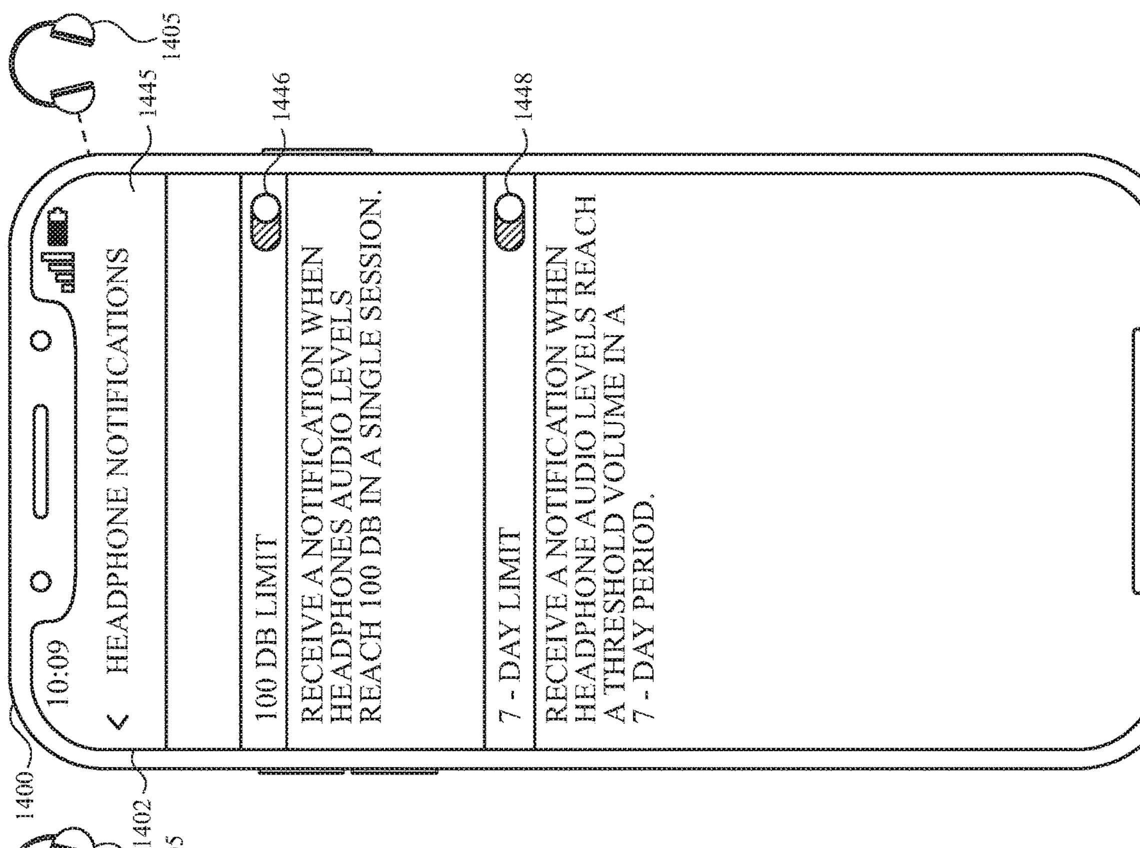

In FIG. 14S, device 1400 detects input 1444 on notifications menu item 1425 and, in response, displays headphone notifications settings interface 1445 in FIG. 14T. Headphone notifications settings interface 1445 includes instantaneous audio exposure alert toggle 1446 and aggregate audio exposure alert toggle 1448. Toggles 1446 and 1448 are selectable to enable and disable the respective instantaneous audio exposure limit and aggregate audio exposure limit alerts, which are currently shown enabled in FIG. 14T.

Figure 14V:
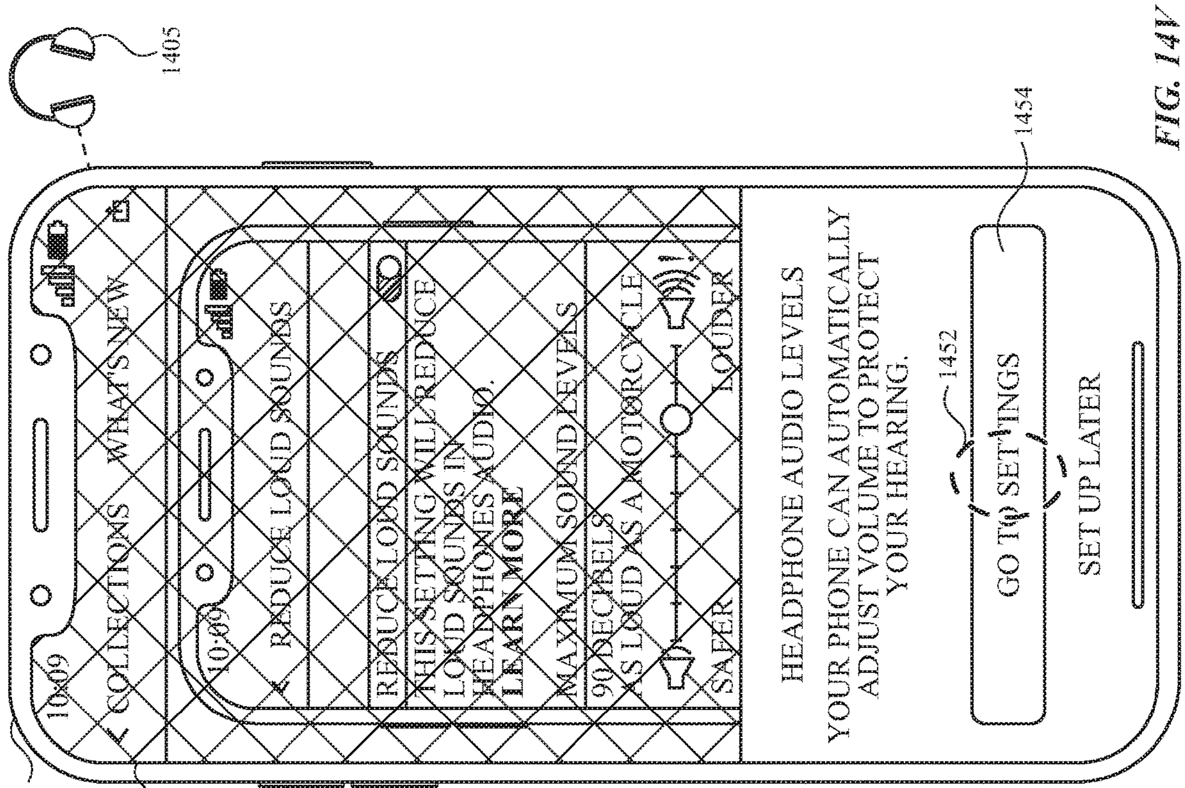
Figure 14U:
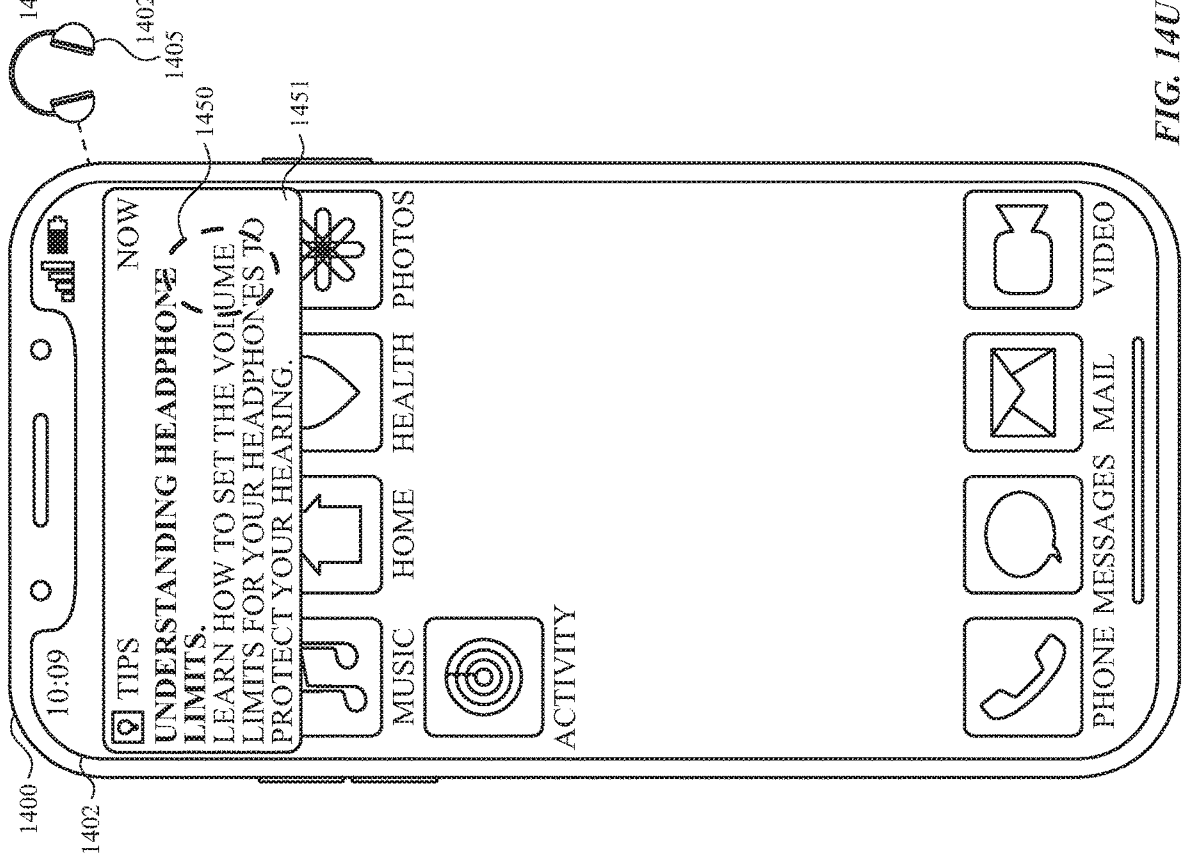
Figure 14W:
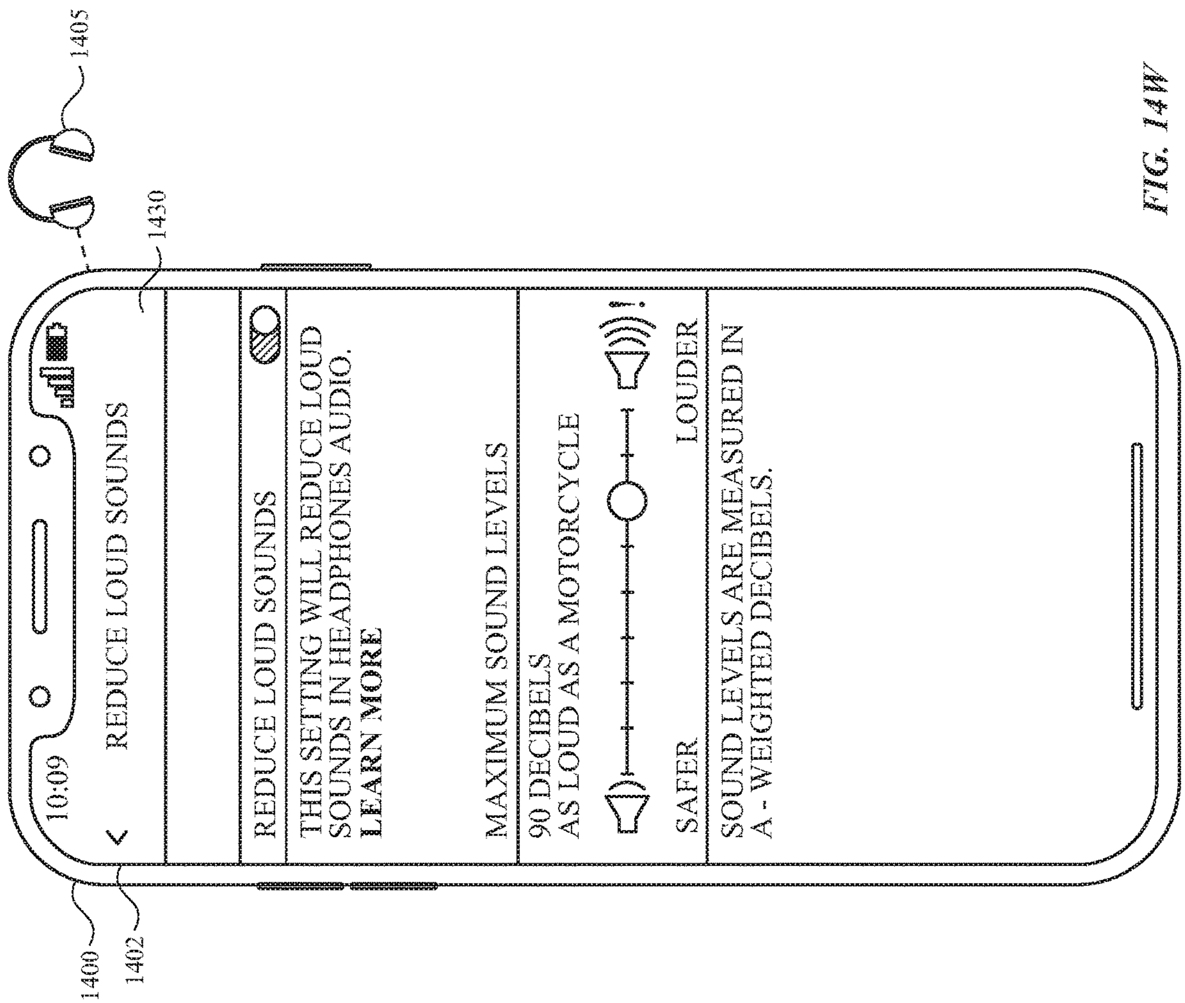

FIGS. 14U-14W depict example user interfaces for accessing sound reduction interface 1430 by selecting (e.g., via input 1450) notification 1451 in FIG. 14U, and selecting (e.g., via input 1452) settings affordance 1454 in FIG. 14V. In some embodiments, notification 1451 is optionally displayed after two alerts (e.g., instantaneous audio exposure alert 1416, aggregate audio exposure alert 1418) have been generated by device 1400. In some embodiments, the user interface depicted in FIG. 14V is optionally displayed.

Figure 14Y:
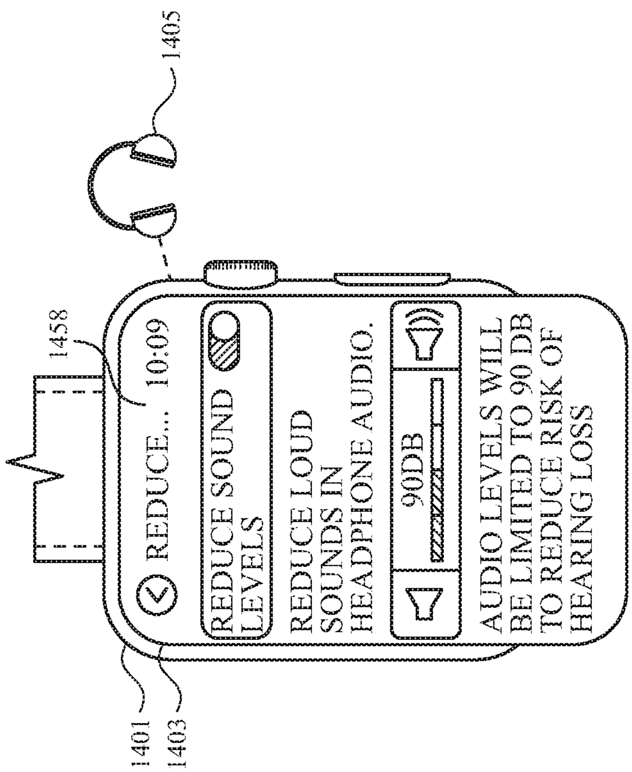
Figure 14X:
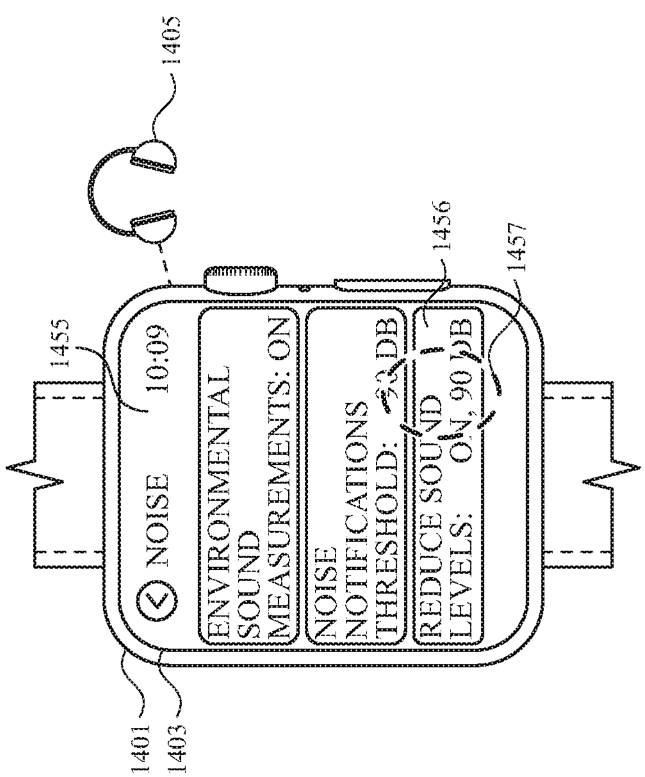

FIGS. 14X and 14Y illustrate example user interfaces for accessing audio settings similar to those shown in FIGS. 14N and 14Q using device 1401. In FIG. 14X device 1401 displays noise settings interface 1455, which includes sound reduction menu affordance 1456, similar to sound reduction menu item 1426. Device 1401 detects, via display 1403, input 1457 on sound reduction menu affordance 1456 and, in response, displays sound reduction interface 1458, similar to sound reduction interface 1430.

Figure 14Z:
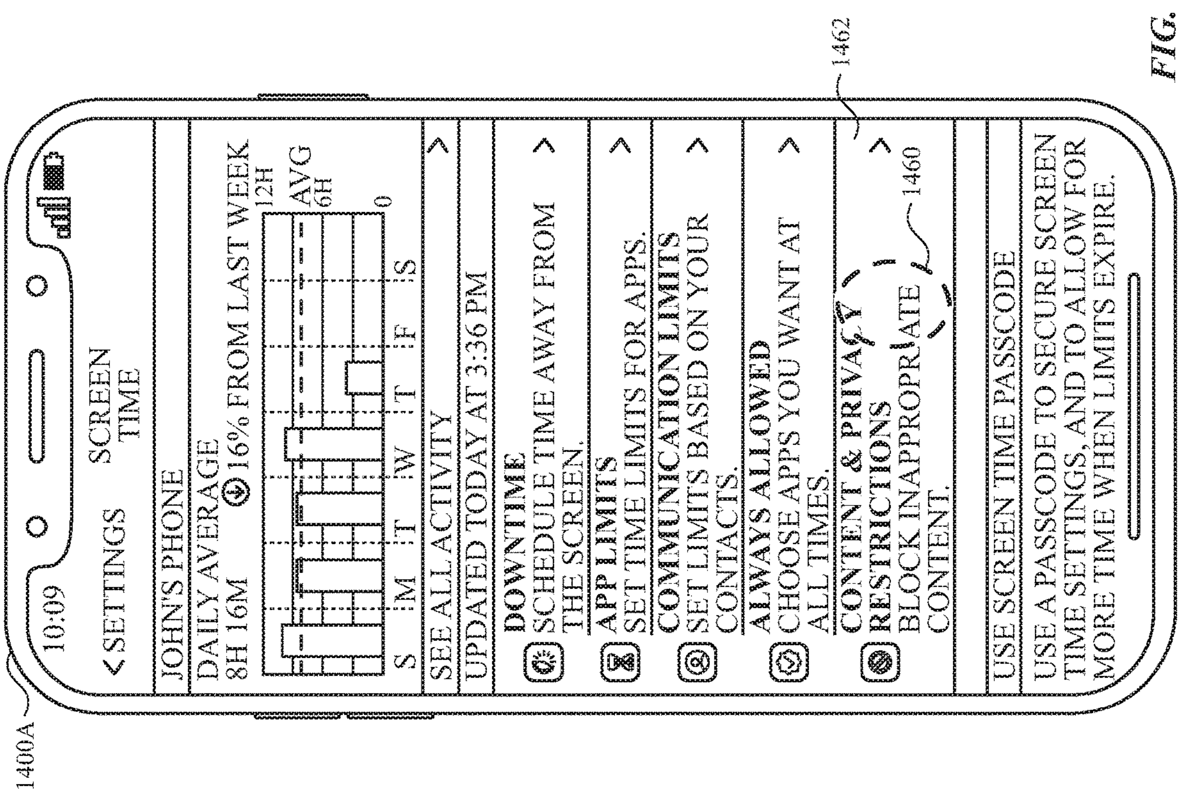
Figure 14A:
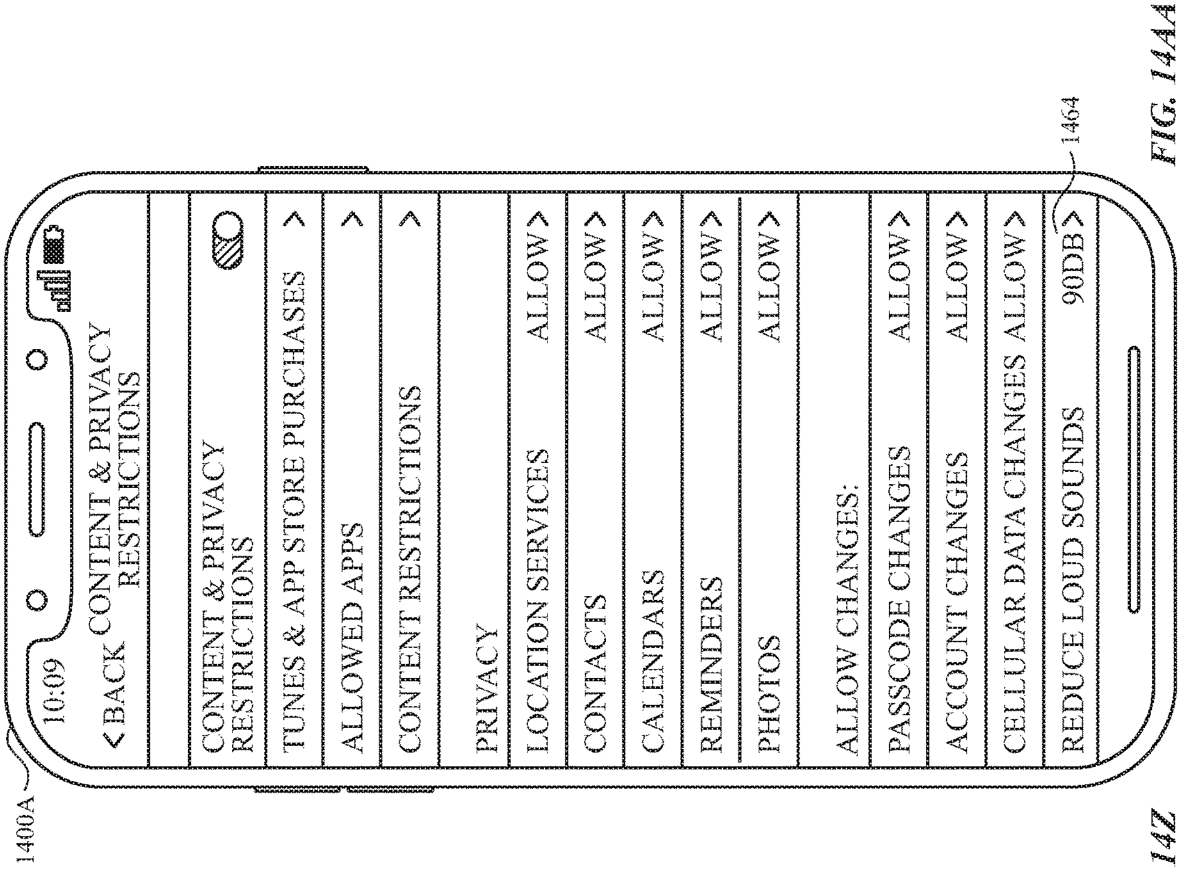
Figure 14A:
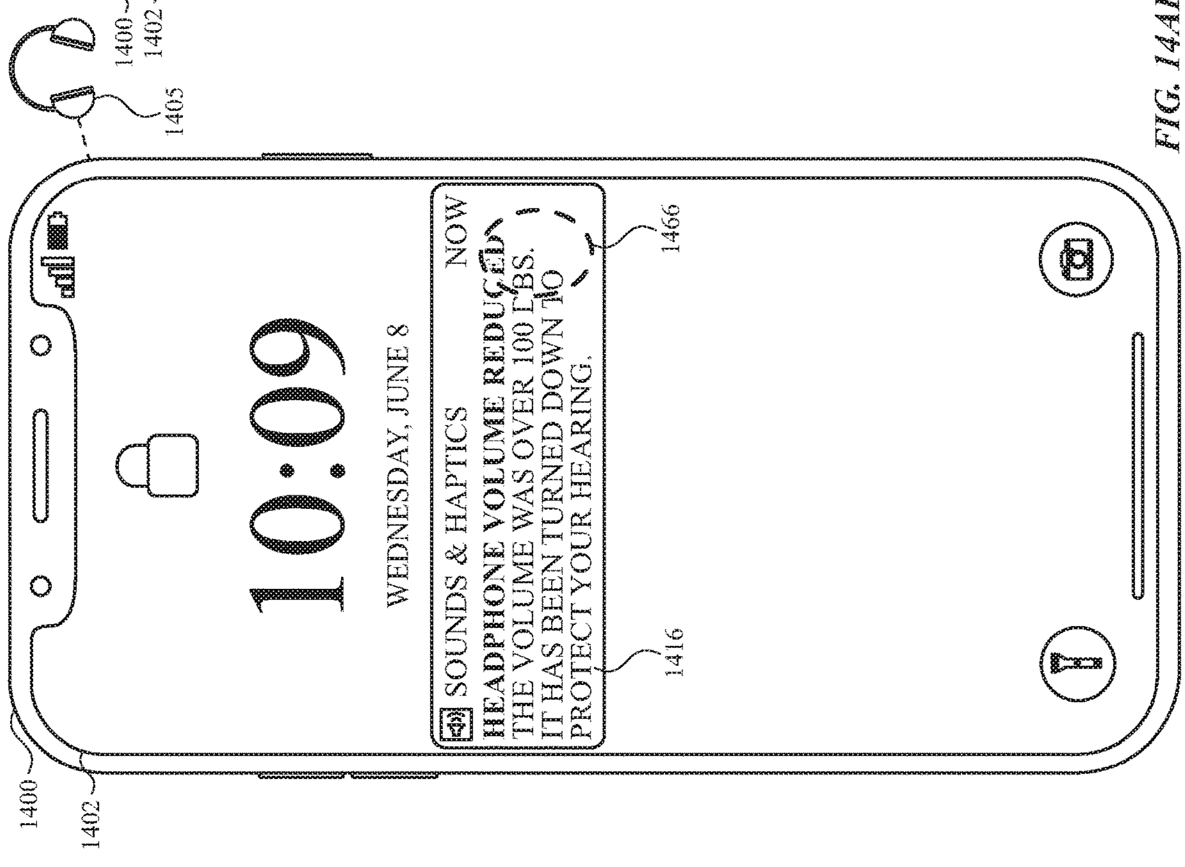
Figure 14A:
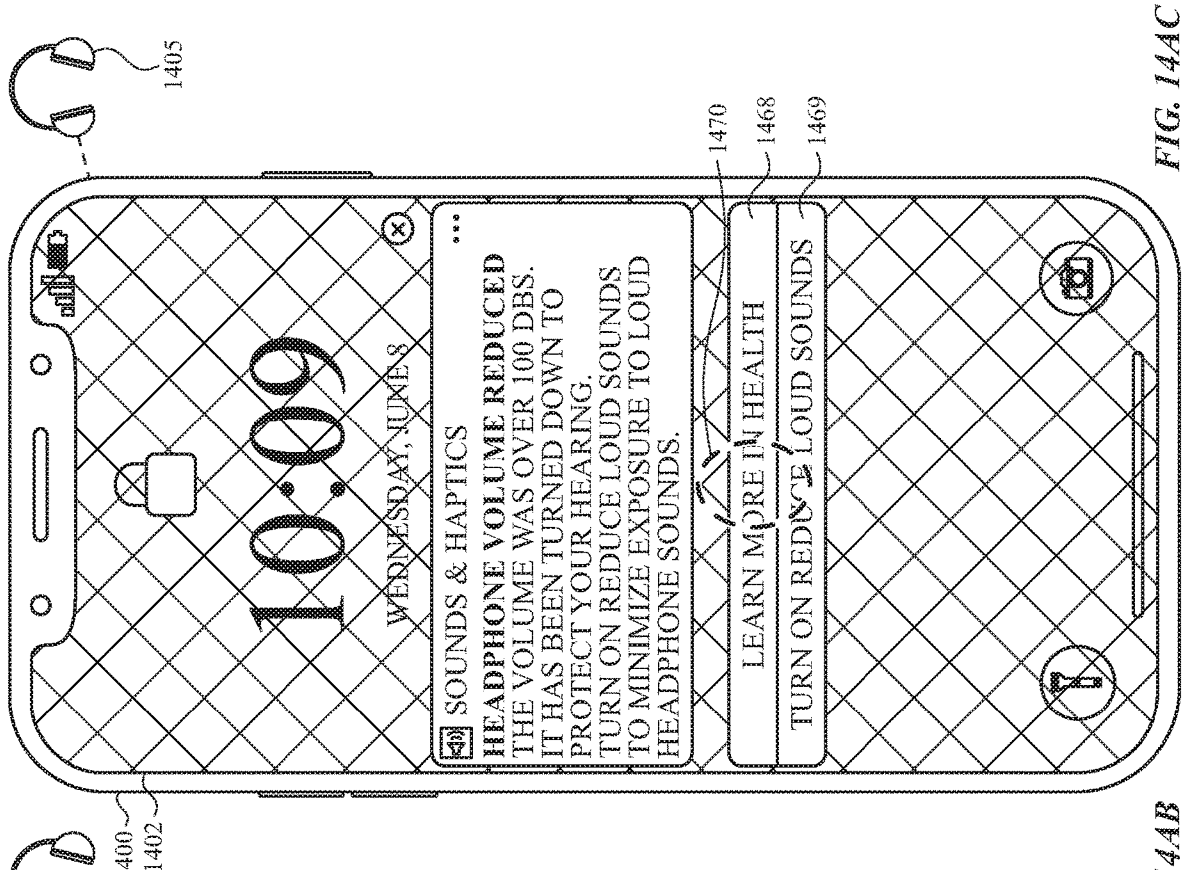
Figure 14A:
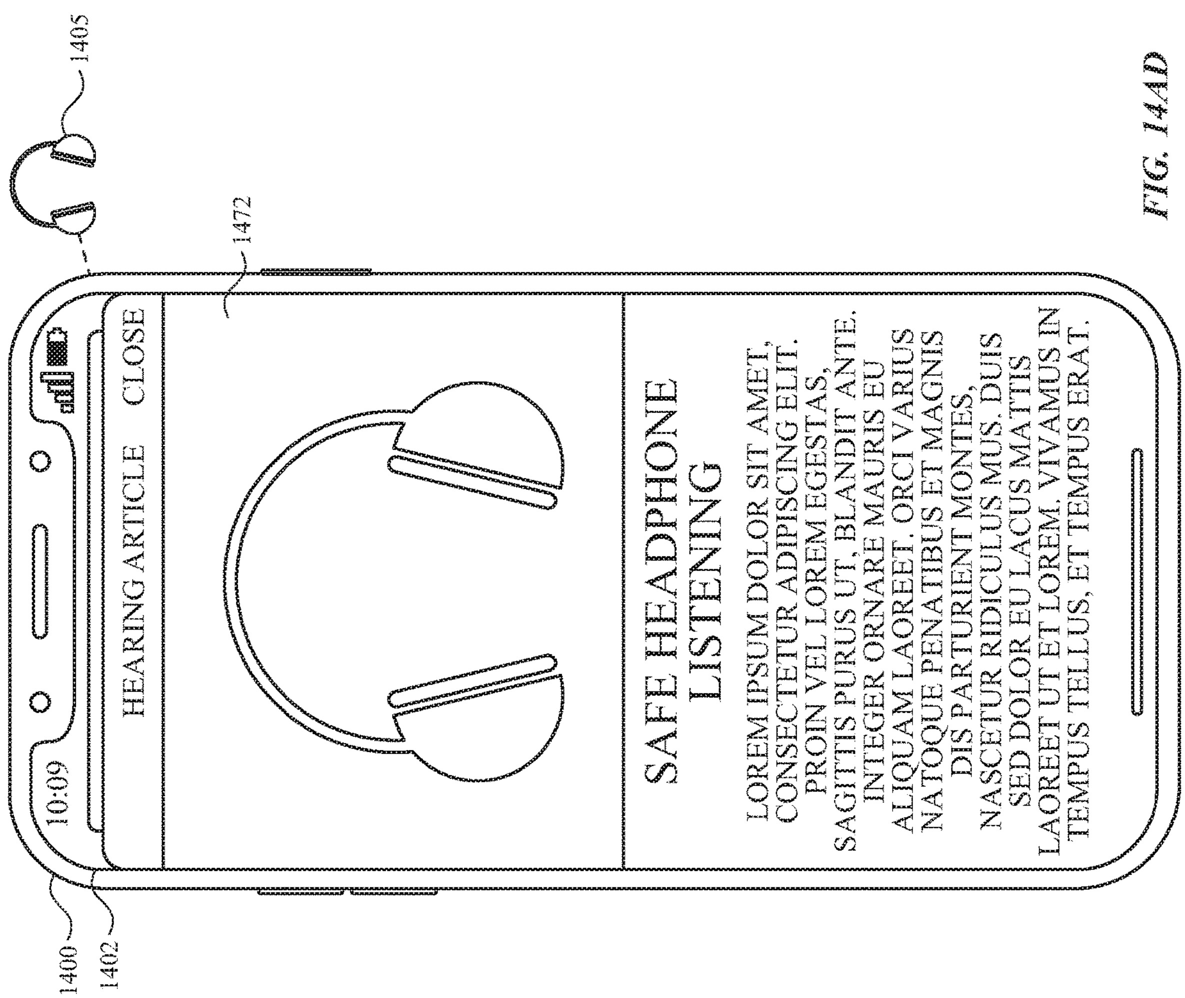
Figure 14A:
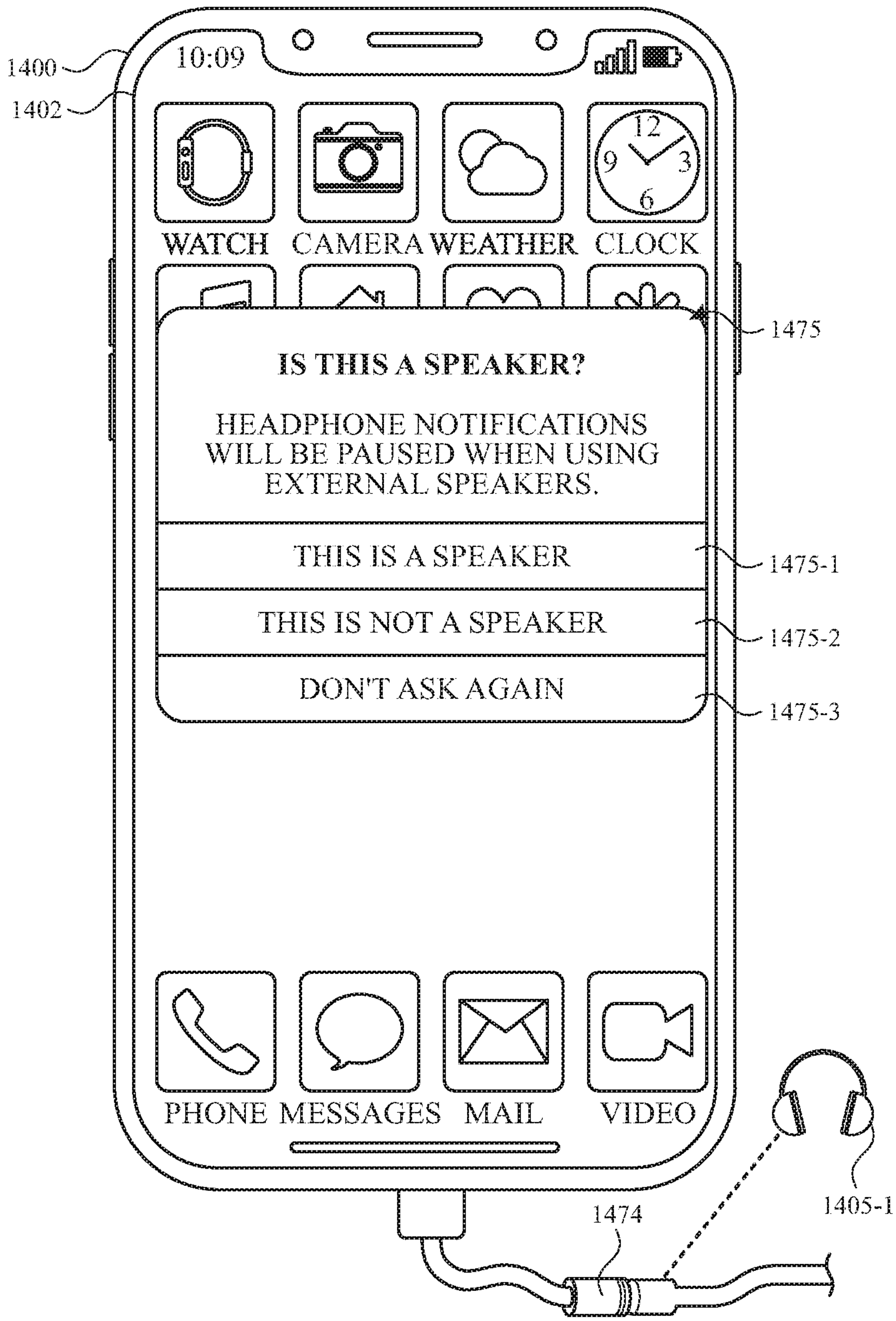
Figure 14A:
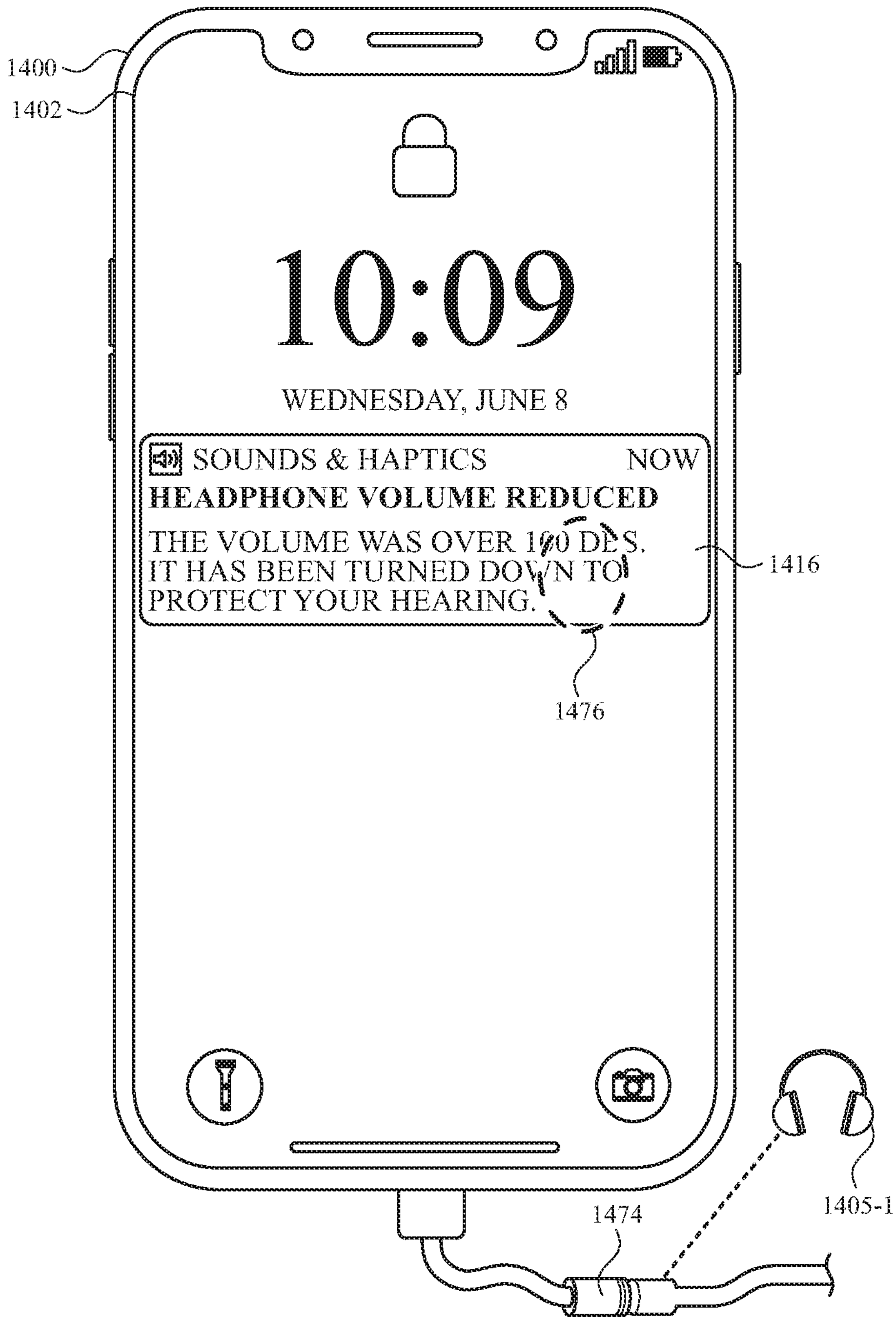
Figure 14A:
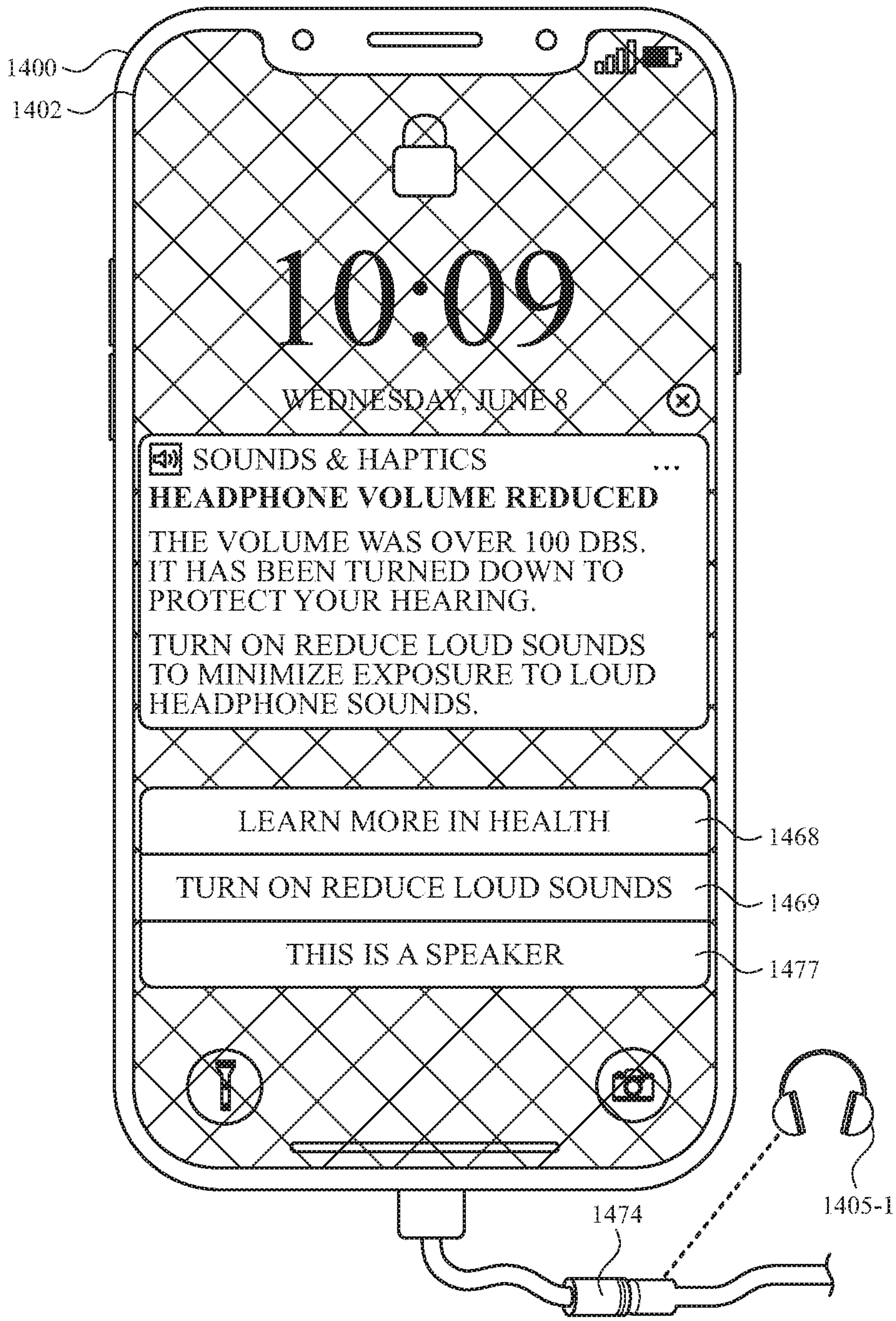
Figure 14A:
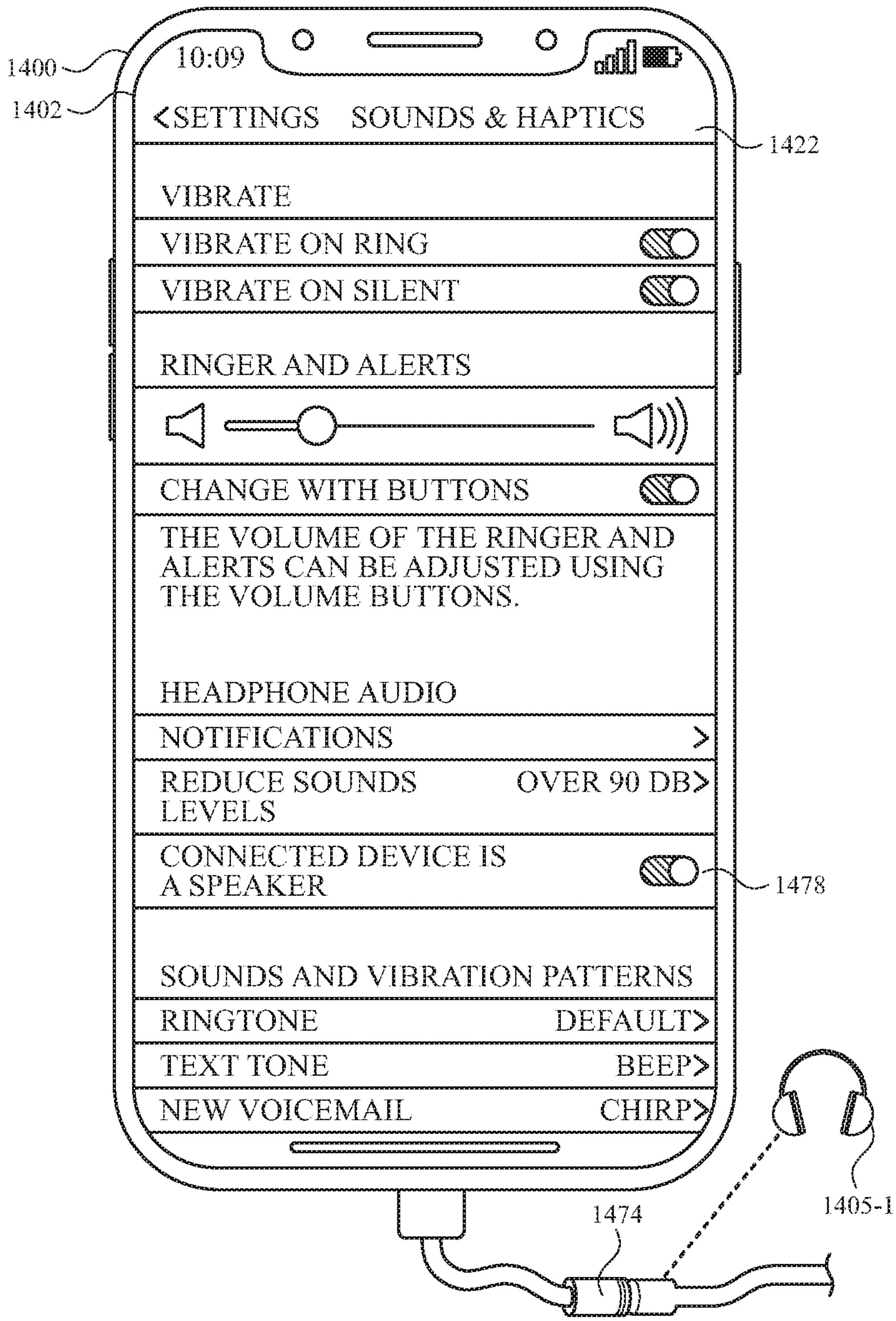
Figure 14A:
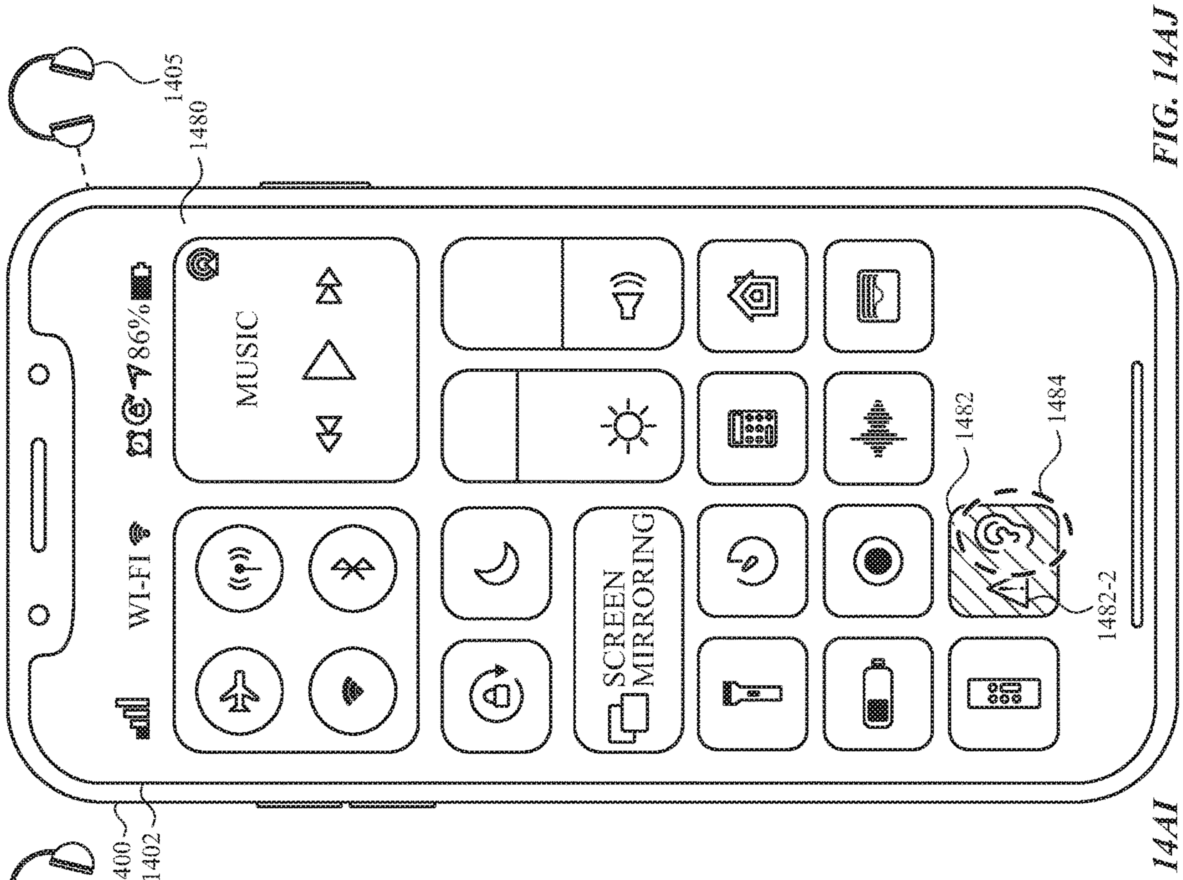
Figure 14A:
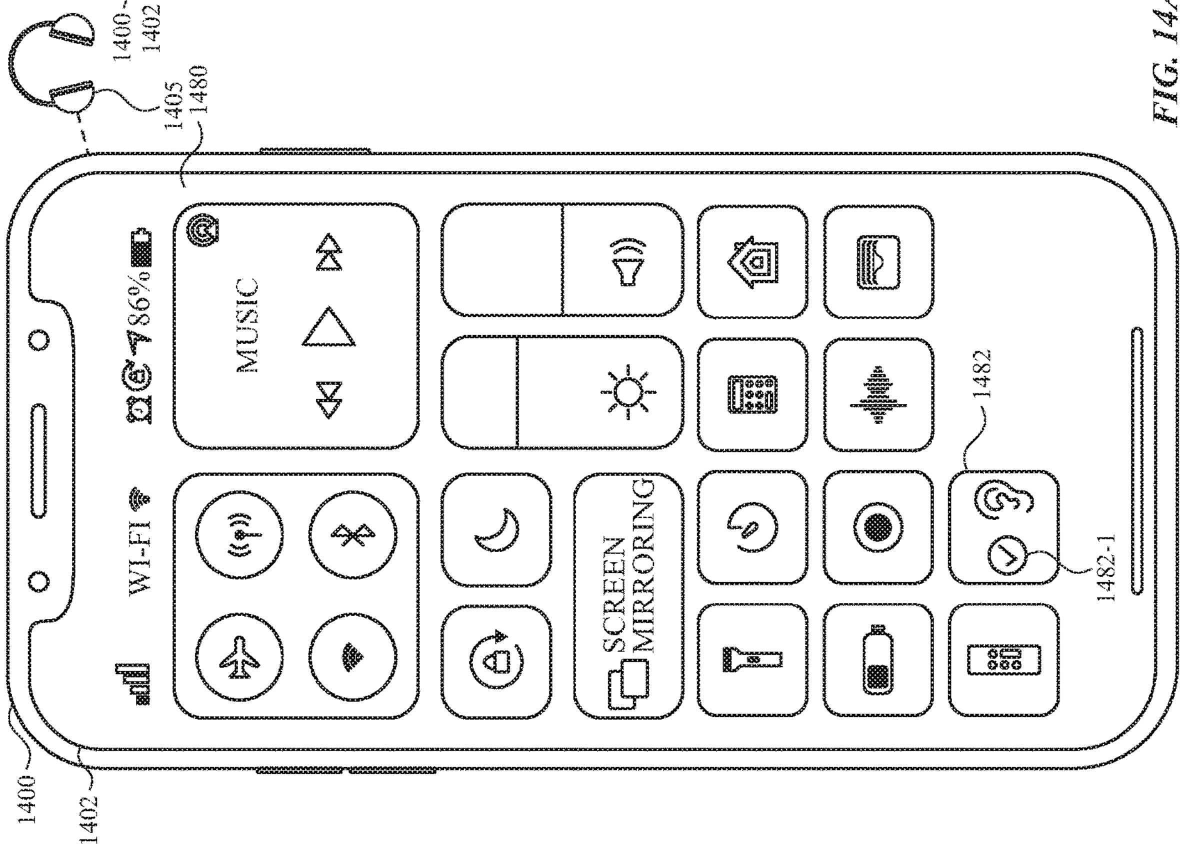
Figure 14A:
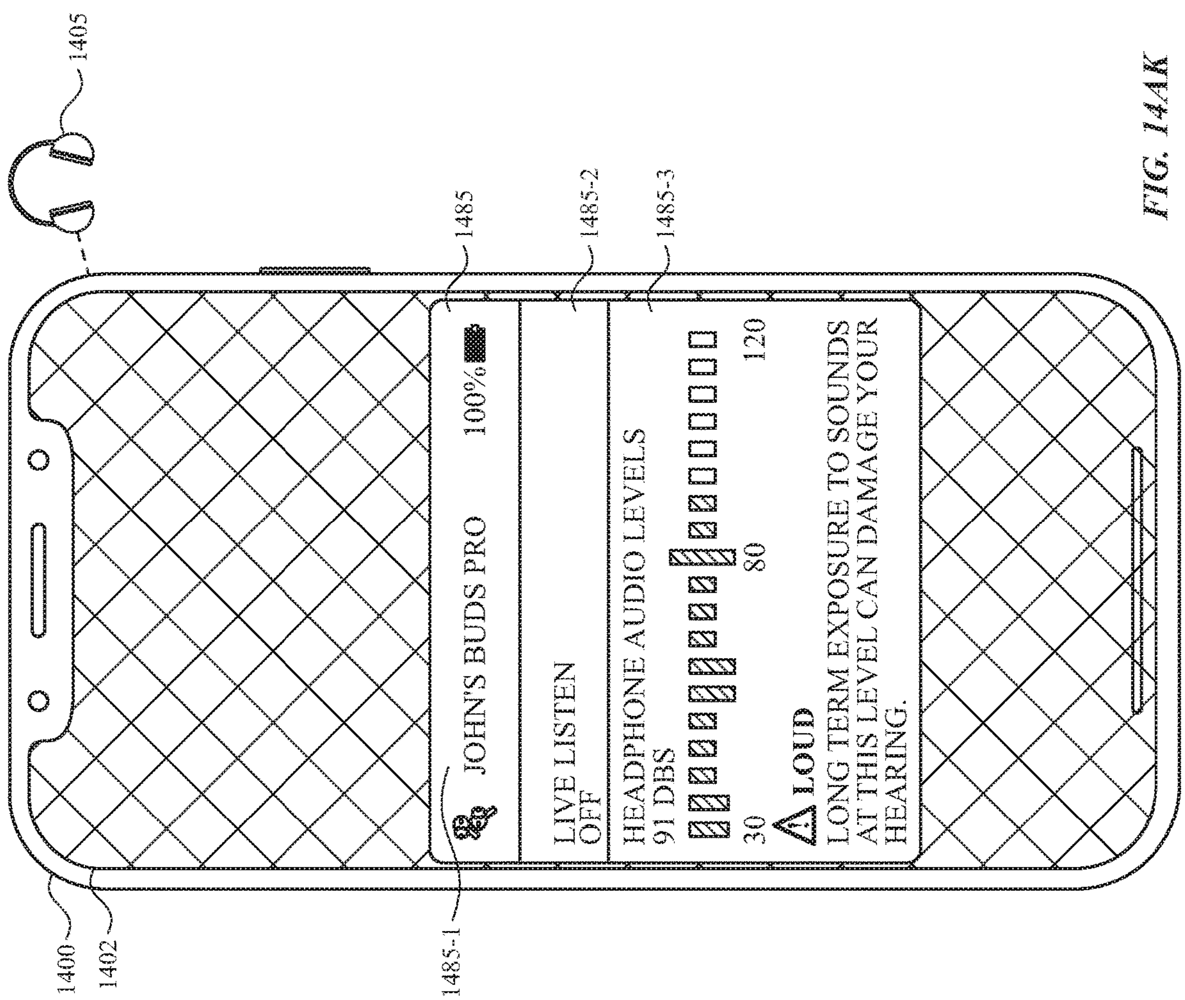

FIGS. 14Z and 14AA depict example user interfaces for setting a sound reduction setting using a different device such as, for example, a device associated with an account of a different user that has been authorized by the user's account to control certain settings of the user's device. For example, device 1400 is associated with the account of a user named John, and device 1400A in FIGS. 14Z and 14AA is associated with the account of John's mother. In this example, John's mother's account has been authorized by John's account to control settings of device 1400. In FIG. 14Z, device 1400A detects input 1460 on content and privacy restrictions menu item 1462 and, in response, displays various setting menu options in FIG. 14AA, including sound reduction menu option 1464. Sound reduction menu option 1464 is similar to sound reduction menu item 1426, and is selectable to control the sound reduction settings for John's device 1400 using an interface similar to sound reduction interface 1430.

FIGS. 14AB-14AD depict example user interfaces for displaying "safe headphone listening" literature. For example, in FIG. 14AB, device 1400 detects input 1466 (e.g., a tap-and-hold gesture) on instantaneous audio exposure alert 1416 (alternatively, the input can be on aggregate audio exposure alert 1418) and, in response, displays option 1468 and option 1469 in FIG. 14AC. Option 1468 is selectable (e.g., via input 1470) to display safe headphone listening literature interface 1472 in FIG. 14AD. Option 1469 is selectable to display audio settings interface 1422 or, in some embodiments, sound reduction interface 1430.

FIGS. 14AE-14AH depict example user interfaces that are displayed when audio device 1405-1 is coupled to device 1400 via a wired connection. In some embodiments, audio device 1405-1 represents an unknown (e.g., unidentified) audio device type. Although the graphic of audio device 1405-1 shown in FIGS. 14AE-14AH resembles a headphones device, it should be understood that audio device 1405-1 can be a device type other than headphones. For example, audio device 1405-1 may be an external speaker. In some embodiments, however, audio device 1405-1 may be a headphones device such as, for example, headphones device 1405. In some embodiments, the user interfaces in FIGS. 14AE-14AH are displayed when audio device 1405-1 is coupled to device 1400 using dongle 1474 or other intermediate connector such that device 1400 is unable to identify the connected device.

In FIG. 14AE, in response to detecting the connection of audio device 1405-1 via dongle 1474, device 1400 displays notification 1475 instructing the user to identify whether the connected device is a speaker. Notification 1475 includes affordance 1475-1 indicating the connected device is a speaker, affordance 1475-2 indicating the connected device is not a speaker, and affordance 1475-3 indicating that the user does not want to be asked again if the device is a speaker. If device 1400 detects selection of affordance 1475-1, device 1400 considers audio device 1405-1 to be a non-headphone speaker and does not record audio exposure data generated using the connected device. In some embodiments, if affordance 1475-1 is selected, device 1400 will repeat the displayed notification after a predetermined period of time (e.g., seven days) of using dongle 1474. If device 1400 detects selection of affordance 1475-2, device 1400 considers audio device 1405-1 to be headphones (e.g., headphones device 1405) and records audio exposure data generated with the connected device. In some embodiments, if affordance 1475-2 is selected, device 1400 does not display notification 1475 again when dongle 1474 is being used. If device 1400 detects selection of affordance 1475-3, device 1400 ceases to display notification 1475 for a predetermined period of time (e.g., seven days).

In some embodiments, device 1400 displays notification 1475 only the first time the connected device is recognized as being connected (e.g., if the device has a built-in identifier). In some embodiments, device 1400 displays notification 1475 each time the connected device is recognized as being connected (e.g., if the device does not have a built-in identifier). In some embodiments, device 1400 displays notification 1475 any time a connected device has not been explicitly identified as something other than headphones. In some embodiments, device 1400 automatically detects audio as being from a non-headphone speaker if a microphone of device 1400 detects audio that matches the audio being played on the connected device.

FIGS. 14AF and 14AG depict example user interfaces for accessing audio settings interface 1422 when an audio device is connected to device 1400 via dongle 1474. In FIG. 14AF, device 1400 detects input 1476 (e.g., a tap-and-hold gesture) on instantaneous audio exposure alert 1416 (or alternatively, aggregate audio exposure alert 1418). In response, device 1400 displays option 1468, option 1469, and option 1477 in FIG. 14AG. Option 1477 is selectable to indicate that the connected device is a non-headphone speaker, similar to affordance 1475-1.

Referring now to FIG. 14AH, in some embodiments, when an audio device is connected to device 1400 via dongle 1474, audio settings interface 1422 further includes speaker toggle 1478 for indicating whether the connected device is a speaker.

Referring now to FIG. 14AI, device 1400 displays control interface 1480 while music is being played at headphones device 1405. Control interface 1480 includes audio exposure indicator 1482. In some embodiments, audio exposure indicator 1482 changes appearance based on the current audio exposure levels. For example, in FIG. 14AI, audio exposure indicator 1482 includes checkmark 1482-1 indicating the audio exposure levels are safe (e.g., not exceeding the instantaneous or aggregate audio exposure threshold). In FIG. 14AJ, audio exposure indicator 1482 includes hazard sign 1482-2 indicating that the audio exposure levels are loud. In some embodiments, audio exposure indicator 1482 also changes color to indicate the current audio exposure levels. For example, audio exposure indicator 1482 may be green in FIG. 14AI and audio exposure indicator 1482 may be red in FIG. 14AJ. In some embodiments, audio exposure indicator 1482 is yellow or orange to indicate that loud noise is accumulating, but currently not too loud.

In FIG. 14AJ, device 1400 detects input 1484 on audio exposure indicator 1482 and, in response, displays audio exposure interface 1485 in FIG. 14AK. In some embodiments, audio exposure interface 1485 includes identification 1485-1 of the connected headphones device 1405, ambient audio affordance 1485-2, and audio exposure meter 1485-3. Audio exposure meter 1485-3 provides a real time measurement of the current amount of audio exposure based on the output volume of audio currently produced at headphones device 1405. Ambient audio affordance 1485-2 is selectable to activate a setting where headphones device 1405 amplifies audio detected from a microphone (e.g., a microphone of device 1400, device 1401, or headphones device 1405), and produces the amplified ambient audio at headphones device 1405.

Figure 15:
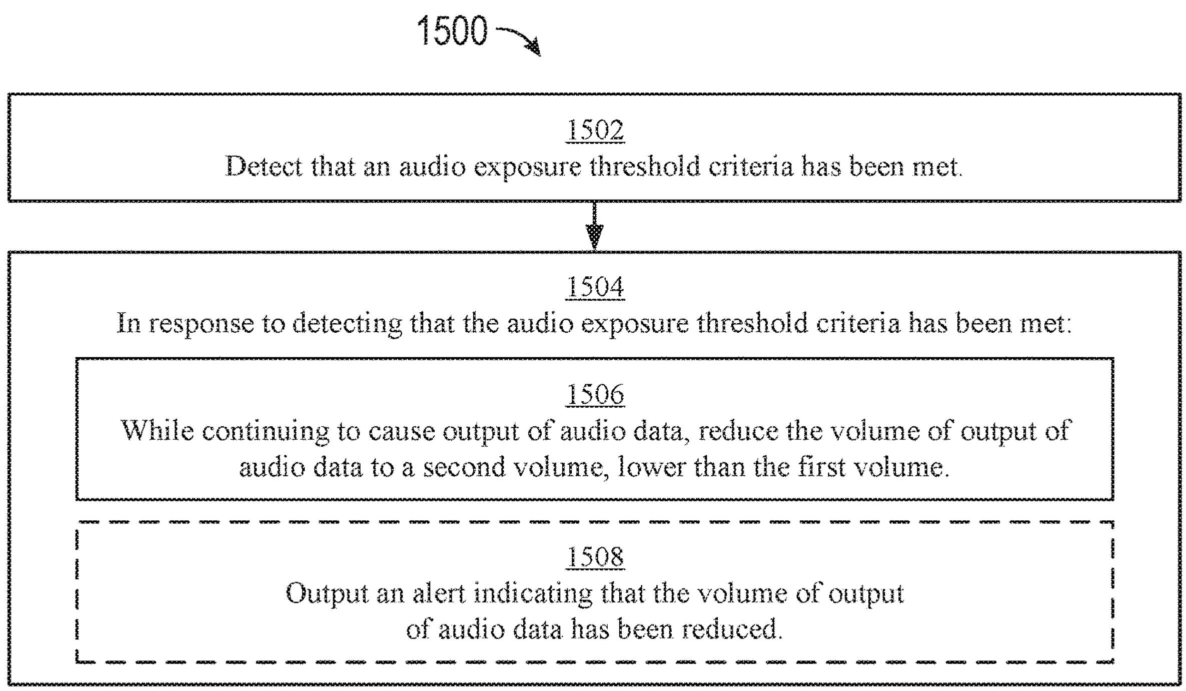
FIG. 15 is a flow diagram illustrating a method for displaying audio exposure limit alerts using a computer system, in accordance with some embodiments.

FIG. 15 is a flow diagram illustrating a method for displaying audio exposure limit alerts using a computer system, in accordance with some embodiments. Method 1500 is performed at a computer system (e.g., a smartphone, a smartwatch) (e.g., device 100, 300, 500, 600, 601, 800, 900, 1100, 1200, 1400, 1401, 1700) that is in communication with (e.g., electrically coupled; via a wired or wireless connection) an audio generation component (e.g., headphones 1405; speaker(s) integrated into the computer system). In some embodiments, the computer system is configured to provide audio data to the audio generation component for playback. For example, the computer system generates audio data for playing a song, and the audio for the song is played at the headphones. Some operations in method 1500 are, optionally, combined, the orders of some operations are, optionally, changed, and some operations are, optionally, omitted.

As described below, method 1500 provides an intuitive way for managing audio exposure by, for example, displaying audio exposure limit alerts. The method reduces the cognitive burden on a user for managing audio exposure, thereby creating a more efficient human-machine interface. For battery-operated computing devices, enabling a user to manage audio exposure faster and more efficiently conserves power and increases the time between battery charges.

In method 1500, while causing, via the audio generation component (e.g., 1405), output of audio data at a first volume (e.g., 1410-2) (e.g., volume setting 1414-1 in FIG. 14C) (e.g., the computer system is causing the headphones to output audio data (e.g., music, videogame audio, video playback audio)), the computer system (e.g., 1400; 1401) detects (1502) that an audio exposure threshold criteria (e.g., 1410-1) has been met. In some embodiments, the audio exposure threshold criteria includes a criterion that is met when the sound pressure level (e.g., volume) of the audio data output at the audio generation component exceeds a first threshold value (e.g., an instantaneous audio exposure threshold; an instantaneous volume level). In some embodiments, the exposure threshold criteria includes a criterion that is met when the sound pressure level of the audio data output at the audio generation component (or a collection of audio generation components including the audio generation component) exceeds a second threshold value over a first period of time or exceeds a third threshold level (lower than the second threshold level) over a second period of time (longer than the first period of time) (e.g., an aggregate exposure threshold). In some embodiments, the sound pressure level is estimated based on a volume setting (e.g., volume at 100%) and a known response of the audio generation component (e.g., headphones output 87 dB at 100% volume for the particular signal being played)).

In response (1504) to detecting that the audio exposure threshold criteria (e.g., 1410-1) has been met, the computer system (e.g., 1400; 1401), while continuing to cause output of audio data (e.g., at the audio generation component), reduces (1506) the volume of output of audio data to a second volume, lower than the first volume (e.g., volume 1410-2 decreases as shown in FIGS. 14C and 14D) (e.g., volume setting 1414-1 decreases as shown in FIGS. 14C and 14D) (e.g., while continuing to play audio at the headphones, the system automatically reduces the volume of the output audio, without stopping playback of the audio). Reducing the volume of output of audio data to the second volume while continuing to cause output of audio data provides feedback to the user that the change in output volume is intentional, rather than an error caused, for example, by poor connection quality of the headphones. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the computer system is instructed (e.g., via a user input to select an output volume; via an output volume setting) to output the audio data at the audio generation component at a requested output audio volume. In response to detecting that the audio exposure threshold criteria has been met, the computer system then reduces the volume of the audio data to a predefined output audio volume that is less than the requested volume. For example, the predefined output audio volume is a maximum output volume limit or an output volume level that is determined to be safe for the user (e.g., the output volume level does not cause damage to the user's hearing) based on historical volume levels at the audio generation component (e.g., based on the history of the volume of the output audio at the audio generation component).

In some embodiments, further in response to detecting that the audio exposure threshold criteria (e.g., 1410-1) has been met, the computer system (e.g., 1400; 1401) causes, via the audio generation component (e.g., 1405), output of an audible indication (e.g., a spoken indication, speech output) (in some embodiments, from a virtual assistant) indicating that the volume of output of audio data has been reduced. Causing output of an audible indication that the volume of output of audio data has been reduced provides feedback to the user that the change in output volume is intentional, rather than an error caused, for example, by poor connection quality of the headphones. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments of method 1500, the computer system (e.g., 1400; 1401) outputs (1508) an alert (e.g., 1416; 1418) (e.g., a notification, a haptic response, an audio response, a banner) indicating that the volume of output of audio data has been reduced (e.g., the alert indicates that the volume has been reduced for recently output audio data). Outputting an alert indicating that the volume of output of audio data has been reduced provides feedback to the user that the change in output volume is intentional, rather than an error caused, for example, by poor connection quality of the headphones. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the audio data (e.g., the volume of the audio data is represented using graph 1410) is generated from an application (e.g., a media application associated with media user interface 1408) (e.g., application 136 (a music application, a video application, a gaming application); a non-operating system software application) operating at the computer system (e.g., 1400; 1401), and the alert (e.g., 1416; 1418) is generated from a system-controlled (e.g., operating system-controlled) component of the computer system (e.g., operating system 126; haptic feedback module 133; graphics module 132) (e.g., FIGS. 14E and 14F demonstrate alert 1416 and 1418 are generated by the sounds and haptics module of device 1400). Generating the alert from a system-controlled component of the computer system provides feedback to the user that the change in output volume is intentional, rather than an error caused, for example, by the media application. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 1400; 1401) is in communication with a display generation component (e.g., 1402; 1403) (e.g., a visual output device, a 3D display, a transparent display, a projector, a heads-up display, a display controller, a display device). In some embodiments, the computer system further comprises the display generation component. In some embodiments, outputting the alert (e.g., 1416; 1418) further includes that, in accordance with a determination that the audio exposure threshold criteria (e.g., 1410-1) is of a first type, (e.g., an instantaneous audio exposure threshold associated with toggle 1446), the computer system displays, via the display generation component, a first notification (e.g., 1416) corresponding to the audio exposure threshold of the first type (e.g., a notification containing text indicating the instantaneous audio exposure threshold was reached). In some embodiments, outputting the alert further includes that, in accordance with a determination that the audio exposure threshold criteria is of a second type different from the first type (e.g., an aggregate audio exposure threshold associated with toggle 1448), the computer system displays, via the display generation component, a second notification (e.g., 1418) corresponding to the audio exposure threshold of the second type and different from the first notification (e.g., a notification containing text indicating the aggregate audio exposure threshold was reached). Outputting the alert including displayed notifications corresponding to the type of audio exposure threshold provides feedback to the user indicating why the volume was reduced for different conditions, allowing the user to more easily and quickly understand and appreciate the purpose of the volume reduction. This potentially dissuades the user from raising the volume, thereby eliminating or reducing inputs associated with a command for subsequent volume increases. Reducing inputs and providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the first or second notification is displayed after or concurrently with reducing the volume of the output of audio data. In some embodiments, outputting the alert includes producing an audible chime (e.g., 1413). In some embodiments, the chime is output before or concurrently with the respective first or second notification.

In some embodiments, the computer system (e.g., 1400; 1401) is in communication with a display generation component (e.g., 1402; 1403) (e.g., a visual output device, a 3D display, a transparent display, a projector, a heads-up display, a display controller, a display device). In some embodiments, the computer system further comprises the display generation component. In some embodiments, the computer system receives an input directed to the alert (e.g., input 1420 on alert 1416) (e.g., an input on alert 1418) (e.g., a touch input on a notification displayed on the display generation component (e.g., input 1450 on notification 1451)) and, after (e.g., in response to) receiving the input directed to the alert, the computer system displays, via the display generation component, volume limit controls (e.g. 1422; 1430) corresponding to controlling output of audio data (e.g., output of current and/or future (anticipated) audio data) (e.g., a settings interface; a "Reduce Loud Sounds" user interface (a sound reduction interface)). In some embodiments, the alert includes displaying an aggregate audio exposure limit notification (e.g., 1418) or an instantaneous audio exposure limit notification (e.g., 1416). In some embodiments, after detecting an input on the aggregate or instantaneous audio exposure limit notification, the computer system displays, via display generation component, volume settings UI including the volume controls. In some embodiments, the alert includes displaying a tip banner (e.g., after two alerts have been previously generated). In some embodiments, after detecting an input on the tip banner, the computer system displays volume limit controls, including a "Reduce Loud Sounds" toggle affordance (e.g., 1432).

In some embodiments, the volume limit controls (e.g., 1430) include an affordance (e.g., 1432) (e.g., a graphical user interface object) (e.g., reduce loud sounds affordance; reduce sound levels menu option) that, when selected, toggles (e.g., enables or disables) a state of a process for reducing an anticipated output volume (e.g., a future output volume (e.g., the volume 1410-2 is reduced when compared to its anticipated volume 1410-3)) of output audio signals that exceed a selectable threshold value (e.g., 1410-1) (e.g., a volume limit set using the computer system or set by an external computer system such as a wearable device or a master device (e.g., a parent device that is authorized to set volume limits for the computer system)). In some embodiments, the audio exposure threshold criteria is met when the output of the audio data at the first volume exceeds the selectable threshold value (e.g., see FIG. 14B). In some embodiments, the selectable threshold value is the instantaneous sound pressure value.

In some embodiments, displaying the volume limit controls (e.g., 1422) includes displaying at least one of: 1) a notification of an aggregate sound pressure limit (e.g., 1424-2) (e.g., a notification indicating that the aggregate audio exposure limit was reached), and 2) a notification of an instantaneous sound pressure limit (e.g., 1424-1) (e.g., a notification indicating that the instantaneous audio exposure limit was reached). Displaying volume limit controls including a notification of an aggregate sound pressure limit or instantaneous sound pressure limit provides feedback to the user indicating why the volume was reduced for different conditions, allowing the user to more easily and quickly understand and appreciate the purpose of the volume reduction. This potentially dissuades the user from raising the volume, thereby eliminating or reducing inputs associated with a command for subsequent volume increases. Reducing inputs and providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the volume limit controls (e.g., 1422) further includes displaying an affordance (e.g., 1478) (e.g., speaker toggle affordance) that, when selected, initiates a process for classifying (e.g., identifying) the audio generation component (e.g., 1405) as an audio generation component other than headphones (e.g., non-headphones (e.g., non-in-ear external speakers; stand-alone speakers)). In some embodiments, the affordance is displayed when the audio generation component is coupled (e.g., physically coupled) to the computer system (e.g., the audio generation component is plugged into the computer system), and is not displayed if the audio generation component is not coupled to the computer system. Displaying an affordance for classifying the audio generation component as an audio device other than headphones, depending on whether or not the device is coupled to the computer system, provides additional controls for identifying the audio generation component without cluttering the user interface with additional controls when they are not needed. Providing additional control options without cluttering the user interface with additional controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the volume limit controls (e.g., 1430) include an affordance (e.g., slider 1436-1) that, when selected, initiates a process for adjusting the audio exposure threshold criteria (e.g., a selectable threshold value that is used to determine when the audio exposure threshold criteria is met) (e.g., a volume limit set using the computer system or set by an external computer system such as a wearable device or a master device (e.g., a parent device that is authorized to set volume limits for the computer system)). Displaying an affordance for adjusting the audio exposure threshold criteria allows a user to quickly and easily adjust the audio threshold without having to navigate multiple user interfaces. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the slider is displayed when the "Reduce Loud Sounds" affordance (e.g., 1432) is activated. In some embodiments, the selectable threshold value sets a volume limit for audio signals comprising the output audio data, such that individual audio signals that are anticipated to exceed the volume limit are compressed at their peaks so as not to exceed the selected threshold value, without adjusting the remaining audio signals comprising the output audio data, as discussed in greater detail below with respect to FIG. 16.

In some embodiments, the audio exposure threshold criteria is met when output of audio data (e.g., audio output at headphones device 1405 associated with graph 1410) (e.g., current output of the audio data and/or expected output of the audio data) (e.g., an average value of the output of audio data over a period of time) at the first volume exceeds an instantaneous sound pressure value (e.g., volume 1410-2 exceeds threshold 1410-1 in FIG. 14B, and threshold 1410-1 is an instantaneous audio exposure limit) (e.g., 100 dB; a maximum dB limit). In some embodiments, the audio exposure threshold criteria is met when the output of the audio data at the first volume exceeds the instantaneous sound pressure value over a predetermined period of time (e.g., a rolling period of time (e.g., 30 seconds) immediately preceding the current time). In some embodiments, the audio exposure threshold is an instantaneous audio exposure threshold, and the audio exposure criteria is criteria for determining an instantaneous audio exposure limit (e.g., instantaneous volume limit (e.g., an instantaneous dB such as for example a dB limit selected from a 75-100 dB range)) has been reached. For example, if the volume limit is 100 dB, then the audio exposure limit is reached the moment the volume (sound pressure value) of the output audio data reaches 100 dB. In some embodiments, the instantaneous volume limit is an average audio exposure (e.g., 100 dB) calculated over a short, rolling time period such as, for example, 30 seconds (or less). In this example, the audio exposure limit is reached when the average volume (sound pressure value) over the 30 second window meets or exceeds 100 dB. In this embodiment, using a short, rolling time period allows for a user to quickly adjust a loud output volume (e.g., 100 dB or greater) to a safe level (e.g., a volume less than the volume limit) without triggering an alert (e.g., 1416).

In some embodiments, the audio exposure threshold criteria is met when an aggregate sound pressure value of output of audio data (e.g., audio output at headphones device 1405 associated with graph 1410) (e.g., current output of the audio data and/or expected output of the audio data) exceeds a threshold value (e.g., a dB limit; an aggregate sound pressure limit) for a duration (e.g., twenty-four minutes, when the volume is 100 dB) (e.g., a duration of time for which the threshold value is safe for a user's hearing health, when measured over a predetermined period of time (e.g., twenty-four minutes of a seven-day period)) measured over a predetermined period of time (e.g., seven days) (e.g., a day; a week; a period of time substantially greater than the amount of time used to determine the instantaneous exposure limit). In some embodiments, the audio exposure threshold is an aggregate audio exposure threshold, and the audio exposure criteria is criteria for determining an aggregate audio exposure limit (e.g., an aggregate exposure to a volume of output audio measured over a period of time such as, for example, a day or a week) has been reached. In some embodiments, the audio exposure threshold criteria (e.g., aggregate audio exposure limit) is met when the aggregate sound pressure level (volume) of the audio data output at the audio generation component (or a collection of audio generation components including the audio generation component) exceeds a first threshold level for a first duration (e.g., period of time) or exceeds a second threshold level (lower than the first threshold level) for a second duration (longer than the first duration). For example, the aggregate audio exposure limit is reached when the aggregate volume of the output audio data includes a volume of 90 dB for a duration of four hours measured over a seven-day period, or if the aggregate volume of the output audio data includes a volume of 100 dB for a duration of twenty-four minutes measured over the seven-day period. In some embodiments, the aggregated sound pressure value can be an aggregation of averaged values, such as an aggregation of instantaneous sound pressure values.

In some embodiments, after detecting that the audio exposure threshold criteria has been met, the computer system (e.g., 1400; 1401) performs the following. While causing, via the audio generation component (e.g., 1405), output of second audio data (e.g., audio produced at headphones device 1405) at a third volume, the computer system detects that an aggregate sound pressure value of output of second audio data (e.g., current output of the second audio data and/or expected output of the second audio data) exceeds a predetermined multiplier (e.g., 1×, 2×) of the aggregate audio exposure threshold value over the predetermined period of time (e.g., 200%, 300% of the aggregate exposure limit for the predetermined period of time (e.g., a day; a week)). In response to detecting that the aggregate sound pressure value of output of second audio data exceeds the predetermined multiplier of the aggregate audio exposure threshold value over the predetermined period of time, the computer system performs the following: 1) while continuing to cause output of second audio data, reducing the volume of output of the second audio data to a fourth volume (e.g., volume 1410-2 is reduced in FIGS. 14C and 14D), lower than the third volume (in some embodiments, the fourth volume is the same as the second volume), and 2) outputting a second alert (e.g., 1418) indicating that the volume of output of the second audio data has been reduced. In some embodiments, when the aggregate exposure limit is reached, and for each instance at which the aggregate exposure limit is exceeded by a given multiplier or percentage (e.g., 100%, 200%), the volume is reduced to the safe volume level and the alert (e.g., 1418) is output indicating that the volume has been reduced. In some embodiments, the alert and volume reduction is limited to being performed once per day at each 100% limit. For example, the alert and volume reduction is performed only once a day when 100% of the aggregate limit is reached, once a day when 200% of the aggregate limit is reached, once a day when 300% of the aggregate limit is reached, and so on. In some embodiments, the same alert (e.g., 1418) is output for each instance at which the aggregate exposure limit is exceeded.

In some embodiments, reducing the volume of output of audio data (e.g., see FIGS. 14C and 14D) to the second volume includes gradually (e.g., incrementally, such that audio data is output at a third and fourth volume between the first and second volume, the third volume different from the first, second, and fourth volume and the fourth volume different from the first and second volume) reducing the volume from the first volume to the second volume. In some embodiments, the reduction in volume is a gradual reduction rather than an instantaneous reduction from the first volume to the second volume. For example, the volume decreases smoothly from the first volume to the second volume over a one- or two-second window. In some embodiments, the volume being reduced is the master volume for the computer system (e.g., the volume setting for a collection of applications or settings controlled by the system), rather than only the volume for a specific application operating on the system. Gradually reducing the volume of output of audio data to the second volume provides feedback to the user that the change in output volume is intentional, rather than an error caused, for example, by poor connection quality of the headphones. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 1400; 1401) is in communication with a display generation component (e.g., 1402; 1403) (e.g., a visual output device, a 3D display, a transparent display, a projector, a heads-up display, a display controller, a display device). In some embodiments, the computer system further comprises the display generation component. In some embodiments, in response to detecting that the audio exposure threshold criteria (e.g., 1410-1) has been met, the computer system displays, via the display generation component, a representation of volume (e.g., volume interface 1414) of output of audio data (e.g., audio produced at headphones device 1405) (e.g., having a first volume setting corresponding to the first volume (e.g., 1414-1 in FIG. 14C) or having a second volume setting corresponding to the second volume (e.g., 1414-2 in FIG. 14D)). In some embodiments, the volume indicator (e.g., 1414) is displayed when the display generation component is in an active (e.g., unlocked) state (e.g. see FIGS. 14C and 14D). In some embodiments, the volume indicator is not displayed when the display generation component is in an inactive (e.g., locked) state (e.g., see FIG. 14G). Displaying a representation of volume of output of audio data provides feedback to the user that the change in output volume is intentional, rather than an error caused, for example, by poor connection quality of the headphones. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the representation of volume of output of audio data (e.g., 1414) includes a graphical element (e.g., 1414-2) indicating a volume that exceeds predetermined safety criteria (e.g., loud) output volume (e.g., 1410-1). Displaying the representation of the volume including a graphical element indicating the volume exceeds predetermined safety criteria for the output volume provides feedback to the user indicating why the volume was reduced, allowing the user to more easily and quickly understand and appreciate the purpose of the volume reduction. This potentially dissuades the user from subsequently raising the volume, thereby eliminating or reducing inputs associated with a command for subsequent volume increases. Reducing inputs and providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the graphical element is displayed above the volume indicator. In some embodiments, the graphical element is displayed when the current output volume is at a maximum volume setting represented with the volume indicator and the volume of the output audio is greater than a threshold volume (e.g., 80 dB).

In some embodiments, displaying the representation of volume of output of audio data (e.g., 1414) includes displaying an animation of the representation of volume of output of audio data transitioning from a first visual state that corresponds to the first volume (e.g., 1414-1 in FIG. 14C) to a second visual state that corresponds to the second volume (e.g., 1414-1 in FIG. 14D), wherein the animation includes at least one visual state (e.g., an intermediate state) different from (1) the first visual state and (2) the second visual state. In some embodiments, the computer system (e.g., 1400; 1401) is in communication with a second audio generation component (e.g., 1405-1 in FIGS. 14AE-14AH). In some embodiments, while causing, via the second audio generation component, output of third audio data at a fifth volume, in accordance with the second audio generation component being an audio generation component of a first type (e.g., non-headphones (e.g., non-in-ear external speakers; stand-alone speakers)), the computer system continues output of audio data (e.g., the third audio data) at the fifth volume (e.g., continuing output irrespective of whether the output of the third audio data meets the audio exposure threshold criteria). In some embodiments, while causing, via the second audio generation component, output of third audio data at a fifth volume, in accordance with the second audio generation component being an audio generation component of a second type (e.g., headphones (e.g., in-ear or over-ear), a device not of the first type), and a determination that the audio exposure threshold criteria has been met (e.g., volume 1410-2 reaches threshold 1410-1 in FIG. 14B), the computer system performs the following: 1) while continuing to cause output of third audio data (e.g., at the audio generation component), the computer system reduces the volume of output of audio data (e.g., the third audio data) to a sixth volume, lower than the fifth volume (e.g., volume 1410-2 reduces in FIGS. 14C and 14D) (e.g., while continuing to play audio at the headphones, the system automatically reduces the volume of the output audio, without stopping playback of the audio), and 2) outputs a third alert (e.g., 1416; 1418) (e.g., a notification, a haptic response, an audio response, a banner) indicating that the volume of output of audio data (e.g., the third audio data) has been reduced. Reducing the output volume while continuing to cause output of third audio data, and outputting an indicating that the volume has been reduced provides feedback to the user indicating why the volume was reduced and that the volume reduction was intentional, allowing the user to more easily and quickly understand and appreciate the purpose of the volume reduction. This potentially dissuades the user from raising the volume, thereby eliminating or reducing inputs associated with a command for subsequent volume increases. Reducing inputs and providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the computer system is instructed (e.g., via a user input to select an output volume; via an output volume setting) to output the audio data at the audio generation component at a requested output audio volume. In response to detecting that the audio exposure threshold criteria has been met, the computer system then reduces the volume of the audio data to a predefined output audio volume that is less than the requested volume. For example, the predefined output audio volume is a maximum output volume limit or an output volume level that is determined to be safe for the user (e.g., the output volume level does not cause damage to the user's hearing) based on historical volume levels at the audio generation component (e.g., based on the history of the volume of the output audio at the audio generation component).

In some embodiments, in accordance with a determination that the computer system (e.g., 1400; 1401) is in communication with (e.g., coupled to; the second audio generation component is plugged into the computer system) the second audio generation component (e.g., 1405-1) a first time, the computer system prompts (e.g., 1475) a user of the computer system to indicate an audio generation component type of the second audio generation component (e.g., display a notification requesting the user to identify the second audio generation component as speaker or not a speaker). In some embodiments, in accordance with a determination that the computer system is in communication with the second audio generation component a subsequent time, the computer system forgoes prompting a user of the computer system to indicate the audio generation component type of the second audio generation component. Prompting the user to indicate an audio generation component type of the audio generation component when it is in communication with the computer system a first time, but not a subsequent time, allows the user to indicate the device type without excessively prompting the user, thereby eliminating inputs to subsequent prompts. Reducing the number of inputs enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the computer system prompts the user to indicate whether an audio generation component is a headphone or non-headphone speaker the first time the audio generation component is connected to the computer system, but not thereafter, if the audio generation component has a built-in identifier.

In some embodiments, in response to establishing the communication (e.g., coupling; the second audio generation component is plugged into the computer system) with the second audio generation component (e.g., 1405-1), the computer system (e.g., 1400; 1401) prompts (e.g., 1475) a user of the computer system to indicate an audio device type for the second audio generation component (e.g., display a notification requesting the user to identify the second audio generation component as speaker or not a speaker). In some embodiments, the computer system prompts the user to indicate whether an audio generation component is a headphone or non-headphone speaker every time the audio generation component is connected to the computer system, if the audio generation component does not have a built-in identifier.

In some embodiments, the computer system (e.g., 1400; 1401) includes an audio input device (e.g. 1406) (e.g., a microphone). In some embodiments, the computer system detects an audio generation component type for the second audio generation component (e.g., 1405-1) based on an input received at the audio input device while the computer system is causing output of audio data via the second audio generation component. In some embodiments, the computer system automatically detects an audio generation component is a speaker if a microphone of the computer system detects audio that matches the audio the computer system is causing to be output at the audio generation component.

In some embodiments, while the computer system (e.g., 1400; 1401) is in communication with the second audio generation component (e.g., 1405-1), the computer system detects a first input (e.g., 1476; an input on 1469) corresponding to a request to display an audio settings interface and, in response to detecting the first input, the computer system displays the audio settings interface (e.g., 1422 in FIG. 14AH), wherein the audio settings interface includes an affordance (e.g., 1478) (e.g., speaker toggle affordance) that, when selected, initiates a process for classifying (e.g., identifying) the second audio generation component as an audio generation component of the first type (e.g., non-headphones (e.g., non-in-ear external speakers; stand-alone speakers)). In some embodiments, while the computer system is not in communication with the second audio generation component (e.g., the second audio generation component is disconnected from the computer system), the computer system detects a second input (e.g., 1420) corresponding to a request to display the audio settings interface and, in response to detecting the second input, the computer system displays the audio settings interface (e.g., 1422 in FIG. 14N), wherein the audio settings interface does not include the affordance that, when selected, initiates a process for classifying the second audio generation component as an audio generation component of the first type.

In some embodiments, in accordance with a determination that the second audio generation component (e.g., 1405-1) is not identified as an audio generation component of the second type (e.g., the second audio generation component is identified as potentially not headphones; the audio generation component has not been explicitly identified as something other than headphones (e.g., a speaker)), the computer system (e.g., 1400; 1401) prompts (e.g., 1475; 1477) a user of the computer system to indicate whether the second audio generation component is an audio generation component of the second type (e.g., display a notification requesting the user to identify the second audio generation component as headphones or not headphones).

In some embodiments, in accordance with a determination that the second audio generation component (e.g., 1405-1) is indicated as an audio generation component of the first type (e.g., non-headphones (e.g., non-in-ear external speakers; stand-alone speakers)), the computer system (e.g., 1400; 1401) prompts (e.g., 1475; 1477) the user to confirm the second audio generation component is an audio generation component of the first type after a predetermined period of time. In some embodiments, if the user indicates the second audio generation component is not headphones, the computer system prompts the user to confirm this indication after a period of time has passed such as, for example, two weeks.

In some embodiments, the audio exposure threshold criteria includes a criterion that is met when the audio generation component (e.g., 1405) is a headphones device (e.g., in-ear or over-ear headphones). In some embodiments, only audio output via headphones is subject to the audio exposure limits. In some embodiments, the headphones device is configured to have an output volume limit (e.g., 1438) that is less than a maximum output volume of the headphones device (e.g., a measure of loudness, a sound pressure level (e.g., 100 dB)). Configuring the headphones device to have an output volume limit that is less than a maximum output volume of the headphones device provides safety measures to protect a user's sense of hearing by implementing volume limits, which are generally less than the maximum volume limits of a headphones device and can vary to meet safety requirements based on the user's listening habits. Providing these safety measures when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while (in some embodiments, after) the computer system (e.g., 1400; 1401) causes output of audio data at the second volume, (and, in some embodiments, while the audio exposure threshold criteria is met), the computer system receives an input corresponding to a request to increase the volume of output of audio data and, in response to receiving the input corresponding to the request to increase the volume of output of audio data, the computer system increases the volume of output of audio data to a seventh volume, greater than the second volume. In some embodiments, the seventh volume is the first volume. In some embodiments, by increasing the volume of output audio in response to an input received after the volume was reduced, the computer system permits the user to override the volume reduction that was caused in response to detecting that the audio exposure criteria was met.

In some embodiments, the audio exposure threshold criteria includes a criterion that is met when the audio data is media playback (e.g., music, games, videos). In some embodiments, the audio exposure limits apply to media playback, but not to other sound sources of the computer system such as, for example, system sounds, phone audio, and video chat audio.

In some embodiments, the computer system (e.g., 1400; 1401) is in communication with a display generation component (e.g., 1402; 1403) (e.g., a visual output device, a 3D display, a transparent display, a projector, a heads-up display, a display controller, a display device). In some embodiments, the computer system further comprises the display generation component. In some embodiments, while the computer system causes output of audio data, the computer system displays, via the display generation component, an audio controls user interface (e.g., 1480). In some embodiments, the audio controls user interface includes an audio exposure indicator (e.g., 1482) indicative of an audio exposure level (e.g., the sound pressure level (e.g., volume)) associated with a current volume of output of audio data. In some embodiments, the current volume of the output audio is indicated (e.g., by an icon and/or color) to be a safe, loud, or hazardous audio exposure level. Displaying an audio controls user interface including an audio exposure indicator indicative of an audio exposure level associated with a current volume of output of audio data provides feedback to the user whether the current audio levels are safe or potentially hazardous. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the audio controls user interface (e.g., 1480) includes, in accordance with a determination that the current volume of output of audio data does not exceed a first volume threshold (e.g., a low noise threshold), displaying the audio exposure indicator (e.g., 1482) having a first color (e.g., see FIG. 14AI). In some embodiments, the audio exposure indicator is displayed having a green color when the current volume of the output audio does not exceed a low threshold (e.g., the audio is not accumulating loud noise). In some embodiments, displaying the audio controls user interface includes, in accordance with a determination that the current volume of output of audio data exceeds the first volume threshold, but does not exceed a second volume threshold greater than the first volume threshold (e.g., a high noise threshold), displaying the audio exposure indicator having a second color different than the first color (e.g., see FIG. 14AJ). Displaying the audio exposure indicator having a particular color based on whether a volume threshold is exceeded provides feedback to the user of whether the current audio levels are safe or hazardous. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the audio exposure indicator is displayed having a yellow color when the current volume of the output audio exceeds a low threshold, but does not exceed a high threshold (e.g., the audio is accumulating loud noise, but the noise is not too loud). In some embodiments, displaying the audio controls user interface includes, in accordance with a determination that the current volume of output of audio data exceeds the second volume threshold, displaying the audio exposure indicator having a third color different than the first color and second color (e.g., see FIG. 14AJ). In some embodiments, the audio exposure indicator is displayed having a red color when the current volume of the output audio exceeds a high threshold (e.g., the audio is accumulating loud noise).

In some embodiments, the computer system (e.g., 1400; 1401) detects an input (e.g., 1484) directed to the audio exposure indicator (e.g., 1482) and, in response to detecting the input directed to the audio exposure indicator, the computer system displays, via the display generation component (e.g., 1402; 1403), an audio exposure user interface (e.g., 1485). In some embodiments, the audio exposure user interface includes a measurement of audio exposure data associated with output of audio data (e.g., 1485-3) (e.g., current output of audio data). In some embodiments, the audio exposure UI includes an audio exposure meter that illustrates a real time measurement of the current audio exposure caused by the headphones currently outputting the audio. Displaying an audio exposure interface including a measurement of audio exposure data associated with output of audio data provides feedback to the user of whether the current audio levels are safe or hazardous. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the audio exposure user interface (e.g., 1485) further includes an identification (e.g., 1485-1) (e.g., a device name) of the audio generation component (e.g. 1405).

In some embodiments, the audio exposure user interface (e.g., 1485) further includes an affordance (e.g., 1485-2) that, when selected, initiates a process for causing output of ambient audio at the audio generation component (e.g., 1405). In some embodiments, the output of ambient audio includes enabling a microphone at the computer system, receiving ambient audio at the microphone, amplifying the ambient audio, and outputting the amplified ambient audio at the audio generation component. This permits the user to hear audio from their environment, without having to remove their headphones.

Note that details of the processes described above with respect to method 1500 (e.g., FIG. 15) are also applicable in an analogous manner to the methods described below and above. For example, methods 1300, 1600, and 1800 optionally include one or more of the characteristics of the various methods described above with reference to method 1500. For example, operations for setting and adjusting audio settings, operations for managing audio exposure, and operations for managing audio exposure data can incorporate at least some of the operations for displaying audio exposure limit alerts discussed above with respect to method 1500. For brevity, these details are not repeated below.

FIG. 16 is a flow diagram illustrating a method for managing audio exposure using a computer system, in accordance with some embodiments. Method 1600 is performed at a computer system (e.g., a smartphone, a smartwatch) (e.g., device 100, 300, 500, 600, 601, 800, 900, 1100, 1200, 1400, 1401, 1700) that is in communication with (e.g., electrically coupled; via a wired or wireless connection) an audio generation component (e.g., headphones 1405). Some operations in method 1600 are, optionally, combined, the orders of some operations are, optionally, changed, and some operations are, optionally, omitted.

As described below, method 1600 provides an intuitive way for managing audio exposure by, for example, setting and adjusting audio settings. The method reduces the cognitive burden on a user for managing audio exposure, thereby creating a more efficient human-machine interface. For battery-operated computing devices, enabling a user to manage audio exposure faster and more efficiently conserves power and increases the time between battery charges.

In method 1600, the computer system (e.g., 1400) receives (1602) (e.g., detects) output audio data (e.g., signals S1, S2, S3) (e.g., data indicating an output volume) associated with output audio generated using the audio generation component (e.g., 1405) (e.g., the headphones are currently generating output audio (e.g., music, videogame audio, video playback audio)). The output audio comprises a first audio signal (e.g., signal S1; signal S3 in some embodiments) (e.g., a first sound) and a second audio signal (e.g., signal S2) (e.g., a second sound different from the first sound; a set of signals/sounds different from the first audio signal). The output audio data includes a first anticipated output audio volume for the first audio signal (e.g., S1 and S1A in audio chart 1435) and a second anticipated output audio volume for the second audio signal (e.g., S2 and S2A in audio chart 1435).

In method 1600, in accordance with a determination (1604) that the output audio data (e.g., signals S1, S2, S3) satisfies a first set of criteria, the computer system (e.g., 1400) causes (1606) (e.g., reduces) output of the first audio signal (e.g., S1) at a reduced output audio volume (e.g., in FIG. 14Q, S1 is output at a volume (about 100 dB) that is less than the anticipated volume it would have achieved following the curve of S1A, as shown in chart 1435) that is below the first anticipated output audio volume (e.g., a predefined audio output volume such as a maximum output volume limit or a volume below the maximum output volume limit) (e.g., the output audio volume for the first audio signal is reduced without adjusting the output audio volume of other signals comprising the output audio such as, for example, the second audio signal (e.g., S2)) and causes (1608) output of the second audio signal (e.g., S2) at the second anticipated output audio volume (e.g., S2 is unadjusted) (e.g., the second audio signal is played at the requested (anticipated) output audio volume for the second audio signal, while the output audio volume for the first audio signal is limited (e.g., capped) at the maximum output volume limit). Causing output of the first audio signal at the reduced output audio volume while causing output of the second audio signal at the second anticipated output audio volume protects the user's hearing health while also preserving the quality of the audio output without requiring the user to manually adjust the audio output volume. Performing an operation when a set of conditions has been met without requiring further input from the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. The first set of criteria is satisfied when the first anticipated output audio volume for the first audio signal (e.g., volume associated with S1A in FIG. 14Q) exceeds an output audio volume threshold (e.g., 1438) (e.g., a maximum output volume limit)

(e.g., an output audio volume threshold selected, for example, in an audio settings user interface). In some embodiments, the first set of criteria includes a first criterion that is satisfied when the output audio volume for the first audio signal exceeds the output audio volume threshold. In some embodiments, the first set of criteria further includes a second criterion that is satisfied when an output audio volume for the second audio signal (e.g., S2) does not exceed the output audio volume threshold.

In some embodiments, the output audio volume threshold (e.g., 1438) corresponds to a volume control setting (e.g., 1436; 1432; 1430) (e.g., a "reduce loud sounds" setting) associated with a user account (e.g., John's account), and the volume control setting is applied at the computer system (e.g., 1400) (e.g., a smartphone associated with the user account (e.g., John's phone)) and an external computer system (e.g., 1401) (e.g., an electronic device separate from the computer system; e.g., a wearable device) associated with the user account (e.g., John's watch). In some embodiments, the volume control setting applies across multiple devices such as, for example, different electronic devices linked with a user account. Applying the volume control setting at the computer system and an external computer system associated with the user account reduces the number of inputs needed to efficiently apply a volume control setting across multiple devices. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 1400; 1401) is associated with a first user account (e.g., John's account) (e.g., a child account) and the output audio volume threshold (e.g., 1438) is determined (e.g., set) by a second user account (e.g., Mom's account) (e.g., a parent account) (e.g., a user account different than the first user account) associated with an external computer system (e.g., 1400A) (e.g., an electronic device separate from the computer system; e.g., a parent device) and authorized (e.g., by the child account) to enable the output audio volume threshold at the computer system. In some embodiments, the volume control settings are accessible from a different user account (e.g., a parent account) than that which is associated with using the computer system (e.g., a child account).

In some embodiments, the first set of criteria includes a criterion that is satisfied when the output audio (e.g., signals S1, S2, S3) is media playback (e.g., music, games, videos). In some embodiments, the volume reduction limits apply to media playback, but not to other sound sources of the computer system (e.g., 1400) such as, for example, system sounds, phone audio, and video chat audio.

In method 1600, in accordance with a determination (1610) that the output audio data (e.g., signals S1, S2, S3) does not satisfy the first set of criteria (e.g., neither the output audio volume for the first audio signal, nor the output audio volume for the second audio signal (e.g., the output audio data does not satisfy a second set of criteria), exceeds the predefined output audio volume (e.g., 1438) (e.g., the maximum output volume limit)), the computer system (e.g., 1400; 1401) causes (1612) output of the first audio signal at the first anticipated output audio volume and causes (1614) output of the second audio signal at the second anticipated output audio volume (e.g., in FIG. 14Q, neither signal S2 nor signal S3 exceeds output limit 1438 and, therefore, neither signal is adjusted).

In some embodiments, in accordance with a determination that the output audio data (e.g., signals S1, S2, S3) satisfies a second set of criteria (e.g., while the output audio data does not satisfy the first set of criteria), the computer system (e.g., 1400; 1401) causes output of the first audio signal (e.g., signal S3) at the first anticipated output audio volume (e.g., the first audio signal is played at the requested (anticipated) output audio volume for the first audio signal, while the output audio volume for the second audio signal (e.g., S2) is limited (e.g., capped) at the maximum output volume limit) and causes (e.g., reducing) output of the second audio signal (e.g., S2) at a reduced output audio volume (e.g., S2 is capped at 90 dB in audio chart 1435 of FIG. 14R) that is below the second anticipated output audio volume (e.g., the output audio volume for the second audio signal is reduced without adjusting the output audio volume of other signals comprising the output audio such as, for example, the first audio signal). Causing output of the first audio signal at the first anticipated output audio volume while causing output of the second audio signal at the reduced output audio volume protects the user's hearing health while also preserving the quality of the audio output without requiring the user to manually adjust the audio output volume. Performing an operation when a set of conditions has been met without requiring further input from the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the second set of criteria is satisfied when the second anticipated output audio volume for the second audio signal (e.g., the volume for S2A) exceeds the output audio volume threshold (e.g., 1438). In some embodiments, the second set of criteria includes a first criterion that is satisfied when the output audio volume for the second audio signal exceeds the output audio volume threshold. In some embodiments, the second set of criteria further includes a second criterion that is satisfied when the output audio volume for the first audio signal does not exceed the output audio volume threshold. In some embodiments, the reduced output audio volume for the second audio signal is the same as the reduced output audio volume for the first audio signal (e.g., in FIG. 14R, both S1 and S2 are capped at 90 dB). In some embodiments, the reduced output audio volume for the second audio signal is different than the reduced output audio volume for the first audio signal.

In some embodiments, the computer system (e.g., 1400; 1401) includes a display generation component (e.g., 1402; 1403) (e.g., a display controller, a touch-sensitive display system) and one or more input devices (e.g., a touch-sensitive surface of 1402; a touch-sensitive surface of 1403). In some embodiments, the computer system displays, via the display generation component, a volume control interface object (e.g., 1436) (e.g., slider 1436-1) representing a range of threshold values (e.g., 75-100 dB) for the output audio volume threshold (e.g., 1438) and detects, via the one or more input devices, an input (e.g., 1440) corresponding to the volume control interface object. In some embodiments, in response to detecting the input corresponding to the volume control interface object, the computer system adjusts the output audio volume threshold (e.g., 1438) (e.g., the maximum output volume limit) from a first threshold value (e.g., 100 dB in FIG. 14Q) to a second threshold value (e.g., 90 dB in FIG. 14R) different than the first threshold value. In some embodiments, the computer system receives the output audio data (e.g., signals S1, S2, S3) including a third anticipated output audio volume (e.g., volume associated with S1A) for a third audio signal (e.g., S1) (e.g., the first audio signal) and a fourth anticipated output audio volume (e.g., volume associated with S2A) for a fourth audio signal (e.g., S3) (e.g., the second audio signal). In some embodiments, in accordance with a determination that the output audio data satisfies a third set of criteria, wherein the third set of criteria is satisfied when the third anticipated output audio volume for the third audio signal exceeds the second threshold value of the output audio volume threshold (e.g., and the fourth anticipated output audio volume for the fourth audio signal does not exceed the second threshold value of the output audio volume threshold), the computer system causes output of the third audio signal at a second reduced output audio volume (e.g., S1 is output at about 90 dB in FIG. 14R) that is below the third anticipated output audio volume (e.g., and equal to or below the second threshold value of the output audio volume threshold) (e.g., the output audio volume for the third audio signal is reduced without adjusting the output audio volume of other signals comprising the output audio such as, for example, the fourth audio signal) and causes output of the fourth audio signal at the fourth anticipated output audio volume (e.g., the fourth audio signal is played at the requested (anticipated) output audio volume for the fourth audio signal, while the output audio volume for the third audio signal is limited (e.g., capped) at the maximum output volume limit (e.g., the second threshold value)) (e.g., in FIG. 14R, signal S1 is capped at 90 dB, but signal S3 remains unadjusted). Causing output of the third audio signal at the second reduced output audio volume while causing output of the fourth audio signal at the fourth anticipated output audio volume protects the user's hearing health while also preserving the quality of the audio output without requiring the user to manually adjust the audio output volume. Performing an operation when a set of conditions has been met without requiring further input from the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the volume control interface object (e.g., 1436) (e.g., slider 1436-1) representing the output audio volume threshold (e.g., 1438) having the first threshold value (e.g., 100 dB in FIG. 14Q), the computer system (e.g., 1400; 1401) displays a non-numerical, text description (e.g., 1436-3 in FIG. 14Q) of the first threshold value (e.g., "loud as an ambulance" is displayed when the output audio volume threshold is the 100 dB threshold value) and, after adjusting the output audio volume threshold (e.g., the maximum output volume limit) from the first threshold value (e.g., 100 dB) to the second threshold value (e.g., 90 dB in FIG. 14R), the computer system displays a non-numerical, text description of the second threshold value (e.g., 1436-3 in FIG. 14R) (e.g., "loud as a motorcycle" is displayed when the output audio volume threshold is the 90 dB threshold value). Displaying a non-numerical, text description of the first and second threshold values provides feedback to the user of real-world, contextual comparisons of the loudness of the audio limits they have set. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first set of criteria further includes a first criterion that is satisfied when a volume control setting (e.g., 1432) (e.g., a "reduce loud sounds" setting) is enabled. In some embodiments, the volume control setting is set/enabled/disabled using the computer system (e.g., 1400) (e.g., an electronic device) or using an external computer system (e.g., an external electronic device such as a wearable device (e.g., 1401) or a master device (e.g., 1400A) (e.g., a parent device that is authorized to set/enable/disable volume limits for the computer system). In some embodiments, in accordance with a determination that the output audio data (e.g., signals S1, S2, S3; audio produced at headphones device 1405 in FIGS. 14A-14D) satisfies the first set of criteria, the computer system forgoes outputting an alert (e.g., 1416) (e.g., a notification, a haptic response, an audio response, a banner) indicating that the output audio volume of the first audio signal (e.g., S1; in some embodiments, one or more of signals S1, S2, and S3 correspond to the audio produced at headphones device 1405 in FIGS. 14A-14D) (e.g., signal S1 corresponds to the signal at headphones device 1405 in FIGS. 14A-14D, and the volume for signal S1 is represented by graph 1410) has exceeded the output audio volume threshold (e.g., 1438; in some embodiments, output limit 1438 corresponds to threshold 1410-1). In some embodiments, the output audio volume threshold (e.g., 1410-1) corresponds to an instantaneous audio exposure threshold (e.g., 100 dB), and the alert (e.g., 1416) indicates that the volume of the output audio has exceeded the instantaneous audio exposure threshold. In some embodiments, this alert is not output when the volume control setting is enabled (e.g., the volume will not reach the threshold to trigger the alert). In some embodiments, in accordance with a determination that the output audio data satisfies a fourth set of criteria, wherein the fourth set of criteria is satisfied when the first anticipated output audio volume for the first audio signal exceeds the output audio volume threshold (e.g., when volume 1410-2 exceeds threshold 1410-1 in FIG. 14B) and the volume control setting is disabled, the computer system performs the following steps: 1) causing output of the first audio signal at the first anticipated output audio volume (e.g., the signal is output with volume 1410-2 that exceeds threshold 1410-1 at time T2 and T3); 2) causing output of the second audio signal (e.g., S2) at the second anticipated output audio volume (e.g., the volume associated with S2/S2A); and 3) outputting the alert (e.g., 1416) indicating that the output audio volume of the first audio signal has exceeded the output audio volume threshold (e.g., see FIG. 14E). In some embodiments, in addition to (e.g., prior to) outputting the alert, the computer system reduces the output audio volume of the first audio signal to an output audio volume that is equal to or less than the output audio volume threshold (e.g., see reduction of volume 1410-2 in FIGS. 14C and 14D). In some embodiments, when the volume control setting is disabled, the computer system can output an alert when an aggregate audio exposure limit is reached (e.g., alert 1418) or when the instantaneous audio exposure limit is reached (e.g., alert 1416). However, when the volume control setting is enabled, the output volume of the output audio generated using the audio generation component (e.g., headphones 1405) is limited such that the maximum volume permitted for the output audio is less than (or equal to) the output audio volume threshold (which optionally corresponds to the instantaneous audio exposure limit). Enabling the volume control setting therefore precludes a scenario in which the computer system outputs alerts for reaching the instantaneous audio exposure limit. In such embodiments, however, alerts can still be output for reaching the aggregate audio exposure limit.

In some embodiments, the output audio (e.g., signal S1, S2, S3) further comprises a fifth audio signal and the output audio data further includes a fifth anticipated output audio volume (e.g., a low volume) for the fifth audio signal. In some embodiments, in accordance with a determination that the output audio data satisfies the first set of criteria, the computer system (e.g., 1400; 1401) causes output of the fifth audio signal at an increased output audio volume that is greater than the fifth anticipated output audio volume (e.g., the fifth audio signal is output at an increased volume, while the first audio signal is output at a reduced volume and the second audio signal is output at the requested (anticipated) volume). In some embodiments, the lower the output audio volume threshold, the more the quiet sounds are increased.

In some embodiments, the output audio volume threshold (e.g., 1438) is a first value (e.g., 100 dB in FIG. 14Q) and the output audio data (e.g., signals S1, S2, S3) satisfies the first set of criteria. In some embodiments, after causing output of the first audio signal (e.g., S1) at the reduced output audio volume (e.g., at about 100 dB in FIG. 14Q) (e.g., a first reduced output audio volume) and causing output of the second audio signal (e.g., S2) at the second anticipated output audio volume (e.g., S2 is unadjusted in FIG. 14Q), the computer system (e.g., 1400; 1401) performs the following steps. In some embodiments, the computer system receives an input (e.g., 1440 on slider 1436-1) corresponding to a request to reduce the output audio volume threshold (e.g., 1438). In some embodiments, in response to receiving the input corresponding to a request to reduce the output audio volume threshold, the computer system reduces the output audio volume threshold from the first value (e.g., 100 dB in FIG. 14Q) to a second value less than the first value (e.g., 90 dB in FIG. 14R). In some embodiments, the computer system receives the output audio data associated with the output audio generated using the audio generation component (e.g., 1405). The output audio data includes the first anticipated output audio volume for the first audio signal and the second anticipated output audio volume for the second audio signal. In some embodiments, in accordance with a determination that the output audio data satisfies the first set of criteria (e.g., the first anticipated output audio volume for the first audio signal exceeds the output audio volume threshold), the computer system causes output (e.g., via the audio generation component) of the first audio signal at a second reduced output audio volume (e.g., S1 is capped at 90 dB in FIG. 14R) that is below the first anticipated output audio volume (e.g., the output audio volume for the first audio signal is reduced to a volume at or below the reduced output audio volume threshold (e.g., the second value)) and causes output of the second audio signal at a second reduced output audio volume that is below the second anticipated output audio volume (e.g., S2 is capped at 90 dB in FIG. 14R) (e.g., the output audio volume for the second audio signal is reduced (e.g., to a volume at or below the reduced output audio volume threshold) now that the output audio volume threshold has been reduced). Causing output of the first audio signal and the second audio signal at the second reduced output audio volume that is below the first anticipated output audio volume protects the user's hearing health, by reducing signals that were previously not reduced after adjusting the threshold, while also preserving the quality of the audio output without requiring the user to manually adjust the audio output volume. Performing an operation when a set of conditions has been met without requiring further input from the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second reduced output audio volume for the first audio signal is the same as the first reduced output audio volume for the first audio signal. In some embodiments, the second reduced output audio volume for the first audio signal is different than the first reduced output audio volume for the first audio signal.

In some embodiments, the output audio volume threshold (e.g., 1438) is a third value (e.g., 90 dB in FIG. 14R) and the output audio data (e.g., signals S1, S2, S3) satisfies the first set of criteria. In some embodiments, after causing output of the first audio signal (e.g., S2) at the reduced output audio volume (e.g., 90 dB in FIG. 14R) and causing output of the second audio signal (e.g., S3) at the second anticipated output audio volume (e.g., S3 is unadjusted in FIG. 14R), the computer system (e.g., 1400; 1401) performs the following steps. In some embodiments, the computer system receives an input corresponding to a request to increase the output audio volume threshold (e.g., an input to increase slider 1436-1 from the 90 dB setting in FIG. 14R, back to the previous 100 dB setting in FIG. 14Q) and, in response to receiving the input corresponding to a request to increase the output audio volume threshold, increases the output audio volume threshold from the third value (e.g., 90 dB) to a fourth value (e.g., 100 dB) greater than the third value. In some embodiments, the computer system receives the output audio data associated with the output audio generated using the audio generation component (e.g., 1405). In some embodiments, the output audio data includes the first anticipated output audio volume for the first audio signal and the second anticipated output audio volume for the second audio signal. In some embodiments, in response to determining that the output audio data does not satisfy the first set of criteria (e.g., the first anticipated output audio volume for the first audio signal no longer exceeds the output audio volume threshold), the computer system causes output of the first audio signal at the first anticipated output audio volume (e.g., S2 is output without being adjusted, similar to as shown in FIG. 14Q) (e.g., the output audio volume for the first audio signal is no longer reduced because the first anticipated output audio volume is less than the increased output audio volume threshold (e.g., the fourth value)) and causes output of the second audio signal at the second anticipated output audio volume (e.g., the output audio volume for the second audio signal (S3) remains unaffected). Causing output of the first audio signal at the first anticipated output audio volume after increasing the output audio volume threshold enhances the quality of the audio output while still protecting the user's hearing health, without requiring the user to manually adjust the audio output volume. Performing an operation when a set of conditions has been met without requiring further input from the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1600 (e.g., FIG. 16) are also applicable in an analogous manner to the methods described below and above. For example, methods 1300, 1500, and 1800 optionally include one or more of the characteristics of the various methods described above with reference to method 1600. For example, operations for setting and adjusting audio settings, operations for displaying audio exposure limit alerts, and operations for managing audio exposure data can incorporate at least some of the operations for managing audio exposure discussed above with respect to method 1600. For brevity, these details are not repeated below.

Figure 17B:
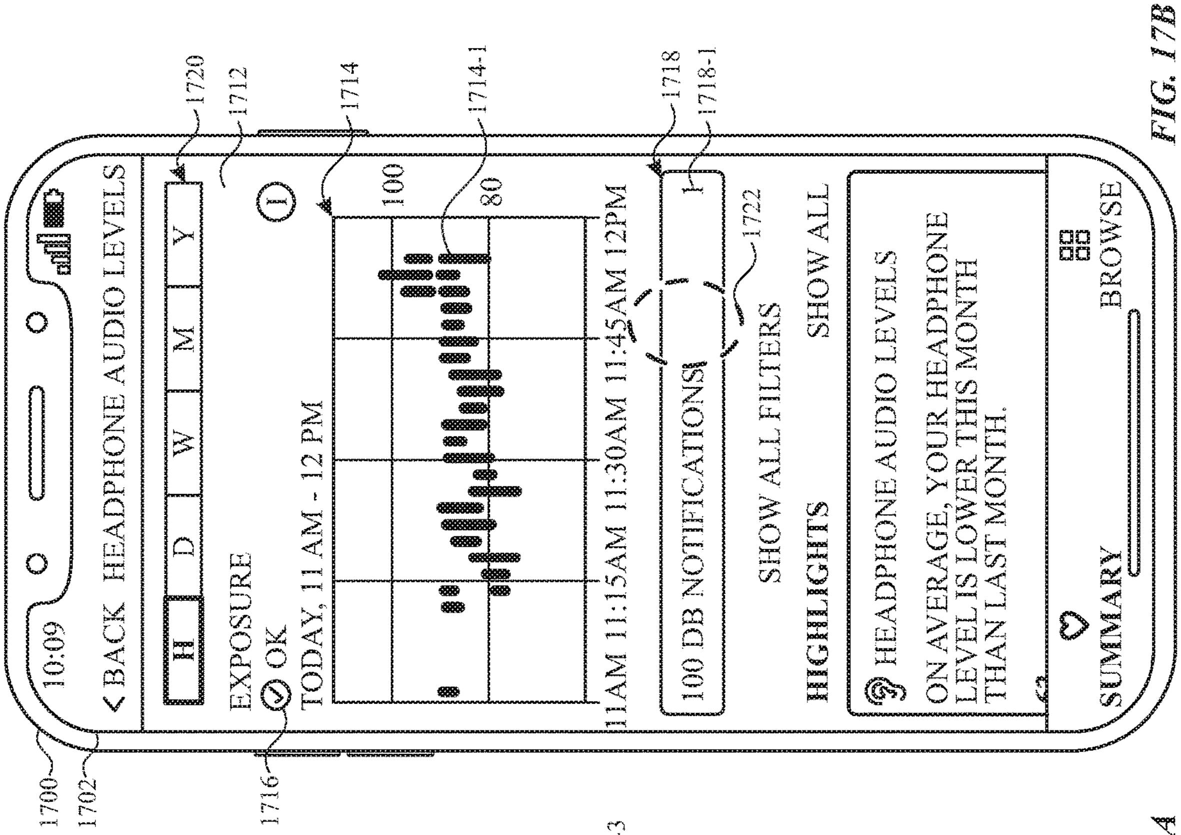
FIGS. 17A-17V illustrate exemplary user interfaces for managing audio exposure data, in accordance with some embodiments.
Figure 17A:
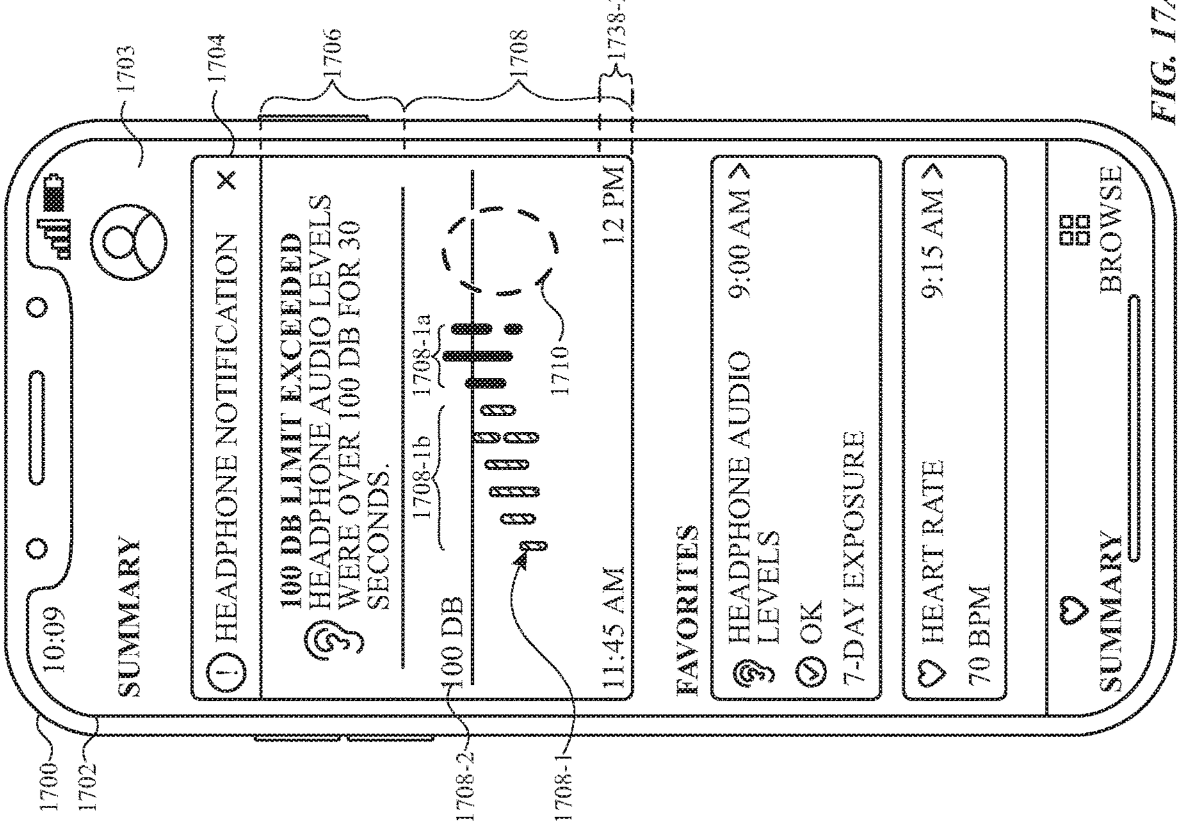
Figure 17D:
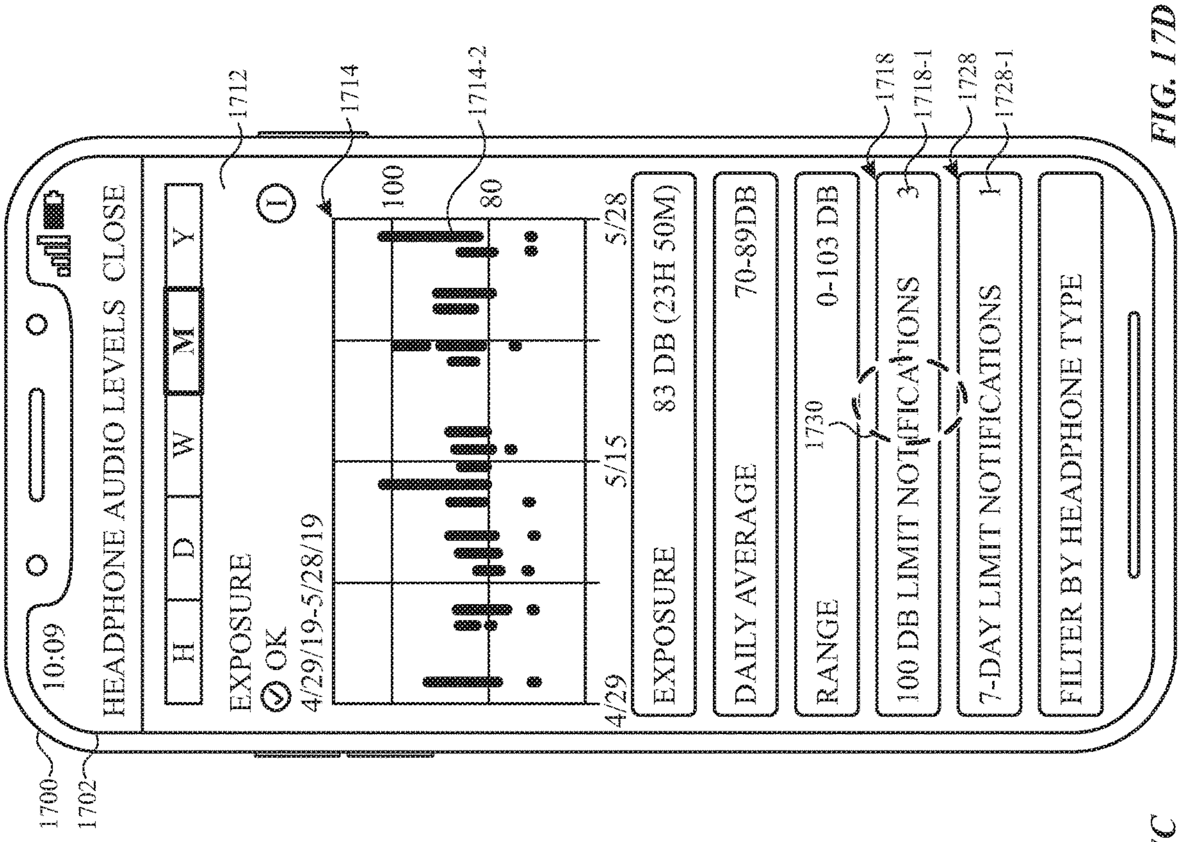
Figure 17C:
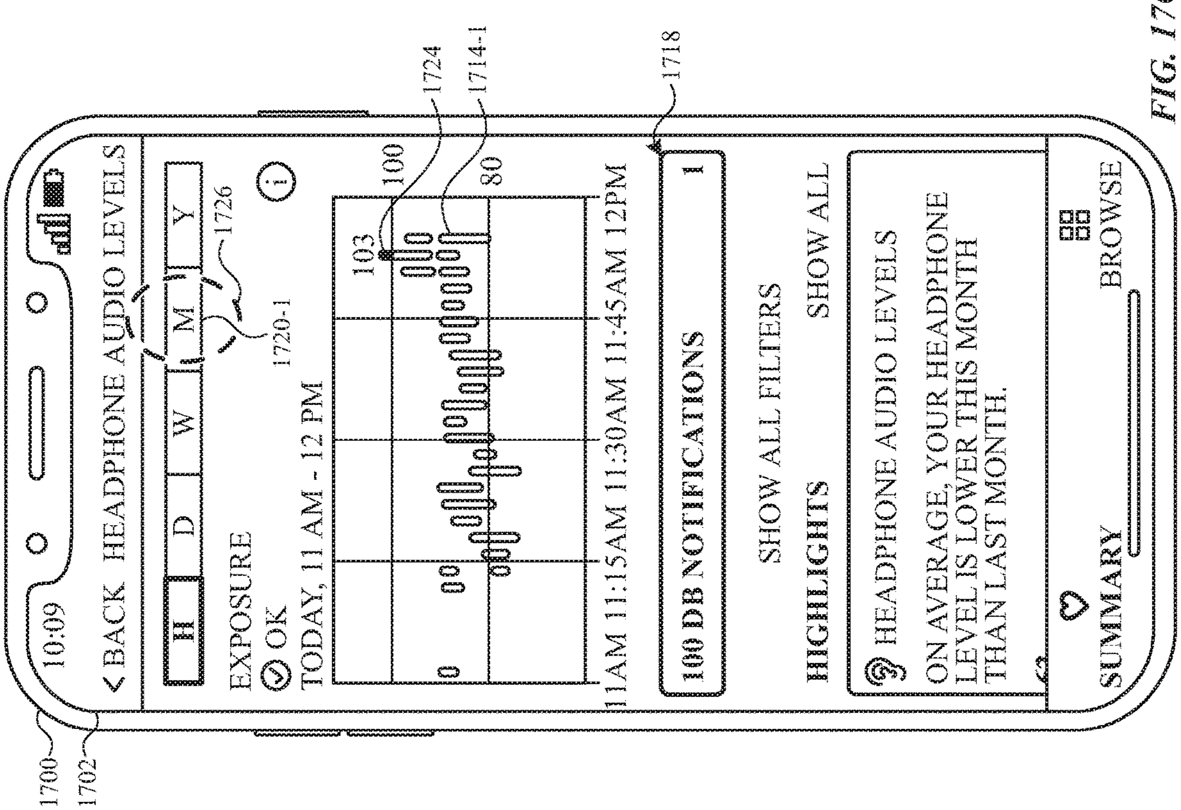
Figure 17F:
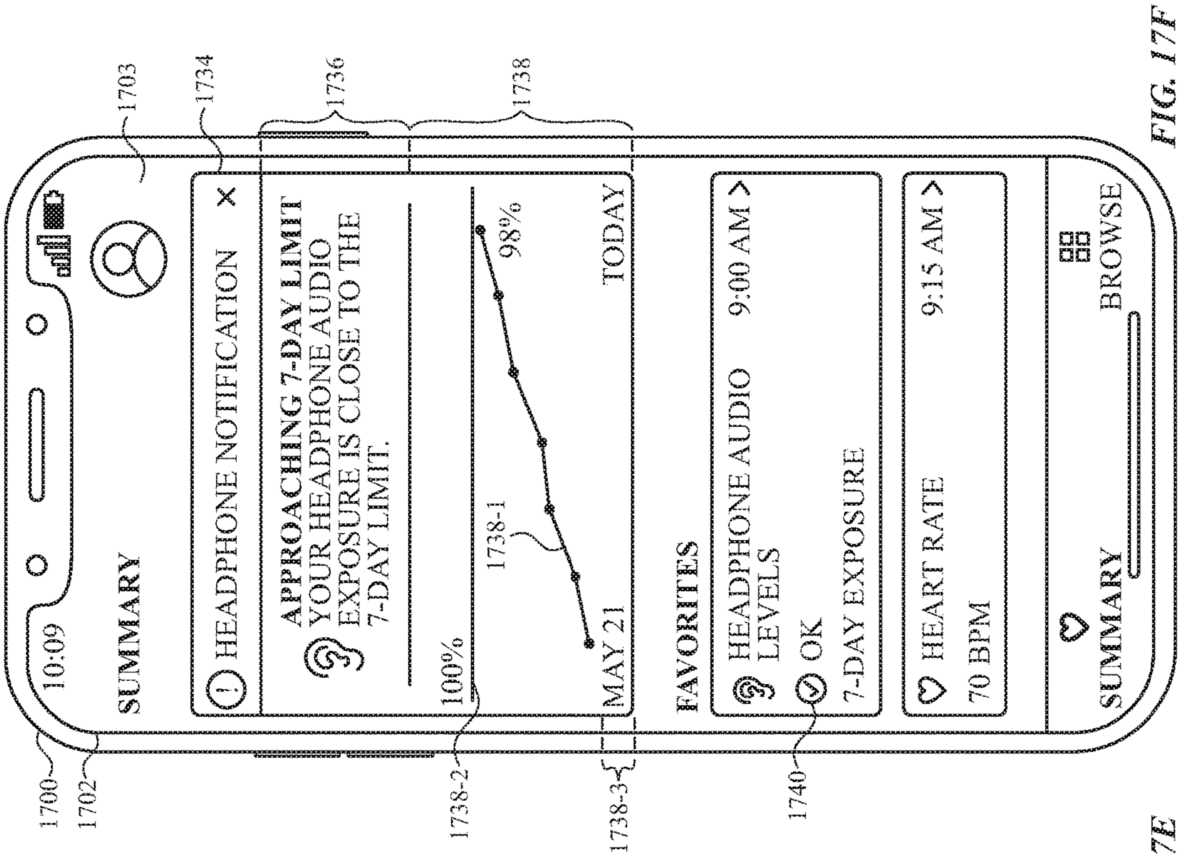
Figure 17E:
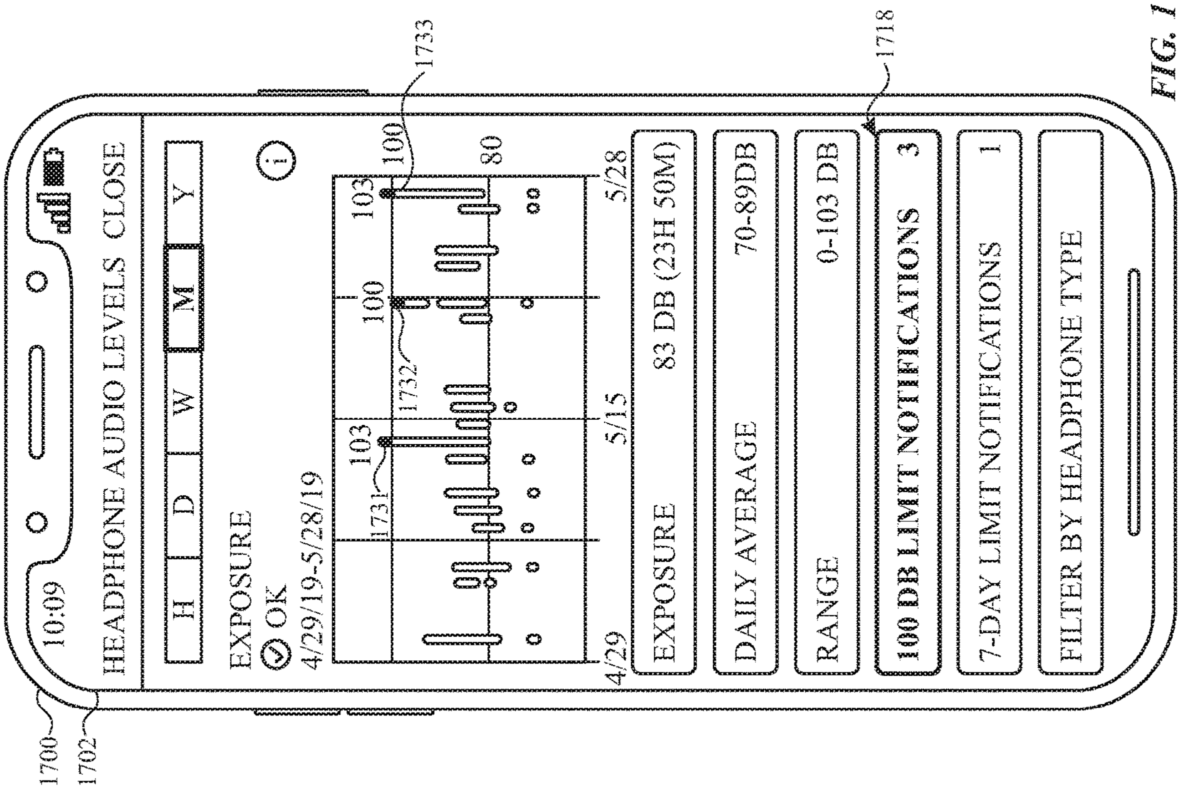
Figure 17G:
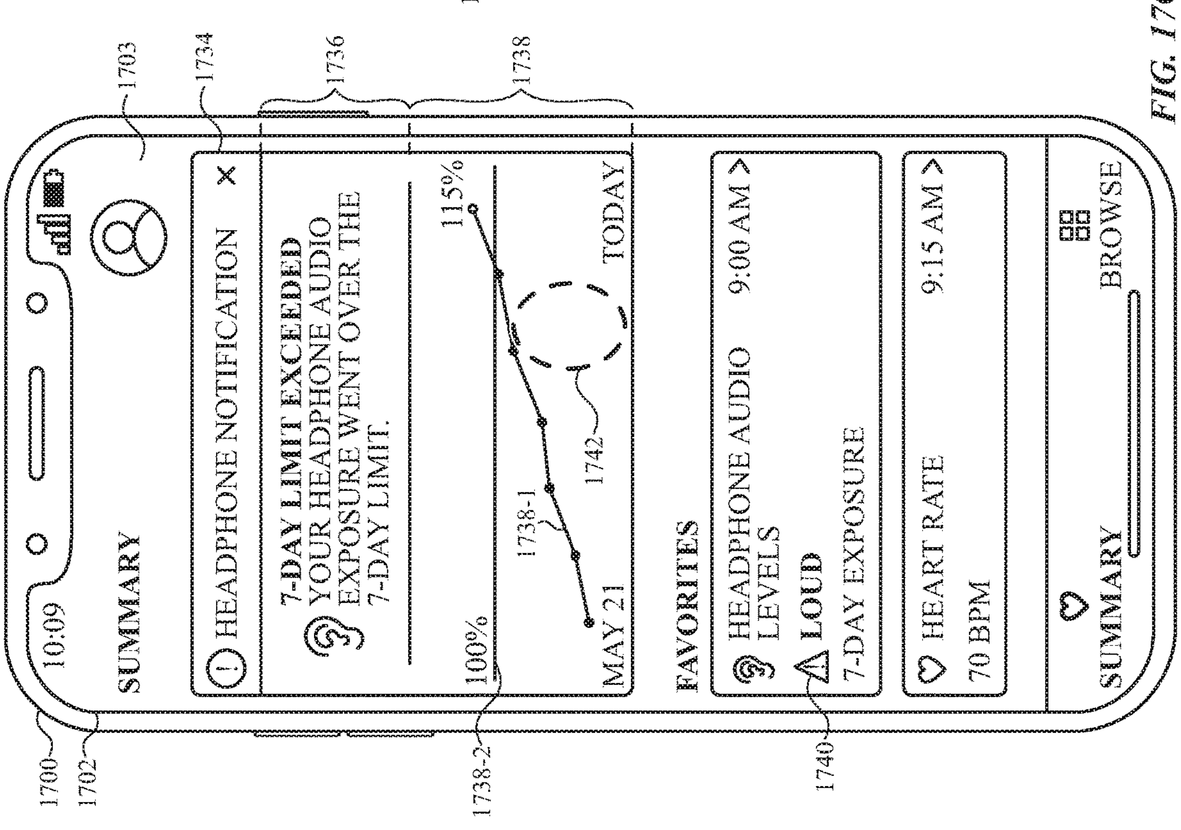
Figure 17H:
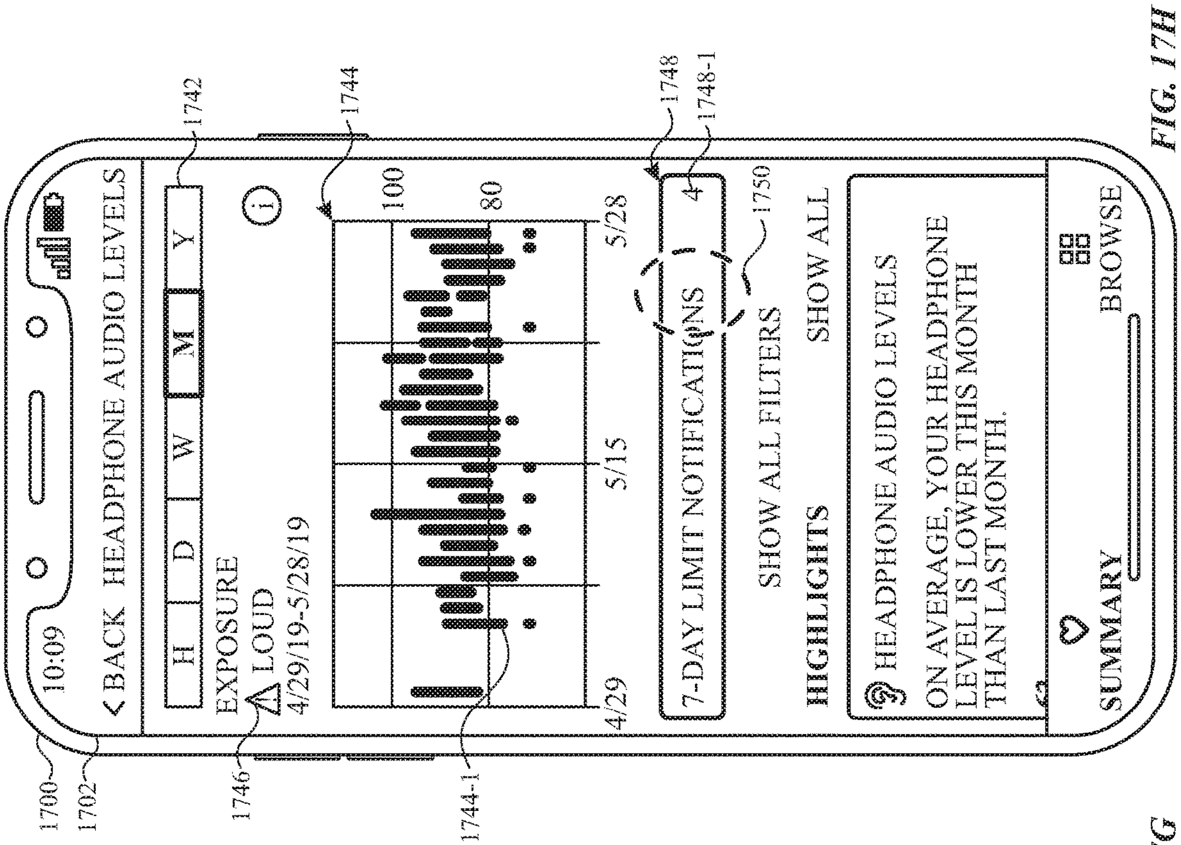
Figure 17I:
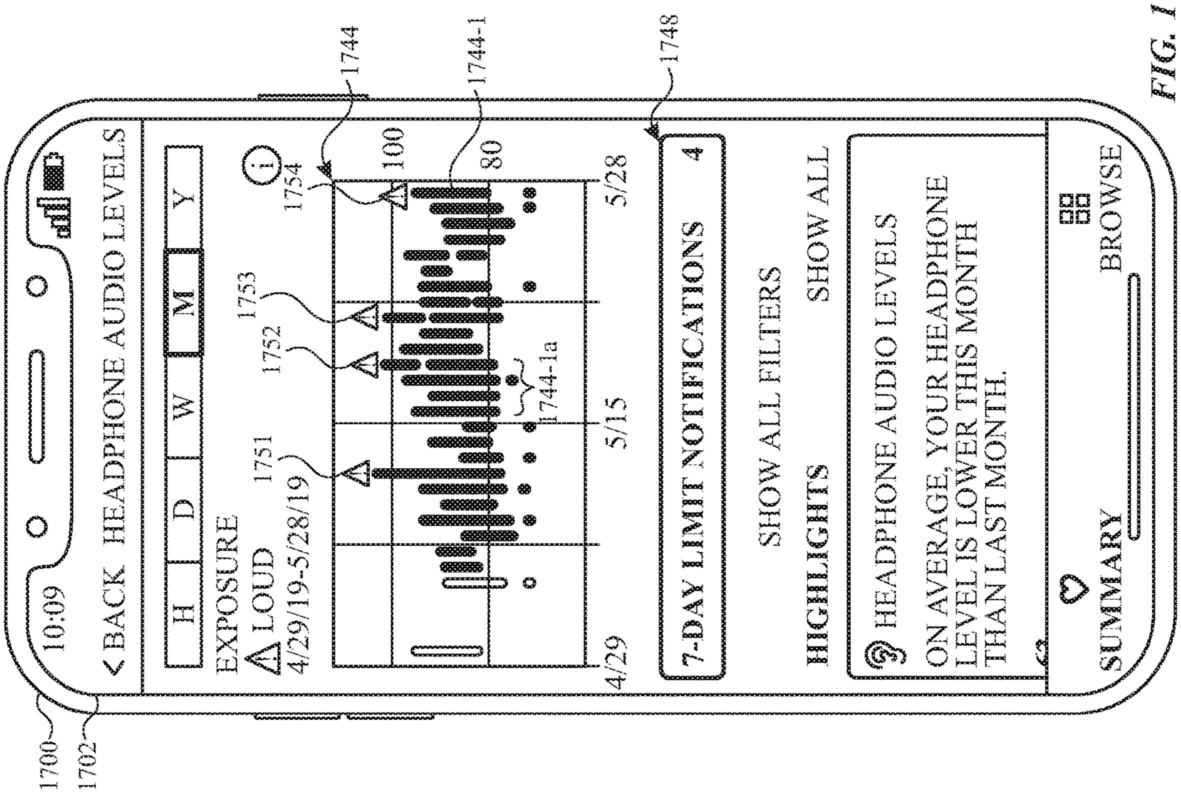
Figure 17J:
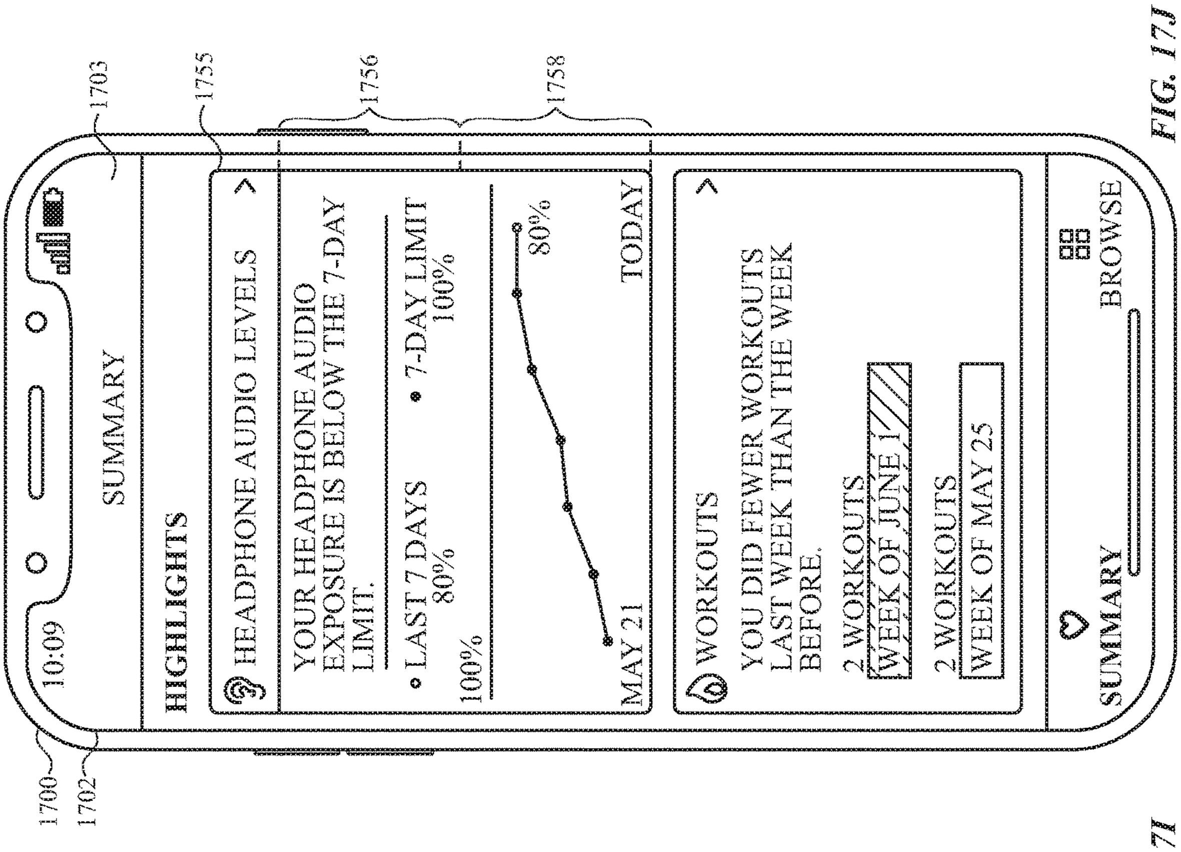
Figure 17L:
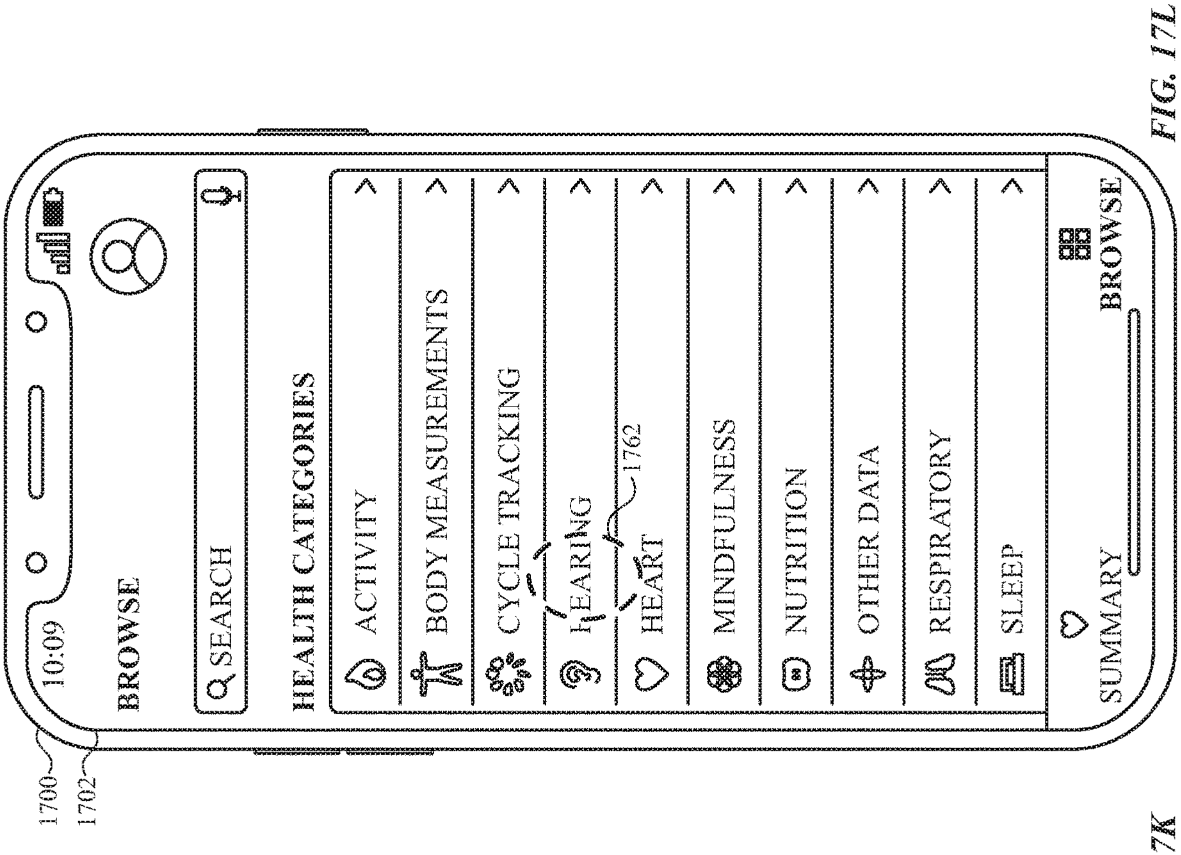
Figure 17K:
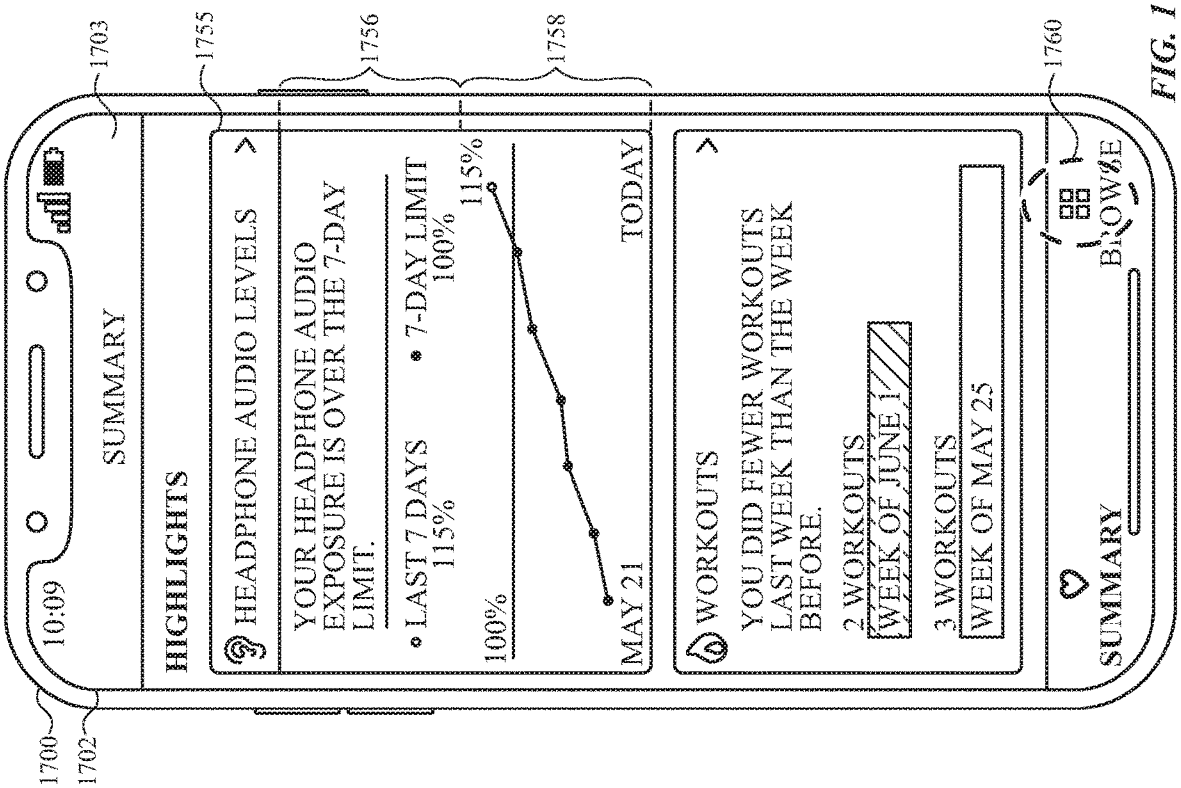
Figure 17N:
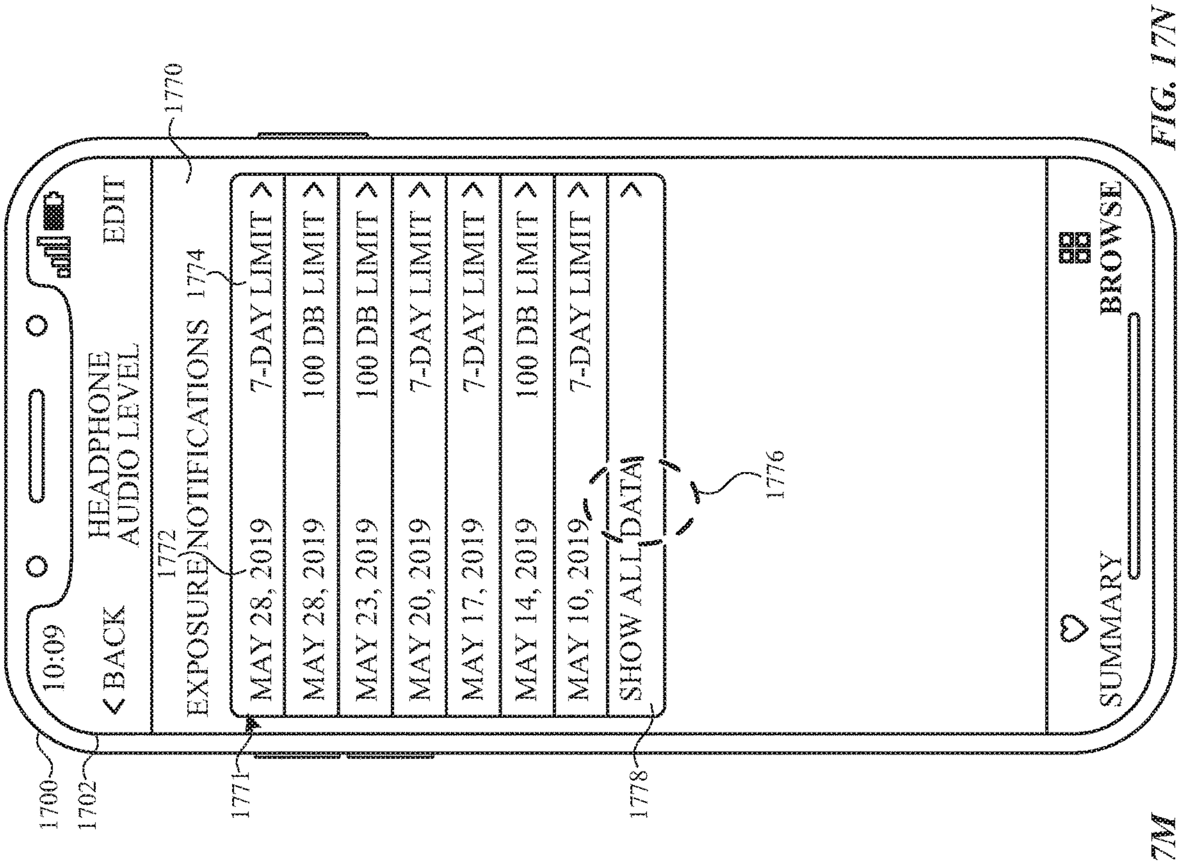
Figure 17M:
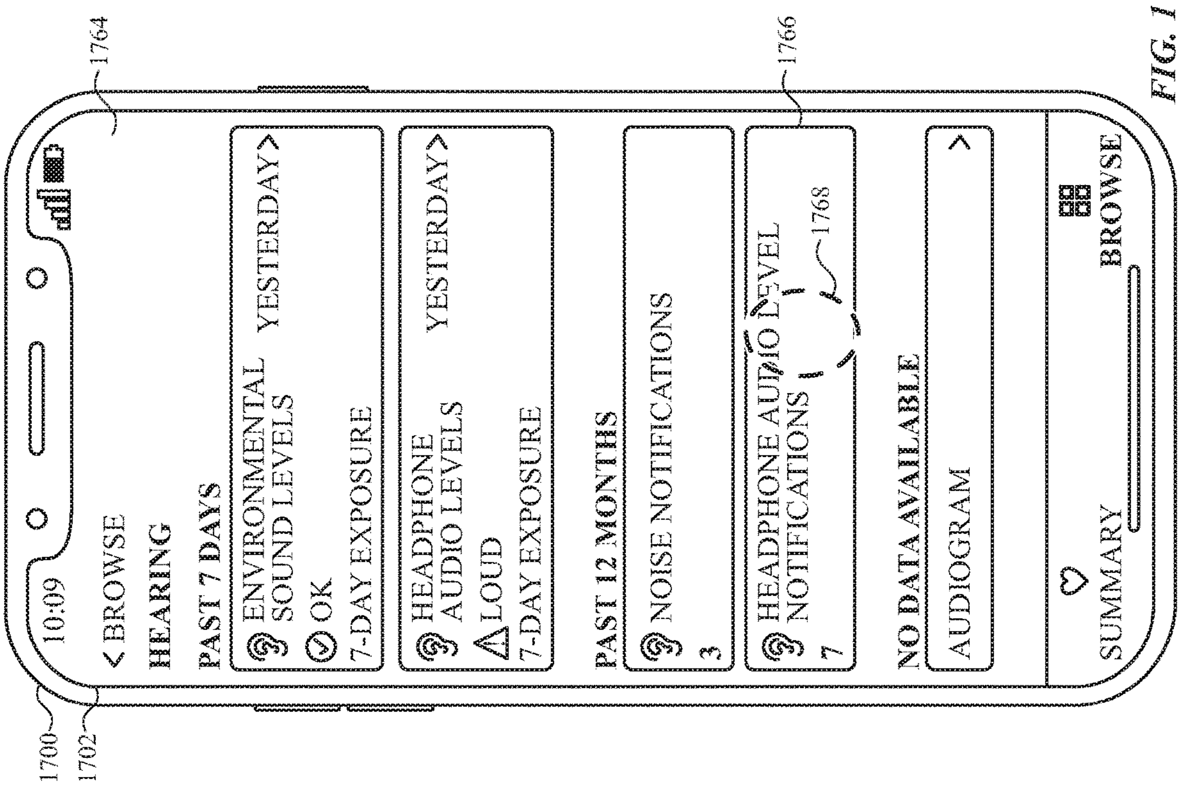
Figure 17P:
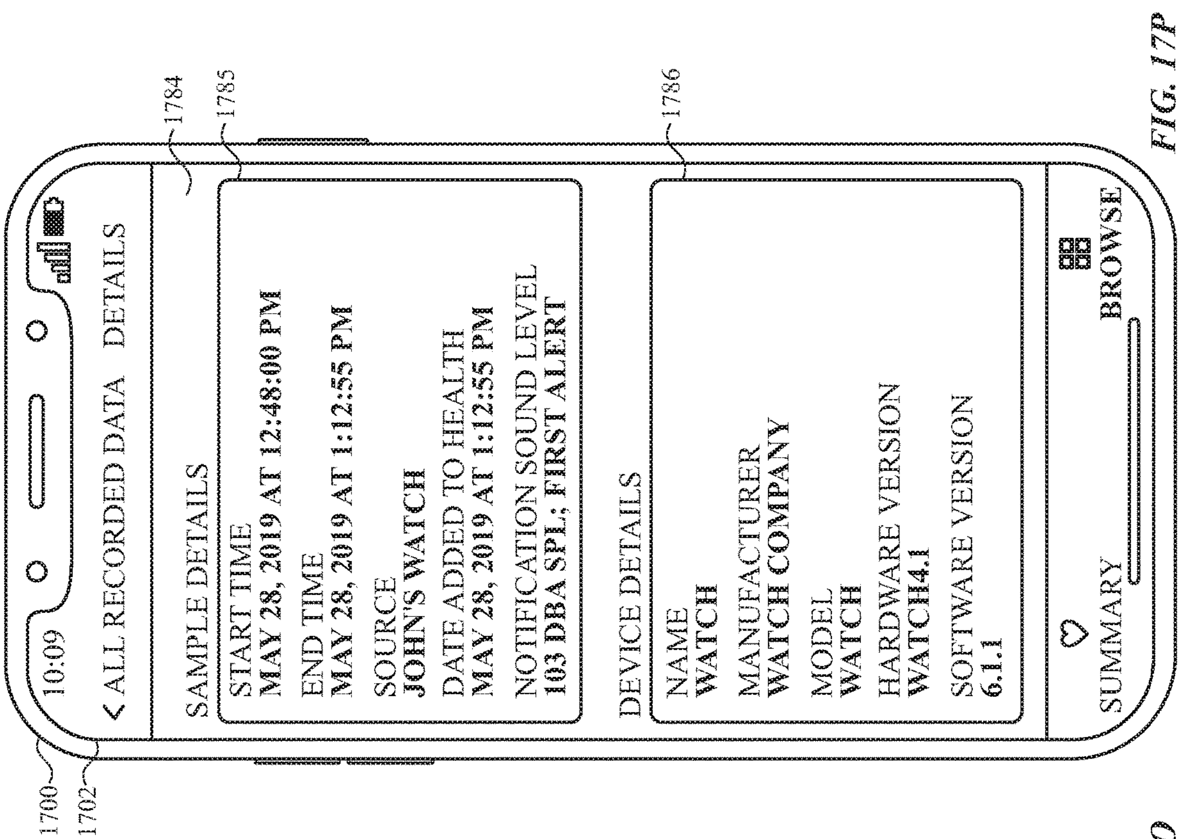
Figure 17O:
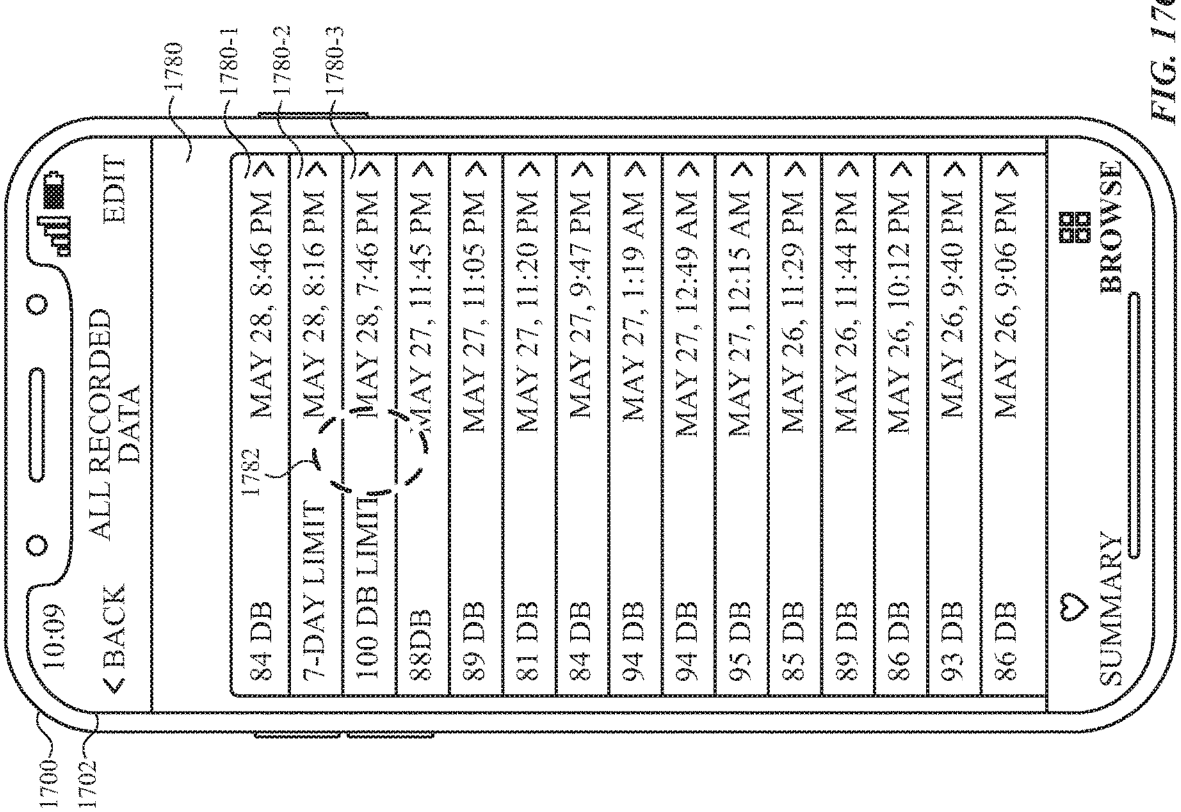
Figure 17Q:
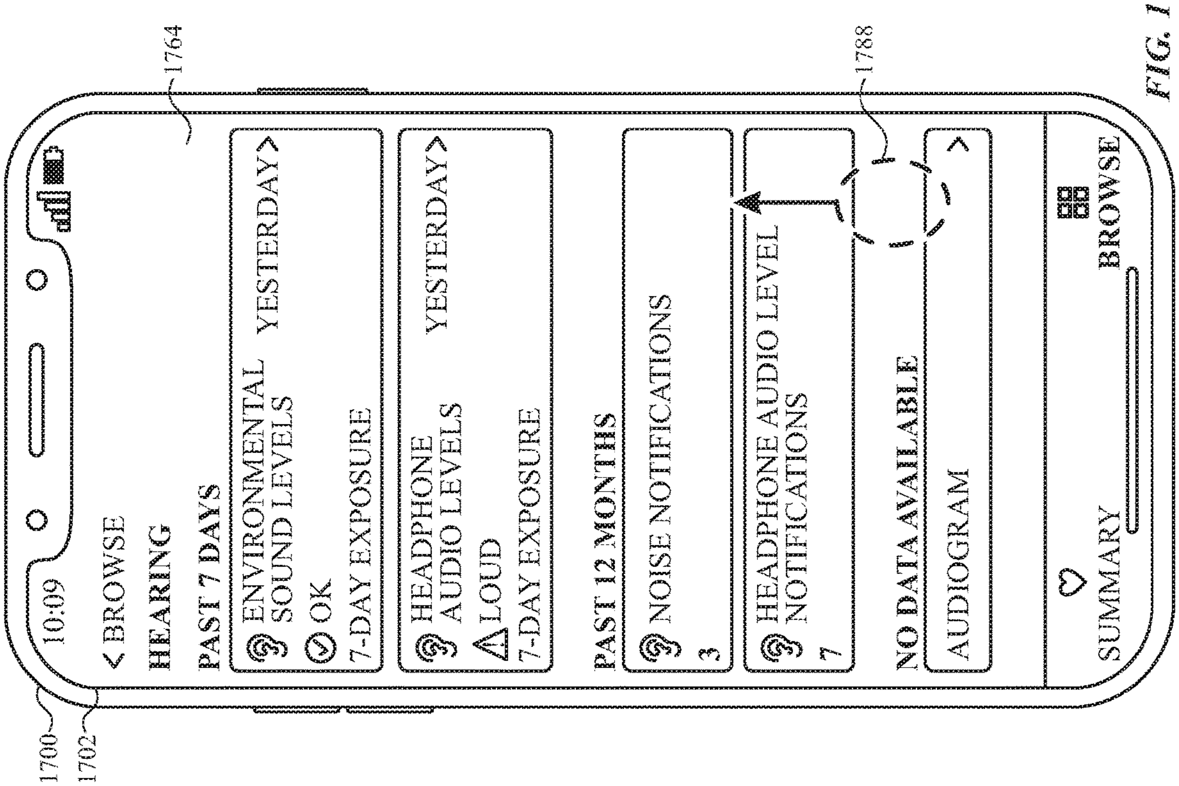
Figure 17R:
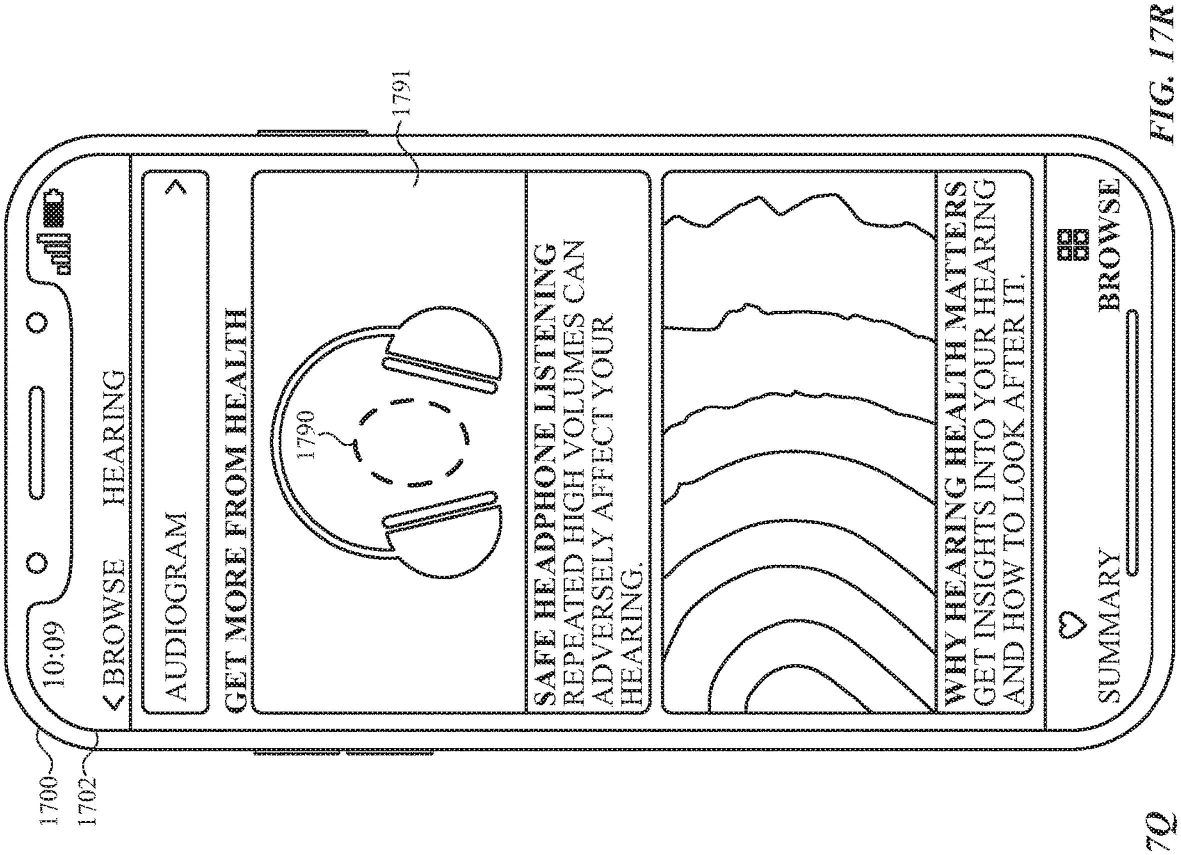
Figure 17T:
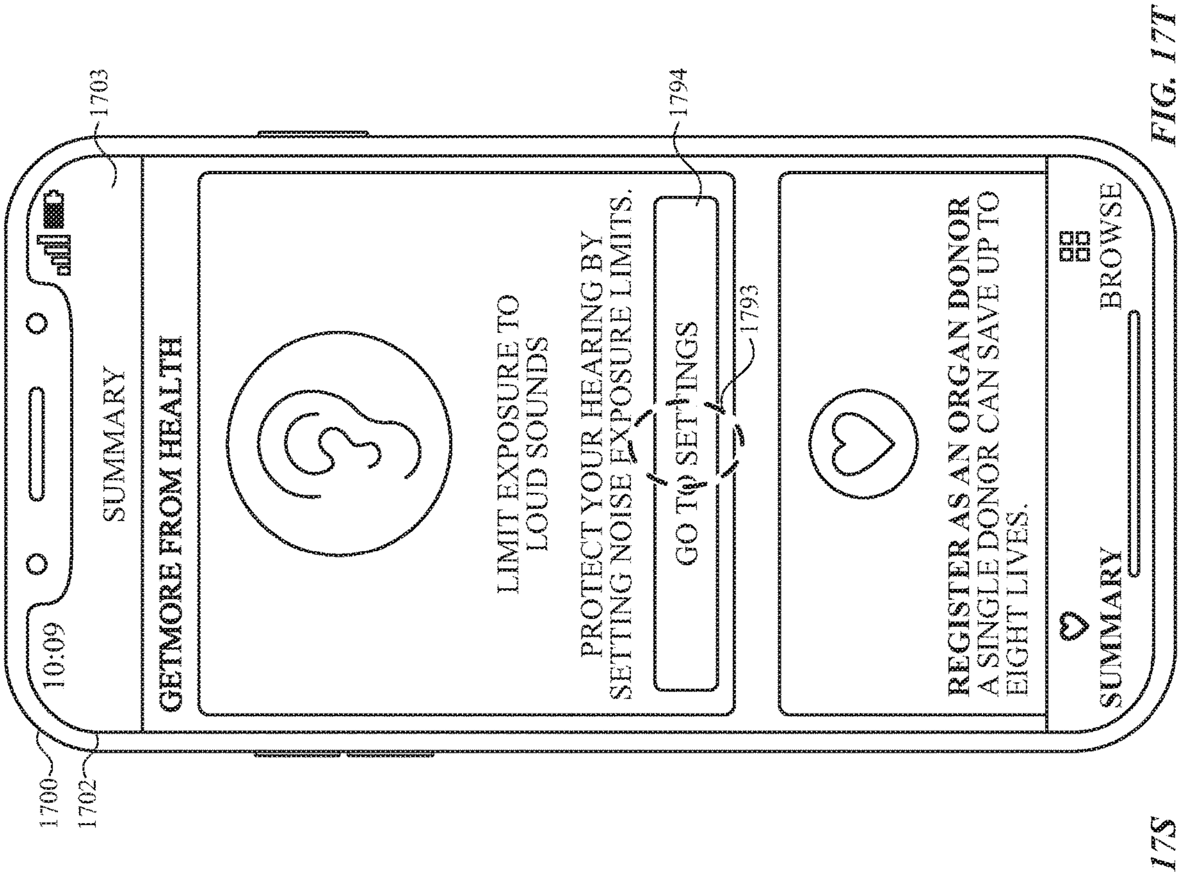
Figure 17S:
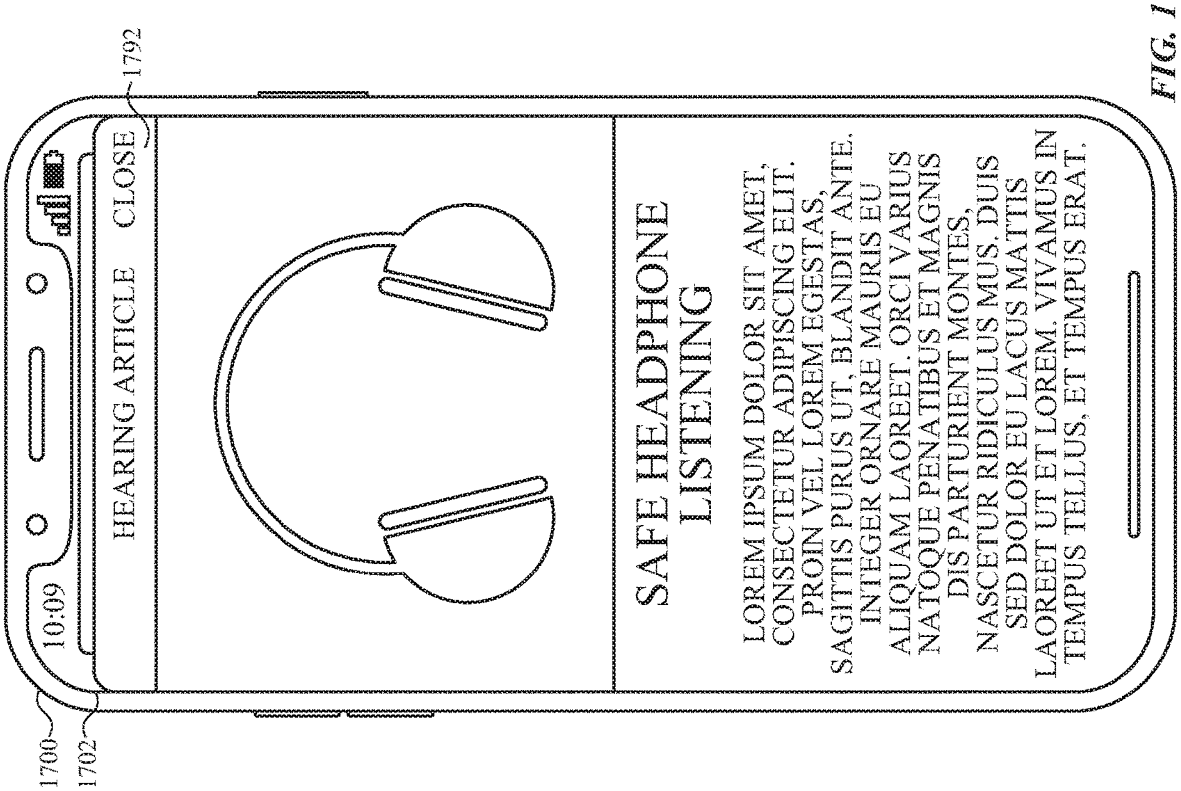
Figure 17V:
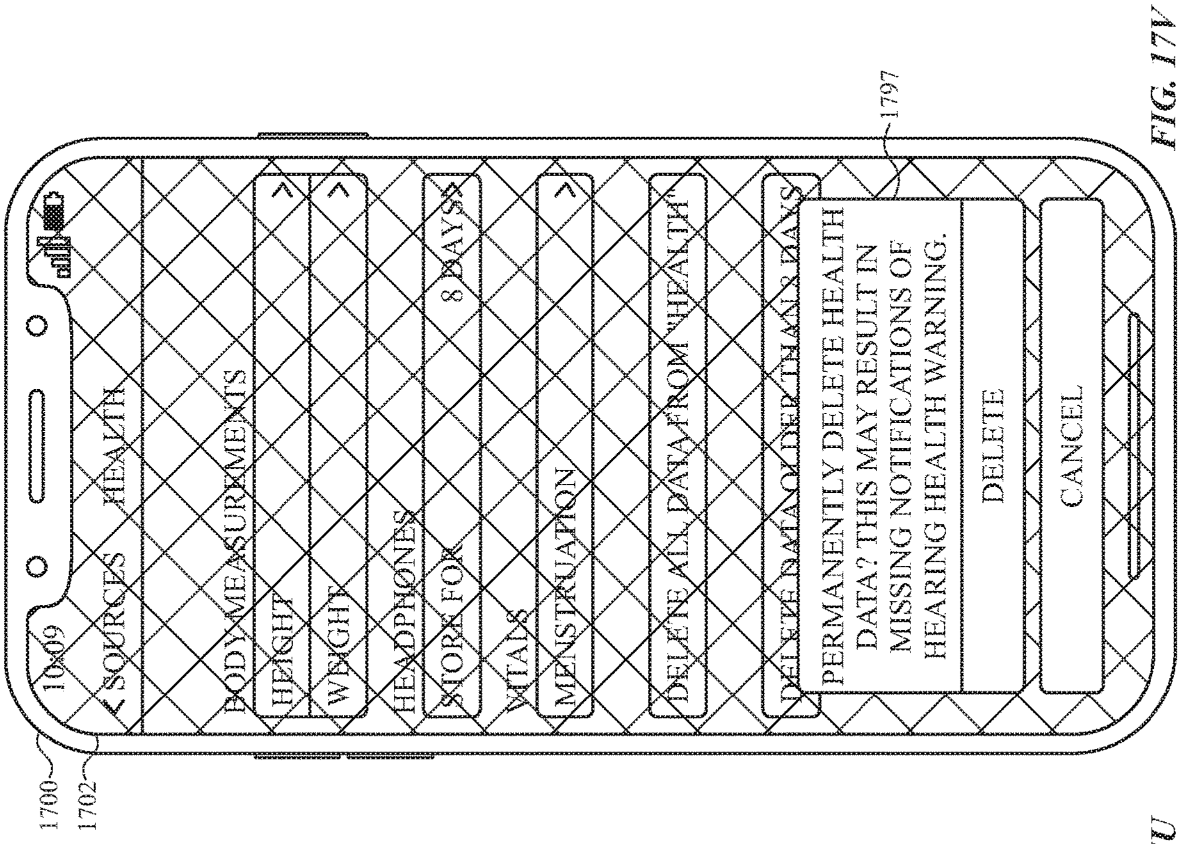

FIGS. 17A-17V illustrate exemplary user interfaces for managing audio exposure data, in accordance with some embodiments. The user interfaces in these figures are used to illustrate the processes described below, including the processes in FIG. 18.

FIGS. 17A-17V illustrate device 1700 displaying user interfaces on display 1702 for accessing and displaying audio exposure data (e.g., sets of data representing a device user's exposure to audio at various sound intensities (e.g., volumes)). In some embodiments, device 1700 is the same as device 601, device 800, device 900, device 1100, device 1200, and device 1400. In some embodiments, device 1700 includes one or more features of devices 100, 300, or 500.

In some embodiments, audio exposure data is recorded at device 1700 based on detected output volume of audio that is output at device 1700 (e.g., output to a headphones device) or a headphones device (e.g., headphones 1405 as described above) that is in communication with (e.g., playing audio from) device 1700 or an external device (e.g., device 1401 as described above). In some embodiments, audio exposure data is recorded at device 1700 based on ambient sound detected by a sensor such as a microphone (e.g., microphone 1406). In some embodiments, audio exposure data is noise level data, such as that discussed above with respect to FIGS. 6A-6AL, 7A-7B, 8A-8L, 9A-9G, and 10. For the sake of brevity, details of such disclosure are not repeated below.

FIGS. 17A-17E illustrate exemplary user interfaces within a health application for accessing and displaying audio exposure data after an instantaneous audio exposure limit is reached and a corresponding alert (e.g., instantaneous audio exposure alert 1416) has been generated by device 1700.

In FIG. 17A, device 1700 displays, on display 1702, summary interface 1702, which, in some embodiments, includes headphone notification 1704. Headphone notification 1704 includes audio exposure graph 1708 and audio status text 1706 indicating a status of the audio exposure data shown in audio exposure graph 1708. In the current embodiment, audio status text 1706 indicates that the audio exposure data exceeded an instantaneous audio exposure limit of 100 dB. Audio exposure graph 1708 includes recent audio exposure data 1708-1 (e.g., amplitudes or levels of audio a user associated with device 1700 has been exposed to), including first portion 1708-1*a* representing at least a 30-second duration of audio exposure data that exceeded 100 dB, thereby triggering an instantaneous audio exposure alert (e.g., 1416), and second portion 1708-1*b* representing audio exposure data that did not trigger the instantaneous audio exposure alert. Audio exposure graph 1708 also includes instantaneous audio exposure limit indicator 1708-2, and time 1708-3 (e.g., a start time and stop time) indicating a period during which the audio exposure data was recorded. Instantaneous audio exposure limit indicator 1708-2 includes a textual description of the limit (e.g., "100 DB") and a threshold shown relative to recent audio exposure data 1708-1. The embodiment illustrated in FIG. 17A shows that the instantaneous audio exposure limit was reached because the audio data exceeded the 100 dB threshold for a period of 30 seconds. However, in some embodiments the limit can be reached, and the corresponding instantaneous audio exposure alert generated, the moment the audio data exceeds the 100 dB threshold—that is, without requiring the threshold to be exceeded for 30 seconds.

Audio exposure graph 1708 provides a simple illustration of the audio exposure data to indicate the audio conditions that triggered the instantaneous audio exposure alert. In the embodiment shown in FIG. 17A, the instantaneous audio exposure limit is 100 dB (as represented by indicator 1708-2 and text 1706), and audio exposure data 1708-1 was recorded between 11:45 AM and 12:00 PM. First portion 1708-1*a* of the audio exposure data is shown exceeding the 100 dB threshold of instantaneous audio exposure limit indicator 1708-2 (thereby triggering the alert), whereas second portion 1708-1*b* is shown positioned below the 100 dB threshold (not triggering the alert). To further illustrate that first portion 1708-1*a* exceeds the threshold, first portion 1708-1*a* is shown visually distinguished from second portion 1708-1*b* by displaying first portion 1708-1*a* in solid black color, whereas second portion 1708-1*b* is shown in hatched shading.

As shown in FIG. 17A, device 1700 detects input 1710 (e.g., a tap input) on headphone notification 1704 and, in response, displays audio exposure interface 1712, shown in FIG. 17B.

FIG. 17B shows audio exposure interface 1712, which includes graph 1714, exposure indicator 1716, instantaneous filter option 1718, and duration selector 1720. Graph 1714 illustrates headphone audio exposure data 1714-1 over a selectable period of time (e.g., hour, day, week, month, year). As shown in FIG. 17B, audio exposure data 1714-1 indicates the volume (represented as a range of decibels) of audio output at a headphones device (e.g., headphones device 1405) from 11 AM to 12 PM. The period of time can be changed, and the corresponding data in audio exposure interface 1712 updated, by selecting one of the duration options in duration selector 1720.

Exposure indicator 1716 indicates whether the aggregate of the audio exposure data in graph 1714 is safe (e.g., not accumulating loud audio), loud (e.g., accumulating loud audio, but currently not too loud), or hazardous (e.g., too loud). In some embodiments, indicator 1716 is shown with a green checkmark when the exposure level is safe, with a yellow warning sign when the exposure level is loud, and with a red warning sign when the exposure level is hazardous.

Instantaneous filter option 1718 is associated with an instantaneous audio exposure threshold of 100 dB, and is selectable to modify the appearance of audio exposure data 1714-1 in order to highlight instances in which a notification or alert was generated in response to the audio exposure data exceeding the 100 dB threshold. Instantaneous filter option 1718 includes notification count 1718-1, indicating that one instantaneous audio exposure notification was generated based on audio exposure data 1714-1. In some embodiments, audio exposure interface 1712 includes various filter options that are shown when the displayed audio exposure data includes data corresponding to the various filter options. Conversely, these various filter options are not shown when they do not apply to the displayed audio exposure data. For example, if no instantaneous audio exposure alerts were generated for audio exposure data 1714-1, instantaneous filter option 1718 would not be displayed.

As shown in FIG. 17B, device 1700 detects input 1722 (e.g., a tap input) on instantaneous filter option 1718 and, in response, selects (e.g., bolds) instantaneous filter option 1718 and modifies the appearance of audio exposure data 1714-1 to introduce data point 1724, as shown in FIG. 17C. Data point 1724 indicates an instance in which device 1700 generated an instantaneous audio exposure alert (e.g., 1416) in response to the volume of the output audio (represented by audio exposure data 1714-1) exceeding the 100 dB threshold. Data point 1724 shows that the alert was generated when the output volume represented by audio exposure data 1714-1 was 103 dB at approximately 11:53 AM.

As shown in FIG. 17C, device 1700 detects input 1726 (e.g., a tap input) on month tab 1720-1 of duration selector 1720 and, in response, updates audio exposure interface 1712 to include audio exposure data 1714-2 generated for a one-month window from Apr. 29, 2019 to May 28, 2019, as shown in FIG. 17D. Updated audio exposure interface 1712 also includes instantaneous filter option 1718 and aggregate filter option 1728, because audio exposure data 1714-2 includes data that corresponds to the respective filter options. Specifically, audio exposure data 1714-2 includes audio exposure data that triggered three instantaneous audio exposure alerts (by exceeding the 100 dB instantaneous audio exposure threshold three times). Accordingly, instantaneous filter option 1718 is shown with notification count 1718-1 having a value of three. Similarly, audio exposure data 1714-2 includes audio exposure data that triggered one aggregate audio exposure alert (e.g., 1418) (by exceeding the seven-day aggregate exposure threshold once). Accordingly, aggregate filter option 1728 is shown with notification count 1728-1 having a value of one.

As shown in FIG. 17D, device 1700 detects input 1730 (e.g., a tap input) on instantaneous filter option 1718 and, in response selects instantaneous filter option 1718 and modifies the appearance of audio exposure data 1714-2 to introduce data points 1731-1733, as shown in FIG. 17E. Similar to data point 1724, data points 1731-1733 indicate instances in which device 1700 generated an instantaneous audio exposure alert in response to the volume of the output audio (represented by audio exposure data 1714-2) exceeding the 100 dB threshold. Data point 1731 shows that an alert was generated when output volume represented by audio exposure data 1714-2 was 103 dB on approximately May 13, 2019. Data point 1732 shows that an alert was generated when output volume represented by audio exposure data 1714-2 was 100 dB on approximately May 21, 2019. Data point 1733 shows that an alert was generated when output volume represented by audio exposure data 1714-2 was 103 dB on approximately May 27, 2019.

As discussed in greater detail below, aggregate filter option 1728 can be selected to update audio exposure data 1714-2 with an indication of when audio exposure data 1714-2 exceeded the aggregate audio exposure limit and a corresponding aggregate audio exposure alert was generated.

FIGS. 17F-17I illustrate exemplary user interfaces within a health application for accessing and displaying audio exposure data (e.g., audio exposure from using headphones device 1405) after an aggregate audio exposure limit is reached and a corresponding alert (e.g., aggregate audio exposure alert 1418) has been generated by device 1700.

In FIG. 17F, device 1700 displays, on display 1702, summary interface 1702, which, in some embodiments, includes headphone notification 1734. Headphone notification 1734 includes aggregate audio exposure graph 1738 and audio status text 1736.

Audio status text 1736 indicates a status of aggregate audio exposure for the user represented by aggregate audio exposure graph 1738. In the current embodiment, audio status text 1736 indicates that an aggregate of the user's audio exposure is approaching an aggregate audio exposure limit for a seven-day period.

Audio exposure graph 1738 represents an aggregate of recent audio exposure (e.g., measured from recent audio exposure data) over a current seven-day period (e.g., a rolling seven day window). Audio exposure graph 1738 includes aggregate audio exposure measurement 1738-1, aggregate audio exposure threshold 1738-2, and date range 1738-3 indicating the seven-day period during which the aggregate of the audio exposure data is measured. Aggregate audio exposure measurement 1738-1 is shown relative to aggregate audio exposure threshold 1738-2. Audio exposure graph 1738 provides a simple illustration of the aggregate audio exposure measured over the seven-day period, relative to the aggregate audio exposure limit.

In some embodiments, aggregate audio exposure measurement 1738-1 is calculated over a rolling seven-day period. As the user is exposed to headphone audio (e.g., the user is listening to audio using headphones) over the seven-day period, the measured aggregate audio exposure fluctuates based on the amount of audio exposure being added in the frontend of the rolling-seven day window (e.g., audio exposure measured today), and the amount of audio exposure dropping off the backend of the rolling window (e.g., audio exposure measured May 21). In some embodiments, the rolling seven-day window is measured in fifteen-minute increments. In some embodiments, the aggregate audio exposure measurement 1738-1 calculates exposure from audio produced at headphones (e.g., across all sets of headphone devices that are used with device 1700). Accordingly, the aggregate audio exposure does not factor in audio exposure from a non-headphone audio device such as, for example, an external speaker.

Aggregate audio exposure threshold 1738-2 represents a threshold amount of aggregated audio exposure measured over a seven-day window that is not harmful to a user's hearing (e.g., the user's auditory system). In some embodiments, aggregate audio exposure threshold 1738-2 is determined for the rolling seven-day window based on a combination of two primary factors: the volume of the audio a user is listening to using headphones (represented herein as the audio exposure data (e.g., audio exposure data 1744-1, discussed below)), and the duration for which the user is exposed to the audio. Accordingly, the louder the volume of the audio played at the headphones, the shorter the amount of time the user can be exposed to the audio without damaging their hearing. Similarly, the longer a user is exposed to headphone audio, the lower the volume at which the user can safely listen to the audio without damaging their hearing. For example, over a seven-day period, a user can safely listen to audio at 75 dB for a total of 127 hours. As another example, over a seven-day period, a user can safely listen to audio at 90 dB for a total of 4 hours. As yet another example, over a seven-day period, a user can safely listen to audio at 100 dB for a total of 24 minutes. As yet another example, over a seven-day period, a user can safely listen to audio at 110 dB for a total of 2 minutes.

The state of the user's aggregate audio exposure relative to this threshold is represented by aggregate audio exposure graph 1738. In the embodiment shown in FIG. 17F, the aggregate audio exposure measurement 1738-1 is currently at 98% of the audio exposure limit for the seven-day period. Accordingly, the aggregate amount of audio volume the user has been exposed to over the seven-day window is approaching aggregate audio exposure threshold 1738-2, but has not exceeded the threshold, as indicated by aggregate audio exposure graph 1738 and audio status text 1736. Additionally, summary interface 1702 includes status indicator 1740 indicating the current aggregate audio exposure for the seven-day period is safe.

Referring now to FIG. 17G, device 1700 shows summary interface 1703 for an embodiment similar to that shown in FIG. 17F, but with the aggregate audio exposure measurement 1738-1 at 115% of the audio exposure limit for the seven-day period. Accordingly, the aggregate amount of audio volume the user has been exposed to over the seven-day window has exceeded aggregate audio exposure threshold 1738-2, as indicated by aggregate audio exposure graph 1738 and audio status text 1736. Additionally, summary interface 1702 includes status indicator 1740 indicating the current aggregate audio exposure for the seven-day period is loud.

As shown in FIG. 17G, device 1700 detects input 1740 (e.g., a tap input) on headphone notification 1734 and, in response, displays audio exposure interface 1742, shown in FIG. 17H.

Audio exposure interface 1742 is similar to audio exposure interface 1712 shown in FIG. 17B, but instead showing audio exposure data corresponding to the conditions represented by FIG. 17G. In the embodiment illustrated in FIG. 17H, audio exposure interface 1742 includes graph 1744 (similar to graph 1714), exposure indicator 1746 (similar to indicator 1716), and aggregate filter option 1748 (similar to aggregate filter option 1728).

Graph 1744 illustrates headphone audio exposure data 1744-1 over a selectable period of time. In FIG. 17H, audio exposure data 1744-1 indicates the volume (represented as a range of decibels) of audio output at a headphones device (e.g., headphones device 1405) over a one-month period from Apr. 29, 2019 to May 28, 2019. Audio exposure indicator 1746 indicates the aggregate audio exposure for the one-month period is loud.

Audio exposure data 1744-1 includes audio exposure data that triggered four aggregate audio exposure alerts (e.g., 1418) by exceeding the seven-day aggregate exposure threshold four times from Apr. 29, 2019 to May 28, 2019. Accordingly, aggregate filter option 1748 is shown with notification count 1748-1 having a value of four.

As shown in FIG. 17H, device 1700 detects input 1750 (e.g., a tap input) on aggregate filter option 1748 and, in response selects aggregate filter option 1748 and modifies the appearance of audio exposure data 1744-1 to introduce alert indicators 1751-1754 and highlight audio exposure data that triggered an aggregate audio exposure alert, as shown in FIG. 17I. Alert indicators 1751-1754 indicate instances in which device 1700 generated an aggregate audio exposure alert in response to the aggregate volume of the output audio (represented by audio exposure data 1744-1) exceeding the seven-day aggregate audio exposure threshold. Audio exposure data that triggered an aggregate audio exposure alert is shown visually distinguished in solid black color, whereas audio exposure data that did not trigger an aggregate audio exposure alert is shown without solid black color.

Alert indicator 1751 indicates that an aggregate audio exposure alert was generated on approximately May 12, 2019, based on an aggregate of the audio exposure data from that date, and the previous six days, exceeding the aggregate audio exposure threshold. Alert indicator 1752 indicates that an aggregate audio exposure alert was generated on approximately May 19, 2019, based on an aggregate of the audio exposure data from that date, and the previous six days, exceeding the aggregate audio exposure threshold. Alert indicator 1753 indicates that an aggregate audio exposure alert was generated on approximately May 22, 2019, based on an aggregate of the audio exposure data from that date, and the previous six days, exceeding the aggregate audio exposure threshold. Alert indicator 1754 indicates that an aggregate audio exposure alert was generated on approximately May 28, 2019, based on an aggregate of the audio exposure data from that date, and the previous six days, exceeding the aggregate audio exposure threshold.

Because the aggregate audio exposure is measured over a rolling seven-day period, in some instances audio exposure data 1744-1 can include a subset of audio exposure data that triggers more than one aggregate audio exposure alert. For example, subset **1744-1*a* is a subset of the audio exposure data that triggered an aggregate audio exposure alert represented by alert indicator 1752. Subset 1744-1*a* is also a subset of the audio exposure data that triggered an aggregate audio exposure alert represented by alert indicator 1753**.

FIGS. 17J-17V illustrate exemplary user interfaces for managing audio exposure data, including viewing audio exposure data details as shown in FIGS. 17J-17P.

In FIG. 17J, device 1700 displays, on display 1702, summary interface 1702 showing headphone audio exposure status 1755 (similar to headphone notification 1734). Headphone audio exposure status 1755 provides a snapshot illustration of the aggregate audio exposure for the current seven-day period. Headphone audio exposure status 1755 includes exposure status text 1756 (similar to audio status text 1736) and aggregate audio exposure graph 1758 (similar to audio exposure graph 1738). Aggregate audio exposure graph 1758 provides a graphical representation of the aggregate audio exposure for the previous seven-day period, and exposure status text 1756 provides a text description of the current status of the aggregate audio exposure relative to the aggregate audio exposure limit. In FIG. 17J, exposure status text 1756 and aggregate audio exposure graph 1758 show that the aggregate audio exposure for the current seven-day period is 80% of the aggregate audio exposure limit.

FIG. 17K shows an embodiment similar to that shown in FIG. 17J, except that the exposure status text 1756 and aggregate audio exposure graph 1758 show that the aggregate audio exposure for the current seven-day period is 115% of the aggregate audio exposure limit. In some embodiments, when the aggregate audio exposure exceeds the threshold by a multiplication factor (e.g., two-times the limit, three-times the limit), headphone audio exposure status 1755 includes an indication of the multiplied amount at which the aggregate audio exposure exceeds the limit. For example, exposure status text 1756 can indicate the seven-day aggregate of audio exposure is 200% or "2×."

As shown in FIGS. 17K and 17L, device 1700 detects inputs 1760 and 1762 (e.g., tap inputs) and, in response, displays hearing interface 1764, as shown in FIG. 17M. Hearing interface 1764 includes various options for accessing audio data. For example, as shown in FIG. 17M, hearing interface 1764 includes notification option 1766, which represents an option for viewing a list of audio exposure alerts that were generated in the past twelve months. Notification option 1766 indicates seven audio exposure alerts were generated in the past year.

As shown in FIG. 17M, device 1700 detects input 1768 (e.g., a tap input) on notification option 1766 and, in response, displays alert listing 1770 as shown in FIG. 17N. Alert listing 1770 is a list of items 1771 representing the alerts device 1700 generated during the past twelve months. Each item 1771 includes date 1772 indicating when the respective alert was generated and alert type 1774 indicating whether the respective alert was an instantaneous audio exposure alert (e.g., a 100 dB limit alert) or an aggregate audio exposure alert (e.g., a seven-day aggregate limit alert).

As shown in FIG. 17N, device 1700 detects input 1776 (e.g., a tap input) on all data affordance 1778 and, in response, displays sound data interface 1780, as shown in FIG. 17O. Sound data interface 1780 includes a listing of recorded sound levels and alerts, and a timestamp for the respective item. For example, item 1780-1 represents an 84 dB sound recorded at 8:46 PM on May 28$^{th}$. Item 1780-2 represents a seven-day aggregate limit alert generated at 8:16 PM on May 28th. Item 1780-3 represents a 100 dB limit alert generated at 7:46 PM on May 28$^{th}$.

As shown in FIG. 17O, device 1700 detects input 1782 on item 1780-3 and, in response, displays audio details interface 1784, as shown in FIG. 17P. Audio details interface 1784 displays various details associated with the item selected from sound data interface 1780. For example, in the present embodiment, item 1780-3 corresponding to a 100 dB limit alert was selected from interface 1780. Accordingly, audio details interface 1784 includes audio sample details 1785 related to the alert, and device details 1786 related to the alert. Audio sample details 1785 include, for example, a start and stop time of the audio sample that triggered the alert, the source of the audio sample that triggered the alert, the date item 1780-3 was added to interface 1780, and details of the alert such as the notification sound level and an indication of whether this was the first, second, third, iteration of the respective alert. For example, if the alert was an aggregate exposure limit alert, audio sample details 1785 can indicate whether the respective alert was the alert generated at the first multiple of the aggregate audio exposure threshold (e.g., 1×), second multiple of the threshold (e.g., 2×), or third multiple of the threshold (e.g., 3×). Data interface 1780 also includes device details 1786 indicating details for the device that generated the alert.

FIGS. 17Q-17S illustrate exemplary user interfaces for accessing audio exposure literature.

As shown in FIG. 17Q, device 1700 detects input 1788 (e.g., a drag or swipe gesture) on hearing interface 1764 and, in response, displays selectable options in FIG. 17R for viewing literature on hearing health.

In FIG. 17R, device 1700 detects input 1790 (e.g., a tap input) selecting article option 1791 for safe headphone listening and, in response, displays safe headphone listening article 1792 in FIG. 17S.

Figure 17U:
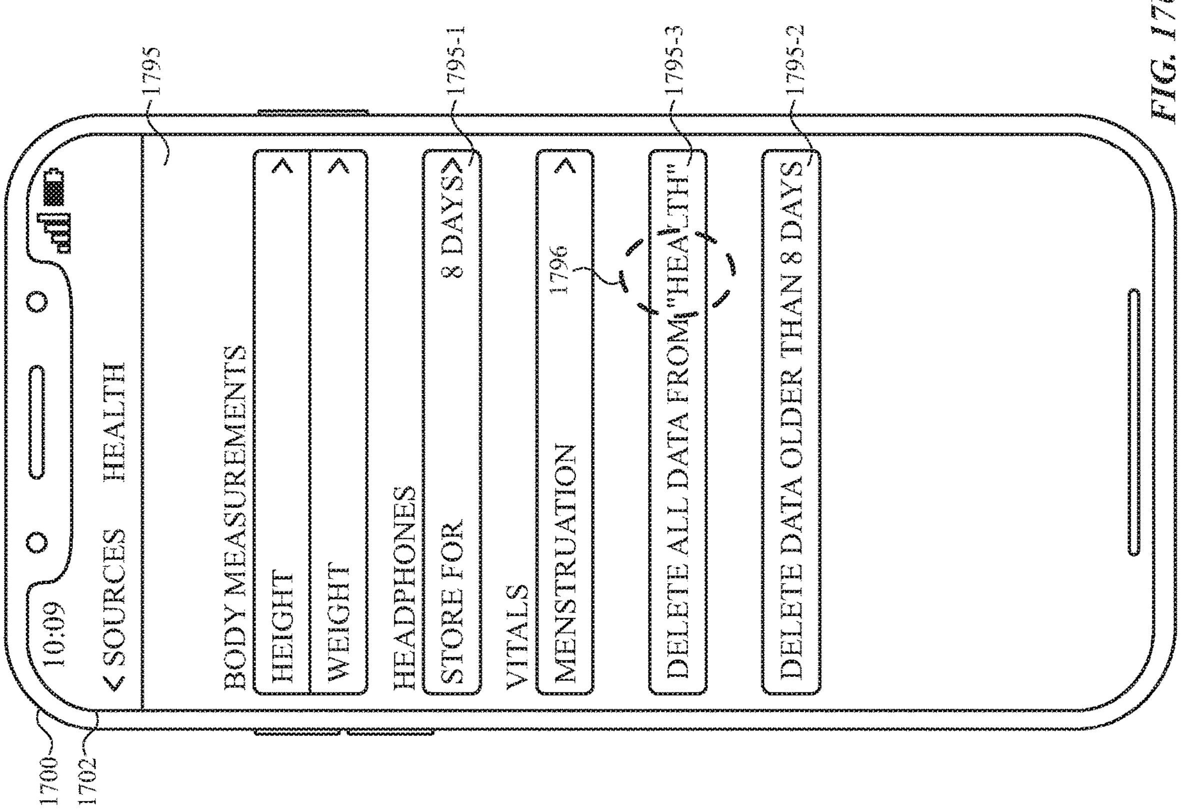

FIGS. 17T-17V illustrate exemplary user interfaces for deleting audio data.

In FIG. 17T, device 1700 detects input 1793 (e.g., a tap input) on settings option 1794 shown in summary interface 1702 and, in response, displays settings interface 1795 for managing audio exposure data storage settings as shown in FIG. 17U.

Settings interface 1795 includes option 1795-1, which can be selected to change a duration for storing headphone audio exposure data. As shown in FIG. 17U, the setting is currently configured to store the audio exposure data for eight days. However, this can be changed (by selecting option 1795-1) to choose a different duration such as, for example, a month or a year.

Settings interface 1795 also includes option 1795-2, which can be selected to delete audio exposure data older than eight days. Selecting this option preserves the current rolling seven-day window of audio exposure data, while deleting audio exposure data that is outside this window.

Settings interface 1795 also includes option 1795-3, which can be selected to delete all audio exposure data, including the audio exposure data within the current rolling seven-day window. As shown in FIG. 17U, device 1700 detects input 1796 (e.g., a tap input) on option 1795-3 and, in response, displays confirmation interface 1797 as shown in FIG. 17V. Confirmation interface 1797 include an option for confirming deletion of the audio exposure data and a warning that deleting the audio exposure data may result in the loss of previously generated (or anticipated) alert notifications.

Figure 18:
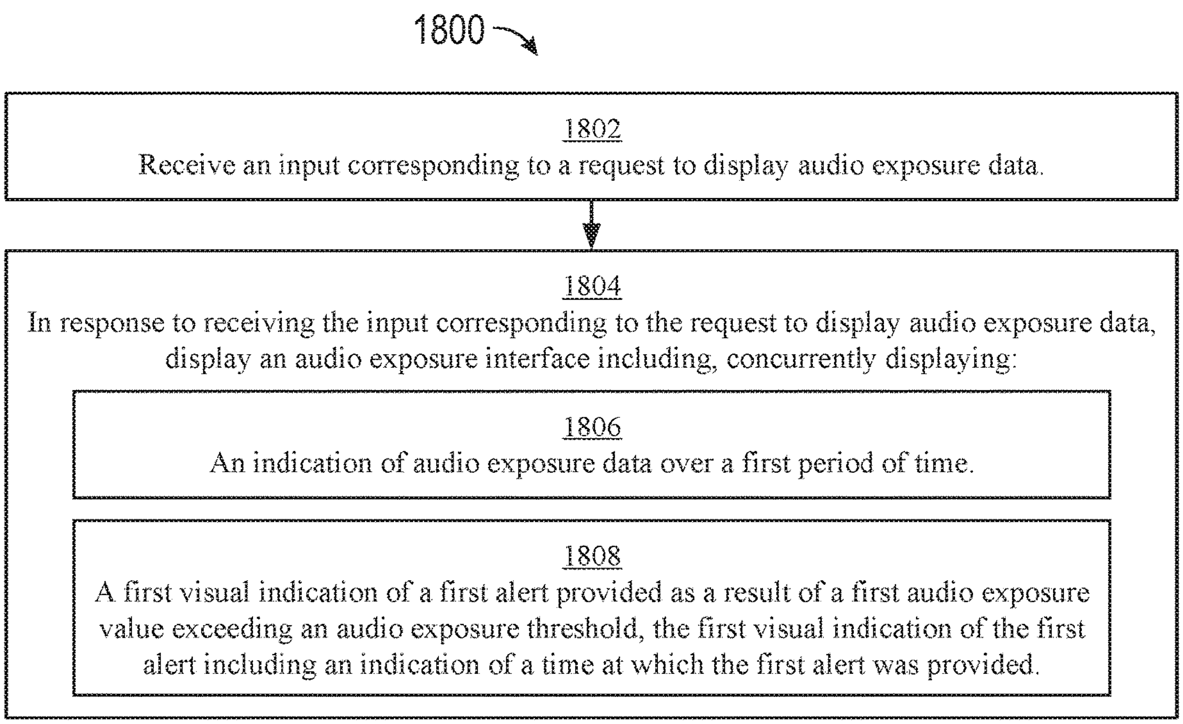
FIG. 18 is a flow diagram illustrating a method for managing audio exposure data using a computer system, in accordance with some embodiments.

FIG. 18 is a flow diagram illustrating a method for managing audio exposure data using a computer system, in accordance with some embodiments. Method 1800 is performed at a computer system (e.g., a smartphone, a smartwatch) (e.g., device 100, 300, 500, 600, 601, 800, 900, 1100, 1200, 1400, 1401, 1700) in communication with a display generation component (e.g., display 1702) (e.g., a visual output device, a 3D display, a transparent display, a projector, a heads-up display, a display controller, a display device) and one or more input devices (e.g., a touch-sensitive surface of display 1702). In some embodiments, the computer system includes the display generation component and the one or more input devices. Some operations in method 1800 are, optionally, combined, the orders of some operations are, optionally, changed, and some operations are, optionally, omitted.

As described below, method 1800 provides an intuitive way for managing audio exposure data. The method reduces the cognitive burden on a user for managing audio exposure data, thereby creating a more efficient human-machine interface. For battery-operated computing devices, enabling a user to manage audio exposure data faster and more efficiently conserves power and increases the time between battery charges.

In method 1800, the computer system receives (1802), via the one or more input devices, an input corresponding to a request to display audio exposure data (e.g., in the Health app from the Summary tab; in the Hearing user interface accessed from the Browse tab).

In response to receiving the input corresponding to the request to display audio exposure data, the computer system displays (1804) (e.g., concurrently displaying), via the display generation component, an audio exposure interface including, concurrently displaying: (1806) an indication of audio exposure data (e.g., a graphical representation of data indicating an output volume generated at an audio generation component (e.g., headphones) over a period of time (e.g., hour, day, week, month, year); e.g., a graphical representation of noise level data (e.g. data from a sensor of the computer system; data from an external computer system), as discussed above with respect to any of FIGS. 6A-6AL, 7A-7B, 8A-8L, 9A-9G, and 10) over a first period of time, and (1808) a first visual indication (e.g., a highlighted point on the graphical representation of the audio exposure data; a notification displayed in a summary tab of a health app UI) of a first alert (e.g., a notification, a haptic response, an audio response, a banner) provided (e.g., generated or output at the computer system) as a result of a first audio exposure value (e.g., a value (e.g., comprising the audio exposure data) indicating an amount of audio exposure (e.g., an instantaneous output volume of audio generated at the audio generation component; an aggregate level or amount of audio generated at the audio generation component; an instantaneous amount of external audio data (e.g., noise) detected at a sensor (e.g., of the computer system); an aggregate amount of external audio data detected at a sensor)) exceeding an audio exposure threshold (e.g., an instantaneous exposure threshold; an aggregate exposure threshold). The first visual indication of the first alert includes an indication of a time (e.g., day, hour, minute) at which the first alert was provided (e.g., the visual indication represents a time/moment at which the alert was provided). In some embodiments, the alert includes an indication that the audio exposure value exceeds the audio exposure threshold. In some embodiments, the audio exposure interface includes a second visual indication of a second alert that includes an indication of a time at which the second alert was provided. In some embodiments, audio exposure values are estimated based on a volume setting (e.g., volume at 100%) and a known audio generation component response (e.g., headphones output 87 dB at 100% volume for the particular signal being played). In some embodiments, audio exposure values are based on noise data (e.g., incoming signals or data) detected by a sensor (e.g., a microphone) of the computer system (e.g., audio levels measured by a microphone) (e.g., the audio exposure value represents the noise level of the physical environment where the computer system is located).

In some embodiments, the audio exposure interface further includes a second visual indication of a second alert provided as a result of a second audio exposure value (e.g., different from the first audio exposure value) exceeding the audio exposure threshold (e.g., an instantaneous exposure threshold; an aggregate exposure threshold). The second visual indication of the second alert includes an indication of a time at which the second alert was provided (e.g., different from the time at which the first alert was provided), wherein the second visual indication is different from the first visual indication.

In some embodiments, displaying the indication of audio exposure data over the first period of time (e.g., a week) includes: 1) displaying a first subset of the audio exposure data corresponding to a first subset of the first period of time (e.g., audio data for a first day of the week) and including the first audio exposure value (e.g., the first audio exposure value exceeded the audio exposure threshold on the first day of the week), and 2) displaying a second subset of the audio exposure data corresponding to a second subset of the first period of time (e.g., audio data for a second day of the week) that includes the second audio exposure value (e.g., the second audio exposure value exceeded the audio exposure threshold on the second day of the week). In some embodiments, the first visual indication of the first alert is displayed with (e.g., as a part of) the first subset of the audio exposure data (e.g., the first visual indication of the first alert is positioned on the audio exposure data for the first day of the week). In some embodiments, the second visual indication of the second alert is displayed with (e.g., as a part of) the second subset of the audio exposure data (e.g., the second visual indication of the second alert is positioned on the audio exposure data for the second day of the week).

In some embodiments, the audio exposure interface includes an indication of one or more days that the first alert (e.g., an alert generated in response to output audio exceeding an instantaneous audio exposure limit or an aggregate audio exposure limit; an alert generated in response to noise level data exceeding an audio exposure limit (e.g., a noise level limit)) was provided (e.g., received at the computer system). In some embodiments, the indication of the time at which the first alert was provided is an indication of a day at which the first alert was provided (e.g., received at the computer system).

In some embodiments, the indication of audio exposure data includes a representation of audio exposure data aggregated over the first period of time. In some embodiments, the representation of aggregate audio exposure is a graph illustrating the aggregate audio exposure for a seven-day period.

In some embodiments, the representation of audio exposure data aggregated over the first period of time includes a graphical representation of the aggregated audio exposure data displayed over the first period of time (e.g., seven days) relative to an indication of the audio exposure threshold (e.g., an indication of the aggregate audio exposure limit). In some embodiments, the graphical representation of the aggregated audio exposure data is displayed without regard to whether an alert has been provided for exceeding an aggregated audio exposure limit (e.g., the graphical representation is displayed even if no alerts have been provided for exceeding the aggregated audio exposure limit). In some embodiments, the graphical representation includes an indication of the aggregate audio exposure limit. In some embodiments, the graphical representation provides a snapshot view of the aggregated audio exposure data relative to the aggregate audio exposure limit. For example, the snapshot view may show the aggregated audio exposure data is below the aggregate audio exposure limit. As another example, the snapshot view may show the aggregated audio exposure data is above the aggregate audio exposure limit. In some embodiments, the aggregated audio exposure data is updated in real time and calculated on a rolling basis (e.g., every fifteen minutes).

In some embodiments, the aggregated audio exposure data is calculated on a repeating schedule (e.g., calculated every fifteen minutes for the predetermined period of time). In some embodiments, the audio exposure data is aggregated every fifteen minutes for a seven-day period. Accordingly, the seven-day period is comprised of approximately 672 fifteen-minute intervals over which the audio exposure data is aggregated. As a new fifteen-minute interval is added to the seven-day window, the oldest fifteen-minute interval is removed, and the audio exposure data is recalculated (e.g., aggregated) for the seven-day window. For example, if the audio exposure data for the most recent fifteen-minute interval indicates a greater audio exposure level than the audio exposure data for the oldest fifteen-minute interval that is no longer included in the seven-day window, the aggregated audio exposure data indicates an increase in aggregated audio exposure during the seven-day window. Accordingly, the aggregated audio exposure data adjusts/updates (e.g., increases, decreases, remains constant) every fifteen minutes based on the audio exposure levels that are being added to, and removed from, the seven-day window.

In some embodiments, the first audio exposure value corresponds to an aggregate audio exposure value over a period of time. In some embodiments, the first visual indication includes an indication of the period of time of the aggregate audio exposure that corresponds to the first alert. In some embodiments, when the alert is generated in response to exceeding an aggregate audio exposure limit, the audio exposure UI displays the seven-day period of audio exposure data that triggered the alert. In some embodiments, the audio exposure interface is displayed as a notification that the audio exposure data is approaching or has exceeded the seven-day aggregate audio exposure limit.

In some embodiments, displaying the audio exposure interface further includes displaying a user interface object including an indication of a sum of alerts (e.g., alerts of a first or second type) (e.g., alerts generated in response to exceeding an instantaneous audio exposure limit, or alerts generated in response to exceeding an aggregate audio exposure limit) provided during the first period of time. In some embodiments, the user interface object is an affordance (e.g., a filter affordance) that, when selected, alters the appearance of the audio exposure data to include the visual indications of the alerts generated during the first period of time (e.g., hour, day, week, month, year). In some embodiments the affordance indicates the number of alerts that were generated during the first period of time.

In some embodiments, the sum of alerts includes a sum of alerts generated in response to exceeding an aggregate audio exposure limit (e.g., the audio exposure threshold). In some embodiments, the user interface object further includes an indication of a type of alert associated with the sum of alerts provided during the first period of time (e.g., wherein the type of alert is an alert generated in response to exceeding an aggregate audio exposure limit).

In some embodiments, the computer system receives, via the one or more input devices, an input corresponding to a request to display a listing of audio exposure alerts and, in response to receiving the input corresponding to the request to display a listing of audio exposure alerts, the computer system displays a list that includes (e.g., as part of the audio exposure interface; separate from the audio exposure interface): 1) an indication of a first audio exposure alert (e.g., the first alert) provided as a result of one or more audio exposure values (e.g., including the first audio exposure value) exceeding one or more audio exposure thresholds (e.g., including the audio exposure threshold) (e.g., an instantaneous exposure threshold; an aggregate exposure threshold), the indication of the first audio exposure alert including first audio sample data (e.g., audio metadata; an indication of a start and stop time of the audio that triggered the corresponding audio exposure alert; an indication of whether the corresponding audio exposure alert is a first/second/third occurrence of the alert over a predetermined period of time) corresponding to the first audio exposure alert, and 2) an indication of a second audio exposure alert provided as a result of one or more audio exposure values exceeding one or more audio exposure thresholds, the indication of the second audio exposure alert including second audio sample data corresponding to the second audio exposure alert.

In some embodiments, during the first time period, the computer system caused output of audio data that met an instantaneous audio exposure threshold criteria (e.g., criteria that is met when the output of the audio data exceeds an instantaneous sound pressure value (e.g., 90 dB)). In some embodiments, displaying the audio exposure interface includes, in accordance with a determination that a volume limit setting (e.g., "Reduce Loud Sounds") was disabled at the time the computer system caused output of the audio data that met the instantaneous audio exposure threshold criteria, displaying a second visual indication of a second alert provided as a result of a second audio exposure value exceeding an instantaneous audio exposure threshold (e.g., an instantaneous audio exposure limit). In some embodiments, displaying the audio exposure interface includes, in accordance with a determination that the volume limit setting was enabled at the time the computer system caused output of the audio data that met the instantaneous audio exposure threshold criteria, forgoing displaying the second visual indication (e.g., the second visual indication is not displayed because the volume limit setting was enabled and, therefore, the audio exposure data did not exceed the instantaneous audio exposure limit, which would have triggered the second alert). In some embodiments, the first alert corresponds to an audio exposure threshold that is of a different type than the instantaneous audio exposure threshold criteria (e.g., an aggregate audio exposure threshold) and is displayed irrespective of whether the volume limit setting is enabled or disabled. In some embodiments, the volume limit is set/enabled/disabled using the computer system or using an external computer system such as a wearable device or a master device (e.g., a parent device that is authorized to set/enable/disable volume limits for the computer system). In some embodiments, when the volume limit is disabled, the audio exposure threshold can be an aggregate audio exposure limit or an instantaneous audio exposure limit. Accordingly, resulting alerts can be an alert that the aggregate audio exposure limit is reached or an alert that the instantaneous audio exposure limit is reached. However, when the volume limit is enabled, audio at an audio generation component (e.g., headphones) is limited such that the maximum volume permitted for the output audio data is less than the instantaneous audio exposure limit, as discussed in greater detail with respect to FIGS. 14A-14AK and 16. Enabling the volume limit therefore precludes a scenario in which the computer system provides alerts for reaching the instantaneous audio exposure limit. In such embodiments, however, alerts can still be provided for reaching the aggregate audio exposure limit. Accordingly, the audio exposure threshold is an aggregate audio exposure limit, but not an instantaneous audio exposure limit, when the volume limit is enabled.

In some embodiments, the computer system concurrently displays: 1) an affordance that, when selected, initiates a process for deleting the audio exposure data, and 2) a notification regarding availability of audio exposure alerts (e.g., text warning a user that audio exposure alerts (e.g., the first alert) may be deleted or missing if the audio exposure data is deleted). In some embodiments, the audio exposure data corresponds to ambient sound (e.g., noise). (e.g., the audio exposure data is noise level data). In some embodiments the audio exposure data represents audio that is external to the computer system, rather than audio that is generated (e.g., at an audio generation component) by the computer system. For example, the audio exposure data represents the noise level of the physical environment where the computer system (e.g., a sensor or microphone in communication with the computer system) is located. In some embodiments, the computer system is in communication with a microphone (e.g., integrated in the headphones) for detecting ambient sounds, and the audio exposure data represents the detected ambient sounds.

In some embodiments, the audio exposure data corresponds to audio output generated by the computer system (e.g., via the audio generation component). In some embodiments, the audio exposure data represents audio data that is generated (e.g., at an audio generation component) by the computer system. For example, the audio exposure data represents the volume of audio output at a headphones device that is coupled to the computer system.

Note that details of the processes described above with respect to method 1800 (e.g., FIG. 18) are also applicable in an analogous manner to the methods described above. For example, methods 1300, 1500, and 1600 optionally include one or more of the characteristics of the various methods described above with reference to method 1800. For example, operations for setting and adjusting audio settings, operations for displaying audio exposure limit alerts, and operations for managing audio exposure can incorporate at least some of the operations for managing audio exposure data discussed above with respect to method 1800. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data (e.g., sound recordings, audiograms) available from various sources to more effectively monitor personal sound exposure levels. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide a user with an accurate assessment of personal noise exposure throughout the day. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of monitoring noise exposure levels, the present technology can be configured to allow users to select to "opt in" or "opt out" of participation in the collection of personal information data during registration for services or anytime thereafter. In another example, users can select not to provide sound recording data for monitoring noise exposure levels. In yet another example, users can select to limit the length of time sound recording data is maintained or entirely prohibit the development of a noise exposure profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, noise exposure data can be selected and delivered to users by inferring preferences based on non-personal information data or a bare minimum amount of personal information, such as the content being requested by the device associated with a user, other non-personal or publicly available information.

What is claimed is:

1. An electronic device, comprising:

a display device;

a touch sensitive surface;

one or more processors; and memory storing one or more programs configured to be executed by the one or more processors, the one or more programs including instructions for:

receiving:

first noise level data attributable to a first device type; and second noise level data attributable to a second device type different from the first device type;

displaying, via the display device, a first user interface, the first user interface including:

a first representation of received noise level data that is based on the first noise level data and the second noise level data; and a first device type data filtering affordance;

while displaying the first user interface, detecting a first user input corresponding to selection of the first device type data filtering affordance; and in response detecting the first user input, displaying a second representation of received noise level data that is based on the second noise level data and that is not based on the first noise level data.

2. The electronic device of claim 1, wherein displaying the second representation of received noise level data includes:

maintaining display of the first representation of received noise level data, wherein the second representation of received noise level data is visually distinguished from the first representation of received noise level data.

3. The electronic device of claim 1, wherein the second noise level data corresponds to noise level data attributable to a single device.

4. The electronic device of claim 1, wherein the first noise level data corresponds to noise level data attributable to a plurality of devices.

5. The electronic device of claim 4, wherein:

the second noise level data includes third noise level data attributable to a third device type;

the first user interface includes a second device type filtering affordance corresponding to the third noise level data; and wherein the one or more programs further include instructions for:

while displaying the first user interface, detecting a user input corresponding to selection of the second device type filtering affordance; and in response detecting the user input corresponding to a selection of the second device type filtering affordance, displaying a third representation of the third noise level data.

6. The electronic device of claim 1, wherein the first user interface includes, prior to detecting the first user input, an average noise exposure level indicator indicating an average noise exposure level corresponding to the first noise level data and the second noise level data for a first time period.

7. The electronic device of claim 6, wherein the one or more programs further include instructions for:

in response detecting the user input corresponding to a selection of the first device type filtering affordance:

updating the average noise exposure level indicator to indicate an average noise level corresponding to the second noise level data.

8. The electronic device of claim 1, wherein the second noise level data is based, at least in part, on one or more signals transmitted from the electronic device to one or more devices of the second type.

9. The electronic device of claim 1, wherein the first representation of received noise level data includes an indication of a maximum value of the noise level data and a minimum value of the noise level data for a second time period.

10. A non-transitory computer-readable storage medium storing one or more programs configured to be executed by one or more processors of an electronic device including a display device and a touch sensitive surface, the one or more programs including instructions for:

receiving:

first noise level data attributable to a first device type; and second noise level data attributable to a second device type different from the first device type;

displaying, via the display device, a first user interface, the first user interface including:

a first representation of received noise level data that is based on the first noise level data and the second noise level data; and a first device type data filtering affordance;

while displaying the first user interface, detecting a first user input corresponding to selection of the first device type data filtering affordance; and in response detecting the first user input, displaying a second representation of received noise level data that is based on the second noise level data and that is not based on the first noise level data.

11. The computer-readable storage medium of claim 10, wherein displaying the second representation of received noise level data includes:

maintaining display of the first representation of received noise level data, wherein the second representation of received noise level data is visually distinguished from the first representation of received noise level data.

12. The computer-readable storage medium of claim 10, wherein the second noise level data corresponds to noise level data attributable to a single device.

13. The computer-readable storage medium of claim 10, wherein the first noise level data corresponds to noise level data attributable to a plurality of devices.

14. The computer-readable storage medium of claim 13, wherein:

the second noise level data includes third noise level data attributable to a third device type;

the first user interface includes a second device type filtering affordance corresponding to the third noise level data; and wherein the one or more programs further include instructions for:

while displaying the first user interface, detecting a user input corresponding to selection of the second device type filtering affordance; and in response detecting the user input corresponding to a selection of the second device type filtering affordance, displaying a third representation of the third noise level data.

15. The computer-readable storage medium of claim 10, wherein the first user interface includes, prior to detecting the first user input, an average noise exposure level indicator indicating an average noise exposure level corresponding to the first noise level data and the second noise level data for a first time period.

16. The computer-readable storage medium of claim 15, wherein the one or more programs further include instructions for:

in response detecting the user input corresponding to a selection of the first device type filtering affordance:

updating the average noise exposure level indicator to indicate an average noise level corresponding to the second noise level data.

17. The computer-readable storage medium of claim 10, wherein the second noise level data is based, at least in part, on one or more signals transmitted from the electronic device to one or more devices of the second type.

18. The computer-readable storage medium of claim 10, wherein the first representation of received noise level data includes an indication of a maximum value of the noise level data and a minimum value of the noise level data for a second time period.

19. A method comprising:

at an electronic device including a display device and a touch sensitive surface:

receiving:

first noise level data attributable to a first device type; and second noise level data attributable to a second device type different from the first device type;

displaying, via the display device, a first user interface, the first user interface including:

a first representation of received noise level data that is based on the first noise level data and the second noise level data; and a first device type data filtering affordance;

while displaying the first user interface, detecting a first user input corresponding to selection of the first device type data filtering affordance; and in response detecting the first user input, displaying a second representation of received noise level data that is based on the second noise level data and that is not based on the first noise level data.

20. The method of claim 19, wherein displaying the second representation of received noise level data includes:

maintaining display of the first representation of received noise level data, wherein the second representation of received noise level data is visually distinguished from the first representation of received noise level data.

21. The method of claim 19, wherein the second noise level data corresponds to noise level data attributable to a single device.

22. The method of claim 19, wherein the first noise level data corresponds to noise level data attributable to a plurality of devices.

23. The method of claim 22, wherein:

the second noise level data includes third noise level data attributable to a third device type;

the first user interface includes a second device type filtering affordance corresponding to the third noise level data; and the method further comprises:

while displaying the first user interface, detecting a user input corresponding to selection of the second device type filtering affordance; and in response detecting the user input corresponding to a selection of the second device type filtering affordance, displaying a third representation of the third noise level data.

24. The method of claim 19, wherein the first user interface includes, prior to detecting the first user input, an average noise exposure level indicator indicating an average noise exposure level corresponding to the first noise level data and the second noise level data for a first time period.

25. The method of claim 24, further comprising:

in response detecting the user input corresponding to a selection of the first device type filtering affordance:

updating the average noise exposure level indicator to indicate an average noise level corresponding to the second noise level data.

26. The method of claim 19, wherein the second noise level data is based, at least in part, on one or more signals transmitted from the electronic device to one or more devices of the second type.

27. The method of claim 19, wherein the first representation of received noise level data includes an indication of a maximum value of the noise level data and a minimum value of the noise level data for a second time period.

* * * * *

UNITED STATES PATENT AND TRADEMARK OFFICE

CERTIFICATE OF CORRECTION

PATENT NO. : 11,223,899 B2
APPLICATION NO. : 16/921312
DATED : January 11, 2022
INVENTOR(S) : Nicholas Felton et al.

It is certified that error appears in the above-identified patent and that said Letters Patent is hereby corrected as shown below:

In the Claims

In Claim 1, Column 119, Line 24, after “response” insert -- to --.

In Claim 5, Column 119, Line 52, after “response” insert -- to --.

In Claim 7, Column 119, Line 63, after “response” insert -- to --.

In Claim 10, Column 120, Line 29, after “response” insert -- to --.

In Claim 14, Column 120, Line 58, after “response” insert -- to --.

In Claim 16, Column 121, Line 4, after “response” insert -- to --.

In Claim 19, Column 121, Line 35, after “response” insert -- to --.

In Claim 23, Column 122, Line 19, after “response” insert -- to --.

In Claim 25, Column 122, Line 29, after “response” insert -- to --.

Signed and Sealed this
Seventeenth Day of October, 2023

Katherine Kelly Vidal

Katherine Kelly Vidal
*Director of the United States Patent and Trademark Office*